US011159909B2

United States Patent
Anderson

(10) Patent No.: US 11,159,909 B2
(45) Date of Patent: Oct. 26, 2021

(54) WIRELESS LOCATION ESTABLISHING DEVICE

(76) Inventor: Victor Thomas Anderson, Portola Valley, CA (US)

(*) Notice: Subject to any disclaimer, the term of this patent is extended or adjusted under 35 U.S.C. 154(b) by 0 days.

(21) Appl. No.: 13/359,394

(22) Filed: Jan. 26, 2012

(65) Prior Publication Data

US 2012/0190386 A1 Jul. 26, 2012

Related U.S. Application Data

(63) Continuation-in-part of application No. 12/366,525, filed on Feb. 5, 2009, now abandoned.

(60) Provisional application No. 61/026,262, filed on Feb. 5, 2008, provisional application No. 61/037,499, filed on Mar. 18, 2008, provisional application No.

(Continued)

(51) Int. Cl.

| | |
|---|---|
| ***G06Q 30/00*** | (2012.01) |
| ***H04W 4/021*** | (2018.01) |
| ***G01C 15/04*** | (2006.01) |
| ***G01S 19/14*** | (2010.01) |
| ***G01S 19/35*** | (2010.01) |
| ***G01S 19/48*** | (2010.01) |
| ***H04L 29/08*** | (2006.01) |

(52) U.S. Cl.

CPC ............ *H04W 4/021* (2013.01); *G01C 15/04* (2013.01); *G01S 19/14* (2013.01); *G01S 19/35* (2013.01); *G01S 19/48* (2013.01); *H04L 67/306* (2013.01)

(58) Field of Classification Search

CPC ........... G06Q 30/0261; G06Q 30/0267; G06Q 30/269; H04N 7/17309; H04N 7/17318; H04H 60/27; H04H 21/41407; H04W 88/02; H04W 24/00; H04W 84/14; H04W 64/00

USPC ...... 705/14.58, 14.64, 14.66; 455/3.05, 3.06, 455/422.1, 424, 425, 426.2, 456, 456.3

See application file for complete search history.

(56) References Cited

U.S. PATENT DOCUMENTS 6,076,099 A * 6/2000 Chen et al. .................. 709/202
6,363,320 B1 * 3/2002 Chou ............................ 701/446

(Continued)

FOREIGN PATENT DOCUMENTS

JP 2003043970 A * 2/2003 ............. G06Q 30/02
JP 2005352611 A * 12/2005 ............. G07B 15/00
JP 2006245868 A * 9/2006 ............... H01Q 3/24

OTHER PUBLICATIONS

Batayneh—Location Management in Wireless Data Networks (Apr. 21, 2006), Retrived online Aug. 12, 2020. https://www.cse.wustl.edu/~jain/cse574-06/ftp/wireless_location/index.html (Year: 2006).*

(Continued)

*Primary Examiner* — James A Reagan
(74) *Attorney, Agent, or Firm* — Stephen E. Zweig

(57) ABSTRACT

A system, method, service and wireless location-establishing device are disclosed, which locates its position by a plurality of means, including GPS satellite interrogation and triangulation. Alternative methods of location establishment include triangulating location data from nearby location-established objects such as WiFi or cell site towers, as well as from other present Invention location establishing devices ("Survey Eggs"). Once location has been established, the device can transmit and receive a variety of data based upon location, profile, and other factors, facilitating novel interactions and transactions.

17 Claims, 49 Drawing Sheets

Related U.S. Application Data

61/038,617, filed on Mar. 21, 2008, provisional application No. 61/039,839, filed on Mar. 27, 2008, provisional application No. 61/040,243, filed on Mar. 28, 2008, provisional application No. 61/042,663, filed on Apr. 4, 2008.

(56) References Cited

U.S. PATENT DOCUMENTS 7,164,986 B2 * 1/2007 Humphries ............. B60R 25/00 340/426.19
7,415,241 B2 * 8/2008 Oprescu-Surcobe ........................ H04W 28/10 455/3.05
7,620,026 B2 * 11/2009 Anschutz ............... G06Q 30/02 370/332
7,925,549 B2 * 4/2011 Looney .................. G06Q 30/02 705/14.49
7,954,032 B2 * 5/2011 Kim ...................... H04L 1/0003 714/746
7,990,151 B2 * 8/2011 Olsson et al. ................ 324/326
9,183,572 B2 * 11/2015 Brubaker ............... G06Q 30/02
2002/0161627 A1 * 10/2002 Gailey et al. ................... 705/10
2004/0260760 A1 * 12/2004 Curnyn ................. H04W 88/06 709/201
2006/0064346 A1 * 3/2006 Steenstra et al. ............... 705/14
2006/0149710 A1 * 7/2006 Koningstein .......... G06Q 30/02
2007/0061363 A1 * 3/2007 Ramer ................... G06Q 30/02
2007/0073799 A1 * 3/2007 Adjali ................... H04W 28/06 709/200
2007/0150073 A1 * 6/2007 Dawson ............. G05B 23/0283 700/11
2007/0244633 A1 * 10/2007 Phillips ................. H04W 4/021 701/408
2007/0291473 A1 * 12/2007 Traynor ................... B60Q 7/00 362/106
2008/0010133 A1 * 1/2008 Pyhalammi et al. ........... 705/14
2008/0134043 A1 * 6/2008 Georgis ................ H04L 67/104 715/733
2009/0024404 A1 * 1/2009 Morley et al. .................... 705/1
2009/0101706 A1 * 4/2009 Boyd ..................... G06Q 30/02 235/380
2009/0221278 A1 * 9/2009 Spelta ................... H04W 8/205 455/418
2012/0036140 A1 * 2/2012 Nielsen ................. G06Q 10/06 707/754

OTHER PUBLICATIONS

• Mathworks. Mapping Toolbox User's guide. (Jul. 15, 2002). Retrieved online Jan. 29, 2021. http://cda.psych.uiuc.edu/matlab_pdf/map_ug.pdf (Year: 2002).*
• International Telecommunication Union. ITU Internet Reports The Internet of Things. (Nov. 2005). Retrieved online Jun. 17, 2021. https://www.itu.int/net/wsis/tunis/newsroom/stats/The-Internet-of-Things-2005.pdf (Year: 2005).*
U.S. Appl. No. 12/366,525, dated Sep. 26, 2011, Restriction Requirement.

* cited by examiner

801 data display tile (on mobile handset)

ParaSites are presented in tiles (Tilz) format users flick through and select the desired ParaSites cover tile
to bring up the custom, local content for that Website ParaSites tiles map to sections on sphere
as the navigation modality for various digital devices

| Web 1.0 vs. Web 2.0 | Web 1.0 | Web 2.0 |
|---|---|---|
| What | 3801 HTML | Tilz 3802 |
| Where | 3803 URL | IPv21# 3804 |
| How | 3805 HTTP | ComCloud 3806 |

| Web 1.0 vs. Web 2.0 | Web 1.0 | Web 2.0 |
|---|---|---|
| What | 4501 HTML | 4502 Tilz (present invention) |
| Where | 4503 URL | 4504 IPv21# |
| How | 4505 HTTP | 4506 ComCloud |

Intersection of Interest

WIRELESS LOCATION ESTABLISHING DEVICE

CROSS-REFERENCE TO RELATED APPLICATIONS

This application is a Continuation-in-Part of and claims the benefit of U.S. patent application Ser. No. 12/366,525, filed on Feb. 5, 2009, which claims the benefit of Provisional Application Ser. No. 61/026,262, filed Feb. 5, 2008, Provisional Application Ser. No. 61/037,499, filed Mar. 18, 2008, Provisional Application Ser. No. 61/038,617, filed Mar. 21, 2008, Provisional Application Ser. No. 61/039,839, filed Mar. 27, 2008, Provisional Application Ser. No. 61/040,243, filed Mar. 28, 2008, and Provisional Application Ser. No. 61/042,663, filed Apr. 4, 2008. The foregoing patent applications are hereby incorporated by reference in their entirety.

FIELD OF THE INVENTION

The principles of the present invention relate to a location establishing method, location establishing devices, and a location establishing service and system, that has applications for many fields, including property surveys. Additionally, the present invention relates to a method and system of data transmission and reception. The data transmission and reception includes, but is not limited to, such items as information, advertisements, offers, and profiles.

DESCRIPTION OF THE CONVENTIONAL ART

At present, when performing a boundary survey for a particular property, survey instruments are utilized to locate the corners of a property owner's lot. The surveyors often mark these corners by driving wooden stakes in the ground.

When the work is done that necessitated the boundary survey, the wooden stakes are (often) removed.

Unfortunately for the property owner, if additional work needs to be done, say a few years later, the owner must incur the cost of performing another boundary survey all over again (with potentially varying results).

SUMMARY OF THE INVENTION

The present Invention is conceived as a response to the above-described disadvantages of the conventional art. The present Invention relates to wireless, location-establishing devices (hereafter "Survey Eggs"), that are wireless Global Positioning Satellite (GPS) devices that enable surveyors to permanently locate the boundary points of property lines. Survey Eggs address problems such as having a property owner's boundary surveyed over and over, for thousands of dollars each time the owner, say, renovates their property.

Accordingly, a cost-efficient method for providing permanent location information is needed.

Survey Eggs can be placed in the ground once (FIG. 4), and property owners can have their boundary points located permanently.

Once established, Survey Egg boundary points can, for instance, be mashed up with satellite map data allowing property boundary lines to be displayed on services such as online maps, as well as synchronized with official parcel maps (FIG. 4).

The principles of the present invention also relate to another embodiment, with a focus on commercial, municipal and government applications for surveys, highways, roads, and paths; in addition to, information communication to police, DMV, car companies, other users, etc. This ruggedized embodiment is referred to as "Gotz Dotz" for convenience. Gotz Dotz can, for example, replace Botts' Dots on highways, and are designed to withstand being run over by vehicles.

The principles of the present invention also relate to yet another embodiment, which shall be referred hereafter to as "Survey Nuts" for convenience, which are devices that do not utilize satellite GPS to locate themselves, instead triangulating from three or more of the boundary Survey Eggs (or other location-established Survey Nuts). Survey Nuts are intended to be placed in every corner and key point of a structure. Once in place Survey Nuts can, for instance, provide a three dimensional electronic blueprint 195 of that structure.

In addition to survey-related uses, property owners can utilize Survey Eggs/Nuts to mini-broadcast a commerce communications cloud—an extranet referred to as a "ComCloud" for convenience—from (or within) their property to (a) synchronously interact with others without necessarily utilizing the Internet.

For example (FIG. 5), the property owner can, via means such as Bluetooth, wirelessly post their "garage sale" items to their ComCloud. Others with devices such as mobile handsets who are walking or driving by 503 and who have created a profile of items they are shopping for, are notified of profile matches for the "garage sale" items. The two parties can then message each other via the ComCloud to set up a time to inspect and possibly purchase the item(s).

BACKGROUND OF THE INVENTION

Survey Eggs address and disrupt the vast worldwide market for property/structure surveys. Hundreds of millions of surveys are performed worldwide each year, with an average cost often above $1,000 in developed countries. Because most boundary surveys do not leave permanent boundary markers such surveys may be performed over and over again on the same property/structure.

Performing the same boundary survey over and over again is extremely wasteful. Survey Eggs address this obvious problem with a new type of permanent electronic boundary/survey marker 403, 404, 405, 406.

The subdivision maps 401 maintained at County Assessor's Offices are sometimes inaccurate, especially for older subdivisions.

Most subdivision maps rely on what are called Survey Monuments. These are physical nails or plaques that are placed in/on the ground and act as the reference points for official subdivision surveys. Over time however, some Survey Monuments are lost or incorrectly replaced. This happens, for example, when a Survey Monument is located in a sidewalk or road that is torn up to access underground utilities, and then re-surfaced. Survey Monuments are supposed to be replaced in exactly the same spot, but in practice they are sometimes replaced inaccurately.

The result is tens of billions of dollars of wasted time, and unnecessarily lengthy surveys, to re-establish an accurate starting point for each survey. Survey Eggs also act as permanent and accurately re-locatable Survey Monuments.

Among other uses, Survey Eggs amass location data to produce subdivision plot maps that may be more accurate than those currently available, and are continuously available at minimal cost—compared to the thousands of dollars spent each time a plot owner needs to do any redevelopment (such as building a new house, or a house addition, or a new sidewalk, or new road, or municipal building, etc.).

The online plot maps Survey Eggs produce provide impetus for resolution of differing boundary surveys—as well as a basis for updating inaccurate legal descriptions of properties—all of which benefits property owners and Assessor's Offices in producing highly reliable and accurate property boundary 402 and subdivision 401 maps.

Surveyors (In embodiments, surveyors install and maintain Survey Eggs, and may revenue share the software, services and transaction income from those Survey Eggs); Government entities (Municipalities may offer new residents a discount on boundary Survey Egg service fees in exchange, for example, for a portion of the Survey Egg CloudCast monthly revenue); Architects (Because architects require the survey (and blueprint) data, they may market Survey Eggs to clients on a monthly basis (with an ongoing revenue sharing relationship), rather than utilizing conventional art (one-time) survey (and blueprint) techniques/methods); Geology organizations (may want the types of datasets that Survey Eggs produce, and seek grants/funds to obtain (aggregated) Survey Egg data); Tourist boards (may co-market the ComCloud travel guide features, in exchange for a cut of revenue from paid guides/tours); Web Drops (Web Drops are places in the real world where users (or objects) can gain access to a wider network of other users or objects, generally via wireless networks, both paid (such as a carrier wireless network) and unpaid (such as Bluetooth). For example, in embodiments, Survey Eggs can be utilized to transfer cellphone (wireless) traffic to landline/fiber optic networks).

Survey Eggs provide vital connections between the online and offline worlds, and may play a vital role in the transformation of the conventional art network architecture. Survey Eggs/Nuts not only establish locations, but fundamentally change people's lives, via the interactions and transactions enabled by Survey Eggs CloudCast, as well as the marketing and merchandising of products and services.

BRIEF DESCRIPTION OF THE DRAWINGS

The Invention, together with further objects and advantages thereof, may best be understood by reference to the following description taken in conjunction with the accompanying drawings, wherein like reference numerals identify like or similar elements, and wherein.

DESCRIPTION OF THE PREFERRED EMBODIMENTS

The present Invention is described in one or more embodiments in the following description with references to the Figures. While the Invention is described in terms of the primary modes for achieving the Invention's objectives, it will be appreciated by those skilled in the art that it is intended to cover alternatives, modifications, and equivalents as may be included within the spirit and scope of the Invention as defined by the appended claims and their equivalents as supported by the disclosures and drawings herein.

Devices

Figure 1:
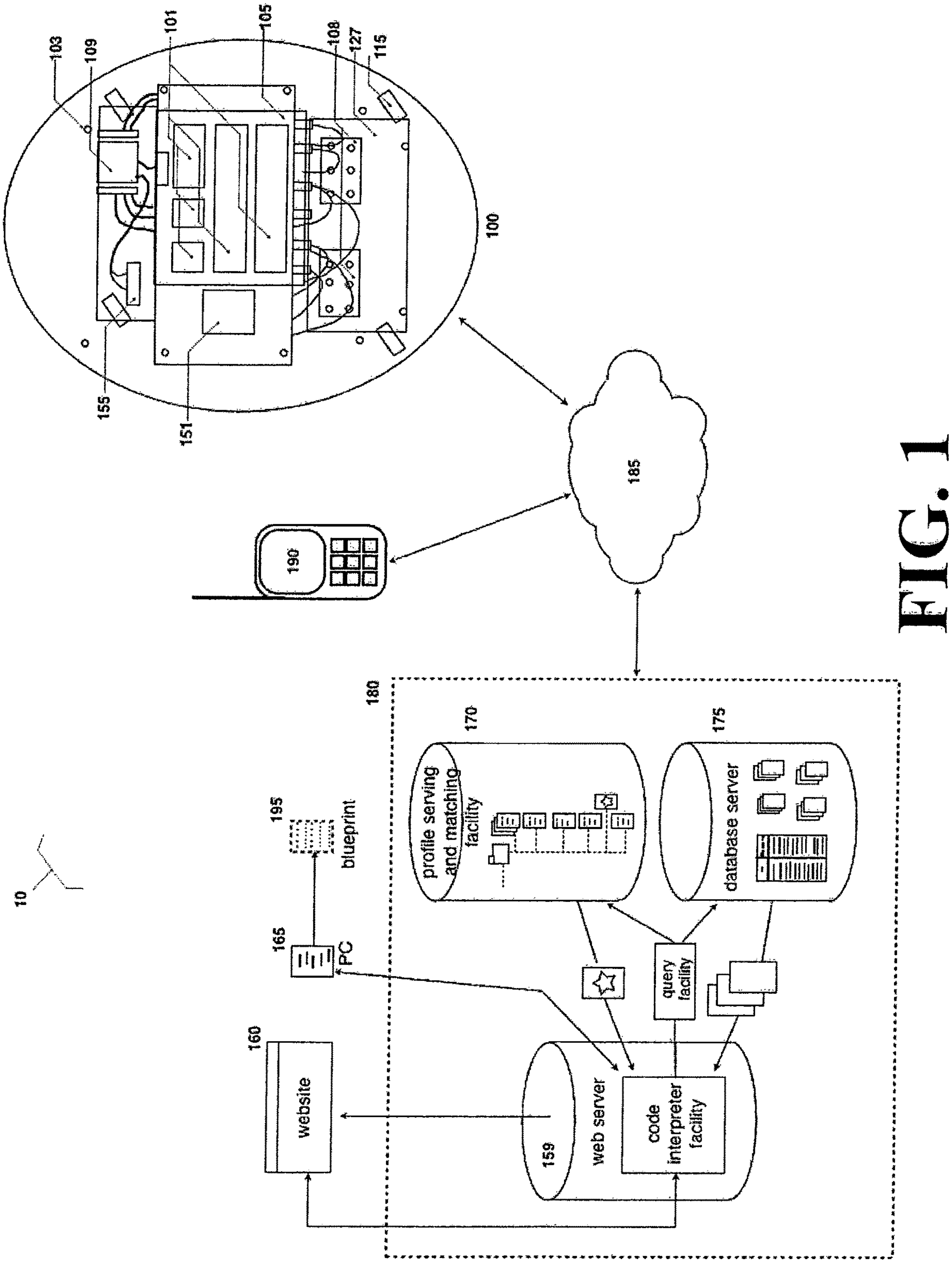
FIG. 1 is a functional block diagram and schematic of an exemplifying architecture of an embodiment of a wireless location-establishing device and system in accordance with the Invention.

Shaped and sized slightly larger than a hen's egg in a preferred embodiment FIG. 1, although other embodiments contemplate other sizes, compact, secure, waterproof Survey Eggs contain a GPS device that can accurately locate its position in one of several ways including (FIG. 7): communicating with orbiting GPS satellites 701 or triangulating from three or more location-established fixed objects such as WiFi 601 or cell site towers 701.

Survey Eggs enable, for instance, surveyors to permanently establish the boundary points of property lines. The resultant boundary/location information 402 can then be transmitted to subscribers, such as the Survey Eggs Website, the user, any number of online map services, or even the County Assessor's office for official filing 401. Survey Eggs address the problem wherein property owners pay over and over again to have boundary points located, at considerable expense each time. Survey Eggs are placed in the ground once, and for an optional monthly fee, boundary points are permanently located and signaled. Once location has been established, the device(s) can transmit and receive a variety of data based upon location, profile, and other factors, facilitating novel interactions and transactions.

A ruggedized embodiment, Gotz Dotz, are compact, secure, waterproof, reflective, location aware, intelligent path marking units (primarily utilized in commercial, municipal, and federal applications), that may serve, for instance, as replacement for Botts' dots on highways to divide lanes of traffic. Gotz Dotz can also comprise a wireless service network (method) to store and transmit geo-based data.

Another embodiment, Survey Nuts, are typically smaller location sensing devices. They are primarily intended for use in establishing all the corners and edges of structures—and are often installed at the time the structure in being constructed. Once in place they can, for instance, produce a three dimensional electronic blueprint of the structure 195.

Potential Survey Egg/Nut Points 50 million single family home plots in the U.S. (and almost 1 billion worldwide) with 3 points minimum (and a greater number for rectangular or odd-shaped lots), plus multi-family dwellings such as apartments/condos, plus commercial structures/buildings such as office buildings, gas stations, grocery stores, etc.

Roads, bridges, antennae, street light posts, telephone poles, ocean buoys, mountaintops, streams, glacier edges (to monitor melting), etc.

City, county, state, and national survey points: buildings, parks, monuments, sidewalks, etc.

Survey Egg Extranet

In addition to survey-related uses, property owners can utilize Survey Eggs to mini-broadcast a commerce communications cloud ("ComCloud")—essentially an extranet from their property to (a) synchronously interact with others (and other entities) via mobile device (or other devices) without necessarily utilizing the Internet. Users can post items to their ComCloud, which can notify others walking by with a profile seeking one of those items. Survey Eggs are capable of storing information beyond their basic location information. Survey Eggs software enables the user to download data and compatible applications, such as ComCloud management software. Downloading is accomplished via any of the networking communications protocols resident on that particular Survey Egg. The ComCloud can access and utilize a user's broadband Internet access via WiFi, or other means; however user-supplied Internet access is not necessary for a ComCloud to function. ComCloud is broadcast (CloudCast) via various means such as Bluetooth, WiFi, wireless carrier network, and other means. A software widget enables users to utilize their mobile device (among other devices) to place items into their CloudCast. For example, the Bluetooth onboard the Survey Egg can be utilized to broadcast (CloudCast) user-supplied information/profiles over a distance of up to 100 meters or more from the location of any given (boundary marker) Survey Egg. So too, ads and offers, can be stored on, and delivered by, Survey Eggs without need for the Internet. And because Survey Eggs may be utilized by businesses, as well as individuals, Survey Eggs may disrupt/improve the way people get information, communicate, interact, transact, and buy and sell.

With the ComCloud management software installed, the user can manage, via various digital devices such as a mobile handset, the information broadcast by the ComCloud created by their boundary marker Survey Eggs. A digital dashboard is supplied to manage the ComCloud, including selecting the networking protocol utilized, managing the content, and setting the range of the broadcast (e.g. via online mapping service).

Once established the ComCloud can perform a number of functions (FIG. 5):

Automatically alert the power company in the case of a power outage.

Provide lifeline alerts for the elderly. The elderly can, for example, wear a tiny Bluetooth or WiFi pendant. In embodiments, the pendant features a button for the person to press if they are in distress.

Advertising local or property needs or information;

Such as:

House is for sale—and provides the details (price, square footage, digital brochure, etc.).

Homeowners can accept offers of interest from others, via a vis purchasing their home. Thus, when it comes time to sell their home, homeowners may not need the marketing services of a real estate agent, since the homeowner may have amassed a number of leads/names/profiles of parties interested in purchasing the home, thereby possibly saving thousands of dollars in real estate agent commissions.

Continuous garage sale items—not just on weekends, and without having to haul all their stuff into the driveway. Users 503 can digitally offer their items without, for example, eBay (or similar) listing fees.

Services wanted (for example, homeowner posts requests for proposals (RFPs) or otherwise seeks bids for a new paver stone driveway) 504.

Homeowners can broadcast profiles of service providers to that home. For example, if a neighbor is strolling past a house, notices the well kept yard, and wants to know the name of gardening service that keeps that yard so nice, the homeowner's ComCloud can supply the profile data tiles or "Tilz" (digital content format) of the homeowner's gardener, and possibly receive a fee from the gardener for "marketing" the gardener's business—a novel type of search; and a novel type of location-based marketing and advertising.

If, for example, a passerby 503 to the homeowner's property, likes the iron work on the homeowner's front gate, the information Tilz may be obtained from the homeowner's Survey Egg ComCloud. And the homeowner may get paid a commission, when an interested party who receives the ironwork gate Tilz, later purchases from that company.

When a user has guests over to their house, and the guest admires, say, the new granite countertops, the ComCloud can (if the homeowners wishes) deliver the Tilz of the granite countertop retailer/installer—and thereby possibly receive a marketing commission from the countertop retailer/installer. And the homeowner may get paid another commission if the party who received the Tilz from the Survey Egg/Nut ComCloud, later transacts with the granite countertop retailer/installer.

In fact, all contractors who ever worked on a person's house, and manufacturer's for every item a person owns in that house, can pay the homeowner to be on the homeowner's "CloudCast" (the ComCloud broadcast). All items: painting, artwork, silverware, couches, TVs, light fixtures, clothes . . . literally everything that user owns may have a Tilz (a digital profile of that item) that is part of that property's CloudCast.

The homeowner's ComCloud can deliver the profile Tilz for any household item, object, plant, tree, etc. the homeowner owns to persons or entities requesting such information, for free or for a fee. ComCloud thereby enables Survey Egg owners to monetize their profiles. For example, an appliance store may wish to pay the user to view that user's household appliance profile; and then pay the user again to send ads, offers, or information as per the user's profile—if the user wishes to receive same, such as when its time to upgrade or replace an item. Or the lawn may need annual aerating. Or the fireplace needs cleaning every 10 years. Companies used to pay middlemen, such as search engines, fees to find potential customers; Survey Eggs and ComCloud may disintermediate such middlemen, and enable the users to get paid instead, while exerting greater control over advertising received.

Business owners can use Survey Eggs to broadcast their ComCloud from the property on which their business is located. The ComCloud can deliver ads, offers, information, profiles, and/or coupons to passersby who can receive same via various devices such as a mobile handset 503.

With a ComCloud, it's as if that user's house/property/business had its own Myspace page—a profile of that house/property/business. Included in that profile are a Tilz for every single item relevant to that property. For example, every appliance the user owns has its own separate Tilz; there is a Tilz for every contractor who worked on/in that property; a Tilz for every knife, fork, spoon, glass, plate, couch, article of clothing, book, etc. that resides in, or relates to, that property; a Tilz for the housekeeper, pool service company, company that trimmed the trees, etc.

Survey Egg ComClouds are of particular relevance in second and third world countries where some villages are not connected to the Internet, but instead rely on peer-to-peer 503 and/or intra-village data coverage.

ComCloud broadcasts (CloudCasts) can be geo-limited by the ComCloud management software, which can be controlled via devices such as personal computers or mobile handsets. That is to say, the user may wish to control the distance certain items are CloudCast. The user may wish certain ComCloud items to conceivably be available to the entire world, by various means, such as the Internet. But, for other items, the user may wish those items/profiles/ads/coupons/etc. to be CloudCast no further than 100 meters from the Survey Egg. For example, it's nearly 6 PM and a restaurant has a few empty tables. The restaurant may want to limit their CloudCast ads and coupons, to those parties 504 within a few miles, and thus those who can get there by 6 PM.

Having generally described operation of the systems and methods for location establishment and profile-based messaging, various embodiments will be described with respect to FIGS. 1-9.

Referring to the accompanying drawings wherein the same reference numerals refer to the same or similar elements:

FIG. 1 shows an architecture of an embodiment of an in-situ location sensing system in accordance with the Invention which is designated generally as system 10.

System 10, hereafter "Survey Eggs," consists of the multiple embodiments of in-situ location sensing devices (ILSD) and/or fixed location sensing devices ((FLSD), in addition to a Website 160, mapping and blueprint software (application programming interfaces APIs) 165, server software 170 and 175 and a widget 190 (Webified mini software application) configured for operation with a variety of digital computing devices including mobile handsets. The widget 190 enables users to engage and manage a number of location-based services the Survey Eggs engender. The Website 160 (and/or widget 190) contains, in addition to survey related features and functions, social networking tools such as profiles, comment sharing, blogging, chat, message boards, media sharing, social mapping and tagging/geo-tagging. Finally, there are online and offline tools for broadcasting profiles 170 and 185 via means such as the Internet, and various non-Internet means such as Bluetooth (such means collectively referred to hereafter as "Cloud-Casting").

In embodiments remotely-programmable Survey Eggs 100 contain a microprocessor 101, NAND chip flash storage capacity 101 and a Linux-based operating system or other operating system compatible with the Survey Eggs software 180. Various electronic interfaces including input/output IO ports, direct memory access (DMA) circuitry, etc. are not included in the schematic of FIG. 1 as such interfaces are well known to those skilled in the art. Survey Eggs 100 are configured with global positioning satellite (GPS) facilities and software for management thereof, including transmission of location information to local and remote sources. A module is configured to perform calculations pursuant to differential distance figuring, with particular regard to other Survey Eggs 100, as well as mobile and fixed objects such as GPS-equipped mobile handsets and cell site towers respectively.

Survey Eggs 100 embodiments sans GPS are provided, configured to be placed in key points of a structure, property, object or other thing, and to thereby triangulate (or otherwise fix) its location by utilizing at least three external location-established devices or other things, such that the location and/or physical makeup of the structure, property, object or other thing may be determined. A module is configured such that digital blueprints may be automatically generated and published based in part upon the prior determined data. A broadcast module is configured to transmit and/or receive messages/data of various types based upon a plurality of factors such as location and/or profile. Such an embodiment is hereafter referred to as "Survey Nuts."

Survey Eggs server-side facilities 180 are provided. A profile serving and matching facility 170 is configured to transmit profiles to/from Survey Eggs 100 as well as other remote devices. The profile serving and matching facility 170 includes algorithms configured to filter and match a plurality of available ads/offers/information/et. al. (configured into data "tiles" or the homonym thereto, data "Tilz") based upon metadata for each such ads/offers/information, against profiles of items a user has indicated a desire to receive (or not) ads/offer/information for. A database server 175 facilitates user profiles and preferences, as well as a rules facility by which certain actions must accord. A report creation and transmission module is configured to accept data from Survey Eggs 100 and remote sources, and therefrom produce and transmit ordered datasets such as boundary surveys and the legal descriptions thereof, to remote entities such as governing agencies. A module is configured for storage, reception, transmission and (static) broadcast 185 of messages and other data, and in particular those data configured into profiles (a module hereafter referred to as "ComCloud"). The ComCloud module includes profile creation, filtering, and matching facilities. In embodiments, one of more of the plurality of facilities/modules described in the present paragraph are configured for operation directly on/by the Survey Eggs 100.

Survey Eggs widget client-side facilities 190 are provided configured for operation on mobile handsets 190 and other devices. A report creation and transmission module is configured to accept data to/from Survey Eggs 100 and remote sources, and therefrom produce and transmit ordered datasets such as boundary surveys, and the legal descriptions thereof, to remote entities such as governing agencies. A ComCloud module is configured for operation by the Survey Eggs widget.

Users create new or update existing profiles by a plurality of means, including, for instance, scanning an ad in a newspaper for an item a user is interested in. The scan results in a query which returns a data/profile tile (Tilz), about the subject item, to the user's mobile handset 190. For example, if the user scanned an ad for an automatic driveway gate, and received the Tilz for same, the client-side Survey Eggs widget 190 queries the user as to whether or not the user would like to receive ads/offers/information pertaining to automatic driveway gates. The user's profile is updated presently by (the Survey Eggs client-side software on the user's mobile device 190, and/or) the Survey Eggs server-side facilities 180, which receive transmission of the query results via a plurality of communication modalities 185. The user's updated profile is returned therefrom to the user's Survey Eggs widget 190 and the Survey Eggs 100 for inclusion in the user's profile broadcast 185 (ComCloud). The ComCloud 185 can be configured for various broadcast distances from global to just a few feet. For example, the Survey Eggs 100 ComCloud 185 may be configured for use via Bluetooth, which has limited range. Bluetooth range may be sufficient however to reach contractors driving by a particular Survey Eggs 100-equipped property, who might otherwise be able to provision and install the user-desired automatic driveway gate (and effect the transaction pursuant thereto via ComCloud).

In embodiments, local passersby via Bluetooth (or other means) or remote users via the Internet (or other means) may broadcast their profiles in such a fashion that a Survey Eggs 100 ComCloud 185 can facilitate matches that may lead to novel interactions and transactions.

In embodiments, Survey Eggs software facilities may be configured as a Web-based application 160.

Figure 2:
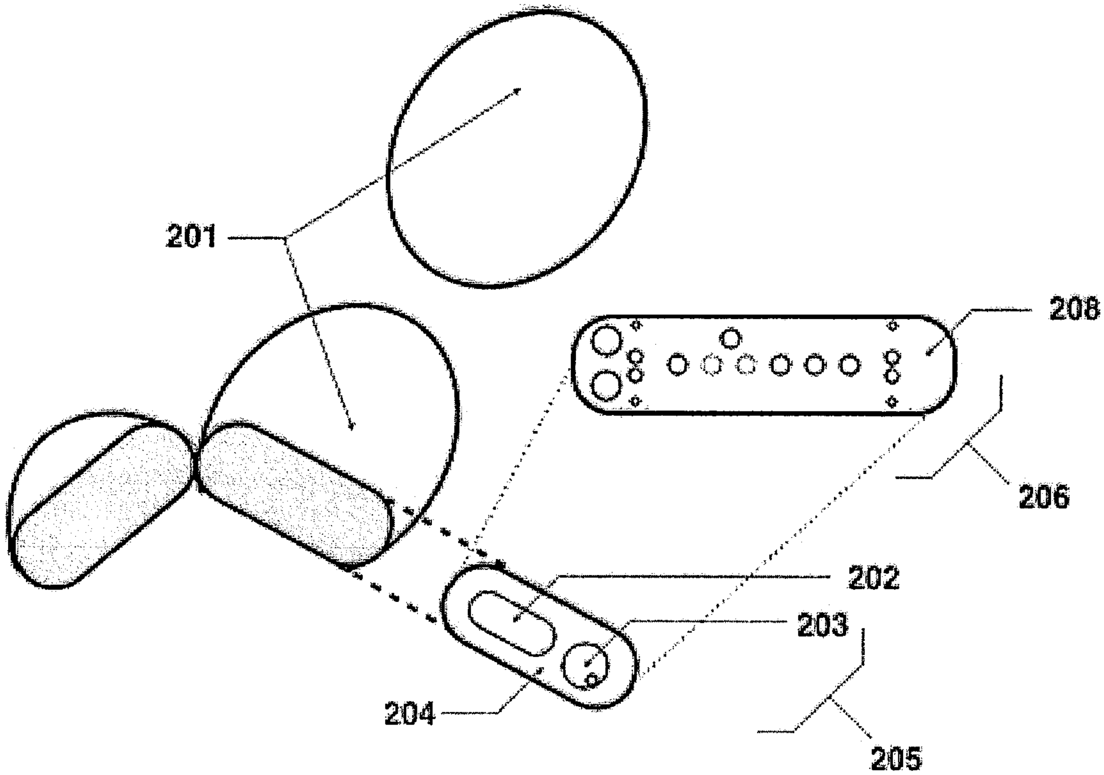
FIG. 2 is a schematic of an exemplifying architecture of an embodiment illustrating how a user might physically interact with and manage the Invention.

FIG. 2 illustrates an embodiment of the compact, secure, waterproof, weatherproof device enclosure 201. For purposes of installation, maintenance, repair or other general physical interaction, the device enclosure may be opened to reveal several interface modalities. Users with clean, dry hands may wish to avail themselves of the touchscreen interface 202 to interact with the device. The user is presented with a menu driven command structure to initialize the unit, and set its various operating parameters. For example, the unit may operate as a standalone unit, or in conjunction with other Survey Eggs. If there are more than one Survey Egg on a given property each Survey Egg must be assigned a canonical order number, to facilitate commands that are serial in nature (as opposed to commands that all Survey Eggs may execute at once, in parallel).

For those instances, when the user interacting with the Survey Egg, may be wearing gloves, and/or may have wet or muddy hands, they may interact with the Survey Egg via a finger wheel menu selector 203.

In order to facilitate repair or other tasks, the faceplate 204 is removed, to reveal the sub-enclosure 205, which features another moisture seal gasket. The mechanical interface 208 to the faceplate 204, illustrates some of the various customizable feature attachment/interface facilities, that differ for various embodiments of the Invention. Such attachments may include various types of meteorologic, gas, and/or flow sensors (among other types of attachments).

Licensed Installation

Figure 3:
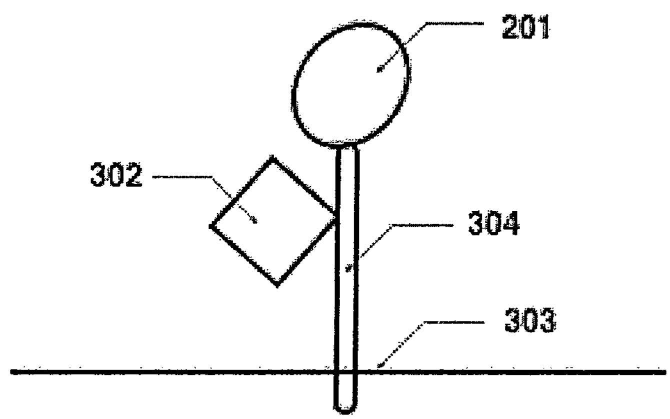
FIG. 3 is a depiction of one of a plurality of Invention installation embodiments, in this case above-grade, on a spike, and powered by a solar cell array.

FIG. 3 Survey Eggs can be installed by anyone, however only licensed surveyor-installed Survey Eggs have legal merit. Survey Eggs are generally installed by personnel such as State licensed survey engineers, and all Survey Eggs and spikes ("Eggposts") 304 so installed, have an electronic (Tilz) and/or physical tag with the survey engineer's survey license number, and survey date. If installed by someone other than a licensed surveyor, they do not have legal merit vis a vis County/State/National Property Assessor's offices.

Survey Eggs can be installed below grade, at grade, or above grade using a spike 304 (made from materials such as composite plastics and/or metal) of varying sizes (including 10 centimeters to 10 meters, for medium/deep-water applications). The spike 304 can be driven into the ground to support the Survey Egg and keep it in place. The spike 304 may be fitted with a weatherproof and waterproof Survey Egg holder 201 on top, and a special lock requiring a special type key (serial numbered and made available only to licensed surveyors) or electronic code to open.

Figure 4:
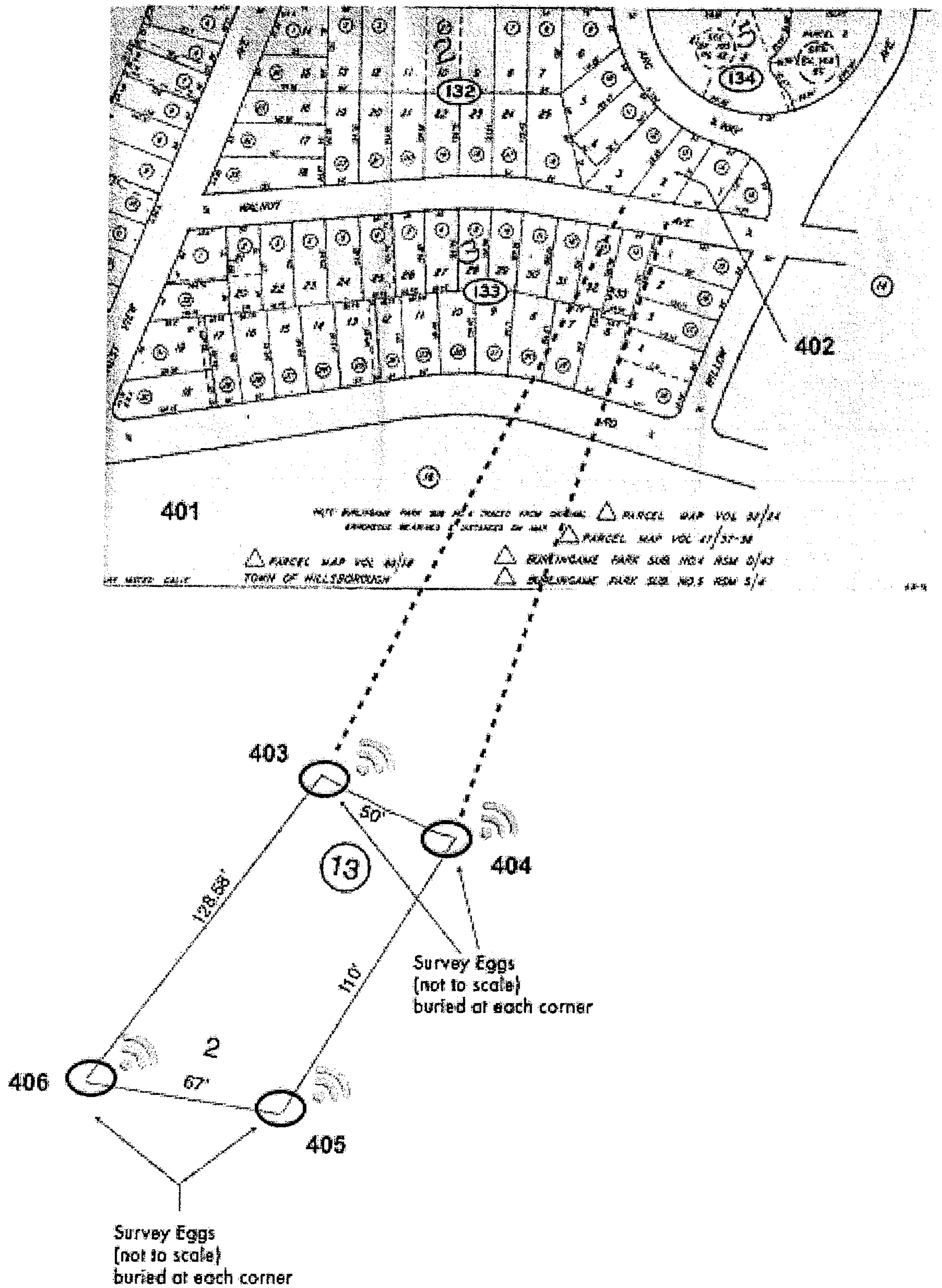
FIG. 4 is a diagram illustrating how installing the Invention ("Survey Eggs") at the corners of a property, enables the Survey Eggs to calculate distances and thereby create a boundary survey map, that can be synchronized electronically with an official parcel map.

FIG. 4 In order to provide more accurate location information than may be available via GPS alone, a Survey Eggs installation by a licensed surveyor may proceed as follows: The surveyor locates the boundary points of a property using conventional survey techniques and instruments. However, instead of simply driving wooden stakes into the ground to mark, say, the corners of the subject property, the surveyor installs Survey Eggs at each corner 403, 404, 405, 406).

Survey Eggs can be networked 185, either via hardline or wirelessly. Survey Eggs typically utilize WiFi for connectivity, but are compatible with several other networking protocols (see Internet Service and Networking Protocols below). Survey Eggs can broadcast their position to the Survey Egg Website 160 where the Survey Egg software produces an online map of the property. This map can be combined or mashed-up with online mapping services.

Each Survey Egg is assigned its own unique identification number, which is also its IP address. This IP address is the location from which the Survey Egg data can be monitored.

A boundary survey for a person's property 402, for example, can be performed by a plurality of means, including starting from a known point in a city, such as City Hall, which is frequently marked by a survey monument. A survey monument is often a metal plaque affixed to the street or sidewalk. The survey team then moves from survey monument to survey monument, utilizing a combination of laser-based and GPS survey instruments (and possibly other traditional survey instrumentation). Then, depending upon the survey methodology employed, the survey team follows the legal description to locate the first point 403 on the subject property 402 boundary line. After establishing the first boundary point, each of the successive boundary points 404, 405, and 406 are established (again depending upon the survey methodology employed).

As each boundary point is established, the surveyor installs and initializes the Survey Egg, and assigns it a canonical sequence number. Initializing consists of turning the Survey Egg power on, whereupon the Survey Egg follows a pre-programmed sequence of instructions to start up the Survey Egg software, and then, in some embodiments, establish its position by interrogating various GPS satellites. The surveyor can then rely upon the GPS location established by the installed Survey Egg, or alternatively, the surveyor can establish the position of a given boundary point, without employing the Survey Egg GPS location information, and then program this surveyor-established location into the Survey Egg, via manual interaction with the Survey Egg control panel 204 or via other means such as the Survey Eggs website 160 or widget 190.

Once initialized Survey Eggs automatically calculate distance to all other Survey Eggs (which can be limited to just those Survey Eggs on the subject property, if desired). Vis a vis the successive sequence numbered Survey Eggs, the Survey Eggs calculate the distance of each of the boundary line distances, such as from 403 to 404, and then, optionally, compare this calculated figure to the parcel map distance or even the legal description distance (if available in machine-readable format).

Upon completion of the boundary point/line establishment and calculation process, the Survey Egg software 180 then is ready to file an electronic Record of Survey (ROS), with the appropriate government agency (or other interested/authorized party/entity). Some survey companies charge a thousand dollars or more just to file the ROS, costs which the use of Survey Eggs may reduce.

There may be cases where discrepancies arise between one survey and another, or between a given survey and, say, the town parcel map 401. If, for instance, a court or other authoritative body, rules that the boundary point locations need to be altered, this can be accomplished remotely via the Survey Eggs Website 160 or widget 190, without need to physically be at the site 402, or to physically move the installed Survey Eggs, since an offset can be programmed into the Survey Egg location data.

Figure 5:
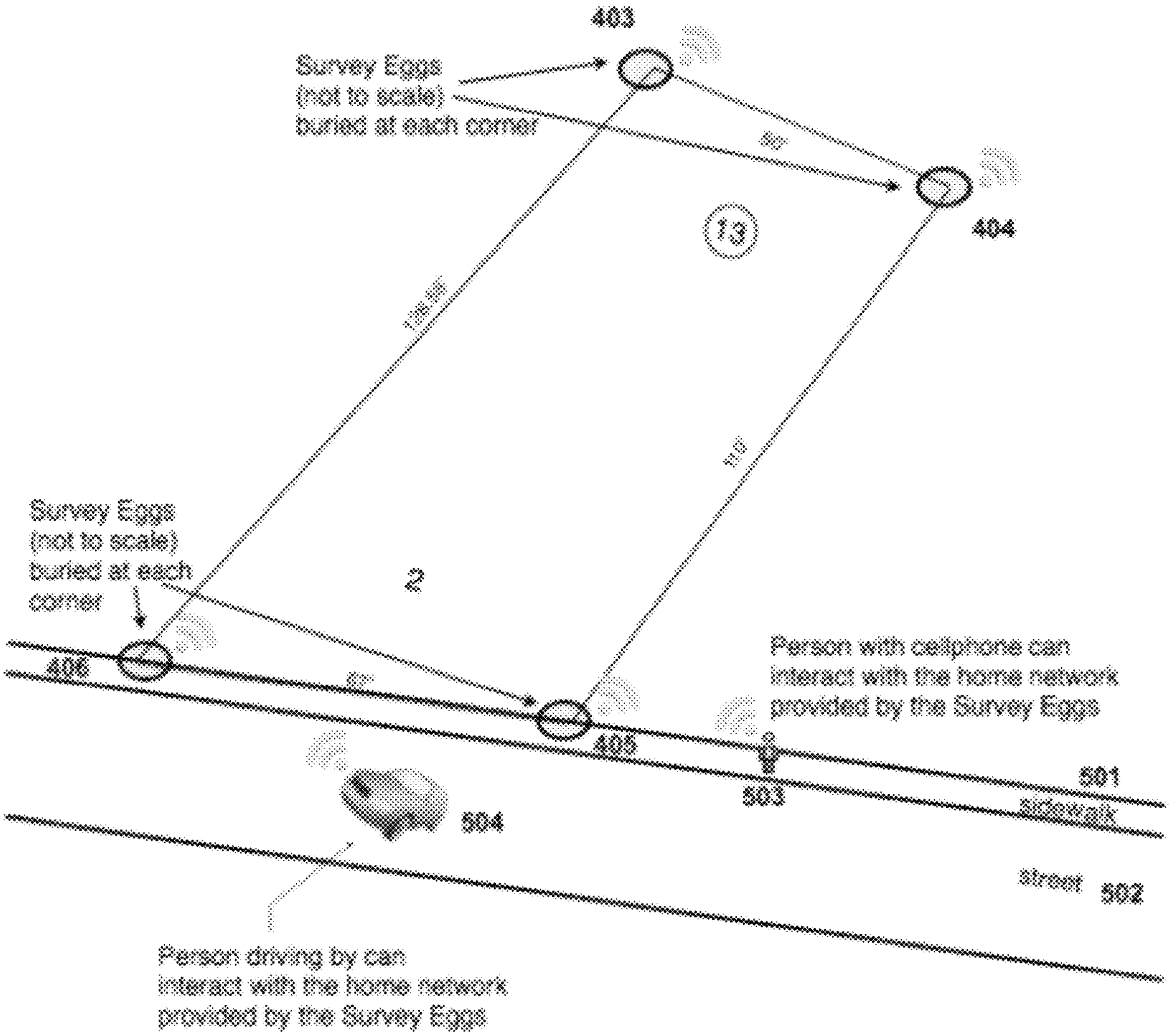
FIG. 5 is an exemplifying diagram illustrating an embodiment of a system, service and method for broadcasting and matching profiles in accordance with the Invention.

FIG. 5 Once installed, the Survey Eggs can perform a number of functions and services. The scope of these functions and services may be determined, limited or enhanced, by the type of Survey Egg connectivity the property owner opts for. The property owner may utilize communication modalities built in to Survey Eggs such as Bluetooth to generate a broadcast of profiles (or other information or digital content), hereafter "ComCloud." Alternatively, if the property owner has WiFi coverage that reaches the Survey Eggs, the Survey Eggs may also, or alternatively, utilize the Internet to broadcast their ComCloud (hereafter "CloudCast"). Also a user might choose to pay a monthly fee to utilize connectivity supplied by a third party, such as a wireless carrier. Users don't have to pay any entity for any type of connectivity for Survey Eggs to perform a boundary locating and marking function. Survey Eggs can be installed, say underground, then located manually, by a plurality of means, such as passing a mobile handset over the approximate location of the Survey Eggs, and listening for a staccato beep which increases in frequency as a user gets closer to being right over a buried Survey Egg; and becomes a static tone, when atop a Survey Egg.

The uses for a Survey Egg powered ComCloud are manifold (see Summary of Invention above, and Applications and Use Cases below, for exemplifying examples). For instance, a user might wish to socially network with others via their ComCloud broadcast (CloudCast) by posting various pictures, status updates, etc. for selected passersby to view. Users could expand the range of possible viewers by utilizing the Survey Egg's Internet connection to CloudCast their profiles to any interested party. Survey Egg users can choose, for instance, to have a limited-range Bluetooth CloudCast, to interact with people walking by 501. Passersby 503, can view the Survey Egg CloudCast to look for items of interest manually, or if the passerby has their own ComCloud, profile matches can be performed automatically. Let's say the property owner has an old inflatable kiddie pool in the garage they'd by happy to get rid of. But its too much hassle for a $5 item such as this, to post on a traditional Internet commerce site. The property owner could instead add the profile (a digital tile of information about that object, hereafter "Tilz") of the kiddie pool to their Survey Egg ComCloud, and CloudCast its availability to just those persons who live or pass nearby (via various means such as Bluetooth). If a neighbor has a need for a kiddie pool, this may be a great way to obtain one with minimum expenditure of time and money, and possibly create an opportunity to meet and interact with a neighbor. Social networking, interacting and transacting, literally from an ILSD (in-situ location sensing device), is unique to the present Invention.

Survey Egg CloudCasts can also interact with drivers 504 driving by 502 the subject property to accomplish things that would otherwise take the property owner some amount of time expenditure. For instance, if the property owner wanted a paver stone driveway to replace their existing asphalt driveway, they could create an RFP (request for proposals) Tilz, seeking bids by paver stone contractors. Such an RFP Tilz could be viewed (if the property owner wished) only by licensed contractors, and further by contractors who have installed paver stone driveways before, or meet certain customer rating levels. That is to say, Survey Eggs give time back to their owners, who might otherwise have to spend hours searching for paver stone driveway contractors. Instead, when a Survey Egg owner wants or needs something, they simply place a Tilz related to same, in their ComCloud, and the information sought, comes to them, automatically.

Figure 6:
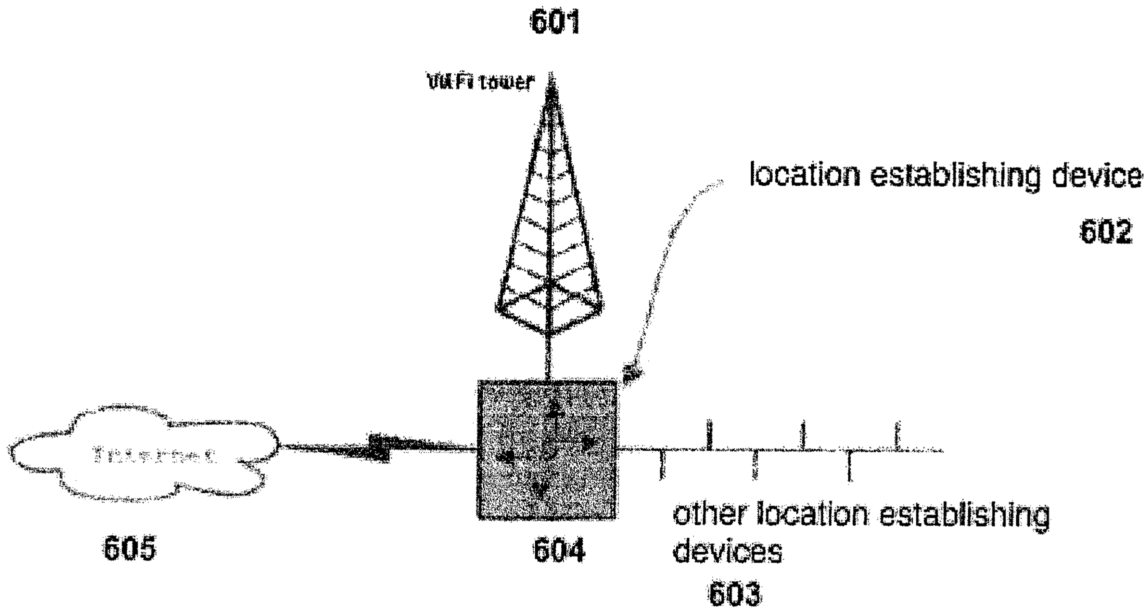
FIG. 6 is a diagram of an exemplifying architecture of an embodiment of a wireless location establishing device establishing its location via a plurality of means including, Internet-based data, nearby location-established structures such as WiFi towers, or even other location-establishing devices—including such devices as various Invention device embodiments referred to as Survey Eggs or Survey Nuts.

FIG. 6 Survey Eggs 602 can establish their location by a plurality of means. For instance, Survey Eggs can triangulate 604 (or otherwise establish) their location via other location-established devices such as WiFi towers 601 or cellular carrier cell site towers (especially those whose location coordinates may have been surveyor-established). Additionally, Survey Eggs can establish their location via triangulation (or other means) of other location-establishing devices 603, such as other Survey Eggs. Survey Eggs can also establish their location via (realtime or otherwise) location datasets available via the Internet (or other means).

Figure 7:
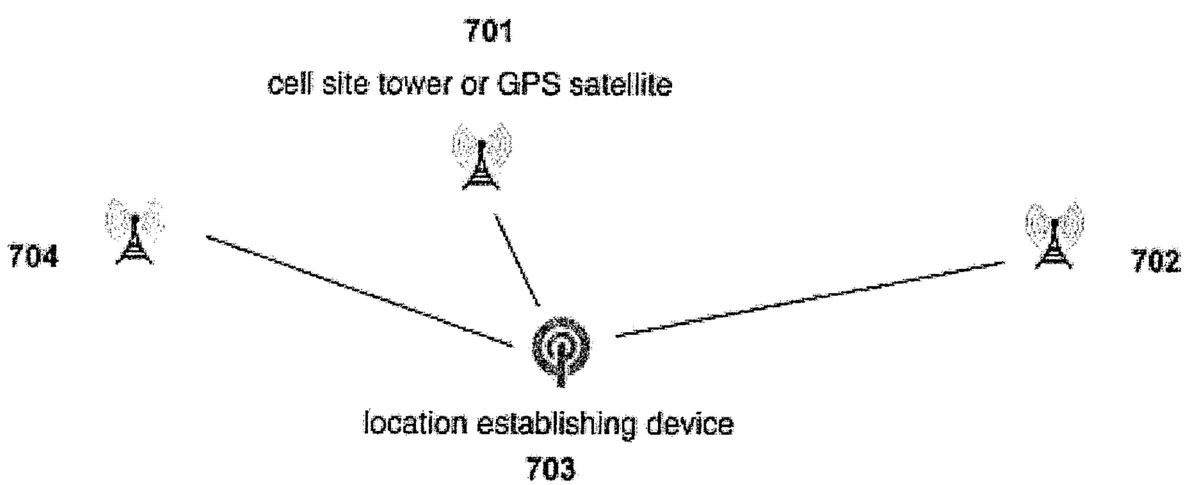
FIG. 7 is a diagram of an exemplifying architecture of an embodiment of a wireless location-establishing device establishing its location via triangulation.

FIG. 7 Survey Eggs 703 can also establish their location via triangulation of cell site towers or interrogation of GPS satellites 701. However, since GPS location accuracy is purposely limited by various government agencies, Survey Eggs can establish their location with even more precision than traditional GPS, by means of dynamic GPS (hereafter dGPS).

The U.S. government, has for military security reasons, limited GPS accuracy to about 20 meters (a recent improvement (authorized in the year 2000) from the prior accuracy of about 100 meters). 20 meter accuracy is nowhere near sufficient for property surveys which may require accuracy on the order of centimeters. Survey Eggs establish their location by a plurality of means, including triangulating their location against other Survey Eggs and surveyor-located fixed objects. This calculation is performed onboard the Survey Egg, but also may be performed utilizing the Survey Egg software 165 on the user's PC, via the widget 190 on the user's digital device, or via the Survey Egg Website 159 and 160. The Survey Egg Website archives this more-accurate-than-GPS-alone data, and can provide this information to other devices. This calculation can be performed at user-set intervals, so that Survey Eggs can (always) have the best location information available. The GPS location of all Survey Eggs and GPS-located objects gets more and more accurate, as GPS-located objects update, in realtime, their 20-meter accurate location, vis a vis more accurate surveyor-established location information. And location accuracy increases as the number of Survey Eggs installed increases (since Survey Eggs can share positional location information with other Survey Eggs). Location information is dynamically updated, hence dGPS.

Other factors also inform the need for a more accurate GPS location system. The universe is dynamic and changing in size and shape. Our solar system is moving through space, as well as changing size. The sun is moving at better than 200 kilometers per second. The earth wobbles on its axis. These facts are materially important, as GPS satellites establish their position in space by means of earth and sun sensors (which have their own host of limitations). Continental drift is inexorable. Additionally, the earth's crust is in constant motion. In earthquake prone areas, portions of land shift with respect to other portions of land. Thus distances should be recalculated. The earth's crust is dynamic, so any location-establishing system that is not dynamic is inherently inaccurate.

Accordingly, an improved GPS system is desired to address these inherent location-determining deficiencies. A network of location-sensing devices, that also locate themselves via geometric triangulation from surveyor location-established fixed objects (e.g. cell site towers), and from each other, produces a more accurate system, with what may be an order of magnitude (or more) better accuracy than the currently allowed GPS accuracy.

Unlike some GPS devices, Survey Eggs can also report their position back to GPS satellites 701 (which are generally not equipped to process such information). A dynamic-GPS "dPGS" system, such as the Survey Eggs network, is more accurate and grows more accurate as each Survey Egg is added. Survey Eggs can report their position information to each other, and continuously update and improve their position accuracy. And, Survey Eggs can dynamically update all subscribed dependencies: other Survey Eggs 703, online maps, assessor subdivision maps 401, GPS systems 701, et. al., as well as other devices 603, and/or other embodiments of Survey Eggs 603.

Figure 8:
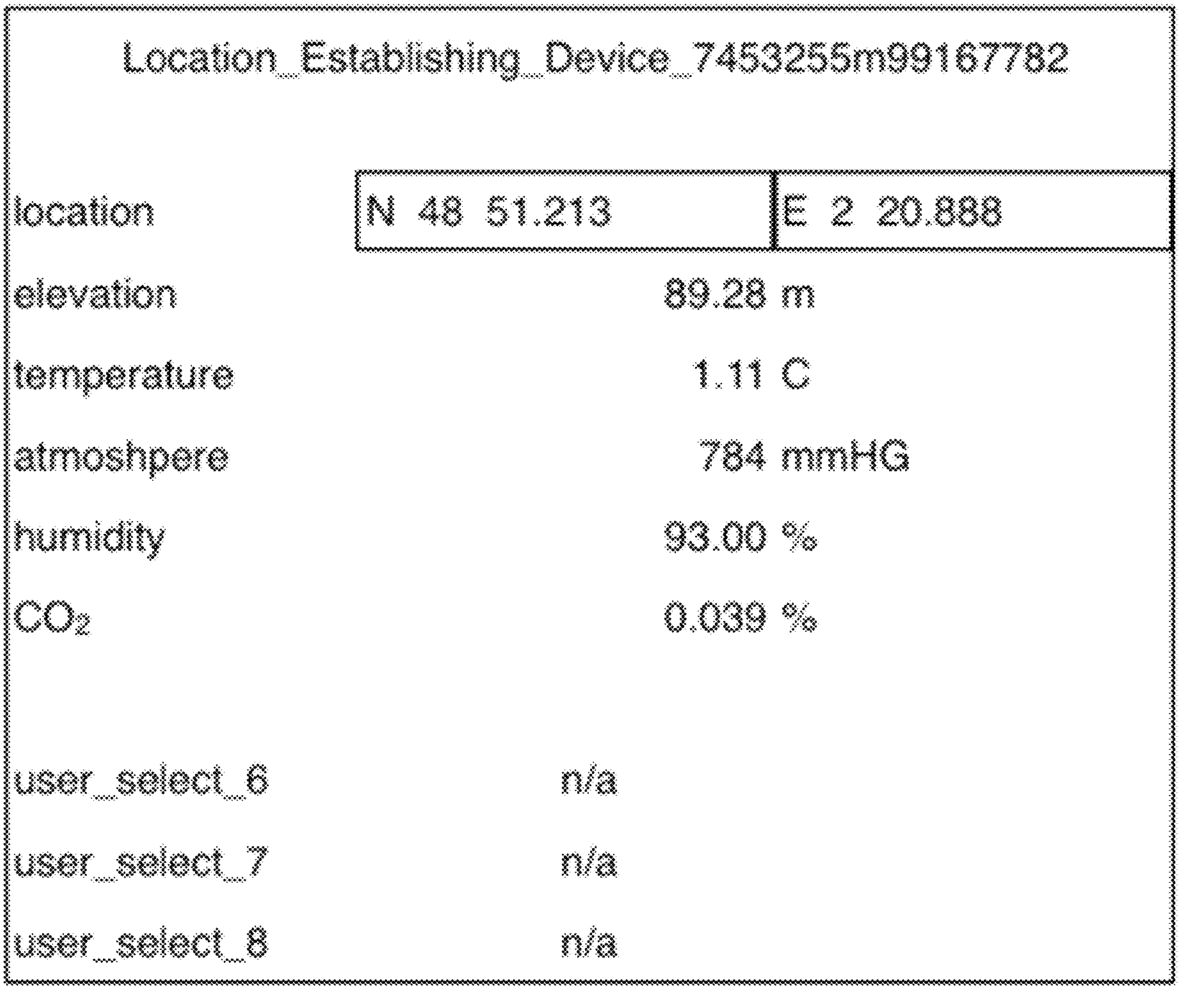
FIG. 8 is a screenshot illustrating an embodiment of an example data display modality, that the Invention owner can customize via their computing device or mobile handset, and which is based upon various optional Invention attachments.

FIG. 8 Information gathered by the Survey Egg is viewable in a number of locations. Users can view the data display on the Survey Egg itself 202. Additionally, the data can be viewed remotely via the Survey Egg Website 160 or widget 190. Users might wish to attach various items to their Survey Egg(s), such as an anemometer or temperature or rainfall gauge. Other attachment examples are discussed below in more detail. Attaching various sensors to a plurality of Survey Eggs may result in a swarm of intelligent connected devices able to broadcast and share datasets, for purposes such as environmental analytics.

Figure 9:
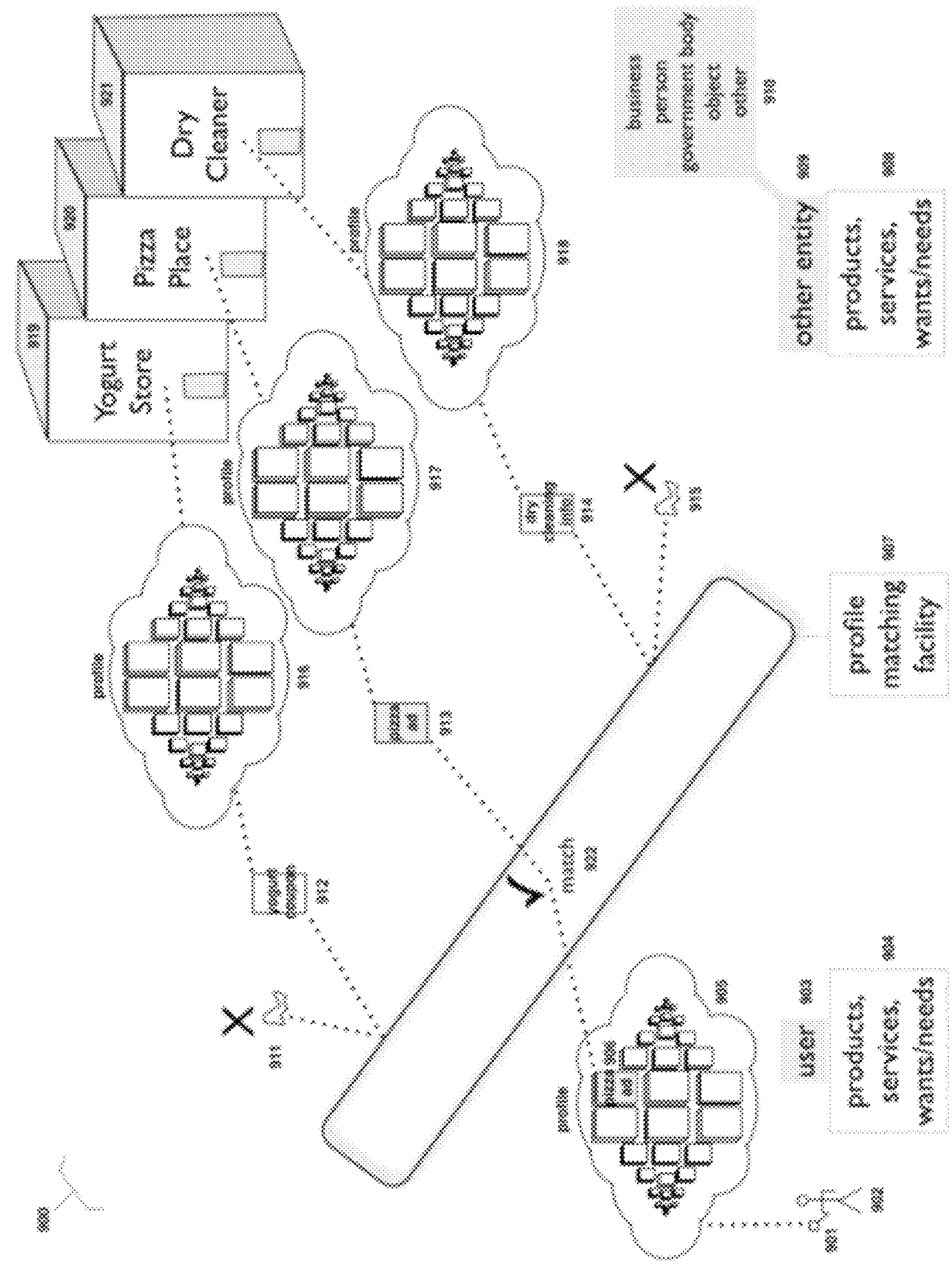
FIG. 9 is a diagram of an exemplifying architecture of an embodiment wherein the Invention is employed by a commercial enterprise to facilitate a profile broadcast, and thereby interact and transact with users.

FIG. 9 shows an architecture of an embodiment of wherein Survey Eggs, in accordance with the Invention, have been installed at a commercial location, and which are transmitting the profile of said business; and which architecture is designated generally as system 900.

Yogurt Store 919, Pizza Place 920 and Dry Cleaner 921 have each installed one or more Survey Eggs (or other Invention embodiments). Survey Eggs broadcast the aforementioned businesses' profiles 916, 917, 918, via a plurality of means including WiFi, cellular carrier network, Bluetooth, and other communication modalities. These profiles might include (but not be limited to) items such as ads 913, offers, coupons 912, and other information 914 related to that business. Businesses could, for example, broadcast their actual realtime inventory levels 908 of each item they carry.

Rather than bombard each user 903 or entity 909 within reach of that business' broadcast, the businesses employ the Invention's profile matching facility 907, wherein the businesses profiles are matched against the profiles 905 of the user 902 or entities receiving the profile broadcast.

As per the present exemplifying architecture (FIG. 9), the user 902 happens to be broadcasting the user's profiles via Bluetooth via the user's mobile handset 901. According to the user's profile 905 the user is unwilling to receive yogurt coupons 912 or dry cleaning information 914; whereupon like items are rejected by the Invention's profile matching facility—the yogurt coupon is rejected 911, and thereby does not attempt to gain the user's attention or clutter up the user's profile; and similarly the dry cleaning information is rejected 915.

On the other hand, the user's profile 905 is amenable to pizza ads 913, and thus a match 922 is accorded by the Invention's profile matching facility 907. Thus that pizza ad 906 is transmitted to the user's profile 905. Depending upon the user's preference profile, the user might view the ad right away, or, for example, that pizza ad 906 might be inserted into a commercial break when the user 902 is watching television later that night.

Furthermore, the pizza ad can be presented in a plurality of digital formats, including Tilz (which are a transactable objects), and thus, for example, upon viewing the ad, the user 902 could choose to order a pizza, and pay for same via the user's digital device 901 (via said Tilz).

Other embodiments are envisioned, wherein entities other than businesses such as other people, government entities, objects, machines, and other entities, might utilize a version of system 900 (or other embodiments of the Invention) in order to interact and transact with various entities.

In many cases, however, some/all entities involved broadcast the profiles of their wants and needs 904, 908, including, for instance, the various products/services the entities utilize/offer, and the Invention thereby facilitates interaction and transactions by matching said profiles.

These and other objects and features of the present Invention may become more fully apparent from the following description and appended claims, or may be learned by the description and practice of the Invention as set forth hereinafter.

Gotz Dotz

Gotz Dotz are an embodiment of Survey Eggs. Gotz Dotz also comprise a wireless service network (method) to store and transmit geo-based data. In embodiments, Gotz Dotz serve as replacement for Botts' dots on highways to divide lanes of traffic. Compact, secure, waterproof, reflective, location aware, intelligent path marking units, Gotz Dotz are rounded raised plastic, ceramic or polyester (or other materials) domes (or other shapes) that serve as road lane (pavement) markers. Gotz Dotz are primarily utilized in commercial, municipal, and federal applications. Gotz Dotz can also help establish locations of roads in countries where reliable digital maps don't exist. Once in place, Gotz Dotz can automatically create digital maps for the area traversed by that road, path, sidewalk or trail marked by Gotz Dotz.

Gotz Dotz can establish location information via GPS and other means such as triangulation. In embodiments, Gotz Dotz can monitor traffic flow/speed, and can provide warnings such as vehicles veering out of lanes (e.g. when users may be falling asleep at the wheel). Gotz Dotz can interact with a car's navigation system or other onboard digital devices, such as a user's mobile handset. Gotz Dotz can act as Web Drop data points: users traveling along a road for instance, can get and leave location-based information. Users frustrated by the daily heavy traffic at a particular intersection can leave a complaint for city officials, actually at that location via the Gotz Dotz. Users can simply speak their message to their mobile handset, which creates a query data tile (Tilz), which is sent to the Gotz Dotz at that location. Gotz Dotz store information about items related to that location/area including, for example: "Stoplights are currently not timed and should be corrected by the City by the end of March." Government road maintenance organizations can leave information there, actually in those Gotz Dotz, that can be accessed via Bluetooth, WiFi, cellular radio, or other means. Furthermore, other motorists can leave comments and complaints as well as answer each other's questions, directly via the Gotz Dotz.

Gotz Dotz are the Survey Eggs embodiments for highways and can perform the same/similar functions as per the descriptions below. In embodiments radio frequency identification RFID is built-into Gotz Dotz. Gotz Dotz are powered by a plurality of means such as: low cost solar cells, heat of the pavement, impact energy of vehicles driving over them, radio waves, et. al. Each Gotz Dotz has its own identification ID number, which is also its IP address, and which is captured in an IP barcode. Gotz Dotz data handoff: transceive to/from available wired/wireless networks, sync to/from passing cars (Bluetooth, WiFi, RFID), communicate with emergency roadside phones (as a means of transmitting information back to central servers, or outside applications or other networks), et. al. Regarding syncing to passing cars, users can hand off profiles and Tilz as they pass by. Gotz Dotz then seek out profile matches and can return results further up the road. Users could sell their sofa, for instance, by driving down the road, and having Gotz Dotz match up that Sofa Sell profile with another user who has a Sofa Sought profile. Gotz Dotz are transactable nodes. Users don't have to make the dangerous walk down the highway to get to the nearest emergency roadside phone, as Gotz Dotz can act as mini relay stations enabling such (VOIP) phone calls to be made.

Survey Nuts

Survey Nuts are an embodiment of Survey Eggs. Survey Nuts are roughly the size of peanuts, although other sizes are also contemplated. They contain a smaller version of Survey Egg electronics with differing functionality and features. Survey Nuts automatically locate themselves and broadcast their position. They do not use satellite GPS to locate themselves, instead triangulating from three or more of the boundary Survey Eggs (or other objects which have location-established themselves) to establish their position. Survey Nuts location data can be sent via low power repeater to the designated central base-station Survey Egg.

Survey Nuts usually have to be within a 10 to 100 meter distance (Bluetooth range) of at least three Survey Eggs to triangulate the location of that Survey Nut. Survey Nuts optionally equipped with sonic pinging or radio telemetry can triangulate to Survey Eggs from distances greater than 100 meters. Alternatively, a Survey Nut can triangulate its location from three or more Survey Nuts which have already established their location via one of the means discussed above.

Survey Nuts are in-situ location establishing devices (or FLSDs). Survey Nuts consist of a Website, mapping and blueprint software (application programming interfaces APIs), server software, and a widget (Webified mini software application). The widget enables users to engage and manage a number of location-based services, that Survey Nuts engender. There are also online/offline tools for CloudCasting profiles, comments, blogging, message boards, media sharing, social mapping and tagging/geo-tagging. Each remotely programmable Survey/Nut contains a microprocessor, flash storage, and an operating system. Survey Nuts determine relative location.

Absolute Vs Relative Location

Survey Eggs are absolute. A single Survey Egg can establish its position without need for any other Survey Eggs or Survey Nuts.

Survey Nuts are relative. Survey Nuts establish their position relative to other Survey Nuts and/or other Survey Eggs and/or other objects which have had their locations established.

In embodiments, Survey Nuts are intended to be placed (during construction) in every corner and key point of structures such as buildings, bridges, dams, and facilities (such as airports, schools, etc.). Once in place, Survey Nuts can provide a three dimensional electronic blueprint 195 for the subject structure, via the Survey Egg client/server software or by uploading the resultant location data to third party architecture/drawing software programs.

Survey Nuts can be installed by anyone (homeowners, contractors building a house/sidewalk/pool, etc.)—i.e. they do not require a licensed surveyor, though their installation may be certified by a licensed architect and/or contractor (or other person/entity) for an additional imprimatur of credibility and accuracy.

Field Locatable

Survey Eggs are field locatable, via wireless mobile device, including non-GPS devices, using protocols such as Bluetooth, RFID, and WiFi. Users are not required to have Internet service. If users desire realtime monitoring, they can utilize connectivity from by wireless carriers, or WiFi at the home/office/property, or (tethering) via Bluetooth from mobile devices, or other means. Both Survey Eggs and Survey Nuts can be field-located by using a GPS-equipped mobile handset (or other devices). They can also be located by a non-GPS, Bluetooth-equipped wireless mobile handset which can transceive signals with the Survey Egg/Nut (without need for Internet access). The mobile handset user may hear a series of staccato beeps, which becomes a solid tone when the mobile handset is immediately above/below the Survey Egg/Nut. Thus surveyors and contractors and property owners, as they walk near the Survey Eggs (which may be buried in the ground), can locate the boundary points to the subject building, plot of land, road, bridge, mountaintop, etc. Other network protocols such as RFID and WiFi may also be used to field-locate Survey Eggs.

Internet Service

Survey Egg users are not required to have any ongoing Internet service contract. However if they desire real-time monitoring, Survey Eggs can utilize Internet connectivity from such sources as: Cellphone service providers or wireless carriers, WiFi at the home/office/property, and/or Free local/municipal WiFi service.

Providing the network for Survey Egg CloudCasts may result in the carrier receiving a cut of all the software, services, and transactions revenue therefrom. As customers drop their landlines in favor of wireless, Survey Eggs (in embodiments) become the Web Drops that connect to existing landlines, and become the wireless nodes to interface with the landline and/or broadband providers' ubiquitous WiFi service. Then those entities may participate in the software, services and transaction income on that network.

Networking Protocols

Survey Eggs feature networking capabilities: WLAN (wireless local area network such as WiFi), and/or WMAN (wireless MAN such as the recently published IEEE 802.16 spec) and/or WWAN (wireless wide area network such as GPRS). Survey Eggs/Nuts are Bluetooth and RFID compatible. Optional weatherproof external connectors include: a standard Ethernet adapter and a HomePlug 1.0 spec adapter (utilizing a power line to supply both power and Internet connectivity).

Solar Power

Survey Eggs contain a lithium-ion (or other type of) battery, which can be solar sustained 302.

Survey Egg options include:

Solar cell panel on the skyfacing surface of the Survey Egg for those Survey Eggs to be located above ground.

Remote solar panel (of various sizes, including 5"×5") that attaches to the Survey Egg via weatherproof external connector, for those Survey Eggs located underground, or those above ground but in a shady spot. The solar panel option currently includes various wire choices up to 30 meters in length.

Solar Powered Extranet

For those users who choose to set up and broadcast their own extranet (sans any external Internet service), a separate solar powered battery option is available FIG. 3. This larger capacity, higher voltage battery almost fills the volume of an entire Survey Egg (in some embodiments) and is powered by one or more of the same optional solar cell grids as regular Survey Eggs.

The solar Survey Egg always draws its power from the solar cell and its separate rechargeable lithium-ion battery, until the voltage drops below an acceptable level, at which point the Survey Egg automatically switches to the primary lithium-ion battery. The Survey Egg runs on the primary battery until the solar powered battery is once again capable of delivering a minimum pre-set voltage, at which point the automatic switch re-engages the solar battery.

High Power Survey Eggs Vs Low Power Survey Eggs

High power Survey Eggs use GPS technology to directly triangulate from GPS satellites.

Low power Survey Eggs triangulate from local sources with known locations such as WiFi hotspots and cell phone towers.

Geo-Tag Databases

Most new WiFi hotspots and cell phone towers are now geo-tagged as to their coordinates or GPS location. Online databases of these locations are utilized by Survey Eggs for triangulation calculations (FIG. 6).

Data Broadcast

Survey Eggs produce a user-selectable set of broadcast data such as the Survey Egg ID number its coordinates/location, and the remaining battery charge. Other (related) information may also be uploaded and broadcast such as easements that are near this Survey Egg, building restrictions (such as sight line preservation), parcel or tax ID numbers, property owner contact info, installation survey company contact info, etc. (as well as other data types).

Femtocell

One or more Survey Eggs on a property can be programmed to work in conjunction with, or even contain, a pico- or femto-cell digital signal processor. (A femtocell is a miniature cellular base station often about the size of a home wireless router, and with a similar range) Though femtocells are being used to dramatically improve cellphone service (faster downloads, clearer calls and less drain on the battery) Survey Eggs can also take advantage of a femtocell a user has installed in their home/office/building/structure to provide continuous connection to the Internet and improve battery life. An option is available to locate a femtocell inside a Survey Egg. The resultant “Femto Egg” is generally placed inside the structure (rather than outside in the ground) and plugged via Ethernet cable directly into the user’s broadband connection.

Radiation Shielding

All Survey Eggs and Nuts feature substantial radiation shielding. The sun routinely experiences cycles of sunspot activity. Solar Cycle 23, is experiencing peak activity that is expected to decay gradually over the next few years, before building again for the next solar cycle. There is concern that some of the most powerful solar storms in decades could arrive during the next solar cycle. A sunspot is an area of intense magnetic activity on the surface of the sun. During a solar storm, highly charged particles ejected from the sun may head toward Earth, where they can bring down power grids and disrupt communications.

Sensor Options

Survey Eggs optionally contain user-selectable sensors of various types to monitor such items as: humidity, temperature, radiation, and gases such as carbon dioxide, etc. (FIG. 8).

Alternate-Use Optional Attachments

Survey Eggs can also be connected to other optional attachments:

Anti-gopher/mole underground signal generators (which produce an unpleasant noise/vibration which may drive away some unwanted rodents).

Invisible pet fences (attach a Survey Nut to a pet’s collar to limit or track the pet’s whereabouts (display the location data on the user’s mobile handset). Alternatively, Survey Eggs can provide the wireless signal to a collar worn around the pet’s neck, which delivers a small shock if the pet tries to cross the property boundary line).

Egg Customization

Survey Eggs/Nuts can be customized and personalized by users via the use of skins. Skins are stickers/decals that can be applied to the Survey Egg/Nut that offer the user a plurality of colors, patterns, photos, logos, etc.

Corporations might pay users to display the company’s logo—sponsored Eggs. Such fees might be utilized to reduce an Survey Egg/Nut monthly fees, if any.

Dimensional diagrams for skins are supplied on the Survey Eggs website, so that all users have to do is upload a graphical image to the website for cropping as per the dimensions of the Survey Eggs/Nuts diagrams. Users can also download the dimensional diagrams to a digital device and software of their choice to further customize their skins.

Users then print out the stickers/decals at their own printers or professional print shops.

ComCloud Customization

Users can also customize the ComCloud message broadcast by each Survey Egg.

Each Survey Egg has on-board storage for users to download text, images, audio or video files, or other items to. When passersby walk near the user’s Survey Eggs with a mobile handset configured to receive such data, the passersby may receive the user’s ComCloud broadcast while in range (503). The Survey Egg may also deliver a digital file to passersby’s mobile handsets, if both the user and the passersby have selected those profile settings.

Examples of such extranet customization include the ability to offer “ringtones” for a property (a song clip played for passersby on their mobile handset), or the user’s kids singing, photos of a property owner/family, and social networking-type profiles of the property owner Akin to a social network profile for a user’s house, but in the real, offline, world. Users can limit which entities, others, devices and/or profiles are allowed to view various content.

And all types of ComCloud broadcasts can be accomplished with or without means such as the Internet or wireless carrier service, since ComCloud broadcasts may be effected via modalities such as Bluetooth.

Dashboard Control Panel

Users interact with their Survey Eggs/Nuts via a control panel, where the user can perform managerial functions such as:

Naming and/or numbering each Survey Egg/Nut.

Numerically ordering each Survey Egg/Nut.

Via a graphical connect-the-dots type tool, users can delineate which Eggs/Nuts should calculate distances from which other Eggs/Nuts. The result of this is an online map representing the user’s Eggs/Nuts in a two or three dimensional map. This map can be mashed with various online maps.

Security

Among other security features, Survey Eggs are programmed to stop working if moved more than a pre-selected distance from their SET position, unless provided an override RESET code by a licensed survey engineer. The security shutdown distance can currently be set by users to be any distance from three centimeters to three meters. The SET FAULT signal is immediately broadcast to the Survey Eggs' owner if such a violation occurs.

Applications and Use Cases

To further clarify the above and other advantages and features of the present Invention, more particular descriptions of the Invention will be rendered by reference to specific embodiments thereof which are, in some cases, illustrated in the appended drawings. It is appreciated that these drawings and descriptions depict only typical embodiments of the Invention and are therefore not to be considered limiting of its scope. The Invention will be described and explained with additional specificity and detail via the following applications and use cases.

Automatic Legal Descriptions of Properties

Survey Eggs in the corners or boundary points of a user's property not only inform the subdivision map but may also create an accurate legal description suitable for submission to, for instance, the County Assessor's Office. Each Survey Egg calculates the distance between itself, and all the other Survey Eggs on the property. It performs this task generally once per day (or any other user selectable interval, such as every second or once per year). Each of the Survey Egg coordinates is wirelessly transmitted via the Internet to the designated Website (or other location/device). Using the Survey Egg control panel the surveyor clicks on the Survey Eggs on the digital map in a sequential manner, assigning each Survey Egg an ordered number for that property (403, 404, 405, 406). The Survey Egg software then calculates each of the distances between the now sequentially numbered boundary points, and automatically produces a Metes and Bounds (or other type of) legal description of the property. For example, starting at the Northeast corner of the subject property (at Survey Egg #1), proceed 47.39 meters south (to Survey Egg #2), then turn West and head 124.69 meters . . . etc.

Cross corner distances are also calculated to ensure that in the case, say, of rectangular property plots, that all proposed boundary line angles are at 90 degrees.

Electronic ROS Filing

Survey Eggs can automatically, wirelessly file the Record of Survey (ROS) with the appropriate (governing) entities. An ROS can be filed electronically at County Assessor's Offices by means such as simply by sending a link to the online map displaying the surveyor-installed Survey Eggs. Assessor's Offices can, among other options, download the data set for the plot in question into their own electronic map software. This can reduce the substantial expense (in addition to the cost of the boundary survey) to property owners that surveyors charge for the filing of the ROS.

Detailed Landscape Surveys

Survey Eggs/Nuts/ and/or Gotz Dotz can be used to locate the edges of every road, sidewalk, and trail on the planet, as well as trees, shrubs, lawns, pools, ponds, et. al.

Fence Locating

Fence builders can simply pass their RFID, GPS or Bluetooth equipped mobile handset over the suspected plot corners, to easily, quickly, inexpensively and accurately locate boundary lines, along which to build the fence.

Government Territory Boundary Markers

Survey Eggs could be used to delineate, mark, and/or CloudCast the boundaries for government owned land: the boundary for every city (in the world), the boundary for every county (in the world), the boundary for every state (in the world), the boundary for every country (in the world), and the boundary for every National Park, State Park, City Park, National Forest, Bureau of Land Management land, etc. (in the world).

Survey Eggs can be located at every boundary direction inflection point, as well, for instance, as one Survey Egg every kilometer.

Parkland Marking

National, State, County and City Parks can mark their hiking and backpacking trails. Forest Service dirt roads can also be marked. Complex rock climbing areas can be marked: Buttermilk Boulders in Bishop, Calif. has over 11,000 boulder problems (climbs) in a few square miles area. Survey Eggs could precisely mark each problem and enable climbers to quickly navigate to desired boulders, and routes thereon.

Map Companies

Online map companies plus government map producers such as the U.S. Geological Survey all can subscribe to or offer to their customers select ComCloud data provided by the Survey Eggs in the field. This enables, for example, the satellite view from Google Maps to zoom in and show subdivision plot maps, and even display individual plot boundary demarcations.

Development Story Poles

Temporary Survey Eggs/EggPosts can be placed as "story poles" to show where new buildings, roads, sidewalks, etc. will be located, allowing easy and accurate locators which developers can use to lay out the proposed development. Additionally such electronic story poles can be utilized by neighbors to the development who may want to present challenges to the development. The resultant data (CloudCast) from the story poles allows the relevant development information to be shared electronically with all interested parties—such as the lawyers and/or surveyors of neighbors—without the considerable expense of such parties having to make their way to the property in person.

Reverse Local Advertising

Homeowners can broadcast reverse ads 504. For instance, if homeowners wanted to change their blacktop driveway to a paver stone driveway, they could put out a notice on their ComCloud that they are accepting bids for paver driveway installations. Contractors who are driving by could receive the reverse local ad on their mobile handset, stop, and get out of their truck to take the measurements needed to provide a bid—which can be submitted electronically via the homeowner's ComCloud.

Examples of reverse ads, or solicitations for bids, from a home/business ComCloud include:

Charge a contractor to respond to a Request for Proposal (RFP) for a paver stone driveway.

Charge a painter to send the following solicitation directly to a user's home: "I see your house needs painting, especially where it is peeling on the western facade." The painter can do this via the ComCloud without needing to know information such as the user's email address.

Charge a realtor to send the message: "I have a buyer interested in your house."

If a house needs a new roof, just as a person might change their social status to "single" after breaking up, the house status can be changed to "Needs new roof" to solicit bids for same. A Survey Egg ComCloud enables messaging similar to social status updates, but for a house/property/business.

These are but a few examples of a nearly limitless number of ways in which a Survey Eggs ComCloud can become a source of income for the user.

Property Inventory Merchandising

Users, via Survey Eggs, can sell access to property profiles or property owner profiles (which may be CloudCast) to various parties. For example, property owners can post Tilz of items they own to the property's Survey Egg ComCloud. Thereby companies can pay the user (first to view and review the profiles/Tilz, and then) to make offers to upgrade or replace an item (when it's time) as per the user's ad and coupon profiles. Examples might include: clothes, placemats, sheets, lightbulbs, et. al. which need replacing from time to time. Commercial properties or businesses can offer their items for sale without need for a conventional art Website.

Location-Based Advertising

Business owners can use Survey Eggs (located at the boundary corners of their commercial establishment) to broadcast their commerce cloud (ComCloud) which can deliver, for instance, ads and coupons to passersby via mobile handset. A yogurt shop, for example, could send out coupons for their daily special flavor in, say, a 100 meter radius from their facility.

Real-Time Weather Data

Some people have installed temperature, humidity, air pressure, and rainfall gauges that electronically transmit this information for their property, to a display unit in their home. With Survey Eggs this same information can be communicated (for free or for a fee) to weather bureaus, local new stations, and online map companies (and other entities) for compilation, analysis, and display in real-time (such as hyperlocal temperature maps for viniculturists).

Geologic Data

Survey Egg location data can be (provided for free or for a fee and) used by geology firms and university departments for research. Each Survey Egg calculates the distance between itself, and all the other Survey Eggs on the property. It performs this task generally once per day (or any other user selectable interval, such as every second). Cross corner distances are also calculated to ensure that in the case of rectangular (or other shaped) property plots, that intended angles are at 90 degrees. This data may change if the ground shifted.

Survey Egg software continuously records and logs all this data, which can be used to measure and monitor tectonic shifts in earthquake prone areas. And Survey Eggs equipped with various optional sensors can provide real-time, continuous temperature, soil, sound, etc. readings.

Environmental Sensor Networks (ESN)

Survey Eggs can form the backbone of (environment) sensor networks or sensor webs that monitor, map and assist in the management of environmental resources. Sensors can be embedded within or attached to the Survey Eggs that monitor the air, water and soil for chemicals and pollutants, and detect changes in temperature and pressure. Because Survey Eggs may already be in situ for survey related needs, they may save the cost of purpose-built environmental sensor networks. Survey Eggs can provide real-time data on a variety of phenomena that affect the environment and society, such as climate change, hurricanes, air and water pollution, and facilitate the advancement of geology, soil and land management, and agriculture. Survey Eggs can be used to track receding coastlines and to track icebergs in the Northwest Passage or elsewhere. Survey Eggs that mark the location of the pilings for piers and docks can also monitor items such as heavy-metal levels and mercury contamination in coastal areas. And Survey Eggs can aggregate and disseminate local data gathered by both mobile device users, as well as (other) sensor networks Once Survey Eggs have created (or joined) a (worldwide wireless) sensor network, or communicate via ComCloud, this data can be automatically integrated with other data sources (such as public health records or historical climate data). Survey Eggs, in conjunction with online mapping services, then can turn the aggregated data into real-time advanced, informative graphical displays with analysis capabilities.

The environmental sensor network data can be used to help researchers understand how environments and people are linked, in order to monitor and protect natural resources, predict and adapt to environmental changes, and provide for sustainable development, as well as reduce the costs and impacts of natural disasters and provide an effective and intelligent response to such disasters.

Note Drop

For properties or locations that have Survey Eggs, a user can, for example, leave a digital "note" (a Tilz), in the Survey Egg ComCloud for that property, revealing the location of a little used side door to gain access to the Notre Dame cathedral in Paris for one of the user's friends—a note accessible only by those users or entities, the user stipulates.

Ad Hoc Transport

A user, for example, who needs to move just four furniture items to their friend's garage or a storage facility, might find it too much hassle to try to get bids for this tiny job. But if the user places a Tilz in their Survey Eggs ComCloud describing their needs, a truck 504 that happens to be driving past the homeowner's property with just enough room (or is dead heading) can, if the truck driver's profile is on the lookout for such jobs, choose to pick up this ad hoc business, enabled by the home's Survey Eggs CloudCast.

Widget Store

Survey Eggs can CloudCast to users appropriate widgets (software applications), in-situ, in-context, in the real world. Widgets that may be useful to a user who is, for example, standing in a particular location, are presented to the user (if the user's profile allows, and possibly only after the user gets paid). For instance, a user may be presented with a coupon widget when entering a store; or a digital travel guide when entering a small village in Europe. Survey Eggs may generate income for their owners, for instance, if the Survey Egg CloudCast charged a commission for widget sales.

Digital Content Store

Survey Eggs can CloudCast to users digital content of any kind, for any purpose, in-situ, and in-context, in the real world. A wide variety of digital content, such as videos: videos shot at or near that Survey Egg or a video guide to a travel monument (that has at least one Survey Egg). Music: such as songs inspired by this location or local historic music from that village. News stories: say from the local newspaper—sifted and presented as per the user's preference profile, giving the user the sports, or political, or historical information related to this site, that they desire. Or digital "notes" left for a user's friends at a particular location, stating for example: "We had to bail, the line was too long, meet us at Julie's flat." In fact, any digital content.

"Electronic" Signs

Physical signs, with Survey Eggs beneath or attached to them, can CloudCast the latest, and most accurate, information. For example, the wooden sign at the Testarossa Winery reads: "Tasting Daily 11 AM-5 PM." Yet users who venture there on the afternoon of December 24th, might be disappointed to find the tasting room closed. Before climbing the long winding driveway, users could have been informed at the bottom of the hill via Survey Eggs CloudCast, that Christmas Eve, is an exception to the stated hours of operation.

Trail Waypoints

For example, trail owners can utilize Survey Eggs/Nuts to locate trail junctions and waypoints along trails. Users, for instance, can utilize a GPS device to determine the trail junction location, and load it, via Bluetooth, into the Survey Egg/Nut buried there or attached to the trail sign (and the more users who download such data to the Survey Eggs/Nuts, the more accurate the data becomes, as, for instance, the mean of the those coordinates can be calculated). Then users who then hike or ski within Bluetooth range of the Survey Egg/Nut, get a hit noise on their mobile device (which may or may not be GPS-equipped).

Users can also store and pass asynchronous messages to one another via the Survey Egg/Nut, via the onboard storage and/or CloudCast.

Users can also request that another user who passes by "pick up the mail" (messages left on the Survey Egg/Nut) via their mobile device, and "deliver" it when that user is next in WiFi, or other networking protocol range—whether for free, or for a fee.

Air Traffic Control

Installing a Survey Egg on an airplane enables it and air traffic controllers to geo-locate planes using GPS satellites. A method with potentially superior accuracy and functionality, as compared to conventional art (World War II era) ground-based radar systems used by air traffic controllers. Survey Eggs can be utilized by (ground or air) avionics for live data telemetry/telematics.

Delivery Box Locations

Survey Eggs can be attached to (or beneath) every United States Post Office mailbox, as well as United Parcel Service (UPS) and FedEx mailboxes, with the ComCloud CloudCasting up-to-date pickup times.

Device Tracking

Survey Nuts can be built into (or attached onto) almost any object, and that object's location may be made trackable. Parents could clip a Survey Nut onto their child's backpack to help determine where their child is. Not a perfect solution, as Survey Nuts opportunistically utilize proximate geo-located WiFi nodes, nearby GPS mobile devices, and other means, but it is free (no monthly service fee).

Third Party Services

Survey Eggs and the Survey Egg ComCloud include application programming interfaces (APIs), that enable third parties to offer various services via Survey Eggs. For example, attaching a Survey Egg to a wine tank at a winery enables various third party services. Connecting brix meters (which read sugar content) and temperature meters for wine tanks, to the Survey Egg on the wine tank, enable a vinicultural management company or contracted winemaker, to remotely monitor fermentation progress (and thereby inform punch down schedules, etc.)—one of the single most time consuming aspects of wine making. Survey Eggs can control valve attachments to automate and coordinate the timing for pumping of fermenting red wine juice back over the grape skins, as well as water flow regulation, to heat or cool the tanks.

Attaching a pressure regulator to the Survey Egg enables remote operation and control of hydraulic-powered fermentors and hydraulic-powered presses. Attaching a mass spectrometer or gas sensor to the Survey Egg enables remote and realtime monitoring of carbon dioxide levels, and thus automate venting. Attaching a spectrophotometer to the Survey Egg enables vintners to remotely and actively measure the presence of various compounds in a wine. And since, Survey Eggs have a ComCloud, data could be shared, selectively, among various winemakers, if they wish to compare their analytics to industry-wide norms. A single spectrophotometer attached to a Survey Egg, is, via CloudCast, shareable among all tanks in the entire winery.

Motion Control

In one or more embodiments, particularly Survey Nuts, wherein an object's position in three dimensional space, within, say, a room or building, can be established, that object can be interacted with, transacted with, or otherwise controlled or engaged via methods such as waving one's hands in the air.

Survey Nuts enable novel types of intra-spatial movement control, as well as novel types of communicating, interacting, and transacting; for example, accomplishing any of the preceding, by movements of one's hand(s) in the air, in a room with Survey Nuts in the corners and edges of that room. And Survey Nuts, in combination with multi-axis magnetometers/accelerometers enable users to engage the real world via hand/arm/foot/etc. gestures and motions.

Survey Nuts' spatial location technology enables users to interact with their physical environment in entirely new ways. Survey Nuts enable users to engage the real world via gestures/motions: guide radio-controlled vehicles; "press" an elevator button with just a flick of a finger; roll up car windows by making a U-shaped motion with a finger, while walking away from the car; control a custom version of a fast food restaurant drive-through menu display; flick content to another person or device; change the TV channel; play various in-person virtual games, such as "Pong" by, for example, users swinging their mobile handsets (or other devices) through the air as if holding a tennis racquet; or play other video games; or engage virtual or overlay environments; utilize RFID fingernail stickers to type on any surface by just moving the user's fingers without need for a physical keyboard; control a virtual heads-up display; among other use cases. In embodiments Survey Nuts utilize radio frequency identification RFID to perform 3-axes geospatial location.

Smart Parking Meters

Parking meters become smart parking meters simply by attaching a Survey Egg or Survey Nut thereto. The Survey Egg/Nut ComCloud CloudCasts information to parking users on parking hours/costs. This can be accomplished by various means including sending Tilz to the parking users' mobile devices or automobiles. Parking users can pay via via CloudCast via a variety of means, including several proprietary methods (such as iDough, Pay by Widge, and Motran). Options include a SafePay method, whereby a user's credit/debit card is charged or bank account debited, for each block of time utilized, without worry about the meter running out of time, and the user possibly receiving a parking ticket (as is the case with coin-operated "dumb" parking meters).

The cost advantages for adding a low cost Survey Egg/Nut to existing parking meters, are tremendous. Cities are paying upwards of $5,000 each for so-called smart meters. For example, Survey Eggs can be installed at the corners of the parking lot, with less expensive Survey Nuts attached to each parking meter at each parking space. In fact, parking lots could even be made "smart" with just one Survey Egg station; that users walk to (or access via Bluetooth) after they park their car. Users then enter their parking space number and payment information. Parking police are wirelessly notified if any meters go "red" (run out of time); or again, users can SafePay, if they have an approved payment modality that can be charged for each unit of time parked.

Furthermore, adding a Survey Egg/Nut to a parking meter, turns that parking meter into a revenue generating station, for both cities and parking users.

Sponsored Parking

Parking users can actually receive revenue by agreeing to accept ads, sent via the Survey Egg ComCloud. Any such revenue can be split with the City. Parking users can receive ads in exchange for reduced or even free parking. The City can also promote, via the Survey Egg ComCloud, upcoming town events. A hair salon, for example, that is near the parking lot can advertise an "empty-chair" 25% discount—true real-time advertising. And all ads are received (or rejected) as per each user's profile. Such advertising meets a real world need: an empty salon chair that will either generate revenue that hour or not. Those skilled in the art may appreciate a plurality of uses and income generating cases, utilizing a Survey Egg ComCloud.

Survey Eggs on City Buses/Trains

All bus stop poles can have Survey Eggs/Nuts attached thereto. Passenger's mobile devices, for example, can receive the bus schedule, and actual bus location on a realtime map (for those buses that have a Survey Egg, or other type of location establishing device, onboard).

Sponsored Riding

Cities, transportation districts, bus companies, et. al. can receive additional revenue from advertisements/coupons sent to passengers in exchange for reduced or free fares. Transportation vehicles simply attach a Survey Egg to the vehicle, and the Survey Egg ComCloud, can, for example, accept ads/coupons/offers/information from businesses near a passenger's stop. Blockbuster video store, for example, may incentivize the user to go two additional stops to a location near the Blockbuster store, by paying the extra 25 cents fare. True realtime advertising, as per users' profiles.

Web Drops

Wireless carrier networks are both relatively slow and lacking in sufficient bandwidth for the current infrastructure to support mobile devices as the next computing platform. One or more embodiments of the Invention are conceived as a response to this deficiency by incorporating or otherwise connecting various external interfaces, wherein wireless network traffic is offloaded onto, among others but not limited to, wireline, cable TV, and fiber optic networks. The external interfaces perform signal conditioning and data format conversions to enable communication through one or both of wired or wireless networks. Such wired interfaces may be compatible with Ethernet standards and TCP/IP. Wireless interfaces may be compatible with one or more of the Infrared Data Association (IrDA) and the Institute of Electrical and Electronics Engineers (IEEE) 802 family of wireless data communications protocols. It should be understood that other data-network interfaces compatible with other communication standards and protocols may also be utilized.

Offsets

If, for some reason, the Survey Eggs cannot be placed at the desired boundary points, Survey Eggs can be programmed for the appropriate amount of distance offset, and thereby located where more physically practical. Also, if, for instance, the boundary points are later challenged (such as in a court of law), the authoritative government body can decree that a location offset be programmed into the Survey Eggs, rather than having to physically move and relocate the Survey Eggs.

Virtual Surveys

For example, for a case involving two adjoining neighbors, Neighbor #1 is seeking approval for an addition to the house, but discovers the lot line is such that Neighbor #1 will need to seek a variance. Furthermore, if the lot line were moved just two inches into Neighbor #2's lot, then no variance would be required. If Neighbor #1 and #2 reach an agreement as to a lot line adjustment, which is then made legally binding by various local processes, the Survey Eggs denoting the prior adjoining lot corners, do not need to be moved. The expense of having a surveyor physically survey the new lot lines can be saved, in favor of having the surveyor re-set the Survey Eggs for a 2" offset—which can be accomplished remotely, electronically, via the surveyor's computing device. The Survey Eggs then automatically re-calculate the lot lines, and transmit the new (Record of Virtual Survey) subdivision and plot map information to the appropriate government agencies.

Travel Monument Guides

Travel monuments could also use Survey Eggs to broadcast information about that site, for example, as follows: a traveler visits a travel monument (say a particular castle ruin in England which features an information plaque with an IP-enabled barcode on it), the traveler then scans/marks it with their mobile handset barcode scanner, which sends a short data burst to see if there are Survey Eggs nearby for that travel monument, and if so, the Survey Eggs send a brief audio and visual history for that monument to the users mobile handset. This is possible even where there is no traditional cell phone coverage (on non cellphone devices), since the data stored on the Survey Eggs can be broadcast via means such as WiFi, RFID, Bluetooth, and other means).

The Survey Egg ComCloud broadcasts (CloudCasts) the profile of that monument. The profile might include items such as: self-guided tour (audio file), self-guided tour (video file), history of the monument (text file), donations to the entity responsible for that monument's upkeep and management (payment transaction modality).

Emergency/Medical Alert Reporting System

Particularly for the elderly or those who live alone, the Survey Egg ComCloud can be used to transmit an emergency signal to local 911 or other emergency services personnel. Users can wear a pendant around their neck which can communicate with the Survey Egg ComCloud (while the user is within 100 meters of the ComCloud), and thereby alert family, friends, neighbors, or first responder personnel to a problem.

Emergency Services

Survey Egg ComCloud (or RFID or Bluetooth) enables firefighters/ambulances/police to find house numbers even in darkness and smoke.

Emergency Broadcast Network

Because Survey Eggs have their own battery source they can be used (with or without ComCloud) to send/receive messages during natural disasters or other emergency situations. Since the power is out during many emergencies, outdated conventional art systems, such as those that broadcast via a user's cable TV system, may be rendered useless without power.

Government agencies, at the national level, and counties at the local level, are investing in systems that allow them to send/receive information during emergencies. Currently most of their programs only allow them to send, but not receive, information. The types of messages they want to send include where to evacuate to, and day-to-day updates on such topics as transportation and sources of food and fresh water.

In-Car Navigation Data

The Survey Egg ComCloud (via means such as WiFi, RFID or Bluetooth) can communicate with users driving by, especially (or even limited to) FedEx or other delivery company personnel, to more conveniently find, locate, and/or determine house numbers/addresses and even the homeowner's name (if the homeowner chooses to ComCloud broadcast it). Drivers can keep their eyes on the road instead of driving while trying to spot and find particular address numbers on buildings/houses.

Atmospheric Research

"Up-look" multi-spectral imaging via low-spectral resolution spectrometer attachments to Survey Eggs can measure atmospheric reflectance in the wavelength region responding to solar illumination. Such data has implications, for example, vis a vis the buildup of airborne pollutants and greenhouse gases.

Automated Water/Gas/Electric Meter Reading

Survey Eggs can automate the reading of water, gas, and electric (and other) meters at residential and commercial properties (504). Users with Survey Eggs at the boundary points of their property, who have also set up a ComCloud can wirelessly transmit the data from the water/gas/electric meters. The water/gas/electric meter can transmit the data to the user's ComCloud via several means including Bluetooth and/or WiFi. The user can set the ComCloud range to transmit the meter reading (which data can be encrypted) to a distance such that water/gas/electric company personnel can drive or walk by and wirelessly receive and record the meter reading from the street/sidewalk. The water/gas/electric personnel can use a mobile handset or other device to receive the (encrypted) readings. Alternatively, users can have the (encrypted) meter readings continuously sent wirelessly via means such as WiFi to the water/gas/electric company's servers; via the Internet if that home, the neighbors, or a nearby mobile device has connectivity—even asynchronously.

Prevent Skiers from Getting Lost

Each year skiers die when they accidentally head off piste, especially in storm conditions. Ski resorts can install Survey Eggs at all chairlifts and resort boundary inflection (direction change) points. Ski patrol officers can then send real-time run closure information. Mobile handset users can locate themselves relative to the Survey Eggs without need for a fee-based monthly GPS service.

GPS Coordinates for Online Map Addresses

Survey Eggs enable maps of businesses, homes, travel monuments/sites, etc. to include the GPS coordinates—which allows for an additional type of navigation, not generally included with today's online maps. Aerial view online maps can offer the option of displaying the GPS coordinates and/or boundary lines for specific sites. GPS coordinates for commercial or residential properties can also be included in telephone directory ads/listings for (automatic) downloading into the user's mobile handset or in-car navigation system to make finding the location easier.

Dig Safely

During any excavation project, the property owner often has to have a company such as Dig Safe come and provide an underground utility survey done. This is done to avoid digging up or damaging underground gas, sewer, water, power or telecommunications lines/pipes. Survey Eggs could be used to mark not only the location of each pipe, and each inflection point (change of direction) but the Survey Eggs could also broadcast metadata such as the type and age of the pipe, and depth of the pipe below grade (or its absolute altimeter reading). All this data is then be assembled into an online map by the Survey Egg software for viewing on any digital device such as a mobile handset or PC. This would also allow excavation crews to walk the area with a mobile handset and quickly determine the location of any section of pipe by a plurality of means, including using the Survey Egg widget to audio-locate any Survey Egg via a series of staccato beeps which increase in frequency and pitch until they reach a steady tone when the user is standing immediately above a Survey Egg. Such underground utilities need only be marked once, with Survey Eggs, rather than during every job.

Improved Underground Utility Serviceability

Another problem with underground utilities is that it is hard to determine exactly where a problem is located if, say, an underground pipe breaks. The use of Survey Eggs located at pipe inflection points (where one section of pipe changes direction relative to the preceding section) can address this problem. Inexpensive flow meters, for example, could be installed in the pipe at all Survey Egg locations. The flow meter data may be broadcast (CloudCast) as part of the Survey Egg metadata—enabling service crews to readily pinpoint a potential/actual trouble spot.

Furthermore, most utilities can use such Survey Eggs to receive continuous real-time flow rate telemetry data (in many cases for the first time ever) so as to better analyze capacity usage and make better determinations as to when to perform utility pipe upgrades.

Online 3D Map Mashups

Online maps could display underground, ground level, and above ground data:

Underground utilities, pipes, water/sewer/gas lines, etc.;

Ground Level railroad lines, dirt roads, sidewalks, trails, etc.;

Above Ground utility poles/lines, airway rights, etc.

In addition, online maps can display digital blueprints 195 of structures mapped via Survey Nuts (in cases where the owner chooses to make such data public). Such data enables numerous location-based services not available today.

The above examples could also all be projected onto (mashed up with) existing online maps such as 50-State maps or voting district maps, etc.

In addition Survey Eggs/Nuts can provide reference points to cameras as they take still and video images. This enables a fly-through three dimensional image or video of any building, monument, et. al. to be created from the thousands of photos taken by tourists (and others).

Digital Blueprints

Digital blueprints 195 or "as-built" blueprints are, per the conventional art, accomplished via very expensive equipment and involve high level mathematics to resolve the stunningly large amounts of data needed create a blueprint of an object (such as a building) that already exists. Currently engineers and surveyors use laser scanners to bounce off numerous targets placed on the structure being blueprinted. The laser is then moved and the process is repeated at this new and slightly different angle. This is done hundreds of times to achieve an accurate as-built blueprint.

Archeologists also use this technique to map ruins such as those at Tikal, an ancient Mayan city in Guatemala.

Survey Eggs and Survey Nuts can accomplish this same result (digital blueprints) with much less time and with lower cost equipment. The surveyors simply place Survey Eggs at major boundary points, and Survey Nuts at all other minor junctions that need mapping, and the Survey Egg software automatically creates a three dimensional digital blueprint 195 of the structure.

And for structures, such as suburban homes, with complete digital blueprints, the architect could "tie" a "cornerstone" of the digital blueprint to a specific cornerstone Survey Egg. This would enable other neighbors or city planning commissions to view things such as potential site lines for proposed new construction projects.

Shipping Container Monitors

Conventional art container monitors cost upwards of $1000 per container. Survey Eggs are much more cost effective. In addition to the normal Survey Egg functions (such as real-time GPS location monitoring) sensors can be installed in the Survey Egg to monitor everything from the container door lock, humidity and temperature to radiation and gases such as carbon dioxide.

Shipping container Survey Egg monitors enable clients to micromanage their supply chains, reduce theft and inventories, and purchase less expensive insurance. The U.S. brings in approximately $1.9 trillion of manufactured goods each year, 60% via sea. Approximately 0.3% of those shipping containers are lost to theft: an annual loss of around $3 billion that can be reduced via use of Survey Eggs. Also increased inspections, especially for containers without such sensors, is very costly: $50,000/day for a medium sized container ship. And due to heightened terrorism concerns, an increasing number of governments are mandating solutions such as shipping container monitors.

GPE Service

Global Positioning Egg (GPE) service can be offered as an alternative to GPS (global positioning satellite) service. GPE is lower power and lower cost. Mobile handsets and cars can utilize a network comprised of Survey Eggs, Survey Nuts, and other means such as cell phone towers, WiFi hotspots, WiFi towers, and other towers to determine their location—in preference to (expensive) satellite GPS service.

Gotz Dotz

Gotz Dotz uses include, but are not limited to: Identify available parking spaces in parking garages or on a street (When a car parks between Gotz Dotz that circumscribe (or other layout arrangement relative to) a parking space the car's/user's ComCloud can indicate to the Gotz Dotz that the parking space is now taken); Telemetry data services (Gotz Dotz can download and transmit telematics data from the car's computer (such as speed, engine temperature, oil pressure, tire pressure, exhaust emissions, et. al.) in realtime. Data, as per user's profiles and wishes, can be sent to entities such as the car owners or the owner's mobile device, or the car manufacturer (which might pay users for such information), or law enforcement agencies (outstanding parking tickets or lapsed insurance), or the department of motor vehicles DMV (smog information, current registration), et. al.); Free GPS (People and cars moving along a Gotz Dotz path can determine their location); Traffic report network (Cars can automatically send anonymous driving speed information to Gotz Dotz, that can be aggregated to provide realtime traffic conditions information, and sell it to online map services and news organizations); Seasonal road marking (Gotz Dotz can mark the edges of seasonal ice roads (a solution superior to the conventional art sticks with flags). Gotz Dotz can also mark the edges of highways and roads with heavy snowfall); Automated vehicle guidance (As various aspects of vehicular control are enabled by ground sensors, Gotz Dotz can interact with the car's navigation system, cruise control, automatic breaking, steering, et. al. to guide the vehicle along the Gotz Dotz marked path); People movers inside airports; Baggage trucks/carts on airport tarmacs; Conveyor belts in factories. Sensor networks (Gotz Dotz can gather/relay information (ambient temperature, carbon dioxide levels, et. al.) in support of networks of devices which can measure and/or analyze, for instance, environmental parameters).

Gotz Dotz may replace survey monuments in places where other Survey Egg embodiments might be destroyed, such as on a street, curb, or sidewalk. Gotz Dotz, like Botts' Dots, are designed to withstand being run over by vehicles. Gotz Dotz may act as permanent and accurately re-locatable survey monuments. Gotz Dotz amass location data to automatically produce subdivision plot maps that can be more accurate than some conventional art subdivision maps, and are continuously available (via online map mashup) at minimal (relative) cost. Because Gotz Dotz may automatically create online/digital plot maps, they provide impetus for resolution of differing boundary surveys—as well as a basis for updating inaccurate legal descriptions of properties. Owners of telephone poles, street light posts, cell phone towers, et. al. are beginning to geo-tag their inventory, driving demand for fixed-location sensing devices such as Gotz Dotz.

Survey Nuts

Inside a home Survey Nuts may CloudCast all of a user's household items. If a guest likes the kitchen appliances, cabinets, or faucet, such information Tilz may be being CloudCast. The homeowner may get paid if/when an interested party who receives those Tilz, for example, later purchases that item from that company. All the contractors/manufacturers for every time in the house, may pay the homeowner to be on the homeowner's CloudCast. Information about items is CloudCast to guest's mobile devices. Such household items might include: paintings, artwork, silverware, couches, TVs, light fixtures, clothes, literally everything that user owns has a Tilz that is part of that property's CloudCast. The homeowner may get paid for the information regarding who designed, supplied and installed their kitchen.

The present Invention may be embodied in other specific forms without departing from its spirit or essential characteristics. The described embodiments are to be considered in all respects only as illustrative and not restrictive. The scope of the Invention is, therefore, indicated by the appended claims in addition to all foregoing descriptions. All changes which come within the meaning and range of equivalency of the claims and foregoing descriptions are to be embraced within their scope.

The Wireless Location-Establishing Device Provides a Platform for Interactive, Customized, User-Solicited Advertisements A system, method, service and platform for providing interactive, multimedia, customized, user-solicited advertisements are disclosed; which, for example, reduce unwanted ads for users and marketing expenses for advertisers. Via a plurality of means, users create profiles of the objects they utilize in their life. The resultant profile(s) is then made available by the present Invention ("Ad Widge") to entities such as those which manufacture or sell said objects. Those entities pay the user to view the user's ad profile, whereupon said entities make a determination whether or not to pay the user again to send ads, offers or other information, as per each user's preferences and profiles.

Up until now (2002), virtually all advertising/marketing has been based upon one thing: guesses. Guesses, for instance, about who might be interested in a company's message(s). Guesses about where, when, and how best to attempt to engage with customers and potential customers.

The present Invention (hereafter "Ad Widge"), is conceived as a response to the above-described deficiencies of the conventional art. With Ad Widge, advertising/marketing shifts from "guesses" to "facts."

Users create profiles of everything in their life. And based upon the facts in those profiles, advertisers/marketers make informed decisions, fact-informed decisions, about getting their messages (and other data) to customers and potential customers. Ad Widge's technology enables users to receive just those ads they want, and get paid to do so.

These profiles indicate not only those items the user would like ads for, but also how, when and where. Ad Widge enables a number of innovative advertising modalities including: local advertising, location-based advertising, timely advertising, contextual ads, blended ads, interest category ads, behavioral ads, affinity ads, intramedia/intrastitial ads, self-aggregating group ads, realtime competitive ads, et. al.

Further, Ad Widge, disintermediates (some) middlemen in the advertising/marketing process; putting advertisers/marketers (often the manufacturer or retailer of a product) in direct one-to-one contact with customers and potential customers. Thus, monies that erstwhile went to middlemen which created profiles of users based upon guesses, can be re-directed to users, who, via Ad Widge, create and surface their fact-based profiles directly to advertising/marketing entities, and are thereby potentially paid to receive information, ads, offers, and other data.

Via a plurality of means, users are in control of the information they receive, including ads/offers/et. al. An Ad Widge profile is a shield against information overload.

The vast majority of advertising today is unsolicited and irrelevant to the recipient. Accordingly, an improved method of advertising is desirable. Interactive, customized, user-solicited advertisements—the present Invention—enables advertisers/marketers to better target interested ad recipients. And for recipients, the avalanche of junk mail, TV and radio ads, and online advertising is reduced to a focused stream of ads for just those products and services (and other things) recipients are interested in receiving more information about.

Both advertisers and advertising recipients are losers vis a vis conventional art advertising modalities. Advertisers waste billions of dollars each year sending ads to recipients with no interest in those ads. And ad recipients are so bombarded with junk mail and all other forms of non-targeted advertising that not only is a great deal of the recipient's time wasted, but also vast quantities of natural resources (such as trees) and energy (coal for electricity, oil for U.S. Postal Service junk mail delivery, etc.) are squandered producing and delivering ads that the recipients don't want.

Advertisers waste the better part of their advertising budget delivering ads to recipients who are not interested in seeing that ad at that time. For example, if a tire company pays $100,000 for a 30-second ad during a football game, the ad might be viewed by millions of people who don't currently need tires; or are members of the family (such as children) who do not purchase their own tires. Advertisers don't want to waste corporate resources sending ads to people who don't want/need them.

As more and more Web properties continue their assault on users' privacy, more and more users will want to take control of their ad profile. And the diminishing value of the tsunami of ads flashed at users each day, cries out for fewer, more relevant ads. Too many ads=too little impact. Quantity vs quality.

Conventional art advertising technology is outdated. The "spray and pray" method, wherein companies put their ads in front of thousands or millions of people, is an outdated and spectacularly inefficient method that hopes for maybe a 1% response rate. There's minimal value to the hundreds of different ad impressions per day the average person is exposed to. And what value is there to increase that number? As more online entities ramp up their advertising, users are about to be drowned in ads. But people need fewer ads, more relevant ads. And even with fewer ads, or ads targeted at smaller groups of users—even solo individuals—Ad Widge enables content owners to profitably make their content available. For example, Ad Widge changes the economics of re-runs (and other digital content). Not just relevant ads, but ads that people actually solicit, and ads for items the users indicated they are imminently purchasing in the next few days, are valuable, orders of magnitude more valuable, as compared to the "spray and pray" cost per thousand viewers. In some cases $5 or even $25 are paid for such ads to a single user, which changes the economics of reruns and enables content owners to monetize their vast libraries in a way that makes their library potentially worth an order of magnitude more than per the conventional art advertising modalities. Attaching an ad paying more than the (10 cent) cost to stream content to a user is profit to the content provider.

There are a plurality of ad platforms, trying to monetize digital content (and other things). However, only the Ad Widge ad platform pays the user (the ad recipient). Conventional art so-called "targeted advertising" assumes that all users are poised in the starting blocks every single second of the day, just waiting to hear a keyword, at which point they launch themselves into a store to purchase that keyword item. A completely absurd assumption that informs targeted advertising schemes, which pepper users with ads each time the user says a keyword, or types it in an email, or speaks it in a phone call, etc. Further, it leads to irrelevant ads that users don't want to receive.

Ad Widge provides an unique solution to the problem of unwanted advertising. Not only does Ad Widge save advertisers money, but also "saves" users money by paying them to receive ads. Furthermore, Ad Widge enables realtime competitive ads. Instead of spraying out ads and hoping a few people respond, advertising via Ad Widge, can be directed to users who are in the act of making a purchase (or have a profile indicating a potential for such a future purchase). Advertising via Ad Widge can now be tied and tracked according to a user's expressed interests and purchase history, automatically. Users simply go about their life and Ad Widge automatically builds their profile, then helps the user monetize their profile. With Ad Widge users are the ones in charge of and being paid for the users' profiles.

Ads Vs Coupons

In embodiments, ads are a means of providing consumers more information about the features and benefits of various competing products/services that recipients are deciding among for a future purchase; whereas coupons are a specific financial discount for items that recipients already regularly purchase or want to purchase (and thus don't necessarily contain product features/benefits information).

The Invention is enabled by the current and forthcoming digital technologies such as the Internet, the ever more present digital radio, and the proposed digital television broadcasting. It is also enabled by ever more capable mobile handsets—which are defined vis a vis the present Invention, as cell phone-like devices, such as a personal digital assistant (PDA) or other devices/embodiments other than a personal computer (PC) or laptop, that don't necessarily require a monthly contract from a wireless carrier to be a useful device. Those skilled in the art will appreciate, however, that a user may utilize other digital devices that are similar to or different from a mobile handset, featuring wireless carrier service or not; Such devices are consistent with the principles of the Invention, and are thusly encompassed herein by inference.

Though in embodiments Ad Widge can be used by anyone with a digital device (such as a computer) and, optionally, Internet access, it is aimed primarily at users of mobile handsets—and some users will exclusively utilize their mobile handset to engage and utilize Ad Widge. Of course, other users may simply utilize other computing devices (or even televisions or other things) that are different from mobile handsets.

Before the Internet and the digital media revolution, advertising was a one-way communication. For decades, advertisers simply foisted their ads via junk mail, newspaper ads, radio ads and TV ads on millions of recipients hoping for something like 1% of the recipients to actually be interested enough in the advertisement to take action to purchase that product or service being advertised.

Increasingly so, recipients are being bombarded not only by junk mail and radio/TV advertising, but also by online advertising. And the avalanche of ads is just about to skyrocket as social network advertising (on MySpace, etc.) and mobile handset advertising emerges. Recipients will hardly be able to go for more than a few minutes of their day without being assaulted by unwanted and irrelevant ads. Additionally, users are becoming increasingly concerned about their privacy, as some of a user's online actions are resulting in so-called targeted ads. And conventional art "targeted advertising" is evermore intrusive.

The conventional art Web advertising model has many flaws, and one of those flaws is just how many entities (middlemen) there are between the Website and the user. Ad placement. Websites hire outside companies to place ads on their sites and choose the ads that will make the most money. Ad buyers. Ad placement companies contact ad networks (that buy the ads) and technology companies that help advertisers bid for them. Ad targeting companies. The ad buyers reach out to other companies to track or measure their ads or for access to ad-targeting data.

All these companies can potentially collect data about users by installing cookies on a computer without the Website knowing. Thus some Websites are upset that others are profiting by selling data about the site's users for ad-targeting purposes. And of course, the users, as per the conventional art, are getting paid nothing, despite the fact that it is the users' profiles that all the others in this value chain are making money off of. Accordingly it's desirable for users to take control of, and profit from, their own profiles. And with Ad Widge, they do just that.

With Ad Widge (in embodiments), Websites interact directly with the user's profile broadcast or "ComCloud" which includes a user's ad profile. Thereby companies can see whether a user wants an ad from that company without the scrum of middlemen making expensive guesses about a user's preferences. Instead the user tells the company directly. Ad Widge's technology enables users to receive just those ads they want, and users get paid to do so.

Unfortunately other advertisers continue to deliver ads as if the Internet and digital revolution has not taken place. Some offline advertisers use information about ad recipients gathered from entry forms for contests and warranty postcards. Direct marketing companies create numerous mailing lists based on these keywords or whether someone bought from a particular catalog before. Then for the next 5-10 years users received junk mail (and other forms of ads) based upon this incomplete, out of date, and often inaccurate profile.

Feedback about the relevance/usefulness of the TV ads or junk mail was not practical—but it is today. Prior to the Internet there wasn't a cost effective way for people to build their own ad profile and communicate it directly to marketers (or today's search engines seeking to serve up ads). Yet most conventional art search engines ignore this fact, and continue to bombard users with ads based upon 50 year old marketing techniques.

The Internet, mobile handsets, digital radio, and the forthcoming digital television enable advertisers to inexpensively target individual recipients via simple, practical means. It would be preferable for users to give feedback about ad relevancy. It would be preferable for users to create their own profiles, either explicitly (by filling out profile checklists or other means) or implicitly (by means such as barcode scanning or RFID interrogation of the objects users utilize in their life—profiles which can be created while online or offline). Ads can thereby be tied to a user's expressed interests and purchase history, automatically.

It would be much better, for example, if advertisers had a list of people who actively indicated an interest in receiving, say, tire ads. Advertisers could target that much smaller subset of people who are interested in receiving tire ads, and not annoy potential future customers who don't want to receive tire ads right now. Instead of advertisers bombarding millions of recipients with millions of ads (a shotgun approach), recipients can, via the Invention, be in charge of the advertising they receive by requesting just those ads they are interested in (a rifle approach). Various technologies have now evolved to the point where it is simple and practical for advertising, for the first time, to become a two-way ongoing communication between advertiser and recipient.

Ad Widge is interactive, customized, user-solicited advertisements. When users solicit ads/information, ads can shift their focus from the marketing-driven hype of the conventional art, to becoming more effective information delivery vehicles, for users who are actively seeking information vis a vis a purchase decision (or other reason).

Interactive, customized, user-solicited advertisements enable advertisers to better target interested ad recipients. Instead of users being bombarded with random ads, users can, for instance, scan the barcodes/RFID of the items they use in their everyday life to automatically build a profile of items they could really use ads for.

As used herein in connection with the ads associated with the plurality of embodiments of the Invention, the following terms are defined as:

Interactive: users solicit and receive additional information on the item in real-time, as well as rate the relevance/usefulness of that ad to that user.

Customized: ads appear in a format according to the user's preferences/profiles, and can offer different information and ad appearances to different users.

User-solicited: users surface profiles of items for which ads may be desired, to various ad-issuing entities, and thereby inform ads they receive.

Advertisements: advertisements, offers, information and/or other forms of data or content are herein encompassed by the terms "advertisements" or "ads."

Reference herein to the word "advertisers" shall be understood to encompass advertising, marketing, and/or related entities.

The present Invention is described in one or more embodiments in the following description with references to the Figures. While the Invention is described in terms of the primary modes for achieving the Invention's objectives, it will be appreciated by those skilled in the art that it is intended to cover alternatives, modifications, and equivalents as may be included within the spirit and scope of the Invention as defined by the appended claims and their equivalents as supported by the disclosures and drawings herein.

A primary purpose of the system, method, service and platform for providing interactive, customized, user-solicited advertising described herein is to reduce inefficiency vis a vis advertising and marketing. The disclosed system, method, service and platform also enable advertising recipients to exert control over and manage the information that is marketed or otherwise sent thereto.

Although various embodiments of the Invention extend to any system that operates in accordance with the principles described herein, one embodiment is described in the context of a Website, server software and widget (Webified mini-software application) that is collectively referred to herein as "Ad Widge."

According to this embodiment of Ad Widge, the Website, server software and widget enable users to create lists/profiles of things they'd like to receive ads for. Users indicate via a preference profile (Web Pref) the way they'd like their ads presented (e.g. text-based details, or visually-oriented, on their mobile handset or in the postal mail, etc.) The checkmark list (or profile), among other embodiments, can be created manually or by using their mobile handset to scan barcodes (Net Dotz) of products as they use them, or scan the barcodes of items they come across in stores, on Websites, in TV ads, or other places. Product/service vendors then send users ads according to user ad profiles. In addition users may engage in social/business networking with other users via profiles, blogs, chat rooms, and message boards.

In embodiments Ad Widge is a software widget that resides on various digital devices (particularly mobile handsets), and enables stores, merchants, service providers, etc. to send ads to a user's digital device, based upon the desired-ad profile set up by the user. Via a plurality of means, including the Ad Widge Website and/or directly on the users' digital device via the Invention's widget (downloadable Webified mini software application), users create a profile of the advertising they would like to receive. Advertisers can, if the user's profile allows, view the profile of items for which the user would like to receive ads. Advertisers then deliver the ads to the users (customized) as per the user's ad profile.

This profile indicates not only those items the user would like to receive ads for (e.g. tennis gear, car tires, organic breakfast cereals, etc.) but also how, when, and where the user would like to receive the information. For example a text message on the user's mobile handset, or a 3 minute detailed ad on the user's TV between 6 and 8 PM, or a brochure mailed to the user's home, etc.

Via their Ad Widge profile users may also elect to allow ads from competitors of products in their Ad Profile—competitors pay the user for the right to try to entice them to switch products (in embodiments via modalities such as realtime bidding). After all it is the users time and money that is sought: The user's time, to review the info/ads/offers/etc.; and ultimately it is the user's money that is sought by the advertiser/marketer (often to purchase the advertiser's/marketer's product/service).

Advertisers/marketers already pay, to get their ads/ads/information/et. al. to users—they pay middlemen such as search engines, Internet tracking companies, and/or market research firms, etc. With Ad Widge, users and potential users make their interest in more information about a product known via their profile broadcast, without need for middlemen to guess which users might be interested in an advertiser's ads/offers/information/et. al. Thus advertisers can save those monies paid to get their messaging to users who weren't interested in receiving it, and further redirect monies that were paid to middlemen to guess which users want which ads/offers/information/et. al.; instead, potentially paying fees to users directly, in exchange for the value the user provided in surfacing their profile.

In those instances where payments are non-zero, users can further control the amount of ads/offers/information/et. al. they receive, by setting a minimum fee to receive, read and review the ads/offers/information/et. al. That is to say, the senders of such material must pay the user an amount equal to or exceeding the user's minimum fee to even send the user such material.

Figure 14:
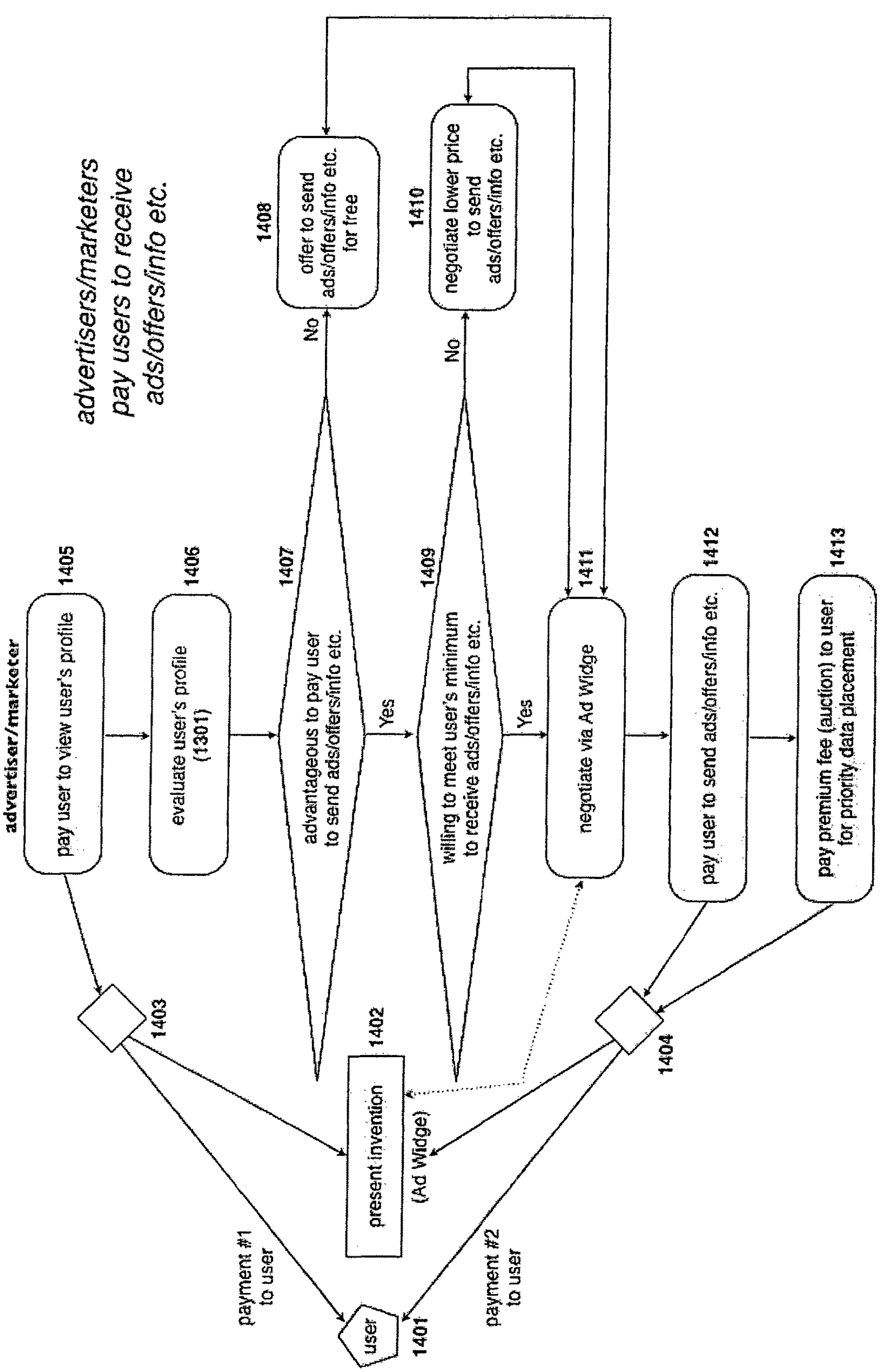
FIG. 14 is a flow diagram illustrating an embodiment of example process steps followed by advertisers as they first pay a user to view and review a user's profile, to thereby determine if it's advantageous to pay to send the user ads; and further consider paying additional monies for priority data placement (an unique variation on paid search, wherein the user is paid; as opposed to a middleman entity).

FIG. 14 illustrates one of the Invention's most important principles: profiles=currency. Ad Widge simplifies and automates the process whereby users create, manage and monetize their profiles. And these profiles have value. There are many companies, for instance, which would pay, literally, to view a user's profiles 1302.

Consider a case where all users create and broadcast all their profiles 1302 to all the appropriate entities at all times. Then, for example, the local movie theater could simply view the movie profiles 1305 of all movie goers in say a 20 mile radius of the movie theater, when making decisions such as which movies to acquire the rights to show in their theater. Such profile-based, fact-based decision making is far superior to the so-called analytics programs which harvest vast amounts of information, and apply complex algorithms, in the hopes of teasing out a few valuable (accurate) nuggets of information. And ad-sending entities pay a great deal of money for such information, weak though it may be, gleaned via such means.

That's why user's fact-based profiles are so valuable to so many entities. In practice, for example, a user reading the Sunday paper, and scanning an ad for a movie they'd like to see may get paid 1022, via Ad Widge, almost instantaneously by entities 1107 such as those that can provide the movie to the user 1108-1113 and ads/offers/information/et. al. related thereto. Scan the ad, and shortly thereafter, the user gets paid. Perhaps only a few pennies (or even fractions thereof) in some embodiments, but the tectonic shift in the advertising landscape may be appreciated by those skilled in the art.

Users create a profile of ads they are willing to receive, primarily through barcode/RFID scanning of products they utilize (as well as by other means). Alternatively users can indicate they are willing to let any entity send an ad-on any subject—if the sender pays the user (a minimum price set by the user). Each user can set their own prices to receive ads. Users also decide if they want to get paid by advertisers or market research firms (or other entities) to view the user's Ad Widge profile. Cumulative totals and/or frequency of various items purchased is valuable information that the user's profile contains. And beyond just frequency information, there is specific purchase information. For example, a user's profile might indicate a user purchased grated Parmesan cheese 18 times in the past year. But beyond that is much more granular information such as: What sizes of bags (8 ounce or jumbo 32 ounce)? Which brands? Re-sealable pouches or vacuum packed bags? Which stores were they purchased at? What payment modalities were utilized? et. al. The user gets paid by market research companies and manufacturers (and other entities) to view the user's Ad Widge profile which contains such valuable detailed information.

The Invention's interests are aligned with users. Ad Widge only gets paid, when users get paid 1403, 1404. Unlike traditional companies, such as leading search companies, which in many cases get paid, even when neither party to a transaction (buyer and seller) are happy with the value received. Traditional middlemen, such as leading search companies, add to the cost of goods (collecting, say, $30 on "refrigerator" searches, during the 10 years a user owns a fridge, happens to do searches on fridges, but isn't at the time in the market for a refrigerator). Ultimately, search companies drives up users' costs twice: 1) the cost of goods that the user eventually pays for is $30 higher; and 2) privacy costs, as entities such as leading search companies spy on users, to obtain the data used as fodder for their algorithmic guesses as to what a user might actually be in the market for.

An unique advantage of Ad Widge is that ads/offers/information/et. al. sent to users are based upon the best, most accurate and most comprehensive profiles available—those maintained by the users themselves. Any profile created by a third party is inferior to a user-created and managed profile; because, ipso facto, the only witness, for example, to every single movie a user consumes, by any and all modalities, is the user himself. If a user's movie profile is maintained by a third party such as the user's television service provider, the television service provider only bears witness to those movies the user consumes via the television service provider. Therefore, anytime the user consumes a movie, not via the user's television service provider, the television service provider's movie profile for that user becomes a bit less accurate, a bit less comprehensive and therefore a bit less valuable.

The same is true for other third parties which base their advertising systems upon profiles that third parties create of users; such third party profiles are less accurate, less comprehensive and less valuable, than profiles created by users themselves. This is a crucial point: all other forms of advertising prior to the present Invention, rely in some form or another on third party profiles of users. Thus all prior forms of advertising are inferior to Ad Widge's system and method wherein users create, and manage, and monetize their profiles.

Therefore in preference to flooding recipients with a plethora of ads, which are often of interest to only a tiny fraction of recipients, users create profiles of everything that matters to them. Said profiles are selectively, as per users' preferences, surfaced to ad-sending entities by Ad Widge. Ad-sending entities (may) pay the user to review the relevant profiles, and thereby determine if they wish to send ads/offers/information/et. al. to the user, and if so, ad-sending entities (may) pay the user again for the user's time to review same.

Ad-sending entities can, likewise, create profiles of their own via Ad Widge (or otherwise). For instance, their profile might be of each of the products they manufacture, stores that retail those products, and entities that perform repairs, technical support and/or related services for said products. Once these profiles are created, ad-sending entities can engage the Invention service which automatically matches their product profiles with those users seeking more information, possibly including ads, about that same, or similar, product.

Once a profile match has been effected, ad-sending entities then review, either manually with live personnel, or via a computer-based system which might employ various algorithmic facilities, a user's preference profile which includes preferences as to how, when and where a user would like to receive any ads/offers/information/et. al. and a fee schedule detailing the minimum prices (which might be zero) a user is willing to accept, to receive said ads/offers/information/et. al.

If the ad-sending entity determines it is advantageous to proceed, ads/offers/information/et. al. are delivered by the company itself, third parties, or via Ad Widge.

In embodiments, Ad Widge ads are delivered via Tilz (data tiles), which are transactable objects, and therefore enable users to purchase directly from the ads, even offline ads. For offline ads, users scan the (Net Dotz Internet protocol IP) barcodes, which, in embodiments, results in a Tilz being downloaded to the user's mobile device. The Tilz is a transactable object which enables the user to make purchases therefrom. The user's Ad Widge profile includes user-selectable options, such as the ability for users to choose to allow ads from competing products. For example, if a user utilizes Tide detergent, then the user has the Tide Tilz in their Ad Widge profile. If they allow ads from competing products, such as in this case Cheer detergent, then Cheer detergent is allowed to pay the user to send ads. Competitors pay the user for the right to entice them to switch products.

Ad Widge is simple to use for product and service providers. In embodiments, they just post all forms and variations of their advertising, and Ad Widge pulls the appropriate Tilz to each user. So for instance, Ad Widge can facilitate the placement or population of the ads (Tilz) the user sees when watching TV, or in their (digital) newspaper or magazine (or other).

The Invention employs and incorporates many unique technologies, such as the ability to purchase a product/item directly from an ad—even offline ads—and facilitate real-time acutions for ads/offers/information/etc. regarding competitive products while the user is in the act of shopping (such as at a bricks and mortar store or while shopping online), as per the detailed descriptions below.

Figure 10:
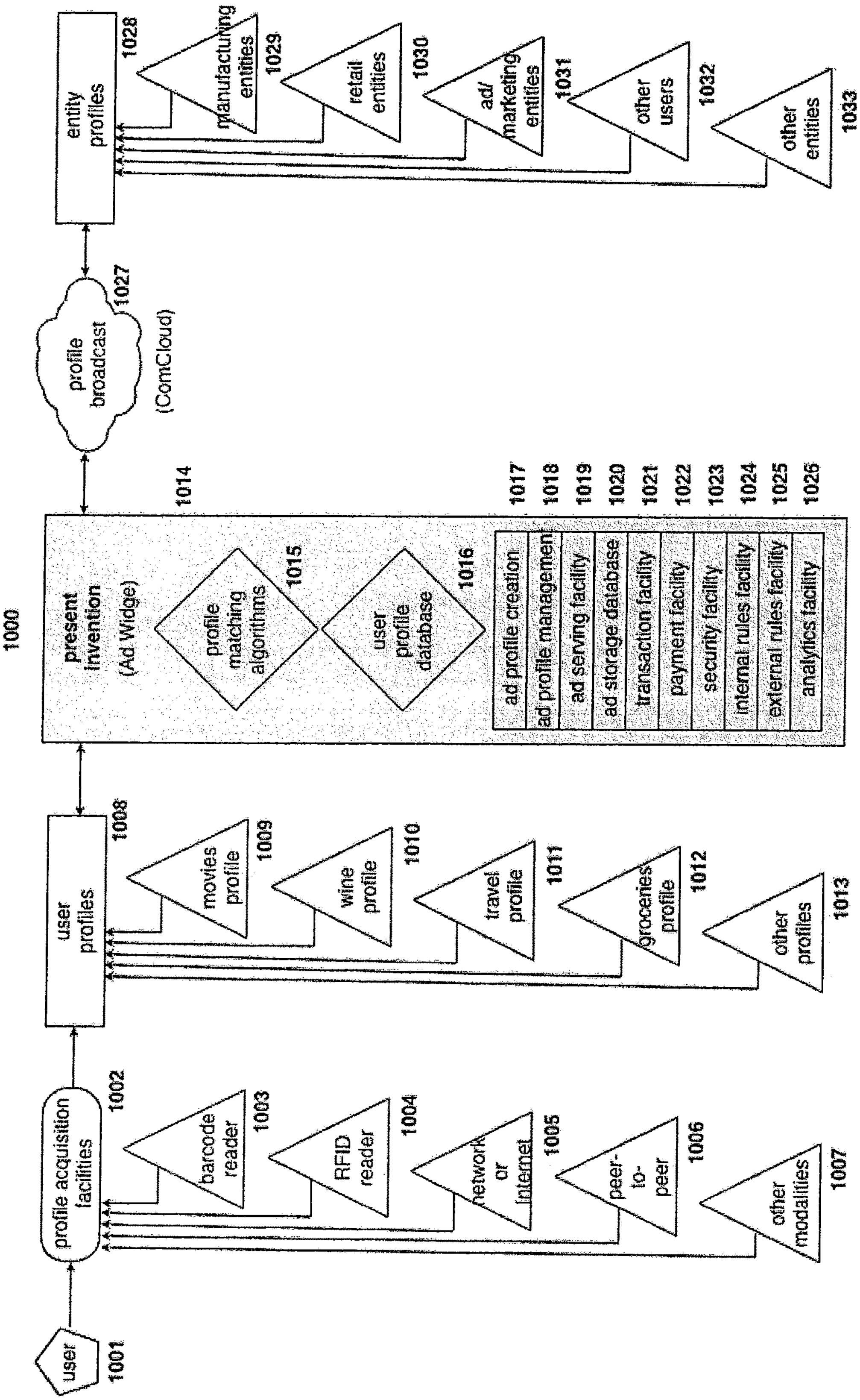
FIG. 10 is a functional block diagram illustrating an embodiment of an example of advertising profile acquisition, creation, and matching, as per the Invention's facilities and algorithms.

Having generally described operation of the systems and methods for profile based advertising, various embodiments will be described with respect to FIGS. 10-19. Referring to the accompanying drawings wherein the same reference numerals refer to the same or similar elements:

FIG. 10 shows an exemplifying architecture of an embodiment of an interactive, multimedia, customized, user-solicited advertisements system, method, service, and platform in accordance with the Invention which is designated generally as system 1000.

System 1000, hereafter "Ad Widge," represents an embodiment of the system, method, service and platform by which a user creates profiles of things, which in turn inform the advertising, offers, information and other data the user receives regarding same. The nucleus of the Ad Widge platform centers around client and server software 1014, but which more generally consists of a plurality of computer applications, devices, components, facilities, and systems, as well as a plurality of data facilities, including various data sources and data acquisition facilities. The foregoing may be centrally located or geographically dispersed, may be locally and/or remotely interconnected, and may consist of distinct components or be integrated into combined systems. In the illustrated embodiment, the Ad Widge platform 1000 architecture facilitates the processing of user-initiated queries entered into a query entry system functioning in conjunction, for example, with a barcode reading facility 1003 on the user's 1001 mobile device 1002. The mobile device may process the results of this query locally via client software, or transmit the results of this query to a remote server software system 1014 for further processing and/or routing to data sources and/or processing facilities, such as one or more servers, such as HTTP servers or other servers that are suitable for handling data that are transmitted over computer networks.

In embodiments, a plurality of profile acquisition facilities are available including barcode scanning facility 1003 (which may include a laser-based barcode scanner or other barcode scanning means), RFID interrogator facility 1004, network or Internet-based facilities 1005, peer-to-peer facilities 1006, among other profile acquisition modalities 1007. Profiles consist of tiles (or other units) of data about things, hereafter "tiles" or its homonym "Tilz." The user 1001 acquires a Tilz about something, such as a product (it is understood that the Invention applies not just to products, but also to people, animate and inanimate objects, ideas, et. al.), by one or more of the aforementioned facilities/modalities. Via a vis scanning the barcode 1003 of the product or interrogating the RFID 1004 tag of a product, a Tilz may be returned directly, or indirectly via means wherein the query returns the Internet Protocol (IP) address where more information, the Tilz, may be found for that product. (Other Invention embodiments not involving barcode/RFID facilities are conceived wherein the same or similar data gathering and presentation is accomplished by more conventional vehicles such as Websites or other means.) Users may also acquire Tilz via network or inter-network (Internet) 1005 means, such as pointing a browser to the Webpage wherefrom Tilz for that product may be downloaded or otherwise acquired. Additionally, users may also acquire Tilz for the product via peer-to-peer 1006 means, such as via Bluetooth from, for example, another user who already has the desired Tilz for that product, say on their mobile device. Other peer-to-peer embodiments such as, but not limited to, person-to-machine and machine-to-machine interactions, facilitated by any number of communication modalities, may be utilized to acquire a Tilz about a particular product. Other modalities 1007 are contemplated, consistent with the principles of the Invention. And further, other embodiments not involving Tilz are conceived wherein the same or similar data tracking and presentation is accomplished by more conventional vehicles such as Websites (or other means).

Once a user has acquired 1002 one or more Tilz about an object, the resultant Tilz, which is the profile of that object, is presented to the Invention's client and/or server software, for sorting into profiles 1008, which consist of logical groups and/or subgroups of one or more Tilz. FIG. 10 illustrates several sample user profiles including the user's movie profile 1009, wine profile 1010, travel profile 1011, groceries profile 1012, and other profiles 1013.

A user's profiles 1008, are then presented to the Ad Widge client/server software 1014 which in embodiments may include profile matching algorithm facilities 1015, user profile database/storage facilities 1016, ad profile creation facilities 1017, ad profile management facilities 1018, ad serving/provisioning facilities 1019, ad storage facilities 1020, transaction facilities 1021, payment facilities 1022, security facilities 1023, internal rules facilities 1024, external rules facilities 1025, analytics facilities 1026 and/or other facilities. One or more of the foregoing facilities then processes the incoming/active profile, by a variety of means not limited to extracting keywords and metadata from the constituent Tilz containing that object's profile.

For each profile 1008 submitted to Ad Widge, the user makes selections (or chooses to accept automatic defaults or system 1000 generated recommendations) regarding what types of data the user would like to receive, or not receive, vis a vis that profile. Granularity of data control extends to the individual Tilz within a profile. Additional choices regarding data reception control include, but are not limited to how, when and where users receive information about the product. (Incoming information about a product is hereinafter assumed to be received via data tiles or Tilz.) The types of data a user may wish to receive regarding a product include but are not limited to ads, offers, information, or other data/content.

For example, a user who just bought 50 items at a grocery store may scan the barcode at the bottom of the user's receipt, and thereby automatically receive a Tilz for each and every item they purchased. These grocery item Tilz may then be sorted into the user's groceries profile 1012. If the user only eats Wheaties cereal, the user may elect to block, REJECT, any incoming cereal ads (which might annoy the user, who only purchases and eats Wheaties). However, a user who is a buyer of Minute Maid orange juice, and is open to receiving orange juice information may therefore set their Ad Widge preference profile regarding orange juice ads to ACCEPT.

Users may fine tune, set the granularity of, or otherwise adjust Accept/Reject criteria via the internal rules facility 1024 or other facilities. Internal rules 1024 (such as those set by the user) and external rules 1025 (such as those set by wireless carriers, and/or other third parties) are applied to user's profiles and affect various aspects of ad delivery and presentation. Examples of rules that can be set manually (by the user) or automatically (by Ad Widge's algorithm facilities 1015) include: 1) How, when, where to receive ads (for instance certain types of ads should be delivered to a user's TV from 7-9 PM on weeknights, other types of ads are to be delivered via car radio while the user is driving home from work; and still other ads are to be delivered to the user's handset at any time); and 2) Ad reminders: 36 months from now start tire ads. Ad Widge can log the date the user purchased/installed new tires, and, if the user wishes, blocks tire ads until the user is likely to be in the market again for tires. Conventional targeted advertising fails miserably in this regard: if a user purchases new tires today, then that user doesn't need to see tire ads for, say, 3 years or 36,000 miles. And though the user isn't in the market for tires, that user may in fact use the word "tires" in the meantime, say in an email. Yet a conventional "targeted" advertising approach would likely serve that user tire-related ads (wasting the user's time, and the advertiser's money) during those 3 years.

Once one or more profiles has been processed, Ad Widge 1014 makes one or more profiles available to select entities 1028 via a user profile broadcast 1027, hereafter "ComCloud" aka "commerce communications cloud" (or other means). A user's ComCloud may be broadcast by a plurality of modalities including Bluetooth, WiFi, wireless carrier network, Internet, infrared (IrDA), and/or other available means. For example, a user walking downtown along the sidewalk, may choose to have Ad Widge broadcast the user's ComCloud (such a broadcast is referred to herein as a "CloudCast") via Bluetooth in such a manner that Ad Widge acts as a shield against information overload; a number of businesses along the user's path, may wish to send ads via WiFi to the user's mobile handset, however Ad Widge can block the undesired ads, and accept just those the user wishes.

In embodiments, Ad Widge matches the profiles of various entities 1028, against the user's profiles 1016, seeking matches for content (info/ads/et. al.) desired by the user against content available by the entity. Such entities may include, manufacturing entities 1029 (such as the manufacturer of Minute Maid orange juice), retail entities 1030 (such as grocery stores), advertising/marketing entities 1031 (such as ad buying agencies or market research firms), other users 1032 (who may, for example, share a similar profile), and/or other entities 1033 (who may, for example, share a similar profile).

In other embodiments, where entity profiles are not made directly available to Ad Widge, Ad Widge searches other sources such as existing online profiles/data, and performs (profile) matching against same.

Once one or more matches has been established, Ad Widge, as per the user's profile preferences, makes the user's profile available to the selected entity, for free or for a fee 1022 (which the user receives a portion of). Based upon the user's profile, the entity then decides whether or not to pay 1022 to send the user ads/offers/information/et. al. as per the user's preference profile. If the payment amount is non-zero, the user receives a portion of said monies.

Those skilled in the art may appreciate that entities already pay to get their ads/information to users; they pay middlemen entities, which make guesses as to which users might be interested in that entity's ads. Middlemen currently peddle profiles based upon guesses (often obtained by spying on users' online activities), and those guess-based profiles are sufficiently valuable that ad-sending entities pay middlemen to acquire such guess-based profiles. With Ad Widge, guesses about what users want/need are replaced by facts, from users, who create, manage and monetize their own profiles—automatically via Ad Widge. With Ad Widge, ad-sending entities no longer need to guess which customers and potential customers to reach and how to reach them. And since customers and potential customers instead manifest their profiles directly, via Ad Widge, to such entities, middlemen may be disintermediated. Thus, in a logical value-for-value transaction, users are paid for the inherent value of their profiles, which because they are based-upon actual products/services a user actually utilizes, are more accurate, and thus more valuable, than the guess-based profiles from middlemen common to the conventional art.

For example, the orange juice user might (be paid to) receive an ad from Minute Maid, which thereby hopes to convince the user to stay loyal to Minute Maid. However, if the user sets their Ad Widge preferences 1018 to accept ads/offers/information/et. al. 1019 from competing entities, the user might be paid 1022 to receive an ad from a Minute Maid competitor, such as Florida's Best orange juice, which thereupon presents information in their ad endeavoring to cause the user to switch brands.

Users 1001, via Ad Widge 1014, interact with ad-sending entities 1028 via their profile broadcast 1027. Examining the user's profile 1016 enables ad-sending entities 1028 to customize the ads. And ad-sending entities send ads 1019 to users who solicit same vis a vis their Ad Widge profile preferences 1018. Hence the present Invention: interactive, customized, user-solicited advertisements 1000.

Figure 11:
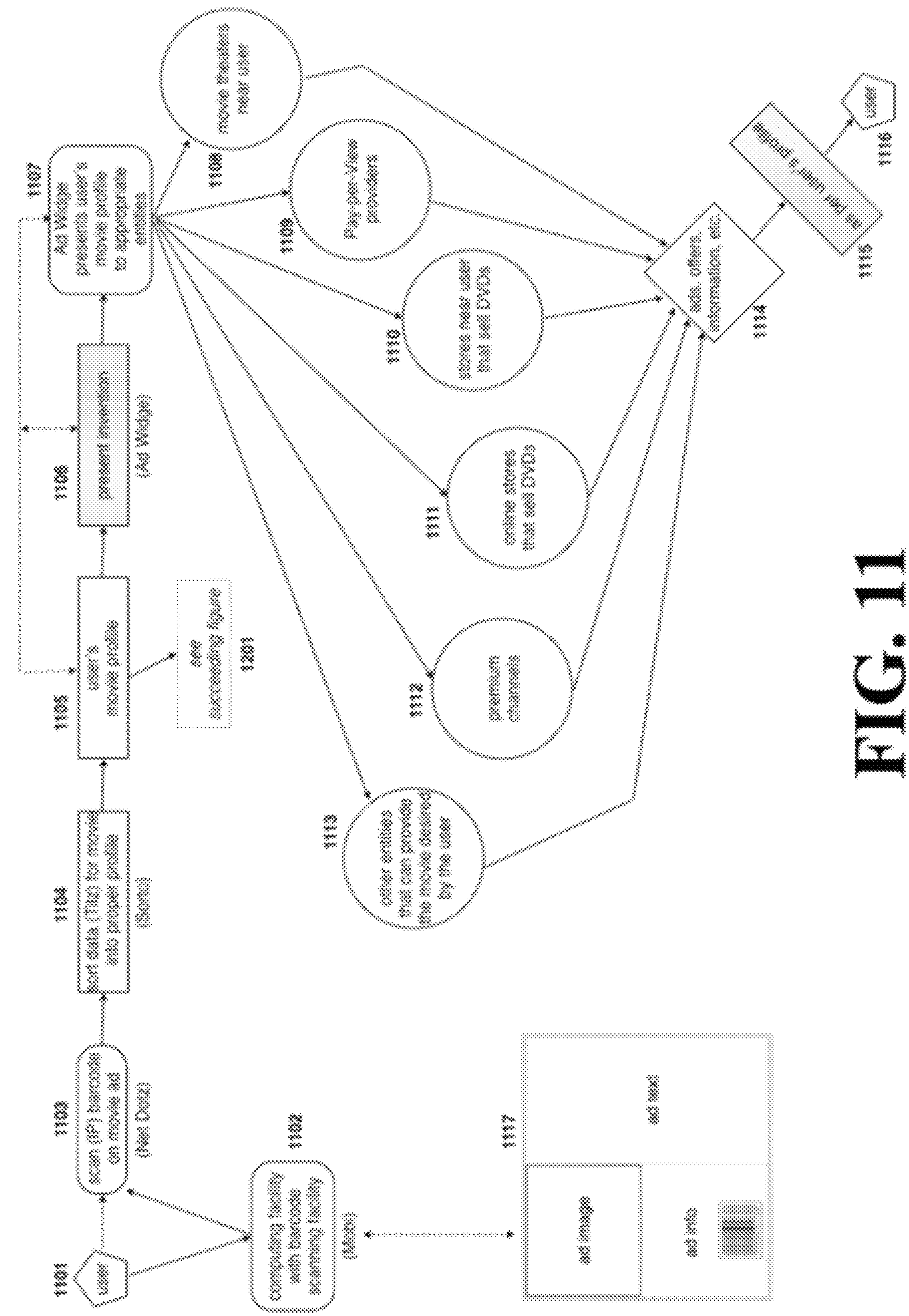
FIG. 11 is a flow diagram illustrating an embodiment of an example wherein a user scans a movie ad in a newspaper, whereupon the user's movie profile is updated, and thereby the movie-providing entities send ads, offers, and information per the user's profile.

FIG. 11 is a flow diagram illustrating an embodiment of an example wherein a user 1101 scans 1103 a movie ad in a newspaper 1117, whereupon the user's movie profile 1105 is updated, and thereby the movie-providing entities 1107 send ads, offers, and information 1114 per the user's profile 1115. For example, a user 1101 reading the Sunday newspaper is looking through the movie section and comes upon an ad 1117 for a movie the user wants to see "The Godfather." In embodiments the user 1101 utilizes the user's mobile handset 1102 to scan the IP-based barcode on the ad 1117 for "The Godfather." The IP-barcode includes the IP address where more information about the movie "The Godfather" can be found, and returns that information to the user's Ad Widge in the form of a data tile (a Tilz). This Tilz may include information such as theater times near the user, prices for DVDs in various store near the user, dates when the this movie will be available on a premium channel such as HBO, et. al. The Tilz users receive are customized based upon the profile of the person scanning the ad.

In embodiments the Ad Widge algorithm facility 1015 may process the received Tilz by heuristic methods that utilize information within the metadata appurtenant to the Tilz. The algorithm facility 1015 may then promote or demote individual elements comprising the user's list of names of profiles, in order to proffer to the user the name of the suggested profile to place "The Godfather" Tilz in. After receiving the user's query response, which might include the user choosing a profile other than the one suggested by Ad Widge, or manually creating a new profile category, "The Godfather" Tilz is sorted 1104 into the desired profile, the user's movie profile 1105. Ad Widge then presents 1107 the user's movie profile 1105, 1201 to appropriate entities 1108, 1109, 1110, 1111, 1112, 1113, such as those entities which can supply the user the movie "The Godfather." Said entities then review the user's movie profile to determine if they would like to interact/transact with the user—a purported movie goer. For those entities 1108, 1109, 1110, 1111, 1112, 1113 that determine that the user 1101 is a party to whom they wish to advertise (or otherwise interact with or send information, et. al. to), those entities then send ads, offers, information, et. al 1114 as per the user's profile 1115.

For example, the first place a user can usually experience a particular movie is in the theater, so movie theaters 1108 near the user, which are playing the movie the user wants to see, might pay the user to send an ad touting that theater's high-end audio systems. Or another theater might make the user the following offer: purchase a movie ticket, and for just $7 more, the user can receive a digital download (the DVD Tilz) of the movie they are watching, while they are watching the movie, via Bluetooth or other means to the user's mobile handset. The next place a user can usually consume a movie is on pay-per-view. Pay-per-view may be offered by the user's television service provider, which can make a customized offer to the user to watch the movie. Next stores near the user that sell DVDs 1110 may wish to send ads to this movie going user, to entice the user to come in and purchase the DVD in their store—which enticement may be sweetened by a customized offer. Next online stores that sell DVDs 1111 may make offers to the user. Next premium channels such as HBO may make offers to the user; followed by other entities that can provide the movie desired by the user may wish to send ads/offers/information/et. al. to the user.

It should be noted that a user's profile 1105 may include a preference for accepting ads/offers/information/et. al. from related parties—in this case, say from food vendors, for delicious snacks and/or refreshing beverages that the user may wish to enjoy while watching the movie.

Finally, the Tilz that users receive are transactable objects, and thus users can make purchases directly from ads, even offline ads. In embodiments, users scan an offline ad 1117 in a newspaper, and receive the Tilz for that product. That data tile (Tilz) may include profile-based links to one or more Websites where the user can purchase the product. Alternatively, the Tilz itself may include the ability to purchase the product. This functionality may be informed by the use of third party servers or Websites. Such use however, may not be apparent to the user as per the Ad Widge graphical user interface, in order to provide a more user-friendly streamlined shopping experience. Order fulfillment may be effected by interface to, for instance, the product manufacturer/distributor/retailer's e-commerce Website (or other order fulfilling entity or process).

Figure 12:
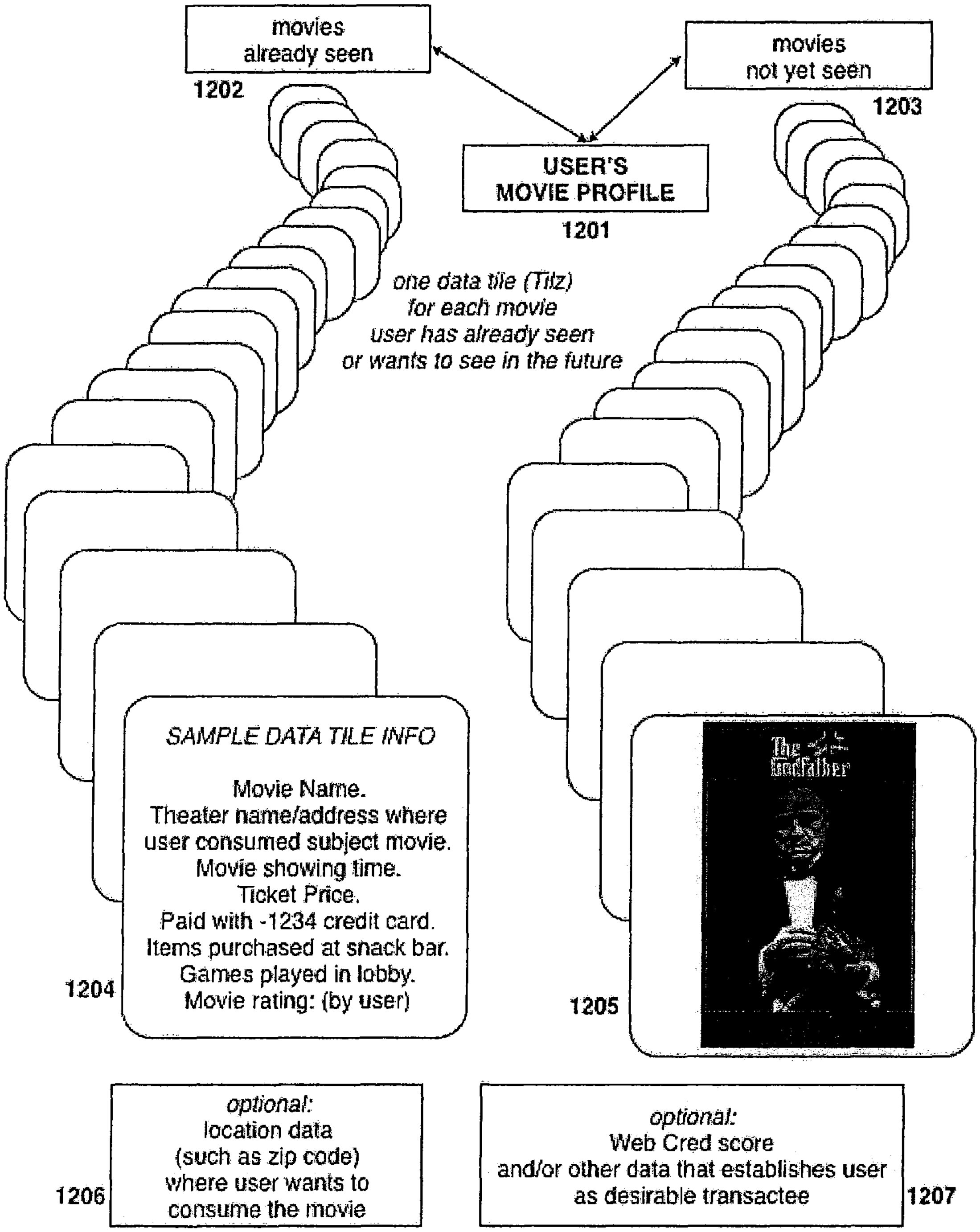
FIG. 12 is a depiction of an embodiment of an example user profile, wherein the movie profile is informed by a data tile for every movie the user has already seen, in addition to a tile for each movie the user would like to see in the future; as combined with optional location and score data.

FIG. 12 is a depiction of an embodiment of an example user profile 1201, wherein the movie profile is informed by a data tile (Tilz) for every movie the user has already seen 1202, in addition to a tile for each movie the user would like to see in the future 1203; as combined with optional location 1206 and score 1207 data.

In embodiments users receive a tile/Tilz each time they consume a movie and thereby their movie profile is automatically built. The Tilz contains a profile of that movie watching experience. No matter whether a user sees a movie in the theater 1108, buys the DVD 1109, 1110, watches it on pay-per-view 1109, a premium channel (such as HBO) 1112, or on a "free" channel, the user receives a Tilz. For example, if a user goes to see a movie in the theater, they may receive the Tilz 1204 as their receipt for purchasing the ticket. In addition, the Tilz profile of the user's movie watching experience might include information such as the name of the movie watched; the theater name/address where the user consumed the movie; the movie showing time; ticket price; paid with credit card xxxx-xxxx-xxxx-1234; items purchased at the snack bar; games played in the lobby; movie rating by the user; et. al. Alternative embodiments not involving Tilz are conceived wherein the same or similar data tracking and presentation is accomplished by more conventional vehicles such as Websites.

In embodiments a user's Movies Already Seen profile 1202 is built-up automatically over time, or users can choose to manually (or via other means) build/supplant their movie profile. Similarly, a user's Movies Not Yet Seen profile 1203 is automatically built-up over time via a plurality of means, including but not limited to scanning the barcodes of ads in the periodicals/newspapers/et. al.; digitally marking an ad the user hears on the radio or sees on TV; and/or recommendation by a friend or colleague; for movies the user hasn't yet seen, but wants to. In each case the user receives the Tilz for the movie, which Ad Widge then sorts 1104 into the user's movie profile 1201.

Users may choose to include location information 1206 in their movie profile, such as the zip code in which the user wishes to consume that particular movie (location preference, can be per profile as a whole, or per individual Tilz). This information is vital to potential ad-sending entities. For example, only those movie theaters near where the user wishes to consume the movie, would likely be interested in paying the user to send the user ads/offers/info/et. al. related to same.

In embodiments where ad-sending entities pay users to send ads to the user, the user must prove to the satisfaction of the ad-sending entity that the user (as per FIG. 12) is a legitimate movie-going user, whose expected future stream of movie-related expenditures 1203 are sufficient to warrant paying the user in the hopes of enticing that user to become a customer of the ad-sending entity. An additional tool ad-sending entities may wish to avail themselves of is the user's Web Cred score 1207. Similar in concept to a user's credit report FICO score, a Web Cred score is a numerical expression of a user's Web credibility; that is to say, a computed figure that examines factors such as the relationship between the number of information requests versus purchases for a given product. And in the same way that a FICO score informs a credit card company's decision to issue a person a credit card or not, an ad-sending entity can choose to factor a user's Web Cred score in, when deciding whether or not to pay to send ads to a given user.

Figure 13:
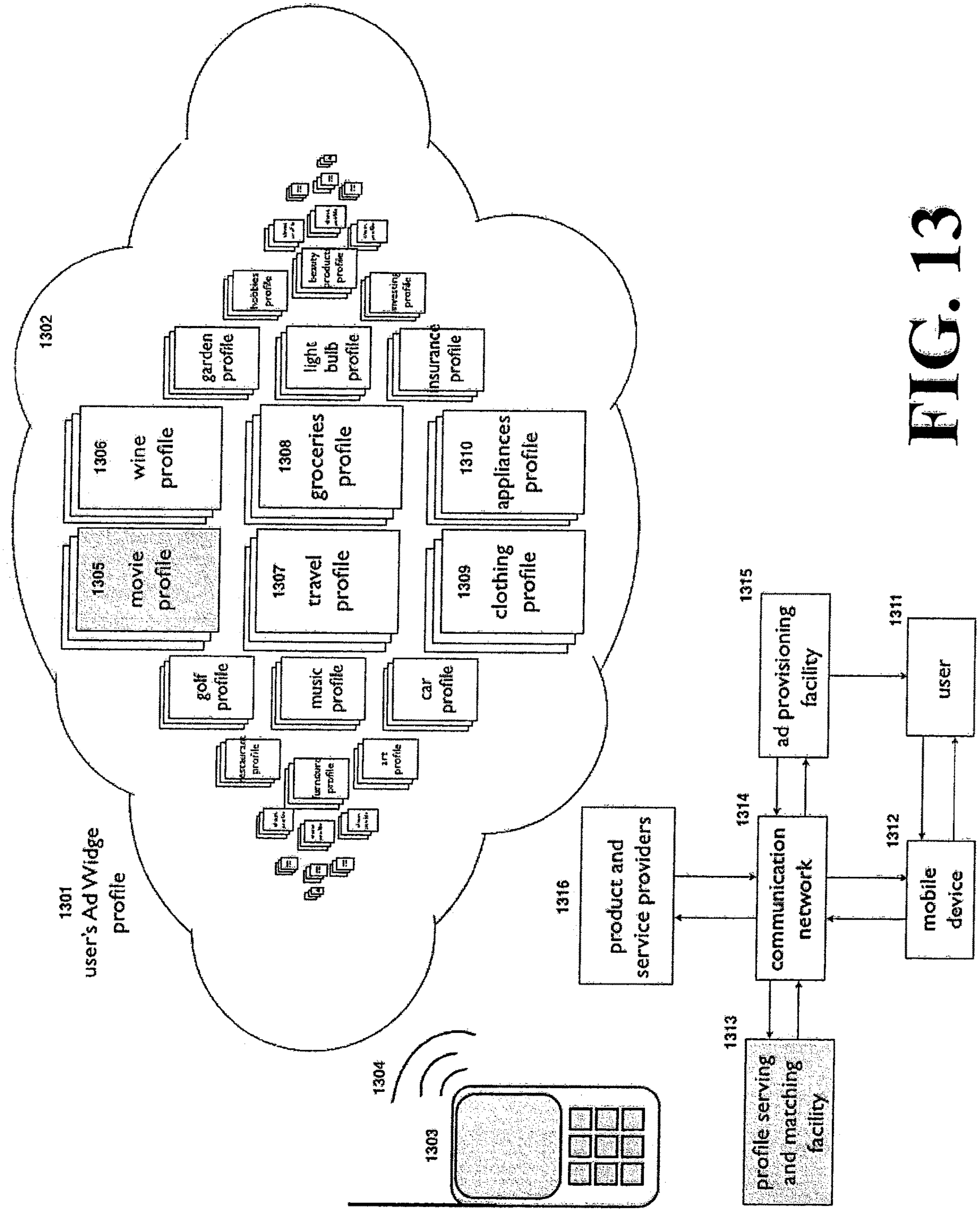
FIG. 13 is a functional block diagram illustrating a depiction of a user's advertising profile, and the constituent elements therein; in addition to a depiction of an embodiment of a simple schematic illustrating the functional relationships between the user and the product and service providers.

FIG. 13 is a functional block diagram illustrating a depiction of a user's advertising profile 1301, and the constituent elements therein 1302; in addition to a depiction of an embodiment of a simple schematic illustrating the functional relationships between the user 1311 and the product and service providers 1316 who wish to advertise 1315 to the user, and highlights the role that the Invention's client-side ad profile matching facility 1313 plays in the process; in this case via the user's mobile handset 1312.

Ad Widge is a real world ad platform. Life takes place in the real world, via, for instance, interaction with the real world objects a person actually utilizes in their life. To that end, the Ad Widge platform is accessible by devices such as mobile handsets 1303, which, pending a compelling blend of hardware/services, may emerge as the next primary computing platform, and represent the first computing platform which a user might have on their person during their every waking hour. A user's profiles can live on the user's devices, not just on the Internet or other servers. Thus, the Ad Widge client-side software, which resides on the user's digital device of choice, enables users to create profiles 1302 as well as broadcast (CloudCast) profiles 1304 therefrom. Such profiles may include things such as: Profiles of the items they want to buy; Profiles of the types of people they want to date; Profiles of their appliances, which at some point will inevitably need replacing/repair; Profiles of those items they are performing searches for; And so on. With the Mobi Platform, users interact with the profiles of others, objects, entities to get what they want/need, with far less time and effort.

In embodiments users CloudCast their Ad Widge profile 1304 directly from their mobile handset 1303 via means such as Bluetooth, or peer-to-peer via various means (such as infrared IrDA), wireless carrier network, or other means (such as via the Internet). Thus as the user moves about in their real life, they can be constantly adding to and updating the profiles 1302 vis a vis the things they utilize in their life, and thereby constantly benefit by this realtime profile. Via Ad Widge users essentially carry around their wants and needs (in the form of profiles), and have their wants and needs met, with far less effort than as per the conventional art.

Even if a user's profiles 1302 are created and hosted locally, for instance on a user's mobile handset 1312, users can also have their profiles stored and matched via (and broadcast from) a remote server (or other device) via the Internet 1314 (or other means). User profiles can even be stored and matched on a user's PC or TV (and broadcast therefrom via a plurality of communication modalities). Multi-nodal profile synchronization can be performed manually by the user or automatically by Ad Widge as per various rules 1024, 1025.

Companies (product and service providers 1316, including product manufacturers and retailers, as well as various ad/marketing entities) can view user profiles 1302 and make decisions manually, or companies can create and surface their own profiles, optionally utilizing Ad Widge, and have their profiles automatically matched in realtime 1313 with other entities/objects/people/companies/et. al. with whom they might want to share/exchange/deliver ads/offers/information/et. al. 1315. A user's profile 1301, is matched with profiles of various companies, entities, objects, et. al. 1316 and can receive information/ads/offers/et. al. from same. Ad Widge surfaces, for example, the user's movie profile 1305 to appropriate entities 1316, such as those entities that can supply the movie to this user. Appropriate entities may also, or alternatively, subscribe to a user's profile and thereby receive realtime or asynchronous updates for free or for a fee (as opposed to being notified manually by Ad Widge, or being notified manually of a profile match from a prospective customer for a product/service that entity provides). Appropriate entities may subscribe to a user's entire profile 1302, or just selected elements, such as a user's clothing profile 1309.

Other embodiments of various interaction modalities between ad senders and ad receivers pursuant to the principles of the Invention are also envisioned.

FIG. 14 is a flow diagram illustrating an embodiment of example process steps followed by advertisers 1405 as they first pay 1403 a user 1401 to view and review a user's profile 1301, to thereby determine if it's advantageous to pay 1404 to send the user ads 1412; and further consider paying additional monies 1404 for priority data placement 1413 (an unique variation on paid search, wherein the user is paid; as opposed to paying a middleman/search entity).

In embodiments, via Ad Widge, the user's profiles 1301 created as per FIG. 10, are made available to advertisers, who pay 1405 the user 1401 for the rights to examine and evaluate 1406 said profiles. Advertisers may pay the user a one time fee, for access to the user's profiles for a fixed amount of time, or may subscribe to the user's profiles as per a fixed or ongoing periodical fee structure. Based upon the profile information, advertisers then decide 1407 if it is advantageous to pay the user to send ads to said user. If not 1408, then advertisers may offer to send ads for free. Users may interact with advertisers directly or let Ad Widge negotiate 1411 on behalf of the user. In this case Ad Widge sets flag to ACCEPT for the subject ads if the user has set their preference profile MIN_CHARGE (minimum charge) to zero. If not the subject ads profile flag is set to REJECT.

In the case where the advertiser considers it advantageous to send this user ads, which sets a transaction flag to PROCEED, Ad Widge then presents the advertiser with the user's MIN_CHARGE fee. For any given profile, vis a vis setting the MIN_CHARGE, users may set the fee manually or let Ad Widge set the fee. Ad Widge may set the fee based upon a plurality of factors, including but not limited to comparing MIN_CHARGE fees for other users with a profile similar to the subject user, for the same or similar products (which may be derived by, among other means, matching product metadata tags).

At this point 1409, the advertiser is either willing or unwilling to meet the user's MIN_CHARGE. If so, the transaction flag is set to PROCEED, and the advertiser pays the user to send ads 1412. If not, the advertiser may negotiate 1410 with the user, via Ad Widge 1411, a lower price to PROCEED. Again, the user may either manually accept this lower price (in response to a query from Ad Widge) or allow Ad Widge to negotiate on behalf of the user, as per the above description. If no agreement on price is reached the transaction flag is set to STOP, and after providing both parties a receipt for the failed transaction, the transaction flag is set to END. The transaction receipt detail includes information regarding the profile in question, and the amounts one or both parties was willing to pay/accept for review of same, including the DIFF difference amount that caused the transaction to END.

For those situations where an ad-sending entity is offering an amount less than the user is willing to accept Ad Widge may negotiate 1411 on the user's behalf if the user has set a DIFF percentage, by which means Ad Widge may accept/reject a proposed profile review fee from an advertiser; for example, a user may set a MIN_CHARGE of X monetary units/credits, but set a DIFF percentage of 10%, enabling Ad Widge to accept a bid of 0.9X, or more, monetary units/credits. (Other embodiments are envisioned wherein Para-Sites negotiates on a user's behalf without necessarily setting a DIFF percentage).

Understanding that a user may receive several ads from several different ad-sending entities, an advertiser may wish to promote its ad to the top of the stack. In which case the advertiser pays the user a premium fee to the user for priority data placement 1413. The process for setting and agreeing to the priority data placement fee can be effected via a number of modalities consistent with the principles of the Invention, including an auction. In the case of an auction, in embodiments, Ad Widge presents each of the ad-sending entities a dataset, which details the order in which Ad Widge will be presenting the ads to the user. Ad Widge informs the ad-sending entities that Ad Widge is accepting bids, consisting of additional monetary units/credits, for top priority vis a vis the ordered list detailing the order in which Ad Widge will present the ads to the user. After receiving all the bids (for which a TIME_LIMIT may be set), Ad Widge re-sets the priority order in which the ads are presented to the user according the #1 position to the highest bidder, the #2 position to the second highest bidder, and so on. Equal bid amounts are ordered as per various factors including according higher priority to bids received before other bids.

In embodiments, if and when a fee amount is accepted both by parties, for any of the above described or other cases, payment is effected by the payment facility 1022, 1403, 1404, with Ad Widge 1402 receiving a portion of the monies/credits. (Ad Widge only gets paid, when users get paid). Payments start at zero. Only when a user proves to the satisfaction of the ad-sending entity, does the user 1401 receive a non-zero payment amount.

Figure 15:
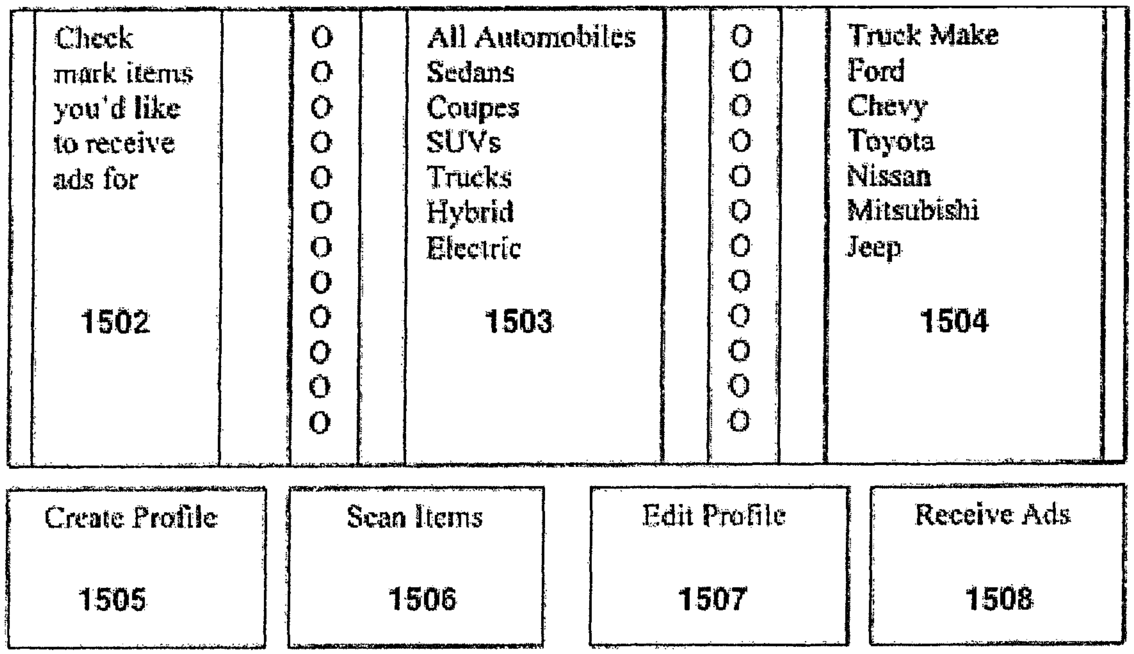
FIG. 15 is an illustrative example of an embodiment of the profile creation process depicting one of a plurality of profile creation and management user interface screens; in this case, manual profile creation via checklists or barcode scanning (as opposed to the Invention's automatic profile creation facilities).

FIG. 15 is an illustrative example of an embodiment of the profile creation process depicting one of a plurality of profile creation and management user interface screens 1501; in this case, manual profile creation via checklists 1502 or barcode scanning 1506 (as opposed to the Invention's automatic profile creation facilities).

Users can opt to manually create a profile 1505 of those items 1503, 1504 they would like to receive ads for 1508. Alternatively users can use barcode/RFID scanning 1506, or a plurality of other means to have any items, including the items they purchase every day, or have in their home, or see in other ads, etc. manually or automatically added to their Ad Widge profile 1016.

In embodiments manually adding an item to a user's profile 1008 may also be effected by downloading the data tile (Tilz) for a product from the Internet 1005, then dragging that data tile into the appropriate profile on the Ad Widge 1014 software screen. Alternatively, automatic additions to a user's profile may be effected by means such as a digital video recorder (DVR) or set top box that is able to send the data tile (Tilz) for a television program to the user's profile broadcast (ComCloud) 1027, when the user finishes watching said program.

Once a profile is created a user may also manually edit the profile 1507, in order to effect changes thereto.

Figure 16:
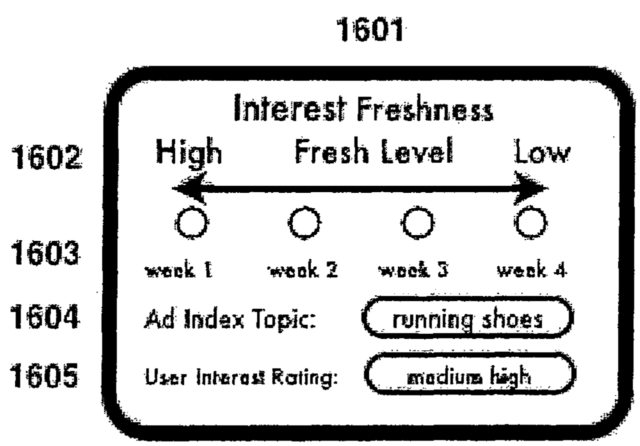
FIG. 16 is a depiction of an embodiment of an example user interface screen, wherein the value of information in a profile is measured (among other factors) by how current, how fresh, the information is.

FIG. 16 is a depiction of an embodiment of an example user interface screen 1601, wherein the value of information in a profile is measured (among other factors) by how current, how fresh 1602, the information is.

For example, a user who is interested in buying a new pair of running shoes 1604, scans the barcode of a pair in a store. The data tile (Tilz) is added to the users clothing profile 1309. Ad Widge notes the date, for instance, that the Tilz was added to the clothing profile. When advertisers later view and evaluate a user's clothing profile, they can thereby take into account how recently a user indicated an interest in running shoes, when deciding if to send the user ads, and additionally how much to pay a user to effect same. Generally speaking, advertisers want to strike while the iron is hot, and thus might accord the greatest value to a profile Tilz that was just added, under the assumption that the user is currently actively interested in (this case) buying running shoes. By contrast, if a user indicated an interest in buying running shoes six months ago, advertisers might be less interested in paying the user very much money, as they might assume the user has lost interest in buying same. To that end, in embodiments the Ad Widge user interface screen 1601, includes a "freshness" indicator 1602, indicating for each Tilz how long ago that Tilz was added to the subject profile. The freshness indicator 1602 may include a plurality of user selectable time units 1603 including: seconds, minutes, hours, days, weeks, months, years, etc.

User, however, can manually set their interest level 1605, despite for instance, a long product search. For example, if a user is interested in buying running shoes, but is a picky shopper, that user might still be actively interested in buying running shoes, even if, according to the freshness indicator 1602, the Tilz was added months ago. In that case, the user can indicate to potential advertisers (including shoe providing entities) that the user's interest in purchasing shoes is still "medium high" 1605. Thus ad sending entities may more interested than they otherwise would be, knowing now the user is still actively shoe shopping.

In cases where a particular item could logically be included in one or more different profiles or ad index topics 1604, the user can manually add, Ad Widge can suggest, and/or the Tilz metadata can already include (or later be remotely updated with) tags which inform inclusion in, or exclusion from, other profiles. In this case, the running shoe Tilz might also be included in the user's sports equipment, running, and/or shoes profiles. Tilz function in this regard, as a relational database, which dramatically increases the usability and value to various parties of Ad Widge profiles.

Figure 17:
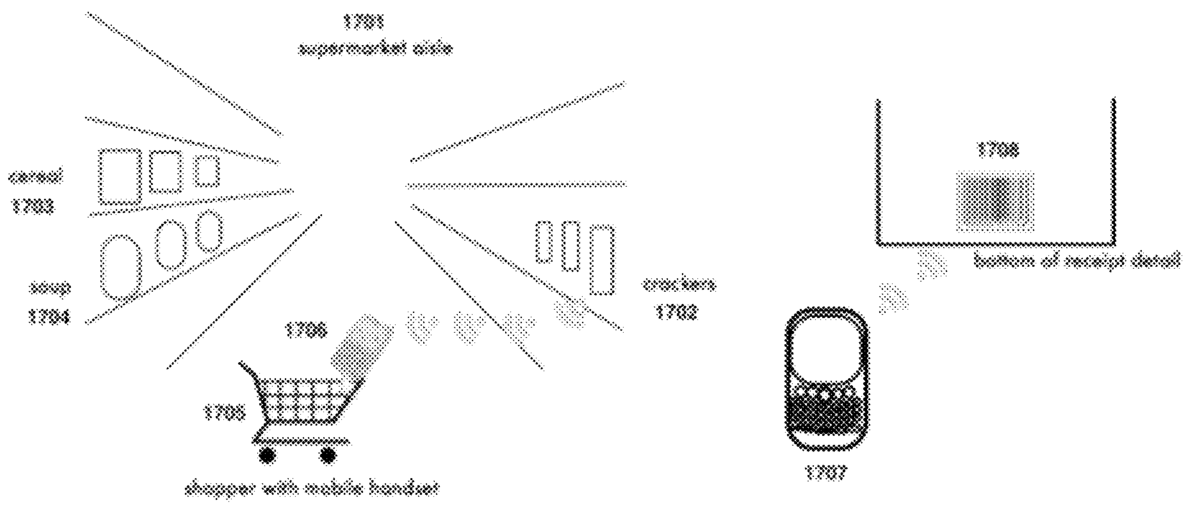
FIG. 17 is a diagram illustrating an embodiment of an example wherein products are interacting with the user (via the use of RFID); as per the user's profile the Invention is allowing the crackers to send the user information, but not allowing information from the soup or cereal. Additionally, the diagram illustrates an embodiment of an example of how scanning the grocery receipt can, if the user wishes, automatically add those items from that purchase to the user's ad profile.

FIG. 17 is a diagram illustrating an embodiment of an example wherein products 1702, 1703, 1704 are interacting with the user 1705 (via the use of RFID); as per the user's profile, Ad Widge is allowing the crackers 1702 to send the user information, but not allowing information from the cereal 1703 or soup 1704. Additionally, the diagram illustrates an embodiment of an example of how scanning 1707 the grocery receipt 1708 can, if the user wishes, automatically add those items from that purchase to the user's ad profile.

One of the advertising trends that the Invention enables is, in embodiments, for products 1702, 1703, 1704 to start to interact with shoppers 1705. The average supermarket 1701 in America carries 45,000 items. It would be cacophonous, if thousands of items interacted with a user, as the user walked into/through the store. Instead, users profit from Ad Widge's shield function—a shield against information overload. Each product on a shelf 1702, 1703, 1704 in a store 1701 has some measure of information about that product available in a plurality of locations, often including Websites. Thus there are profiles of each item available somewhere, that the user can benefit from when entering and/or moving about in, for example, a store.

In embodiments such profiles can be "sent" to the user's mobile (or other digital) device as follows: the shelf end-cap under each group of like items has an RFID tag affixed. The RFID tag is encoded with the Internet Protocol (IP) address where more information about that item is located. When a user with a mobile handset 1706 featuring an RFID facility walks near an end cap, the RFID facility can interrogate the RFID tag, and when the IP address is returned, point a browser to that location, and thereby download, in realtime, a data tile (Tilz) about that item. In embodiments Ad Widge then presents such Tilz in a unique way, by ghosting the Tilz onto the user's mobile device (in such a manner that the opacity of the Tilz is set to a percentage, say 50%) such that the user can see through the Tilz. If the user has a mobile handset with a camera facility, then the user can turn the camera facility on, hold the mobile handset up in the air in front of the user, in such a manner that the user can see the Tilz for various objects appear in realtime, as the user pans across various items on the shelf, which the user can see in the background behind the ghosted-in Tilz.

That Tilz is the profile of that item. The profile may include, but not be limited to, such information as price (which via Ad Widge can be customized and different for different users, as per each user's Ad Widge profile), nutrition information (calories, fat grams, etc.), ingredients list (including whether such ingredients are consistent with the diet service the user is a member of, and/or is kosher, and/or vegan, etc.), et. al. Thereby for a user who is on, for instance, a low sodium diet, Ad Widge could alert the user to items that match the user's low sodium diet profile. And further, in embodiments, Ad Widge then deliver ads/offers/information/et. al. 1019 to the user, in realtime, if the user's Ad Widge preference profile 1016 indicates such interaction is desirable, and even purchase the item 1021, 1022, on the spot, via mobile device.

Those skilled in the art may appreciate that there are a plurality of alternative embodiments and modalities to those described herein that achieve essentially the same or similar data retrieval and profile matching, in a manner consistent with the principles of the Invention (i.e. in embodiments, everything has a profile, profiles are matched, and thereby more intelligent interactions and transactions are facilitated).

In embodiments, once a user has completed their (intelligent) shopping, the user scans the barcode on the bottom of their receipt 1708, and thereby receives an individual Tilz for each items they purchased. With Ad Widge, users can receive and manage all their Tilz right on their mobile device 1707 (local Tilz; unlike a Website, which is a remote data source that generally requires a network connection to access and utilize). All the Tilz collectively can, for instance, be added to the user's Groceries profile 1308; and individual Tilz added to other more focused profiles, such as Junk Food, Camping Trip Food, etc. or even added to a profile the user might wish their doctor to view, such as the user's Health profile, which might include all the food items a user consumes over a given period of time. Ad Widge enables a user's doctor or insurance company or other person/entity/ machine to subscribe to the one or more of a user's profiles (as per the user's preferences/permissions regarding same 1016, 1024).

In embodiments, users automatically receive the Tilz for the items they purchase (without need to scan a physical receipt) when transactions are performed electronically 1021, say via mobile handset 1707, which delivers a Tilz as the digital receipt. The digital receipt includes an individual Tilz for each item the user purchased.

Figure 18:
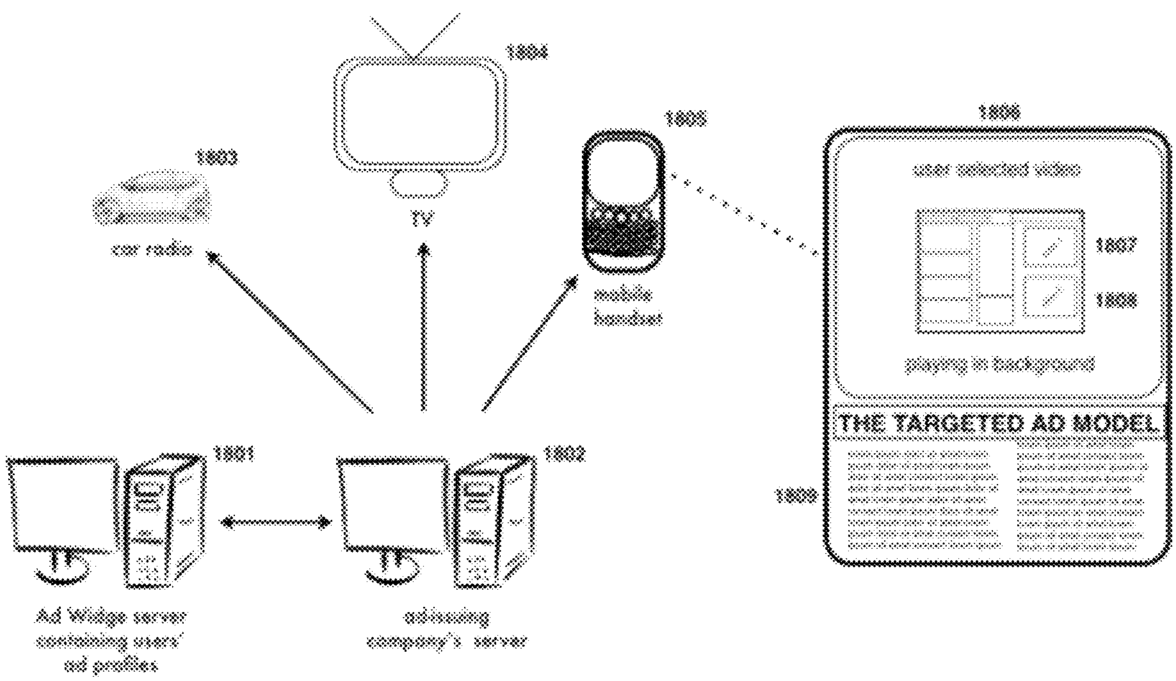
FIG. 18 is a block diagram illustrating an embodiment of an example architecture wherein a user's ad profile informs how, when and where a user would like to receive ads, in addition to which ads to receive.

FIG. 18 is a block diagram illustrating an embodiment of an example architecture wherein a user's ad profile 1801 informs how, when and where 1803, 1804, 1805 a user would like to receive ads, in addition to which ads to receive 1802.

In embodiments a user's Ad Widge profiles are stored remotely on servers 1801, which ad-issuing entities 1802 can access via various means including the Internet. Thusly fortified by the data contained in the user's profiles, ad-issuing entities can send ads to users, as per the user's profiles which contain preferences (among others) as to how, when and where the user would like to receive said ads. For example, a user might wish to receive work/business-related ads, between 6 PM and 6:30 PM, Monday through Friday, on the car radio 1803, while driving home from work; Ads related to household items on the user's TV 1804 from 7-9 PM on weeknights.; And all other ads directly on the user's mobile handset 1805.

In other embodiments, users will carry their Ad Widge profile Tilz around with them, literally on their mobile handset. In this case, ad-sending entities may obtain and review the user's profile, via interaction with the user's mobile handset 1805 (and therefore, not necessarily via a remote server 1801 that also hosts the user's profiles). The ad-sending entity 1802 may send the ad, which is sent to the user in the form of a Tilz, directly to the user's mobile handset 1805. The user may wish to view the ad via the user's mobile handset or stream it from the user's handset to the user's car radio 1803 or TV 1804. In embodiments, Ad Widge facilitates same as follows: the ad-issuing entity 1802 sends the ad to the user's mobile handset 1805 in the form of a Tilz. As the user is driving home, the radio broadcast includes notification signals in the metadata broadcast alerting appropriate devices, such as the user's mobile handset 1805 that a commercial break is coming up, and if the user's ad serving facility 1019 (Ad Widge) has any ads to insert, indicate to this station now (so the regularly scheduled commercial can be muted) and stream them from the mobile handset 1805 via Bluetooth in 5, 4, 3, 2, 1 seconds BEGIN_USERAD.

In a situation where a content provider is serving ad-supported content, the content provider's ad server 1802 first checks with the user's Ad Widge profile 1801, before ads for products or services being shown in a video, TV program, movie, Website 1806, etc. are served to the screen. In embodiments, the ad will be streamed from the user's mobile handset 1805 to the user's PC 1809 which is displaying the Website 1806 where the video is playing. Users may be presented with a choice of ads 1807 or 1808. Based upon the user's selection, the user's Ad Widge profile may be updated locally on the user's mobile handset 1805 (if within, say, Bluetooth distance of the PC 1809), or remotely via the Internet to the Ad Widge servers 1801 containing the user's profiles.

Those skilled in the art may appreciate that a user may utilize other digital devices that are similar to or different from a mobile handset, featuring wireless carrier service or not; Such devices are consistent with the principles of the Invention, and are thusly encompassed herein by inference.

Figure 19:
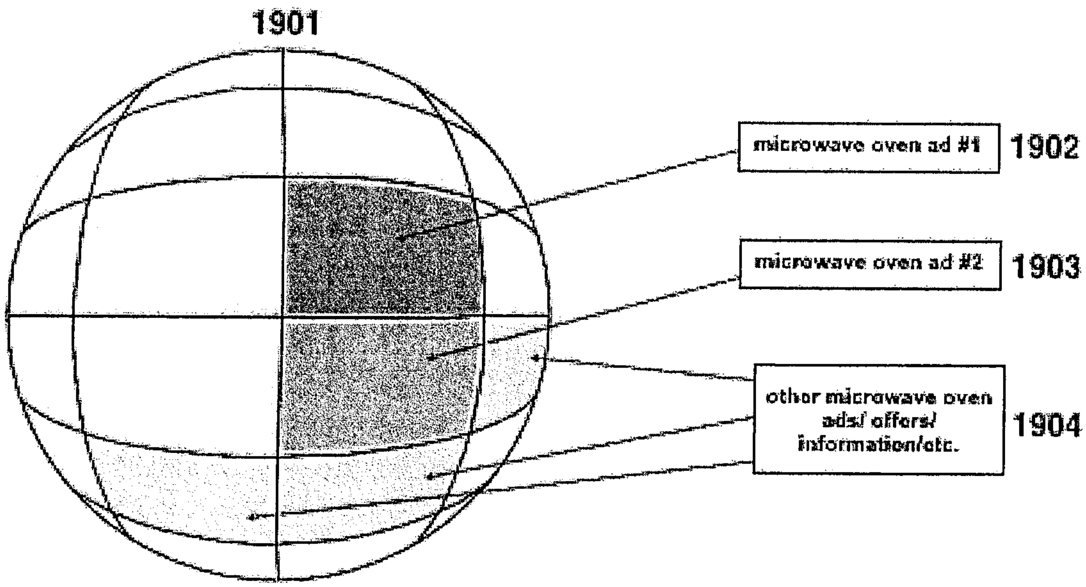
FIG. 19 is a depiction of an embodiment of an example of an unique ad management facility, a Spherez, wherein ads/offers/info/et. al. a user receives are received in thumbnail tiles that are mapped onto (in this case) a sphere; whereupon the sphere information management facility attracts like content to it, for which the user may be paid directly by the ad sender, for prominent placement on the user's topic-specific sphere.

FIG. 19 is a depiction of an embodiment of an example of an unique ad management facility, wherein ads/offers/information/et. al. 1902, 1903, 1904, a user receives are received in thumbnail tiles (Tilz) that are mapped onto (in this case) a sphere 1901; whereupon the sphere information management facility (hereafter "Spherez") attracts like content to it, for which the user may be paid directly by the ad-sending entity, for prominent placement on the user's topic-specific sphere (Spherez) 1901.

When users receive ads on their mobile device they can be viewed using several different information display and navigation facilities such as Spherez (multi-faceted spheres onto which Tilz are mapped). And if the user chooses, when they receive an ad for Tide detergent, they can allow competitors to send an ad for a similar product. These competing ads appear clustered closely to the original Tide ad Tilz on the Spherez. Users can then click on the Tilz of the ad they wish to view and it will be delivered to the device of their choice: mobile device, TV computer, car radio, etc. Users get paid to receive competing ads. This is also why the Tilz construct is so important—its an object for advertisers to target. If a user who is in the market for tires, has been doing research on tires (various search Tilz are now on her Imminent Purchase Spherez), then she could easily get paid $5 or more by competing tire companies who can see the relevant data about this user as it pertains to her car (how many tires the user needs at this time, what size, what make/model/year of car, any modifications to the vehicle, etc.). Further, the user may then start to get paid to receive solicitations from local tire shops to sell or install the desired tires (say Bridgestone). And once the user has made an actual appointment as represented by an appointment Tilz that user might receive $10 or possibly $25 from competing tire companies to switch her upcoming order to their brand. It's the holy grail of advertising—a user who is literally in the act of making a purchase. How much a user continues to get paid depends upon that user's conversion rations. Conversion ratios are how often a user follows through on their purchase. Conversion ratios also matter via a vis the amount advertisers will pay that user.

It may be appreciated by those skilled in the art, that fields such as search are becoming inextricably linked to advertising, and thus embodiments that relate to search/advertising warrant exploration.

With Ad Widge users can, for the first time, actually actively manage their ads 1902, 1903, 1904. And with Ad Widge Spherez, ads achieve a unique level of capability and usability—thus making ads far more valuable to users—literally making users lives better. For example, if a user's microwave oven is 10 years old, and needs replacing, the user, in embodiments, scans the barcode/RFID of their microwave oven to receive the data tile 1902 (Tilz) on their mobile handset. The received Tilz is mapped onto an information navigation facility called a Spherez 1901, which appears on the user's mobile handset screen. Spherez 1901 enable users to manage the ads/offers/information/et. al. they receive.

As per the conventional art, a user who needed to replace their microwave oven would most likely sit down at their PC, and utilize a search engine to seek out information about microwave ovens. In fact, as per the conventional art, users often have to become a mini-expert when they need to accomplish something: find a reliable plumber to fix the leaking kitchen sink, figure out how to increase their child's chances of getting into the desired nursery school, or in this case, find a replacement for their aging microwave oven. As per the conventional art a user is likely to take a significant deal of time, trying to learn about microwave ovens: what's new since the user last purchased a microwave?; which manufacturer's are reliable?; should the user purchase the microwave online or at a local store near the user? (taking into account such issues such as product returns and repairs).

And as step #1, which ovens are right for me? As per the conventional art, a user would likely have to try to locate a tape measure, then go into their kitchen attempt to measure the dimensions of the opening of their cabinetry in which their current microwave resides. At which point the user realizes the microwave also provides the cooktop ventilation. The user is probably scribbling down all this information on a piece of paper, which they have to take back to their PC utilize as the starting point for a long and rambling search for suitable replacement microwaves.

During the conventional art search process (which is funded by the appurtenant advertising, such as paid search), the user's time is being expended, and monies are being made by the search provider. Monies paid to search providers increase the costs of goods. Product makers build their marketing/advertising costs into the price of their products. Therefore every dollar that goes into a search engine's pocket is ultimately a dollar taken out of a user's pocket.

With Ad Widge other entities take their time supplying information to the user, and it is the user who gets paid.

The Tilz 1902 for the user's microwave oven, contains the profile for the user's microwave oven. With Ad Widge users don't have to become a mini-expert for all the problems they need to solve during the course of their regular life. With Ad Widge, the user doesn't have to research the dimensions of their microwave, or try to discover the power requirements, or if it is a combination microwave/cooktop vent model. The user doesn't need to know any such details. In embodiments the user, via Ad Widge, simply indicates that their microwave oven needs replacement and drags the Tilz for their old microwave oven from the blocked ads (REJECT) profile, to the seeking ads (ACCEPT) profile. And, in embodiments, within seconds, two things happen: the user starts receiving profile-informed ads/information, and the user gets paid to receive same.

Only those entities which manufacture microwaves that fit the proper dimensions, and include required functionality (such a cooktop venting) send ad Tilz or offer Tilz or information Tilz to the user. And only those bricks and mortar stores near the user send the user ads, hoping to convince the user to purchase the microwave at their store.

If a manufacturer made a microwave oven that did not include the cooktop venting function (and thus would not meet the user's needs) were to send the user an ad or information Tilz, it would be a waste of that company's time and money (as the user won't be buying their product) thus they are automatically disincentivized from bombarding the user with ads.

In response to the newly flagged ACCEPT condition regarding microwave ovens in the user's Ad Widge profile, the user may start to receive additional ads/offers/information/et. al. 1903, 1904 presently. The Spherez maps these Tilz onto the sphere in such a way as to site the most closely matched responses as close as possible to the key position 1902 on the Spherez—currently occupied by the Tilz 1902 for the user's current microwave. Ad Widge's profile matching algorithm facilities 1015 compare the profile of the incoming Tilz to the user's current microwave and place the best matches 1903, 1904 as close as possible to the key Tilz for the user's microwave 1902.

Alternatively if the user's Ad Widge profile allows, ad-sending entities can pay the user for premium data placement 1413 on the Spherez 1901 (a variation on paid search advertising wherein the users get paid, as opposed to the search engine middlemen as per the conventional art).

Several other aspects of the Ad Widge information navigation modalities are worth noting. First, Spherez is just one of an essentially limitless number of possible embodiments for ads/offers/information/et. al. presentation. Instead of spheres they can be cubes, or any shape the user desires. Third parties can build other Ad Widge information navigation modalities (templates) for anyone to use, either for free or for a fee.

Spherez are a convenient navigation modality for the smaller screen size of the mobile handset (and work well with a touchscreen wherein the user can navigate the Spherez by flicking with their finger which causes the Spherez to spin, and thereby reveal the desired Tilz). Users on a mobile handset may prefer a handful of relevant search results (as per Ad Widge), to a million blue links (as per conventional search engines).

Spherez attract like content—which revolutionizes search. With a conventional search engine, a search is performed, but the search results are generally not saved. So any given user may do the same search over and over again. With Spherez search results are saved—the ads/offers/information/et. al. a user receives related to a given topic are each maintained on separate profile-based Spherez (that the user can keep indefinitely). FIG. 19 illustrates the user's microwave oven Spherez. Ad Widge creates Spherez for each of a user's profiles. For example, a user whose hobby is comic book collecting may have a Comic Book Spherez, which stores current information (Tilz) the user already has, and continues to attract new information, such as upcoming comic book conventions, and offers from comic book sellers. Spherez are "living" entities. That is to say, they continue to function in the background, attracting like content. In the case of the user's microwave oven Spherez 1901, it might continue to attract like content, such as ads about microwavable cookware, or microwave recipes, or information about sterilizing a baby's bottle using the microwave, etc. However, each user's Spherez only attracts content as per that user's profile. Thus each user's Spherez are different, even if they are about the same topic—such as microwave ovens. If a user doesn't have a baby, that user likely won't receive the baby bottle sterilization Tilz. User's profiles inform inbound messaging.

With Ad Widge, search is no longer a process that puts all the burden on the user, instead search becomes something that happens automatically, and continuously, and minimizes the amount of time a user has to invest in the process. Ad Widge respects the user experience. Conventional search does not. With conventional search, the search engine makes money off users; wherein Ad Widge makes money with users.

Conventional search also fails users in other ways. Consider the case of two users in Paris, each one trying to figure out where to go for dinner. As per the conventional art, they each avail themselves of a search engine, and type in "Paris restaurants." The search engine, returns the same results for both users. There are billions of users on earth, each of whom are different, yet conventional art search engines return the same results for all users. One-size-fits-all search/advertising is a woefully inadequate solution.

Consider the additional case information that one person is a student backpacking through Europe and the other person is the CEO of a large company. Chances are the student wants to pay very little for dinner, while the CEO might be willing to pay quite a lot. Search engines should deliver different results for different people. Yet don't.

Ads are information that inform purchase decisions. The two Paris users need information to inform their restaurant choice.

Utilizing Ad Widge is a far more effective way of informing their restaurant choice. In embodiments, Ad Widge sets their Restaurant profiles to ACCEPT and updates the user's location information 1206. Each user's restaurant profile consists of a Tilz for each restaurant they've already been to, thus Paris restaurants can make an informed decision as to whether the student's or CEO's restaurant tastes are such that they are a possible match. And if so, those restaurants send the particular user their ad Tilz, and potentially pay the user to receive such information 1903, 1904.

In embodiments Ad Widge blurs some aspects of the line between search and advertising. Ad Widge delivers more relevant information to users; in this case delivering differing and highly relevant sets of ads/offers/information/et. al. based upon each user's profile; whereas conventional art search engines treat every single user on earth, as if they all had the same profile. Profile-based search/advertising, as per the present Invention, obsoletes the conventional art.

Embodiments are virtually endless, and compelling, and unique, and revolutionize aspects of search, marketing, advertising, and merchandising.

These and other objects and features of the present Invention may become more fully apparent from the following description and appended claims, or may be learned by the description and practice of the Invention as set forth hereinafter.

The Invention description makes reference to barcode/RFID scanners on mobile handsets, however the same or similar information may be acquired by other means and/or modalities such as sourcing information via a Website, and/or by utilizing devices other than mobile handsets, consistent with the principles of the Invention, and therefore alternative means, modalities and devices are included herein by inference.

The Invention consists primarily, though not exclusively, of a Website, server software, and a widget (Webified mini-software application) that together facilitate a novel method for delivering and receiving advertising. Via the Website (easily accessible and usable via mobile handset) or widget, users create an account. Users then create a profile of items (or types of items) they would like to see ads for. Advertisers receive permission from the users for the right to both view the user's ad profile and send ads to the user as per the user's ad solicitation profile. Advertisers then deliver ads to all the users who indicated a desire to receive an ad for that specific product or service.

Misc.

In embodiments the Ad Widge site is pre-populated with a list of various types of businesses, service providers, etc. similar to those in phonebooks, which may aid the user in building a list of specific entities or classes of entities from which the user may want to receive ads. In embodiments the user then creates a profile listing the items they may want ads for, including via means such as scanning the product barcodes/RFID of everyday items they use.

In embodiments when the Ad Widge widget is active on a user's mobile handset, and the user is scanning a barcode, a query bubble (Tilz) pops up and asks: "Start Coupons for this Item, Stop Coupons for this Item, or Sorting Bin" If the user selects the Sorting Bin, the item is stored in a general folder that the user can come back to later and sort into the correct coupon profile later (or have an automatic sorting facility accomplish the same (automatically)).

Once the user has established an Ad Profile, the user can receive ads sent via the Internet or other means such as WiFi or Bluetooth. For example, let's say a user has added Gyms and Coffee Shops to their Ad Profile. While walking down the street with the Ad Widge widget active on their mobile handset, the user can receive ads according to their Ad Profile:

Solicit, Send, and Receive Ads

A user's Ad Profile can be synced with the user's other profiles such as Regularly Purchased Items, Gift Registry List, Recreation List or Entertainment List (which may include items such as the restaurants, etc. frequently used by that user). Once the user's Ad Profile is established Ad Widge solicits ads from all service/product suppliers and other entities that match the user's preference profile.

Ad-sending entities can then provision ads. The Ad Widge Website comes pre-populated with templates enabling users to create digital ads. Ad Widge also encourages third parties to upload digital ad templates which they can offer for free or for a fee. Ad senders pay users for the right to send ads as per the preferences of the user.

Users can receive ads on their mobile handsets (or any digital device of their choice). If the user has solicited and received offers, they are ready to redeem them. Ad Widge offers can be redeemed in person, by using a mobile handset to display and redeem the offer at suitably equipped POS (point of sale) stations. Offers may also be redeemed via mobile payment transaction using a unique ID number for each offer.

In embodiments the Ad Widge digital, user-solicited offer redemption process is executed in three primary steps:

1) Upon presentation of the digital offer, the shopper receives an immediate discount for the amount of the offer utilized in the transaction;

2) The retailer electronically presents the digital offer to the offer issuer for payment; and 3) Once the offer issuer pays the retailer the offer face amount (at specified intervals which could be daily, weekly, monthly, etc.) plus a small incentive fee, the shopper may receive an incentive such as a payment for utilizing the offer.

All three parties can be paid simultaneously for all-digital transactions (though in some cases offer issuers will ask that retailers present aggregated audited bundles of offers for payment). The offer issuer may induce retailers to use digital offers by offering a larger incentive fee for using digital (non-paper) offers.

Detailed Ad Widge Process

On a Website (easily accessible and utilized, for instance, via mobile handset) users sign up. Users then create an ad profile of items (or types of items) they would like to see coupons for.

Ad issuers pay for the right to both view the recipient's ad profile and send ads to the recipient as per the recipient's ad solicitation profile.

Ad issuers deliver ads to all the recipients who indicated a desire to receive a ad for that specific product or service.

Ads can be delivered where and how the user selects: such as to social networking sites, online videos, within video games, to mobile handsets or PCs or TVs, and via email, text message or postal mail (or other means). Wireless Internet networks (such as WiFi) enable ads targeted to specific geographic locations. GPS-enabled mobile handsets enable ads targeted to even more specific locations.

Users can also change ad receiving venues (for example: stop sending this type of ad to my mobile handset, and instead send it via postal mail).

Ads are also delivered in a format according to the users' preferences profile: ads alone, ads delivered within ads, detailed information on the ad, just basic information, etc. Also users can control when ads are delivered, especially in the case where users choose to receive ads on their mobile handset. Users may not want ads arriving during their work hours, so they can choose to schedule to receive them, say, only from 6-8 PM at night and perhaps during their lunch hour.

The Ad Widge Website also maintains a history, at the user's option, of all past ads/offers received. A user's Ad Widge can store a plurality of ads/offers and make use of them while shopping anywhere in the world.

Ad Widge automatically moves expired ads/offers into an Expired Ads/Offers folder. Users can make public or share with other users their Ad Profile of ads sought. Users can choose to view ads in the Website white spaces that result from the use of ad blocking software.

In embodiments Ad Widge ads have an IP barcode enabling instant purchase of the item via mobile handset—for which the user may be given a discount or paid a rebate.

Ad Profile

Users set up a profile indicating the type of items they'd like to receive ads for, and what format (which can differ for each item) they'd like their ads to be: email, text messages (SMS), videos (MMS), TV/radio ads, or postal mail delivered to their home/office. A user's profile also details how they'd like the information to be presented to them: high level only, intangible benefits, or technical details, or comparison to competitors, etc.

Users can create their own profiles, either explicitly or implicitly. Explicitly: via filling out their ad profile on the Ad Widge Website or on the user's mobile handset. Implicitly: via means such as barcode/RFID scanning with their mobile handset. Barcode/RFID scanning can, at the user's option, track a user's actual shopping habits. In addition users can scan barcodes of items they are just browsing, but not buying, in offline stores (which enables Ad Widge to collect data about offline activities not included by today's digital search or advertising tools). Ad Widge also tracks tag-related search (uTag) results to add a user's online browsing habits to their profile as well. Such barcode scanning can also track where users eat (restaurants) and recreate (sporting events attended, etc.), what users read (which books users read or own or borrow from the library), and where users vacation (hotels, airlines, etc.). Ad Widge can track, and add to a user's profile, those items on Websites or in TV ads a user requests more information about.

In embodiments users can elect to let Ad Widge automatically create the user's ad profile based upon the user's barcode/RFID scanning habits. A user's ad profile can be automatically created via the use of barcode/RFID scanners on mobile handsets to mark those items users are interested in. By scanning those items a user regularly encounters in the user's daily life (such as food items, household items such as light bulbs, DVDs purchases, etc.) it is very simple to build and manage the list of items for which users want to receive ads for. At the user's choice, Ad Widge can monitor which items a user barcode/RFID scans and suggest ads that might be of interest.

The product/service Ad Index List is pre-populated by Ad Widge but can be added to and maintained by users and product/service vendors who want to make sure their ads can be found.

Many of the offline, real-life items/products/objects in a user's life have a barcode/RFID that can be scanned. In embodiments, only those items that the user chooses to scan and wants to receive information on will be fed to the Invention which then automatically updates the user's ad profile. The user may also manually edit the ad profile created by the Ad Widge software.

Users can create an ad profile to indicate which items they'd like to receive ads for, and which items they don't want to receive ads for (as well as items that they are neutral towards receiving ads for). In embodiments, Ad Widge features a list of items, with radio buttons next to each item for the user to click: Want Ads, Don't Want Ads, or Neutral. For example: if a user has enough credit cards, the user can indicate that they Don't Want any credit card ads/offers.

Ad Widge users may utilize a new type of reverse electronic "cookies" (hereafter My Cookiez)—a token or short packet of data passed between communicating programs—to send ad profile information to TV's, radios, other devices, and for various forms of online and offline activity. For example, when a user is on a Website, the Invention can automatically send that user's cookies (My Cookiez) to that Website's servers (or directly to the company serving the advertising on that Website) to transmit the user's ad profile, so the Website can deliver user-solicited ads to the user.

Ad Topic List

For each category list topic Ad Widge collects (links to) ads related to that topic. When advertisers create an ad they also include metadata for the ad that includes category tags/keywords. Once the ad (with metadata tags) has been created and placed online the Ad Widge (uTag tag-based) search engine crawls to find tagged ads and delivers them to the Ad Widge Ad Topic profile.

Let's say a user wanted to see ads for a delivery pizza parlors, the user scrolls down to pizza in the Ad Categories list in Ad Widge. Ad Widge collects ads (based on tag keywords) from various pizza parlors and present the results in a manner described below. The user clicks on the data tile (Tilz) featuring the pizza parlor they would like to see ads for.

Contextual Ads

Users can also set their ad profile to allow them to receive ads for things not specifically listed in their ad wish profile. So for instance while watching a sporting event on TV (or Website or mobile handset or other or listening via digital radio or other) they could receive sports related ads (advertising upcoming sporting events, sports memorabilia, etc.), but not solicitations for, say, refinancing a mortgage.

Blended Ads

Users can choose to allow or disallow blended ads. For example the following radio ad: Expression College of Digital Arts (San Francisco) presents an Expression Session with the band Silver Sun Pickups. Users who are into live music might allow such a blended ad for this concert (which also advertises this local college).

Pop-in Ads

Ads that pop into, say, the TV picture during the show or are sent to the user's mobile device instead. For example, a user is watching a show where the cast members are in a beautiful hotel, and the user wants to find out more information about that hotel. The user, via IP-based barcodes (Net Dotz), can request the Tilz for that hotel with the user's mobile handset (Mobi), and thereby receive a custom Tilz for that hotel (with information customized as per the profile of each viewer who receives the hotel Tilz). Users can click through the Tilz for a map that locates the hotel; to reviews from travel enthusiasts with profiles similar to the user's;

discounts/offers/promotions for the hotel; automatic reminder whenever the user's mobile device (Mobi) is within, say, 50 miles of the hotel; or when the user's travel itinerary indicates the user will be within 50 miles of the hotel. Pop-in ads appear as per the user's Ad Widge profile. So for instance, for a user who is watching a TV show, pop-in ads could contain information about things such as the couch the cast are sitting on, or the restaurant they're eating in, or the wine they just ordered, or the clothes they are wearing, etc. etc. The ads are send to the user's mobile device (Mobi) during the show and thus won't interfere with the viewing experience of others in the room. And the user gets paid to receive these ads. The user can keep the ad on their mobile device (Mobi) and it will be updated with the latest information on the hotel (room or spa pricing and specials, events held there, etc.); updated whenever the user's mobile device (Mobi) is connected to the Internet, or, and this is a unique Mobi feature, when it finds a more updated Tilz for that hotel on another person's digital device, which can then automatically update the user's Tilz via, say, Bluetooth.

Interest Categories

Users can also set their ad profile to allow ads anytime, anywhere (TV, Website, digital radio) that meet the user's interest categories. For instance, movie buffs could specify in their profile that they are always open to seeing the latest movie trailers, no matter if the Website they happen to be visiting has anything to do with movies or not (meaning non-contextual ads are OK if they meet the user's specified Interest Categories.) And users can even set specifics within an interest category. For example, only horror film trailers, or just comedy movies, or actions movies, or anything with Halle Berry in it, or romantic comedies, or any movie trailers except for foreign films with subtitles.

Behavioral Ads

Users can choose to receive ads based upon the behavior of others with similar profiles, who solicited certain ads. Such a profile might be: attends sporting events, and wine tastings, and art galleries, married, car lover, age 25-40, etc. A user's behavior profile can be imported from a social networking site, or created from scratch on the Ad Widge Website. In embodiments the anonymous behavioral ad matching is accomplished via the Ad Widge servers which compare ad serving for mathematically constructed groups formed by various aggregations of behavior keywords. All permutations of up to 4 keywords at a time are examined, and clear trends with very high degrees of confidence are used to suggest ads for a user, based upon ads solicited by others with similar behavior profiles.

Affinity Ads

Users can choose to receive ads based upon the interests or behavior of others in their affinity groups (women, men, college students, elderly, married, single, soccer team, etc.). For example, other women (with similar profiles) wanted ads for these cosmetics or clothes, so this user might also.

Self-Aggregating Groups

Before all advertisers switch to one-to-one marketing, some may wish to continue to want to market to larger groups of users. Users can choose to create or join groups of people with similar profiles. Ad Widge facilitates entente cordiale—the friendly agreement among such users to work together to maximize ad profile monetization. Ad Widge aggregates these groups and makes them available to advertisers using, in embodiments, no-personally identifiable information about the users in the group. Users can join, or elect to allow themselves to be automatically added to various groups as they are created. Users get paid for the resultant ads. Users can also choose to be the curator or host of a group. They might try to create a very large group; or they might want to be very selective about who they let in to the groups to increase the attractiveness to advertisers (and thereby increase the payment per user). Third parties can also choose to curate or host various groups of profiles.

Intramedia Ads or Intrastitial Ads

Ad Widge technology is compatible with embedded ads within a show, movie, video, photo, document (Tilz) or any digital content, as long as the intramedia/intrastitial ad supports tags. Users can wirelessly collect such ads/offers via mobile handset. Intramedia/interstitial content are ads or content that the user cannot fast forward past or otherwise skip. Intramedia ads may float on top of part of the existing program. Interstitial ads are ads between segments of a show or between successive Tilz, and are displayed between shows (or during commercial breaks) but, again, cannot be defeated or avoided by the user.

Freshness

As illustrated in an example embodiment in FIG. 16 the user's ad profile indicates to the ad senders how recently the user indicated a desire to receive ads on a given subject. The time and date an item is added to a user's Want Ads profile is indicated to those viewing the profile. Users who recently indicated an interest for a particular ad item might be more valuable to advertisers, than, say, a user who more than a year ago indicated an interest for that same item. This difference in freshness value is reflected in the price advertisers pay to view a user's profile. The more up to date the profile (on average, across all profile data) the more useful the advertisers will find the users profile.

The interest freshness radio button is automatically set to highest interest level the first time a customer registers a product interest. Then each week (or other time interval) the interest level is automatically lowered along with the price charged advertisers (and commissions paid to users), one notch. The user may countermand this automatic lowering of interest level by manually re-setting it to the highest level—indicating their interest in purchasing such a product is still very high. Users may also re-set the highest level of interest in any given item by scanning its barcode again.

This freshness process assures ad issuers fresh interest on the part of the consumers they market to.

Usage Based Suggestions

At the user's choice, Ad Widge, via a proprietary software algorithm, can monitor which items a user barcode/RFID scans and suggest other ads that might be of interest. The user could also choose to let Ad Widge automatically create the user's ad profile based upon the user's barcode/RFID scanning habits.

Users can also indicate in their profile that they are willing to let anyone send an ad—on any subject—if the sender meets the requirements set by the user. The user could then choose to add that ad to their Want or Don't Want ad profile.

Users Rate Ads

Another unique feature of the Invention is interactivity. Advertisers have longed for the ability to find out how relevant/useful the ads were to various users, in real-time, without the artificial focus-group environment. Users can choose to, or not to, rate the ads they receive for quality and relevance as well as suggest improvements. Users can also change ad receiving venues (for example: stop sending this type of ad to my mobile handset, and instead send it to my TV, where the same ad may receive a higher rating, due perhaps to the larger screen real estate on a TV).

In this way the Ad Widge software engine fine tunes the likes/dislikes of its users. And by rating an ad the very lowest rating, the user can stop all future ads of that type from that vendor. The user ad ratings information may, at the user's option, be made available to ad vendors for free or for a fee. Thus, users are incentivized to rate ads, since only ad-rating users will receive a percentage of the income generated by selling Ad Effectiveness Statistics back to the ad-sending entities.

4 Types of Ratings

1) Ad issuers can rate users (e.g. person A is a heavy ad watcher, person B rarely watches requested ads).

2) Users can rate the ads from the advertisers (and/or users can rate the ad supplying company, such as the product vendor).

3) Usage Ratio: for each Ad Widge ad solicited Ad Widge software calculates ratios such as the percentage of ads requested vs. the percentage watched.

4) Purchase Ratio: Ad Widge software assigns a score (a rating) that matches a user's purchases against their solicited-ad profile (Ad Widge software can track, at the user's option, the percentage of solicited ads that lead to purchases of that specific product—across all ads requested and utilized by a given user).

Market Research

Users who rate the ads might receive (at the advertiser's choice) additional incentives from the advertiser, which may be in the form of a novel digital, credits-based currency (hereafter "iDough"). Advertisers or market research firms can also send more detailed questionnaires about the product/service ad to selected users whose profile allows this. Thus the Invention enables a new type of real-time market research.

User Run Ad Forums

An additional aspect of Ad Widge interactivity is the user-run forums which give users who wish to discuss the advertising, or any other matter/topic, a place to express their views. In embodiments, advertisers can pay to view and monitor such forums, however they may not interact with any user, unless that user specifically opts-in to interaction with advertisers in the forums.

Widget

Ad Widge's software widget resides on user devices (particularly mobile handsets), and enables (among many other functions) stores, merchants, service providers, etc. to send ads to a user's mobile handset (or device of user's choice or in paper form to their home/office or other user-specified locations), as well as enables users to manage their ad profile.

Purchasing from Ads

Digital barcodes on ads enable purchasing from ads. In embodiments, Ad Widge ads contain a novel type of IP-based digital barcode (hereafter "Net Dotz") enabling, among other features, instant electronic purchase of the item. The IP address contains the location where more information about the item can be found. Ad barcodes are easily scannable by suitably-equipped mobile handsets (Mobis) for online or offline purchases of the ad item. In embodiments, scanning the digital barcode may return transactable tiles of information (hereafter "Tilz") relating to the ad.

In embodiments Tilz function as a focused mini-Website pertaining to just the object from that ad, enabling (among other features) instant purchases of the ad item from both online and offline ads. In embodiments the user may be given a discount or paid a rebate for purchasing items directly from the ad, since it saves the product/service maker the expense of paying middlemen such as department stores to stock and sell the item. One advantage of having an IP-based digital barcode such as a Net Dotz on the ad, is that the vendor can feature the very latest pricing for the item, and even offer different pricing or discounts depending on who the shopper is. The user's reverse cookies, My Cookiez, may, at the user's option, provide the vendor the preference profile or other profiles of the user scanning the digital barcode on the ad. Furthermore Net Dotz digital barcodes are also electronic so users, for instance, watching TV or listening to the radio can "scan" the electronic digital barcode as they watch TV or listen to the radio, to download the associated data tile (Tilz) ad to their mobile handset, and effect the purchase therefrom.

In embodiments the user may scan the IP-based digital barcode with their mobile handset, and be able to complete the purchase transaction using their mobile handset via the Coupon Widge widget to transmit their credit card information or other payment modality information; or pay via a novel type of credits-based digital currency, iDough.

Time Limits

There can be time limits put on any of the user's ad profile list items. If a user just purchased tires, that user doesn't need to see tire ads for, say, 3 years. The Ad Widge widget can block tire ads for three years, and then start allowing/soliciting them 36 months later, depending upon tire need at that time.

Preview and Schedule Ads

Ad Widge enables users to preview ads. Using the AD FORMAT described below, advertisers can also include short, say 10 second long "trailers" for their full length 2 minute detailed product ads. If the recipient doesn't wish to view the ad based upon the preview, the user's negative rating for the preview is sent back to the advertisers. If the recipient wants to review the full length ad, the recipient has the option of scheduling the ad for any time/date, or even downloading the ad to the recipient's digital device of choice (mobile handset, PC, TV/set top box, DVR, et. al.) for later viewing at the recipient's convenience. Recipients can also choose to schedule ads via a plurality of manners including, but not limited to: never send again, send again but not for X hours/days/weeks/months/years and/or other options.

Other Profile Details

Users can choose to fill out as much or as little personal information about themselves in their ad profile. Users can choose to provide, or not, additional information that advertisers routinely seek out via means such as contest entry forms such as gender, age, income, zip code, hobbies, etc. The more information the user provides, the more robust their profile, which likely increases the value of the profile—and thus the amounts paid to the user by entities who pay to view/utilize the user's profile.

Instant Ads

Ad Widge is mobile digital-content format (Tilz) and tags/keywords compatible so, in embodiments, instant ads can appear, for instance, across the bottom of relevant, ad-enabled mobile documents (Tilz).

Anonymity

Users can choose to use an anonymous IP address supplied to them by Ad Widge to receive all their ads (via forwarding), without disclosing any personally identifiable information to the ad senders.

Privacy

Ad Widge addresses some online users' privacy concerns (that some major online advertising companies are starting to encounter) by putting users in charge of their own ad profile, including which information to disclose to advertisers. Ad Widge does not require users to make their ad profiles public. Users can keep their profiles private, and anonymously disclose to selected advertisers just those items they wish to receive ads about.

Security

In embodiments Ad Widge ads are presented in mobile digital-content format (Tilz), which assigns an unique digital serial number to each ad. In cases, for instance, where the user makes an in-ad purchase and/or pays for the transaction electronically (via mobile handset) a digital receipt is created detailing the serial number of each ad, and item(s) purchased, in that transaction.

Ad Format

In embodiments Ad Widge ads appear in an unique digital content format (Tilz) that is optimized for mobile handsets but is compatible with a plurality of devices (such as PC's, TV's/set top boxes, cell phones, etc.). This format, Tilz, has numerous features, however one interesting feature enables users to store any ads (if the advertiser allows) on their digital devices for playback at a later time. This unique format also allows ads to be placed in, around, under, alongside, etc. any digital file (document, video, song, TV show, etc.). Thus via Ad Widge, solicited ads can appear, at the user's request, in many new places other than where conventional art banner ads typically appear.

Digital Ad Formats

Ad Widge can present digital ads in a plurality of sizes, shapes and/or formats, particularly so when using the mobile digital-content format (Tilz). Some of the common ad formats Ad Widge can place ads in, without using mobile digital-content format (Tilz), are skins (e.g. wrap a movie ad around a video), bugs (e.g. a graphic of the item being advertised that slides onto the bottom of a video as it plays: the graphic offers viewers who click on it the ability to wirelessly receive ads/offers/information), and tickers (e.g. overlay ads which insert text or graphics like a ticker-tape at the bottom of a video).

Match My Offer

Match My Offer enables customers to accept bids from competing products to match or beat an offer amount. For example, an Ad Widge user receives a "2-for-1 Tide laundry detergent" offer, but just before they use it, selects the Match My Offer option on the Ad Widge widget, which then causes their mobile handset broadcast that offer and ask competing laundry detergent companies or other entities to match or beat that offer in the minutes/hours/days before the user purchases detergent. The Ad Widge Match My Offer offer is displayed on the Ad Widge Website (or other locations, such as the user's profile CloudCast) for all ad vendors' servers to monitor and issue realtime offers if they choose. In embodiments Ad Widge broadcasts the impending use of a coupon and solicits other coupons that match or beat it. Thereupon local vendors or the store itself or other entities may send a competing coupon to the user's mobile handset.

Paid Ads

Paid ads function in a fashion similar to paid search. In embodiments, users indicate in their profile that they are willing to let anyone send an ad—on any subject—if the sender pays the user (a user-set minimum amount). The user could then choose to add that ad to their Want or Don't Want ad profile. Users can create their own lists of ads they solicit, but for those users who opt-in to the Paid Ad option in their Ad Widge profile, they are indicating to ad vendors that they are willing to receive ads from any vendor on either a Selected List of items, or All Items. That is to say, the user will still receive ads for those items they specifically listed in their Ad Widge profile, but also are open to receiving ads from competing vendors. So for instance if they indicated they want Tide laundry detergent ads in their Ad Widge profile, but are open to Paid Ads, then vendors such as Cheer laundry detergent can pay the user for the privilege of sending an ad for Cheer (in the hopes of causing that consumer to try their product instead of what the consumer usually uses). Users are incentivized to use receive paid ads because they may be paid more than the usual fee they receive for receiving ads. The ad sender may ask if the user liked the ad (or just be informed whether the user added the ad to the user's profile). Ad senders may even conduct mini market research this way.

Related and Unrelated Ads

Ad Widge offers users the option of receiving ads for products or services related to those which they already indicated an interest in. If the user elects the Related Ads option, then each time an ad is sent to the user, that is related to any of their areas of interest the user specifically elected for Related Offers, a window (Tilz) pops up and ask if the user if they would like to view a related ad.

Unrelated Ads function in a fashion similar to Related Ads but apply to products/services/etc. unrelated to an ad the user received. Unrelated Ad users can opt to add restrictions on the Unrelated Ad pertaining to which device (mobile handset, TV, PC, etc.) the ad is to be sent to, including time of day and day of week restrictions.

Users are incentivized (by the fees they potentially stand to receive) to be open to receiving ads from vendors they have not previously specifically allowed.

For example, if the user was in the market for laundry detergent, and was leaning toward purchasing Tide detergent, an ad for Tide laundry detergent would appear in the center tile of the data tile sphere navigation facility (Spherez). Then laundry detergents with similar characteristics (tags) would appear in the tiles around the Tide laundry detergent center tile, so that competitors who also have laundry detergent can also present the user their ads. Ad Widge calls these Piggy Back Ads. The user may spin the data tile navigation sphere (Spherez) using finger flicking motions (on a touch-screen capable digital device) to see more related/unrelated results.

Sponsored Ads

Sponsored Ads are ads that advertisers directly send to users, irrespective of whether the ad meets that user's solicited-ad categories list. Users must first choose to allow (explicitly opt-in) to receive such sponsored ads. For instance, if a user is watching a TV show such as "Cheers" and that episode is sponsored by Starbuck's Coffee, then Starbuck's Coffee can send ads/offers/information/et. al. to all those in the viewing audience who allow such sponsored ads.

Unique "Missed Demand" Tracking Capability

Ad Widge can provide retailers with information they have never been able to track before: Missed Demand. Missed Demand is defined herein to mean when there are no more left of a particular item on a retailer's shelf, but consumers come to that shelf hoping to purchase that particular out-of-stock (or simply empty-shelf) item. For example, let's say a consumer goes to a grocery store to purchase 2 liter Diet Coke. When the consumer gets to the shelf it is empty. As per the conventional art the store would have no way of knowing how many additional bottles of Diet Coke they could have sold (and thus should have ordered for that store) had their supply exactly equaled demand. Ad Widge could sell this Missed Sales or Missed Demand information to retailers (and split this income with each consumer who helped provide the Missed Sales data). Employing Ad Widge, the store may have the barcode/RFID tag on the edge (or end cap) of the shelf where the Diet Coke sits. If the shelf is empty when the consumer arrives, the consumer simply scans the Diet Coke barcode/RFID. A message is instantly sent to the consumer's mobile handset via Ad Widge asking how many 2 liter Diet Cokes they would have purchased if they were in stock. Once the consumer has indicated the number of missed items they would have purchased, a Rain Check may be sent to the consumer's mobile handset via Ad Widge for the number of Diet Cokes sought. (This Rain Check could be set to expire, say in one week, or any other vendor selectable timeframe.) Everyone wins: the consumer gets a rain check, the grocery store gets the missed demand information sent along with that consumer's shopping club profile information (if they have one), and Coca Cola also gets the data about Missed Sales (to determine store by store sales efficiencies).

This "missed demand" data is valuable information that the store (or other entity) may remunerate the consumer for, and the manufacturer may pay consumers for indicating would-be purchase data. Not only that, but stores and manufacturers get this data in realtime. Analytics they've never had available before.

To further clarify the above and other advantages and features of the present Invention, more particular descriptions of the Invention will be rendered by reference to specific embodiments thereof which are, in some cases, illustrated in the appended drawings. It is appreciated that these drawings and descriptions depict only typical embodiments of the Invention and are therefore not to be considered limiting of its scope. The Invention will be described and explained with additional specificity and detail via the following applications and use cases.

Local Advertising

Unlike conventional art local advertising, local advertising using Ad Widge send ads to recipients who wish to receive such ads. For example, a neighborhood ice cream shop using Ad Widge could be wirelessly broadcasting (in a one block radius) an ad for their premium ice cream. Instead of this ad spamming all mobile handset users within their broadcast radius, only those mobile handset users who wish to receive ice cream ads, as per their Ad Widge profile, will receive the ad on their mobile handset. Or as a user walks past a yogurt shop, the yogurt shop can entice the user with an offer if the user's profile is open to receiving such offers. Or the pizza parlor can be broadcasting (in a five mile radius) ads highlighting their unique pies, to attract users to their pizza place rather than their competitors. Again, only those users within that radius (who solicited pizza ads) will receive ads on their mobile handset (or other digital device the user designates in their ad profile).

Location Based Advertising

Ad Widge enables both ad senders and ad recipients to create profiles that set geographic limits for the scope of ads sent/received (again with an eye toward most users of the Invention utilizing their mobile handset to receive their solicited ads). Utilizing the mobile handset's location determining facility, ad senders, using the Ad Widge, will know when a potential customer, that explicitly wants to know more about their product/service, is within a certain distance from their establishment.

This distance may differ for different types of establishments. For a restaurant which has not yet filled out its 6 PM dinner service, the revenue lost by unfilled seats at the 6 PM seating is lost forever, but they don't have time to attract customers who are more than a few miles away. Thus the restaurant will want to send out ads in a radius whereby users could get there in time for the 6 PM seating. So they might broadcast, for instance, via the Internet a location-limited ad, which offers a very local and very timely ad regarding that night's 6 PM dinner service. Ad Widge's location-based advertising also determines if a user is traveling to another city, and businesses in that city can pay the user to accept ads prior to (or upon) the user's arrival in that city.

Instead of bombarding users with ads as they near various restaurants, users solicit, via their ComCloud profile broadcast, ads only for, say, That restaurants, or only for restaurants under $25/person.

Timely Advertising

Ad Widge enables both ad senders and ad recipients to create profiles that set time/date limits for ads sent/received (again with an eye toward most users of the Ad Widge using their mobile handset to receive their solicited ads). For example, it's morning in London: there are a number of plays happening tonight, however not all are sold out. Most patrons/visitors know they can go to the last-minute-tickets booth near the theaters (such as TKTS, which sell discount day-of-performance tickets); however some cannot make it to the booth, but would like to purchase a last minute, discounted ticket. So the users add London theater tickets to their Ad Widge profile, and elect to permit last minute ads.

In embodiments the TKTS booth can send out via the Internet an ad for tonight's plays, with a price equivalent to that which patrons could receive if they had the time to show up at the ticket booth. In embodiments a user is made aware of the ad via the users Ad Widge widget on the user's mobile handset. Tickets may be purchased directly via the Ad Widge ad, or online (or other means) from a user's mobile handset via several modalities, including several proprietary methods (such as iDough, Pay by Widge, and Motran).

Alternatively, for those with the TKTS widget/ParaSite/Tilz, that widget/ParaSite/Tilz can query the user's Ad Widge profile to detect interest in receiving certain promotions. And the user's Ad Widge profile can be informed by the user's calendar. Are they free this evening? Because a user's Ad Widge profile is on their mobile handset (Mobi), it can interact with the widget in the background. Or even send Ad Widge profile elements (Tilz) to the TKTS main central server, to solicit discount tickets.

Product Endorsements

Athletes (or other endorsing persons) often take the highest dollar offer amongst competing endorsement deals. Product endorsements, via Ad Widge, can be more closely tied to results. For example, athletes can be paid $1 for each athlete Product Profile Tilz requested, and $4 for each product purchased (via that Tilz). If a customer returns the product, then the $4 sales commission is clawed back. For instance, a user sees a commercial on TV for Air Jordan sneakers. That user then requests the Tilz for Air Jordans. And how long that Tilz is kept on the user's mobile device (Mobi) and how many times they view that Tilz determines whether the athlete receive the full $1 product information commission, or just a fraction of that amount. Ad Widge thereby creates a method to tie the effectiveness of a marketing campaign to actual user interest and actual user purchases.

Corporate Uses

Corporate uses include the ability to solicit product information (ads) from various suppliers, and for those suppliers to offer discounts. These solicitations can be blind (each supplier only sees the solicitation from the sender, or they can be public (like a reverse auction) so that when a sender requests best prices, say for 500 two by fours, local lumber yards could choose to bid or not, after seeing what other local lumber yards were bidding.

Corporate Brand Elements

Tilz allow for branded elements to be embedded in them. For example, a document template might have a coporate logo included on it, in exhange for free use of the document template. In such a case, users, via Ad Widge could click on the corporate brand element to solicit an ad related thereto.

Small Business Owners

For a small business owners such as a local restaurant, marketing efficiency is important. Thus its important to identify users who are likely customers of that type of restaurant, and not spend marketing dollars reaching people who don't like that type of food. For example, for an Indian food restaurant, it may be difficult via conventional means to limit marketing expenses to just those users who like Indian food. With Ad Widge, users may have a restaurant profile which lists all the restaurants the user has dined at. Reviewing restaurant profiles, then being able to reach just those desired users (such as those who have dined at Indian restauarants on more than one occasion, or those who do so more than X times per year) is a powerful advantage that Ad Widge delivers.

Custom Versions of Ads

Advertisers can create a plurality of customized versions of each ad. For example, for a tire ad, the advertiser might create a version of the ad that appeals to men, another version that appeals to women, and another version that appeals to teenagers who may be future tire customers. In addition, there may be different forms of the ad for all destination formats: "junk mail" delivered to a recipient's home, radio ads, television/set top box ads, website banner ads, and advertising on mobile handsets. Furthermore ads can also be further customized, within each of the destination formats, by the way various people like to receive their information: all text with lots of facts, or visually via a TV ad that explains how a user would feel when using the product, etc. (as per the recipient's preferences profile).

As per the conventional art advertisers struggle with how to produce a single ad slogan that appeals to all recipients; when what they might like to do is break down their customers into different groups, and market to each group in a different way. For example, a television commercial for a tire can be the same for all recipients, but using the Invention, the voice-over messaging can be different for the three or four types of users the tire company has identified they have—said messaging delivered to differing users who broadcast their Ad Widge profile to the ad-sending entity.

Third Party Profile Integration

Ad Widge may import, for instance, TV viewing data from their digital video recorder (DVR) or grocery store club card data, to enhance a user's Ad Widge profile. This imported data may be made available via Ad Widge to advertisers or market research firms, who may in turn, via Ad Widge or otherwise, send ads based upon the user's thusly enhanced Ad Widge profile.

Digital Ad Booklets

In embodiments Ad Widge can eliminate the millions of paper ad booklets some stores print up and stuff in users' bags at checkout as follows: Users scan the barcode of the proto-booklet available at each point-of-sale (POS) register and aisle caps; The (user profile-sifted) ads for that booklet are transmitted into the user's mobile handset in Tilz format. If the store utilizes certain smart labels for its products, they may have RFID tags built in which can interact with the user's profile as the user walks near the item. Ad Widge can limit the ads sent to the user to just those ad types the user solicited in their Ad Widge profile—so as not to be annoyed by hundreds of ads as the user roams the store's aisles.

In embodiments Ad Widge digital ad booklets can be electronically available in many languages as follows: Whenever a user receives a digital ad book, it can be presented via Ad Widge in the user's native language as per the user's preference profile, as opposed to printed booklets which are usually only available, say, in English, due to cost constraints of printing in multiple languages. This feature may be helpful to persons traveling to a foreign country who want information in their native language about the store's products and services.

Captive Advertising

In embodiments Ad Widge informs captive audience display screens. For example, when a user steps into an elevator or is at a gas station pump featuring an advertising screen, the user's mobile handset may broadcast the user's Ad Widge profile ads may be displayed that the user has solicited. Users can opt to receive additional information that relate to those products/services being advertised. Or the user may scan the barcode/RFID directly from the ad on the screen to receive the information Tilz. In emerging-market countries with limited Internet access, providing a place where users update their profiles/Tilz at a captive location (which might be one of the few places in town which has Internet access) may be crucial.

Request More Information

About Ads/Shows/Movies Seen on TV

Users watching television who see an advertisement for a product they would like more information about can wirelessly submit a Request For Information (RFI) to the product manufacturer via Ad Widge. The response to this RFI can be to send, via Ad Widge, the user an ad, or a brochure in the mail or e-brochure, etc. according to the requester's preference profile (Web Pref). In embodiments the user interacts with the TV via the use of a widget (Tube Widge) that completes a Bluetooth or WiFi or similar handshake and information exchange between the user's mobile handset and the user's TV via means such as the user's DVR, set top box, etc. Identification of the proper ad or show or movie that the user desires more information about is possible for those ads/shows/movies encoded with a digital IP address (IPv21 #) or digital barcode (Net Dotz).

Patient or Client Communiqués

Doctors, for instance, can, via Ad Widge, send informational ads about procedures or tests that the doctor thinks that patient should consider undergoing. Consultants or any vendor with clients can send ads to their existing client base seeking to entice them into purchasing additional products or services. For instance, personal shoppers at fine department stores often keep customer database lists of hundreds or thousands of names. Personal shoppers could send ads with pictures or videos of outfits or accessories that are on sale or would particularly suit a given client demographic, as per users' Ad Widge profiles.

New Customer Follow Up

The week after a customer makes their first purchase in a store (online or offline) is one of the best times to market to that customer. Retailers, as per users' Ad Widge profile, could send ads to that user's mobile handset in the days following that first purchase to attempt to entice the customer to come back and purchase more of that store's products.

Multi Ads

Multi ads refers to different ads for different users all watching the same show. For example, four users are sitting on a couch watching the same TV show. During commercial breaks, different commercials are delivered (via means such as WiFi or Bluetooth or other) to each user's mobile handset whereupon they each watch different ads, or different, customized versions of the same/similar ads. Then when the commercial break is over, users return to all watching the same content on the TV.

The present Invention may be embodied in other specific forms without departing from its spirit or essential characteristics. The described embodiments are to be considered in all respects only as illustrative and not restrictive. The scope of the Invention is, therefore, indicated by the appended claims in addition to all foregoing descriptions. All changes which come within the meaning and range of equivalency of the claims and foregoing descriptions are to be embraced within their scope.

The Wireless Location-Establishing Device Provides a Platform for Interactive, Multimedia Customized, User-Solicited Coupons A system, method, service and platform for providing interactive, multimedia, customized, user-solicited coupons are disclosed; which, for example, enable advertisers to better target interested recipients. Via a plurality of means, users create profiles of the objects they utilize in their life. The resultant profile(s) is then made available by the present Invention ("Coupon Widge") to entities such as those which manufacture or sell said objects. Those entities pay the user to view the user's coupon profile, whereupon said entities make a determination whether or not to pay the user again to send coupons or other information, as per each user's preferences and profiles.

Up until now (2002), coupon distribution, usage, redemption, backend accounting, and reimbursement has been inefficient, scattershot, and wasteful of the various resources involved; not to mention a tedious user experience.

The present invention (hereafter "Coupon Widge"), is conceived as a response to the above-described deficiencies of the conventional art. With Coupon Widge, the industry shifts to profile-based, digital coupons.

Users create profiles of everything in their life. And based upon the facts in those profiles, advertisers/marketers make informed decisions, fact-informed decisions, about getting their coupons, messages (and other data) to customers and potential customers. Coupon Widge's technology enables users to receive just those coupons they want, and get paid to do so.

These profiles indicate not only those items the user would like coupons for, but also how, when and where. Coupon Widge enables a number of innovative advertising modalities including: local advertising, location-based advertising, timely advertising, contextual coupons, blended coupons, interest category coupons, behavioral coupons, affinity coupons, intramedia/intrastitial coupons, self-aggregating group coupons, realtime competitive coupons, et. al.

Further, Coupon Widge, disintermediates (some) middlemen in the advertising/marketing process; putting advertisers/marketers (often the manufacturer or retailer of a product) in direct one-to-one contact with customers and potential customers. Thus, monies that erstwhile went to middlemen which created profiles of users based upon guesses, can be re-directed to users, who create and surface their fact-based profiles directly to advertising/marketing entities, and are thereby potentially paid to receive information, coupons, offers, and other data.

Via a plurality of means, users are in control of the information they receive, including coupons/offers/etc. Coupon Widge is a shield, against information overload.

The vast majority of coupons today are unsolicited and irrelevant to the recipient. Accordingly, an improved method of couponing is desirable. Interactive, multimedia, customized, user-solicited coupons—the present Invention—enables advertisers/marketers to better target interested coupon recipients. And for recipients, the avalanche of paper coupons and online coupons is reduced to a focused stream of coupons for just those products and services recipients are interested in receiving discounts for or more information about.

Both coupon issuers and coupon recipients are losers in current couponing modalities. Coupon issuers waste billions of dollars each year sending coupons to recipients with no interest in those coupons. Around 300 billion coupons are issued in the U.S. each year, and almost 1 trillion worldwide.

The cost to coupon issuers is anywhere from 1 to 5 cents per coupon (depending upon many factors including volume) to author, design, print, ship, handle and redeem. 99% of this more than $10 billion spent each year is wasted on coupons tossed in the trash or otherwise unredeemed. Accordingly an improved method for delivering and utilizing coupons is desirable.

Through the use of digital coupons, the labor-intensive hand-processing of coupon clearing can be reduced or eliminated. And Coupon Widge disintermediates the wasteful middleman-step in the coupon redemption process. Coupon Widge was informed by the transition to the new computing platform, the mobile device (Mobi). For many countries (such as India), digital coupons, especially those delivered to mobile devices, are the best way to reach consumers. Mobile device penetration is higher than for TV or (hardline) Internet. And in India's case there are hundreds of language dialects—a problem much more easily addressed via digital mobile coupons.

When Coupon Widge was invented in 2002, mobile, location-based digital couponing was unheard of. Conventional art couponing solutions are mainly focused on the coupon sender rather than the coupon receiver. Users don't want every possible coupon available, they want only those offers as per their profile. In embodiments, user-solicited coupons appear on the user's handset (Mobi) from entities the user wants discounts from. In embodiments, a user's Coupon Widge profile is continuously CloudCast, blocking unwanted coupons and getting paid to accept desired coupons. Rebates, are an ex post facto form of a coupon, and thus are requested and delivered via Coupon Widge. And Coupon Widge does the work of tracking those rebates that often take many weeks to arrive. In embodiments, coupons are electronically delivered to users as per their Coupon Widge profile, thus reducing the unnecessary expense of the billion of coupons printed in newspapers, and Value Packs, and at stores, etc.

With Coupon Widge coupons can be multimedia, such as animated characters, or even favorite cartoon or movie characters. Coupons can speak their message: "Today we're featuring 50 cents off Alpo dog food" and can be in the licensed voice of a, say, a movie star. No longer are coupons just a boring slip of paper with a barcode on it.

Ads vs Coupons

In embodiments, ads are a means of providing consumers more information about the features and benefits of various competing products/services that recipients are deciding among for a future purchase; whereas coupons are a specific financial discount for items that recipients already regularly purchase (and thus typically don't contain product features/benefits information).

The Invention is enabled by the current and forthcoming digital technologies such as the Internet, the ever more present digital (and HD) radio, and the proposed digital television broadcasting. It is also enabled by ever more capable mobile handsets—which are defined vis a vis the present Invention, as cellphone-like devices, such as a personal digital assistant (PDA) or other devices/embodiments other than a personal computer (PC) or laptop, that don't necessarily require a monthly contract from a wireless carrier to be a useful device. Those skilled in the art will appreciate, however, that a user may utilize other digital devices that are similar to or different from a mobile handset, featuring wireless carrier service or not; Such devices are consistent with the principles of the Invention, and are thusly encompassed herein by inference.

Of the people who don't currently use paper coupons, many don't use them because of the hassle of having to cut them out and carry them around to be available at the time of purchase. Hence the need for digital coupons, and more so, for conveniently delivered digital coupons—say, to the user's mobile handset, which will be with many users during most coupon redemptions.

Though in embodiments Coupon Widge can be used by anyone with a computing device and Internet access, it is aimed at users of mobile handsets—and many users may exclusively use their mobile handset to engage and utilize Coupon Widge. Of course, other users may simply utilize other computing devices (or even televisions or other things) that are different from mobile handsets.

According to the current coupon process, at plants filled with barcode scanners and sorting machines, coupon processing companies go through the coupons. They then send a bill to each coupon issuer—usually with the coupons attached—seeking reimbursement for the coupons' face value, plus shipping and handling fees. Payments vary. For a 50-cent coupon, the supermarket gets 50 cents back from the manufacturer, and usually a few cents more. That money is split with the processor.

Coupon issuers currently pay over $150 million per year to coupon processing companies. For years, coupon processors have run plants in Mexico, so they can hire low-cost labor needed to sort through all the coupons.

Coupon issuers and retailers often disagree on reimbursement. Coupon issuers will deny payments arguing, for example, that an offer had expired or that goods weren't sold in the area where the coupon was supposedly redeemed.

User-solicited, digital coupons address the shortcomings of the current coupon process.

Digital coupons reduce the two most common reasons coupon issuers refuse to reimburse retailers for coupons: the offer had expired—using digital coupons eliminates this problem at the time of redemption by verifying that the coupon has not expired; and the goods weren't sold in the area where the coupon was redeemed—digital coupons presented at the time of the transaction could only be utilized for products that were actually for sale in that area.

Before the Internet and the digital media revolution, coupon issuance was a one-way communication. For decades, coupon issuers simply foisted their coupons via junk mail and newspaper inserts on millions of recipients hoping for something like 1% of the recipients to actually be interested enough in the coupon to take action to purchase that product or service being advertised.

Increasingly so, recipients are being bombarded not only by junk mail and newspaper insert coupons, but also by online coupons. And the avalanche of coupons is just about to skyrocket as social network advertising (on MySpace, etc.) and mobile handset advertising emerges. Recipients will hardly be able to go for more than a few minutes of their day without being assaulted by unwanted and irrelevant ads/coupons. Additionally, users are becoming increasingly concerned about their privacy, as some of a user's online actions are resulting in so-called targeted ads/coupons. And conventional art "targeted advertising" is evermore intrusive.

Unfortunately other advertisers continue to deliver ads/coupons as if the Internet and digital revolution has not taken place. Some offline advertisers use information about ad/coupon recipients gathered from entry forms for contests and warranty postcards. Direct marketing companies create numerous mailing lists based on these keywords or whether someone bought from a particular catalog before. Then for the next 5-10 years users received junk mail (and other forms of ads/coupons) based upon this incomplete, out of date, and often inaccurate profile.

Feedback about the relevance/usefulness of coupons was not practical—but it is today. Prior to the Internet there wasn't a cost effective way for people to build their own ad/coupon profile and communicate it directly to marketers (or today's search engines seeking to serve up ads/coupons). But there is today. Yet most marketers ignore this fact, and continue to bombard users with ads/coupons based upon 50 year old marketing techniques.

The Internet, mobile handsets, digital radio, and the forthcoming digital television now enable coupon issuers to inexpensively target individual recipients via simple, practical means. It would be preferable for users to give feedback about coupon relevancy. It would also be preferable for users to create their own profiles, either explicitly (by filling out profile checklists) or implicitly (by means such as barcode scanning or RFID interrogation of the objects users utilize in their life—profiles which can be created while online or offline). Coupons can thereby be tied to a user's expressed interests and purchase history, automatically.

It would be much better, for example, if marketers had a list of people who have actively indicated an interest in receiving tire coupons. Advertisers could target that much smaller subset of people who are interested in receiving, say, tire coupons, and not annoy potential future customers who don't want to receive tire coupons right now. Instead of marketers bombarding millions of recipients with billions of coupons (a shotgun approach), recipients can, via the Invention, be in charge of the coupons they receive by requesting just those coupons they are interested in (a rifle approach). Various technologies have now evolved to the point where it is simple and practical for couponing, for the first time, to become a two-way ongoing communication between coupon issuer and recipient.

Coupon Widge is interactive, multimedia, customized, user-solicited coupons. When users solicit coupons/information, advertising/couponing entities can shift their focus from the marketing-driven hype of the conventional art, to becoming more effective information delivery vehicles, for users who are actively seeking a discount/information vis a vis a purchase (decision).

Interactive, multimedia, customized, user-solicited coupons enable advertisers to better target interested coupon recipients. Instead of users being bombarded with random coupons, users can, for instance, scan the barcodes/RFID of the items they use in their everyday life to automatically build a profile of items they could really use coupons for.

As used herein in connection with the coupons associated with the plurality of embodiments of the Invention, the following terms are defined as:

Interactive: users solicit and receive additional information on the item in real-time, as well as rate the relevance/usefulness of that coupon to that user.

Multimedia: coupons can be digital and/or physical, and digital can include pictures or video (or other things).

Customized: coupons appear in a format according to the user's preferences, and can offer different discounts and coupon appearances to different users.

User-solicited: users surface profiles of items for which discounts may be desired, to various coupon-issuing entities, and thereby inform coupons they receive.

Coupons: coupons, offers, information and other data/content are all encompassed by the term coupon. Rebates are considered to be a form of ex post facto coupons, thus rebates are implicitly included in the Invention.

Reference herein to the word "advertisers" shall be understood to encompass advertising, marketing, and/or related/similar entities.

The present Invention is described in one or more embodiments in the following description with references to the Figures. While the Invention is described in terms of the primary modes for achieving the Invention's objectives, it will be appreciated by those skilled in the art that it is intended to cover alternatives, modifications, and equivalents as may be included within the spirit and scope of the Invention as defined by the appended claims and their equivalents as supported by the disclosures and drawings herein.

A primary purpose of the system, method, service and platform for providing interactive, multimedia, customized, user-solicited coupons described herein is to reduce inefficiency vis a vis advertising and marketing in general, and more specifically via a vis coupons. The disclosed system, method, service and platform also enable coupon recipients to exert control over and manage the information that is marketed or otherwise sent thereto.

Although various embodiments of the Invention extend to any system that operates in accordance with the principles described herein, one embodiment is described in the context of a Website, server software, and widget (Webified mini-software application) that is collectively referred to herein as "Coupon Widge."

According to this embodiment of Coupon Widge, the Website, server software, and widget enable users to create lists/profiles of things they'd like to receive coupons for. Users indicate via a preference profile (Web Pref) the way they'd like their coupons presented (e.g. text-based details, or visually-oriented, on their mobile handset or in the postal mail, etc.) The checkmark list (or profile), among other embodiments, can be created manually or by using their mobile handset to scan barcodes (Net Dotz) of products as they use them, or scan the barcodes of items they come across in stores, on Websites, in TV ads (or other places). Product/service vendors then send users coupons according to user coupon profiles. In addition users may engage in social/business networking with other users via profiles, blogs, chat rooms, and message boards In embodiments Coupon Widge is a software widget that resides on various digital devices (particularly mobile handsets), and enables stores, merchants, service providers, etc. to send coupons and rebates to a user's digital device, based upon the desired-coupon profile set up by the user. Via a plurality of means, including the Coupon Widge Website or directly on the users' digital device via the Coupon Widge widget (downloadable Webified mini software application) users create an electronic profile of the coupons they would like to receive. Advertisers can, if the user's profile allows, view the profile of items for which the user would like to receive coupons. Advertisers then deliver the coupons to the user (customized) as per the user's coupon profile.

This profile indicates not only those items the user would like to receive coupons for (e.g. tennis gear, car tires, organic breakfast cereals, etc.) but also how, when, and where the user would like to receive the information. For example a text message on the user's mobile handset, or during a 3 minute detailed advertisement on the user's television between 6 and 8 pm, or a brochure mailed to the user's home. Or users could choose to receive all their coupons digitally on their mobile handset (or other device), which can be used for redemption at the point of purchase, wherein, in some embodiments, the mobile handset (or other device) serves as the payment vehicle as per a variety of modalities.

Via their Coupon Widge profile users may also elect to allow coupons from competitors of products in their Coupon Profile—competitors pay the user for the right to try to entice them to switch products (in embodiments via modalities such as realtime bidding). After all it is the users time and money that is sought: The user's time, to review the info/coupons/offers/etc.; and ultimately it is the user's money that is sought by the advertiser/marketer (often to purchase the advertiser's/marketer's product/service).

Advertisers/marketers already pay, to get their coupons/offers/information/etc. to users—they pay middlemen such as search engines, Internet tracking companies, and/or market research firms, et. al. With Coupon Widge, users and potential users make their interest in more information about a product known via their profile broadcast, without need for middlemen to guess which users might be interested in an advertiser's coupons/offers/information/et. al. Thus advertisers can save those monies paid to get their messaging to users who weren't interested in receiving it, and further redirect monies that were paid to middlemen to guess which users want which coupons/offers/information/et. al.; instead, potentially paying fees to users directly, in exchange for the value the user provided in surfacing their profile.

In those instances where payments are non-zero, users can further control the amount of coupons/offers/information/et. al. they receive, by setting a minimum fee to receive, read and review the coupons/offers/information/et. al. That is to say, the senders of such material must pay the user an amount equal to or exceeding the user's minimum fee to even send the user such material.

Figure 23:
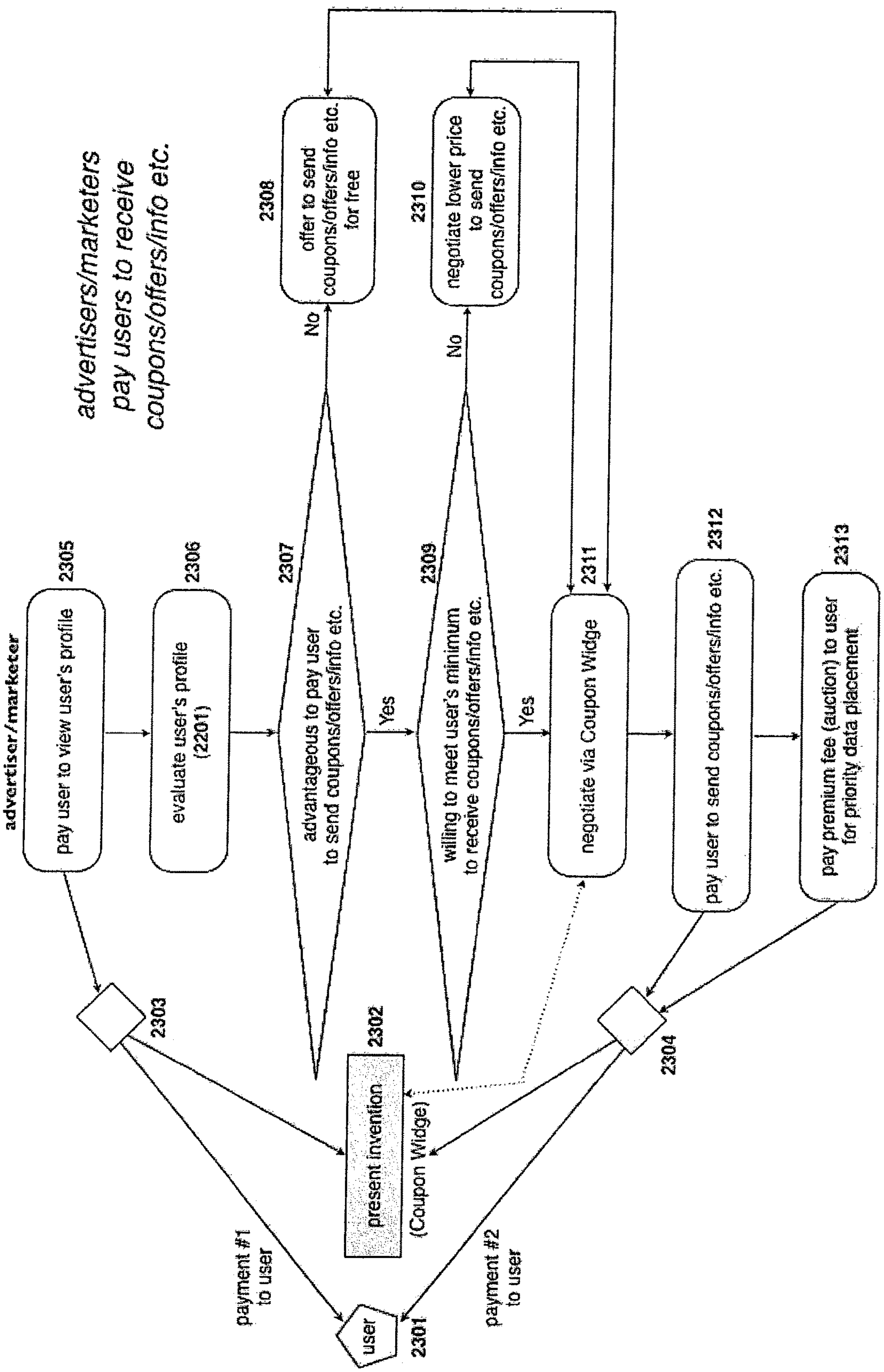
FIG. 23 is a flow diagram illustrating an embodiment of example process steps followed by advertisers as they first pay a user to view and review a user's profile, to thereby determine if it's advantageous to pay to send the user coupons; and further consider paying additional monies for priority data placement (an unique variation on paid search, wherein the user is paid; as opposed to a middleman entity).

FIG. 23 illustrates one of the Invention's most important principles: profiles=currency. Coupon Widge simplifies and automates the process whereby users create, manage and monetize their profiles. And these profiles have value. There are many companies, for instance, which would pay, literally, to view a user's profiles 2202.

Consider a case where all users create and broadcast all their profiles 2202 to all the appropriate entities at all times. Then, for example, the local movie theater could simply view the movie profiles 2205 of all movie goers in say a 20 mile radius of the movie theater, when making decisions such as which movies to acquire the rights to show in their theater. Such profile-based, fact-based decision making is far superior to the so-called analytics programs which harvest vast amounts of information, and apply complex algorithms, in the hopes of teasing out a few valuable (accurate) nuggets of information. And ad-sending entities pay a great deal of money for such information, weak though it may be, gleaned via such means.

That's why user's fact-based profiles are so valuable to so many entities. In practice, for example, a user reading the Sunday paper, and scanning an ad for a movie they'd like to see may get paid 2022, via Coupon Widge, almost instantaneously by entities 2107 such as those that can provide the movie to the user 2108-2113 and coupons/offers/information/et. al. related thereto. Scan the ad, and shortly thereafter, the user gets paid. Perhaps only a few pennies (or even fractions thereof) in some embodiments, but the tectonic shift in the advertising landscape may be appreciated by those skilled in the art.

Users create a profile of coupons they are willing to receive, primarily through barcode/RFID scanning of products they utilize (as well as by other means). Alternatively users can indicate they are willing to let any entity send a coupon—on any subject—if the sender pays the user (a minimum price set by the user). Each user can set their own prices to receive coupons. Users also decide if they want to get paid by advertisers or market research firms (or other entities) to view the user's Coupon Widge profile. Cumulative totals and/or frequency of various items purchased is valuable information that the user's profile contains. And beyond just frequency information, there is specific purchase information. For example, a user's profile might indicate a user purchased grated Parmesan cheese 18 times in the past year. But beyond that is much more granular information such as: What sizes of bags (8 ounce or jumbo 32 ounce)? Which brands? Re-sealable pouches or vacuum packed bags? Which stores were they purchased at? What payment modalities were utilized? et. al. The user gets paid by market research companies and manufacturers (and other entities) to view the user's Coupon Widge profile which contains such valuable detailed information.

Coupon Widge delivers solutions for both paper and electronic coupons. Paper coupons' barcodes can be scanned thus enabling the user, via Coupon Widge, to automatically receive that coupon's discount at checkout, including when paying via mobile device (Mobi). Users can also scan items while shopping in a store, and if their Coupon Widge profile allows, receive instant electronic coupons for those products or even competing products. Coupon Widge enables a two-way ongoing communication and relationship between coupon issuer and user.

The Invention's interests are aligned with users. Coupon Widge only gets paid, when users get paid 2303, 2304. Unlike traditional companies, such as leading search companies, which in many cases get paid, even when neither party to a transaction (buyer and seller) are happy with the value received. Traditional middlemen, such as leading search companies, add to the cost of goods (collecting, say, $30 on "refrigerator" searches, during the 10 years a user owns a fridge, happens to do searches on fridges, but isn't at the time in the market for a refrigerator). Ultimately, search companies drives up users' costs twice: 1) the cost of goods that the user eventually pays for is $30 higher; and 2) privacy costs, as entities such as leading search companies spy on users, to obtain the data used as fodder for their algorithmic guesses as to what a user might actually be in the market for.

An unique advantage of Coupon Widge is that coupons/offers/information/et. al. sent to users are based upon the best, most accurate and most comprehensive profiles available—those maintained by the users themselves. Any profile created by a third party is inferior to a user-created and managed profile; because, ipso facto, the only witness, for example, to every single movie a user consumes, by any and all modalities, is the user himself. If a user's movie profile is maintained by a third party such as the user's television service provider, the television service provider only bears witness to those movies the user consumes via the television service provider. Therefore, anytime the user consumes a movie, not via the user's television service provider, the television service provider's movie profile for that user becomes a bit less accurate, a bit less comprehensive and therefore a bit less valuable.

The same is true for other third parties which base their advertising systems upon profiles that third parties create of users; such third party profiles are less accurate, less comprehensive and less valuable, than profiles created by users themselves. This is a crucial point: all other forms of advertising prior to the present Invention, rely in some form or another on third party profiles of users. Thus all prior forms of advertising are inferior to Coupon Widge's system and method wherein users create, and manage, and monetize their profiles.

Therefore in preference to flooding recipients with a plethora of coupons, which are often of interest to only a tiny fraction of recipients, users create profiles of everything that matters to them. Said profiles are selectively, as per users' preferences, surfaced to coupon-sending entities by Coupon Widge. Coupon-sending entities (may) pay the user to review the relevant profiles, and thereby determine if they wish to send coupons/offers/information/et. al. to the user, and if so, coupon-sending entities (may) pay the user again for the user's time to review same.

Coupon-sending entities can, likewise, create profiles of their own via Coupon Widge (or otherwise). For instance, their profile might be of each of the products they manufacture, stores that retail those products, and entities that perform repairs, technical support and/or related services for said products. Once these profiles are created, coupon-sending entities can engage the Invention service which automatically matches their product profiles with those users seeking more information, possibly including coupons, about that same, or similar, product.

Once a profile match has been effected, coupon-sending entities then review, either manually with live personnel, or via a computer-based system which might employ various algorithmic facilities, a user's preference profile which includes preferences as to how, when and where a user would like to receive any coupons/offers/information/et. al. and a fee schedule detailing the minimum prices (which might be zero) a user is willing to accept, to receive said coupons/offers/information/et. al.

If the coupon-sending entity determines it is advantageous to proceed, coupons/offers/information/et. al. are delivered by the company itself, third parties, or via Coupon Widge.

In embodiments, Coupon Widge coupons are delivered via Tilz (data tiles), which are transactable objects, and therefore enable users to purchase directly from the coupons, even offline coupons. For offline coupons, users scan the (Net Dotz Internet Protocol IP) barcodes, which, in embodiments, results in coupon Tilz being downloaded to the user's mobile device. Tilz are transactable objects which enables the user to make purchases therefrom. The user's Coupon Widge profile includes user-selectable options, such as the ability for users to choose to allow coupons from competing products. For example, if a user utilizes Tide detergent, then the user has the Tide Tilz in their Coupon Widge profile. If they allow coupons from competing products, such as in this case Cheer detergent, then Cheer detergent is allowed to pay the user to send coupons. Competitors pay the user for the right to entice them to switch products.

Coupon Widge is simple to use for product and service providers. In embodiments, they just post all forms and variations of their coupon, and Coupon Widge pulls the appropriate Tilz to each user. So for instance, Coupon Widge can facilitate the placement or population of the coupons (Tilz) the user sees/receives when watching TV, or in their (digital) newspaper or magazine (or other).

The Invention employs and incorporates many unique technologies, such as the ability to incorporate video into digital coupons, wirelessly redeem a digital or paper coupon during a payment transaction, purchase the product/item directly from the coupon—even offline coupons—and facilitate realtime auctions for competitive coupons to those which the user is in the act of utilizing (such as at a bricks and mortar store or while shopping online), as per the detailed descriptions below.

Figure 20:
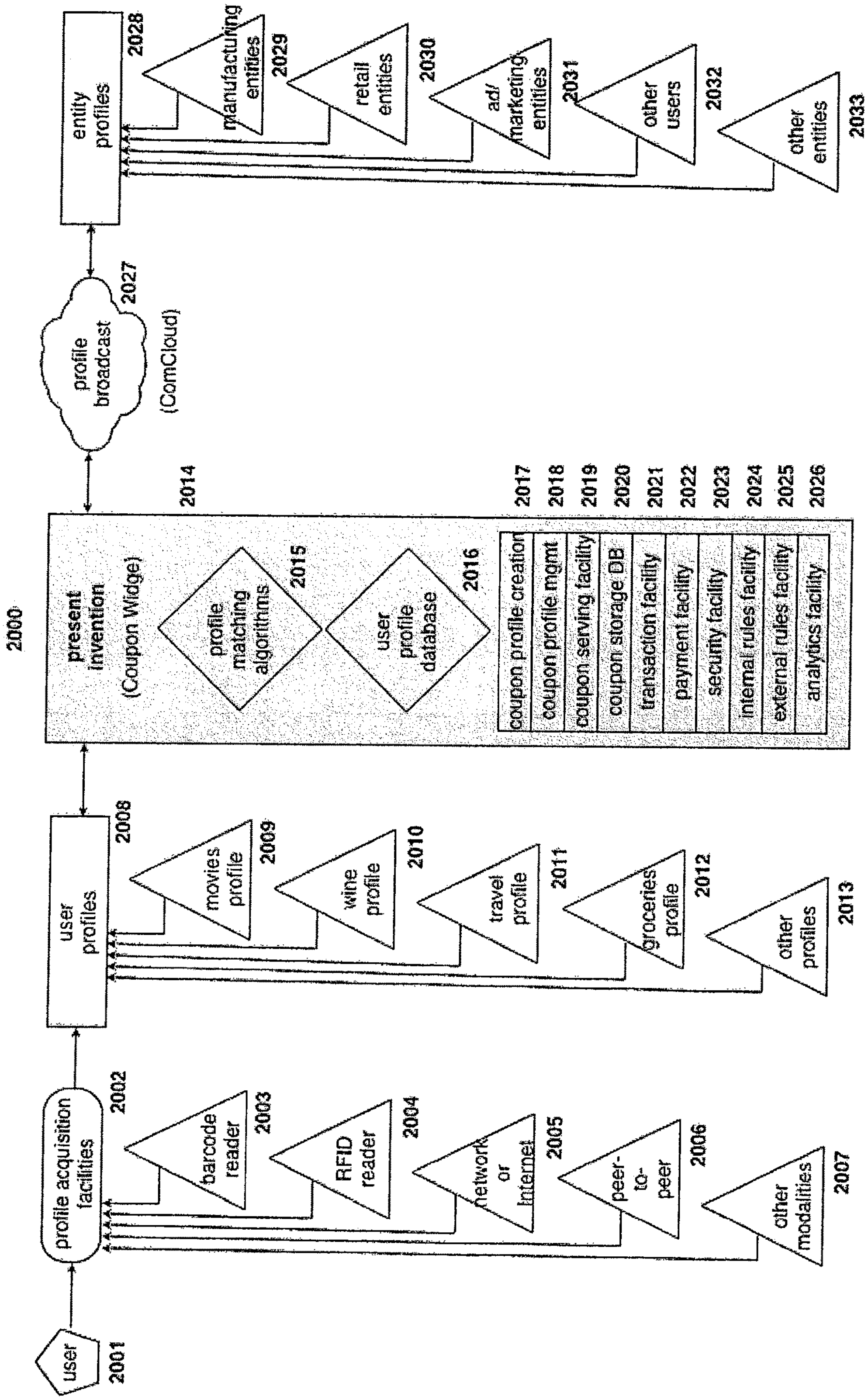
FIG. 20 is a functional block diagram illustrating an embodiment of an example of coupon profile acquisition, creation, and matching, as per the Invention's facilities and algorithms.

Having generally described operation of the systems and methods for profile based coupons, various embodiments will be described with respect to FIGS. 20-29. Referring to the accompanying drawings wherein the same reference numerals refer to the same or similar elements:

FIG. 20 shows an exemplifying architecture of an embodiment of an interactive, multimedia, customized, user-solicited coupons system, method, service, and platform in accordance with the Invention which is designated generally as system 2000.

System 2000, hereafter "Coupon Widge," represents an embodiment of the system, method, service and platform by which a user creates profiles of things, which in turn inform the coupons, offers, information and other data the user receives regarding same. The nucleus of the Coupon Widge platform centers around client and server software 2014, but which more generally consists of a plurality of computer applications, devices, components, facilities, and systems, as well as a plurality of data facilities, including various data sources and data acquisition facilities. The foregoing may be centrally located or geographically dispersed, may be locally and/or remotely interconnected, and may consist of distinct components or be integrated into combined systems. In the illustrated embodiment, the Coupon Widge platform 2000 architecture facilitates the processing of user-initiated queries entered into a query entry system functioning in conjunction, for example, with a barcode reading facility 2003 on the user's 2001 mobile device 2002. The mobile device may process the results of this query locally via client software, or transmit the results of this query to a remote server software system 2014 for further processing and/or routing to data sources and/or processing facilities, such as one or more servers, such as HTTP servers or other servers that are suitable for handling data that are transmitted over computer networks.

In embodiments, a plurality of profile acquisition facilities are available including barcode scanning facility 2003 (which may include a laser-based barcode scanner or other barcode scanning means), RFID interrogator facility 2004, network or Internet-based facilities 2005, peer-to-peer facilities 2006, among other profile acquisition modalities 2007. Profiles consist of tiles (or other units) of data about things, hereafter "tiles" or its homonym "Tilz." The user 2001 acquires a Tilz about something, such as a product (it is understood that the Invention applies not just to products, but also to people, animate and inanimate objects, ideas, et. al.), by one or more of the aforementioned facilities/modalities. Via a vis scanning the barcode 2003 of the product or interrogating the RFID 2004 tag of a product, a Tilz may be returned directly, or indirectly via means wherein the query returns the Internet Protocol (IP) address where more information, the Tilz, may be found for that product. (Other Invention embodiments not involving barcode/RFID facilities are conceived wherein the same or similar data gathering and presentation is accomplished by more conventional vehicles such as Websites or other means.) Users may also acquire Tilz via network or inter-network (Internet) 2005 means, such as pointing a browser to the Webpage wherefrom Tilz for that product may be downloaded or otherwise acquired. Additionally, users may also acquire Tilz for the product via peer-to-peer 2006 means, such as via Bluetooth from, for example, another user who already has the desired Tilz for that product, say on their mobile device. Other peer-to-peer embodiments such as, but not limited to, person-to-machine and machine-to-machine interactions, facilitated by any number of communication modalities, may be utilized to acquire a Tilz about a particular product. Other modalities 2007 are contemplated, consistent with the principles of the Invention. And further, other embodiments not involving Tilz are conceived wherein the same or similar data tracking and presentation is accomplished by more conventional vehicles such as Websites (or other means).

Once a user has acquired 2002 one or more Tilz about an object, the resultant Tilz, which is the profile of that object, is presented to the Invention's client and/or server software, for sorting into profiles 2008, which consist of logical groups and/or subgroups of one or more Tilz. FIG. 20 illustrates several sample user profiles including the user's movie profile 2009, wine profile 2010, travel profile 2011, groceries profile 2012, and other profiles 2013.

A user's profiles 2008, are then presented to the Coupon Widge client/server software 2014 which in embodiments may include profile matching algorithm facilities 2015, user profile database/storage facilities 2016, ad profile creation facilities 2017, ad profile management facilities 2018, ad serving/provisioning facilities 2019, ad storage facilities 2020, transaction facilities 2021, payment facilities 2022, security facilities 2023, internal rules facilities 2024, external rules facilities 2025, analytics facilities 2026 and/or other facilities. One or more of the foregoing facilities then processes the incoming/active profile, by a variety of means not limited to extracting keywords and metadata from the constituent Tilz containing that object's profile.

For each profile 2008 submitted to Coupon Widge, the user makes selections (or chooses to accept automatic defaults or system 2000 generated recommendations) regarding what types of data the user would like to receive, or not receive, vis a vis that profile. Granularity of data control extends to the individual Tilz within a profile. Additional choices regarding data reception control include, but are not limited to how, when and where users receive information about the product. (Incoming information about a product is hereinafter assumed to be received via data tiles or Tilz.) The types of data a user may wish to receive regarding a product include but are not limited to coupons, offers, information, or other data/content.

For example, a user who just bought 50 items at a grocery store may scan the barcode at the bottom of the user's receipt, and thereby automatically receive a Tilz for each and every item they purchased. These grocery item Tilz may then be sorted into the user's groceries profile 2012. If the user only eats Wheaties cereal, the user may elect to block, REJECT, any competing cereal coupons (which might annoy the user, who only purchases and eats Wheaties). However, a user who is a buyer of Minute Maid orange juice, and is open to receiving orange juice coupons may therefore set their Coupon Widge preference profile regarding orange juice coupons to ACCEPT.

Users may fine tune, set the granularity of, or otherwise adjust Accept/Reject criteria via the internal rules facility 2024 or other facilities. Internal rules 2024 (such as those set by the user) and external rules 2025 (such as those set by wireless carriers, and/or other third parties) are applied to user's profiles and affect various aspects of coupon delivery and presentation. Examples of rules that can be set manually (by the user) or automatically (by Coupon Widge's algorithm facilities 2015) include: 1) How, when, where to receive coupons (for instance certain types of multimedia coupons should be delivered to a user's TV from 7-9 PM on weeknights, other types of coupons are to be delivered via car radio while the user is driving home from work; and still other coupons are to be delivered to the user's handset at any time); and 2) Coupon reminders: 36 months from now start tire coupons. Coupon Widge can log the date the user purchased/installed new tires, and, if the user wishes, blocks tire coupons until the user is likely to be in the market again for tires. Conventional targeted advertising fails miserably in this regard: if a user purchases new tires today, then that user doesn't need to see tire coupons for, say, 3 years or 36,000 miles. And though the user isn't in the market for tires, that user may in fact use the word "tires" in the meantime, say in an email. Yet a conventional "targeted" advertising approach would likely serve that user tire-related coupons (wasting the user's time, and the advertiser's money) during those 3 years.

Once one or more profiles has been processed, Coupon Widge 2014 makes one or more profiles available to select entities 2028 via a user profile broadcast 2027, hereafter "ComCloud" aka "commerce communications cloud" (or other means). A user's ComCloud may be broadcast by a plurality of modalities including Bluetooth, WiFi, wireless carrier network, Internet, infrared (IrDA), and/or other available means. For example, a user walking downtown along the sidewalk FIG. 29, may choose to have Coupon Widge broadcast the user's ComCloud 2903 (such a broadcast is referred to herein as a "CloudCast") via Bluetooth in such a manner that Coupon Widge acts as a shield against information overload; a number of businesses 2907, 2908, 2909 along the user's path, may wish to send coupons 2904, 2905, 2906 via WiFi to the user's mobile handset, however Coupon Widge 2910 can block the undesired coupons, and accept just those the user wishes.

In embodiments, Coupon Widge matches the profiles of various entities 2028, against the user's profiles 2016, seeking matches for content (info/coupons/et. al.) desired by the user against content available by the entity. Such entities may include, manufacturing entities 2029 (such as the manufacturer of Minute Maid orange juice), retail entities 2030 (such as grocery stores), advertising/marketing entities 2031 (such as ad buying agencies or market research firms), other users 2032 (who may, for example, share a similar profile), and/or other entities 2033 (who may, for example, share a similar profile).

In other embodiments, where entity profiles are not made directly available to Coupon Widge, Coupon Widge searches other sources such as existing online profiles/data, and performs (profile) matching against same.

Once one or more matches has been established, Coupon Widge, as per the user's profile preferences, makes the user's profile available to the selected entity, for free or for a fee 2022 (which the user receives a portion of). Based upon the user's profile, the entity then decides whether or not to pay 2022 to send the user coupons/offers/information/et. al. as per the user's preference profile. If the payment amount is non-zero, the user receives a portion of said monies.

Those skilled in the art may appreciate that entities already pay to get their coupons/information to users; they pay middlemen entities, which make guesses as to which users might be interested in that entity's coupons. Middlemen currently peddle profiles based upon guesses (often obtained by spying on users' online activities), and those guess-based profiles are sufficiently valuable that coupon-sending entities pay middlemen to acquire such guess-based profiles. With Coupon Widge, guesses about what users want/need are replaced by facts, from users, who create, manage and monetize their own profiles—automatically via Coupon Widge. With Coupon Widge, coupon-sending entities no longer need to guess which customers and potential customers to reach and how to reach them. And since customers and potential customers instead manifest their profiles directly, via Coupon Widge, to such entities, middlemen may be disintermediated. Thus, in a logical value-for-value transaction, users are paid for the inherent value of their profiles, which because they are based-upon actual products/services a user actually utilizes, are more accurate, and thus more valuable, than the guess-based profiles from middlemen common to the conventional art.

For example, the orange juice user might (be paid to) receive a coupon from Minute Maid, which thereby hopes to convince the user to stay loyal to Minute Maid. However, if the user sets their Coupon Widge preferences 2018 to accept coupons/offers/information/et. al. 2019 from competing entities, the user might be paid 2022 to receive a coupon from a Minute Maid competitor, such as Florida's Best orange juice, which thereupon presents discounts/information in their coupon endeavoring to cause the user to switch brands.

Users 2000, via Coupon Widge 2014, interact with coupon-sending entities 2028 via their profile broadcast 2027. Examining the user's profile 2016 enables coupon-sending entities 2028 to customize the coupons. And coupon-sending entities send coupons 2019 to users who solicit same vis a vis their Coupons Widge profile preferences 2018. Hence the present Invention: interactive, multimedia, customized, user-solicited coupons 2000.

Figure 21:
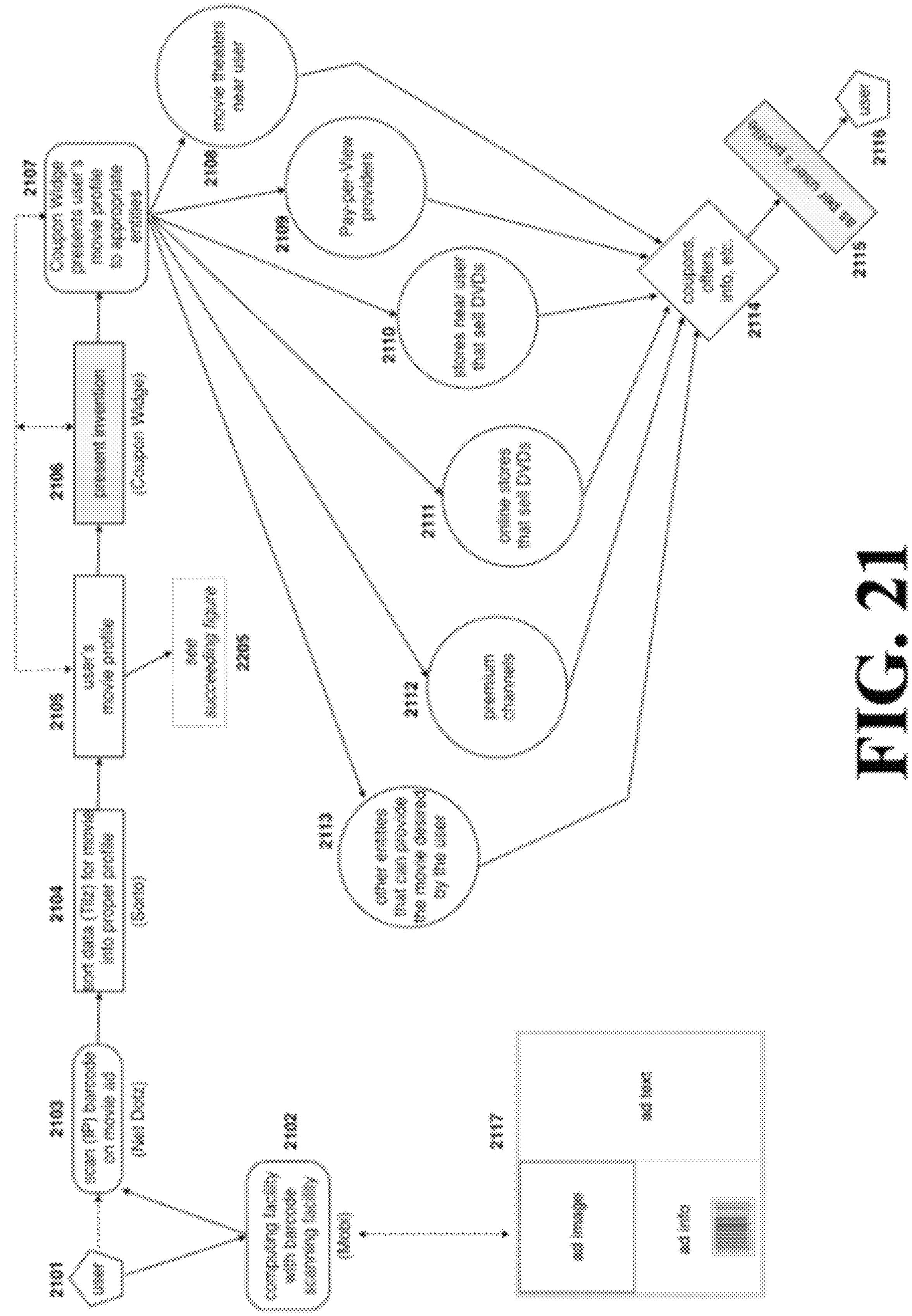
FIG. 21 is a flow diagram illustrating an embodiment of an example wherein a user scans a movie ad in a newspaper, whereupon the user's movie profile is updated, and thereby the movie-providing entities send coupons, offers, and information per the user's profile.

FIG. 21 is a flow diagram illustrating an embodiment of an example wherein a user 2101 scans 2103 a movie ad in a newspaper 2117, whereupon the user's movie profile 2105 is updated, and thereby the movie-providing entities 2107 send coupons, offers, and information 2114 per the user's profile 2115. For example, a user 2101 reading the Sunday newspaper is looking through the movie section and comes upon an ad 2117 for a movie the user wants to see "The Godfather." In embodiments the user 2101 utilizes the user's mobile handset 2102 to scan the IP-based barcode on the ad 2117 for "The Godfather." The IP-barcode includes the IP address where more information about the movie "The Godfather" can be found, and returns that information to the user's Ad Widge in the form of a data tile (a Tilz). This Tilz may include information such as theater times near the user, prices for DVDs in various store near the user, dates when the this movie will be available on a premium channel such as HBO, et. al. The Tilz users receive are customized based upon the profile of the person scanning the ad.

In embodiments the Coupon Widge algorithm facility 2015 may process the received Tilz by heuristic methods that utilize information within the metadata appurtenant to the Tilz. The algorithm facility 2015 may then promote or demote individual elements comprising the user's list of names of profiles, in order to proffer to the user the name of the suggested profile to place "The Godfather" Tilz in. After receiving the user's query response, which might include the user choosing a profile other than the one suggested by Coupon Widge, or manually creating a new profile category, "The Godfather" Tilz is sorted 2104 into the desired profile, the user's movie profile 2105. Coupon Widge then presents 2107 the user's movie profile 2105 to appropriate entities 2108, 2109, 2110, 2111, 2112, 2113, such as those entities which can supply the user the movie "The Godfather." Said entities then review the user's movie profile to determine if they would like to interact/transact with the user—a purported movie goer. For those entities 2108, 2109, 2110, 2111, 2112, 2113 that determine that the user 2101 is a party to whom they wish to advertise (or otherwise interact with or send information, et. al. to), those entities then send coupons, offers, information, et. al 2114 as per the user's profile 2115.

For example, the first place a user can usually experience a particular movie is in the theater, so movie theaters 2108 near the user, which are playing the movie the user wants to see, might pay the user to send an coupon that also touts that theater's high-end audio systems. Or another theater might make the user the following offer: purchase a movie ticket, and for just $7 more, the user can receive a download (the DVD Tilz) of the movie they are watching, while they are watching the movie, via Bluetooth or other means to the user's mobile handset. The next place a user can usually consume a movie is on pay-per-view. Pay-per-view may be offered by the user's television service provider, which can make a customized offer or discount coupon to the user to watch the movie. Next stores near the user that sell DVDs 2110 may wish to send coupons to this movie going user, to entice the user to come in and purchase the DVD in their store—which enticement may be sweetened by a customized offer. Next online stores that sell DVDs 2111 may make offers to the user. Next premium channels such as HBO may make offers or send coupons to the user; followed by other entities that can provide the movie desired by the user may wish to send coupons/offers/information/et. al. to the user.

It should be noted that a user's profile 2105 may include a preference for accepting coupons/offers/information/et. al. from related parties—in this case, say from food vendors, for delicious snacks and/or refreshing beverages that the user may wish to enjoy while watching the movie.

Finally, the Tilz that users receive are transactable objects, and thus users can make purchases directly from coupons, even offline coupons. In embodiments, users scan an offline coupon 2117 in a newspaper, and receive the Tilz for that product. That data tile (Tilz) may include profile-based links to one or more Websites where the user can purchase the product. Alternatively, the Tilz itself may include the ability to purchase the product. This functionality may be informed by the use of third party servers or Websites. Such use however, may not be apparent to the user as per the Coupon Widge graphical user interface, in order to provide a more user-friendly streamlined shopping experience. Order fulfillment may be effected by interface to, for instance, the product manufacturer/distributor/retailer's e-commerce Website (or other order fulfilling entity or process).

Figure 22:
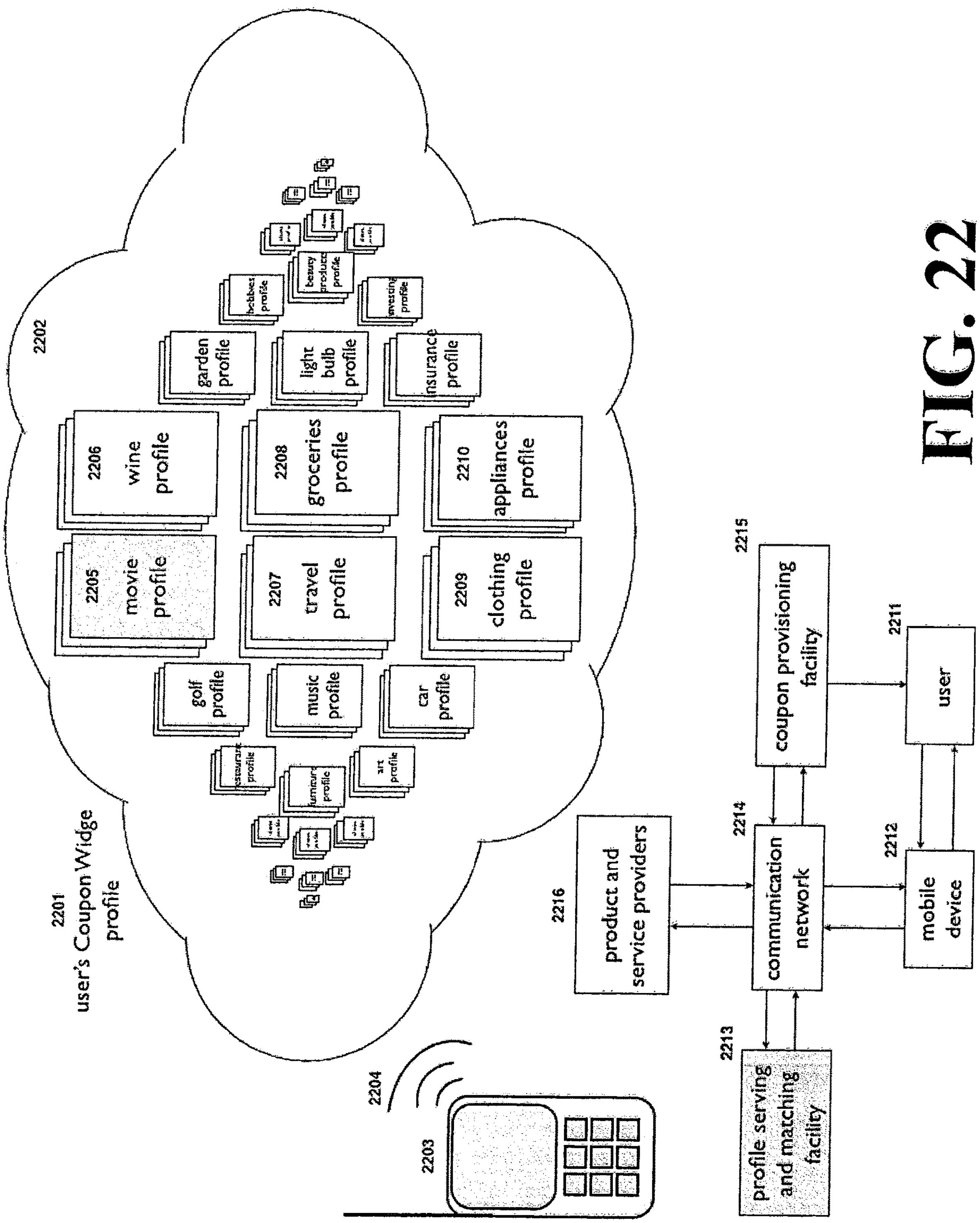
FIG. 22 is a functional block diagram illustrating an embodiment of a depiction of a user's coupon profile, and the constituent elements therein; in addition to a depiction of an embodiment of a simple schematic illustrating the functional relationships between the user and the product and service providers.

FIG. 22 is a functional block diagram illustrating a depiction of a user's coupon profile 2201, and the constituent elements therein 2202; in addition to a depiction of an embodiment of a simple schematic illustrating the functional relationships between the user 2211 and the product and service providers 2216 who wish to advertise 2215 to the user, and highlights the role that the Invention's client-side coupon profile matching facility 2213 plays in the process; in this case via the user's mobile handset 2212.

Coupon Widge is a real world coupon/information platform. Life takes place in the real world, via, for instance, interaction with the real world objects a person actually utilizes in their life. To that end, the Coupon Widge platform is accessible by devices such as mobile handsets 2203, which, pending a compelling blend of hardware/services, may emerge as the next primary computing platform, and represent the first computing platform which a user might have on their person during their every waking hour. A user's profiles can live on the user's devices, not just on the Internet or other servers. Thus, the Coupon Widge client-side software, which resides on the user's digital device of choice, enables users to create profiles 2202 as well as broadcast (CloudCast) 2204 profiles 2202 therefrom. Such profiles may include things such as: Profiles of the items they want to buy; Profiles of the types of people they want to date; Profiles of their appliances, which at some point will inevitably need replacing/repair; Profiles of those items they are performing searches for; And so on. With Coupon Widge, users interact with the profiles of others, objects, entities to get what they want/need, with far less time and effort.

In embodiments users CloudCast 2204 their Coupon Widge profile 2201 directly from their mobile handset 2203 via means such as Bluetooth, or peer-to-peer via various means (such as infrared IrDA), wireless carrier network, or other means (such as via the Internet). Thus as the user moves about in their real life, they can be constantly adding to and updating the profiles 2202 vis a vis the things they utilize in their life, and thereby constantly benefit by this realtime profile. Via Coupon Widge users essentially carry around their wants and needs (in the form of profiles), and have wants and needs met, with far less effort than as per the conventional art.

Even if a user's profiles 2202 are created and hosted locally, for instance on a user's mobile handset 2212, users can also have their profiles stored and matched via (and broadcast from) a remote server (or other device) via the Internet 2214 (or other means). User profiles can even be stored and matched on other devices such a user's PC or TV (and broadcast therefrom via a plurality of communication modalities). Multi-nodal profile synchronization can be performed manually by the user or automatically by Coupon Widge as per various rules 2024, 2025.

Companies (product and service providers 2216, including product manufacturers and retailers, as well as various advertising/marketing entities) can view user profiles 2202 and make decisions manually, or companies can create and surface their own profiles, optionally utilizing Coupon Widge, and have their profiles automatically matched in realtime 2213 with other entities/objects/people/companies/et. al. with whom they might want to share/exchange/deliver coupons/offers/information/et. al. 2215. A user's profile 2201, is matched against profiles of various companies, entities, objects, etc. 2216 and can receive information/coupons/offers/et. al. from same. Coupon Widge surfaces, for example, the user's movie profile 2205 to appropriate entities 2216, such as those entities that can supply the movie to this user. Appropriate entities may also, or alternatively, subscribe to a user's profile and thereby receive realtime or asynchronous updates for free or for a fee (as opposed to being notified manually by Coupon Widge, or being notified manually of a profile match from a prospective customer for a product/service that entity provides).

Appropriate entities may subscribe to a user's entire profile 2202, or just selected elements, such as a user's clothing profile 2209.

Other embodiments of various interaction modalities between coupon senders and coupon receivers pursuant to the principles of the Invention are also envisioned.

FIG. 23 is a flow diagram illustrating an embodiment of example process steps followed by coupon-sending entities 2305 as they first pay 2303 a user 2301 to view and review a user's profile 2306, to thereby determine if it's advantageous to pay 2304 to send the user coupons 2312; and further consider paying additional monies 2304 for priority data placement 2313 (an unique variation on paid search, wherein the user is paid; as opposed to paying a middleman/search entity).

In embodiments, via Coupon Widge 2302, the user's profiles 2201 created as per FIG. 20, are made available to coupon-sending entities, who pay 2305 the user 2301 for the rights to examine and evaluate 2306 said profiles. Advertisers may pay the user a one time fee, for access to the user's profiles for a fixed amount of time, or may subscribe to the user's profiles as per a fixed or ongoing periodical fee structure. Based upon the profile information, advertisers then decide 2307 if it is advantageous to pay the user to send ads to said user. If not 2308, then advertisers may offer to send coupons for free. Users may interact with advertisers directly or let Coupon Widge negotiate 2311 on behalf of the user. In this case Coupon Widge sets flag to ACCEPT for the subject coupon if the user has set their preference profile MIN_CHARGE (minimum charge) to zero. If not the subject coupon profile flag is set to REJECT.

In the case where the coupon-sending entity considers it advantageous to send this user coupons, which sets a transaction flag to PROCEED, Coupon Widge then presents the coupon-sending entity with the user's MIN_CHARGE fee. For any given profile, vis a vis setting the MIN_CHARGE, users may set the fee manually or let Coupon Widge set the fee. Coupon Widge may set the fee based upon a plurality of factors, including but not limited to comparing MIN_CHARGE fees for other users with a profile similar to the subject user, for the same or similar products (which may be derived by, among other means, matching product metadata tags).

At this point 2309, the coupon-sending entity is either willing or unwilling to meet the user's MIN_CHARGE. If so, the transaction flag is set to PROCEED, and the coupon-sending entity pays the user to send coupons 2312. If not, the coupon-sending entity may negotiate 2310 with the user, via Coupon Widge 2311, a lower price to PROCEED. Again, the user may either manually accept this lower price (in response to a query from Coupon Widge) or allow Coupon Widge to negotiate on behalf of the user, as per the above description. If no agreement on price is reached the transaction flag is set to STOP, and after providing both parties a receipt for the failed transaction, the transaction flag is set to END. The transaction receipt detail includes information regarding the profile in question, and the amounts one or both parties was willing to pay/accept for review of same, including the DIFF difference amount that caused the transaction to END.

For those situations where a coupon-sending entity is offering an amount less than the user is willing to accept Coupon Widge may negotiate 2311 on the user's behalf if the user has set a DIFF percentage, by which means Coupon Widge may accept/reject a proposed profile review fee from an advertiser; for example, a user may set a MIN_CHARGE of X monetary units/credits, but set a DIFF percentage of 10%, enabling Coupon Widge to accept a bid of 0.9X, or more, monetary units/credits. (Other embodiments are envisioned wherein ParaSites negotiates on a user's behalf without necessarily setting a DIFF percentage).

Understanding that a user may receive several coupons from several different coupon-sending entities, a coupon-sending entity may wish to promote its coupon to the top of the stack. In which case the coupon-sending entity pays the user a premium fee to the user for priority data placement 2313. The process for setting and agreeing to the priority data placement fee can be effected via a number of modalities consistent with the principles of the Invention, including an auction. In the case of an auction, in embodiments, Coupon Widge presents each of the coupon-sending entities a dataset, which details the order in which Coupon Widge will be presenting the coupons to the user. Coupon Widge informs the coupon-sending entities that Coupon Widge is accepting bids, consisting of additional monetary units/credits, for top priority vis a vis the ordered list detailing the order in which Coupon Widge will present the coupons to the user. After receiving all the bids (for which a TIME_LIMIT may be set), Coupon Widge re-sets the priority order in which the coupons are presented to the user according the #1 position to the highest bidder, the #2 position to the second highest bidder, and so on. Equal bid amounts are ordered as per various factors including according higher priority to bids received before other bids.

In embodiments, if and when a fee amount is accepted both by parties, for any of the above described or other cases, payment is effected by the payment facility 2022, 2303, 2304, with Coupon Widge 2302 receiving a portion of the monies/credits. (Coupon Widge only gets paid, when users get paid). Payments start at zero. Only when a user proves to the satisfaction of the coupon-sending entity, does the user 2301 receive a non-zero payment amount.

Figure 24:
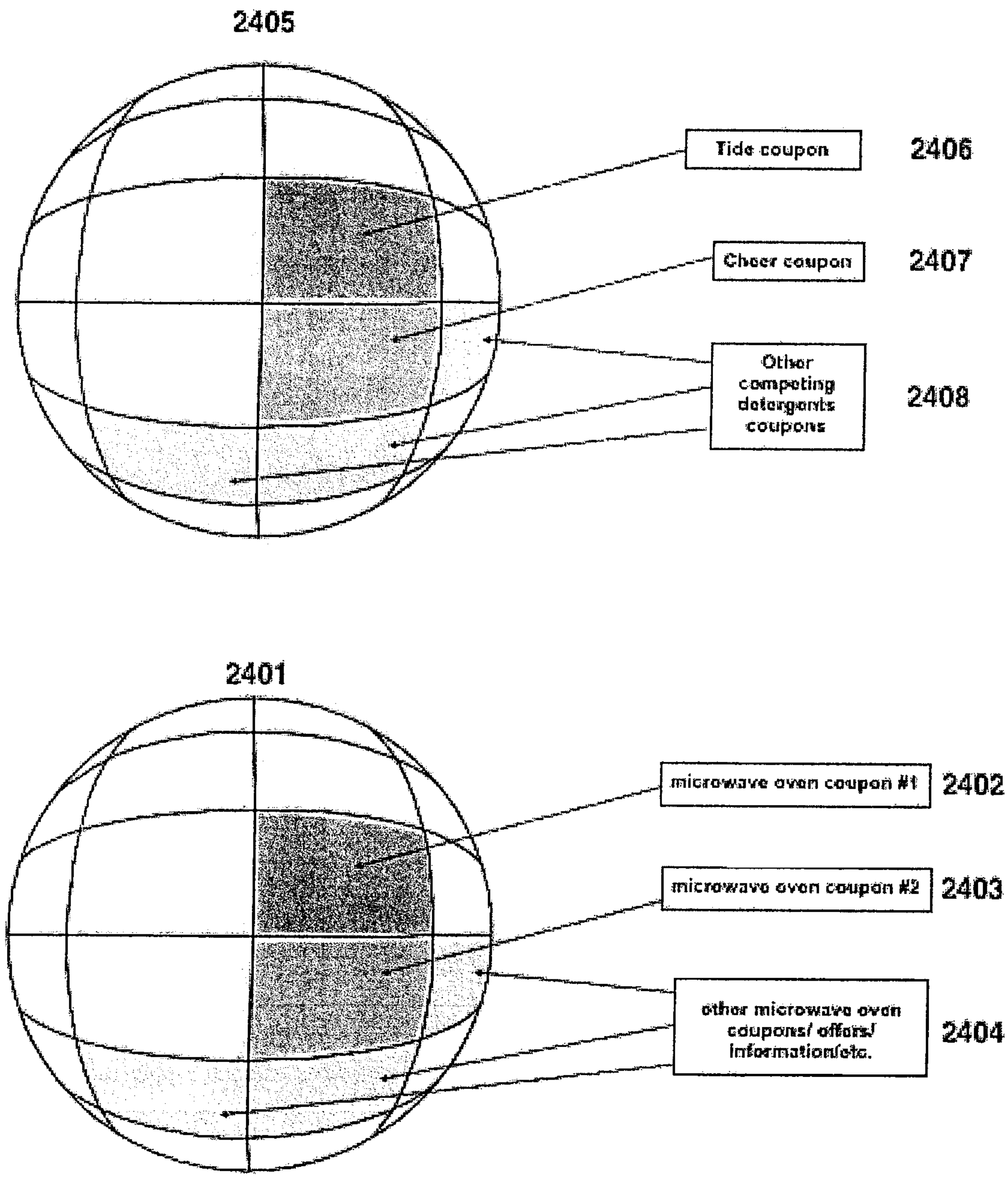
FIG. 24 is a depiction of an embodiment of an example of an unique information management facility, a Spherez, wherein coupons/offers/info/et. al. a user receives are received in thumbnail tiles that are mapped onto (in this case) a sphere; whereupon the sphere information management facility attracts like content to it, for which the user may be paid directly by the coupon sender, for prominent placement on the user's topic-specific sphere.

FIG. 24 is a depiction of an embodiment of an example of an unique coupon management facility, wherein coupons/offers/information/et. al. 2402, 2403, 2404, a user receives are received in thumbnail tiles (Tilz) that are mapped onto (in this case) a sphere 2401; whereupon the sphere information management facility (hereafter "Spherez") attracts like content to it, for which the user may be paid directly by the coupon-sending entity, for prominent placement on the user's topic-specific information spheres (Spherez).

It may be appreciated by those skilled in the art, that fields such as search are becoming inextricably linked to advertising (and the coupons that result therefrom), and thus embodiments that relate to search/advertising warrant exploration.

With Coupon Widge users can, for the first time, actually actively manage their coupons 2402, 2403, 2404, 2406, 2407, 2408. And with Coupon Widge Spherez, coupons achieve a unique level of capability and usability—thus making coupons far more valuable to users—literally making users lives better. For example, if a user's microwave oven is 10 years old, and needs replacing, the user, in embodiments, scans the barcode/RFID of their microwave oven to receive the data tile 2402 (Tilz) on their mobile handset. The received Tilz is mapped onto an information navigation facility called a Spherez 2401, which appears on the user's mobile handset screen. Spherez 2401 enable users to manage the coupons/offers/information/et. al. they receive.

As per the conventional art, a user who needed to replace their microwave oven would most likely sit down at their PC, and utilize a search engine to seek out information about microwave ovens. In fact, as per the conventional art, users often have to become a mini-expert when they need to accomplish something: find a reliable plumber to fix the leaking kitchen sink, figure out how to increase their child's chances of getting into the desired nursery school, or in this case, find a replacement for their aging microwave oven. As per the conventional art a user is likely to take a significant deal of time, trying to learn about microwave ovens: what's new since the user last purchased a microwave?; which manufacturer's are reliable?; should the user purchase the microwave online or at a local store near the user? (taking into account such issues such as product returns and repairs).

And as step #1, which ovens are right for me? As per the conventional art, a user would likely have to try to locate a tape measure, then go into their kitchen attempt to measure the dimensions of the opening of their cabinetry in which their current microwave resides. At which point the user realizes the microwave also provides the cooktop ventilation. The user may scribble down all this information on a piece of paper, which they have to take back to their PC utilize as the starting point for a long and rambling search for suitable replacement microwaves.

During the conventional art search process (which is funded by the appurtenant advertising, such as paid search), the user's time is being expended, and monies are being made by the search provider. Monies paid to search providers increase the costs of goods. Product makers build their marketing/advertising costs into the price of their products. Therefore every dollar that goes into a search engine's pocket is ultimately a dollar taken out of a user's pocket.

With Coupon Widge other entities take their time supplying information to the user, and it is the user who gets paid.

The Tilz 2402 for the user's microwave oven, contains the profile for the user's microwave oven. With Coupon Widge users don't have to become a mini-expert for all the problems they need to solve during the course of their regular life. With Coupon Widge, the user doesn't have to research the dimensions of their microwave, or try to discover the power requirements, or if it is a combination microwave/cooktop vent model. The user doesn't need to know any such details. In embodiments the user, via Coupon Widge, simply indicates that their microwave oven needs replacement and drags the Tilz for their old microwave oven from the blocked coupons (REJECT) profile, to the seeking coupons (ACCEPT) profile. And, in embodiments, within seconds, two things happen: the user starts receiving profile-informed coupons/information, and the user gets paid to receive same.

Only those entities which manufacture microwaves that fit the proper dimensions, and include required functionality (such a cooktop venting) send coupon Tilz or offer Tilz or information Tilz to the user. And only those bricks and mortar stores near the user send the user coupons, hoping to convince the user to purchase the microwave at their store.

If a manufacturer made a microwave oven that did not include the cooktop venting function (and thus would not meet the user's needs) were to send the user a coupon or information Tilz, it would be a waste of that company's time and money (as the user won't be buying their product) thus they are automatically disincentivized from bombarding the user with coupons.

In response to the newly flagged ACCEPT condition vis a vis microwave ovens in the user's Coupon Widge profile, the user may start to receive additional coupons/offers/information/et. al. 2403, 2404 presently. The Spherez maps these Tilz onto the sphere in such a way as to site the most closely matched responses as close as possible to the key position 2402 on the Spherez—currently occupied by the Tilz 2402 for the user's current microwave. Coupon Widge's profile matching algorithm facilities 2015 compare the profile of the incoming Tilz to the user's current microwave and place the best matches 2403, 2404 as close as possible to the key Tilz for the user's microwave 2402.

Alternatively if the user's Coupon Widge profile allows, coupon-sending entities can pay the user for premium data placement 2313 on the Spherez 2401 (a variation on paid search advertising wherein the users get paid, as opposed to the search engine middlemen as per the conventional art).

Several other aspects of the Coupon Widge information navigation modalities are worth noting. First, Spherez is just one of an essentially limitless number of possible embodiments for coupons/offers/information/et. al. presentation. Instead of spheres they may be cubes, or any shape the user desires. Third parties may build other Coupon Widge information navigation modalities (templates) for anyone to use, either for free or for a fee.

Spherez are a convenient navigation modality for the smaller screen size of the mobile handset (and work well with a touchscreen wherein the user can navigate the Spherez by flicking with their finger which causes the Spherez to spin, and thereby reveal the desired Tilz). Users on a mobile handset may prefer a handful of relevant search results (as per Coupon Widge), to a million blue links (as per conventional search engines).

Spherez attract like content—which revolutionizes search. With a conventional search engine, a search is performed, but the search results are generally not saved. So any given user may do the same search over and over again. With Spherez search results may be saved—the coupons/offers/information/et. al. a user receives related to a given topic may each be maintained on separate profile-based Spherez (that the user can keep indefinitely). FIG. 24 illustrates the user's detergent and microwave oven Spherez. Coupon Widge creates Spherez for each of a user's profiles. For example, a user whose hobby is comic book collecting may have a Comic Book Spherez, which stores current information (Tilz) the user already has, and continues to attract new information, such as upcoming comic book conventions, and offers from comic book sellers. Spherez are "living" entities. That is to say, they continue to function in the background, attracting like content. In the case of the user's microwave oven Spherez 2401, it might continue to attract like content, such as coupons/information about microwavable cookware, or microwave recipes, or information about sterilizing a baby's bottle using the microwave, etc. However, each user's Spherez only attracts content as per that user's profile. Thus each user's Spherez may be different, even if they are about the same topic—such as microwave ovens. If a user doesn't have a baby, that user may not receive the baby bottle sterilization Tilz. A user's profiles inform inbound messaging.

With Coupon Widge, search is no longer a process that puts all the burden on the user, instead search becomes something that happens automatically, and continuously, and minimizes the amount of time a user has to invest in the process. Coupons Widge respects the user experience. Conventional search does not. With conventional search, the search engine makes money off users; wherein Coupon Widge makes money with users.

Conventional search also fails users in other ways. Consider the case of two users in Paris, each one trying to figure out where to go for dinner. As per the conventional art, they each avail themselves of a search engine, and type in "Paris restaurants." The search engine, returns the same results for both users. There are billions of users on earth, each of whom are different, yet conventional art search engines return the same results for all users. One-size-fits-all search/advertising is a woefully inadequate solution.

Consider the additional case information that one person is a student backpacking through Europe and the other person is the CEO of a large company. Chances are the student wants to pay very little for dinner, while the CEO might be willing to pay quite a lot. Search engines should deliver different results for different people. Yet don't.

Ads are information that inform purchase decisions. The two Paris users need information to inform their restaurant choice.

Utilizing Coupon Widge is a far more effective way of informing their restaurant choice. In embodiments, Coupon Widge sets their Restaurant profiles to ACCEPT and updates the user's location information. Each user's restaurant profile may consist of a Tilz for each restaurant they've already been to, thus Paris restaurants may make an informed decision as to whether the student's or CEO's restaurant tastes are such that they are a possible match. And if so, those restaurants may send the particular user their coupon Tilz, and potentially pay the user to receive such information 2303, 2304.

In embodiments Coupon Widge blurs some aspects of the line between search and advertising. Coupon Widge delivers more relevant information to users; in this case delivering differing and highly relevant sets of coupons/offers/information based upon each user's profile; whereas conventional art search engines treat every single user on earth, as if they all had the same profile. Profile-based search/advertising, as per the present Invention, obsoletes the conventional art.

FIG. 24 also illustrates a user's detergent Spherez 2405. Coupon Widge, among many other features, enables a unique realtime challenge coupon process. For example, a user in a store, grabs a box of their favorite detergent, Tide, and scans the barcode with their mobile handset to receive via Coupon Widge any available Tide coupons. If the user has elected, as per their Coupon Widge preference profile, to receive challenge coupons, then the following may take place: the user's Coupon Widge profile is updated in realtime, including any received coupons for Tide. Coupon Widge presents an ordered list of available coupons on the user's mobile handset via the Coupon Widge client-side software. Once the user has selected a coupon, that fact is added in realtime to the user's Coupon Widge profile. Competing detergent companies, for instance, may receive an alert, that a user is actually in the process of purchasing detergent, and furthermore that the user, is about to purchase the competition's brand of detergent. There is no time when a user is more valuable to coupon-sending entities than when a user is actively in the act of making a purchase. In that moment, competitors to Tide, such as Cheer, are likely to make their most aggressive coupon offers, since the user is an active detergent buyer (as opposed to a coupon a company may send to someone who is in fact a detergent buyer, but may or may not be buying detergent anytime soon). And particularly, if the user's Household Items profile indicates that this user has been a loyal Tide buyer for years, it may take a bold gesture on Cheer's part to try to get this user to switch. It is not inconceivable therefore, that the user, via realtime Coupon Widge profile broadcast, may be offered a multi-dollar off coupon from Cheer, and even pay the user, say, 50 cents, just to review the coupon right then and there in the store. The Cheer coupon may include a provision that the coupon is only redeemable on a receipt sans any Tide detergent.

Embodiments are virtually endless, and compelling, and unique, and revolutionize aspects of search, marketing, advertising, and merchandising.

Figure 25:
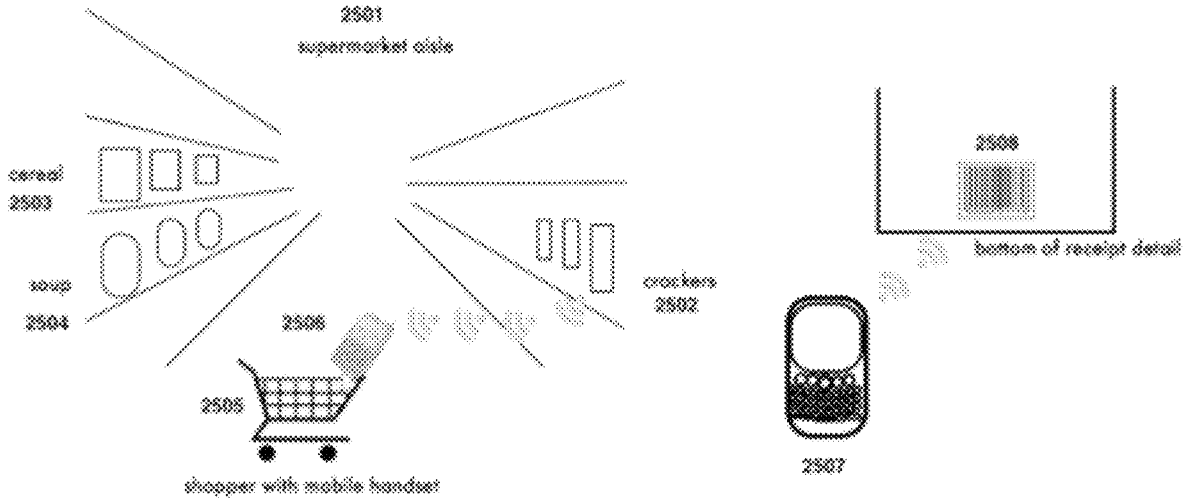
FIG. 25 is a diagram illustrating an embodiment of an example wherein products are interacting with the user (via the use of RFID); as per the user's profile the Invention is allowing the crackers to send the user information, but not allowing information from the soup or cereal. Additionally, the diagram illustrates an embodiment of an example of how scanning the grocery receipt can, if the user wishes, automatically add those items from that purchase to the user's coupon profile.

FIG. 25 is a diagram illustrating an embodiment of an example wherein products 2502, 2503, 2504 are interacting with the user 2505 (via the use of RFID); as per the user's profile, Coupon Widge is allowing the crackers 2502 to send the user information, but not allowing information from the cereal 2504 or soup 2504. Additionally, the diagram illustrates an embodiment of an example of how scanning 2507 the grocery receipt 2508 can, if the user wishes, automatically add those items from that purchase to the user's coupon profile.

One of the advertising trends that Coupon Widge enables is (in embodiments) for products 2502, 2503, 2504 to start to interact with shoppers 2505. The average supermarket 2501 in America carries 45,000 items. It would be cacophonous, if thousands of items interacted with a user, as the user walked into/through the store. Instead, users profit from Coupon Widge's shield function—a shield against information overload. Each product on a shelf 2502, 2503, 2504 in a store 2501 has some measure of information about that product available in a plurality of locations, often including Websites. Thus there are profiles of each item available somewhere, that the user can benefit from when entering and/or moving about in, for example, a store.

In embodiments such profiles can be "sent" to the user's mobile (or other digital) device as follows: the shelf end-cap under each group of like items has an RFID tag affixed. The RFID tag is encoded with the Internet Protocol (IP) address where more information about that item is located. When a user with a mobile handset 2506 featuring an RFID facility walks near an end cap, the RFID facility can interrogate the RFID tag, and when the IP address is returned, point a browser to that location, and thereby download, in realtime, a data tile (Tilz) about that item. In embodiments Coupon Widge then presents such Tilz in a unique way, by ghosting the Tilz onto the user's mobile device (in such a manner that the opacity of the Tilz is set to a percentage, say 50%) such that the user can see through the Tilz. If the user has a mobile handset with a camera facility, then the user can turn the camera facility on, hold the mobile handset up in the air in front of the user, in such a manner that the user can see the Tilz for various objects appear in realtime, as the user pans across various items on the shelf, which the user can see in the background behind the ghosted-in Tilz.

That Tilz is the profile of that item. The profile may include, but not be limited to, such information as price (which via Coupon Widge can be customized and different for different users, as per each user's Coupon Widge profile), nutrition information (calories, fat grams, etc.), ingredients list (including whether such ingredients are consistent with the diet service the user is a member of, and/or is kosher, and/or vegan, etc.), et. al. Thereby for a user who is on, for instance, a low sodium diet, Coupon Widge could alert the user to items that match the user's low sodium diet profile. And further, in embodiments, Coupon Widge then delivers coupons/offers/information/et. al. 2019 to the user, in realtime, if the user's Coupon Widge preference profile 2016 indicates such interaction is desirable, and even purchase the item 2021, 2022, on the spot, via mobile device.

Those skilled in the art may appreciate that there are a plurality of alternative embodiments and modalities to those described herein that achieve essentially the same or similar data retrieval and profile matching, in a manner consistent with the principles of the Invention (i.e. in embodiments, everything has a profile, profiles are matched, and thereby more intelligent interactions and transactions are facilitated).

In embodiments, once a user has completed their (intelligent) shopping, the user scans the barcode on the bottom of their receipt 2508, and thereby receives an individual Tilz for each items they purchased. With Coupon Widge, users can receive and manage all their Tilz right on their mobile device 2507 (local Tilz; unlike a Website, which is a remote data source that generally requires a network connection to access and utilize). All the Tilz collectively can, for instance, be added to the user's Groceries profile 2208; and individual Tilz added to other more focused profiles, such as Junk Food, Camping Trip Food, etc. or even added to a profile the user might wish their doctor to view, such as the user's Health profile, which might include all the food items a user consumes over a given period of time. Coupon Widge enables a user's doctor or insurance company or other person/entity/machine to subscribe to the one or more of a user's profiles (as per the user's preferences/permissions regarding same 2016, 2024).

In embodiments, users automatically receive the Tilz for the items they purchase (without need to scan a physical receipt) when transactions are performed electronically 2021, say via mobile handset 2507, which delivers a Tilz as the digital receipt. The digital receipt includes an individual Tilz for each item the user purchased.

Figure 26:
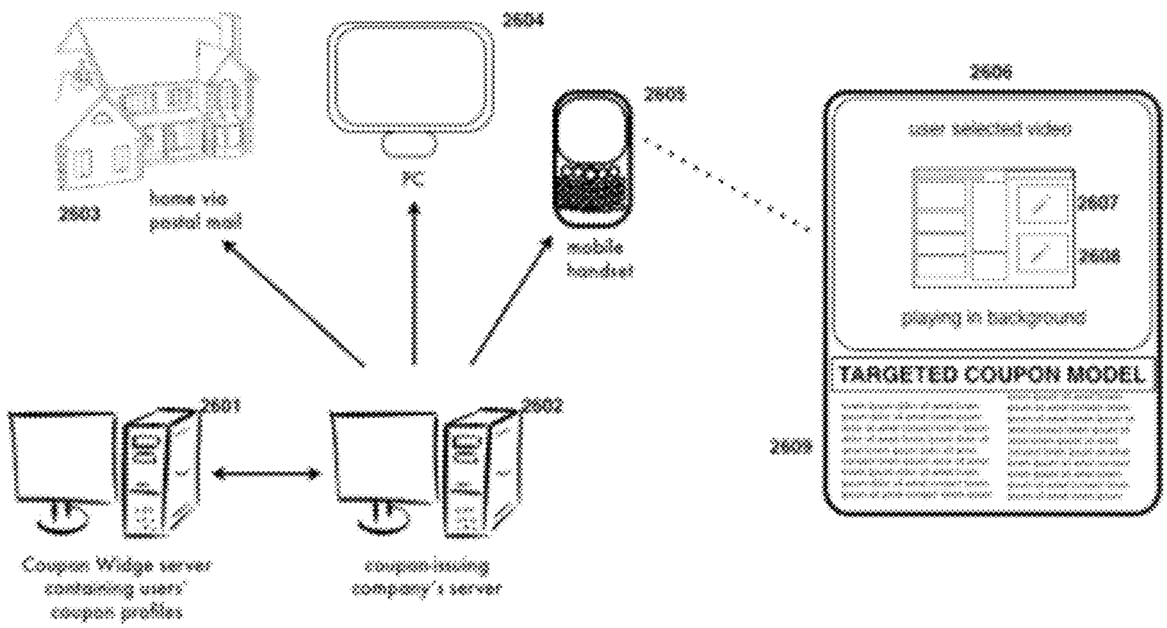
FIG. 26 is a block diagram illustrating an embodiment of an example architecture wherein a user's coupon profile informs how, when and where a user would like to receive coupons, in addition to which coupons to receive.

FIG. 26 is a block diagram illustrating an embodiment of an example architecture wherein a user's coupon profile 2601 informs how, when and where 2603, 2604, 2605 a user would like to receive coupons, in addition to which coupons to receive 2602.

In embodiments a user's Coupon Widge profiles are stored remotely on servers 2601, which coupon-issuing entities 2602 can access via various means including the Internet. Thusly fortified by the data contained in the user's profiles, coupon-issuing entities can send coupons to users, as per the user's profiles which contain preferences (among others) as to how, when and where the user would like to receive said coupons. For example, a user might wish to receive work/business-related multimedia coupons, between 6 PM and 6:30 PM, Monday through Friday, on the car radio 2603, while driving home from work; Multimedia coupons related to household items on the user's TV 2604 from 7-9 PM on weeknights; And all other coupons directly on the user's mobile handset 2605.

In other embodiments, users will carry their Coupon Widge profile Tilz around with them, literally on their mobile handset. In this case, coupon-sending entities may obtain and review the user's profile, via interaction with the user's mobile handset 2605 (and therefore, not necessarily via a remote server 2601 that also hosts the user's profiles). The coupon-sending entity 2602 may send the coupon, which is sent to the user in the form of a Tilz, directly to the user's mobile handset 2605. The user may wish to view the coupon via the user's mobile handset or stream the multimedia embodiment of the coupon from the user's handset to the user's car radio 2603 or TV 2604. In embodiments, Coupon Widge facilitates same as follows: the coupon-issuing entity 2602 sends the coupon to the user's mobile handset 2605 in the form of a Tilz. As the user is driving home, the radio broadcast includes notification signals in the metadata broadcast alerting appropriate devices, such as the user's mobile handset 2605 that a commercial break is coming up, and if the user's coupon serving facility 2019 (Coupon Widge) has any coupons to insert, indicate to this station now (so the regularly scheduled commercial can be muted) and stream them from the mobile handset 2605 via Bluetooth in 5, 4, 3, 2, 1 seconds BEGIN_USERAD.

In a situation where a content provider is serving coupon advertising-supported content, the content provider's coupon server 2602 first checks with the user's Coupon Widge profile 2601, before coupons for products or services being shown in a video, TV program, movie, Website 2606, etc. are served to the screen. In embodiments, the multimedia coupon will be streamed from the user's mobile handset 2605 to the user's PC 2609 which is displaying the Website 2606 where the video is playing. Users may be presented with a choice of coupons 2607 or 2608. Based upon the user's selection, the user's Coupon Widge profile may be updated locally on the user's mobile handset 2605 (if within, say, Bluetooth distance of the PC 2609), or remotely via the Internet to the Coupon Widge servers 2601 containing the user's profiles.

Those skilled in the art may appreciate that a user may utilize other digital devices that are similar to or different from a mobile handset, featuring wireless carrier service or not; Such devices are consistent with the principles of the Invention, and are thusly encompassed herein by inference.

Figure 27:
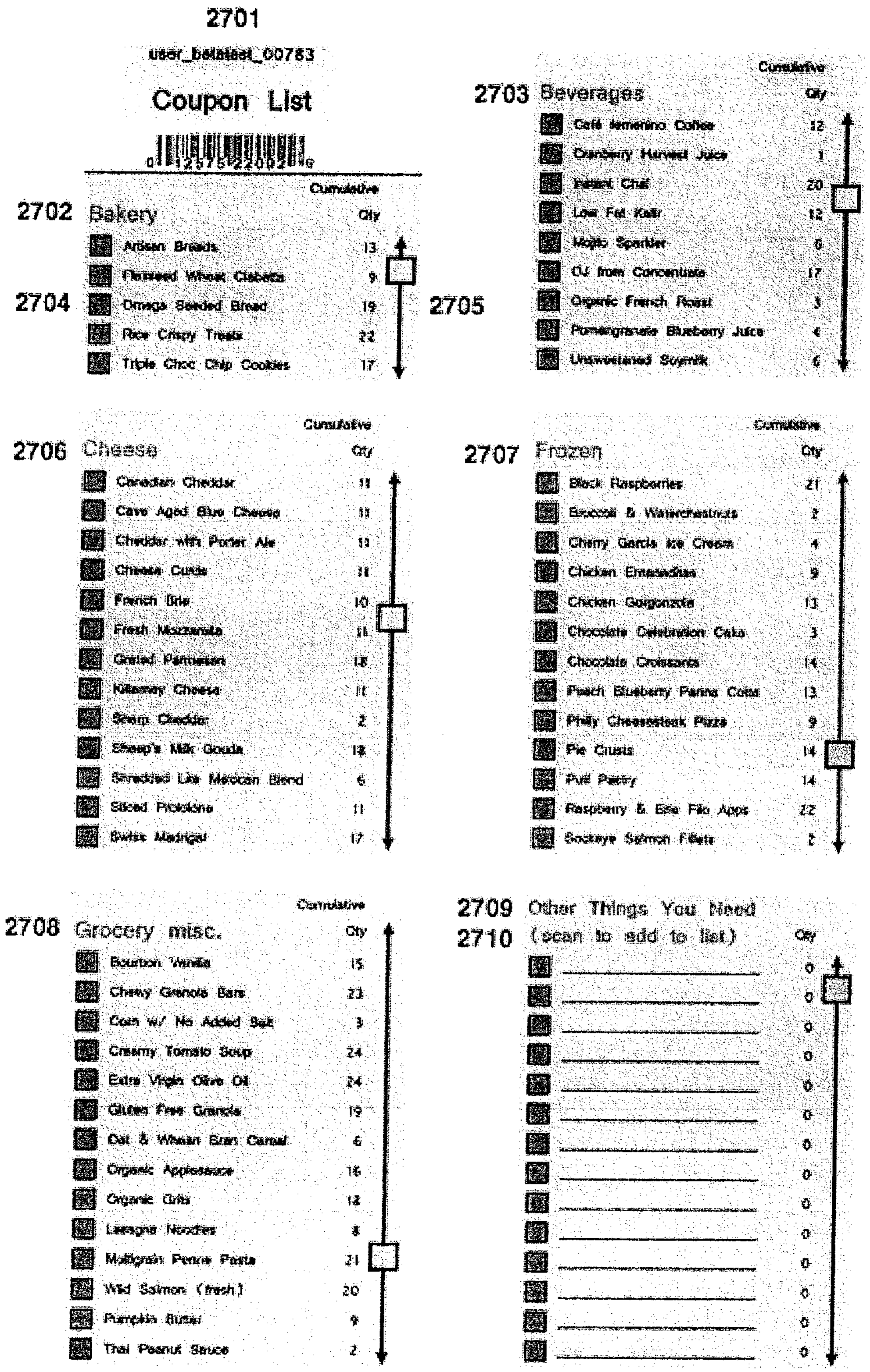
FIG. 27 is an illustrative example of an embodiment of the profile creation process depicting one of a plurality of profile creation and management user interface screens; in this case, manual profile creating via checklists or barcode scanning (as opposed to the Invention's automatic profile creation facilities).

FIG. 27 is an illustrative example of an embodiment of the profile creation process depicting one of a plurality of profile creation and management user interface screens 2701; in this case, manual profile creating via checklists or barcode scanning 2710 (as opposed to the Invention's automatic profile creation facilities).

In embodiments, users can utilize one of a plurality of data input screens to configure their Coupon Widge profile. Coupon Widge can maintain a Coupon History which can be imported into the Create Coupon List user-interface screen 2701. Users can see all their past coupons, in this example, the Groceries profile, broken down by various categories such as Bakery 2702, Beverages 2703, Cheese 2706, Frozen 2707, and Grocery Misc. 2708. Within a category, such as Bakery 2702, users can view an ordered list (per a plurality of sort options) of baked goods which the user has redeemed a coupon for. For example, the subject beta test user redeemed nineteen 2705 coupons for Omega Seeded Bread 2704. If the user wanted to solicit another coupon for Omega Seeded Bread the user could place a checkmark in the box to the left of the Item Name.

For new items the user has not received a coupon for in the past 2709, the user can add them in a plurality of ways including scanning 2710 the barcode/RFID of the item, which adds the Item Name into the appropriate category, as per the available metadata (Tilz) about the item. Coupon Widge will either suggest a category or ask that the user enter the category manually. Alternatively, the user can navigate to a blank line in any category and simply type in the Item Name, and then place a checkmark in the box to the left of the Item Name. Placing a checkmark in a box causes Coupon Widge to query one or more databases to see if Coupon Widge has, or has access to, the metadata (Tilz) for that item. If so the new item is then added to that category; if not, then Coupon Widge performs a search to find the exact product desired and disambiguate among a plethora of possible candidates if such is the case.

For existing items, placing a checkmark in a box causes the profile for that Item Name to be flagged ACCEPT—and thereby solicit available coupons as per descriptions herein.

The cumulative redemption totals for each Item Name are logged, and displayed on embodiments of the Create Coupon List user interface screen. Such data can also, at the user's option be made available (for free or for a fee, which the user shares in) to select interested entities.

Figure 28:
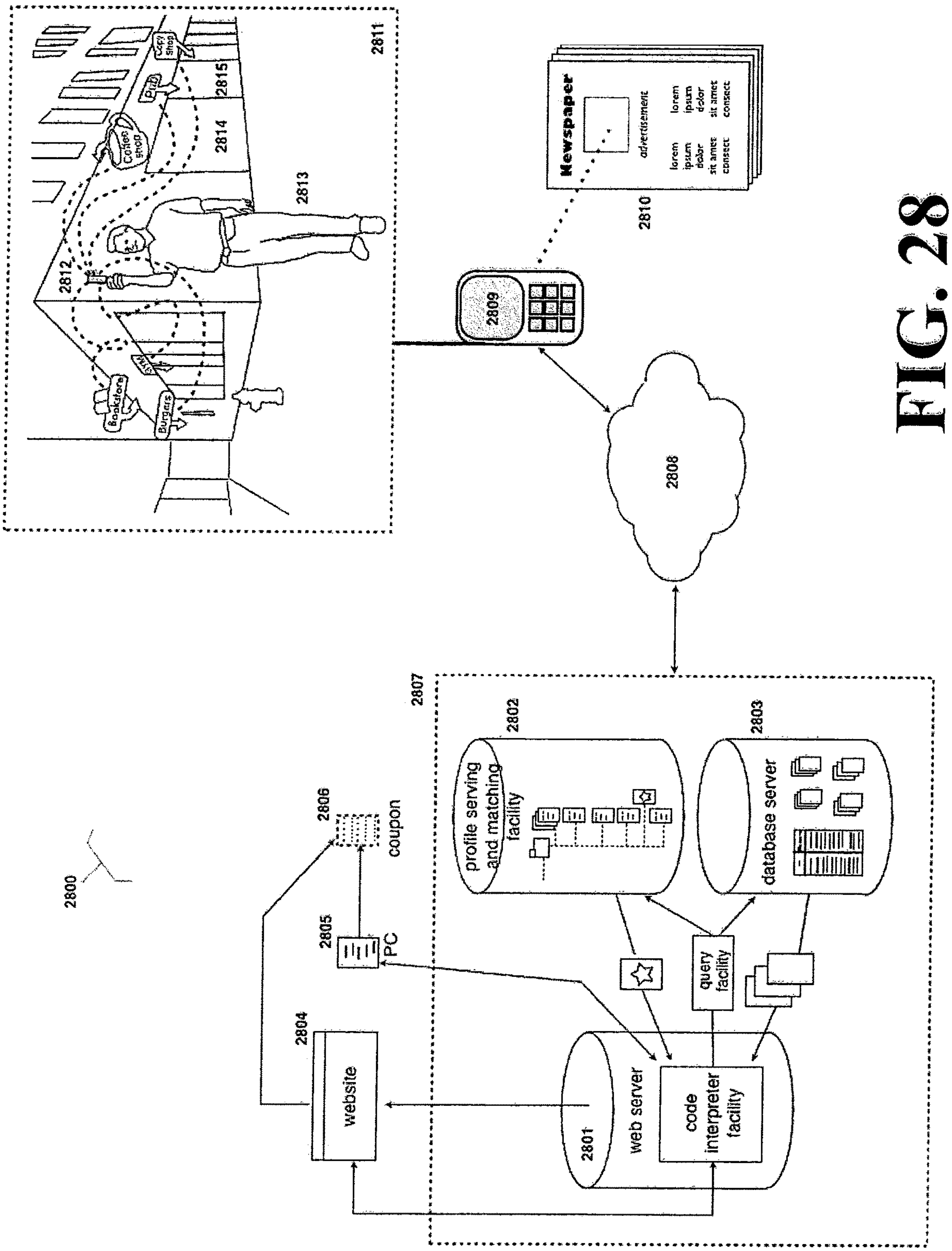
FIG. 28 is a functional block diagram illustrating an embodiment of an exemplifying architecture of a method for server-side profile configuration and transaction facilitation as per mobile handset scanning and broadcast.

FIG. 28 is a functional block diagram illustrating an embodiment of an exemplifying architecture of a method for server-side 2807 profile configuration and transaction facilitation as per mobile handset 2809 scanning 2810 and broadcast 2812.

A user's coupon profile 2809 is updated as a result of an ad 2810 the user scanned in their morning newspaper, then as the user 2813 is walking to work, various commercial enterprises 2814, 2815 attempt to send coupons to the user's mobile handset 2812. The user is shielded from information overload by the user's instantly updated coupon profile 2809 which dictates which coupons the user desires, and which the user does not. And is alerted to a desired transaction involving the coffee shop 2814.

Coupon Widge server-side facilities 2807 are provided. A profile serving and matching facility 2802 is configured to transmit profiles (Tilz) to remote devices. The profile serving and matching facility 2802 includes algorithms configured to filter and match a plurality of available coupons based upon metadata for each coupon against profiles of items a user has indicated a desire to receive (or not) coupons for. A database server 2803 facilitates user profiles and preferences, as well as a rules facility by which certain actions must accord.

Users create new or update existing profiles by a plurality of means, including, for instance, scanning an ad 2810 in a newspaper for an item a user is interested in. The scan results in a query which returns a data tile (Tilz), about the subject item, to the user's mobile handset 2809. For example, if the user scanned an ad 2810 for Acme coffee beans, and received the Tilz for same, the user, via the client-side Coupon Widge widget 2809 queries the user as to whether or not the user would like to receive Acme coffee bean coupons. The user's profile is updated presently by (the Coupon Widge client-side software on the user's mobile device, and/or) the Coupon Widge server-side facilities 2807, which receive transmission of the query results via a plurality of communication modalities 2808. The user's updated profile is returned therefrom to the user's Coupon Widge widget for inclusion in the user's profile broadcast (ComCloud) 2201.

As the user 2813, walks along and passes a number of commercial entities, said entities attempt to send various information to the user's mobile handset 2812. In embodiments Coupon Widge REJECTS all information, based upon the user's Coupon Widge profile, not flagged for ACCEPT. So for instance information-sending attempts by the burger joint, bookstore, copy shop, and pub 2815 all failed—as Coupon Widge protected the user against such information overload. Coupon Widge did let through the communication from coffee shop 2814, because Acme coffee beans are sold therein, and a coupon for same was proffered to the user. The user might not have known that that particular coffee shop sold Acme coffee beans were it not for Coupon Widge facilitating such an interaction/transaction.

In embodiments, the commercial entities review the user's profile, as broadcast directly from the user's mobile handset 2812, and if their wares match the user's wants, could then send, via Coupon Widge, a coupon to the user.

In embodiments, both the user and the commercial enterprise broadcast their profiles, whereupon the Coupon Widge profile matching facility (either client- or server-side) can alert the user to matches and present the resultant coupons.

In embodiments Coupon Widge searches other sources, accessed for instance, via the Internet 2808, for Acme coffee beans (data tiles) and/or coupons therefore, and if found, the Coupon Widge Web server 2801 presents the coupons to the Coupon Widge website 2804 wherefrom the user may display via their mobile handset 2812 the coupon's 2806 machine readable barcode for redemption at the coffee shop. Similarly the coupon can be sent to the user via modalities such as email, which the user might access from a PC 2805 and therefrom print the coupon 2806.

In embodiments Coupon Widge may be configured as a Web-based application 2804.

Figure 29:
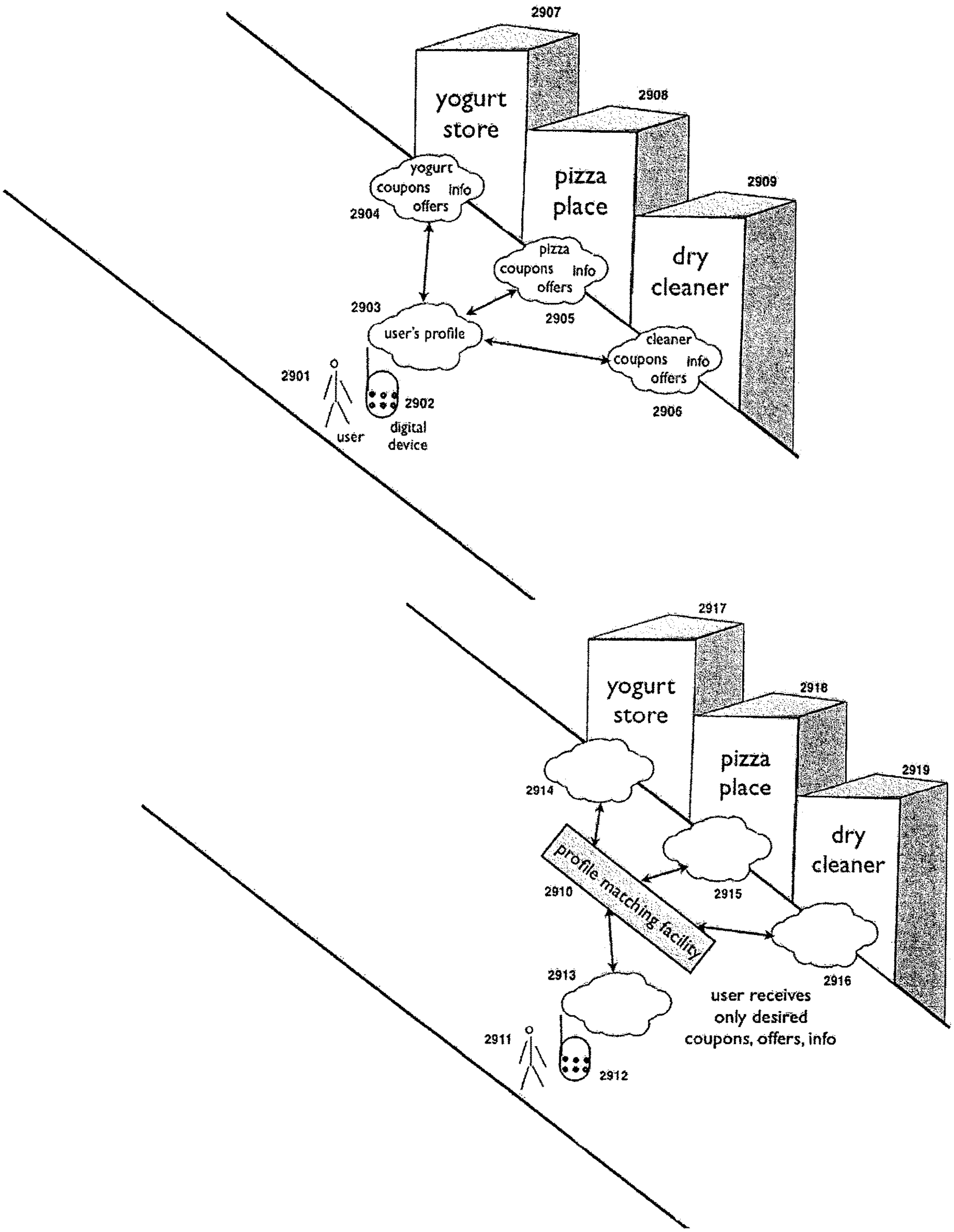
FIG. 29 is a depiction of an embodiment of an example wherein both product/service providers as well as the user broadcast their profiles, which are then profile-matched by the Invention; thereupon filtering for just those coupons/offers/information/et. al. the user desires.

FIG. 29 is a depiction of an embodiment of an example wherein both product/service providers 2907, 2908, 2909 as well as the user 2901 broadcast their profiles 2904, 2905, 2906, 2903, which are then profile-matched 2910 by the Invention; thereupon filtering for just those coupons/offers/info/et. al. the user 2911 desires.

Profile-based interactions and transactions are sufficiently superior to the conventional art that a shift to same without profile-matching facilities 2910 would be cacophonous. Coupon Widge facilitates such profile-matching 2910 via a plurality of means and modalities. For instance, all parties may broadcast cast their wants and needs 2904, 2905, 2906, 2903 via the Internet, and via client-side facilitation such profile-matching occurs.

Alternatively, such broadcasts may be facilitated entirely via local means and modalities. In embodiments, a user locally 2901 CloudCasting the user's Coupon Widge profile 2903 (say via Bluetooth) encounters various businesses 2907, 2908, 2909 also CloudCasting 2904, 2905, 2906 via local means, such as WiFi. Without need for a wireless carrier network, the user can receive just those coupons/offers/information/et. al. desired as per Coupon Widge's client-side profile matching facility 2910 configured for operation on the user's 2911 mobile handset 2912.

Peer-to-peer, user-to-machine, and machine-to-machine transactions are likely to skyrocket in the coming years, and be facilitated by an innovative system, method, service and platform such as the Invention.

These and other objects and features of the present Invention may become more fully apparent from the following description and appended claims, or may be learned by the description and practice of the Invention as set forth hereinafter.

The Invention description makes reference to barcode/RFID scanners on mobile handsets, however the same or similar information may be acquired by other means and/or modalities such as sourcing information via a Website, and/or by utilizing devices other than mobile handsets, consistent with the principles of the Invention, and therefore alternative means, modalities and devices are included herein by inference.

The Invention consists primarily, though not exclusively, of a Website, server software, and a widget (Webified mini-software application) that together facilitate a novel method for delivering and receiving advertising. Via the Website (easily accessible and usable via mobile handset) or widget, users create an account. Users then create a profile of items (or types of items) they would like to see coupons for. Advertisers receive permission from the users for the right to both view the user's coupon profile and send coupons to the user as per the user's coupon solicitation profile. Advertisers then deliver coupons to all the users who indicated a desire to receive a coupon for that specific product or service.

Misc.

When issuing a coupon, coupon vendors may, at the Coupon Widge user's option, send one additional directly related coupon (which is the digital equivalent of the obverse of the physical coupon).

In embodiments the Coupon Widge site is pre-populated with a list of various types of businesses, service providers, etc. similar to those in phonebooks, which may aid the user in building a list of specific entities or classes of entities from which the user may want to receive coupons. In embodiments the user then creates a profile listing the items they may want coupons for, including via means such as scanning the product barcodes/RFID of everyday items they use.

In embodiments when the Coupon Widge widget is active on a user's mobile handset, and the user is scanning a barcode, a query bubble (Tilz) pops up and asks: "Start Coupons for this Item, Stop Coupons for this Item, or Sorting Bin" If the user selects the Sorting Bin, the item is stored in a general folder that the user can come back to later and sort into the correct coupon profile later (or have an automatic sorting facility accomplish the same (automatically)).

Once the user has established a Coupon Profile, the user can receive coupons sent via the Internet or other means such as WiFi or Bluetooth. For example, let's say a user 2813 has added Gyms and Coffee Shops 2814 to their Coupon Profile. While walking down the street with the Coupon Widge widget active on their mobile handset 2812, the user can receive coupons according to their Coupon Profile:

Solicit, Send, and Receive Coupons

A user's Coupon Profile can be synced with the user's other profiles such as Regularly Purchased Items, Gift Registry List, Recreation List or Entertainment List (which may include item such as the restaurants, etc. frequently used by that user). Once the user's Coupon Profile is established Coupon Widge solicits coupon/offers from all service/product suppliers and other entities that match the user's preference profile.

Coupon-sending entities can then provision coupons. The Coupon Widge Website comes pre-populated with templates enabling users to create digital coupons. Coupon Widge also encourages third parties to upload digital coupon templates which they can offer for free or for a fee. Coupon senders pay users for the right to send coupons as per the preferences of the user.

Users can receive coupons on their mobile handsets (or any digital device of their choice). Once the user has solicited and received coupons, they are ready to redeem them. Coupon Widge coupons can be redeemed in person, by using a mobile handset to display and redeem the coupon at suitably equipped POS (point of sale) stations. Coupons may also be redeemed via mobile payment transaction using a unique ID number for each coupon.

In embodiments, the Coupon Widge digital, user-solicited coupon redemption process is executed in three primary steps:

1) Upon presentation of the digital coupon, the shopper receives an immediate discount for the amount of the coupons utilized in the transaction;

2) The retailer electronically presents the digital coupon to the coupon issuer for payment; and 3) Once the coupon issuer pays the retailer the coupon face amount (at specified intervals which could be daily, weekly, monthly, etc.) plus a small incentive fee, the shopper may receive an incentive such as a payment for utilizing the coupon.

All three parties can be paid simultaneously for all-digital coupon transactions (though in some cases coupon issuers will ask that retailers present aggregated audited bundles of coupons for payment). The coupon issuer may induce retailers to use digital coupons by offering a larger incentive fee for using digital (non-paper) coupons.

Detailed Coupon Widge Process

On a Website (easily accessible and utilized, for instance, via mobile handset) users sign up. Users then create a coupon profile of items (or types of items) they would like to see coupons for.

Coupon issuers pay for the right to both view the recipient's coupon profile and send coupons to the recipient as per the recipient's coupon solicitation profile.

Coupon issuers deliver coupons to all the recipients who indicated a desire to receive a coupon for that specific product or service.

Coupons can be delivered where and how the user selects: such as to social networking sites, online videos, within video games, to mobile handsets or PCs or TVs, and via email, text message or postal mail (or other means). Wireless Internet networks (such as WiFi) enable coupons targeted to specific geographic locations. GPS-enabled mobile handsets enable coupons targeted to even more specific locations.

Users can also change coupon receiving venues (for example: stop sending this type of coupon to my mobile handset, and instead send it via postal mail).

Coupons are also delivered in a format according to the users' preferences profile: coupons alone, coupons delivered within ads, detailed information on the coupon, just basic savings information, etc. Also users can control when coupons are delivered, especially in the case where users choose to receive coupons on their mobile handset. Users may not want coupons arriving during their work hours, so they can choose to schedule to receive them, say, only from 6-8 PM at night and perhaps during their lunch hour.

The Coupon Widge Website also maintains a history, at the user's option, of all past coupons received. A user's Coupon Widge can store a plurality of coupons and make use of them while shopping anywhere in the world.

Coupon Widge automatically moves expired coupons into an Expired Coupons folder. Users can make public or share with other users their Coupon List of coupons sought. Users can choose to view coupons in the Website white spaces that result from the use of ad blocking software.

In embodiments Coupon Widge coupons have an IP barcode enabling instant purchase of the item via mobile handset—for which the user may be given a discount or paid a rebate.

Coupon Profile

Users set up a profile indicating the type of items they'd like to receive coupons for, and what format they'd like their coupons to be: email, text messages (SMS), videos (MMS), mobile documents, or postal mail delivered to their home/office. Users can choose, depending upon their preferences profile to receive paper, as opposed to digital, coupons. A user's preference profile (Web Pref) also details how they'd like the information to be presented to them: high level only, intangible benefits, technical details, comparison to competitors, etc.

Users can create their own profiles, either explicitly or implicitly, either manually or automatically. Explicitly: via filling out their coupon profile on the Coupon Widge Website or on the user's mobile handset. Implicitly: via means such as barcode/RFID scanning with their mobile handset. Barcode/RFID scanning can, at the user's option, track a user's actual shopping habits. In addition users can scan barcodes of items they are just browsing, but not buying, in offline stores (which enables Coupon Widge to collect data about offline activities not included by today's digital search or advertising tools). Coupon Widge also tracks tag-related search (uTag) results to add a user's online browsing habits to their profile as well. Such barcode scanning can also track where users eat (restaurants) and recreate (sporting events attended, etc.), what users read (which books users read or own or borrow from the library), and where users vacation (hotels, airlines, etc.). Coupon Widge can track, and add to a user's profile, those items on Websites or in TV ads a user requests more information about.

In embodiments users can elect to let Coupon Widge automatically create the user's coupon profile based upon the user's barcode/RFID scanning habits. A user's coupon profile can be automatically created via the use of barcode/RFID scanners on mobile handsets to mark those items users are interested in. By scanning those items a user regularly encounters in the user's daily life (such as food items, household items such as light bulbs, DVDs purchases, etc.) it is very simple to build and manage the list of items for which users want to receive coupons for. At the user's choice, Coupon Widge can monitor which items a user barcode/RFID scans and suggest coupons that might be of interest.

The product/service Coupon Index List is pre-populated by Coupon Widge but can be added to and maintained by users and product/service vendors who want to make sure their coupons can be found.

Many of the offline, real-life items/products/objects in a user's life have a barcode/RFID that can be scanned. In embodiments, only those items that the user chooses to scan will be fed to the proprietary Coupon Widge algorithms which then automatically create the user's coupon profile. The user may also manually edit the coupon profile created by the Coupon Widge software.

Users can create a coupon profile to indicate which items they'd like to receive coupons for, and which items they don't want to receive coupons for (as well as items that they are neutral towards receiving coupons for). In embodiments, Coupon Widge features a list of items, with radio buttons next to each item for the user to click: Want Coupons, Don't Want Coupons, or Neutral. For example: if a user just purchased a new treadmill, the user can indicate that they Don't Want any treadmill coupons.

Coupon Widge users may utilize a novel type of reverse electronic "cookies" (hereafter My Cookiez)—a token or short packet of data passed between communicating programs—to send coupon profile information to TV's, radios, other devices, and various forms of online and offline activity. For example, when a user is on a Website, Coupon Widge can automatically send that user's cookies (My Cookiez) to that Website's servers (or directly to the company serving the advertising/coupons on that Website) to transmit the user's coupon profile, so the Website can display/deliver user-solicited coupons to the user.

Coupon Topic List

For each category list topic Coupon Widge collects digital coupons related to that topic. When advertisers create a coupon they also include metadata for the coupon that includes category tags/keywords. Once the coupon (with metadata tags) has been created and placed online the Coupon Widge (uTag) search engine crawls to find tagged coupons and delivers them to the Coupon Widge Coupon Topic profile.

Let's say a user wanted to see coupons for a delivery pizza, the user scrolls down to pizza in the Coupon Categories list in Coupon Widge. Coupon Widge collects coupons (based on tag keywords) from various pizza parlors and present the results in a manner described below. The user clicks on the data tile (Tilz) featuring the pizza parlor they would like to see coupons for.

Contextual Coupons

Users can also set their coupon profile to allow them to receive coupons for things not specifically listed in their coupon wish profile. So for instance while watching a sporting event on TV (or Website or mobile handset or other or listening via digital radio or other) they could receive sports related coupons (offering discounts for upcoming sporting events, sports memorabilia, etc.), but not coupons, for, say, laundry detergent.

Blended Coupons

Users can choose to allow or disallow blended ads. For example: The San Francisco Giants baseball team might offer a $3 coupon discount coupon for bleacher seats for those users who redeemed a Slurpee coupon at their local 7-11 mini-market the day of the game. Users who are a fans of live sporting events might allow such a blended coupon (which also advertises/coupons a snack food). Users into live music might allow: Digital Arts College of San Francisco presents Expression Session featuring Silver Sun Pickups (band) event coupons (which also advertises this local college).

Interest Categories

Users can also set their coupon profile to allow coupons anytime, anywhere (Website, mobile handset, postal mail) that meet the user's interest categories. For instance, movie buffs could specify in their profile that they are always open to receiving discount coupons for movie theaters, no matter if the Website they happen to be visiting has anything to do with movies or not (meaning non-contextual ads are OK if they meet the user's specified Interest Categories). And users can even set specifics within an interest category. For example, users could elect to receive coupons for just comedy movies, or just actions movies, or anything with Halle Berry in it, or romantic comedies, or any movies except for foreign films with subtitles.

Behavioral Coupons

Users can choose to receive coupons based upon the behavior of others with similar profiles, who solicited certain coupons. Such a profile might be: attends sporting events, and wine tastings, and art galleries, married, car lover, age 25-40, etc. A user's behavior profile can be imported from a social networking site, or created from scratch on the Coupon Widge Website. In embodiments the anonymous behavioral coupon matching is accomplished by Coupon Widge servers which compare coupon serving for mathematically constructed groups formed by various aggregations of behavior keywords. All permutations of up to 4 keywords at a time are examined, and clear trends with very high degrees of confidence are used to suggest coupons for a user based upon coupons solicited by others with similar behavior profiles.

Affinity Coupons

Users can choose to receive coupons based upon the interests or behavior of others in their affinity groups (women, men, college students, elderly, married, single, soccer team, etc.). For example, other women (with similar profiles) wanted coupons for these cosmetics or clothes, so this user might also.

Self-Aggregating Groups

Before all advertisers switch to one-to-one marketing, some may wish to continue to want to market to larger groups of users. Users can choose to create or join groups of people with similar profiles. Coupon Widge facilitates entente cordiale—the friendly agreement among such users to work together to maximize coupon profile monetization.

Coupon Widge aggregates these groups and makes them available to advertisers using, in embodiments, no-personally identifiable information about the users in the group. Users can join, or elect to allow themselves to be automatically added to various groups as they are created. Users get paid for the resultant coupons. Users can also choose to be the curator or host of a group. They might try to create a very large group; or they might want to be very selective about who they let in to the groups to increase the attractiveness to advertisers (and thereby increase the payment per user). Third parties can also choose to curate or host various groups of profiles.

Intramedia Coupons or Interstitial Coupons

Coupon Widge technology is compatible with embedded coupons within a show, movie, video, photo, document (Tilz) or any digital content, as long as the intramedia/interstitial content supports tags. Users can wirelessly collect such coupons via mobile handset. Intramedia/interstitial content are coupons or content that the user cannot fast forward past or otherwise skip. Intramedia coupons may float on top of part of the existing program. Interstitial coupons are displayed between shows (or during commercial breaks) but, again, cannot be defeated or avoided by the user.

Freshness

The user's coupon profile indicates to the coupon issuers how recently the user indicated a desire to receive coupons on a given subject. The time and date an item is added to a user's Want Coupons profile is indicated to those viewing the profile. Users who recently indicated an interest for a particular coupon item might be more valuable to advertisers than, say, a user who more than a year ago indicated an interest for that same item. This difference in freshness value is reflected in the price advertisers pay to view a user's profile. The more up to date the profile (on average, across all profile data) the more the marketers/coupon issuers pay the users to view the profile.

Interest freshness is automatically set to highest interest level the first time a customer registers a product interest. Then each week (or other time interval) the interest level is automatically lowered along with the price charged advertisers (and commissions paid to users), one notch. The user may countermand this automatic lowering of interest level by manually re-setting it to the highest level—indicating their interest in purchasing such a product is still very high. Users may also re-set the highest level of interest in any given item by scanning its barcode again.

This freshness process assures coupon issuers fresh interest on the part of the consumers they market to.

Usage Based Suggestions

At the user's choice, Coupon Widge, via a proprietary software algorithm, can monitor which items a user barcode/RFID scans and suggest other coupons that might be of interest. The user could also choose to let Coupon Widge automatically create the user's coupon profile based upon the user's barcode/RFID scanning habits.

Users can also indicate in their profile that they are willing to let anyone send a coupon—on any subject—if the sender meets the requirements set by the user. The user could then choose to add that coupon to their Want or Don't Want coupon profile.

Users Rate Coupons

Another unique feature of the Invention is interactivity. Coupon issuers have longed for the ability to find out how relevant/useful the coupons were to various users, in real-time, without the artificial focus-group environment. Users can choose to, or not to, rate the coupons they receive for quality and relevance, as well as suggest improvements. Users can also change coupon receiving venues (for example: stop sending this type of coupon to my house via postal mail, and instead send it to my mobile handset, where the same coupon may receive a higher rating, greater usability via a mobile handset).

In this way the Coupon Widge software engine fine tunes the likes/dislikes of its users. And by rating a coupon the very lowest rating, the user can stop all future coupons of that type from that vendor. The user coupon ratings information may, at the user's option, be made available to coupon vendors for free or for a fee. Thus, users are incentivized to rate coupons, since only coupon-rating users will receive a percentage of the income generated by selling Coupon Effectiveness Statistics back to the coupon-sending entities.

4 Types of Ratings

1) Coupon issuers can rate users (e.g. person A is a heavy coupon user, person B rarely redeems requested coupons).

2) Users can rate the coupons from the advertisers (and/or users can rate the coupon supplying company, the product vendor).

3) Usage Ratio: for each Coupon Widge coupon solicited Coupon Widge software calculates ratios such as the percentage of coupons requested vs. the percentage redeemed.

4) Purchase Ratio: Coupon Widge software assigns a score (a rating) that matches a user's purchases against their solicited-coupon profile (Coupon Widge software can track, at the user's option, the percentage of solicited coupons that lead to purchases of that specific product—across all coupons requested and utilized by a given user).

Market Research

Users who rate the coupons might receive (at the advertiser's choice) additional incentives from the advertiser, which may be in the form of a novel digital, credits-based currency (hereafter "iDough"). Coupon issuers or market research firms can also send more detailed questionnaires about the product/service coupon to selected users whose profile allows this. Thus the Invention enables a new type of real-time market research.

User Run Coupon Forums

An additional aspect of Coupon Widge interactivity is the user-run forums which give users who wish to discuss the coupons or any other matter/topic, a place to express their views. Advertisers/coupon issuers can pay to view and monitor such forums, however they may not interact with any user unless that user specifically opts-in to interaction with advertisers/coupon issuers in the forums.

Widget

Coupon Widge's software widget resides on user devices (particularly mobile handsets), and enables (among many other functions) stores, merchants, service providers, etc. to send coupons to a user's mobile handset (or digital device of their choice or in paper form to their home/office), as well as enables users to manage their coupon profile.

Purchasing from Coupons

Digital barcodes on coupons enable purchasing from coupons. In embodiments, Coupon Widge coupons contain a novel type of IP-based digital barcode (hereafter "Net Dotz") enabling, among other features, instant electronic purchase of the item. The IP address contains the location where more information about the item can be found. Coupon barcodes are easily scannable by suitably-equipped mobile handsets (Mobis) for online or offline purchases of the ad item. In embodiments, scanning the digital barcode may return transactable tiles of information (hereafter "Tilz") relating to the ad.

In embodiments Tilz function as a focused mini-Website pertaining to just the object from that coupon, enabling (among other features) instant purchases of the coupon item from both online and offline coupons. The user may be given a discount or paid a rebate for purchasing items directly from the coupon, since it saves the product/service maker the expense of paying middlemen such as department stores to stock and sell the item. One advantage of having an IP-based digital barcode such as a Net Dotz on the coupon, is that the vendor can feature the very latest pricing for the item, and even offer different pricing or discounts depending on who the shopper is. The user's reverse cookies, My Cookiez, may, at the user's option, provide the vendor the one or more profiles of the user scanning the digital barcode on the coupon. Furthermore Net Dotz digital barcodes are also electronic so users, for instance, watching TV or listening to the radio can "scan" the electronic digital barcode as they watch TV or listen to the radio, to download the associated data tile (Tilz) coupon to their mobile handset, and effect the purchase therefrom.

In embodiments the user may scan the IP-based digital barcode with their mobile handset, and be able to complete the purchase transaction using their mobile handset via the Coupon Widge widget to transmit their credit card information or other payment modality information; or pay via a novel type of credits-based digital currency, iDough.

Time Limits

There can be time limits put on any of the user's coupon profile list items. If a user just purchased tires, that user doesn't need to see tire coupons for, say, 3 years. The Coupon Widge widget can block tire coupons for three years, and then start allowing/soliciting them 36 months later, depending upon tire need at that time.

Preview and Schedule Coupons

In embodiments, such as for multimedia coupons, Coupon Widge enables users to preview coupons. Using the COUPON FORMAT described below, coupon-sending entities can also include short, say 10 second long "trailers" for their full length 2 minute detailed product multimedia coupon. If the recipient doesn't wish to view the multimedia coupon based upon the preview, the user's negative rating for the preview is sent back to the advertisers. If the recipient wants to review the full length multimedia coupon, the recipient has the option of scheduling the multimedia coupon for any time/date, or even downloading the multimedia coupon to the recipient's device of choice (mobile handset, PC, TV/set top box, DVR, et. al.) for later viewing at the recipient's convenience. Recipients can also choose to schedule multimedia coupons and other types of coupons via a plurality of manners including, but not limited to: never send again, send again but not for X hours/days/weeks/months/years and/or other options Other Profile Details Users can choose to fill out as much or as little personal information about themselves in their coupon profile. Users can choose to provide, or not, additional information that marketers/coupon issuers routinely seek out via means such as contest entry forms such as gender, age, income, zip code, hobbies, etc. The more information the user provides, the more robust their profile, which likely increases the value of the profile—and thus the amounts paid to the user by entities who pay to view/utilize the user's profile.

Instant Coupons

Coupon Widge are mobile digital-content format (Tilz) and tags/keywords compatible so, in embodiments, instant coupons can appear, for instance, across the bottom of relevant, coupon-enabled mobile documents (Tilz).

Anonymity

Users can choose to use an anonymous IP address supplied to them by Coupon Widge to receive all their coupons (via forwarding), without disclosing any personally identifiable information to the coupon issuers.

Privacy

Coupon Widge addresses some online users' privacy concerns by putting users in charge of their own coupon profile, including which information to disclose to coupon issuers. Coupon Widge does not require users to make their coupon profiles public. Users can keep their profiles private, and anonymously disclose to selected advertisers/coupon issuers just those items they wish to receive coupons for.

Security

There is some measure of fraud in the coupon business. Unscrupulous individuals and companies sometimes present unused coupons to coupon issuers seeking (undeserved) payment. Coupon Widge combats fraud in several ways. In embodiments Coupon Widge coupons are presented in mobile digital-content format (Tilz), which assigns an unique digital serial number to each coupon. In cases, for instance, where the user presents the digital coupons and/or pays for the transaction electronically (via mobile handset) a digital receipt is created detailing the serial number of each coupon used, and item purchased, in that transaction.

Coupon Format

In embodiments Coupon Widge coupons appear in an unique proprietary format (Tilz) that is optimized for mobile handsets but is compatible with a plurality of devices/objects (such as PC's, TV's, cellphones, etc.). This proprietary format has numerous features, however one interesting feature enables users to store any coupons (if the coupon issuer allows) on their digital devices for use at a later time. This unique proprietary format also allows coupons to be placed in, around, under, alongside, etc. any digital file (document, video, song, TV show, etc.). Thus via Coupon Widge, solicited coupons can appear, at the user's request, in many new places other than the traditional ones (newspapers, "Value-Packs" of coupons in the mail, etc.).

Digital Coupon Formats

Coupon Widge can present digital coupons in a plurality of sizes, shapes or formats, particularly so when using the mobile digital-content format (Tilz). Some of the common coupon formats Coupon Widge can place coupons in, without using mobile digital-content format (Tilz), are skins (e.g. wrap a movie coupon around a video), bugs (e.g. a graphic of the item being couponed that slides onto the bottom of a video as it plays: the graphic offers viewers who click on it the ability to wirelessly receive a digital coupon), and tickers (e.g. overlay coupons which insert text or graphics like a ticker-tape at the bottom of a video).

Embedded Pictures and Video

Coupons are no longer limited to just a small piece of paper. Coupon Widge digital coupons can include a plurality of embedded text and image data tiles (Tilz). Coupon Widge coupons can include a video therein. Coupon Widge coupons can also include an embedded ad in the coupon data tile (Tilz). Furthermore, Coupon Widge coupons support IP barcodes which can summon additional information, or effect interactions or transactions, when the user has Internet connectivity (or by other means).

Match My Coupon

Match My Coupon enables customers to accept bids from competing products to match or beat a coupon amount. For example, a Coupon Widge user receives a "$1 off Tide laundry detergent" coupon, but just before they use it, selects the Match My Coupon option on the Coupon Widge widget, which then causes their mobile handset broadcast that coupon and ask competing laundry detergent companies or other entities to match or beat that coupon in the minutes/hours/days before the user purchases detergent. The Coupon Widge Match My Coupon offer is displayed on the Coupon Widge Website (or other locations, such as the user's profile CloudCast) for all coupon vendors' servers to monitor and issue realtime coupons if they choose. In embodiments Coupon Widge broadcasts the impending use of a coupon and solicits other coupons that match or beat it. Thereupon local vendors or the store itself or other entities may send a competing coupon to the user's mobile handset.

Paid Coupons

Paid coupons function in a fashion similar to paid search. In embodiments, users indicate in their profile that they are willing to let anyone send a coupon—on any subject—if the sender pays the user (a user-set minimum amount). The user could then choose to add that coupon to their Want or Don't Want coupon profile. Users can create their own lists of coupons they solicit, but for those users who opt-in to the Paid Coupon option in their Coupon Widge profile, they are indicating to coupon vendors that they are willing to receive coupons from any vendor on either a Selected List of items, or All Items. That is to say, the user will still receive coupons for those items they specifically listed in their Coupon Widge profile, but also are open to receiving coupons from competing vendors. So for instance if they indicated they want Tide laundry detergent coupons in their Coupon Widge profile, but are open to Paid Coupons, then vendors such as Cheer laundry detergent can pay the user for the privilege of sending a coupon for Cheer (in the hopes of causing that consumer to try their product instead of what the consumer usually uses). Users are incentivized to use receive paid coupons because they may be paid more than the usual fee they receive for receiving coupons. The coupon sender may ask if the user liked the coupon (or just be informed whether the user added the coupon to the user's profile). Coupon senders may even conduct mini market research this way.

Related and Unrelated Coupons

Coupon Widge offers users the option of receiving coupons for products or services related to those which they already indicated an interest in. In embodiments, if the user elects the Related Coupons option, then each time a coupon is sent to the user, that is related to any of their areas of interest the user specifically elected for Related Coupons, a window (Tilz) pops ups and ask if the user if they would like to view a related coupon. For example, buy a pair of shoes, and get paid to receive a socks coupon.

Unrelated Coupons function in a fashion similar to Related Coupons but apply to products/services/etc. unrelated to a coupon the user received. Unrelated Coupons users can opt to add restrictions on the Unrelated Coupons pertaining to which device (mobile handset, TV, PC, etc.) the coupon is to be sent to, including time of day and day of week restrictions.

Users are incentivized (by the fees they potentially stand to receive) to be open to receiving coupons from vendors they have not previously specifically allowed.

For example, if the user was in the market for laundry detergent, and was leaning toward purchasing Tide detergent, a coupon for Tide laundry detergent would appear in the center tile of the data tile sphere navigation facility (Spherez). Then laundry detergents with similar characteristics (tags) would appear in the tiles around the Tide laundry detergent center tile, so that competitors who also have laundry detergent can also present the user their coupons. Coupon Widge calls these Piggy Back Coupons. The user may spin the data tile navigation sphere (Spherez) using finger flicking motions (on a touch-screen capable digital device) to see more related/unrelated results.

Sponsored Coupons

Sponsored Coupons are coupons that advertisers directly send to users, irrespective of whether the coupon meets that user's solicited-coupon categories list. Users must first choose to allow (explicitly opt-in) to receive such sponsored coupons. For instance, instead of ads that appear during a TV show, relevant coupons (as per each user's profile) can be delivered to all viewers who view the entire episode. This is a new way to monetize content. And viewers could receive coupons to watch a show delivered on a Tilz, then pass the Tilz along to another user.

Unique "Missed Demand" Tracking Capability

Coupon Widge can provide retailers with information they have never been able to track before: Missed Demand. Missed Demand is defined herein to mean when there are no more left of a particular item on a retailer's shelf, but consumers come to that shelf hoping to purchase that particular out-of-stock (or simply empty-shelf) item. For example, let's say a consumer planning to purchase four bottles of 2 liter Diet Coke goes to a grocery. When the consumer gets to the shelf it is empty. As per the conventional art the store would have no way of knowing how many additional bottles of Diet Coke they could have sold (and thus should have ordered for that sale) had their supply exactly equaled demand. Coupon Widge could sell this Missed Sales or Missed Demand information to retailers (and split this income with each consumer who helped provide the Missed Sales data). Employing Coupon Widge, the store may have the barcode tag on the edge (or end cap) of the shelf where the Diet Coke sits. If the shelf is empty when the consumer arrives, the consumer simply scans the Diet Coke barcode. A message may be sent to the consumer's mobile handset via Coupon Widge asking how many 2 liter Diet Cokes they would have purchased if they were in stock. Once the consumer has indicated the number of missed items they would have purchased a Rain Check coupon is instantly sent to the consumer's mobile handset via Coupon Widge for the number of Diet Cokes sought. (This coupon could be set to expire, say in one week, or any other vendor selectable timeframe.) Everyone wins: the consumer gets a rain check, the grocery store gets the missed demand information sent along with that consumer's shopping club profile information (if they have one), and Coca Cola also gets the data about Missed Sales (to determine store by store sales efficiencies).

This "missed demand" data is valuable information that the store (or other entity) may give the consumer a coupon (or other remuneration) for, and the manufacturer may pay consumers for indicating would-be purchase data. Not only that, but stores and manufacturers get this data in realtime. Analytics they've never had available before.

Rebates

Coupon Widge supports rebates as well as regular coupons. Users don't have to do anything additional to receive rebates, as Coupon Widge will automatically solicit and present rebate coupons whenever the product manufacturer makes them available to Coupon Widge users. In embodiments the Coupon Widge rebate process proceeds as follows: The user scans the barcode (Net Dotz) of the item they just purchased; The user scans the barcode (Net Dotz) of the sales receipt—as proof of purchase; The user scans the barcode (Net Dotz) of the rebate coupon; The user receives an instant rebate via electronic payment (iDough) or other means; Or in cases where an instant and/or electronic rebate is not possible, Coupon Widge tracks the payment status of the rebate, which may take weeks.

To further clarify the above and other advantages and features of the present Invention, more particular descriptions of the Invention will be rendered by reference to specific embodiments thereof which are, in some cases, illustrated in the appended drawings. It is appreciated that these drawings and descriptions depict only typical embodiments of the Invention and are therefore not to be considered limiting of its scope. The Invention will be described and explained with additional specificity and detail via the following applications and use cases.

Local Coupons

Unlike conventional art local advertising, local advertising using Coupon Widge will only send coupons to recipients who wish to receive such coupons. For example, a neighborhood ice cream shop using Coupon Widge could be wirelessly broadcasting (in a one block radius) a coupon for their premium ice cream. Instead of this coupon spamming all mobile handset users within their broadcast radius, only those mobile handset users who wish to receive ice cream coupons will receive the coupon on their mobile handset. Or coupons delivered, say, as a user walks past a yogurt shop. Coupon Widge facilitates delivery from the yogurt shop's owner's mobile handset (Mobi), coupons to passersby whose profiles indicate a desire for yogurt coupons or who would otherwise be a good candidate to receive a yogurt coupon. Or the pizza parlor using Coupon Widge could be broadcasting (in a five mile radius) coupons highlighting their unique pies, to attract users to their pizza place rather than their competitors. Again, only those users within that radius (who solicited pizza coupons) will receive coupons on their mobile handset (or other digital device the user designates in their coupons profile).

Location Based Coupons

Coupon Widge enables both coupon senders and coupon recipients to create profiles that set geographic limits for the scope of coupons sent/received (again with an eye toward most users of Coupon Widge using their mobile handset to receive their solicited coupons). Utilizing the mobile handset's location determining facility, coupon senders, using Coupon Widge, will know when a potential customer, that explicitly requested coupons for their product/service, is within a certain distance from their establishment.

This distance may differ for different types of establishments. For a restaurant which has not yet filled out its 6 PM dinner service, the revenue lost by unfilled seats at the 6 PM seating is lost forever, but they don't have time to attract customers who are more than a few miles away. So they might broadcast, for instance, via the Internet (or other means) a location-limited coupon, which offers a very local and very timely coupon for tonight's 6 PM dinner service. Coupon Widge's location-based coupons also determine if a user is traveling to another city, and businesses in that city can pay the user to accept coupons prior to (or upon) the user's arrival in that city.

Instead of bombarding users with coupons as they near various restaurants, users solicit, via their ComCloud profile broadcast, coupons only for, say, That restaurants, or only for restaurants under $25/person.

Timely Coupons

Coupon Widge allows both coupon senders and coupon recipients to create profiles that set time/date limits for coupons sent/received (again with an eye toward most users of Coupon Widge using their mobile handset to receive their solicited coupons). For example, it's morning in London; they are a number of plays happening tonight, however not all are sold out. Most patrons/visitors know they can go to the last-minute-tickets booth near the theaters (such as TKTS, which sell discount day-of-performance tickets); however some cannot make it to the booth, but would like to purchase a last minute, discounted ticket. So the users add London Theater Tickets to their Coupon Widge profile, and elect to permit last minute coupons.

In embodiments the TKTS booth could send out via the Internet (or other means) a coupon for tonight's plays, with a net price equivalent to that which patrons could receive if they had the time to show up at the ticket booth. In embodiments a user is made aware of the coupon via the user's Coupon Widge widget on the user's mobile handset. Tickets may be purchased directly via the Coupon Widge coupon, or online (or other means) from a user's mobile handset via several modalities, including several proprietary methods (such as iDough, Pay by Widge, and Motran).

Alternatively, for those with the TKTS widget/Parasite/Tilz, that widget/ParaSite/Tilz can query the user's Coupon Widge profile to detect interest in receiving certain promotions. And the user's Coupon Widge profile can be informed by the user's calendar. Are they free this evening? Because a user's Coupon Widge profile is on their mobile handset (Mobi), it can interact with the widget in the background. Or even send Coupon Widge profile elements (Tilz) to the TKTS main central server, to solicit discount tickets.

Smart Register Receipt Coupons

A user's coupon profile CloudCasts to the point of sale (POS) receipt printer, which coupons the user would like to receive. For example if a user just moved to a new town, that user might need a new place to get a haircut, therefore when shopping, his register receipt may print barbershop coupons, instead of random dog food coupons.

Piggyback Coupons

One user can piggyback on another user's coupons. If the originating user's profile allow this, then the originating user gets paid. For example, user #1 in a store scores a great coupon. User #2 who's also in that store wants to take advantage as well. User #2 pays an instantaneous electronic currency (iDough) fee to the originating user #1, and thereby user #2 receives the same coupon or deal. Product or service companies may even get paid. For example, user #1 scores a BOGO (Buy One Get One free) coupon for detergent. User #2 sees that this is a better coupon for detergent than user #2 already had. How? User #2 has detergent listed in their Coupon Widge profile. User #2 might have only had a 75 cents off coupon, but BOGO is better. However, user #2 has to pay user #1, and possibly even the detergent company, say 10 cents each, to get this deal. Thereby the detergent company, via Coupon Widge, has customers evangelizing on their behalf, and is getting paid. This can be accomplished anonymously: for example, a user receives the following instant message on their phone: "A better coupon deal for detergent has been found by another user in this store. Would you like to pay 20 cents to receive a BOGO coupon for Tide?" This is a truly interactive coupon, which actually engages a customer in realtime, and gets them emotionally (and financially) involved in a company's product transaction. And neither party #1 nor party #2 receive any additional monies, unless they both purchase Tide. Thus users who do a lot of research and find a great deal can, via Coupon Widge, be compensated for their efforts (if the product or service provider allows piggybacking by selling such a deal to others).

Piggyback Profiles

Originating user #1 whose carefully honed profile is now producing a lot of income or deals for that user, can sell portions of their profile to other users. Other users' profiles get upgraded temporarily to the status of user #1. If the other users use the couponed products with sufficient frequency (i.e. increases their conversion ratio sufficiently), they will get to keep their upgraded profile. Profiles=currency. Other users can pay the originating user to allow them to piggy-back on the originating user's great coupon profile. And its a win/win/win situation. The product manufacturer now has their own customer base evangelizing their product. More users are getting better deals on that product (and thus are more loyal). And the merchants are seeing increased unit sales. Coupon Widge can be introduced to businesses by users' ComClouds indicating they are utilizing Coupon Widge—and thereby can act as a salesforce for Coupon Widge.

Branded Coupons

Companies can offer to sponsor coupons, discounts, and offers made to customers. For instance, a hotel and an airline can team up to make joint travel offers. So if a user flies American Airlines, the user could get a 10% coupon from any downtown London Marriott hotel. Additionally conventional art payment processing and credit card companies such as Visa, MasterCard and AMEX could choose to issue branded coupons via Coupon Widge. A Visa "40 cents off Cheer" coupon can be thought of as the first 40 cents toward a transaction that Visa might be processing anyway.

Corporate Uses

Corporate uses include the ability to solicit product information from various suppliers, and for those suppliers to offer discounts (coupons). These solicitations can be blind (each supplier only sees the solicitation from the sender, or they can be public (like a reverse auction) so that when a sender requests best coupons, say for 500 two by fours, local lumber yards could choose to bid or not, after seeing what other local lumber yards were bidding.

Corporate Brand Elements

Tilz allow for branded elements to be embedded in them. For example, a document template might have a coporate logo included on it, in exhange for free use of the document template. In such a case, Coupon Widge users may click on the corporate brand element to solicit a coupon related thereto.

Corporations can make available branded elements that user's post on their profile Tilz, or other Tilz, in exchange for coupons for items the user is interested in. Very cool templates that user can get but instead of paying for them, the sponsor covers the cost, in exchange for that profile Tilz element proclaiming, for example, "Built Ford Tough."

Small Business Owners

For a small business owners such as a local restaurant, marketing efficiency is important. Thus its important to identify users who are likely customers of that type of restaurant, and not spend marketing dollars reaching people who don't like that type of food. For example, for an Indian food restaurant, it may be difficult via conventional means to limit marketing expenses to just those users who like Indian food. With Coupon Widge, users may have a restaurant profile which lists all the restaurants the user has dined at. Reviewing restaurant profiles, then being able to reach just those desired users (such as those who have dined at Indian restauarants on more than one occasion, or those who do so more than X times per year) is a powerful advantage that Coupon Widge delivers.

Custom Versions of Coupons

Advertisers can create a plurality of customized versions of each coupon. For example, for a tire coupon, the advertiser might create a version of the coupon that appeals to men, another version that appeals to women, and another version that appeals to teenagers who may be future tire customers. In addition, there may be different forms of the coupons for all destination formats: "junk mail" delivered to a recipient's home, radio coupons, television/set top box coupons, Website banner coupons, and coupons on mobile handsets. Furthermore coupons can also be further customized, within each of the destination formats, by the way various people like to receive their information: all text with lots of facts, or visually within a TV ad that explains how a user would feel when using the product, etc. (as per the recipient's preferences profile).

Third Party Profile Integration

Coupon Widge may import, for instance, TV viewing data from their digital video recorder (DVR) or grocery store club card data, to enhance a user's Coupon Widge profile. This imported data may be made available via Coupon Widge to advertisers or market research firms, who may in turn, via Coupon Widge or otherwise, send coupons based upon the user's thusly enhanced Coupon Widge profile.

Digital Coupon Booklets

In embodiments Coupon Widge can eliminate the millions of paper coupon booklets some stores print up and stuff in users' bags at checkout as follows: Users scan the barcode of the proto-booklet available at each point-of-sale (POS) register and aisle caps; The (user profile-sifted) coupons and rebates for that booklet are transmitted into the user's mobile handset in Tilz format; Users don't have to scan all the coupons individually; they may be automatically utilized at checkout via various transaction facilities (such as Motran Networks) and payment facilities (such as iDough); If the store utilizes certain smart labels for its products, they may have RFID tags built in which can interact with the user's profile as the user walks near the item. Coupon Widge can limit the coupons sent to the user to just those coupon types the user solicited in their Coupon Widge profile—so as not to be annoyed by hundreds of coupon offers as the user roams the store's aisles.

In embodiments Coupon Widge digital coupon booklets can be electronically available in many languages as follows: Whenever a user receives a digital coupon book, it can be presented via Coupon Widge in the user's native language as per the user's preference profile, as opposed to printed booklets which are usually only available, say, in English, due to cost constraints of printing in multiple languages. This feature may be helpful to persons traveling to a foreign country who want information in their native language about the store's products and services.

Captive Advertising Coupons

In embodiments Coupon Widge informs captive audience display screens. For example, when a user steps into an elevator or is at a gas station pump featuring an advertising screen, the user's mobile handset, via Bluetooth or other means, may broadcast the user's Coupon Widge profile and coupons may be sent that the user has solicited. Coupons thusly delivered can be for gasoline when at the gas station, or products in the mini market at the gas station, or coupons for the carwash attached to the gas station, as well as coupons for businesses near that gas station; but in all cases in accordance with the user's profile. Users can opt to receive coupons (on their mobile handset and via postal mail, etc.) that relate to those products/services being advertised on the captive screen. Alternatively the user may scan the barcode/RFID directly from the ad on the screen to receive the coupon. In emerging-market countries with limited Internet access, providing a place where users update their profiles/Tilz at a captive location (which might be one of the few places in town which has Internet access) may be crucial.

Competition Coupons

While buying Tide detergent, in realtime, in the store, standing at the user's cart, get paid to allow Cheer detergent to send a competition coupon. Coupons can become ads. When a user receives a competition coupon, they might want to know why Cheer is better than Tide. To turn the coupon into an ad the user simply taps on the coupon to get the Cheer ad Tilz. The ad Tilz that the user receives will be in accordance with the user's preferences profile (Web Pref) and advertising (Ad Widge) profiles. The ad Tilz might be a 10-second video the user watches ala minute (right then) on their mobile device or the user might choose to receive more detailed ads via the car radio on their drive home from the store or even during their TV viewing that evening.

Request More Information

About Ads/Shows/Movies Seen on TV

Users watching television who, for instance, see an advertisement for a product they would like more information about can wirelessly submit a Request For Information (RFI) to the product manufacturer via Coupon Widge. Alternatively, the user sees something on TV, (for example, the shirt that TV actor was wearing), wants more information, and receives a coupon for $5 off that shirt from Macy's. The response to this RFI can be to send, via Coupon Widge, the user a coupon or a longer advertisement, or a brochure in the mail or e-brochure, etc. according to the requester's preference profile (Web Pref). In embodiments the user interacts with the TV via the use of a widget (Tube Widge) that completes a Bluetooth (or WiFi or other) handshake and information exchange between the user's mobile handset and the user's TV via the user's DVR, set top box, or other means. Identification of the proper ad or show or movie or other thing that the user desires more information about is possible for those ads/shows/movies or other things encoded/labeled with a digital IP address (IPv21 #) or IP digital barcode (Net Dotz), or via utilization of the TV metadata broadcast, or via other means.

Reverse Coupons

In cases where Coupon Widge forms groups of users who are about to make a certain purchase, in a certain geographic area (say those imminently ready to buy 4 tires, or even just a bag of charcoal for their weekend BBQs), Coupon Widge via means such as digital task agents (Victors Botz) or ComCloud CloudCast, solicit companies who wish to offer the best fulfillment of this need. Reverse coupons are for those advertisers which may prefer to deal with groups of users, rather than one-to-one marketing, and one-to-one coupons.

Patient or Client Communiqués

Doctors, for instance, can, via Coupon Widge, send coupons along with information about procedures or tests that the doctor thinks that patient should consider undergoing. Consultants or any vendor with clients can send coupons to their existing client base seeking to entice them into purchasing additional products or services. For instance, personal shoppers at fine department stores often keep customer database lists of hundreds or thousands of names. Personal shoppers could send coupons with pictures or videos of outfits or accessories that are on sale or would particularly suit a given client demographic, as per users' Coupon Widge profiles.

New Customer Follow Up

The week after a customer makes their first purchase in a store (online or offline) is one of the best times to market to that customer. Retailers, as per users' Coupon Widge profile, could send coupons to that user's mobile handset in the days following that first purchase to attempt to entice the customer to come back and purchase more of that store's products.

Multi Coupons

Multi coupons refers to different coupons for different users all watching the same show. For example, four users are sitting on a couch watching the same TV show. During commercial breaks, different commercials are delivered (via means such as WiFi or Bluetooth or other) to each user's mobile handset whereupon each user receives customized, and possibly differing, coupons. Then when the commercial break is over, users return to all watching the same content on the TV.

The present Invention may be embodied in other specific forms without departing from its spirit or essential characteristics. The described embodiments are to be considered in all respects only as illustrative and not restrictive. The scope of the Invention is, therefore, indicated by the appended claims in addition to all foregoing descriptions. All changes which come within the meaning and range of equivalency of the claims and foregoing descriptions are to be embraced within their scope.

The Wireless Location-Establishing Device Provides a Platform for Customizable, Portable, Auto-Syncing Local Websites A system, method, service and platform for providing customizable, portable, auto-syncing Websites are disclosed. The present Invention ("ParaSites") is the next evolution of a Website—portable Websites which also, or even exclusively, live on the user's digital devices of choice; not just at the hosting server. Because they are stored locally, ParaSites are available and functional on devices such as a user's mobile handset, even when an Internet connection is not available. Having Websites always available—on the user's personal computer and on their television and on their mobile handset—changes how users interact with Websites. Websites become much less of a one-way information presentation vehicle, and more of an interactive, constant companion to the user, anticipating and supplying the required/desired digital content or services.

Up until now (2003), Websites have been an information display vehicle which the user has to "go" to, as opposed to the information being at the user's fingertips when desired. Furthermore, Websites can be difficult to deal with vis a vis fundamental aspects: it can be expensive, trying, and/or time consuming to obtain a domain name, have said domain hosted, and then create the Website. Very few individuals, as compared to the world's population, are conversant in HTML, a lingua franca for Websites. And thus, most individuals are unable to personally and quickly achieve what one might wish to achieve via a Website: share, exchange or otherwise display information such that one or more parties or entities can access and utilize said information, and thereby potentially engage in interactions or transactions or other concerts.

The present Invention (hereafter "ParaSites"), is conceived as a response to the above-described deficiencies of the conventional art. ParaSites turn the concept of a Website on its head—instead of users going to Websites, Websites now live wherever the users are.

Rather than the users having to interrupt the tasks of their day to go to a PC, sit down, and surf to a Website, ParaSites' proprietary technology enables users to have the Websites of their choice live and reside on the user's digital device of their choice. For some users the digital device of choice will be the mobile handset, for others it will be the TV (or other device). Shifting usage locales (to multiple and/or unconventional locales such as gaming rigs, cars, et. al.) drives demand for new incarnations of Websites. Present: a Website is a place where users "go." Future (with ParaSites): a Website is a place where users already "are." Websites at users fingertips is the next wave.

In embodiments, ParaSites contain a user-selected subset of a conventional Website's content—just those items the ParaSites user most frequently needs access to. A ParaSite's content can be synced with the main Website when the user has connectivity to the Internet. However, users may obtain a more updated version of the ParaSite from a plurality of locations, including other users' devices via means such as Bluetooth.

Websites have been around for years without major change. They were largely designed for a user sitting at a personal computer (PC) who has to actively take steps to connect with the Website to access its contents.

Websites were designed around the idea of a buffet at which the user can graze for the sought after information. And while such a design paradigm has worked fairly well to date, a tectonic shift is occurring in the computing industry.

At over 20 years of age the PC is reaching maturity, and a new hardware platform, the mobile handset, is being ushered in as the preferred computing platform. In some markets, mobile handsets outsell PCs almost 10:1. And more than a billion mobile handsets are sold each year. In fact there are now more mobile handset users on earth, than non-mobile handset users.

As the tectonic shift unfolds, and more and more users migrate to the mobile handset as their primary computing platform, it drives demand for the next generation of all things digital, including the Web stalwart—the venerable Website.

Users often utilize but a tiny fraction of available content on a given Website during a given session. Thus it would be desirable to determine which content a user is likely to want to interact with and present just that subset of content/information to the user a priori. Furthermore, there are billions of people on earth with differing preferences as to how they'd like content/information presented to them. Therefore it is desirable to customize the content/information presentation as per user preferences. Still further, networks, and in particular wireless networks, may be challenged to expeditiously deliver the geometrically growing volume of content/information. Therefore it is desirable to push such content/information as close as possible to the user, to facilitate efficient content/information delivery (similar to conventional content delivery networks, such as Akamai). ParaSites' customizable, portable, auto-syncing Websites address the aforementioned deficiencies, by automatic/manual creation of portable Websites (ParaSites) which also, or even exclusively, live on the user's digital devices of choice; not just at the hosting server.

Local Shift

It's time for technology to serve users rather than the other way around. And in that vein, it's time for the Website to do a better job of meeting users' needs. One way this can be accomplished is to shift the "location" of Websites from the Internet to the users' digital devices.

ParaSites enable Website owners and Website users to create, manage and utilize a customized local copy of a Website on the digital device of the user's choice. The local copy of the Website, the ParaSite, contains just the information from the Website that the user wishes ready access to—not the entire Website contents.

Favorites

Instead of users going to Websites, favorite Websites come to users. ParaSites enables live local versions of a user's chosen Websites to be available on the user's PC, and their TV, and their mobile handset (and other devices)—even when an Internet connection is not available.

Most users have a dozen or so Websites they regularly visit. Users can keep local copies, ParaSites, of those Websites on, say, their mobile handset. ParaSites can be displayed and interacted with via a touchscreen display. ParaSites contain the user Preference Profile customizable version of those Websites and are automatically updated each time a user has Internet access (or via other means).

Website Functions

Websites have two primary functions: display information and execute tasks. As an information display vehicle a Website often contains far more information than any one individual Website user actually utilizes on any given visit to that Website. Furthermore, when executing a task, software often resides on a remote Web server, and thus there are performance deficiencies as compared to that same task being executed by software code on a local device. That is to say, software runs more efficiently and smoothly when on, say, a user's PC, than when accessing that same code set remotely via a network connection wherein the code is resident on a remote server.

Accordingly it is desirable in some circumstances to have both the information sought, and the software code, local—actually on the digital device the user is utilizing at the moment. Hence the present Invention ("ParaSites") which provides customizable, portable, auto-syncing local Websites.

Information Overload

Often when a user goes to a Website, the user utilizes less than 1% of the total information content at that Website. Furthermore, in many cases, users to a given Website utilize a similar set of information each time they visit a given Website—for instance, view the top political news articles from the CNN Website.

ParaSites anticipate this usage trait, by pre-downloading data/content from a conventional Website, to the local ParaSite version on the user's digital device of choice. That is to say, ParaSites software studies the user's information usage patterns, and serves up that information, say, each morning, to the user's ParaSite, so the user doesn't have to "go" to the CNN Website and grab the information sought.

Furthermore, by having the information/content local, the user has a functional value product, without need for a live Internet connection. Not only is this desirable in many wealthier countries, but this is particularly important in second and third world countries.

In second and third world countries, it may be decades, if ever, before the network infrastructure approaches that of first world countries. Therefore, a new type of Website is desirable, that lives locally, actually on user's devices, and which can be obtained and shared by non-Internet means.

In first world countries, paying $100/month for a minutes and data cellphone plan may seem reasonable, but for some second and third world countries, $100/month may be an entire month's wages. ParaSites were conceived to suit the needs of a 5 billion person addressable market, instead of the 1 to 2 billion person addressable market, ostensibly sought by today's "leading" makers of various digital devices.

Website Evolution

Websites have evolved over the years, and have now become something of a dumping ground for the Website owning entity. The Website owning entities often dump just about every available datum onto their Website, which over time results in a cluttered user-interface, or complex search experience to locate the desired information; or area wherein one can perform the desired task.

And similar to the situation where a user utilizes perhaps just 1% of a Website's data, most users utilize only a tiny fraction of any given software program's functionality. Thus Website owning entities can review which specific features of their Website software applications are utilized most often, and deliver just those features via a local widget (Webified mini software application)—which is part of the ParaSite.

Functionality and data access, and more importantly the most often utilized functionality and data, are the subsets that inform each entity's ParaSite. The paradigm shift to a new computing platform—the forthcoming smartphone (and other mobile/smaller computing devices)—provides impetus for Website-owning entities to re-examine the interface with their users, and ParaSites are the perfect platform to meet these emerging needs.

And as more and more users move to the emerging mobile device platform, such devices may become the primary tool for interacting and transacting. Thus, developers need to deliver not just static software applications that run on mobile devices, but live applications; live data access (via, for instance, the conventional Website), and live transactability (such as being to transfer money from checking to savings). ParaSites provides a development platform for the next generation of computing devices. It should be noted, however, that ParaSites are not limited to the forthcoming mobile devices, and are designed to be functional on almost any digital device, including legacy PCs, as well as other devices such as gaming consoles, set top boxes, TVs, and other devices.

Websites are information delivery vehicles as well as interaction/transaction vehicles. ParaSites also deliver local and/or offline interaction/transaction capability. ParaSites provide custom versions of Websites with just the content the user desires, presented the way the user desires, and available to the user anytime, anywhere on any device, even offline. With Parasites, users can take their Websites with them all day long, wherever they go in their real life, so they can be useful to the user, right when and how the user needs them. Instead of delivering a bloated Website, with (potentially extraneous) information such as all prior Press Releases, to a user's mobile device, the ParaSite delivers just the capability/information sought by the user. For example, for a pizza delivery company Website, instead of delivering gigabytes of undesired data such as ten years of past Annual Reports, the Pizza Delivery Company ParaSite, includes the ability to review the menu and place orders—and perhaps not much more. Study what 80% of users do with a given Website 80% of the time, and deliver just that functionality/data. Users who want more functionality/data can either download such functionality/data to their ParaSite, or access such functionality/data on the conventional main/parent/hosted Website via the ParaSite. ParaSite's user interface is configured such that, in embodiments, accessing the conventional main/parent/hosted Website is seamless process that may be undetectable by the user (if such a configuration is deemed desirable by the Website owner/user).

Websites were invented over a decade ago, and have changed very little in the meantime. The mobile device revolution and the variety of screens upon which Website content will be viewed informs the desirability of new modalities for Websites. ParaSites are the future, driven by the mobile device revolution. A customized experience where users are first, and users get paid for utilizing a new, more convenient, mobile, and always available form of a Website—a ParaSite.

The present Invention is described in one or more embodiments in the following description with references to the Figures. While the Invention is described in terms of the primary modes for achieving the Invention's objectives, it will be appreciated by those skilled in the art that it is intended to cover alternatives, modifications, and equivalents as may be included within the spirit and scope of the Invention as defined by the appended claims and their equivalents as supported by the disclosures and drawings herein.

A primary purpose of the system, method, service and platform for providing customizable, portable, auto-syncing Websites described herein is to advance Website technology into the mobile age. The disclosed system, method, service and platform enable a novel form of always available Websites. Websites on the user's personal computer and on their television and on their mobile handset, et. al. changes how users interact with Websites. Websites become much less of a one-way information presentation vehicle, and more of an interactive, constant companion to the user, anticipating and supplying the required/desired digital content or services.

Although various embodiments of the Invention extend to any system, method, service and/or platform that operates in accordance with the principles described herein, one embodiment is described in the context of a Website, server software and one or more widgets (Webified mini software applications) that are collectively referred to herein as "ParaSites".

According to this embodiment of ParaSites, the server software, Website and/or widgets enable users to create a customized, interactive subset of a primary, conventional hosted Website. The ParaSites Website and/or widget(s) contain in addition to local Website management and customization features, social networking tools such as profiles, comment sharing, blogging, chat, message boards, media sharing, social mapping and tagging.

Software

The adaptive server software of the present Invention is capable of analyzing the usage of Websites (including local Websites, such as ParaSites) and various sections of Websites. The software produces as an output analysis of and reports about the data collected from hosted Websites and ParaSites usage. Such information does not reveal any personal information about any one user; instead it provides Website owners aggregate information about the effectiveness of their hosted and local Websites. Reports include unique full-color, three-dimensional views of hosted and local Website section by section usage information.

Compatibility

Website owners do not have to rewrite their Websites to make them ParaSites compatible. All the information on a hosted Website can be utilized as-is; it is just divided into "tiles" to make it easier for users to pull the desired sections/information to the ParaSite. Website owners can make their Website's ParaSite compatible in two primary ways:

The ParaSites widget can generally pull content from most Websites' publicly accessible Webpage. When a ParaSites widget user clicks on a particular section of a Website, the ParaSites widget creates a generic template for that Website and pulls the selected content into that template (if the Website allows such data/content to be copied or utilized in that fashion). That is to say, ParaSites software is able to create a basic "Website clip" of many hosted Websites, without need for those hosted Websites to take any action.

Figures 38, 39:
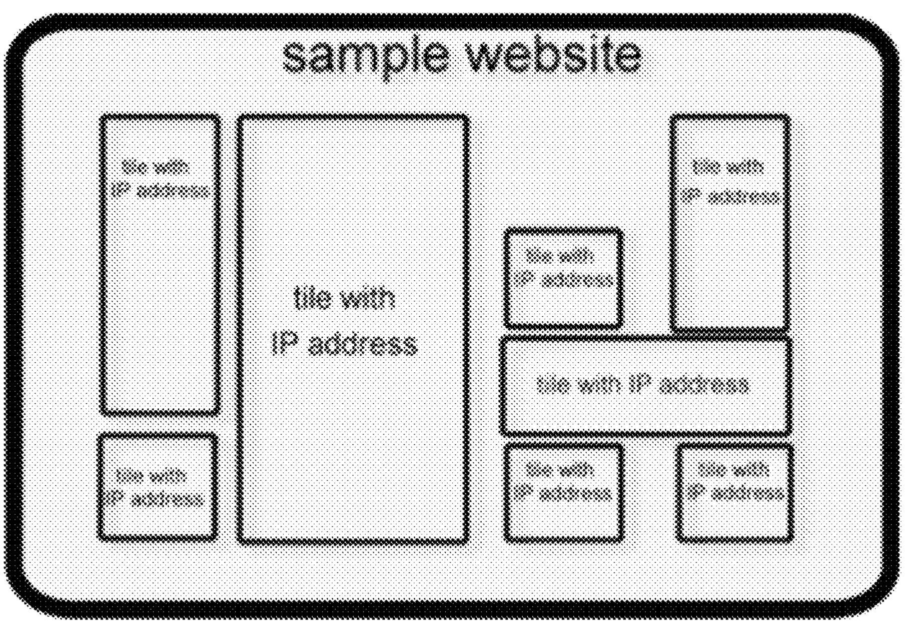
FIG. 38 is a table illustrating the distinctions between the Web's (and therefore Websites') aging fundamental technologies, and their modern, designed for the mobile handset age, replacements including the present Invention's constituent components, data "tiles" (hereafter "Tilz"), which supplant and/or update the aging hypertext markup language protocol.
FIG. 39 is a functional block diagram illustrating an embodiment of an exemplifying architecture of a ParaSite, that not only is a Tilz as whole, but each element of the ParaSite (text, photos, ads, etc.) are each Tilz themselves—each Tilz with its own IP address. Tilz within Tilz.

For those Website owners who want their users to have an even richer local Website (ParaSite) experience they can optionally download and run additional software in accordance with the principles of the Invention. This software crawls the software code for that Website, and produces a ParaSites compatible Website by creating a "tiles" version of the Website (FIG. 39). "Tiles" or its homonym "Tilz" as referred to herein shall mean that every element of a Website—sections, articles, ads, diagrams, etc.—are each placed in an invisible, separate tile. The Website will appear exactly the same as before, but each element of a Website is now compartmentalized into its own tile (Tilz). This enables users of the ParaSite widget who click on any particular element—tile—of a Website, to selectively pull just that section to their ParaSite.

For Websites that are login/password protected, the user typically must login before being able to create a ParaSite. An exception to this rule is the ability for information technology (IT) personnel at companies to add the company ParaSites in fleet fashion to the digital devices of various groups of their company employees.

Builder Software

Figure 37:
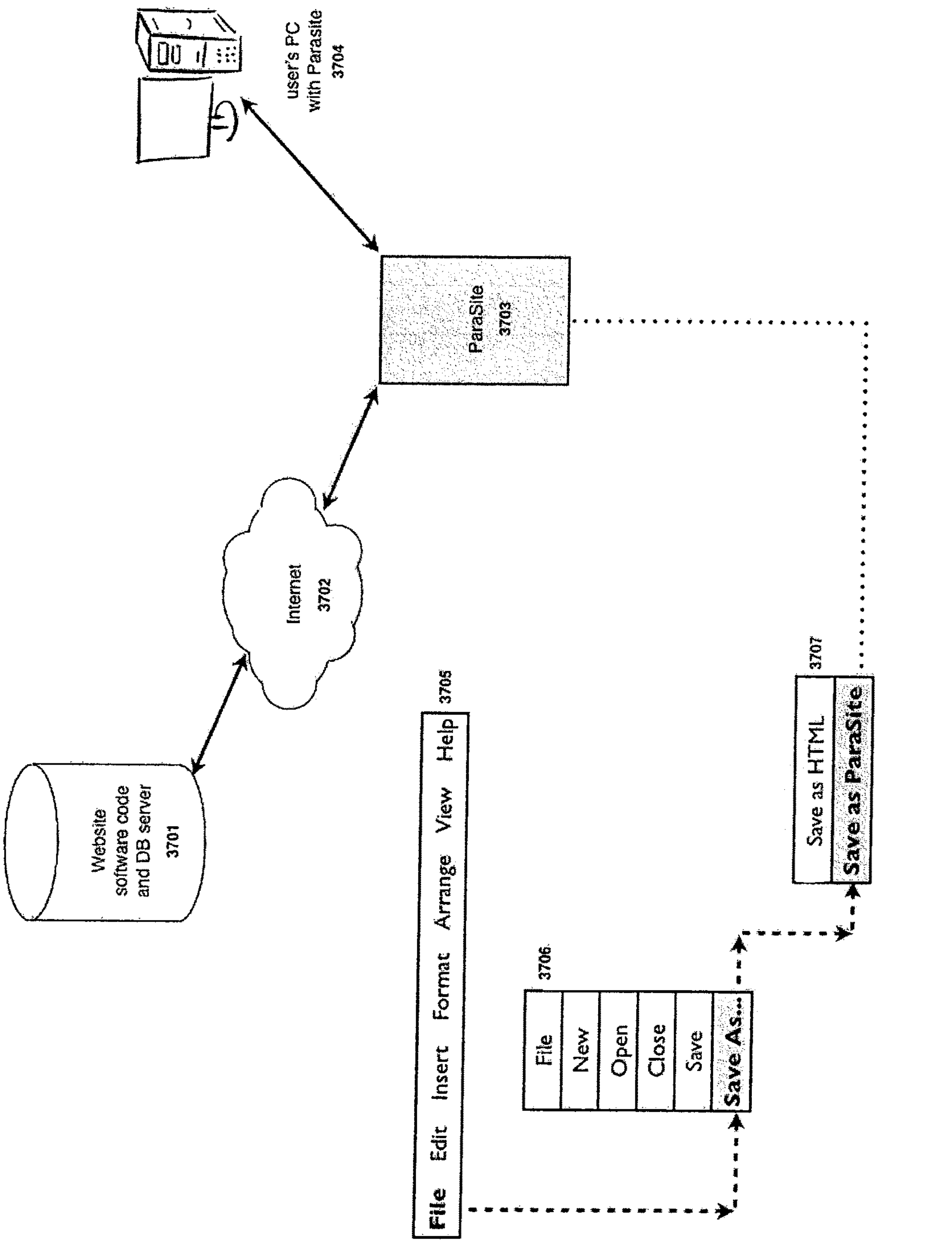
FIG. 37 is a depiction of an embodiment of an exemplifying architecture illustrating a method by which users can create ParaSites, and the interactive relationship between the hosted Website and the ParaSite.

The builder software is used by Website owners to create a feature-rich ParaSites-compatible Website. In embodiments this software is compatible with Website creation software programs, so that users can create a ParaSites-compatible Website as they create their Internet Service Provider (ISP)—or self-hosted Website. The software adds a drop-down menu item to compatible Website creation programs. When a user selects this menu item, a version of the Website is saved in ParaSites compatible format (FIG. 37).

User Setup Widget

The ParaSites setup widget is utilized by Website users to: Create a local copy of a particular Website on those devices the user specifies; and Create a local copy that conforms to the user's preferences profile (which includes such things as which information the user would like displayed, and how to display it).

The ParaSites setup widget also provides a point-and-click tool to enable users to click on the content they want from a Website, and just that particular content will be replicated on the ParaSite (in accordance with any data/content usage restrictions the host Website may place upon its contents).

Customized

ParaSites are tiles-based customized local copies of Websites that reside on the user's mobile handset or other device such as a PC or TV. Local copies enable users of a Website to have continuous access to just the portion of that Website's content that is most important to that user. Most users access less than 1% of a typical Website, so users can now pull just that 1% to their ParaSite. If, however, the user wants to view content not stored locally in their ParaSite, they can, in embodiments, click on a ParaSites link to be taken to the full content on the conventional version of that Website (when Internet connectivity is available).

Layout

ParaSites users have several options to choose from for how ParaSite contents are displayed. They can be displayed in the same format as the conventional version of the Website, or they can be displayed in a "tiles" format, which presents each section of a Website on a separate tile which users can flick through to find the desired content.

Size Format

ParaSites generally present Websites in the mobile handset size format—even on TVs or PCs. ParaSites can, however, re-size to fit any sized screen.

Self-Hostable

ParaSites don't necessarily require an Internet service provider (ISP) (or conventional computer server) to host them. Website owners don't have to start with a Website that is hosted, for instance, at an ISP and convert it to a ParaSite—they can forgo the traditional Website, and simply create a ParaSite as the "main" Website. Website owners can create ParaSites, and "host" the ParaSites, say, on their mobile handset. Other users who "subscribe" to that ParaSite will get updated information/Tilz synced to their local copy of that ParaSite when both parties are simultaneously connected to the Internet, or both parties are simultaneously peer-to-peer connected via other means such as Bluetooth.

Different for Different Devices

ParaSites can be different on different devices for the same user. For example, a user might keep a robust, and much larger—in terms of storage capacity utilized—local copy (ParaSite) of a given Website on their PC and DVR, but only a basic/skeleton version on their storage-space-limited mobile handset. ParaSites also enables users to create a different ParaSite profile for each type of digital device they utilize ParaSites on.

Profile Manager

The ParaSites Profile Manager is where a user selects both generally and specifically which and which type of content they would like to keep locally on each of their digital devices.

Data Storage Management

The Profile Manager is also where the user manages data storage. Users set storage space allocations for individual ParaSites as well as the total amount of storage to be allocated to the user's entire ParaSites collection. As the user's storage space limitations are approached, the ParaSites software can automatically delete some of the ParaSites (or sections/Tilz of ParaSites) from the user's local collection, according to criteria the user sets in their preference profile (least frequently used, longest time since use, etc.).

Me Too

The Me Too ParaSite enables users to automatically receive the ParaSites version of a particular Website that is, for instance, most popular for their particular or selected affinity group. For example, if a user is a motorcycle enthusiast, they could indicate in their ParaSite Profile that they would like to receive the version of a ParaSite that other bikers are most frequently viewing/using.

Touchscreen Compatible

ParaSites are touchscreen compatible enabling users to control content, using, for instance, flicking motions with their fingers on compatible display screens.

Offline Functionality

ParaSites continue to function and be useful in offline mode, when not connected to the Internet. Users can get updated information not just when connected to the Internet, but also when anyone else within, say, Bluetooth range has that same ParaSite, but has an updated version of its content/Tilz. ParaSites can execute offline transactions. Since the ParaSite code is local and profile based, users can engage in interactions and transactions via peer-to-peer modalities, even while neither party has any network access. Offline users can easily trade/exchange ParaSites elements (Tilz) mobile handset to handset via Bluetooth or other means. Additionally users may engage in asynchronous transactions. In embodiments, offline users engage in a transaction via ParaSite, which is later synced to remote sources for transaction confirmation/execution when one or both parties is connected to the Internet.

The Invention employs and incorporates many unique technologies, such as the ability to execute transactions directly from a ParaSite, even while offline, as per the detailed descriptions below.

Having generally described operation of the systems, methods, service and platform for customizable, portable, auto-syncing local Websites, various embodiments will be described with respect to FIGS. 30-39.

Figure 30:
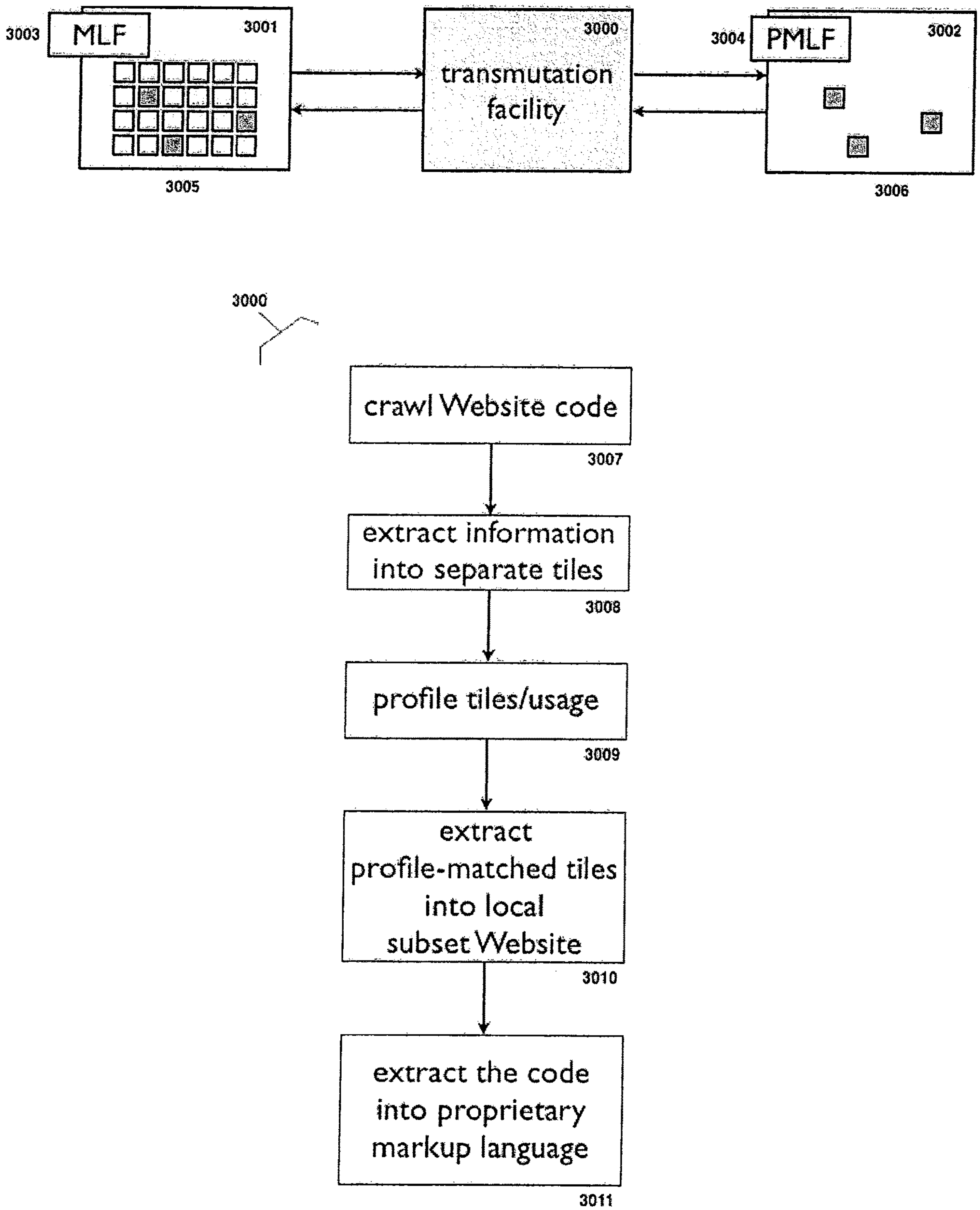
FIG. 30 is a functional block diagram illustrating an embodiment of a depiction of the transmutation process, wherein a plurality of content on a traditional Website is filtered as per a user's profile for just the desired subset of content, which is then transferred to the user's device as a ParaSite, a customized local copy of the Website; in addition to a flow diagram illustrating an embodiment of a method for extracting the profile-based subset of content which informs the ParaSite—the customized local copy of the Website.

Referring to the accompanying drawings wherein the same reference numerals refer to the same or similar elements:

FIG. 30 shows an exemplifying architecture of an embodiment of a customizable, portable, auto-syncing local Websites system, method, service, and platform in accordance with the Invention which is designated generally as system 3000.

System 3000, hereafter "ParaSites," consists of client and server software configured to transform a provided ordered dataset, such as a Website, into a resultant ordered dataset, which, in embodiments, is a subset of the provided dataset. In particular system 3000 is configured to translate markup language format (MLF) 3003 data into a proprietary markup language format (PMLF) 3004 which accords certain additional functionality and usability.

FIG. 30 is a functional block diagram illustrating an embodiment of a depiction of the transmutation process 3000, wherein a plurality of content 3001 on a traditional Website 3005 is filtered as per a user's profile for just the desired subset of content 3002, which is then transferred to the user's device as a ParaSite 3006, a customized local copy of the Website.

A flow diagram 3000 illustrates an embodiment of a method/process for extracting 3010 the profile-based subset of data/content which informs the ParaSite—the customized local copy of the Website 3006. The input agent 3007 identifies the markup language format (MLF) 3003 for the provided dataset. The job processor 3008 determines when a proprietary markup language format (PMLF) 3004 dataset is desired and communicates instructions to the translator 3010. The translator 3010 generates a PMLF dataset 3011 in response to the instructions and as per the user's profile 3009. The translator 3010 integrates user profile information 3009 into the resultant PMLF dataset 3011 metadata, that continues to inform further modifications to the PMLF dataset 3011, including recursive profile-parametric driven passes of the described process. That is to say, as changes to a user's profile are logged, the PMLF dataset 3011 is transformed, as per above, in active response thereto.

In embodiments the input agent 3007 is directed to a provided dataset, such as a Website 3005, wherein the input agent 3007 crawls provided Website's software code, which may be presented in markup language formats such as hypertext markup language format (HTML) or other formats. An extraction module 3008 is configured to extract the plurality of information contained therein into data "tiles" (or the homonym thereto, data "Tilz"). The result of this extraction is that Website features such as text, pictures, video content, advertisements, et. al. are separated into discrete logical groups and subgroups, as arranged into separate data tiles (Tilz).

A profiling module 3009 configured to track and log individual Tilz usage patterns, is thereby able to produce ordered lists of Tilz, per various parameters such as frequency of use. An algorithm facility processes such ordered lists by heuristic methods, the result of which is the promotion or demotion of individual elements comprising the list, in order to proffer suggested Tilz for inclusion in the user's Website subset (the Parasite). Users may also manually select individual elements (Tilz) they wish included in, or excluded from, their ParaSite. The profiling module 3009 is also configured to adjust the mix of included/excluded Tilz based upon external profiles, such as the user's profiles 3301. External profiles may include items such as user preferences for how, when and where a user likes information presented (thus informing differences between a users mobile handset ParaSite version as compared to the user's PC ParaSite version); as well as other profiles containing information regarding groups of users, with whom the subject user may have affinity, and based upon the Tilz affinity group users included in, or excluded from, their ParaSites, the given user may wish to include/exclude such Tilz in the given user's ParaSite(s).

The translator 3010 then extracts the profile-matched Tilz into the local subset Website, the ParaSite 3006—a portable version of the parent Website 3005. Data/content from the parent Website is not just filtered (from a plurality of content, to just the desired subset of content) but also transformed into mobile digital-content format (MDF) 3004—a proprietary markup language format (previously referred to herein as PMLF) that makes viewing and using applications and digital content on mobile devices much easier.

In embodiments ParaSites 3006 include links back to the parent Website 3005, should further information be desired, that is not otherwise included in the ParaSite 3006. The profiling module 3009 records such links/content usage, and can thereby update the mix of included/excluded Tilz for the user's ParaSite 3006. Tilz included in or excluded from the ParaSite 3006, are also based upon factors such as the user-selected storage space allocated to the ParaSite 3006. Users may have different versions of ParaSites 3311, 3312, 3313 for different devices, all based upon the same parent Website 3314. That is to say, for any given parent Website, a user may include fewer Tilz for their mobile handset ParaSite 3313, and more Tilz for their PC 3311 or TV 3312 ParaSite, where more storage capacity may be available.

In embodiments the profiling module 3009 is configured to recursively apply its process, on an ongoing basis, to facilitate the updating of the set of Tilz included in a user's ParaSite. In addition, the input module 3007 flags changes to Tilz, and synchronizes such changes, for instance, made to parent Website Tilz 3001, to the user's ParaSite Tilz 3002. Such synchronization may be effected by a plurality of means, remotely or locally, via the Internet or peer-to-peer via Bluetooth respectively. Regarding peer-to-peer synchronization, if user 1 is in Bluetooth range of user 2 who has a newer version of a Tilz containing updated information as compared to user 1's version, then such DIFF differential data can be exchanged (subject to content rights usage).

Selecting 3008 for content 3007 deemed most desirable 3009 by the user, the content subset 3010 is ported 3011 for local use on a user's various devices, and subscribed to parent content 3007 for updates 3009, hence the present Invention: customizable, portable, auto-syncing local Websites 3000.

Figure 31:
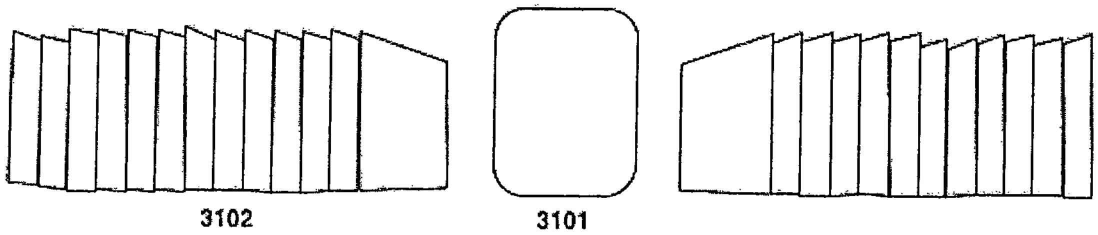
FIG. 31 is a depiction of an embodiment of a method for users to navigate through the thumbnail tiles representing their various custom, local Websites (ParaSites); which can be accomplished on a touchscreen by flicking through the tiles with one's finger.

FIG. 31 is a depiction of an embodiment of a method for users to navigate through the thumbnail tiles 3102 representing their various custom, local Websites (ParaSites); which can be accomplished on a touchscreen by flicking through the tiles with one's finger.

Regarding navigation among various ParaSites, in embodiments a user is presented with fanned deck of tiles 3102 (Tilz) each representing a ParaSite; and which is particularly convenient for smaller screen sizes such as those on mobile handsets. The cover Tilz 3101 for the ParaSite can present user selectable data, such as a thumbnail photograph or other image, that conveys the essence of the ParaSite at a glance; further such a cover Tilz can include live data updates, pending a user's network (or other) connection to the parent Website for same.

Figure 32:
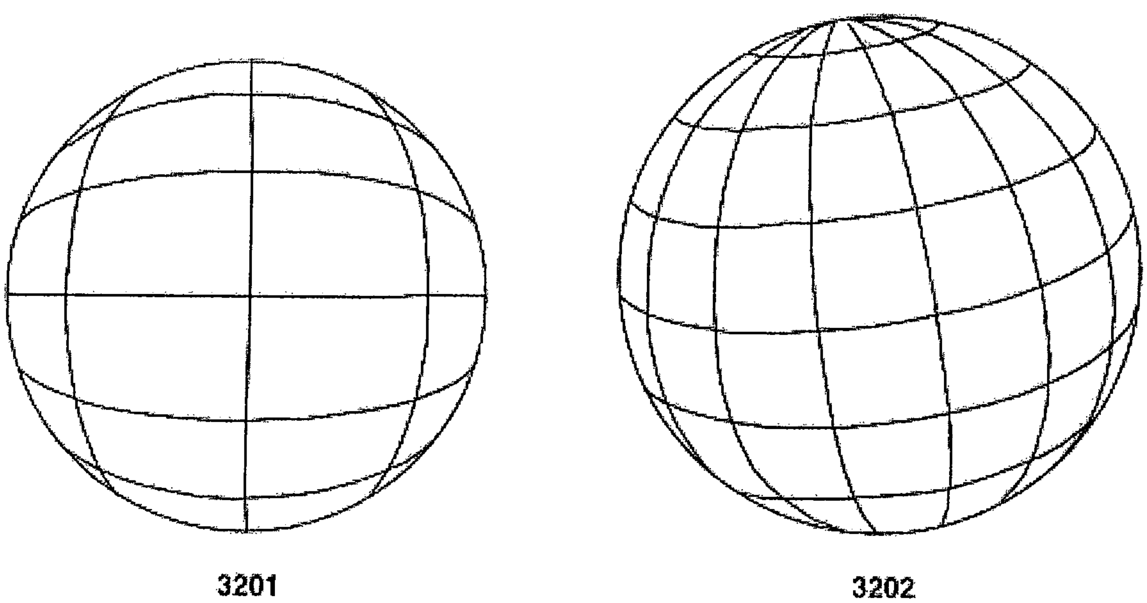
FIG. 32 is a depiction of an embodiment of an example of an unique information management facility, wherein ParaSites (custom, local Websites) a user receives are received in thumbnail tiles that are mapped onto (in this case) a sphere; whereupon the sphere information management facility attracts like content to it. A sphere is a convenient navigation modality for ParaSites, particularly on mobile handset-sized devices.

FIG. 32 is a depiction of an embodiment of an example of an unique information management facility, wherein ParaSites (custom, local Websites) a user receives are received in thumbnail tiles 3101, 3102 that are mapped onto (in this case) spheres 3201, 3202; whereupon the spheres information management facility (hereafter "Spherez") attracts like content to it, for which the user may be paid directly by information-sending entities, for prominent placement on the user's Spherez. A Spherez 3201, 3202 is a convenient navigation modality for ParaSites, particularly on mobile handset-sized devices.

In embodiments Spherez 3201, 3202 are dedicated to topics, such as user's "Hobbies" Spherez. Those ParaSites with content relating to a given Spherez' topic are mapped onto that Spherez. For example, is a user is an aficionado of lepidoptery, then ParaSites related to the study of moths and butterflies may automatically be mapped onto that Spherez. Then, automatically and continuously, that Spherez continues to attract like content. So if that Spherez, when connected for instance to the Internet, or by peer-to-peer means, or by other means, finds content tagged "moths" or "butterflies" then it could, as per the user's ParaSite profile, pull that ParaSite to the user's "Hobbies" Spherez. For example, the Invention may create a ParaSite, as per content tags, from the massive California State Parks Website, consisting of just that information relating to Natural Bridges State Beach, whereto impressive masses of monarch butterflies migrate each year. The Invention pulls those Tilz, as per system 3000 into a ParaSite, which is then mapped onto the user's Spherez.

The same ParaSite may be mapped onto many Spherez according to, for instance, tags which are applied by the user manually, ParaSites automatically, or even tags supplied by third parties. For example, information relating to Natural Bridges State Beach, could also be mapped onto other user's "Beach" or "California" Spherez.

Spherez also are unique as an information management facility in that they may be monetized on behalf of the user by ParaSites. For example, if a user had a "Pizza" Spherez, then the (Tilz representing) ParaSites for the user's favorite pizza parlors might by mapped thereupon. However, in a variation upon paid search (where in this case the user gets paid, as opposed to the middleman search company) a pizza company could offer, via ParaSite, to pay the user for priority placement on the user's Spherez. Priority could be accorded to any number of user-selected factors such as being in the center position of the Tilz, which is seen prominently each time the user engages that Spherez. A pizza company might even offer to pay the user to be the exclusive pizza delivery ParaSite, on a user's mobile handset (or other device).

With ParaSites Spherez, Websites become much less of a one-way information presentation vehicle, and more of an interactive, constant companion to the user, anticipating and supplying the required/desired digital content or services.

Figure 33:
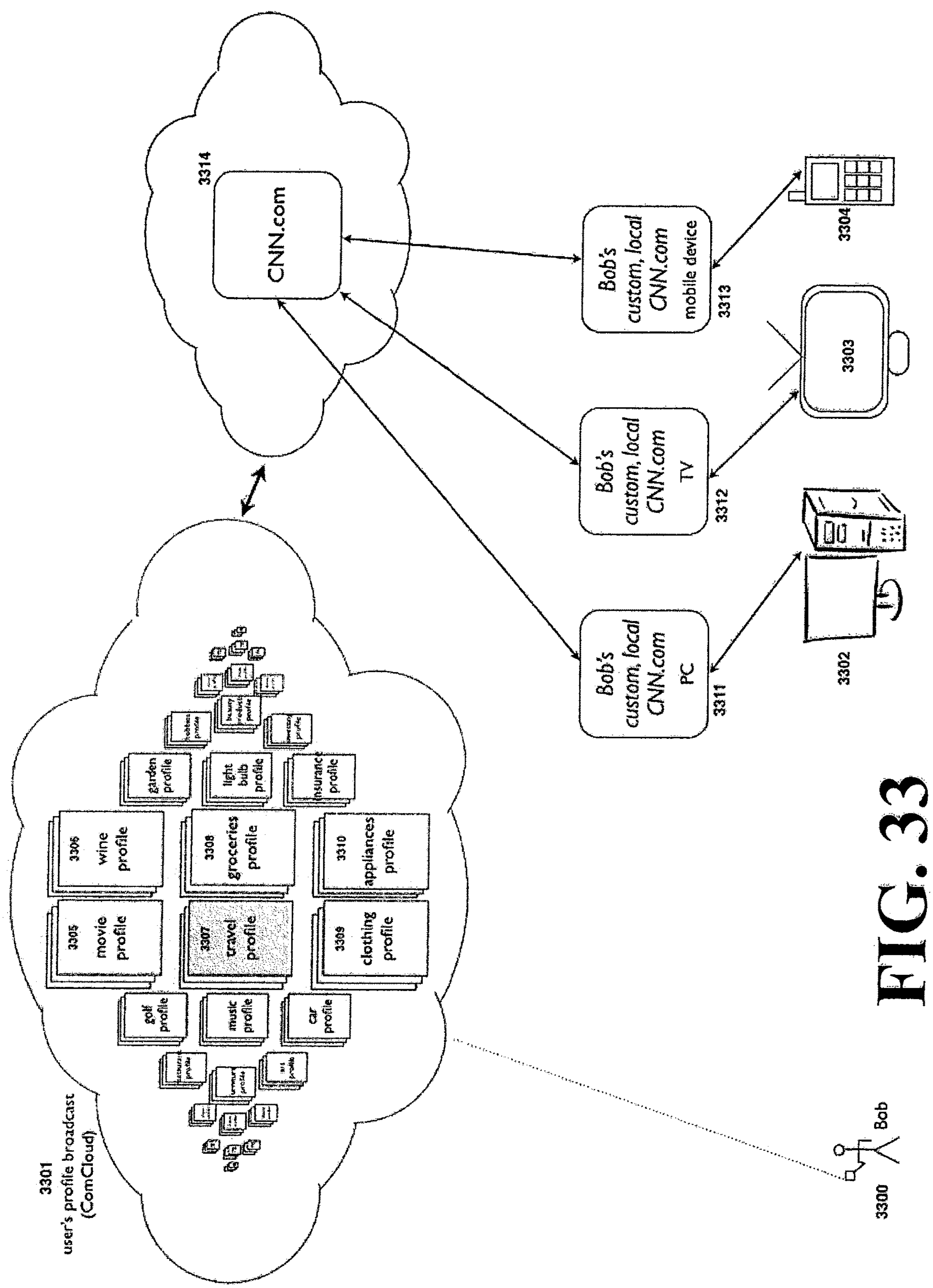
FIG. 33 is a functional block diagram illustrating an embodiment of an exemplifying architecture for a method whereby real world interactions inform changes to a user's ParaSite.

FIG. 33 is a functional block diagram illustrating an embodiment of an exemplifying architecture for a method whereby real world interactions inform changes to a user's ParaSite.

A user 3300, Bob, is moving about in the real world, and based upon interactions in the real world, Bob's travel profile 3307 is updated, which informs Bob's CNN ParaSites 3311, 3312, 3313, which are custom, local copies of the parent CNN.com Website 3314; and each of Bob's ParaSites is different depending upon the profile of the device the ParaSite is on.

For example, if there is political unrest in a country a user is traveling to, per their travel profile 3307, the user's (Bob's) ParaSites 3311, 3312, 3313, may automatically receive news stories/videos/etc. (as captured in data tiles, or data Tilz) from CNN.com 3314 regarding that country. And each Tilz of information is delivered (to the individual ParaSites 3311, 3312, 3313) as per the user's preference profile 3301. For instance, a text alert to the user's mobile device 3304, an article with photos to the user's PC 3302, and a video clip of the unrest to the user's TV 3303.

Websites, now ParaSites, respond in realtime to each user's actual life events.

Figure 34:
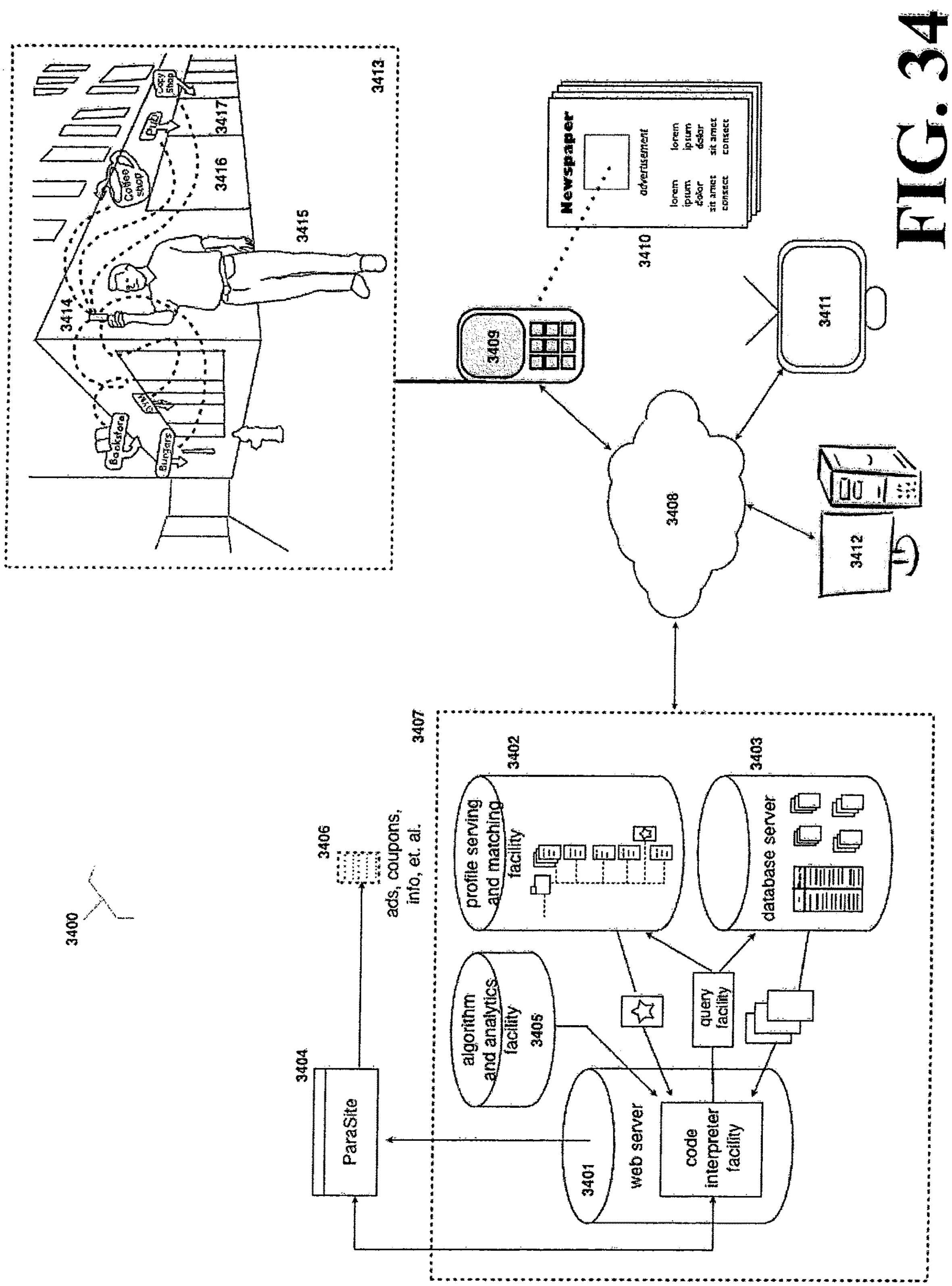
FIG. 34 is a functional block diagram illustrating an embodiment of an exemplifying architecture of a method for server-side profile configuration and transaction facilitation as per mobile handset scanning and broadcast.

FIG. 34 is a functional block diagram illustrating an embodiment of an exemplifying architecture of a method for server-side 3407 profile configuration and transaction facilitation as per mobile handset 3409 scanning 3410 and broadcast 3414.

Profiles are the key to ParaSites. It's not just about smaller, local Websites, it's about Websites that morph to a user's needs, as informed by user profiles.

ParaSites server-side facilities 3407 are provided. A profile serving and matching facility 3402 is configured to transmit profiles to/from mobile handsets 3409 as well as other remote devices 3411, 3412. The profile serving and matching facility 3402 works in conjunction with the algorithm facility 3405 which is configured to filter and match a plurality of available information/ads/offers/et. al. (configured into data "tiles" or the homonym thereto, data "Tilz") based upon metadata for each such information/ads/offers/ et. al., against profiles 3403, 3301 of items a user has indicated a desire to receive (or not) information/ads/offers/ et. al. for. A database server 3403 facilitates user profiles and preferences, as well as a rules facility by which certain actions must accord. A ParaSite creation facility is configured, as per system 3000, to create ParaSites, and refresh and sync the content thereof. A module is configured for storage, reception, transmission and broadcast 3401, 3414, 3301 of messages and other data, and in particular those data configured into profiles (a module hereafter referred to as "ComCloud"). The ComCloud module includes profile creation, filtering, and matching facilities.

ParaSites widget client-side facilities 3409 are provided configured for operation on mobile handsets 3409 and other devices. A ParaSite creation facility is configured, as per system 3000, to create ParaSites, and refresh and sync the content thereof. A ComCloud module is configured for operation by the ParaSites widget.

Users create new or update existing profiles 3403, 3301 by a plurality of means, including, for instance, scanning an ad 3410 in a newspaper for an item a user is interested in. The scan results in a query which returns a data tile (Tilz), about the subject item, to the user's mobile handset 3409. For example, if the user scanned an ad for a bottle of Beringer Cabernet Sauvignon wine, and received the Tilz for same, the client-side ParaSite widget 3409 queries the user as to whether or not the user would like to receive information/ads/offers/et. al. pertaining to Beringer Cabernet Sauvignon wine. The user's profile is updated presently by (the ParaSites client-side software on the user's mobile device 3409, and/or) the ParaSites server-side facilities 3407, which receive transmission of the query results via a plurality of communication modalities 3408. The user's updated profile is returned therefrom to the user's ParaSites widget 3409 for inclusion in the user's profile broadcast 3414, 3301 (ComCloud). The ComCloud 3414, 3301 can be configured for various broadcast distances from global to just a few feet. For example, the mobile handset ComCloud 3414 may be configured for use via Bluetooth, which has limited range. Bluetooth range may be sufficient however to reach restaurants or pubs 3417 the user is passing by which might otherwise be able to provision and/or sell the user-desired bottle of wine (and effect the transaction pursuant thereto via ComCloud).

Profiles inform Parasites creation, as per system 3000. That is to say, as a user moves about in the real world, conducting life in such a fashion that along the way, the user creates a profile of objects, people, ideas, anything of interest at all, that now inform the information presented via ParaSites. ParaSites are unique in that they "know" their user; and provide desired information when and where and how a user would like it. For example, a user interested in wine may have a "Wines" Spherez. If so, then when the user scans the ad 3410 for the bottle of Beringer Cabernet Sauvignon, then Websites for entities that can supply the user that bottle of Beringer Cabernet Sauvignon wine, may be added (and possibly pay the user to be added) as ParaSites to the user's "Wines" Spherez. Thusly, do ParaSites Spherez revolutionize search.

The user didn't have to take any time "searching" for where to find the Beringer wine; the information came to the user. Furthermore, just like paid search, a wine-supplying entity might choose to pay the user, via ParaSites, for premium placement on the use's "Wines" Spherez. And further, a wine store, such as BevMo, which may carry Beringer Cabernet Sauvignon wine, may wish to send the user an advertisement; an ad customized for this user, that added to their regular 30-second advertisement, is a custom voice-over or onscreen message touting Beringer Cabernet Sauvignon wine or coupons related thereto. Such an ad could be sent to the user's TV 3411 ParaSite—where the ad could be streamed onscreen. Thusly, do ParaSites Spherez revolutionize advertising, marketing, and merchandising.

The embodiments related hereto are essentially endless, and compelling, and unique.

Figure 35:
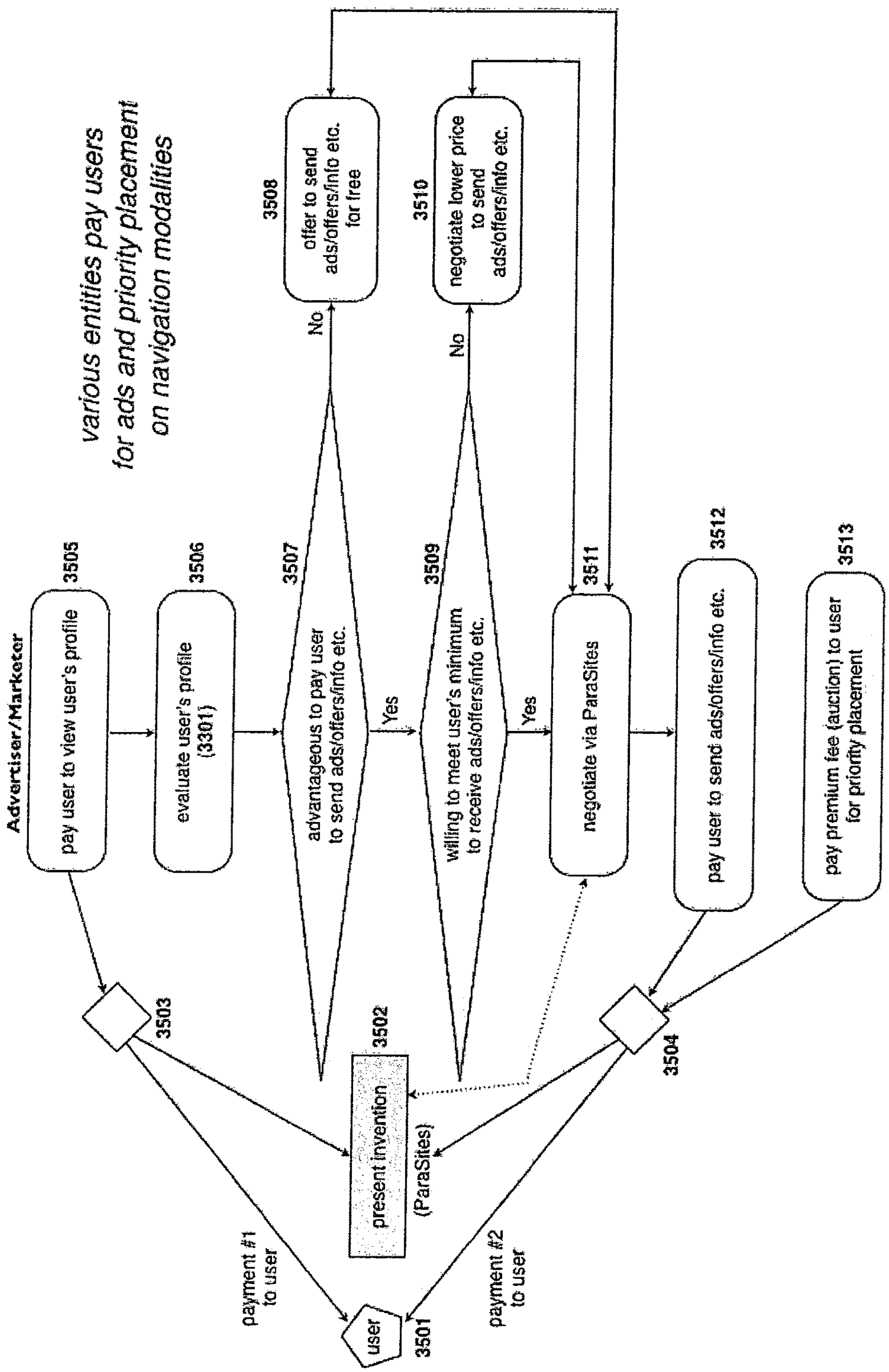
FIG. 35 is a flow diagram illustrating an embodiment of example process steps followed by advertisers as they first pay a user to view and review a user's profile, to thereby determine if it advantageous to pay to send the user ads; and further consider paying additional monies for priority data placement (an unique variation on paid search, wherein the user is paid; as opposed to a middleman entity).

FIG. 35 is a flow diagram illustrating an embodiment of example process steps followed by ad-sending entities 3505 as they first pay 3503 a user 3501 to view and review a user's profile 3506, to thereby determine if it's advantageous to pay 3504 to send the user ads 3512; and further consider paying additional monies 3504 for priority data placement 3513 (an unique variation on paid search, wherein the user is paid; as opposed to paying a middleman/search entity). Among a plurality of ways and means to send ads to users, sending ads to users' topic-specific Spherez is hereby included (which, in embodiments, appear as Tilz mapped onto the Spherez). And priority data placement may include cases where, for example, a pizza delivery company pays for priority placement of their ParaSite on a user's "Pizza" Spherez; or to be the only pizza delivery ParaSite on a user's mobile handset.

In embodiments, via ParaSites 3502, users profiles 3301 are made available to ad-sending entities 3505, who pay 3503 the user 3501 for the right to examine and evaluate 3506 said profiles. Advertisers may pay the user a one time fee, for access to the user's profiles for a fixed amount of time, or may subscribe to the user's profiles as per a fixed or ongoing periodical fee structure. Based upon the profile information, advertisers then decide 3507 if it is advantageous to pay the user to send ads to said user. If not 3508, then advertisers may offer to send ads for free. Users may interact with advertisers directly or let ParaSites negotiate 3511 on behalf of the user. In this case ParaSites sets flag to ACCEPT for the subject ad if the user has set their preference profile MIN CHARGE (minimum charge) to zero. If not the subject ad profile flag is set to REJECT.

In the case where the ad-sending entity considers it advantageous to send this user ads, which sets a transaction flag to PROCEED, ParaSites then presents the ad-sending entity with the user's MIN_CHARGE fee. For any given profile, vis a vis setting the MIN_CHARGE, users may set the fee manually or let ParaSites set the fee. ParaSites may set the fee based upon a plurality of factors, including but not limited to comparing MIN_CHARGE fees for other users with a profile similar to the subject user, for the same or similar products (which may be derived by, among other means, matching product metadata tags).

At this point 3509, the ad-sending entity is either willing or unwilling to meet the user's MIN_CHARGE. If so, the transaction flag is set to PROCEED, and the ad-sending entity pays the user to send ads 3512. If not, the ad-sending entity may negotiate 3510 with the user, via ParaSites 3511, a lower price to PROCEED. Again, the user may either manually accept this lower price (in response to a query from ParaSites) or allow ParaSites to negotiate on behalf of the user, as per the above description. If no agreement on price is reached the transaction flag is set to STOP, and after providing both parties a receipt for the failed transaction, the transaction flag is set to END. The transaction receipt detail includes information regarding the profile in question, and the amounts one or both parties was willing to pay/accept for review of same, including the DIFF difference amount that caused the transaction to END.

For those situations where an ad-sending entity is offering an amount less than the user is willing to accept ParaSites may negotiate 3511 on the user's behalf if the user has set a DIFF percentage, by which means ParaSites may accept/reject a proposed profile review fee from an advertiser; for example, a user may set a MIN_CHARGE of X monetary units/credits, but set a DIFF percentage of 10%, enabling ParaSites to accept a bid of 0.9X, or more, monetary units/credits. (Other embodiments are envisioned wherein ParaSites negotiates on a user's behalf without necessarily setting a DIFF percentage).

Understanding that a user may receive several ads from several different ad-sending entities, a ad-sending entity may wish to promote its ad to the top of the "stack." In which case the ad-sending entity pays the user a premium fee to the user for priority data placement 3513. The process for setting and agreeing to the priority data placement fee can be effected via a number of modalities consistent with the principles of the Invention, including an auction. In the case of an auction, in embodiments, ParaSites presents each of the ad-sending entities a dataset, which details the order in which ParaSites will be presenting the ads to the user. ParaSites informs the ad-sending entities that ParaSites is accepting bids, consisting of additional monetary units/credits, for top priority vis a vis the ordered list detailing the order in which ParaSites will present the ads to the user. After receiving all the bids (for which a TIME_LIMIT may be set), ParaSites re-sets the priority order in which the ads are presented to the user according the #1 position to the highest bidder, the #2 position to the second highest bidder, and so on. Equal bid amounts are ordered as per various factors including according higher priority to bids received before other bids.

In embodiments, if and when a fee amount is accepted both by parties, for any of the above described or other cases, payment is effected by the payment facility 3503, 3504, with ParaSites 3502 receiving a portion of the monies/credits. (ParaSites only gets paid, when users get paid). Payments start at zero. Only when a user proves to the satisfaction of the ad-sending entity, does the user 3501 receive a non-zero payment amount.

Figure 36:
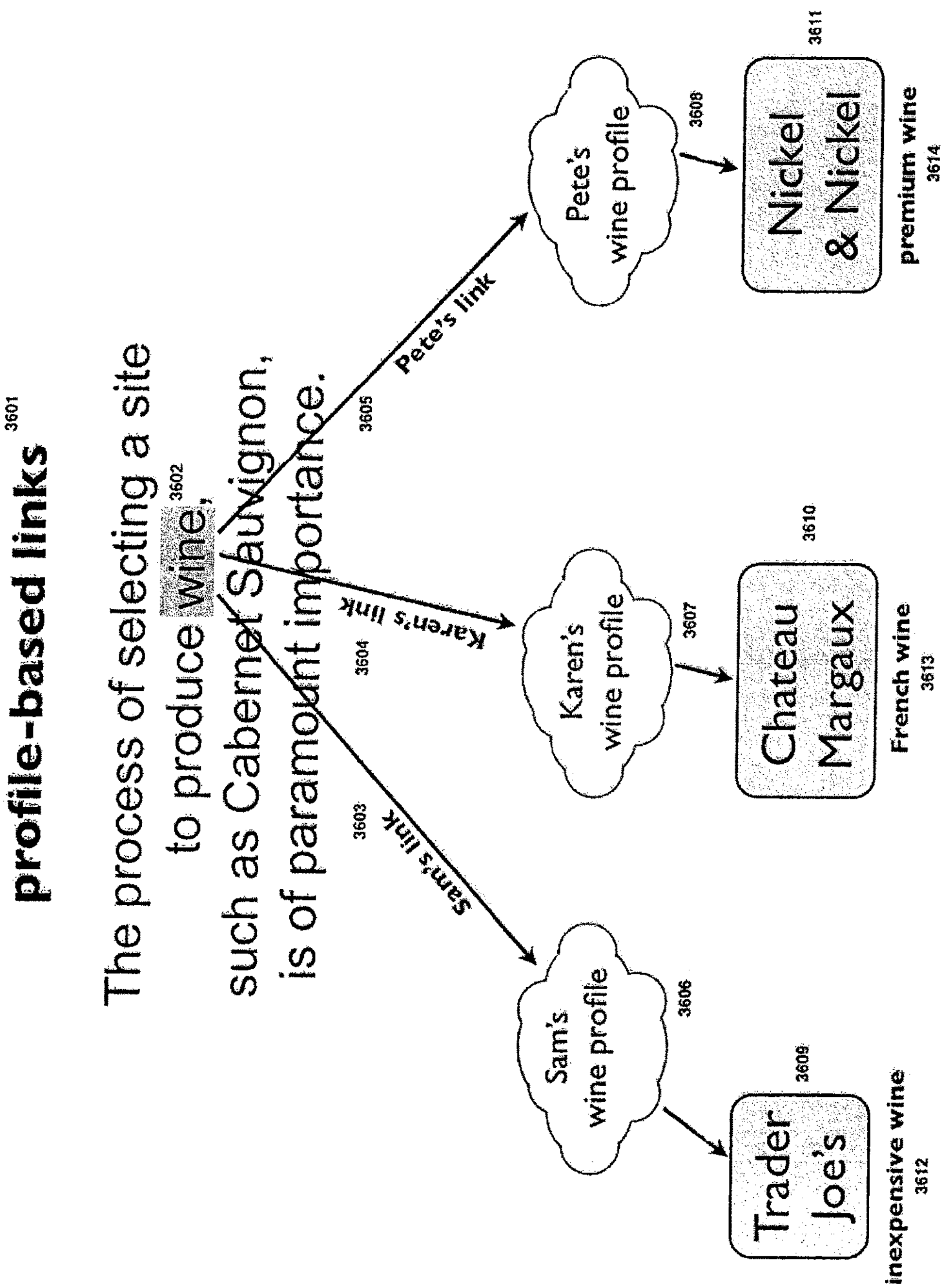
FIG. 36 is a functional block diagram of an embodiment of an example of profile-based links Unlike links on Webpages, which take different users who click on the same link to the same destination, ParaSites links are profile-based, and thus take different users to different destinations based upon each user's profile.

FIG. 36 is a functional block diagram of an embodiment of an example of profile-based links 3601 Unlike links on Webpages, which take different users who click on the same link to the same destination, ParaSites links are profile-based, and thus may take different users 3603, 3604, 3605 to different destinations 3609, 3610, 3611 based upon each user's profile 3606, 3607, 3608.

There are billions of people on earth and not all of them like chocolate ice cream. Some prefer vanilla, or strawberry, or don't like ice cream at all. The point is we're all different. And yet conventional art hypertext links treat everyone on earth the same. If a thousand people click on a link, all thousand may be taken to the exact same destination. But that one destination may not be the best destination for all thousand people. It's time for profile-based links 3601.

There are profiles of people and things all over the Web, those profiles can enhance interactions and transactions, both online and offline. Whether such profiles are created by ParaSites (in embodiments as per FIG. 34) or by any other means, it would be desirable to have those profiles inform one of the most common navigation modalities on the Web—links ParaSites feature profile-based links 3601. User profiles exist (as the per preceding paragraph), now they just need to be matched to tagged content. Such content can be online or offline Online content tagging is familiar to those skilled in the art. Offline content tagging can be accomplished by a plurality of methods including scanning a barcode/RFID for an object, which query returns the IP address where more information about that object can be found (such as a Website, ParaSite, Tilz, or other thing). ParaSites profile server 3402 matches user profiles to tagged content. In embodiments, tagged content can be based upon profiles of other users with whom one shares affinity characteristics. In embodiments users can set their link destination profile to be influenced by the links most popular with any number of groups: such as their friends, baseball lovers, food aficionados, Republicans, etc. Additionally users can set their link profile to "subscribe to" or "follow" the prospective link destinations of others. For instance, a user might not be a wine expert, but know someone who is. The user could "subscribe to" (for free or for a fee) or "follow" that wine expert's link metadata, to be taken to the same destinations as that expert for wine-related links In embodiments ParaSites facilitates profile-based links for non-ParaSite Websites (i.e. conventional Websites) via a unique technology—reverse Web cookies. Conventional Web cookies are, in embodiments, a packet of data sent by an Internet server to a browser, which is returned (if not otherwise deleted) by the browser each time it subsequently accesses the same Internet server, and is used to identify the user or track their access to the Internet server. In embodiments, with reverse Web cookies ("My Cookiez"), instead of an Internet server pushing a packet to the user's browser, the user's browser pushes the user's packet to the Internet server. The user's packet contains (links to) the user's salient profile information. In embodiments, the user's packet contains the Internet protocol (IP) address (a pointer to) where the user's more complete profile information may be found. Vis a vis ParaSites' users, their profiles may be extant in a plurality of locations, including the profile server 3402. Thus informed, the Internet server for a Web page containing the link word "ice cream" may send chocolate ice cream lovers to one location, vanilla to another, and lactose intolerant people to suitable substitutes.

Vis a vis FIG. 36, the linked word "wine" 3602 is a profile-based link, that takes three different users Sam 3503, Karen 3604, and Pete 3605 to three different destinations. Sam's wine profile 3606 indicates a preference (which may be circumstance or time-based, such as when Sam is unemployed) for inexpensive wine 3612, thus Sam is directed to vendors of inexpensive wine or other sources with information relating to inexpensive wine, such as Trader Joe's 3609. Similarly, Karen's wine profile 3607 indicates a preference for French wines 3613 (based perhaps upon wines Karen recently ordered/consumed in restaurants, as per her Restaurant profile) and thus Karen is directed to a site such as Chateau Margaux 3610. Finally Pete's wine profile 3608 indicates a preference for premium wine 3614 (according to recent additions to his wine cellar, as per his Wine Cellar profile) and a current fondness for Napa wines, and is thus directed to a site such as Nickel & Nickel 3611.

In embodiments, direction to destination sites, in response to profiles (and profile-based links) may be auctioned by ParaSites for premium data placement 3512 (an unique variation on paid search, wherein the user gets paid, as opposed to the search middleman). For example, there are many premium wineries in Napa, so those wineries that wish to have users directed to their site, may bid for priority.

FIG. 37 is a depiction of an embodiment of an exemplifying architecture illustrating a method by which users can create ParaSites 3703, and the interactive 3702 relationship between the hosted (conventional art) Website 3701 and the ParaSite 3703.

In embodiments ParaSites 3703 are created as per system 3000 from code that informs the parent Website 3701. The resultant ParaSite 3703 is then download to the user's device of choice, such as a user's PC 3704, where the ParaSite resides locally.

Additionally, ParaSites may be created without need for a "parent" Website 3701. In embodiments developers/users can utilize Website creation software 3705, which is enhanced by the ParaSites client-side facilities which includes a builder module configured to add the menu level capability 3706 of "Saving as ParaSite" rather than as HTML 3707.

FIG. 38 is a table illustrating the distinctions between the Web's (and therefore Websites') aging fundamental technologies, and their modern, designed for the mobile handset age, replacements including, in embodiments, the present Invention's constituent components, Tilz 3802, which supplant and/or update the aging hypertext markup language protocol 3801.

Created over a decade ago, the Web is informed by three fundamental elements which are becoming ever more inconsistent with the rapid changes in devices and network usage. The PC was the dominant computing device when the Web was born in 1990, whereas today the mobile handset is beginning to emerge as the next major computing platform. A majority of the networking protocols were designed for IP devices that were stationary. In short, very few of the technological assumptions that informed the creation of the Web, and thus Websites, are true today.

Therefore it is desirable for more advanced technologies to replace the Web's aging fundamental technologies, starting with HTML. Not credibly described as user-friendly, HTML was designed by an engineer for other engineers. But for the billions of non software engineers on the planet HTML is an undecipherable, foreign language. Tilz replace HTML, as Tilz can be created using any software program, and simply saved as a Tilz. Once in Tilz MDF (mobile digital-content) format, a user can grab just those Tilz desired, and, with no programming needed, an average user has just created and hosted shareable content, via the resultant ParaSite.

Similarly, it's time for the next version beyond URL and HTTP. IPv21 is an ID number for every object/person/thing on earth—an ID number, which is the IP address, for the Tilz, which is the profile, of that object/person/thing And with ComCloud (a data/profile broadcast for users/objects), instead of using an opaque hypertext transfer protocol (HTTP) to move bits about, users can simply do so by dragging and dropping (or otherwise moving) items into their ComCloud.

FIG. 39 is a functional block diagram illustrating an embodiment of an exemplifying architecture of a ParaSite (Website), that not only is a Tilz as whole, but each element of the ParaSite (text, photos, ads, etc.) are each Tilz themselves—each Tilz with its own IP address. Tilz within Tilz. Such an architecture has many advantages including the ability to grab any element/item individually, and easily add that item to one's ComCloud profile broadcast.

In embodiments ParaSites are data "tiles" (or the homonym) "Tilz"-based custom Websites. Tilz are an unique digital-content format. In embodiments users can choose to download a Tilz of an entire conventional Website—thereby creating a ParaSite. Otherwise ParaSites may contain a user-customized subset of the conventional main/parent/hosted Website content/information. This ParaSite can be on a user's TV, computer, mobile device, gaming rig, or other device or thing. Users can set their (Web Pref) preference profile to receive/or otherwise be directed to the ParaSite (as opposed to the conventional Website) from (uTag or other) search engine searches. ParaSites function offline because ParaSites are stored locally. ParaSites are available and functional on devices such as a user's mobile device, even when an Internet connection to the conventional main/parent/hosted Website is not available.

No longer do uses have to surf to a Website, ParaSites are available to them all the time on their digital devices with content/information updated whenever an Internet connection is available (among other means).

These and other objects and features of the present Invention may become more fully apparent from the following description and appended claims, or may be learned by the description and practice of the Invention as set forth hereinafter.

Surfing Profile Widget

The surfing profile widget is a computer cookie-based mini-application that some users of a particular Website may optionally choose to download, which can track their Website usage in great detail. This widget works across virtually any Website, accessed via a plurality of digital devices. Users may be incentivized to allow such data to be collected on their Website surfing habits with financial or privilege-based "carrots" (or other incentives).

Users of the Surfing Profile Widget can also select from several levels of disclosure, from total disclosure of their user-provided demographic profile, to a tracking widget which gathers no personal information for a given user, instead providing the Website owner detailed but completely anonymous user usage information.

The Surfing Profile widget produces data which may be of interest not only to Website owners, but also the ParaSite users, as the Surfing Profile Widge provides recommendations as to which Websites a user should consider pulling locally as a ParaSite.

Automated Collection Creation

The Websites that a given user visits most often can (if the user selects this option in their preference profile) be automatically up/downloaded to a user's mobile handset (or other digital devices the user designates) in the form of a ParaSite as per the storage space allocation preferences the user sets in the user's ParaSite preference profile. By such (or other) means, users can manually or automatically create collections of ParaSites.

Analytics

ParaSites software produces reports for Website owners with suggestions for how to alter their Website to better respond to the needs of its users. ParaSites software monitors how users interact with a given local Website (Parasite) and creates the Website Profile Report.

The Website Profile Report breaks down the local Website (Parasite) into its component pieces—not based upon the obvious menu headings, but instead separates the Website into functional pieces (Tilz) depending on how users interact with various portions of the Website. For instance, some sections of the Website contain static information that is rarely updated (such as Company History), other sections contain information that users often access (such as the Products/Services section), and other sections that users (almost) always access: such as the splash page and page displayed immediately post-login. The Website Profile Report offers suggestions as to where to re-locate information to make it more likely that Website/ParaSite users will find and use it.

The Website Profile Report breaks down the Website's user population into one or more "buckets" or groupings of users who share common Website usage traits. Those who casually graze for information, those who actively and almost aggressively interact with the Website, and several groups of users that fall in between these bookend groups.

The Website Profile Report also includes data such as how users arrived at the non-local, hosted Website: Direct Navigation (typing the actual Website URL into the browser) or Assisted Navigation (most commonly via search, whose search result link(s) the user clicked on to be taken to the Website in question).

Internet-Wide Analytics

ParaSites software provides Website owners with an unique advantage: the software can amass data and present actionable Website improvement patterns, across many local Websites (Parasites), not just the usage data collected from a single individual local Website (ParaSite). So, for example, a Website owner can learn not just from how their own users are utilizing their local Websites, but also receive reports and specific actionable recommendations for site improvement based up similar industry sites' data (if they opt-in to such data collection) or even all local Websites (ParaSites) as a whole.

Other reports include Missed Demand Data. Missed demand for airlines—utilized by airlines for flight scheduling planning. Because, in embodiments, ParaSites use Tilz, as users try to book a flight, Tilz can create standby lists (which inform as to missed demand), as well as users who express when their ideal flight time would be. That is to say airlines for the first time can see data such as “54 more people would have liked to travel on the 2:05 PM flight, but it was already booked.” Tilz can be shared as is, so users don’t have to take any extra steps to send the missed demand information, and users get paid to send missed demand information)

Metrics

ParaSites provides dozens (and ever growing number) of different metrics for Website owners. These metrics are intended to aid Website owners in taking maximum advantage of the use of ParaSite local copies of Websites.

Velocity Metrics

Velocity Metrics are a way for Website owners to measure and monitor in real-time how effective particular changes to a Website are; and in specific, changes to the local copies (ParaSites) of Websites. Velocity Metrics measure not just, for example, how many more clicks a particular Website section or ad is getting, but also the Rate of Change (the direction of the change in addition to the magnitude of the change). For example, a change the Website owner just made produced a doubling of traffic on the Products page, but nearly 100% of the increased usage came from mobile handset users’ ParaSites. Thus, rather than “beefing up” the Products data pages, perhaps a company ought to slim-down the information to better serve the smaller screen size and slower connection speed of the average mobile handset. Similarly, the increased traffic may have come from a particular affinity group (elderly, business users, sports enthusiasts, etc.) at the expense of a different affinity group—so the Website owner may want to rewrite their section copy accordingly.

Fulcrum Metrics

Metrics which track which local Website (ParaSite) item changes have the greatest effect on a number of user-selectable attributes, such as the ratio of users who head to another Website before completing a transaction vs those who complete their transaction on the local Website (ParaSite) in question.

Offline Functionality

In embodiments ParaSites continue to function and be useful in offline mode, when not connected to the Internet. Furthermore ParaSites do not necessarily require the Internet to receive updates: updates can be received directly from the Website owner’s mobile handset, or from the mobile handsets of other users who have received the updated information on their mobile handset already. That is to say, users can peer-to-peer sync their ParaSite (local copy of the Website data) with another user’s ParaSite, from most any other wired or wireless digital device, without having to surf to the ISP (or otherwise)-hosted “source” content.

Non-Website Digital Content

ParaSites technology is extensible to any type of digital content. In embodiments ParaSites Website technology is not limited to Websites, but may be used, for example, for users to have a local copy of a video game character live/reside on their mobile handset and have some, limited, capabilities even without running a copy of the video game. The digital content is placed in a mobile digital-content format tile (Tilz) that provides said functionality for the content within.

Local and Web-Based Applications

In addition to information serving, ParaSites other primary function is to deliver executable functionality, via local software. Website owners can select portions of existing code functionality and re-write it as a widget that resides on a user’s (local) digital device, such as a mobile handset. For example, instead of pointing one’s browser to the URL for that user’s bank, to transfer funds from checking to savings, that same user could launch the ParaSite for their bank and accomplish that same task via the ParaSite widget for that Website residing, for example, on the user’s mobile handset. Such local (ParaSite) software may be more responsive, than streaming the same functionality. Since ParaSites may also function via a live connection to the primary Website’s servers, executing a task such as transferring funds from checking to savings can be accomplished in like manner. In accordance with the shift from the PC to the new computing platform, the mobile device, such a simplification of the user experience may drive adoption of smaller, more tightly focused executables, such as ParaSites/widgets, in preference to dealing with bloated aging Website technology (which was designed over a decade ago primarily for the PC user).

To further clarify the above and other advantages and features of the present Invention, more particular descriptions of the Invention will be rendered by reference to specific embodiments thereof which are, in some cases, illustrated in the appended drawings. It is appreciated that these drawings and descriptions depict only typical embodiments of the Invention and are therefore not to be considered limiting of its scope. The Invention will be described and explained with additional specificity and detail via the following applications and use cases.

Typical Usage Example

Out of the millions of Websites on the Web, Joe Smith utilizes just a couple dozen of them frequently, and somewhat less frequently visits several hundred others. And from time to time Joe visits a brand new Website. In this example, Joe visits CNN.com once or twice a day largely to monitor political headlines. In embodiments Joe clicks on the ParaSites icon (or menu selection) on the hosted Website, or clicks on the ParaSites widget on his mobile handset, to pull a local copy of the CNN.com Website to his mobile handset. Instead of pulling the massive total content of the Website (perhaps hundreds of gigabytes or more), Joe first clicks on the portions of the Website he wants to have locally available—in this example, he just clicks on the Politics headline. Joe can also select options such as whether or not he wants any Political video clips to be pulled locally or stream them as-needed, on-demand, from the CNN.com hosted Website.

In similar fashion, Joe visits his favorite social networking site, such as Myspace. Once there his ParaSite software monitors which other profiles Joe visits most often and pulls their content onto Joe’s local Myspace copy. Again, Joe can add restrictions as to type and quantity of content to pull to his ParaSite. For example, no videos, just a snapshot of the first frame of videos, which Joe can always click on and view on-demand; and only 25 of the most recently posted photographs, with no individual photographs allowed over 200 Kb.

Joe repeats this process for his most frequently visited Websites until he has a “playlist” (ordered collection) of ParaSites, on his mobile handset. ParaSites are touchscreen compatible and Joe can use flicking motions to scroll through lists or rows of mini-thumbnail images for each ParaSite. Joe can group collections of related Websites into “playlists” similar to the way he creates playlists of MP3 songs.

Joe then sets his ParaSites profile to manage storage space limitations for each ParaSite in specific, and his entire playlist (collection) of ParaSites in general. Joe also uses his ParaSites profile to manage when and how information updates take place. All profile selections can be applied globally to all of a user's ParaSites, or be fine-tuned for individual ParaSites.

Now let's say Joe has entered an area where his mobile handset does not have access to the Internet. He can still view and use the local data on each ParaSite. And any item he clicks on (with the mouse or tap of his finger on the touchscreen display) that needs Internet connectivity to pull the content is stored in a Cached Instructions folder, and may be carried out next time Joe has Internet connectivity.

Over time as Joe interacts with his ParaSites, he can optionally choose (or not) to let ParaSites software track usage patterns and automatically reconfigure the mix of content that is stored locally on Joe's mobile handset. This new mix might include deleting some ParaSites, and replacing them with other ParaSites, as well as changing the mix of content within a given ParaSite.

Mini-Blog

Some users create huge blogs. Not all of their friends will want access to the full content, so those friends can create a ParaSite of just that portion of the blog they want to view—especially if they are viewing with a storage or screen-size limited device such as a mobile handset. The fact that the ParaSites can display blog content in tiles (Tilz) format, also enables easier mobile handset viewing of the content.

ParaSites on TVs

In embodiments ParaSites are displayed on televisions via set top boxes, digital video recorders (DVRs), or other devices which support third-party and/or Internet content uploading. ParaSites may also be displayed on compatible TVs directly via plugging in a storage device such as a (compatible) thumb drive which contains the user's ParaSites (if the user's TV or set top box has such a facility) or via an Internet, WiFi, Bluetooth (or other communication/networking protocol)-enabled set top box (or other means).

ParaSites in Cars and on Airplanes

ParaSites can live on storage devices such as thumb drives or digital memory card. In embodiments, users simply plug the thumb drive into (a PC or) an automobile (that supports and displays third party digital content) or an airplane personal entertainment unit for display and utilization on the seat-back screen and the user's ParaSites collection comes to life—even without an Internet connection. Alternatively, users may broadcast (CloudCast) their ComCloud from their digital device, such as their mobile handset, to stream their ParaSites' content.

Parasite as Widget

In embodiments, ParaSites act as widgets (Webified mini software applications) to perform various functions. For example, takeout pizza ordering. Some pizza companies are now accepting online orders and/or text-message orders. This process is much easier if users select the ParaSite for their favorite pizza place, and click on the ParaSite's menu section and order (and pay for) the desired pizza with a few more clicks/taps/et. al. Users download the ParaSite of their favorite pizza places onto their mobile device, where it is most convenient for them to place an order to be delivered or picked up. Pizza Places might pay users to be the exclusive pizza ParaSite (widget) on a user's mobile device (TV or other device or thing).

On-Demand Hosting

Users can create and host a ParaSite on, say, their mobile device; but if that ParaSite becomes very popular, or experiences a temporary burst in traffic, it can be automatically (or temporarily) hosted at another/third party site. A new type of on-demand Website hosting occurs for those cases where the user has created a "local-only" ParaSite, without having ever created a conventional or an ISP-hosted version of that Website. When the popularity of that "local-only" ParaSite becomes too much for the individual to host, the ParaSite software can, at the user's option, upload the ParaSite to a designated ISP (or other entity) for temporary high-volume hosting.

Peer-to-Peer Parasite Sharing

Additionally, peer-to-peer ParaSite sharing addresses high demand traffic issues—by enabling users to trade ParaSites (Tilz) with each other directly, rather than all content being sent from the main hosted Website. In a virtuous cascade effect, the more popular a ParaSite is, the more users have obtained a local copy. Thus, there are more users making copies of the ParaSite available from their digital devices directly via peer-to-peer sharing with their friends and associates. The more popular a ParaSite is, the more abundant it will become—automatically—and without necessarily overtaxing the conventional (potentially ISP-hosted) main Website. Without local copies of Websites, the more popular a conventional art Website is, the more likely it is to be overtaxed, or crash, or slow down due to the fact that most users are utilizing the (single) main Website Third-Party Edited Versions of Websites Website owners can optionally allow third parties to create a customized "directors cut" ParaSite. Similar to the process whereby movie producers release a digital version of a film and let third parties create their own versions or "cuts" of a film (ala the "director's cut"), Website owners can allow third parties to create an edited version of their Website. Some Websites contain thousands of pieces of information. This might constitute information overload for some visitors to that Website. Those users might want an edited version of that Website. Since ParaSites enable individuals to create an edited version of a Website (a Website "clip"), containing just those sections the user desires, ParaSites also allows one user to sync with a ParaSites version of a Website created by another user.

For example, let's say there is a comprehensive Website about wine, but it contains too much information to be kept locally, and most of the information is not relevant to the user Joe Smith. If Joe has a buddy, Pete, who has similar tastes in wine, and Pete has taken the time to produce a ParaSite of the comprehensive Website, then Joe can sync his ParaSite with Pete's ParaSite. That is to say, Joe can benefit from the time Pete spent creating a usefully and/or artfully edited version of the comprehensive wine site.

Ad Hoc File Sharing

The concept (and various embodiments) of ParaSites includes not only Websites, but also individual documents or files. Take for example a dozen users who all work in the same department at some company and need access to certain common documents. To this end the department manager creates a Common Docs ParaSite which is "hosted" on the manager's mobile handset. Any one of the department workers may create a ParaSite document and simply add it their copy of the Common Docs ParaSite which resides on each of their mobile handsets.

Each time there is an update to any existing document or any new document is added, all the department workers' Common Docs ParaSites will sync next time they are connected to the Internet or directly peer-to-peer with each other's mobile handsets, say via Bluetooth. And since future updates to an existing document only send the document changes (as opposed to the entire document), many interactions are no more bandwidth intensive or intrusive than any two people exchanging a text message. Thus users can utilize ParaSites to provide a means of ad hoc file sharing.

Non-Website Digital Content

ParaSites technology is extensible to any type of digital content. For example, users could have a local copy of a cartoon character live and/or reside on their mobile device or TV, and have some limited capabilities even without running or having a copy of the videogame on that device).

Video Game Compatibility

In embodiments ParaSites are configured to function on videogaming rigs and consoles. The Invention Website also includes downloadable software code that videogame developers can incorporate into their videogames to enable them to display and have their characters use ParaSites (or Parasites technology) inside their actual video games.

Non-Console Video Gaming

In embodiments ParaSites enable some aspects of single- and multi-player games to be played on some Internet-enabled digital devices, such as certain mobile handsets, or PC or TV. In embodiments popular videogame characters can be pulled as a local copy to a user's digital device of choice. And though removed from the standard videogame environment and videogame console, some video game characters are, per ParaSites, able to "live" outside the confines of the video game, and begin to take their place in their user's everyday life, living locally on a variety of devices (such as mobile handsets, TV's, refrigerators, et. al.).

Collecting and Trading ParaSites

Similar to the collecting and trading of baseball cards, ParaSites (and in particular, the especially useful or artful custom versions certain individuals have or have created) can be collected and traded by users. Once a user has amassed a collection of ParaSites, they can share their collection with other users in several ways:

ParaSites collections may be shared and traded via the ParaSites widget and/or Website. Users can also create and trade their own custom "skins" for their ParaSites cover tiles.

ParaSites, and collections of ParaSites, may also be sent directly, say mobile handset to mobile handset via any number of wireless or wired protocols. For example a mobile handset user could use Bluetooth to send a ParaSite for a cool new travel Website to a friend. The ParaSite received by the recipient will at first be in the format selected by the sender. However, when the recipient next connects to the Internet (or otherwise accesses the main hosted version of that Website) the ParaSite may morph to display the ParaSite's information according to the recipient's (Web Pref) preferences profile.

Parasite Pro

ParaSite Pro is for corporations, government agencies, and other organizations and clubs, giving them greater control, such as remote management and wipe. Corporations can give their customers a customized Website (ParaSite) with information that can include in-process manufacturing data, account data, financial information and a history of all past communications. A (conventional art) extranet does not live on a company's customer's mobile device. ParaSites do.

Misc.

ParaSites are personalized (as per each user's profile); One-to-one marketing (customized experience, ads, and transactions for each ParaSites user); Evangelists (sharing a ParaSite version of a Website with their friends and/or fans, has the effect of evangelizing a Website's content/message); Traffic reduction (in embodiments, ParaSite (Tilz) are shared among users, utilizing users' bandwidth or alternate means such as Bluetooth (thus reducing network traffic)).

Cloud/Distributed Computing

ParaSite technology can determine the most expeditious means of delivering a ParaSite. For example, download the ParaSite from the main site or have the ParaSite sent from another user. Thus, in effect, ParaSites are "hosted" at many different sites—that is to say, on individual users' digital devices—far more efficient than conventional art content delivery networks.

The present Invention may be embodied in other specific forms without departing from its spirit or essential characteristics. The described embodiments are to be considered in all respects only as illustrative and not restrictive. The scope of the Invention is, therefore, indicated by the appended claims in addition to all foregoing descriptions. All changes which come within the meaning and range of equivalency of the claims and foregoing descriptions are to be embraced within their scope.

The Wireless Location-Establishing Device Provides a Platform for Mobile Digital Content Format A system, method, service and platform for providing a next generation mobile digital-content format are disclosed. The present Invention (hereafter "Tilz") is informed by the shift to a new computing platform—the mobile digital device. Current document formats are largely incompatible with the smaller screen size of mobile digital devices, and lack functionality across the entire spectrum of digital content formats. Tilz is an unique universal, transactable, digital-content format, that makes viewing and using applications and digital content on mobile devices much easier. Furthermore, everything including documents, folders, Websites, songs, photos, videos, movies, tickets, credit cards, passports, keys, et. al. can be created/saved/displayed/utilized in Tilz MDF Mobile Digital-content Format.

Most conventional art document formats, which were primarily created during the era of the now aging personal computer (PC), are largely incompatible with the smaller screen size of mobile digital devices, and lack functionality across the entire spectrum of digital content formats. A leading document format, such as Adobe's Portable Document Format (PDF) is generally not utilized for music or videos or certain other types of digital content. Neither can most people build a Website from most current leading document formats.

The present Invention (hereafter "tiles" or the homonym "Tilz") is conceived as a response to the above-described deficiencies of the conventional art, and is informed by the shift to a new computing platform—the mobile digital device. Tilz is an unique universal, transactable digital-content format, that makes viewing and using applications and digital content on mobile devices much easier. Furthermore, everything including documents, folders, Websites, newspapers, magazines, songs, photos, videos, movies, tickets, credit cards, passports, keys, et. al. can be created/saved/displayed in Tilz MDF Mobile Digital-content Format.

Everything (digital) becomes one thing—a Tilz.

The present Invention enables novel forms of interacting and transacting based upon profiles—profiles which are captured in tiles, or the homonym thereto, "Tilz."

Tilz can be likened to a digital "baseball card" for every single object on earth—containing the profile of that object. And objects that have profiles can be interacted with and transacted with far more efficiently than today. And such profile-based interactions and transactions, lead to revolutionary new methods for search, marketing, advertising, merchandising, payments, social networking, et. al.

However, Tilz are not limited to objects. Any person, animal, animate or inanimate thing, idea, intention, philosophy, et. al.—literally anything and everything—may have a Tilz profile.

The metaphor of a digital baseball card is instructive as it relates to two of the primary drivers for the need for a new digital-content format: history and dimensionality. Each prior shift to a new computing platform (mainframe to mini, mini to PC, and now PC to mobile handset) has engendered a new crop of hardware and software optimized for the new platform. And it's those new technologies designed from the ground up for the new computing platform that historically are the long term winners vis a vis that new computing platform—and not the warmed over technology from the prior platform. It's time therefore for a new digital content format for the new mobile device platform. And regarding dimensionality, if one holds up a traditional 8.5"×11" document to a mobile handset, the dimensional mismatch of trying to view 90 square inches of document on 10 square inches of mobile handset screen, becomes apparent. A new digital-content format built from the ground up for the new computing platform screen size (but amenable and adaptable to any screen size) is therefore desirable.

Over a billion cellphones are sold each year. Over 100 million new users connect to the Internet for the first time every year. The majority of them are connecting with a mobile handset. Yet the current format of documents and other things is still geared toward personal computers—especially those connected to ever larger display screens.

The personal computer (PC) is outmoded and out of sync with the majority of new Internet users. A mobile handset is smaller, requires less maintenance, has an instant on operating system and is fast becoming the next generation computing platform (now that the PC is over 20 years old). As per a major paradigm shift, everything should be clean-sheeted (rethink; start over with a clean sheet of paper) including how content, applications, Websites, documents, and other things are formatted. As content becomes digital and utilized on a wide variety of devices, the old convention, say, of a document as an 8.5"×11" sheet of paper is no longer a desirable model to emulate. A new mobile document format needs to be developed that rids itself of the boring shackles of emulating the analog world, and fully embraces the cool and limitless digital world.

In many second and third world countries, it's unlikely that the investment required for large scale hard-wired Internet infrastructure will be made anytime soon. Thus wireless access, particularly mobile handset access, is likely to continue to be the dominant modality. It would be preferable to have a new format for documents that is designed from the ground-up to work with mobile handsets.

Tilz are the paradigm-shifting solution to the problem of how to view and utilize digital content on the mobile handset. Instead of adapting the current size of documents and Websites to mobile handset screens, Tilz are a new universal format that fits the screen size of mobile handsets. Everything including documents, folders, Websites, newspapers, magazines, etc. can be displayed in the Tilz mobile digital-content format.

Tilz are not limited to mobile handset-sized screens as they re-size to any size display screen—such as large screen TVs. As televisions morph to become a hub of users' lives, they may need a way, for instance, to display documents and Websites et. al. in the margins of the large screen display area—and Tilz fit that size requirement perfectly. In embodiments Tilz first appear, no matter on what device or display, in Tilz view and size (mobile handset sized, similar to the size of a baseball card), but users can change their preferences in their Tilz profile to display a different size as default. Users can click on the re-sizing icon to cause Tilz to display in classic document size fitting the screen size of the device display.

Another way to think of Tilz is as follows. Instead of a Website containing hundreds (or thousands) of things, think of Tilz as: a portable Webpage containing just one file; a portable Webpage containing just one song; a portable Webpage containing just one movie; a portable Webpage containing just one document;

In embodiments Tilz is a profile for each and every thing, including each file, song, movie, document, et. al.

Tilz are metadata driven, as each Tilz is a profile of something. Furthermore, Tilz are "live"—i.e. they connect to the Internet (among other means) whenever possible to grab the latest updates to, or refresh the content of, the information contained in the Tilz.

In an age where people are so busy they have too little time, and are simultaneously experiencing an overload of information, the last thing people want, is more than what they want. Tilz comports with these trends by delivering a summary of information about every thing in a convenient "digital baseball card"-like profile. Though, if additional information is desired, it can be obtained via unique profile-based links to more information/Tilz.

The forthcoming mobile device revolution is such a tectonic structural shift for the computing world, that it demands that everything related to computing and networking be entirely re-imagined. Tilz has re-imagined the concept of a document. As well as how literally any digital content may be stored and displayed. Tilz are informed by the smaller screen size of the mobile handset, but also flourish in a multi-device environment. Tilz revolutionize marketing, merchandising, customer interaction, and social interaction.

With Tilz transactions are transactable. Tilz templates may be cool and beautiful, and a source of revenue as well as interaction. Tilz enable the next generation of notifications and messaging. Notifications, messages, and status updates can appear in Tilz templates. If a user received a Tilz from Fred, then any updates or messages from Fred can be displayed in novel fashion via the Tilz template. Tilz also generate new sources of revenue for application makers which choose to employ/enable Tilz. Tilz offer credit card companies entirely new business models based on transactions instead of users. Users' social profiles in Tilz means that users may get paid for monetization of their profiles. Users are incentivized to create Tilz for every object on earth, because Tilz creators may share in the revenue generated by that Tilz.

Tilz create a brand new profitable and exciting format for magazines and newspapers (not to mention books, movies, TV shows, pictures, etc.). And Tilz extend the reach of magazines and newspapers into the real world. Tilz are location-aware, touch-capable, interaction and transaction ready, and thus suitable for mobile devices—as compared to conventional aging/outmoded formats such as .doc and PDFs. The simple act, for instance, of a user adding movies to the user's Movies Not Yet Seen list may put money in the user's pocket and provides movie vendors of all sorts, new avenues to attract and interact with potential customers.

Tilz replace email. Tilz replace Websites. Tilz are the beginning of the end for conventional overly complex relational database systems. Tilz are geo-tagged and location aware. Tilz enable a new type of paid search that also works in the real world, not just online (and the users get paid). Tilz may take the place of everything in a user's wallet from cash and checks to credit cards and library cards and shopping/loyalty-programs cards and workplace badges et. al. Tilz are the embodiment of the forthcoming mobile device revolution.

The present Invention is described in one or more embodiments in the following description with references to the Figures. While the Invention is described in terms of the primary modes for achieving the Invention's objectives, it will be appreciated by those skilled in the art that it is intended to cover alternatives, modifications, and equivalents as may be included within the spirit and scope of the Invention as defined by the appended claims and their equivalents as supported by the disclosures and drawings herein.

A primary purpose of the system, method, service and platform for providing a next generation mobile digital-content format described herein is to address the fact that most current digital content formats are still geared towards personal computers, at a time when the mobile handset is emerging as the new computing platform. The disclosed system, method, service and platform also enable new forms of interacting and transacting based upon profiles—profiles which are captured in tiles, or the homonym thereto, "Tilz."

Although various embodiments of the Invention extend to any mobile digital-content format that is consistent with the principles described herein, one embodiment is described in the context of a Website, server software and widget (Webified mini software application) that is collectively referred to herein as the "Tilz Platform."

According to this embodiment of the Invention, the Website, server software and widget enable users to utilize a new universal, transactable, digital-content format that makes creating, using and viewing applications and digital content on mobile handsets (and other devices) much easier. In addition, Tilz are designed to be functional on a plurality of digital devices, such as TVs, DVRs, set top boxes, PCs, cameras, gaming rigs, etc.

Tilz is a novel format for documents, files, data, and all other digital content (Websites, music, videos, photos, et. al.), optimized for the mobile handset screen size/topology.

As used in connection with the digital formats of these embodiments of the present Invention, the following terminology is defined as:

Clipz, deckz, and rackz refer to groups of related tiles/Tilz.

Tribe Tilz also refer to a group of related Tilz, usually those Tilz which share common tags, but also can refer to the user's group (of friends) lists (their tribes).

Mosaic is an artful grouping of a user's (favorite) Tilz.

Spherez is a means of navigating a plurality of Tilz—see detailed Navigation section below.

Tilz Creation

There are a plurality of means to create Tilz that include: the user takes a picture or scans the (Internet protocol based IP) barcode (such as Net Dotz) for that item. Tilz may also be created by clicking an MDF (Mobile Digital-content Format) icon on the bottom of a content page. And, in embodiments Tilz may be created from any program that chooses to embed Tilz technology in it (or be otherwise compatible with the Tilz widget). Users could choose to save, for example, a Word document as .MDF.

Tilz Website

The Tilz Website includes various features such as profiles, comment sharing, blogging, tagging, chat, message boards, etc. The Tilz Website is a place where users come to discuss, share and discover a plurality of types of digital media: music, books, photos, videos, etc. all of which are captured in Tilz.

The Tilz Website includes a digital content store. Users may also use the Tilz Website to store the IP addresses of all the digital content a user owns, such as songs/movies, along with all playlists. Users can then simply download all their owned content to any new device at any time. This is in contrast to current users who may spend hours just trying to transfer MP3 (or other format) songs from their old computers to their new computers.

Appraisals

Appraisals for the condition of Tilz items works in a fashion similar to rock climbing ratings. Knowledgeable people set a rating, but others can reset ratings. Appraisers themselves are also rated, and carry with them a rating score. The more times an appraiser has their rating re-set, the lower their score.

Global Platform

In embodiments, Tilz constitutes a platform for third party applications to run on. Unlike a social networking site platform such as Myspace, which is a single Website platform for third party applications, Tilz is a global platform for any Website, any device (mobile device, PC, TV, MP3 player, refrigerator, etc.), and for any and all types of digital content (videos, photos, music, movies, e-books, documents, files, folders, etc.). In embodiments Tilz auto-resize depending upon the device displaying them, as per the user's preference profile.

Relational Database

In embodiments Tilz are a form of relational database—via the use of tags. For example:

A user takes a photo or video of a Boy Scout camping trip. In the tags section of the photo/video they could add tags such as: vacations, Boy Scouts, 2001 Yearbook, camping, tents, etc.

A user also takes pictures of their Boy Scout trip to London and adds tags such as: vacations, London, Europe, Boy Scouts, etc.

When the user searches for the tag keyword "vacations" it will bring up all such tagged Tilz. When the user searches for the tag keyword "Boy Scouts" it will also bring up those Tilz—without the user having to file individual copies of that same Tilz in multiple folders with the tag keyword names. This enables users who are searching their Tilz to bring up all related Tilz with a few keywords.

Users don't have to know how databases work or deal with the complexities many of them introduce. Furthermore since Tilz may contain all types of digital content it is simple for a user to create a "database" that contains text, dates, videos, pictures, Website links, etc.—because they are simply individual Tilz with those types of content to which the user added keyword tags.

And Tilz metadata tagged relational database capabilities inform both structured and unstructured data analytics.

Search

Search is built into all Tilz and the built-in search capability enables users to search any and all Tilz (as per user-selectable privacy/security settings) connected to the Internet (or via other means, including but not limited to peer-to-peer connections), not just on the user's digital device (such as mobile handset or PC).

Notifications

Tilz reveal if content has changed via a plurality of types of notifications, including pulsing frames, actual image of the new content, audio notifications, etc. If the user grabs the real estate listing Tilz for a house, the user could set that Tilz to notify the use each time there is an Open House for that property. See also REFLECTION below.

Built-in Browser

Tilz obviates the need for stand-alone browsers, with a mini web browser built into embodiments of Tilz—that is to say an active browser opens when a user has one or more Tilz open on any digital device. This browser is hidden, but automatically connects those Tilz to the Web whenever those Tilz are in use (unless the user sets the Tilz option to Do Not Autoconnect).

In order to save memory, once one open Tilz has its browser active, all other active Tilz on that same digital device may use that same browser code—that is to say, although each Tilz has its own copy of the mini browser code built-in, it may not be called into CPU memory when that Tilz opens if another Tilz has its mini browser active. When each Tilz is opened a browser window is launched within that Tilz (which stays hidden until launched via means such a clicking an icon) and that Tilz is "live" if a connection to the Internet exists (subject to the user's preferences profile).

Users may opt to instead use third party browsing technology instead.

Built-in Operating System

Tilz reduce the need for underlying operating systems such as Windows, by having a micro operating system built into embodiments of Tilz.

The built-in Tilz operating system allows Tilz to communicate with each other irrespective of the underlying operating system of the digital device on which they reside (similar to the open source zero configuration technology). Since the Invention treats documents, files, et. al. the same way some other companies treat electronic devices, the Invention communication technology provides automatic Internet Protocol (IP) network configuration and dynamic discoverability of other Tilz (as well as hardware devices). Each Tilz' IP settings are automatically configured.

Each Tilz is then discoverable (subject to user-selectable privacy/security settings) by any other Tilz that are network/Internet/peer-to-peer connected. Tilz may operate via the network subnet for ad hoc local and wide area networking or via "pinged" peer-to-peer connections (or via other means). This technology also allows Tilz to discover other devices such as printers, enabling, for example, wireless printing from mobile handsets.

The Tilz operating system also manages basic event handling.

MDF

When any digital content is saved as a Tilz it is optionally appended with the following file extension: .mdf or .MDF or other/no file extension. In embodiments Tilz=MDF=mobile digital-content format. For example a Tilz document may be saved as: client_letter.mdf (instead of, say, client_letter.doc). If possible Tilz may seek establishment of the Tilz domain suffix .mdf (ala .com or .net) since each Tilz is assigned its own IP address.

How Tilz Work

In embodiments the Tilz widget enables compatible applications that support printing to generate MDF—the mobile digital-content format for Tilz (i.e. provide the user the option to Save As MDF rather than physically print that document (or other thing)).

In embodiments the Tilz widget also adds the capability to create most any document in Tilz format. For example, when using a word processing program, when the user is creating a new document, the user may be presented with the option to create said document in Tilz format. This is in contrast to Adobe's PDF, which can be likened to a shell a user creates after they are finished composing a document. Saving in PDF is selected, for example, as an alternative to printing the document. Tilz (MDF) may also be selected at the time of document creation.

A selection of Tilz templates are available from drop down menus that may be added to compatible software programs the user is utilizing to create a digital document/content. These drop down menus are added by the Tilz widget. For instance, a user has created a document using a word processing program. The user could choose to save that file not only in standard .doc format, but also in .mdf format.

Furthermore, the Tilz widget allows a user to select an option to automatically create a Tilz version of every document that that user creates with that program. As the document is saved in .mdf format the user may add metadata such as Document Summary, tags/keywords, and cover art and document customization elements.

Icons

User-selectable continuously (in)visible and menu-resident icons can populate various positions along the edges and corners (and other locations) of Tilz. For example:

an icon to take the user to the native document from the Tilz version;

an icon to take the user to more documents by the same author;

an icon to take the user to related (tag/keyword matched) documents/digital-content;

an icon to print the document/digital-content.

IP Address and Barcode

Every Tilz has its own unique ID number—its IP address. Each time a Tilz is created by a user, an IP address is assigned (in embodiments, from that user's bank of IP addresses, such as from IPv21). Alternatively, an IP address is assigned automatically to each Tilz next time that Tilz is connected to the Internet. Additionally an IP-based barcode (such as Net Dotz) is assigned to each Tilz. Other users may scan this barcode to be taken to the IP address where the content of that Tilz resides. The IP barcode also simplifies the process for that content to be utilized or selected by a reader.

Tilz confer an unique IP address for every object, person, thing, et. al. captured/profiled as a Tilz. The IP address is the location where more information about that object can be found. Consider the Tilz for a clock radio: the clock radio has a serial number, which is its ID number, which is its IP address for its Tilz, which is the profile for that object.

For example, if Sony sold 1 million units of the model 1000 clock radio, then each of the 1 million Tilz (one for each individual clock radio unit) are unique. Furthermore, the profile of an object, such as a clock radio, contains other unique information, such as information related to the ownership of that clock radio by the person who purchased it: Sony clock radio, serial number #123456789, was purchased on Apr. 10, 2001, by Joe Smith, at the Best Buy, at 1111 Industrial Blvd. in Redwood City, Calif., for $35.31, paid for with credit card xxxx-xxxx-xxxx-1234. The extended warranty was purchased for an additional $9, etc. etc. So too would any warranty or repair information be included on the Tilz. In fact, any information regarding the person's ownership of that object can also be captured in the Tilz.

Tilz is also the ongoing relationship, for instance, between the product maker/retailer and the owner of the product. If the owner of the product wants to get hold of the product maker/retailer, the owner does so through and via the Tilz—which has unique built in communication facilities.

Live Data

Tilz based digital content is updatable. Tilz based content can be automatically refreshed as new information becomes available, via a plurality of means including Internet and/or peer-to-peer modalities. When (master) content is refreshed by the content creator, all Tilz containing that (slave) content can (at the publisher's/subscriber's option) also have their content automatically updated.

As a transactable object, Tilz may produce revenue for users, and content providers, and third parties, and even original application providers. In embodiments, content is refreshed by the content creator who has the master Tilz. Tilz slaved or subscribed to that content may have their Tilz automatically updated, for free or for a fee. Tilz tag data can, at a user's option, be automatically enhanced—if other users add metadata and tags to their Tilz, any other user's Tilz may be informed by that same data. Furthermore, Tilz enable a new type of digital video recorder (DVR)—the DCP (digital content provider). A DCP pulls Tilz/content that meet the user's interest profiles and other profiles. Tilz are tagged so DCP's can continuously seek out and acquire desired content, even via peer-to-peer means such as Bluetooth. So if a user has an interest in butterflies and another person walks by who has cool butterfly-related Tilz, that user's DCP can acquire for free or for a free those butterfly Tilz (as per both party's preference profiles, and digital content rights).

Tilz, and a Tilz information navigation modality, Spherez, also automatically attract like content.

The Invention employs and incorporates many unique technologies, such as the ability to execute novel interactions and transactions, even offline, as per the detailed descriptions below.

Having generally described operation of the systems and methods creating and utilizing a mobile digital-content format, various embodiments will be described with respect to FIGS. 40-49.

Figure 40:
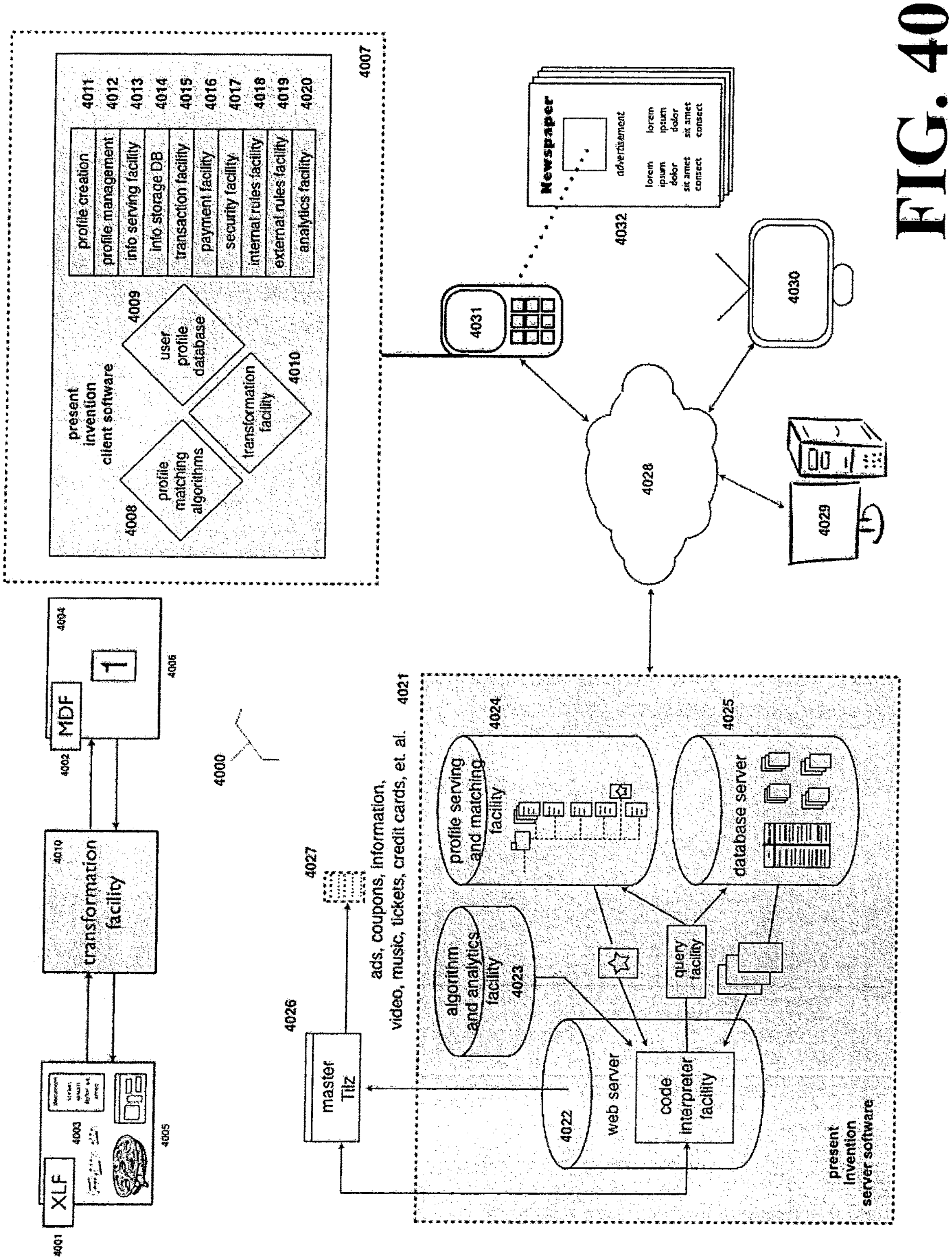
FIG. 40 is a functional block diagram illustrating an embodiment of a depiction of the transmutation process, wherein content in any language format is translated into the Invention's unique universal mobile digital-content format MDF—everything is transmuted into one thing, a Tilz. Providing additional detail is a functional block diagram of an embodiment of an exemplifying architecture of the client and server software systems that inform the Tilz Platform functionality.

FIG. 40 shows an exemplifying architecture of an embodiment of an universal digital-content format system, method, service, and platform in accordance with the Invention which is designated generally as system 4000.

System 4000, hereafter the "Tilz Platform," consists in embodiments of server software 4021 and client software 4007 which includes a widget (Webified mini software application) configured for operation with a variety of digital computing devices including mobile handsets 4031. The widget enables users to engage and manage a number of facilities pursuant to transforming a plurality of digital content types 4005 into a single type 4006, a Tilz, and interacting and transacting thereupon the resultant Tilz.

FIG. 40 is a functional block diagram illustrating an embodiment of a depiction of the transformation process 4010, wherein content in any language format 4001 is translated into the Invention's unique universal mobile digital-content format "MDF" 4002—everything 4003 is transmuted into one thing, a Tilz 4004.

FIG. 40 is further a block diagram illustrating a depiction of system 4000, hereafter the "Tilz Platform," which represents an embodiment of the system, method, service, and platform by which a user creates profiles of things, which in turn inform the ads, offers, information and other data the user receives regarding same. In embodiments the Tilz Platform consists of client 4007 and server software 4021, but which more generally consists of a plurality of computer applications, devices, components, facilities, and systems, as well as a plurality of data facilities, including various data sources and data acquisition facilities. The foregoing may be centrally located or geographically dispersed, may be locally and/or remotely interconnected, and may consist of distinct components or be integrated into combined systems. In the illustrated embodiment, the Tilz Platform 4000 architecture facilitates the processing of user-initiated queries entered into a query entry system functioning in conjunction, for example, with a barcode reading facility on the user's mobile device 4031. The mobile device may process the results of this query locally via client software 4007, or transmit the results of this query to a remote server software system 4021 for further processing and/or routing to data sources and/or processing facilities, such as one or more servers, such as HTTP servers or other servers that are suitable for handling data that are transmitted over computer networks.

In embodiments, a plurality of profile acquisition facilities are available including barcode scanning facility 4031, RFID interrogator facility 4031, network or Internet-based facilities 4031, peer-to-peer facilities 4031, among other profile acquisition modalities. Profiles consist of tiles (or other units) of data about things, hereafter "tiles" or its homonym "Tilz." The user acquires a Tilz about something, such as a product (it is understood that the Invention applies not just to products, but also to people, animate and inanimate objects, ideas, or any other thing), by one or more of the aforementioned facilities/modalities. Via a vis scanning the barcode of the product or interrogating the RFID tag of a product, a Tilz (which is the profile of that product) may be returned directly, or indirectly via means wherein the query returns the Internet Protocol (IP) address where more information, the Tilz, may be found for that product. (Other Invention embodiments not involving barcode/RFID facilities are conceived wherein the same or similar data gathering and presentation is accomplished by more conventional vehicles such as Websites or other means.) Users may also acquire Tilz via network or inter-network (Internet) 4028 means, such as pointing a browser to the Webpage wherefrom Tilz for that product may be downloaded or otherwise acquired. Additionally, users may also acquire Tilz for the product via peer-to-peer 4031 means, such as via Bluetooth from, for example, another user who already has the desired Tilz for that product, say on their mobile device. Other peer-to-peer embodiments such as, but not limited to, person-to-machine and machine-to-machine interactions, facilitated by any number of communication modalities, may be utilized to acquire a Tilz about a particular product. Other modalities are contemplated, consistent with the principles of the Invention. And further, other embodiments of Tilz are conceived wherein in addition to being the profile for a product (or other thing), the Tilz may also act as a wrapper for the product/thing, such as in the case of a song or movie or document, and thereby confer upon the product/thing enhanced functionality.

Figure 43:
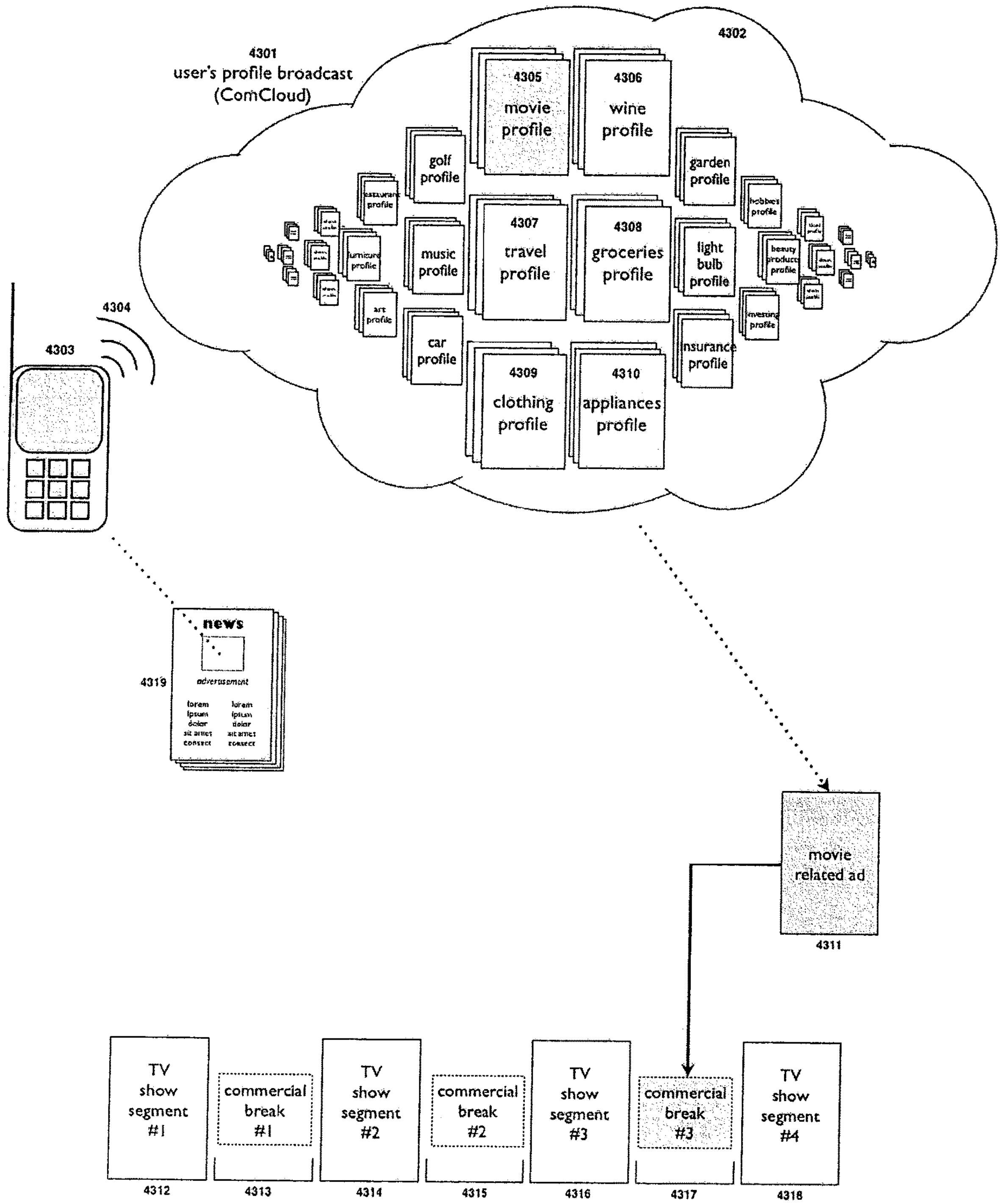
FIG. 43 is a functional block diagram illustrating an embodiment of an example of Tilz as the constituent elements of a user's profile broadcast which was just informed by the user scanning an ad for a movie the user wanted to see; whereupon a commercial slot is later filled when that user watches TV by the Tilz of the movie trailer for the movie whose ad the user scanned.

Once a user has acquired one or more Tilz about an object, the resultant Tilz, which is the profile of that object, is presented to the Invention's client 4007 and/or server 4021 software, for sorting into profiles 4011, which consist of logical groups and/or subgroups of one or more Tilz. FIG. 43 illustrates several sample user profiles including the user's movie profile 4305, wine profile 4306, travel profile 4307, groceries profile 4308, and other profiles 4302.

A user's profiles 4302, are then presented to the Tilz Platform client/server software 4007/4021 which in embodiments may include profile matching algorithm facilities 4008/4024, user profile database/storage facilities 4009/4025, profile creation facilities 4011, profile management facilities 4012, information serving/provisioning facilities 4013, information storage facilities 4014, transaction facilities 4015, payment facilities 4016, security facilities 4017, internal rules facilities 4018, external rules facilities 4019, analytics facilities 4020/4023 and/or other facilities. One or more of the foregoing facilities then processes the incoming/active profile, by a variety of means not limited to extracting keywords and metadata from the constituent Tilz containing and/or constituting that object's profile.

For each profile 4009 submitted to the Tilz Platform, the user makes selections (chooses to accept automatic defaults or system 4000 generated recommendations) regarding what types of data the user would like to receive, or not receive, vis a vis that profile. Granularity of data control extends to the individual Tilz within a profile. Additional choices regarding data reception control include, but are not limited to how, when and where users receive information about the product. (Incoming information about a product is hereinafter assumed to be received via data tiles or Tilz.) The types of data a user may wish to receive regarding a product include but are not limited to ads, offers, information, or other data/content.

For example, a user who just bought 50 items at a grocery store may scan the barcode at the bottom of the user's receipt, and thereby automatically receive a Tilz for each and every item they purchased. These grocery item Tilz are then sorted into the user's groceries profile 4308. If the user only eats Wheaties cereal, the user may elect to block, REJECT, any incoming cereal ads (which might annoy the user, who only purchases and eats Wheaties). However, a user who is a buyer of Minute Maid orange juice, and is open to receiving orange juice ads may therefore set their Mobi preference profile regarding orange juice ads to ACCEPT.

Users may fine tune, set the granularity of, or otherwise adjust Accept/Reject criteria via the internal rules facility 4018 or other facilities. Internal rules 4018 (such as those set by the user) and external rules 4019 (such as those set by wireless carriers, and other third parties) are applied to user's profiles 4009 and affect various aspects of information delivery and presentation. Examples of rules that can be set manually (by the user) or automatically (by Tilz Platform algorithm facilities 4023) include: 1) How, when, where to receive ads (for instance certain types of ads should be delivered to a user's TV 4030 from 7-9 PM on weeknights, other types of ads are to be delivered via car radio while the user is driving home from work; and still other ads are to be delivered to the user's handset at any time); and 2) Ad reminders: 36 months from now start tire ads. Tilz Platform can log the date the user purchased/installed new tires, and, if the user wishes, blocks tire ads until the user is likely to be in the market again for tires. Conventional targeted advertising fails miserably in this regard: if a user purchases new tires today, then that user doesn't need to see tire ads for, say, 3 years or 36,000 miles. And though the user isn't in the market for tires, that user may in fact use the word "tires" in the meantime, say in an email. Yet a conventional "targeted" advertising approach would likely serve that user tire-related ads (wasting the user's time, and the advertiser's money) during those 3 years.

Once one or more profiles has been processed, the Tilz Platform 4000 makes one or more profiles available to select entities via a user profile broadcast 4301, hereafter "ComCloud" aka "commerce communications cloud." A user's ComCloud may be broadcast by a plurality of modalities including Bluetooth, WiFi, wireless carrier network, Internet, infrared (IrDA), and/or other available means. For example, a user 4802 walking downtown, may choose to have their mobile handset 4801 broadcast the user's ComCloud 4805 (such a broadcast is referred to herein as a "CloudCast") via Bluetooth in such a manner that the Tilz Platform 4807 acts as a shield against information overload; a number of businesses 4819, 4820, 4821 may wish to send ads/offers/information/et. al 4816, 4817, 4818 via WiFi to the user's mobile handset, however the Tilz Platform 4807 may block the undesired ads/offers/information/et. al., and accept 4822 just those the user wishes 4806.

In embodiments, the Tilz Platform matches the profiles of various entities, against the user's profiles 4009, seeking matches for content (information/ads/et. al.) desired by the user against content available by the entity. Such entities may include, manufacturing entities (such as the manufacturer of Minute Maid orange juice), retail entities (such as grocery stores), advertising/marketing entities (such as ad buying agencies or market research firms), other users (who may, for example, share a similar profile), and/or other entities (who may, for example, share a similar profile).

In other embodiments, where entity profiles are not made directly available to the Tilz Platform, the Tilz Platform searches other sources such as existing online profiles, and performs profile matching against same.

Once one or more matches has been established, the Tilz Platform, as per the user's profile preferences, makes the user's profile available to the selected entity, for free or for a fee 4016 (which the user receives a portion of). Based upon the user's profile 4009, the entity then decides whether or not to pay 4016 to send the user ads/offers/information/et. al. as per the user's preference profile 4009. If the payment amount is non-zero, the user receives a portion of said monies.

Those skilled in the art may appreciate that entities already pay to get their ads/information/et. al. to users; they pay middlemen entities, which make guesses as to which users might be interested in that entity's ads. Middlemen currently peddle profiles based upon guesses (often obtained by spying on users' online activities), and those guess-based profiles are sufficiently valuable that ad-sending entities pay middlemen to acquire such guess-based profiles. With the Tilz Platform, guesses about what users want/need are replaced by facts, from users, who create, manage and monetize their own profiles—automatically via the Tilz Platform. With the Tilz Platform, ad-sending entities no longer need to guess which customers and potential customers to reach and how to reach them. And since customers and potential customers instead manifest their profiles directly, via the Tilz Platform, to such entities, middlemen may be disintermediated. Thus, in a logical value-for-value transaction, users are paid for the inherent value of their profiles, which because they are based-upon actual products/services a user actually utilizes, are more accurate, and thus more valuable, than the guess-based profiles from middlemen common to the conventional art.

For example, the above orange juice user might (be paid to) receive an ad from Minute Maid, which thereby hopes to convince the user to stay loyal to Minute Maid. However, if the user sets their Tilz Platform preferences 4009 to accept ads/offers/information/et. al. 4013 from competing entities, the user might be paid 4016 to receive an ad from a Minute Maid competitor, such as Florida's Best orange juice, which thereupon presents information in their ad endeavoring to cause the user to switch brands. Such ads/information/et. al. if presented to the Tilz Platform in a format other than Tilz MDF, may be transformed into Tilz MDF as per the transformation facility 4010 module.

In embodiments, the transformation facility 4010 method consists of an input agent which identifies the language format 4001 for the incoming digital content 4003, such as a song in .MP3 format. A job processor determines when an MDF file 4002 (Tilz) is desired and communicates instructions to the translator 4010. The translator 4010 generates an MDF file 4004 in response to the instructions and digital content metadata, as per the user's profile 4009. The Translator 4010 then integrates a subset of user profile information 4009 into the resultant MDF file metadata.

A main purpose of the transformation system and method 4010 described herein above is to create a universal data format that enhances the metadata for something into a full profile that actively informs interactions and transactions with regard to that thing. Hence Tilz. Tilz are profiles.

Once the user has created Tilz for their objects, family, friends, and anything else they wish, they can, via a plurality of means, broadcast their profiles 4013, which consist of Tilz, in such a manner that users can interact and transact 4015 with related parties by profile matching 4024 the Tilz metadata information: Users may socially network around shared interests; Users may be paid 4016 to receive ads/offers/information/et. al. about their products; Users may perform a novel type of search regarding any item wherein information comes to the user automatically: for a user needing a new refrigerator, the user adds the Tilz of their old fridge into their ComCloud (a profile Tilz broadcast) and thereby starts to automatically receive information/ads/offers/et. al. from those entities that can supply a new fridge that meets the user's profile (such as kitchen cabinet space requirements).

Pursuant to the above, Invention server-side facilities 4021 are provided. A profile serving and matching facility 4024 is configured to transmit profiles to/from mobile handsets 4031 as well as other remote devices 4029, 4030. The profile serving and matching facility 4024 work in conjunction with the algorithm facility 4023 which is configured to filter and match a plurality of available information/ads/offers/et. al. (configured into data "tiles" or the homonym thereto, data "Tilz") based upon metadata for each such information/ad/offer/et. al., against profiles 4301 of items a user has indicated a desire to receive (or not) information/ads/offers/et. al. for. A database server 4025 facilitates user profiles and preferences, as well as a rules facility by which certain actions must accord. A Tilz creation facility 4010 is configured, as per system 4000, to create Tilz, and refresh and sync the content thereof. A module is configured for storage, reception, transmission and broadcast 4022, 4031, 4301 of messages and other data, and in particular those data configured into profiles (a module hereafter referred to as "ComCloud"). The ComCloud module includes profile creation, filtering, and matching facilities.

Invention widget client-side facilities 4007 are provided configured for operation on mobile handsets 4031 and other devices. A Tilz creation facility 4010 is configured, as per system 4000, to create Tilz, and refresh and sync the content thereof. In embodiments the information translation facility 4010 translates incoming language formats into binary, and therefrom into MDF, the Tilz proprietary markup language format. A wallet module configured to produce digital versions of credit cards, tickets, passports, et. al. is provided. A ComCloud module is configured for operation by the Invention widget.

Users create new or update existing profiles 4025, 4301 by a plurality of means, including, for instance, scanning an ad 4032 in a newspaper for an item a user is interested in. The scan results in a query which returns a data tile (Tilz), about the subject item, to the user's mobile handset 4031. This data tile or Tilz is a profile of that item. For example, if the user scanned an ad for a bottle of Beringer Cabernet Sauvignon wine, and received the Tilz for same, the client-side widget 4007 queries the user as to whether or not the user would like to receive information/ads/offers/et. al. pertaining to Beringer Cabernet Sauvignon wine. The user's profile is updated presently by (the client-side software 4007 on the user's mobile device 4031, and/or) the server-side facilities 4021, which receive transmission of the query results via a plurality of communication modalities 4028. The user's updated profile is returned therefrom to the user's widget 4007 for inclusion in the user's profile broadcast 4013, 4301 (ComCloud). The ComCloud 4013, 4301 can be configured for various broadcast distances from global to just a few feet. For example, the mobile handset ComCloud 4013 may be configured for use via Bluetooth, which has limited range. Bluetooth range may be sufficient however to reach grocery stores the user is passing by which might otherwise be able to provision and/or sell the user-desired bottle of wine (and effect the transaction pursuant thereto via ComCloud). Or alternatively the user could broadcast (CloudCast) via the Internet the user's interest in Beringer Cabernet Sauvignon wine, whereupon entities that can supply that wine could send the user ads/offers/information/et. al. regarding same.

Master Tilz 4026 are the parent Tilz for a plurality of related/dependent Tilz. For example, Acme makes the clock radio model 1000, and sells 10,000 units. In embodiments, there will be one Master Tilz maintained by Acme Corporation, and the other 10,000 (slave) Tilz, all subscribe to the Master Tilz. All 10,000 slave Tilz contain the same general information (e.g. product manual, tech specifications, etc.), but differ in specific information, commencing with the serial number for each clock radio, which is its ID number, which is the IP address for the Tilz, which is the profile for that clock radio.

Figure 41:
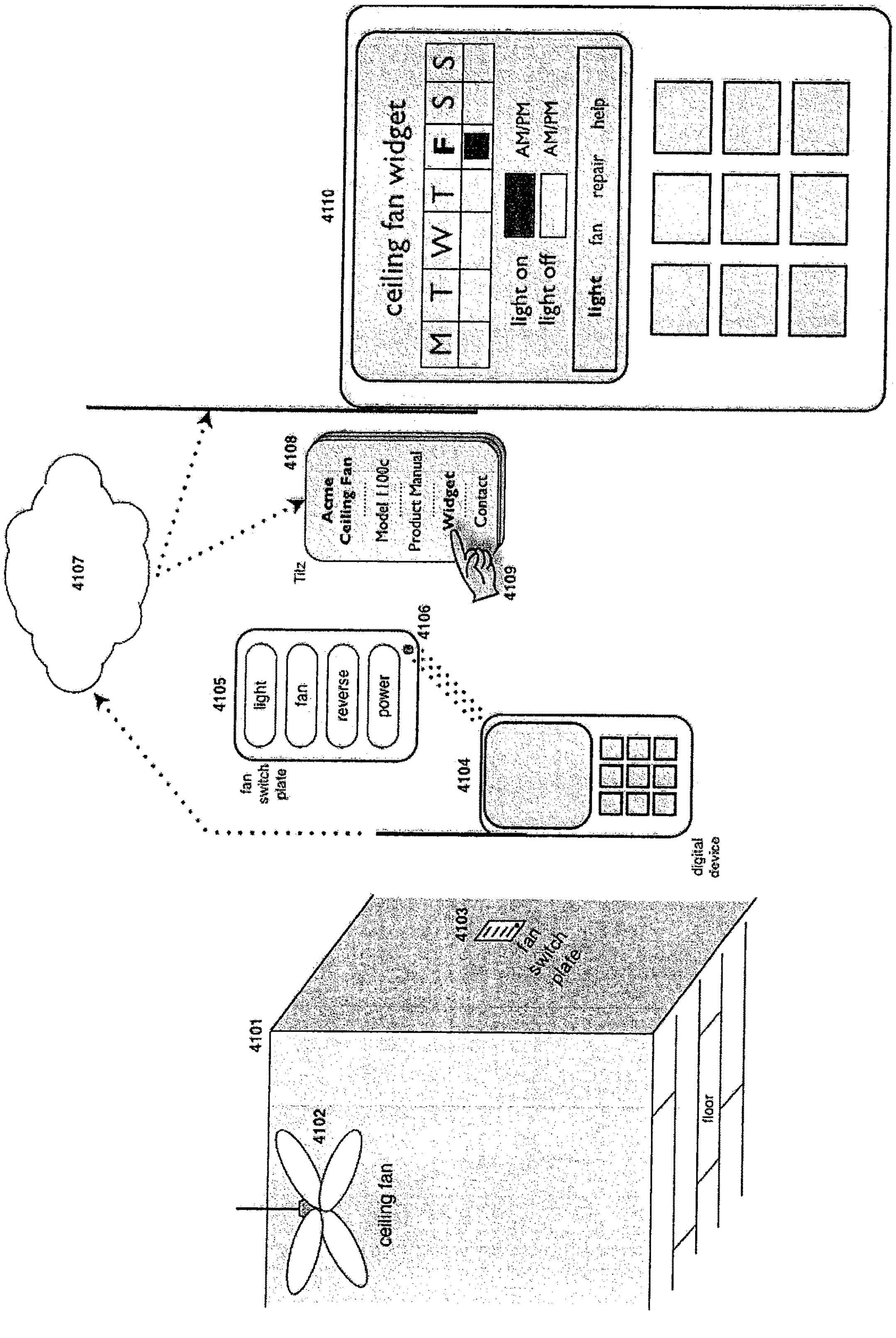
FIG. 41 is a functional block diagram illustrating an embodiment of an example of how Tilz can be utilized to program a user's ceiling fan light while the user is away on vacation.

FIG. 41 is a functional block diagram illustrating an embodiment of an example of how Tilz 4108 can be utilized to program a user's ceiling fan light 4102 to go on and off at various hours of the night, while the user is away on vacation, as a theft deterrent.

As per the conventional art, programming a ceiling fan is a tedious, non-intuitive process. The user has to perform a complex series of steps involving a convoluted series of button presses on the fan switch plate 4105, 4103 to cause the light to go on and off at the desired times/days. With Tilz, however, that all changes. With Tilz a user seeking to program the light in their ceiling fan 4102 to go on and off at set times/days while the user is on vacation, scans the barcode/RFID 4106 on the fan switch plate 4105, and thereby receives the Tilz 4108 for the ceiling fan on the user's mobile handset 4104. The Tilz 4108 includes user selectable options, such as the product manual and the software widget. The user selects 4109 the widget, which downloads 4107 the ceiling fan widget 4110 to the user's mobile handset. The ceiling fan widget 4110 provides a simple software program with intuitive user interface that easily facilities the desired light programming This ceiling fan widget 4110 may then stay resident on the user's digital device 4104, or be flushed/deleted, and downloaded again on an ad hoc basis. By retaining the widget 4110 on the user's handset 4104, however, the user retains the application functionality, which can be utilized even without an Internet/WiFi/wireless carrier connection 4107 available, via local means such as Bluetooth or RFID (assuming, of course, such or other communication modalities are (someday) built into ceiling fan switch plates).

Scanning the barcode/RFID 4106 on the fan switch plate 4105, 4103 returns Tilz 4108 associated with that ceiling fan. Each user may receive a different set of Tilz 4108, depending upon their preference profile. Examples of Tilz 4108 a user might receive may include the Tilz 4108 from the manufacturer (product specifications, product manual, a widget 4110 (a Webified mini-software application) that enables the user to control/program the ceiling fan, ability to contact manufacturer with questions regarding tech support, use, repair, replacement, etc.); Tilz 4108 from retailers who carry this same ceiling fan, or similar competing ceiling fans, and thus could offer repair services or replacement items; Tilz 4108 from manufacturers of competing ceiling fans (ads, offers, information that could potentially convince the user to switch to their competing ceiling fan); Tilz 4108 from entities that offer ceiling fan reviews (Consumer Reports, etc.); as well as other entities' Tilz as per the user's preference profile.

Figure 42:
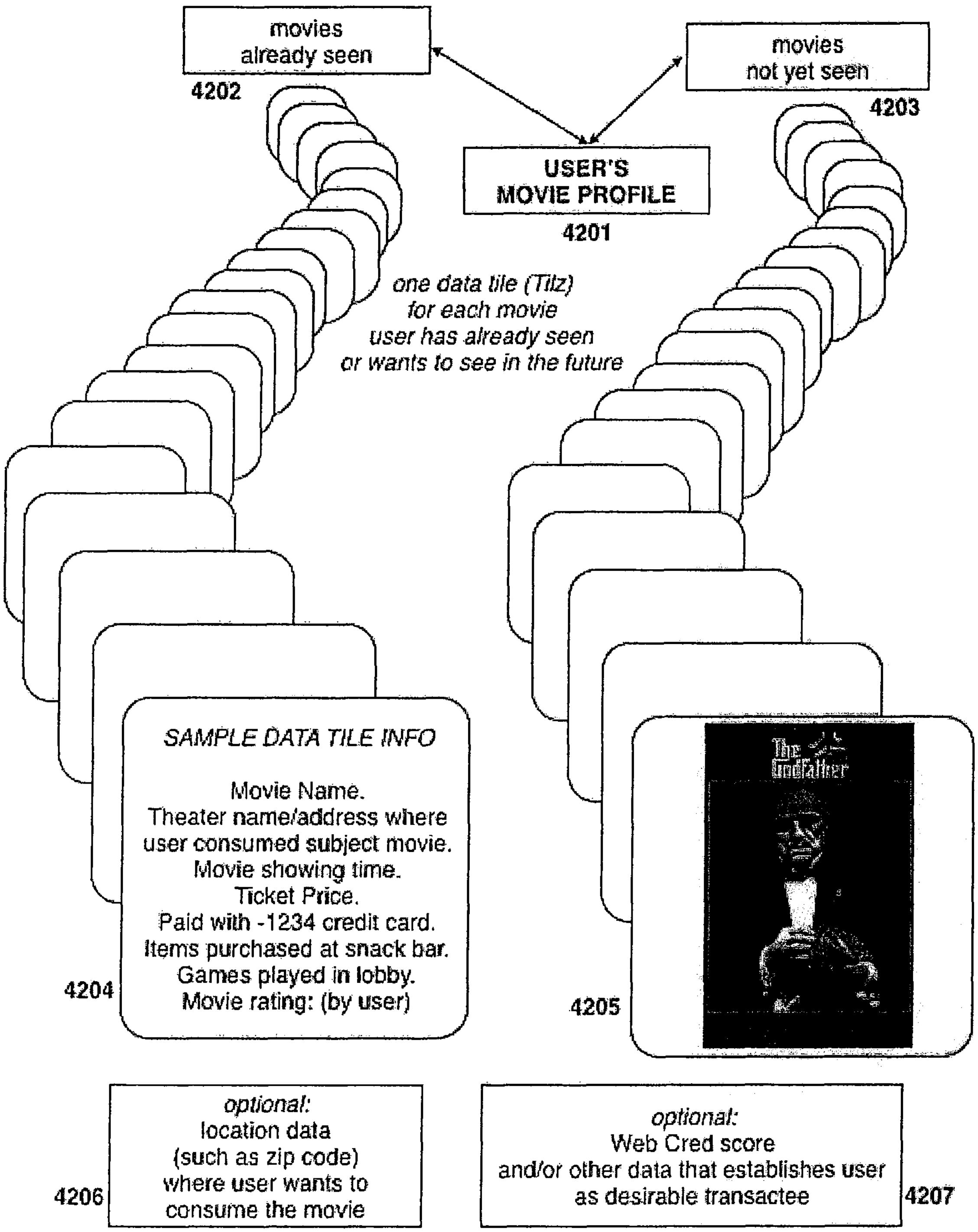
FIG. 42 is a depiction of an embodiment of an example user profile, wherein the movie profile is informed by a tile of information, a Tilz, for every movie the user has already seen, in addition to a Tilz for each movie the user would like to see in the future; as combined with optional location and score data.

FIG. 42 is a depiction of an embodiment of an example user profile, wherein the movie profile 4201 is informed by a tile of information, a Tilz, for every movie the user has already seen 4202, in addition to a Tilz for each movie the user would like to see in the future 4203; as combined with optional location 4206 and score 4207 data.

In embodiments users receive a Tilz 4204 each time they consume a movie and thereby their movie profile is automatically built. The Tilz may contain a profile of that movie watching experience. No matter whether a user sees a movie in the theater, buys the DVD, watches it on pay-per-view, a premium channel (such as HBO), or on a "free" channel, the user may receive a Tilz. For example, if a user goes to see a movie in the theater, they receive the Tilz 4204 as their receipt for purchasing the ticket. In addition, the Tilz profile of the user's movie watching experience might include information such as the name of the movie watched; the theater name/address where the user consumed the movie; the movie showing time; ticket price; paid with credit card xxxx-xxxx-xxxx-1234; items purchased at the snack bar; games played in the lobby; movie rating by the user; et. al. Alternative embodiments not involving Tilz are conceived wherein the same or similar data tracking and presentation is accomplished by more conventional vehicles such as Websites.

In embodiments a user's Movies Already Seen profile 4202 is built-up automatically over time, or users can choose to manually (or via other means) supplant their movie profile. Similarly, a user's Movies Not Yet Seen profile 4203 is automatically built-up over time via a plurality of means, including but not limited to scanning the barcodes of ads in the periodicals/newspapers/et. al.; digitally marking an ad the user hears on the radio or sees on TV; and/or recommendation by a friend or colleague; for movies the user hasn't yet seen, but wants to. In each case the user receives the Tilz for the movie, which is then added to the user's movie profile 4201.

Users may choose to include location information 4206 in their movie profile, such as the zip code in which the user wishes to consume that particular movie (location preference, can be per profile as a whole, or per individual Tilz). This information may be vital to potential ad-sending entities. For example, only those movie theaters near where the user wishes to consume the movie, may be interested in paying the user to send the user ads/offers/information/et. al. related to same.

In embodiments where ad-sending entities pay users to send ads to the user, the user must prove to the satisfaction of the ad-sending entity that the user (as per FIG. 42) is a legitimate movie-going user, whose expected future stream of movie-related expenditures 4203 are sufficient to warrant paying the user in the hopes of enticing that user to become a customer of the ad-sending entity. An additional tool ad-sending entities may wish to avail themselves of is the user's Web Cred score 4207. Similar in concept to a user's credit report FICO score, a Web Cred score is a numerical expression of a user's Web credibility; that is to say, a computed figure that examines factors such as the relationship between the number of information requests versus purchases for a given product. And in the same way that a FICO score informs a credit card company's decision to issue a person a credit card or not, an ad-sending entity may choose to factor a user's Web Cred score in deciding whether or not to pay to send ads/offers/information/et. al. to a given user.

FIG. 43 is a functional block diagram illustrating an embodiment of an example of Tilz as the constituent elements of a user's profile broadcast 4301 which was just informed by the user scanning an ad 4319 for a movie the user wanted to see; whereupon a commercial slot 4317 is later filled, when that user watches TV, by the Tilz for the movie trailer 4311 of the movie whose ad 4319 the user (just) scanned.

Tilz enables users to carry with them, for instance literally on their mobile device 4303, their profiles of everything. Users can store the Tilz on, and broadcast 4304 from, their mobile handset 4303. And such profiles, with Tilz 4302 as their constituent elements are continuously being updated by users various real world (and online) interactions and transactions. In this case, a user who scanned the ad 4319 for a movie the user wanted to see, did thereby update the user's movie profile 4305.

Companies with products, services and/or information related to that movie, might then pay the user to receive Tilz regarding same. One such Tilz might be the trailer 4311 for that movie, which may be slotted into a commercial break 4317 at a time of the user's choosing; and in preference to an ad that was likely much less relevant to the user than an ad which the user actively solicited—in this case, more information about a desired movie.

Tilz function with or without Internet, with or without wireless carrier provided network, and with or without other communication modalities such as WiFi. For example, if after the user scanned the ad 4319, the user ventured into an area where the user had no wireless carrier coverage, the user could still receive the desired movie-related information. Users can broadcast 4304 their profiles 4301 via means such as Bluetooth via their mobile handset 4303. Similarly other users can do so as well. Thus profiles 4302 can be matched between users. In this case if someone who walked nearby had the trailer Tilz 4311 for that movie on their mobile device. The user may receive the movie trailer Tilz 4311 via Bluetooth, then that movie trailer Tilz informs a commercial break 4317 while the user is watching TV later that night—again transmitted via Bluetooth to the user's TV or set top box or transmitted directly to the TV from the mobile handset 4303 itself.

A user's profile broadcast (ComCloud) 4301 can be broadcast from many devices, including a user's mobile handset, via a plurality of means such as Bluetooth or via Internet, or peer-to-peer via various means such as infrared (IrDA) or other. Thus the gathering and matching of Tilz can take place between almost anytime—continuously informing interactions and transactions.

Finally, Tilz metadata can include functions such as rules. For instance, how, when and where to receive certain types/profiles of ads. And Tilz can included ad reminders. If a user just purchased tires for their car, they don't need to see tire ads for 36 months or 36,0000 miles. Thus the users car profile can block tires ads for 36 months, then start accepting tire ads again pursuant to another tire purchase at that time.

Figure 44:
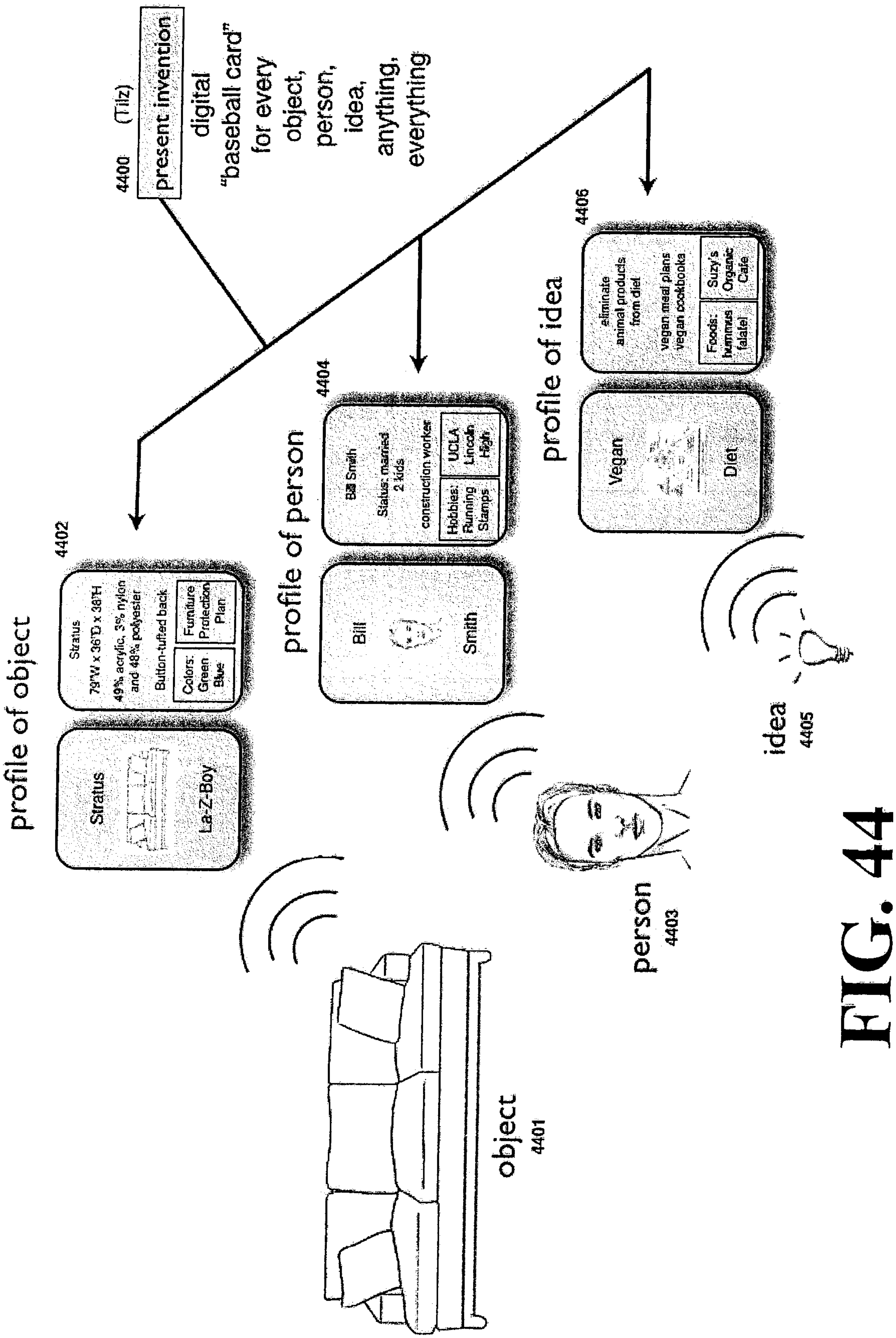
FIG. 44 is an illustration of an embodiment of an example depiction of the conceptual basis for Tilz: Tilz are like a digital baseball card for every object, person, idea, anything, everything.

FIG. 44 is an illustration of an embodiment of an example depiction of the conceptual basis for Tilz: Tilz are like a digital baseball card for every object 4401, person 4103, idea 4305, anything, everything.

The impetus for Tilz is to create a usable profile for everything, and thereby enable more efficient and enjoyable interactions and transactions. And not just every object 4401, but every person 4403, animal, animate and inanimate entity, molecule, atom, thought, philosophy, intention, . . . everything.

A Tilz 4400 profile of something may be presented in a limitless plurality of formats (shapes, sizes, colors, animated with sound, 3D, etc.). As shown herein the Tilz appear as the two sides to a digital baseball card—an atmospheric metaphor. Considering the profile for the couch 4401, the Tilz 4402 might include such information such as a picture on the cover Tilz, and very little other information. Just enough information to discover at a glance, the subject of the Tilz.

As a practical matter, a user who needed to have their couch cleaned, or was in the market for a new couch, may simply scan the barcode/RFID on their couch 4401, to receive the Tilz for same. The resultant Tilz 4402, which is downloaded directly onto the user's mobile handset (or other device of choice), contains a plurality of information such as dimensions, fabric materials, couch style information, available colors and the details of the furniture protection plan. The user may simply add their couch Tilz 4402 to their profiles broadcast (ComCloud), and update the couch profile to indicate the user's wants/needs: in this case, seeking cleaning bids, and also ads/offers/information/et. al. pertaining to a new couch. Because the vendors who can either clean the old couch or sell the user a new couch, may view the user's couch Tilz 4402 (if allowed by user), they may see salient information such as what types of cleaning products work with that type of fabric; and what dimensions the new couch will likely be similar to.

Without Tilz, the burden would be on the user to take the user's time, over and over, to explain to potential vendors the users wants/needs. With Tilz "digital baseball card" profiles, vendors have the information they need at their fingertips.

Tilz 4400 "digital baseball cards" are not limited to just two screens of information (which for convenience sake may be presented thusly) similar to an actual baseball card; indeed users can tap on various portions of the Tilz to discover further information available (in a manner similar to hypertext links on Web pages). Thus an unlimited amount of information potentially may be discovered relating to the item in question.

If the person 4403 in the present figure were not married, that user could instead create a Tilz profile of who they'd like to date, and thereby meet others with whom they potentially have a lot in common, as both parties may have a ComCloud profile broadcast 4301 of all their various profiles.

And not only do Tilz automatically attract information they user may find useful (such as couch cleaning vendors), but Tilz provide the basis for users to monetize their profiles. For a user possessing a Tilz for (the idea 4405) Vegan Diet, that user may be paid by entities such as Suzy's Organic Cafe 4406 to appear in a sub Tilz (a Tilz within a Tilz), as a place where that user may enjoy vegan meals.

Figures 45, 46:
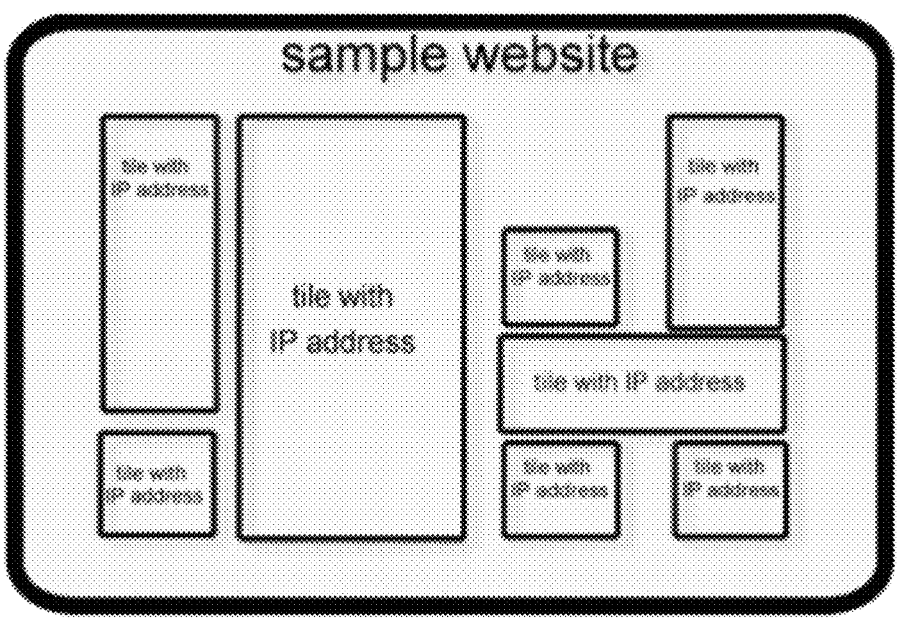
FIG. 45 is a table illustrating the distinctions between the Web's aging fundamental technologies, and their modern, designed for the mobile handset age, replacements including the present Invention, Tilz which supplant and update the aging hypertext markup language protocol.
FIG. 46 is a functional block diagram illustrating an embodiment of an exemplifying architecture of a Website, that not only is a Tilz as whole, but each element of the Website (text, photos, ads, etc.) are each Tilz themselves—each Tilz with its own IP address. Tilz within Tilz.

FIG. 45 is a table illustrating the distinctions between the Web's aging fundamental technologies, and their modern, designed for the mobile handset age, replacements including the present Invention, Tilz 4502 which supplant and/or update the aging hypertext markup language protocol 4501.

Created over a decade ago, the Web is informed by three fundamental elements (HTML, URL, HTTP) which are becoming ever more inconsistent with the rapid changes in devices and network usage. The PC was the dominant computing device when the Web was born in 1990, whereas today the mobile handset is beginning to emerge as the next major computing platform. A majority of conventional art networking protocols were designed for IP devices that were stationary. In short, some of the primary technological assumptions that informed the creation of the Web are no longer true today.

Therefore it is desirable for more advanced technologies to replace the Web's aging fundamental technologies, starting with HTML. Not credibly described as user-friendly HTML was designed by an engineer for other engineers. But for the billions of non software engineers on the planet HTML is an undecipherable, foreign language. Tilz replace HTML, as Tilz can be created using any software program, and simply saved as a Tilz. Once in Tilz MDF (mobile digital-content) format, a user can add the Tilz into their ComCloud profile broadcast and in seconds, with no programming needed, an average user has just created and hosted shareable content, via Tilz.

Similarly, it's time for the next version beyond URL and HTTP. IPv21 is an ID number for every object/person/thing on earth—an ID number, which is the IP address, for the Tilz, which is the profile, of that object/person/thing And with ComCloud, instead of using an opaque hypertext transfer protocol (HTTP) to move bits about, users can simply do so by dragging and dropping (or otherwise moving) items into their ComCloud.

FIG. 46 is a functional block diagram illustrating an embodiment of an exemplifying architecture of a Website, that not only is a Tilz as whole, but each element of the Website (text, photos, ads, etc.) are each Tilz themselves—each Tilz with its own IP address. Tilz within Tilz.

Each article or ad or table of contents (or other item) on a Website may each be in its own Tilz, with its own IP address. Readers may, for example, mark or select any particular section of a Website for later reference, downloading, printing (or other reason). For example, an address book can be a Tilz. Each entry in the address book is also a Tilz. Tilz within a Tilz. Each address book entry is a contact Tilz ("Tactilz"). Users may include another Tilz within any other Tilz, such as a bank statement entry for payment to the veterinarian, within the Tactilz address book entry for the user's veterinarian. Users can drag Tilz from one document (a bank statement entry) to another (their address book Tactilz), and have it include live data.

In embodiments Websites are comprised of Tilz. And with Tilz users may no longer have to go to the information technology (IT) person to add content to a Website. Any authorized user may simply drag a Tilz onto the hosted Website Tilz—and that content may be instantly available to all subscribers of that Tilz—including users simply viewing it online, as per conventional art Websites.

Tilz may replace Websites. Such an architecture has many advantages including the ability to grab any element/item individually, and easily add that item to one's ComCloud profile broadcast.

Most users have a dozen or so Websites they visit often. Users may keep (subsets of) those Websites in Tilz format, on their mobile handset or digital device of choice. Those Tilz may contain the user-selected version of those Tilz Websites, say CNN, ESPN, Google, Yahoo, Amazon, etc., and be updated each time a user has a network connections (or updates the Tilz content via other means, such as peer-to-peer with another user or other entity).

Tilz presents Websites in a size format that suits the mobile handset. Tilz versions of Websites, stored locally on the digital device of choice for the user (PC, TV, mobile handset, et. al.) helps to reduce Internet traffic, since some of the information the a user may be seeking from their most commonly visited Websites, may be right on their mobile handset already.

A software widget may be set by the user to track the user's most frequently used Website Tilz, and automatically keep the most commonly accessed information from each Website on those local Tilz on, say, the user's mobile handset (as per the disk space allocation preferences the user sets in the user's profile). That is to say, the entire contents of a Website are not necessarily kept locally, just an auto-syncing, customized local copy (a ParaSite).

Figure 47:
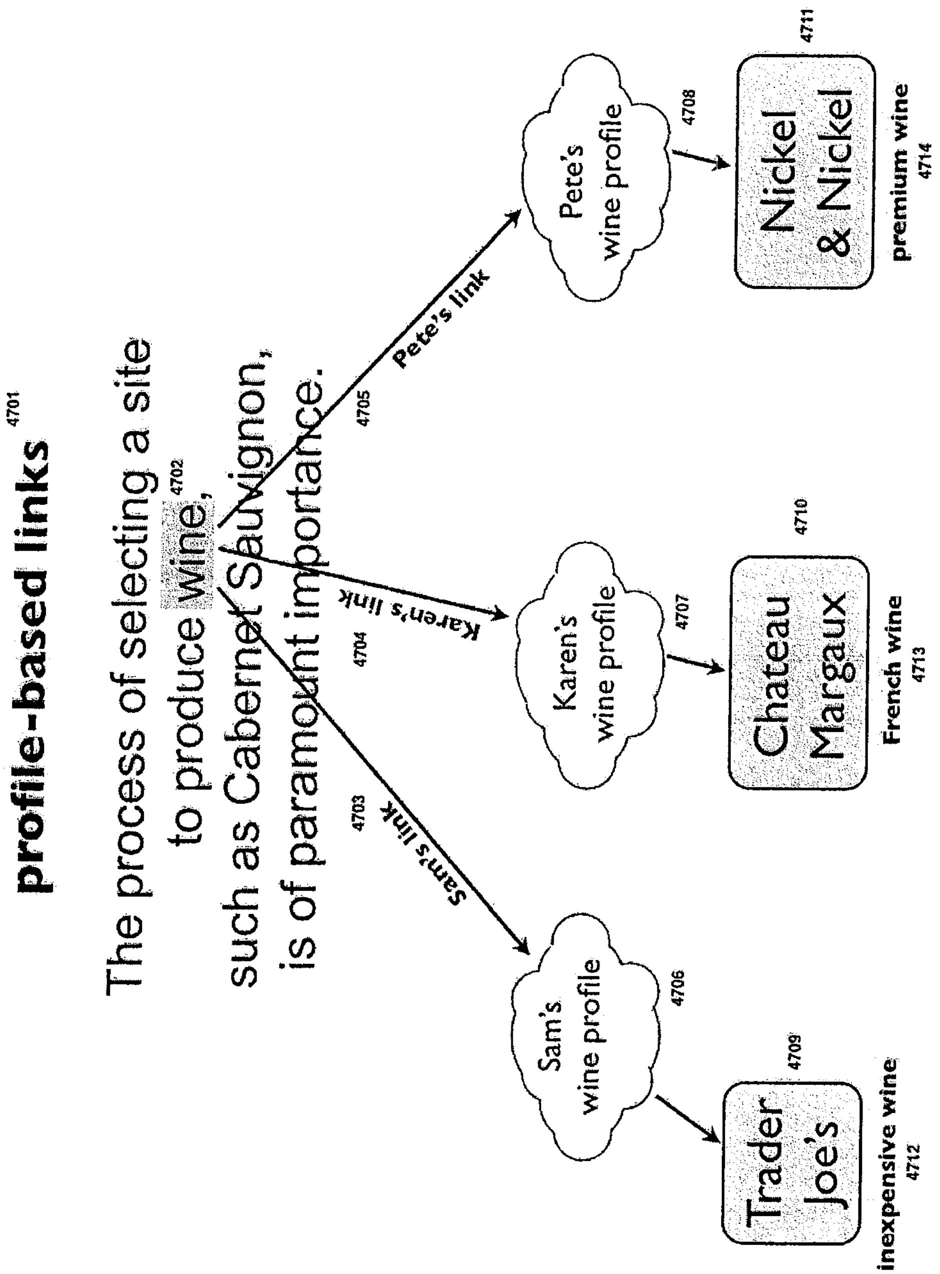
FIG. 47 is a functional block diagram of an embodiment of an example of profile-based links Tilz, which functionally replaces Websites, also contain links to additional information; however, unlike links on Webpages, which take different users who click on the same link to the same destination, Tilz links are profile-based, and thus may take different users to different destinations based upon each user's profile.

FIG. 47 is a functional block diagram of an embodiment of an example of profile-based links 4701 Unlike links on Webpages, which take different users who click on the same link to the same destination, Tilz links are profile-based, and thus take different users 4703, 4704, 4705 to different destinations 4709, 4710, 4711 based upon each user's profile 4706, 4707, 4708.

There are billions of people on earth and not all of them like chocolate ice cream. Some prefer vanilla, or strawberry, or don't like ice cream at all. The point is we're all different. And yet conventional art hypertext links treat everyone on earth the same. If a thousand people click on a link, all thousand may be taken to the exact same destination. But that one destination may not be the best destination for all thousand people. It's time for profile-based links 4701.

There are profiles of people and things all over the Web, those profiles can enhance interactions and transactions, both online and offline. Whether such profiles are created by Tilz (in embodiments as per FIG. 40) or by any other means, it would be desirable to have those profiles inform one of the most common navigation modalities on the Web—links Tilz feature profile-based links 4701. User profiles exist (as the per preceding paragraph), now they just need to be matched to tagged content. Such content can be online or offline Online content tagging is familiar to those skilled in the art. Offline content tagging may be accomplished by a plurality of methods including scanning a barcode/RFID for an object, which query returns the IP address where more information about that object may be found (such as a Website, ParaSite, Tilz, or other thing). The Tilz Platform profile server 4024 matches users profiles to tagged content. In embodiments, tagged content may be based upon profiles of other users with whom one shares affinity characteristics. In embodiments users may set their link destination profile to be influenced by the links most popular with any number of groups: such as their friends, baseball lovers, food aficionados, Republicans, etc. Additionally users may set their link profile to "subscribe to" or "follow" the prospective link destinations of others. For instance, a user might not be a wine expert, but know someone who is. The user could "subscribe to" (for free or for a fee) or "follow" that wine expert's link metadata, to be taken to the same destinations as that expert for wine-related links In embodiments profile-based links are facilitated by a unique technology—reverse Web cookies. Conventional Web cookies are, in embodiments, a packet of data sent by an Internet server to a browser, which is returned (if not otherwise deleted) by the browser each time it subsequently accesses the same Internet server, and is used to identify the user or track their access to the Internet server. In embodiments, with reverse Web cookies ("My Cookiez"), instead of an Internet server pushing a packet to the user's browser, the user's browser pushes the user's packet to the Internet server. The user's packet contains (links to) the user's salient profile information. In embodiments, the user's packet contains the Internet protocol (IP) address (a pointer to) where the user's more complete profile information may be found. Vis a vis Tilz users, their profiles may be extant in a plurality of locations, including the profile server 4024. Thus informed, the Internet server for a Web page containing the link word "ice cream" may send chocolate ice cream lovers to one location, vanilla to another, and lactose intolerant people to suitable substitutes.

Vis a vis FIG. 47, the linked word "wine" 4702 is a profile-based link, that takes three different users Sam 4703, Karen 4704, and Pete 4705 to three different destinations. Sam's wine profile 4706 indicates a preference (which could be circumstance or time-based, such as when Sam is unemployed) for inexpensive wine 3612, thus Sam is directed to vendors of inexpensive wine or other sources with information relating to inexpensive wine, such as Trader Joe's 4709. Similarly, Karen's wine profile 4707 indicates a preference for French wines 4713 (based perhaps upon wines Karen recently ordered/consumed in restaurants, as per her Restaurant profile) and thus Karen is directed to a site such as Chateau Margaux 4710. Finally Pete's wine profile 4708 indicates a preference for premium wine 4714 (according to recent additions to his wine cellar, as per his Wine Cellar profile) and a current fondness for Napa wines, and is thus directed to a site such as Nickel & Nickel 4711.

In embodiments, direction to destination sites, in response to profiles (and profile-based links) may be auctioned by the Tilz Platform for premium data placement 4712 (an unique variation on paid search, wherein the user gets paid, as opposed to the search middleman). For example, there are many premium wineries in Napa, so those who wish to have users directed to their site, may bid for priority.

Figure 48:
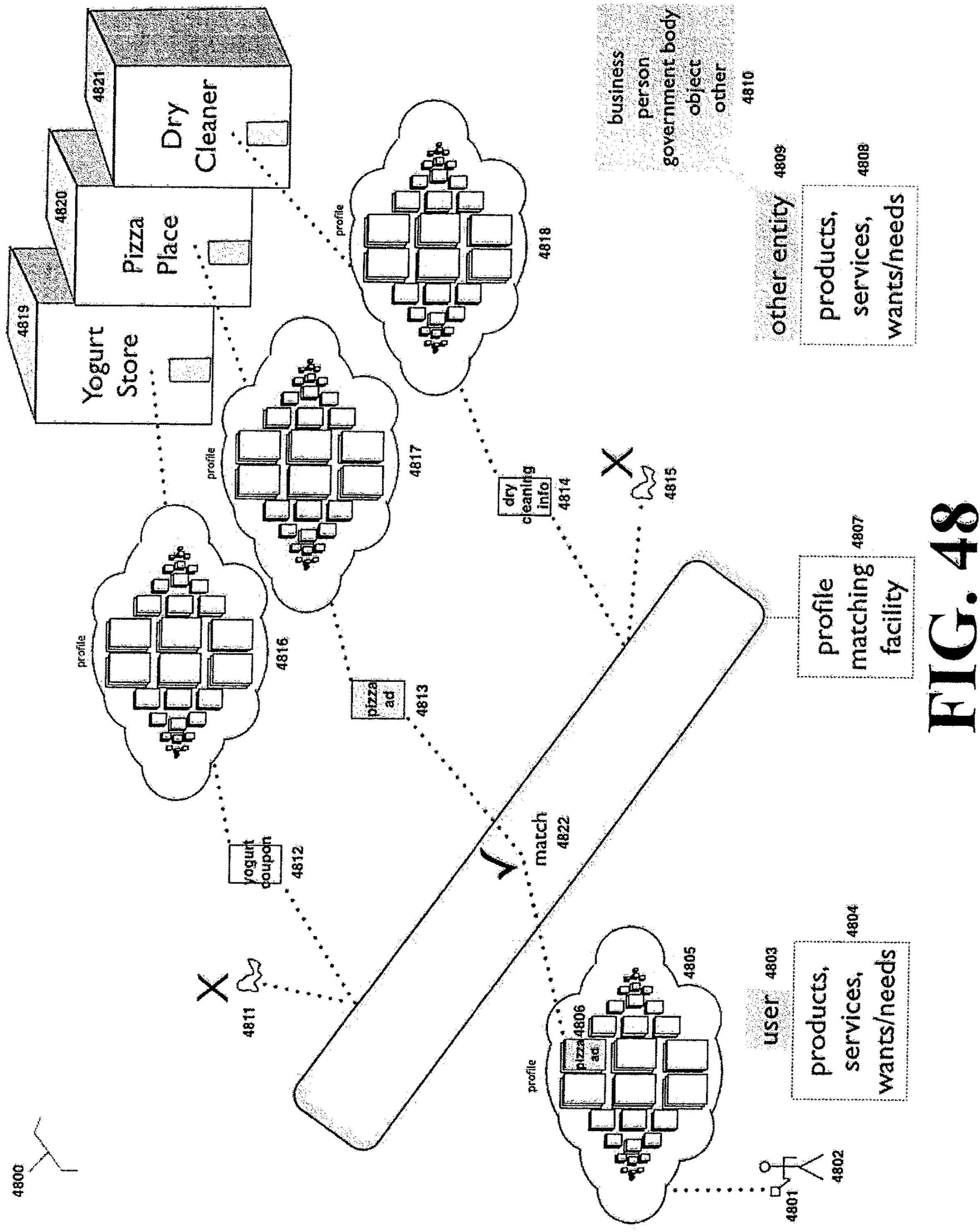
FIG. 48 is a functional block diagram illustrating an embodiment of an example of Tilz as the constituent elements of profiles, which are matched, by matching the data/metadata appurtenant to Tilz; thereby facilitating desirable features such as Tilz-based profiles preventing information overload. Only desired content (Tilz) gets through to the user.

FIG. 48 is a functional block diagram illustrating an embodiment of an example of Tilz as the constituent elements of profiles 4805, 4816, 4817, 4818, which are matched, by matching the data/metadata appurtenant to Tilz; thereby facilitating desirable features such as Tilz-based profiles 4805 preventing information overload. Only desired content 4806 (Tilz) gets through to the user 4802.

Yogurt Store 4819, Pizza Place 4820 and Dry Cleaner 4821 are broadcasting the their businesses' profiles 4816, 4817, 4818, via a plurality of means including WiFi, cellular carrier network, Bluetooth, and other communication modalities. These profiles (Tilz) might include (but not be limited to) items such as ads 4813, offers, coupons 4812, and other information 4814 related to that business. In addition, such businesses could, for example, broadcast their actual realtime inventory levels 4808 of each item they carry.

Rather than bombard each user 4803 or entity 4809 within reach of that business' broadcast, the businesses employ the Invention's profile matching facility 4807, wherein the businesses profiles are matched against the profiles 4805 of the user 4802 or entities receiving the profile broadcast.

As per the present exemplifying architecture, the user 4802 happens to be broadcasting the user's profiles via Bluetooth via the user's mobile handset 4801. According to the user's profile 4805 the user is unwilling to receive yogurt coupons 4812 or dry cleaning information 4814; whereupon like items are rejected by the Invention's profile matching facility—the yogurt coupon is rejected 4811, and thereby does not attempt to gain the user's attention or clutter up the user's profile; and similarly the dry cleaning information is rejected 4815.

On the other hand, the user's profile 4805 is amenable to pizza ads 4813, and thus a match 4822 is accorded by the Invention's profile matching facility 4807. Thus that pizza ad 4806 is transmitted to the user's profile 4805. Depending upon the user's preference profile, the user may view the ad right away, or, for example, that pizza ad 4806 may be inserted into a commercial break when the user 4802 is watching television later that night.

Furthermore, the pizza ad may be presented in a plurality of digital formats, including Tilz, which is a transactable object, and thus, for example, upon viewing the ad, the user 4802 may choose to order a pizza, and pay for same via the user's digital device 4801.

Other embodiments are envisioned, wherein entities other than businesses such as other people, government entities, objects, machines, and other entities 4810, may utilize a version of system 4800 (or other embodiments of the Invention) in order to interact and transact with various entities.

In many cases, however, some/all entities involved broadcast the profiles of their wants and needs 4804, 4808, including, for instance, the various products/services the entities utilize/offer, and the Invention thereby facilitates interaction and transactions by matching said profiles.

Figure 49:
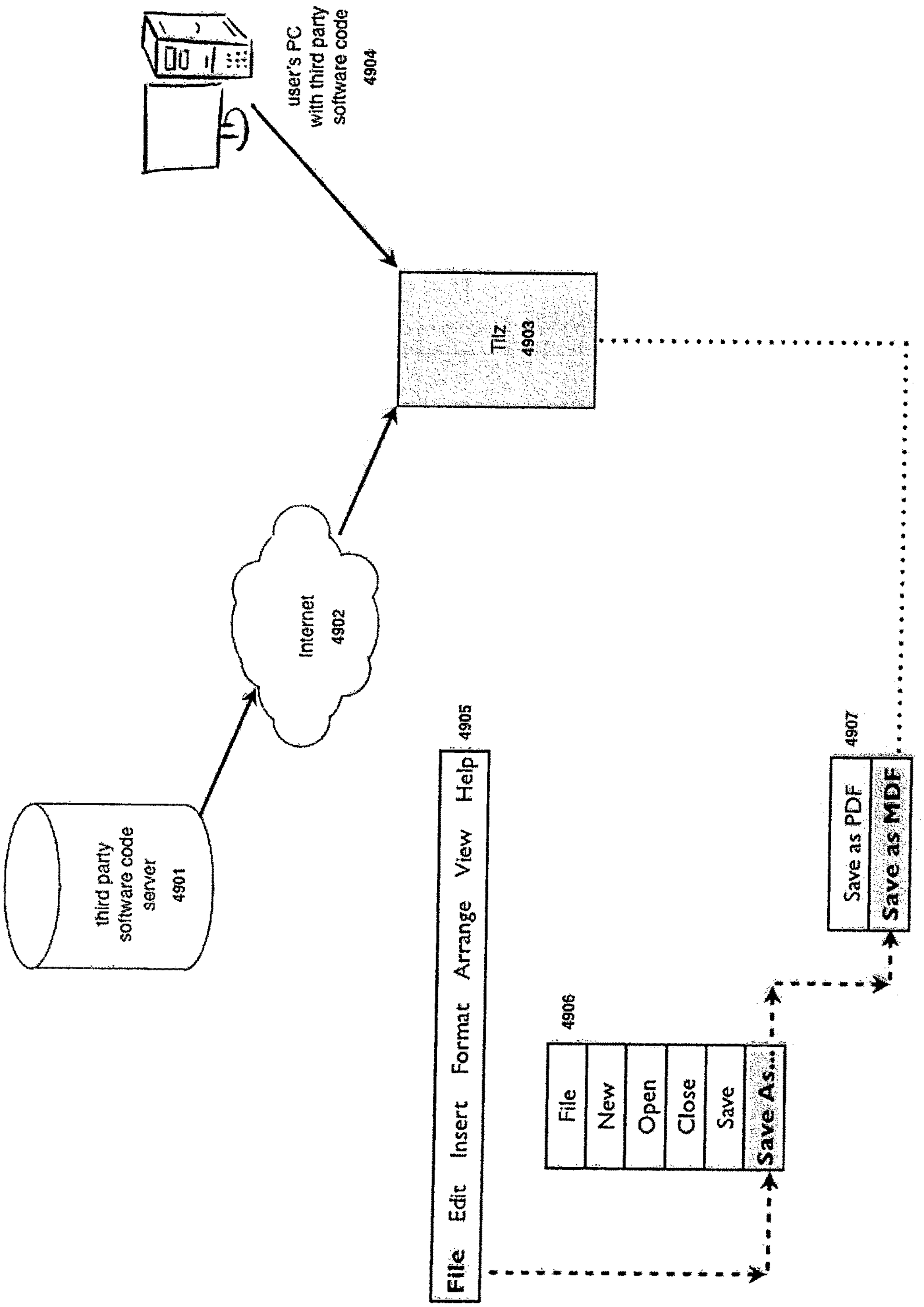
FIG. 49 is a depiction of an embodiment of an exemplifying architecture illustrating a plurality of methods by which users can create Tilz.

FIG. 49 is a depiction of an embodiment of an exemplifying architecture illustrating a plurality of methods by which users can create Tilz 4903.

Tilz are a flexible object space, configured to be compatible with third party software. Users must have the right to use such third party software. Users must either have the third party software licensed and installed on the device 4904 on which the Tilz is being created/edited (or other user-owned device which conveys therein use rights on other user-owned devices); or must have obtained licensed rights for remote access 4902 to the third party software code 4901, such as with application service providers wherein users access the software code via remote servers 4901.

In either case, the Tilz information translation facility 4010 automatically converts native format to binary and then to Tilz MDF format. Analogy: instead of converting files to HTML as when displaying a file created with third party software on a Webpage, third party file formats are converted instead to Tilz MDF format. In embodiments a user who has created a file in a third party software program 4905, wherein MDF has been configured for operation, then may choose to save 4906 another copy of the file as MDF 4907.

Tilz may be created in two way: Converted and Native. As in the above paragraph, regarding Converted code, users create, say, a document with Microsoft Word, then save the document not just in ".doc" (dot doc) format, but also the Tilz ".MDF" (dot MDF) format. For a Native Tilz, third parties port their software code to be machine executable on the micro operating system/browser code built into each Tilz. That is to say, third party software runs on the Tilz OS/browser platform. As third parties re-write their software applications as smaller, simpler applications for the new computing platform (mobile digital devices and similar), they can choose to write native code for the Tilz platform.

These and other objects and features of the present Invention may become more fully apparent from the following description and appended claims, or may be learned by the description and practice of the Invention as set forth hereinafter.

Digital Content Player

In embodiments, Tilz are configured to play various digital content. Additionally, Tilz enable third party digital content players to embed their functionality in Tilz. In embodiments Tilz have a built-in mini-player that supports a plurality of types of digital content. Users can thereby play, pause, rewind or fast forward some video or music contained in the Tilz. Additionally, in embodiments, Tilz feature a "slide show" function built-in that will play each picture or page of a document, one picture/page at a time, with user selected intervals and transitions. The slide show function displays a slideshow of the covers of the content in that folder. Slide Show example: the list of Tilz being viewed can be seen as a slide show, at a user-adjustable rate of frame advance.

Content Editor

In embodiments Tilz have a built-in text and image editor, to enable alterations of Tilz content without need, in some cases, for the software program in which the document was created.

Animation

In embodiments Tilz support digital animation protocols and enable third parties to supply their own animation technology, as per the Tilz Tech Specs.

Tilz Styles

Users may buy, sell, and trade templates for various types of documents (and other things). Though some templates are provided via the Tilz Website, there are no limitations as to the styles users may choose for their Tilz. For example, some Tilz may appear like shiny, hard plastic. Other Tilz may appear like soft, gummy candy material. Third parties such as graphic artists, and users at large, are free to upload Tilz covers or templates and make them available with an exclusive or non-exclusive license, such that other users may use as a template for customized covers for their digital documents. Full color, high gloss, and even 3-D graphic or photo renderings of actual objects, are among the plurality of types of Tilz cover art supported.

The Tilz Website provides Tilz templates with a plurality of user-created and uploaded attributes and looks (e.g. flashing neon lights for text fonts, different colored backgrounds, fonts, transitions from slide thumbnail to the next slide thumbnail, etc.) that other users may utilize.

Tilz Tricks

Tilz Trickz (how Tilz are displayed and move around a screen) may be uploaded and traded by various users. For example one embodiment of a Tilz trick shares setups similar to elaborate domino toppling tricks. These tricks are simply more interesting ways of users navigating the digital equivalent of a user walking up to a physical filing cabinet to search for a file.

Cover Tilz

Users may select a Cover Tilz for a document (or other thing), or, by default, the Tilz may be a thumbnail image (a visual preview) of the first page or picture or frame of that file. Users may have a consistent Cover Tilz for all their Tilz, such as Bob's Documents might each feature a small picture of Bob; or even customize each Cover Tilz individually. In embodiments Cover Tilz may contain a short single sentence summary of the content of that file, and may optionally display the tag keywords. Tilz may also be displayed via cover art for documents and digital content. Such cover art for various types of content may be traded.

Transfer Tilz

Any user may establish their own transfer Tilz. Just drag and drop any file, movie, video, or digital object at all onto the user's transfer Tilz and it can be made available for viewing by or transfer to other users (subject to user-set size limitations and digital content rights).

Touchscreen Compatible

In embodiments Tilz are touchscreen compatible and can be manipulated, for instance, with a flick of a finger on touchscreen enabled digital devices. For example users may move lists up and down, or send Tilz left and right with a flick of their finger on a touchscreen capable display or touch pad.

Tilz Display the Document Contents

For example the Tilz representing a folder filled with various documents might, in embodiments, be a shiny, translucent Tilz which features an automatically rotating set of thumbnail images of documents in that folder (and similarly so for thumbnails from a Website or video or any other digital content).

Attribute Denotation

Different sizes, shapes, colors of Tilz denote many different user-selectable and user-changeable attributes: indicating, for example, that the item is text, or pictures, or music, or video, or mixed content, etc. What any one size, shape and/or color means may be set by each user. And other attributes, for instance flashing colors or a pulsing Tilz background, may mean that Tilz requires the user's attention.

Communication

Tilz are configured for inter-Tilz communication, enabling Tilz (and thus the users of Tilz) to communicate with each other. In embodiments Tilz have a proprietary text message style communication—a Tilz message, which enables communication irrespective of the underlying operating system—to network Tilz with other Tilz. Users may also click on the Tilz phone icon to make a phone call to another person from within a Tilz. Furthermore, users may send a ringtone—or any other introductory digital content (audio/video/text/image/etc.) they wish, assuming the user has acquired the necessary digital rights thereto.

Tilz Chat

In embodiments, users may select the phone (or other) icon on a Tilz to communicate with another Tilz user and may, according to the user's preference profile, use the audio or video communication modality of their choice: such as Phone Widge, third party means, or other means. Tilz Chat also enables users to interface with various instant messaging (IM) clients, or the Tilz Chat widget in a Tilz to enable chat, IM, voice chat, or video chat (including the ability to run a slide presentation that both parties can view). Users may click on the Tilz chat icon to chat with another user who is viewing a Live Tilz (a Tilz with access via the Internet or other means to other Tilz) or has their choice of chat program active.

Network Node Software

A downloadable patch is available on the Tilz Website (ParaSite) that switch, router, load balancer and hub (and other device) manufacturers may download to their network node devices to prevent unauthorized transmission of Tilz on/via/through their network devices, for instance, of restricted or copyrighted Tilz content. The Tilz restrictions are linked to the IP address/ID number for that Tilz, which the patch may double check for before sending the packet on its way.

Tilz Tags

Tilz creators may add tags to any Tilz, making them easier to search and database capable. Tilz creators may also choose (or not) to let readers/subscribers/other entities place keyword tags on a given Tilz. In embodiments the Tilz creator then has the option of approving and/or editing such (reader/subscriber/other) third party-placed tags.

Tag-Based Search

Tilz tags address the thorny search problem for pictures and videos, since all Tilz support tags that create searchable keywords. Many technology approaches are being tried including highly specialized chips that attempt to mimic the incredible processing power of the human visual cortex. Tilz takes a simpler approach and enables users to simply post a few tag keywords to pictures (or groups of pictures) and images (such as videos, TV shows, movies, etc.), as a means of making the content searchable.

Options

Various embodiments of Tilz have user-selectable options including:

Opacity/transparency—users can make a given Tilz any level of transparency, for instance, to expose or hide the Tilz below it;

Color—users can choose any colors they like and may assign meaning to each color, such as Red for Do Now, Green for Completed Tasks, Blue for Work Documents, etc. The Tilz Website enables third parties to upload colors and/or patterns for others to use for free or for a fee;

Shape—Tilz can be any shape the user chooses, and the Tilz Website enables third parties to upload shape templates for others to use for free or for a fee Live Element Sync Any content on any Tilz may be auto-updated, by simply changing the master Tilz element (which may also be a subscribable element). For example let's say a user has placed a logo in several documents and also on the Web in several places. Then the user changes the some aspect of the logo. If the user has opted-in to the Live Element Sync option then wherever the logo appears in Tilz, it may be updated next time each of the Tilz has Internet connectivity (or other means of accessing a newer version of that Tilz). So too if a company changes their logo, all Tilz (documents, Websites, videos, anything) that have that logo subTilz in/on them, may be automatically updated, and so too may the plurality of dependent/slaved Tilz, as per each Tilz' preference profile Preference Adjustable Tilz change and respond according to each user's preference profiles, and other profiles, which may belong to the user or another entity. Once a user sets up their preference profile, all Tilz, for instance, that user sees may present the information in the format preferred by that user.

Custom Content

When users watch a program or movie on Tilz, additional content may be displayed according to a user's preference profile: such as on-screen story background information (for example, "This was the third day of shooting, and it rained all night before, so the area was soaked . . . ") Custom content may also include such items as behind-the-scenes insider information ("That day the hairdresser didn't show up, so the lead actress wore the wig now seen in the movie.").

Personal Metadata

Personal metadata is the personal information and the user's rights regarding the digital content. For example the personal metadata for a user renting the movie Black Rain: Metadata: Movie: Black Rain. Starring: Michael Douglas. Length: 125 minutes Personal metadata: User's Item Rights:

User rental expires Sep. 27, 2001

User paid Fee: $2 to rent it from Vendor: Blockbuster

User has viewed Item: Black Rain—One time before this Rental.

User also viewed Related Items: Black Rain 2 and Black Rain 3, and saw 11 other Michael Douglas movies.

Tilz Ratings

Tilz and all Tilz related elements are user-ratable. Users may rate any aspect of the Tilz such as information accuracy, design, etc. Users may also rate third party uploads—items such as third party Tilz templates. Third party uploads without a very high rating may not be a wise choice for user concerned about viruses or other types of malware.

Parental Controls

Tilz supports (among other ratings systems, such as those for videogames) the Motion Picture Association of America ratings system. The content on Tilz may also be rated by the Tilz creator or other Tilz users via the corner menus—depending upon the preference settings for that Tilz. Tilz also provides an automated rating checking system that scans for keywords to determine or verify the rating of any Tilz. Rating categories include, but are not limited to: G, PG, PG-13, R, NC-17, X, XX, XXX, MA (L, S, V, N, AC). Video or picture Tilz can also be self-rated or labeled as Unrated.

Orientation

Nine square orientation allows mobile handset users, for instance, to view just a portion of a Webpage but still know where on the full size Webpage, the Tilz they are viewing is situated.

A darkened (or otherwise highlighted) square may indicate where the Tilz appears on the full size view of the Webpage (as if the Webpage were divided into nine squares, on a 3×3 grid).

Information Assimilation

Tilz continuously attract and assimilate related content. Content can be curated for free, or for a fee, by the expertise of others/third parties. And via paid assimilation (an analog to "paid search") users may be paid to receive related content.

Navigation

Tilz may be viewed as cover pages arranged in a horizontal row, that the user can move through by sliding a scroll bar, or via touching a touchscreen and flicking the covers left or right. Additionally, users may choose other types of navigation or even use third party navigation schemes that conform to Tilz APIs (application programming interfaces).

Alternate Navigation Forms Include:

Spherez

Spherez (pronounced "spheres") are a navigation and display tool, wherein Tilz are mapped onto a multi-faceted shape, such as soccer ball-like sphere. In embodiments, Spherez are a grouping of two dimensional Tilz that appear to have been rendered onto a three dimensional sphere. A purpose of Spherez is to enable a user to use flicking motions with their fingers on a touchscreen to find the Tilz they are looking for (somewhat akin to a user flipping an old style rolodex to find a particular 3×5 address card). Spherez is one of a plurality of unique navigation modalities. And the entire Spherez may be taken over as a notification, if the use's profile allows, or even display (as) a whole Spherez advertisement.

For spherical Spherez, the cover Tilz may be arranged on a two dimensional projection of a sphere that the user can spin around, or spin individual rows (as one moves a specific row of a Rubik's cube). When using the navigation sphere, the Tilz on the rows above and below the center or "key" Tilz may be those Tilz which have the greatest number of matching tag keywords. Or users may choose among other Grouping Criteria: such a Most Recently Used or viewed Tilz. The Tilz most frequently selected by that user may then be closest to the center/key tilz.

Spherical Spherez may either be convex or concave. If concave, it's as if the user is inside a huge sphere, and all the Tilz are situated similar to control room flat screens. For example, if one were inside a giant multi-faceted soccer ball, and each facet were a display screen—displaying a Tilz. With a concave spherez, the outer edges of the sphere curve toward the users. For example, if one were looking down on a multi-faceted soccer ball, and each facet were covered with a Tilz.

Sliding Block Puzzle

When viewing multiple Tilz the user can have them appear and move in ordered rows and columns similar to sliding block puzzles. In embodiments users may choose to have block grouping (in either a square or rectangle shape) of as little as 2×3 Tilz, and as many as 999×999 (or more) Tilz. Users may adjust the size of the individual slider Tilz. Other sliding block arrangements as possible, such as 3×3 sliding block puzzle navigation or 4×4 sliding block puzzle navigation.

Swirl or Starburst

Users may choose to have a grouping of Tilz appear and/or move in a swirl or starburst formation.

Highlight Bubble

When viewing items in list mode on a Tilz the highlighted item may be shown in a transparent digital bubble. A thin, wide, transparent bubble Tilz may magnify the word a user is currently on. As the user scrolls up and down, the bubble Tilz moves up and down the list, highlighting and slightly magnifying the selected item list name—similar to how water may appear to slightly magnify things.

Third Party Navigation Modalities

Third parties may upload to the Tilz Website navigation modalities, as per the Tilz APIs (application programming interfaces). For instance Tilz may float across the screen in a seemingly random display. Alternatively Tilz might may move as if they were dandelions blowing in the breeze or like leaves falling from trees. When a user sees a Tilz they want to select pass by, they may simply click or tap on it to both select that Tilz as well as end the navigation animation.

Geo-Tagged

As a user views a map mashup, they may see flags (or other indicators) showing where the user has Tilz content tagged to that location. For example, if a user saves the Tilz of various houses the user is interested in buying, those houses may appear on online maps. Also as a user moves about in the real world their mobile device may alert them to (or popup) Tilz content/messages associated with that location).

Bio-Tagged

Tilz are configured for compatibility with facial recognition technology, so that as the user's camera (or other device, person or thing) recognizes the person, object, sign, location or other thing, it may alert the user to related Tilz (which may contain content/information/messages/et. al.). Tilz may also identify another person not just for tagging photos and content related to that person, but for transaction authentication. Tilz may also be configured for compatibility with wearable and implantable RFID for various interaction and transaction and other purposes.

Shared Tilz

At the user's option, each Tilz may be set to be shared with other users, either entirely public (anyone can view it) or only for those friends/associates/other entities designated by the user. Tilz may also be shared but require login/password. Tilz set to be shared may be viewed anytime both users are connected to the Internet (or via other means), and those Tilz may temporarily or permanently be downloaded to the other user's mobile handset via a caching facility (such as Packet Cache).

Security

In embodiments Tilz feature a wealth of security options including time stamp, device stamp, and location stamp, for applications such as signatures, postings to restricted sites, transactions, et. al. These security stamps may be embedded in the Tilz metadata, for identification and authentication purposes and which further ensure against identity theft. If a thief gets hold of a user's credit card Tilz or passport Tilz they may try to utilize it in a city where the user is not located (or otherwise has not authorized use there). Thus an alarm may be activated, which may send automatic notifications to the use as well as Tilz provider such as the bank or U.S. government). In addition, Tilz are each assigned an unique ID number which is also its IP address (the IPv21 #); and each copy thereof is automatically assigned a differing IP address. Copy prevention and other measures also may restrict sharing and viewing of the content in the Tilz. Built-in security technology may prevent copies being made in the first place—a Tilz may be set to be Read Only. And Tilz may be prevented from being transmitted via switch/router/hub/load balancer software patches.

Also it's harder for a hacker to disrupt a user's entire computer since each Tilz is separate unto itself (due to a micro OS built into various Tilz embodiments). Some malware may only crash the Tilz it invaded, as opposed to the entire digital device.

Developer Tools

Application development, and template development tools may be available, as well as tools for developing or porting games, and for media-sharing.

Tilz Function Offline

Content may be added, deleted, or edited, even while a Tilz is not connected to the Internet. Users may, for instance, scan barcodes/RFIDs and have their Tilz update on their mobile device, then have those changes synced to all dependent Tilz when next connected to the Internet or via other means (such as Bluetooth).

Tilz-Based Applications Work Offline

For example, in embodiments social networking Websites may display each user's profiles in separate Tilz. Myspace users may then edit their own Tilz, the Tilz of their chosen friends, as well as their most frequently used Myspace Tilz while offline, since all Tilz automatically cache such data/Tilz/profiles. The data/Tilz/profiles changed while offline may automatically sync when back online (when WiFi or other Internet or peer-to-peer connectivity is available again). This is important for users who use mobile handsets that do not have cell phone network coverage. Users may also scan barcodes/RFIDs to add content and update their profiles on any Tilz-enabled Website or widget all while offline.

To further clarify the above and other advantages and features of the present Invention, more particular descriptions of the Invention will be rendered by reference to specific embodiments thereof which are, in some cases, illustrated in the appended drawings. It is appreciated that these drawings and descriptions depict only typical embodiments of the Invention and are therefore not to be considered limiting of its scope. The Invention will be described and explained with additional specificity and detail via the following applications and use cases.

Interactions and Transactions

Once a user has created Tilz for their objects, family, friends, and anything else they wish, they can, via a plurality of means, broadcast selected profiles, which consist of Tilz, in such a manner that users may interact and transact with selected parties by profile matching the Tilz metadata information. For example, users may socially network around their shared interest Tilz, such as hobbies; and users may be paid to receive ads/offers/information/et. al. related to their product Tilz; among an essentially limitless plurality of other uses.

Users Create, Manage, & Monetize Profiles

Instead of third parties creating profiles of users, with Tilz users may create, and manage, and monetize their own profiles. Take, for example, a user's Movies Not Yet Seen profile, as captured in Tilz. Each time a user sees, for instance, a movie ad on TV or in the newspaper they may scan the ad via electronic IP-based barcodes (such as Net Dotz); which return a Tilz to the user's mobile handset. The Tilz is the profile of that movie. If the user wanted to add that movie to their queue of movies at a DVD delivery service such as Netflix, they might not be able to if the movie is not yet in Netflix's database. If not, then the user might have to take the time and effort to set a calendar reminder to add that movie to their Netflix queue six months from now—not a user friendly solution.

But with Tilz, the user simply amasses the Tilz of all movies the user wants to see, but hasn't yet, and broadcasts (CloudCasts) that profile. Thereupon entities such as Netflix may, when Netflix databases enable it to do so, add that movie to the user's Netflix movie queue. However, the CloudCast may be made available to all entities that can supply that movie to this user. And thereby does the user get paid to receive ads/offers/coupons/information/et. al. from entities that can supply a particular movie to that user (as per the user's various preference profiles (such as Web Pref).

Nearby theaters, pay-per-view providers, nearby bricks and mortar DVD sellers, the premium channel which acquired the rights to that movie, online DVD sellers, et. al. may each pay the user to view the user's movie profile (which may include the user's Movies Already Seen list and Movies Not Yet Seen list), and thereupon determine if it's worth it to pay the user again to send ads/offers/coupons/information/et. al. related to this movie to this user. Users have the option of setting the price to receive such ads/offers/coupons/information/et. al.

Tilz also enable new income streams for other parties: If users attend a movie at the Acme Movie Theater, for example, users may have the option to get the DVD Tilz (electronic copy of the movie) for an additional price (beyond the movie theater ticket price). The Tilz may be downloaded to the user's mobile device via means such as Bluetooth or WiFi (and/or other modalities) while the user watches the movie in the theater. And after a user watches a movie, it is automatically added to the user's Movies Already Seen list—a list which others might by paying the user to view. Movies Already Seen list subscribers might include movie marketing companies or market research firms or other entities.

Paid Search

Users may perform a novel type of search regarding any item wherein information is attracted to the user automatically. For example, if a user needs a new refrigerator, the user may add the Tilz of their old refrigerator to their ComCloud (a profile broadcast consisting of Tilz) and thereby start to automatically receive information/ads/offers/et. al. from those entities that can supply a new refrigerator that meets the user's profile (such as kitchen cabinet space requirements)—without the user having to become a mini-expert on refrigerators, without the user having to measure their refrigerator, and without the user having to take their time to perform the search. And the user may be paid to receive such information/ads/offers/et. al. by the information/ad/offer/et. al.-sending entities.

In embodiments, companies may pay the user to populate the closest-to-the-center ring (or other "key") Tilz spaces on the Spherez, whenever a user is utilizing a Spherez for searching, organizing, or anytime.

Periodical Tilz

Magazines and newspapers may need to consider changes to reflect the information overload their readers suffer from. Many readers don't have the time to read the full text of every article or document, whether offline or on. So how can a magazine or newspaper change in appearance and function utilizing Tilz? Each element of (for instance) an article, whether offline or online, has its own Tilz. A shift to the much smaller screen of mobile devices informs the need for magazines and newspapers (and documents and other things) to update their layouts. The layout has been the same for hundreds of years, and is increasingly out of sync with users with far too little time to consume lengthy versions of every article.

Extend Periodicals Reach

Tilz extend the reach of magazines/newspapers into the real world. After formatting their online and/or offline editions into Tilz, their articles can extend into the real world experiences of their readers. For example, if there was an article about bond measures for the user's city, then when the user is driving around town, the Tilz alerts the user (or intermediary facility) when, for instance, the user is driving on a road that may soon be torn up to facilitate the new sewer system that is the subject of an upcoming bond vote.

Other examples. When a subscriber to a periodical in Tilz format, drives/walks past a place that was the subject of a story, that story Tilz, and related Tilz, may pop up on the user's mobile handset. And periodicals may get paid if the user transacts upon those field Tilz, even if the user is not a subscriber. Field Tilz are Tilz that pop-up on a user's mobile device (or any other digital device of choice) in the real world—out in the "field." Driving past a cupcake shop, featured in the food section of the paper—a Tilz may pop up (if the user wishes). And thusly alerted the user may stop in to purchase a cupcake (for which the newspaper might receive a commission). And the magazine or newspaper may get paid, even if the Tilz about the cupcake shop is shared with users who are not subscribers (but received the Tilz article about the cupcake shop), if they purchase a cupcake. Driving past a company's headquarters building a recent story (in the user's subscribed periodical) about their CEO may pop up, depending upon a user's profile settings. When the user is driving past the marshlands that need saving, the newspaper may get paid a commission if the user donates to the Save the Marshlands fund. If the user is into fashion, fashion-related Tilz, stories from that magazine's or newspaper's fashion section may pop-up (in fashion-related situations) on their mobile device as users move about in the real world. If the user is into politics, political issues pop up.

If there's an article in the Travel section about bed & breakfast inns in the area, the Tilz may alert the user when the user happens to be driving near one. The metadata in the Tilz, such as the address of the inns may be matched against the user's location profile (which is itself a Tilz), and if the calculated DIFF distance is less than a user selected amount, such as 2 miles, then an alert may be triggered via the user's mobile handset.

In embodiments, the newspaper may be paid a commission by the inn, for use-traffic driven thereto. Such commissions (and the plurality of other such cases) may improve the economics for periodicals. And their traditional revenue sources, such as advertising, may also be revolutionized. For example, subscribers to the local paper, may receive the ads as electronic Tilz in addition to receiving the printed paper at home. The Tilz for all the ads needn't clamor for the user's attention, but exist quietly in the user's ad profile, until the user happens to be driving past, say, a store that is having a sale (and an ad appeared for same in the newspaper). If that store's sale items match the profile for items the user is seeking or interested in, an alert may be issued to the user (or other intermediary facility).

Sample Article Stack

An article Tilz stack may include the Headline Tilz, one or more document/article/content Summary Tilz, and the Author's Tilz.

Signature Tilz may also serve as a user's official digital signature. Additionally, the reader could click on the Author Tilz to discover more content about that author, including a photo, avatar, or image of the author, author backgrounder, list of other articles by that Author, or other things. Also, the reader may click on the appropriate Tilz icon to be taken to that Author's blog/Website/et. al.

If the user wants to read more of the article they may tap/click the Headline Tilz, and up pops the Summary Tile(s). The Summary Tilz may have a single paragraph summary, or another single sentence with the main point of the article. The Summary Tilz may contain the document's main tags/keywords. For example, the tags might be: WiFi and cellphone. The tags may appear in a dark blue color (ala Web links) to indicate they are tag links.

And one user's Summary Tilz may be different from another user's Summary Tilz. Content creators may provide different types of summaries to meet the needs of different types of profiles. Some people like lists of information, others may prefer a summary by a critic or blogger they trust. Still others may prefer an animated Tilz. Some may want their article summaries presented on their TV, others may prefer their mobile device. These headline, summary and body Tilz may be how all documents appear, not just magazines and newspapers.

Such a format may be utilized for documents inside a corporation. What manager has time to read 20+ page documents from each of her reports? Instead, managers may read all the summaries and only if necessary the full body of the document. Everyone is time-limited—and documents may change format to reflect this fact. And different users may adopt different styles, shapes, colors, animations, sounds, etc. for their Summary Tilz to express their individuality, instead of all documents being nearly identical.

If the Summary Tilz does not provide enough information, the user may click on it to view the Full Content Tilz. Content may be displayed with or without images/videos.

Also the user may click or tap the Tilz Sizer to provide a larger/smaller viewing window.

Tapping the Author Tilz may take the reader to other articles by that author.

Set to Hidden (in embodiments) by default, are the action icons in the corners of the Tilz. On Tilz that features tags, there may be a Tags icon (in some embodiments appearing like dog tags), so that a reader wanting more information on any of the tags may either click on the dark blue tag word itself, or click on the dog tags icon in the upper left hand corner and up pops an individual Tilz with more information (more Tilz) on each of those tag words.

When the tag Tilz pop up, there may be a visual indication of the other Tilz the user has access to that relate to that tag word, with the user seeing a stack of Tilz receding into the distance (in some embodiments), with the Tilz slightly offset like a partially fanned deck of cards. Those Tilz may then Slide Show to the front for a few seconds at a time, then show the next Tilz, or wait for the user to click on them for more information.

Or the user may click on the Internet Access icon in the upper right hand corner of some embodiments of Tilz to pull content with those tag words from a search on the Web.

Tilz may include both Text and Images/Video. Users may add comments for other readers of an article tile to view via popup Tilz.

And users may live connect via Tilz to others reading that same article at that same time: instant message (IM), (video) chat, etc.; even leave glops (digital content, such as text or audio or video, that readers may add to other objects) for other readers to view. And information in articles may be live information. Whenever a user pulls up an article, the user, via Tilz, may choose the live version of all information in the article (a sports article that referenced a team's then win/loss record, may have that fact updated to the win/loss record of the team at the time/date the user is viewing the article).

Printed versions of articles may have much the same functionality as the digital versions with Tilz. Printed pages may look the same as digital pages, with each Tilz (corresponding to each discrete element of an article) having an IP-based digital barcode (Net Dotz) that readers can scan to receive the Tilz they seek. On a digital page compatible with user preference profiles (Web Pref) the user may turn off glops, and choose for instance to never show article detail until the user clicks on a Summary Tilz, or opts, for example, to receive updates to the article next time the user is magazine browsing on their TV (via means such as Tube Widge).

Furthermore, the glops that readers leave may be location-based, so when a user opens the same article in New York City, they might see different glops than when they are in Los Angeles. Also the user may set the article to view the social network profile (Galaxz) Tilz for people mentioned in the article, or grab other articles that mention those same people. And glops may change according to a reader's profiles (including profiles which track a user's location). Users may also set glops, as per preference profile selections, to, for instance, view all the comments from, and interact with, others reading this same Tilz at this very moment, or limit comments to those with certain affinity profiles.

And with Tilz, as users start to consume more magazine and newspaper article content on devices such as TV's (via means such as Tube Widge), Tilz gives content creators and content consumers untold flexibility to maximize each screen size and capability. TV's powered by Mobi Homi DVR's are location-aware, and thus introduce location-based elements and functionality to Tilz articles viewed thereon.

Magazine Tilz

Magazines enter the digital age, via delivery as Tilz customized for each user, bringing periodicals new revenue streams.

Newspaper Tilz

Tilz enable newspapers to be easily read on any number of different digital devices, including mobile handsets. Newspaper sections, individual articles, and every individual item, are each assigned their own Tilz, and users click/tap on the appropriate Tilz to read/download that content.

Real Estate Listings Tilz

Real Estate Listings Tilz may include, for example, a downloadable Tilz for each individual house for sale. Such Tilz may contain items such as the history (such as past sale prices), past photos (from past listings), as well as any price changes that may occur. And such Tilz may notify interested parties when that property is available for sale or lease. Tilz may change how houses are sold. Users may express interest via the property Tilz of that house, whether it's for sale or not, thus when the owners get ready to sell, they may have already amassed a list of interested buyers, and therefore may not need a real estate agent to market and sell their home, saving them a great deal of money—paperwork and transaction may be able to be effected by a few hours of a real estate attorney's time. The user's property Tilz may also become an income center for the homeowner (commissions may be paid for the gate maker Tilz, or gardener Tilz, etc. when other users request such information or Tilz (from the home's profile broadcast (CloudCast)).

Reflection

As per the user's preference settings, Tilz may reflect the look and feel of the user's social networking home page/site/Tilz/et. al.—and even change when that page/site/Tilz/et. al. changes; the margins, for instance, of any document created by that user may contain status updates, and indicators of items, such as new photos, etc. Thus each time a user looks at that document, the cover Tilz may have changed—or just the background image have changed but the document content hasn't changed. Tilz (backgrounds, covers, margins, or other elements) may, for example, change as the seasons change, or look differently as the hours of the day progress, or as the Tilz creator's mood changes (for example, blue=sad, red=angry, yellow=happy, etc.—even though the document content doesn't change. A Tilz background image may also be just a small thumbnail of the first page of the document—or picture—screenshot of the video. A Tilz background image may be utilized to show a picture or live video feed of the person who is calling (or otherwise attempting to communicate with) the user—video caller ID—so that ghosted background image starts to talk to the user from, say, the document: "Hey George, you there? Pick up."

Application Tilz

Developers may build software applications or widgets utilizing Tilz. The Tilz may be the functional application/widget. Application/widget Tilz may be represented in a plurality of styles, including by animated, licensed characters, such as popular cartoon characters (as opposed to the conventional art application/widget icons which are generally mundane static images conveying the application's/widget's use). Entities such as Disney or Electronic Arts may charge users a monthly fee to license their characters to execute a plurality of functions including perform alerts, reminders, and provide help instructions, and act as animated representations of various applications/widgets.

Movie Tilz

Movies may be distributed and viewed via Tilz. For the movie cover Tilz, users may set preferences as to how much information about the movie is revealed. Movie Tilz covers may contain live trailers or just text, or just a photo for those who don't want any spoiler information. Some users may prefer a minimal amount of information about a movie when they view the cover Tilz—at least until after they have seen the movie. So that the plot is not ruined for them, some users may prefer only the movie title, cast list, and year of release. Others may prefer a full plot description even before they have seen the movie.

DVD Tilz

Conventional art DVDs are static content—the information is burned onto the disc and stays constant. DVDs delivered electronically via Tilz to a user's mobile handset or digital device of choice are fully interactive and live. For instance, the DVD Tilz present not only the movie and the extra features/content, but enable the movie producers to continue to add content over time (even after the DVD Tilz release). DVD Tilz may later add (perhaps, for an additional fee) a director's cut, or let any fans of the movie make and present their cuts, or only the winner voted best Fan Cut version of the film, or let film school students produce a cut or re-shoot, or re-edit some scenes, among other possibilities. DVD Tilz present a plurality of possibilities. Users may engage in live chat with others who happen to be watching the same movie at the same time. And unlike a physical DVD, which if it gets broken, is ruined, if a DVD Tilz is accidentally deleted (though there are many protections against this) or lost, the user may (in embodiments) download it again. Additionally, as airplanes start to allow WiFi (or other) connections, airplanes may pre-load movies that a user owns to the seat back entertainment unit in the hours prior to departure, so that each person has their library of movies and music with the user at all times (or allows USB, or other modalities, such as uploading/streaming from the user's mobile handset to the seat back entertainment unit).

Video rental stores or like vendors may use DVD Tilz to rent movies to customers in a plurality of different ways. Users may come into the video rental store and either physically plug their mobile handset into a USB (or other) port to download the movie. Or users users may browse the shelves and scan the barcode of the movie they desire on the DVD box of the movie on the shelf, and the movie may start downloading (once the transaction to rent the movie is completed) to the use's DVR, (which may be back at their house, or might be the mobile device (Mobi) in their hand), while the user grabs some candy and soda, and pays at the checkout. Users may also browse the video rental store Website or ParaSite, and click the movie they want and it may start downloading (after payment has been received). The point is users may start associating that video rental company with a company that is thinking about the best ways to add value to the movie watching experience. Using Tilz a video rental company such as Blockbuster may also be an e-distribution hub for digital movie delivery to movie theaters. Using Tilz Blockbuster may be the video content delivery vehicle for corporations that need a live event or canned video materials distributed and made available to employees.

Gift Card Tilz

Replacing the need to physically manufacture and carry around a plurality of gift cards, stores may issue Tilz-based gift cards that users may store in their mobile handset. In embodiments Tilz gift card features include, but are not limited to:

Displays the balance left on the card;

Reminds user prior to annual fees being deducted;

Reminds user prior to the gift card credit expiring;

Compatible with a plurality of mobile handset payment technologies.

Business Card Tilz

Tilz may replace business cards. Tilz business cards may be a portal through which additional information is made available about that person or company. And may become the ongoing connection point for the business relationship among the individuals exchanging business cards. The business card Tilz may provide a history of all interactions, as well as means for future interaction. Also, Tilz business cards may be any shape, size, color, or be animated, say, when presented on a TV. Or be animated in such as way as to capture rituals such as those in Japan around the exchanging of business cards. Images may appear of thumbs and forefingers gripping the upper corners of the card, and having the cards "bow" to each other, and then be placed directly in the lower center of the device screen parallel to the bottom edge.

Artwork Tilz

Every piece of art a user owns may have its own Tilz. Users may socialize with others who share an appreciation for that particular artist or style. Gallery owners may, if the user's Tilz profile permits, send invites to gallery showings. Museums may make art aficionados aware of related events, via such artwork Tilz.

Coupon Tilz

Multimedia, user-solicited, location-aware, profile-based Tilz coupons. Digital coupons replace paper coupons with barcodes. Users may acquire Tilz as per the profile of items they utilize in their life, and redeem them automatically, via, say their mobile device.

Phonebook Listings Tilz

Phonebook listings as transactable Tilz. Listings of solutions for problems, not just names of individuals and businesses. Such listing Tilz may include ratings by people who utilized that vendor Tilz before.

Wine Label Tilz

Collect the labels for each wine a user tried; keep tasting notes therein. User may get paid by companies wanting to sell that user wine or wine related items or other things, to receive ads/offers/information/et. al.

Status Tilz

For example, 14 weeks pregnant; or Out of Office—backpacking in the Sierras; or Single, and then include the profile of the type of person they're looking for; et. al.

City Overview Playlist

Chamber of Commerce delivers this Tilz deck, to users inquiring about that city. The Tilz in the deck the user receives depends upon the profile of the person requesting the information: are they a business thinking about opening an office/plant in that city?; or are they an individual looking to move there?; or other.

Digital Wallet

Instead of having to carry around all the various cards (and other things) in a user's wallet, the user could instead carry digital versions of their driver's license, credit cards, frequent flyer club cards, etc. in Tilz format on their mobile handset.

Tilz ID Cards

Some cities, states, and countries are considering issuing resident ID cards. These cards may be electronic and Tilz-based. A Tilz ID card may display a person's picture in addition to salient personal information. Tilz ID cards may include IP-based barcodes (such as Net Dotz). Tilz passports may replace physical passports.

Web Presence Tilz

A user's image or photo may be used for their Web presence Tilz. Other users may click on that Tilz (to flip it over) to see that person's online profile or get more information about that person—and the information the recipient sees, may depend upon the recipient's profile. Tilz enable users to create social/business networking profiles, without the need for a particular Website on which to post a user's profile. And Tilz function all over the Web, as well as on a user's PC and mobile handset.

Ad Tilz

Customized advertisements delivered as Tilz.

Intramedia Ads, Intrastitial Ads, Targeted Ads

One or more embodiments of Tilz support embedded ads within a show, movie, video, photo, document or any digital content. And since Tilz each have their own unique ID number (IP address) they may, as per the user's preference profile, delivers ads targeted at or requested by individual Tilz viewers. Intramedia ads may float on top of part of the existing program in such a way they cannot be defeated or avoided by the user. Interstitial ads are between shows (or during commercial breaks) but, again, cannot be defeated or avoided by the user. Targeted ads that reflect those items a user's (ad) profile specifies the user wants to receive and not receive. Targeted ads, if the use allows, may also be based upon keywords associated with that user from many sources, including the user's lists of items they own or want to purchase.

Bottom Line Ads

Ad strips across the bottom of Tilz, that show a short 2-5 second (or time amount) ad from time to time. Such bottom line ads may slide out from the bottom of the Tilz, or appear in the Tilz frame, or even encroach on the bottom portion of the Tilz field itself.

Tilzvertisements

Some Tilz content may be view only after, say, a 20 second long advertisement on the Tilz (a Tilzvertisement). Ad serving companies may collect a transaction fee, if the Tilz is utilized to make a transaction based upon the ad.

Branded Tilz

Some companies may wish to extend their brand by offering users Tilz (templates) branded with the company logo for free or paid use. One or more embodiments of Tilz may have the look, feel and colors of various sports teams, universities, organizations, companies and/or commercial products (or other things or entities). For example, users may pay an extra fee to have Tilz that look, say, like the colors/logo of their favorite band or like colorful M&M's—or possibly even be paid, to utilize, say, a particular company's logo-branded Tilz.

Sponsored Tilz

For example: Ford Trucks whose slogan is Built Ford Tough, may pay to put Built Ford Tough across the bottom of certain Tilz groups—say those Tilz with tags, relating to the topics, "Trucks," or "4wd," or other. Similarly a Website may sponsor a Tilz that enables users to discuss various/top-rated topics. Rolex may sponsor the public Tilz of a top tennis pro.

Licensed Tilz

Users may pay for the license/right to use/display Tilz that look like, say, Cheetos or a NASCAR race car.

Tilz Templates

Individuals and companies may create templates for various types of documents, contracts, greeting cards, etc. that others can purchase. These may include company/university mascots moving around the document Tilz frame or even (licensed) famous people's voices introducing the Tilz (e.g. Michael Douglas' voice introducing the prospectus). Tilz templates may revenue share income from that Tilz, or charge a one-time fee.

Avatars

Instead of boring conventional art digital versions of an 8.5"×11" piece of paper, a document, for instance, may be represented by an animated walking talking avatar robot. Such avatars may be sponsored by third parties whose brand name may appear thereon. Such a complex Tilz template may otherwise cost the user some money to acquire the rights to, however, the sponsor may cover the template fees in exchange for its brand identity prominently featured on the avatar. In embodiments the user's face may be mapped onto the avatar, as per profile/preference customization. The avatar is the document.

TV Everywhere

TV everywhere (via Tilz). A user's, say, cable TV subscription package gives users Tilz (each show in its own Tilz) rights to every show, on every channel in the user's TV package. TV service provider advantage: many of the Tilz may be served to users directly from content providers' (e.g. CBS, NBC) servers. User advantage: Tilz available anytime, anywhere on any digital device. Users may access their show Tilz (say, via the Internet) while at a friend's house, or hotel, etc. And shows may scale in size and/or quality as per the user's profile and the display device's profile.

Hidden Information

The profile of the person clicking on the Tilz may enable special access to extra content. Tilz creators may use the cover Tilz image (or other parts of a Tilz) for more than just its standard intent. Clicking on the cover Tilz usually takes the reader to the more detailed information, however the Tilz creator may want to enable special access, say, for their friends, by having them click on some inconspicuous feature on the cover Tilz image, which then directs them to extra content Tilz. And since Tilz may have profile-based links, different users may be directed to different content, though they clicked on the same area/link.

Tilz Program Electronic Devices

Some electronic devices are difficult to program. It may be easier and intuitive to create a mobile device widget to control and program electronic devices (FIG. 41). For instance, the user may program a ceiling fan's light to go on and off at certain intervals, (say, when the user is on vacation), via a mobile device widget for the ceiling fan, using fingertip swipes featuring an image of a clock and a calendar, rather than the conventional art non-intuitive light/fan/light fan switch programming progression, used by some ceiling fan lights, which may require the user to refer to the product manual (if they can find it).

Tilz Replace Email

Tilz replace email (Tilz email=tmail). With Tilz, email is no longer a separate entity, whose data must be cut and pasted into other places (such as documents—since some email formats are not seamlessly compatible with conventional art document formats). The data in the email Tilz update in realtime or when all other dependent Tilz update asynchronously. If a user changes their address, the user's address Tilz on, say, their magazine subscription Website is auto-synced. As per the conventional art, if a user moves (and thus changes address) the burden is on the to remember all the locations (such as various Websites, login accounts, mailing lists, etc.) where the user's address is stored, then update them one by one. With Tilz, each of those locations stores the user's address via a user's Address Tilz—which is automatically updated when an information changes. In embodiments email via Tilz means users may write, speak or video chat (among other modalities) back and forth synchronously or asynchronously.

Users receive less spam via email Tilz. Via a plurality of user-selectable ways of being notified, the user may be alerted that a particular Tilz is available for download or sync. If the users don't recognize the sender, they don't download the Tilz, thus spam can't get in unless users download it themselves. If a user receives a conventional art email about a product, there is no simple way to update that user's profile vis a vis that product, without the user having to re-type such information manually. With Tilz, a user receives the Tilz for that product, which a sorting facility (Sorto), can easily sort, as is, into any number of profiles directly, and whereupon the user, if they wish, may start being paid to receive ads, for instance, for where they may purchase said product near them. And users may be paid for flicking said Tilz (equivalent perhaps to the outmoded conventional art email "forwarding") to one of their friends who may be interested that product.

In embodiments a user creates any sort of digital content, and selects the email icon in the corner of the Tilz. There the user types the name of the intended recipient, who receives a link to the location of the Tilz, and the Tilz is "downloaded" by the same recipient at a time of their choosing, and onto a device of their choosing. Further changes to that Tilz, are synced rather than "sent" as per conventional art email. Tilz are synced anytime the recipient is connected to the Internet or via peer-to-peer if proximate to another user who has a newer version of that Tilz or by other means. Thus, any size tmail can be sent, since, in embodiments it is being up/downloaded. Tilz recipients essentially subscribe to the content of the sender's Tilz.

In embodiments a user wishing to send an email, may simply create the document (or photo, video, spreadsheet, blog entry, etc.) they wish to send in a Tilz. Each Tilz is assigned an IP address and IP-based barcode. The sender then clicks on the "email" icon in the corner of the Tilz, which opens a Send To address field. The sender may then type in the name or IP address of the recipient, or the IP address of the recipient's mobile handset, and the Tilz is then "uploaded" to that IP address. Tilz are uploaded or downloaded, rather than "sent" as email is today. The recipient may view the Tilz, as well as provide a response. Once the response Tilz is complete the recipient can upload the response Tilz to the original sender. Sender and receiver subscribe to that Tilz' content, and thus receive updates thereto.

The fact that Tilz are uploaded/downloaded, rather than "sent" like email, solves the problem of large email attachments (which via conventional email are not allowed to be delivered)—because files (or Tilz) of any size can be up- or down-loaded.

Additionally, the Tilz may be "sent" (among other ways) by instant messaging (IM'ing) or texting the recipient's mobile handset (or other device) with the IP barcode/address for the Tilz, which the recipient can click on or scan to download the Tilz content whenever convenient. Tilz "email" content may also be viewed on a Website (or other means).

Users may store their contacts' IP addresses in their address book or contacts manager (along with their contacts' name, email addresses, phone numbers, etc.) so they don't have to memorize IP address numbers.

Also, users don't need to have an email service provider (such as Yahoo or Hotmail). Instead of an email being sent to the receiver's email service provider, where the message is stored on the email service provider's servers, the sender can upload the Tilz directly to the recipient's mobile handset when both users' mobile handsets happen to be simultaneously connected to the Internet. And if the recipient is offline at the time the sender is trying to send the Tilz, the Tilz is cached in the sender's Communication Cache Tilz for delivery when the recipient's mobile handset is online again (the system may keep pinging the IP address of the recipient's mobile handset (or other device), until a response is returned).

Tilz Widgets

Tilz may also be utilized as widgets (Webified mini software applications) that may be downloaded to, among other places, a user's mobile handset. For example:

A document Tilz may contain a small open source document editor in the Tilz itself.

A spreadsheet Tilz may contain a small open source spreadsheet editor in the Tilz itself.

A video Tilz may contain a small open source video editor in the Tilz itself.

A presentation Tilz may contain a small slide presentation program to view and edit the presentation.

And as an alternative having the Tilz contain the mini version of the open source licensed software, the user may have a copy of the open source software on their digital device, and each Tilz may, in embodiments, utilize that software code.

In embodiments the Tilz Website publishes a list of, and makes available for user download, compatible open-source programs.

Tilz on TV

Tilz work on TV. Tilz may be displayed on TVs via a user's digital video recorder (DVR) or set top box or other device that interfaces with a television set.

Users may, for instance, leave several small semi-transparent Tilz up on the screen when they are watching TV—to, among other choices, monitor stocks, interact with friends via (chat, play games, send/receive email, et. al.).

Channel Tilz

Media company Tilz (Channel Tilz) may provide an alternative to television. Each media company (as well as individuals and other entities) may have its own Channel Tilz that users may carry with them on their mobile handsets (or view via the digital device of their choice). In embodiments Channel Tilz are similar to a mini TV channel for that media company—however the content may be cached, not just live. For instance, CNBC may have its own Channel Tilz, that it refreshes with content about stocks, various stories of the day—in neat 3 minute clips. Media company Channel Tilz don't require the bandwidth of actual live TV to the mobile handset, yet enable users to stay in touch with and "watch" CNBC almost all day, via quick check-ins. Users may decide how much mobile handset storage space to allot to each media company Tilz.

For example, Disney may have a Channel Tilz that runs video trailers of upcoming movies, or of their ABC TV shows (enough to get the gist of the entire episode, but in a 5 minute per 30 minutes of show clip). And as bandwidth and storage increase (particularly to mobile devices), media company Channel Tilz may be utilized as a new means to replace actual full TV channels.

Media companies may decide to run ads or not on their Channel Tilz—for instance Disney may run ads about DisneyWorld or even ads for products not related to Disney at all. Media company Tilz may also be used to deliver targeted ads to specific viewers since Tilz are compatible with reverse electronic cookies (My Cookiez) which the viewer may use to transmit a profile of the types of ads they would like to see.

A user may keep their favorite media Tilz current all the time on their mobile device: ESPN, ABC, CNBC, CNN, National Geographic, HGTV, etc. Media company Channel Tilz may also be viewed by users on their regular TV sets.

Tilz as Record "Singles"

In embodiments, as per the old vinyl record 45's with an A and B sides, music owners/publishers may choose to release their music on Tilz as (one or) two-song "singles." Because it's a Tilz, such singles may be supplemented with extras such as videos of the band performing those songs. But unlike CD/DVD content, the Tilz may be released in numerous different audio formats which users may pay extra for. And each time the Tilz is played it can be optimized (as to audio/video quality, for instance) for that device. Since Tilz may be viewed on a number of different devices, from mobile handsets to large screen TVs, users may purchase the highest quality DVD video Tilz of the "single," and their Tilz license may allow them to download different, and the most appropriate, formats to different devices (such as the MP3 format to their non-video playing mobile handset).

Living Tilz

Song artists (or other entities) may choose to release "living" Tilz for a given song. So for instance, a band may release their song called "Forever You" in a living Tilz. Living Tilz may cost more than a regular Tilz (or charge a monthly subscription fee) but, for example, the user may receive a new version of "Forever You" each time the band plays and records it. If the band were on a concert tour, the user may receive a live performance version of "Forever You" automatically sent to their digital device of choice, at no extra cost (or alternatively by monthly subscription fee), each time the band chose to record a live performance. And if the band appeared at a radio station to promote their tour stop, and played, say, an acoustic version of the song at the radio station (that was broadcast over the air), that version may be sent to the user's Living Tilz automatically, at no additional cost (or other fee arrangement).

Essentially Tilz enable artists to break free from the conventional art analog confines (that have been copied to date in the digital world) and let their imaginations run free as to how they'd like to present their wares to their customers.

Living Tilz may also include pictures users send to their friends/relatives. For instance, if a user sent their friends/relatives a Tilz of the user's son, Pete, in a Living Tilz, then each time the user takes a new picture of Pete (that the user designates as Public) it may be sent (or become viewable) to all holders of, or subscribers to, the Pete Living Tilz. With Living Tilz they may always have the latest photo of the user, or user's child or pet or what the user is serving for dinner, etc. So if a user were to subscribe to "Eiffel Tower" photos, that are Living Tilz, they may receive, in embodiments, any photo Tilz tagged "Eiffel Tower" that any user has uploaded or is "hosting" publicly from their camera or mobile device. So, once every 30 seconds (or other user-defined time interval), the user may receive/see a new Eiffel Tower image in their Living Tilz.

Collectibles

Every coin, stamp, bottle of wine, and every other collectible item may have its own Tilz with its own unique IP address. In embodiments users take (or download or otherwise obtain) pictures of the front and back of the item to display the item in the Tilz. Also, manufacturers may start assigning unique IP address numbers to all, say bottles of wine, so that when a user purchases that bottle, the bottle may come with its own Tilz with (profile) information about that specific bottle (not just about the general category to which the wine belongs or such wine made by a particular winery). For example a Beringer 2001 Cabernet Sauvignon Reserve bottle ID #12345678. When the user purchases the bottle (likely with their mobile handset) the purchase transaction may send the user's mobile handset (or other device) the Tilz for that bottle of wine. The user may then add that Tilz to their Wine Cellar list. Beringer may then send tasting notes to all purchasers of (and thus Tilz subscribers to) the wine. Beringer may suggest Drink Now, or perhaps, lay down for an additional 2-4 years. And users with the Tilz for that same wine may socialize (from/within the Tilz), and compare, say, drinking timing or tasting notes with each other (if they choose) without having to "go" to a conventional art Website to do so.

Users and/or third parties may create custom Tilz templates in which to present Tilz for collectibles (or any other Tilz). Designer Tilz of items may become the must-have accessory for certain items, and may someday be even more collectible than the (Tilz of the) item itself.

Patent Examiners

If inventors submit patent applications in/via Tilz, then inventors/patent examiners may add tags to the Tilz for each invention. This may automatically form a searchable relational database for the examiner to pull up related patents (submitted in Tilz format) with similar keyword (or other type of) tags.

Hospital Tilz

Hospital Tilz may be displayed on any digital screen (PC monitor, TV, mobile handset). The hospital Tilz may act as the information board for each patient; and as a better alternative to the frequently used whiteboard.

Hospital Tilz may also be made available to any subscribers the hospital and/or patient wishes, such as family members (especially those out of town), insurance company, doctors, nurses, et. al. Hospital Tilz may be customized with many items such as a rotating set of photos, both for friends and family (with in-hospital photos), and from the patient's friends and family (with at-home photos of the dog chewing the patient's favorite slippers).

Badges

Users may collect Tilz/badges from any location, monument, store, et. al. they physically visit (or otherwise acquire remotely via non-proximate modalities). In embodiments, these badges may not only be collected, but also may be utilized as information dissemination and advertising vehicles. They may also provide on-table interaction. As a user enjoys a drink at a bar, for example, their drink "electronic coasters" (Tilz) may reflect the drink they're having, or even be suggesting their next drink. For instance, Coke if they're having a soda, Bud if they're having a beer, Kendall-Jackson wines if they're having vino. Electronic coasters may also be utilized by third parties, for example to post missing persons "milk carton" profiles, or local ads, say for the ice cream parlor down the block for dessert, or the bookstore across the street. Users may get paid to receive such ads/offers/information/et. al. Which may reduce the cost of their drinks by, say, X cents per 10 minutes (an electronic currency (iDough) credit toward their bill). Users' drink information may be automatically added to their Drinks Profile—which may increase that profile's value.

Users' badge Tilz data may be sent not only to that restaurant so waiters may offer customers "the usual"—but also directly to the drink manufacturer. Tilz may help the drink manufacturer build a more accurate (realtime) profile of their users, as well as be able to market directly to their customers via badge Tilz, which enables interactions such as buying their frequent users a drink, or offering discounts from time to time at various locations. Or inviting customers to tour the actual brewery or winery. Waiters may also use the Tilz drink badges to keep track of the drinks (or food) the user has ordered. So Tilz badges may become a user's bill and receipt for that establishment (far more interesting and useful than a conventional art printed receipt). Badges may also be utilized for real world scavenger hunts, and other games, contests and activities); Tilz badges may also be utilized as a way to keep in direct contact with customers/friends/colleagues/et. al.

Reverse Badges

In addition to users receiving a badge when checking in at a location, users can give a badge—their personal badge. Their profile Tilz. With Badge Tilz users have information about that restaurant (or other entity) and that restaurant (or other entity) has information about that user. Such badge Tilz may be the basis, the vehicle, for (all) future interaction and transaction and communication between that user and that restaurant/person/other entity. The reverse badge may simply be the obverse of the badge the user receives from that establishment (ala a baseball card; with one side all about the establishment and the other all about that user). And is the gateway to that person's (ComCloud) profile broadcast and are the (Galaxz) social/business/object network Tilz for each customer of that establishment or company.

Product Registration

Every object may have a Tilz. Manufacturers may push Tilz of their product to customers who purchase it so that, among other motivations, users may register that Tilz (or the registration may take place automatically), and the manufacturer may pay the user for that ongoing product usage data. Such Tilz may be pushed to the user's mobile (or other) device at the time the item is purchased. As the user scans their checkout receipt, it may push a Tilz for each item they purchased, and, if the user wishes, registers that item according to that users profile. Why for instance, would a user want a Tilz for every item in their house? Many reasons. The Tilz may warn a user when their food item is about to go past its Use By date, or when their aspirin are about to expire. And manufacturers and retailers may use this opportunity to pay the user to receive a coupon for or ad about that product, or market related or competitive items.

Revenue Sharing

As Tilz generate income, say from others wishing to pay to view the content of a given Tilz, or from ads on or relating to that Tilz, such revenue is shared with the user. Revenue may also be shared with the device maker (such as Motorola), network carrier (such as Verizon Wireless), et. al. In embodiments Tilz (transaction) revenue may be split with application makers, for Tilz saved natively from that application. For example, third parties, such as Microsoft, may participate in the revenue generated by a Tilz, that was created by saving a Word document as a Tilz MDF document (.MDF rather than or in addition to .doc). As per the conventional art, Microsoft doesn't participate in the revenue a .doc document might generate. Tilz may also be customized for users. Hello Kitty animated frames for Japanese teenage girls. Kendall-Jackson winery sponsored framez (an animated edge around the Tilz) for wine-related documents (or for any topic document sent to or owned by a wine aficionado). Animated template item lists. Revenue may be shared for premium Tilz fees. The application maker (such as Microsoft) may share in the revenue from the sale of premium Tilz features or Tilz templates, for Tilz created via that application. Tilz are a flexible object space that enable characters from video games to live on mobile devices, PCs, TVs in novel ways. In such a manner, third party's brands may start to interact with their users in a way never before achieved as per conventional art advertising methods.

Conventional art social networks make money off the profiles of users. It's time the users share in the value created. To with: a user creates their public Tilz (their public profile). Social networks then pay the user to park that Tilz on that particular social network site. If not, then users may choose alternate social nets where the user shares in the economic value being made off that user's profile. A Tilz is also a profile. A profile of that person, place, thing, object, file, folder, Website, song, photo, etc. Conventional profiles live at profile parking sites such as Myspace and Ryze. And social networks make money off the profiles of users, yet don't share the resultant revenue with their users. It's time that users share in the billions of dollars of value being created off their profiles.

Users are motivated to create Tilz for objects. Take the case of antique hunters rummage through old barns. As they come across items, they may create Tilz for those items (e.g. take a picture and add some descriptive text). Those Tilz are then living on their mobile handsets. Those Tilz become part of their information broadcast (CloudCast) that may eventually entice someone who sees those Tilz to go the barn owner and purchase one of those items. If so, that antique hunter may receive a commission on that sale. Tilz creators may share in revenues from the sale of Tilz templates (e.g. to more artfully display the information) applied to their Tilz, or from transactions that their Tilz engender. If people have to work, why not do something they love? This applies to anyone who has a passion for something, and now with Tilz, may have fun pursuing what they love. And such behavior promotes adoption of Tilz.

Transactable Transactions

Wrapping transactions in Tilz engenders a whole new class of affiliated transactions. For example, via a Tilz hotel check-in transaction, AAA members may be automatically rewarded their extra points credit when they book rooms at participating hotels, whereas today they'd have to know that a particular hotel had such an offer extant. Users benefit by getting offers to receive discounts on a particular transaction, from entities such as competing hotels, or digital payment systems (which might offer different points/credits bonuses) or payment processors, and ensure that all benefits the user is entitled to are, in fact, realized for the user. Tilz also enables various payment methods/managers to bid on a given transaction. Tilz enables a new way for credit card companies to mitigate risk, and offer a much more custom interaction with their customers. And as a person's credit score increases, a credit card company may bid to offer that transaction with, say a 12% interest rate, rather than the 15% rate their card is currently set at. Conversely, if a person's credit score is declining they may offer rates for transactions that are higher than the current 15%. That is to say, rates fluctuate with user risk, not just with, for example, the Fed Funds rate. Vis, AMEX and others may offer credit facilities not just credit cards. If a user's FICO score drops, the credit card company may no longer be obligated to offer that person credit. Or may choose to offer credit on a transaction by transaction basis, with differing risk-based interest charges for each transaction. Also Tilz may be a good way of acquiring a new customer. Just bid for their credit card or debit card business on a per transaction basis.

The plurality of Tilz applications and uses are practically limitless.

The present Invention may be embodied in other specific forms without departing from its spirit or essential characteristics. The described embodiments are to be considered in all respects only as illustrative and not restrictive. The scope of the Invention is, therefore, indicated by the appended claims in addition to all foregoing descriptions. All changes which come within the meaning and range of equivalency of the claims and foregoing descriptions are to be embraced within their scope.

The Wireless Location-Establishing Device Provides a Platform for a Mobile Handset Data-Acquisition and -Processing Device A system, method, service and platform for creating, managing, and monetizing profiles of the people and things in a person's life, via digital devices that make accomplishing one's daily activities more efficient and enjoyable are disclosed. The present Invention ("Mobi") enables users to create and broadcast profiles of their wants and needs, and by profile matching the wants and needs of other people and entities, substantially reduce the friction inherent in today's outdated and outmoded forms of interaction and transaction; thereby revolutionizing everything from search to marketing to advertising to payments to social networking, et. al.

Today's leading cellphones (such as Motorola StarTAC and BlackBerry) and personal digital assistants (PDAs such as Palm Pilot), do not have a ready ability to engage the real world objects with which a person routinely interacts.

One can make a phone call on a cellphone. And one can perform a few basic tasks on a PDA. But the true power of a converged computing communication device has not been realized by today's various offerings.

Today's cellphones have only a few built-in functions, such as a calendar and address book. Users are generally unable to add additional functionality to their phones via onboard software applications, for a number of reasons including: limited memory, limited processing power, and limited desire by wireless carriers/handset makers for users to exercise control over the onboard software/hardware. Aside from downloading a ringtone or two, users are generally unable to modify or enhance the functionality of their phones.

The present Invention (hereafter "Mobi"), is conceived as a response to the above-described deficiencies of the conventional art. Mobi combines the power and versatility of a personal computer (PC), with the task-execution abilities of a PDA, and the communication and interaction capabilities of a cellphone, to create a device that dramatically alters the computing landscape (and users' lives).

Mobi enables users to create and carry with the user profiles of everything important to them. Furthermore, Mobi enables users to broadcast from their digital devices (or other means) their wants and needs, thus facilitating the many interactions and transactions a user wants/needs to accomplish, both online and offline.

Mobi's revolutionary mobile handsets (and other embodiments) are equipped with features that connect the offline world with the online world. In embodiments Mobis feature among other items, barcode/RFID scanners. The devices do not require monthly service contracts from traditional cell phone providers, yet enable everything from IP (Internet protocol) phone service to social networking, via wireless means such as WiFi and Bluetooth. In embodiments Mobis the size of a PDA, may replace a user's DVR (digital video recorder); replace cordless home phones; and act as the wireless touchpad input and cursor control device for other digital devices, such as TVs.

And Mobi's unique facilities enable new forms of advertising and merchandising never before available.

Over a billion cell phones are sold each year. However many users chafe at the monthly fees charged by cellular service providers. Furthermore, most wireless carriers have been slow to open their cellphones and their networks to third party software applications and hardware devices.

And while most cellphones today do a decent job of making phone calls and listening to music, many Website or PC software applications are not available on mobile handsets.

A number of technological events are expected to drive demand for new and more capable mobile handset devices. And also for less expensive mobile handsets that don't necessarily require network service from a wireless carrier. New wireless airwaves may become available for mobile handsets. New spectrum may drive demand for a new class of devices.

WiFi Internet access may be utilized as a means of both making phone calls as well as using Internet applications, without having to utilize (and pay for) a wireless carrier's network. WiFi is becoming more pervasive with WiFi networks being added to numerous cities, airports, coffee shops, etc. Many people now have WiFi networks in their home and in their office at work. And WiFi may even be added to transportation vehicles such as cars and airplanes.

Hence new mobile handsets that use WiFi in preference (or in addition) to cellular networks are emerging. By tapping into WiFi hotspots, which are increasingly ubiquitous, users may check email, stocks and weather, as well as utilize services or information based, for instance, upon the user's location. Such mobile devices may become the next computing platform.

Thus there is a market need, particularly in emerging markets countries, for a wireless carrier optional mobile handset with IP (Internet protocol) services capability.

The present Invention is described in one or more embodiments in the following description with references to the Figures. While the Invention is described in terms of the primary modes for achieving the Invention's objectives, it may be appreciated by those skilled in the art that it is intended to cover alternatives, modifications, and equivalents as may be included within the spirit and scope of the Invention as defined by the appended claims and their equivalents as supported by the disclosures and drawings herein.

A primary purpose of the system, method, service, device and platform described herein is to facilitate improved interactions and transactions between people, companies, objects (and other things). The disclosed system, method, service, device and platform enable users to create, manage and monetize the profiles related to anything in their life, and thereby more easily, efficiently, and profitably accomplish their daily tasks.

Although various embodiments of the Invention extend to any mobile data acquisition and -processing devices consistent with the principles described herein, these embodiments are referred to collectively as "Mobi(s)."

According to these embodiments of the Invention, Mobis enable users to exert control over the flood of information bombarding them, sifting for relevancy, and delivering such results when, where, and how a user wishes. In addition, various embodiments of Mobis are designed to be functional replacements for plurality of (digital) devices, such as cordless home phones, digital video recorders (DVRs), TV set top boxes, videogaming rigs, et. al.

Mobis' novel facilities 5150, described in detail below, are the foundation of the first "cellphone" (and other devices) that don't need a wireless carrier—and thus Mobis don't require a user to pay monthly fees to same. This also makes Mobis especially suitable for the second- and third-world countries.

In addition to facilitating Voice Over Internet Protocol (VOIP) phone calling on a wireless carrier-optional handset, Mobi mobile handsets (and other digital devices) incorporate a number of new and existing technologies in unique manners to enable a brand new class of IP applications/services, initially aimed at the consumer market.

Various Mobi embodiments have several unique features for a consumer mobile handset such as a laser-based barcode scanner and/or RFID reader. Mobis may also be able to display all documents and files in a new mobile document format (Tilz Facility 30) that makes viewing and using applications on a mobile handset much easier.

Barcode scanning. Barcode scanning has traditionally been reserved for commercial retail and inventory applications using purpose-built barcode scanners. Various Mobi embodiments incorporate various types of barcode scanners in a mobile handset so as to enable an entire new universe of social and consumer IP service applications that have not existed before. For example, users may walk into a restaurant and sit down at a table which has a menu on it. Each menu item may have a barcode next to it, and users may scan the menu item to order and pay for that item, entirely with the barcode scanner equipped mobile handset.

Furthermore Mobis are capable of reading a novel type of digital IP-based barcode (hereafter Net Dotz Facility 27). Unlike traditional static barcodes which contain the item information in the barcode itself, digital IP-based barcodes contain the IP address where information is located for that item. Thus, digital IP-based barcodes may require a barcode reader that is also Internet capable—which the Mobi is.

For instance, a user reading the Sunday newspaper sees an article in the Travel section about Ireland, complete with pictures, text, and a list of suggested hotels and restaurants, and sites to visit. Instead of getting out scissors, cutting out that article and physically filing it in their drawer, if the article were IP barcode (Net Dotz Facility 27) labeled, the user may scan the article with their mobile handset, and the mobile handset may retrieve the article and deliver it to the user's mobile handset (or other device) in a convenient mobile document format (Tilz Facility 30) (or at the user's option, just bookmark that IP address). Additionally, if the author of the article later changed some aspect of the article, let's say added two additional hotel suggestions, the user may receive those updates automatically since the barcode encodes the IP address of the information, and any updates of the content at that IP address may be automatically synced with the user's local copies (Tilz) of the article.

RFID. RFID (radio frequency identification) tags have traditionally been used for commercial inventory purposes. RFID has failed to live up to its full expectations primarily because of two factors: cost and reliability. On the cost side, the goal to reduce the cost of an RFID tag to less than one penny per tag, has eluded the industry for years. As for reliability, RFID tags have lost favor for some inventory applications because of a less-than-acceptable read rate. For example, manufactured goods with RFID tags are often moved on high-speed conveyor belts in warehouses. In some cases RFID readers have been unable to offer better than a 95% successful read rate for RFID tagged items as they pass the RFID reader. A 5% miss-rate is unacceptable for many inventory applications.

Mobi mobile handsets featuring RFID readers are intended to be used (among other uses) for consumer and social applications that have not existed before. For example, users with RFID capable mobile handsets may walk into their local Starbucks coffee shop for a cup of coffee, and Starbucks may send coupons for their products for sale (t-shirts, CDs, coffee mugs, etc.) via RFID tags on the shelf caps to the user's mobile handsets. Such non-mission-critical social/consumer applications/services are a new use of RFID technology that Mobi mobile handsets enable.

MobiMail is a mobile handset email service. Unlike current services, MobiMail also works on mobile handsets which do not subscribe to a wireless carrier. Instead these mobile handsets rely on WiFi and other forms of wireless data services that happen to be geographically proximate to the mobile handset device to send and receive email (in addition to other communication and messaging modalities).

In embodiments Mobi function as a cordless-phone handset for the home/office, however Mobis' various facilities engender other uses as well:

Barcode scanner for in the home/office (for instance to track the bottles in a user's wine cellar);

Create and manage a user's commerce communications cloud (a wireless network the user utilizes to broadcast profiles, such as for instance, their garage sale items, from their own home/office network or digital device);

Function as an universal TV and stereo remote control;

Serve as a functional replacement for the DVR (digital video recorder) for the user's TV;

Serve as the touchscreen/touchpad and keyboard input device for TVs, enabling users to utilize Internet and computer software applications/services on their television set, while sitting on the couch/bed using the touchscreen (or other modality) on their mobile handset to control the cursor and input information. Thus users may do their social networking while watching TV—utilizing the TV display screen;

Enable users to "mark" TV shows/movies or commercials or other things that a user wants to bookmark; and, among a plurality of other uses;

Enable users to make phone calls from their home, even if they do not have a landline phone service, using IP-based phone services, including such a facility native to Mobi.

In embodiments, Mobis are mobile handsets (though other embodiments depart dramatically from this archetype) one or more embodiments of which contain a barcode scanner, USB port, Ethernet plug-in port, RFID reader, WiFi, and/or other frequencies tuner. One or more Mobi embodiments have satellite GPS, but one or more Mobi embodiments can also use cell phone towers and WiFi hotspots to locate themselves. Mobis may operate independently of the need for a cellular service provider. A Mobi software widget that enables users to control the hardware and software may be resident on Mobis.

The Invention also includes a Website where users can manage various aspects of their Mobi devices and services, as well as up/download software to the device. The Mobi Website also features a digital content store, where users can rent or purchase music, TV shows, movies (subject to rights acquisition) and other digital content for use on their Mobi.

Some Mobi embodiments and facilities function without need for wireless carrier service. However, other Mobi embodiments are intended for wireless carrier network functionality, and for this reason some Mobi embodiments contain a CDMA/GSM tuner or a software defined radio version of same instead.

Each mobi device has its own, unique, changeable and/or static IP address.

IP Phone Service

One or more Mobi embodiments include a Voice over Internet Protocol (VOIP) phone service facility, enabling users to make/receive IP-based phone calls without need for a cellular service provider.

Widgets

In embodiments Mobis include one or more of the following software widgets (Webified mini applications) (not a comprehensive or restrictive widget list):

1) Security widget—manages the user's device and connection security. Among other functions this security widget) alerts users as to the level of encryption offered by a particular WiFi connection. This security widget (Secure Widge) also enables virtual private network (VPN) connections, which many companies use when workers remotely connect to company servers.

2) Payment transaction manager widget.

3) Digital content management widget that enables users to edit digital content that resides in mobile document format.

Software Developers Kit

Mobi supplies a software development kit that enables independent programmers to build Mobi applications.

Corporate Features

In embodiments Mobis ship with email support for some corporate software programs, including, but not limited to, Microsoft Exchange Server, Lotus Notes and Novell GroupWise. In addition, Mobis interface to and sync with common corporate contact lists and calendars, so that, for example, a new appointment entered into a calendar at the office will show up on a user's Mobi.

Mobis provide corporate information technology (IT) departments control over the devices, allowing them, for example, to remotely wipe all data from stolen or lost Mobis to protect sensitive information. Remote management also includes a feature to hunt down and switch off errant Mobis.

Mobis enable businesses to distribute Mobi-based software applications directly to employees.

Mobis offer a basic type of virtualization software. Mobis may also, at a corporate administrator's option, support a mandatory second password to log in. Mobis are designed to access virtual private networks via a Web browser. Data on Mobis is optionally wrapped in encryption software via a mobile digital-content format (Tilz Facility 30).

Open Device Specification

By following a largely open specification that Mobi may make publicly available on its Website, third parties may incorporate, subject to license terms, select Mobi features and facilities into other existing products such as thumb drives, MP3 players, cellphones, set-top boxes for TVs, et. al.

Standard Features

Various Mobi embodiments have differing standard features which, depending upon configuration and embodiment include: barcode scanner; WiFi (802.11); Bluetooth; USB; rechargeable battery; charging dock (headphone jack may be the charging dock connection point for some embodiments); and/or battery indicator.

Optional Features

Various Mobi embodiments have differing optional features which, depending upon configuration and embodiment include: RFID reader; HD radio tuner; GPS (global positioning satellite) location determining ability; memory card slot; wireless networking card (fits in the memory card slot in some embodiments); USB cable; USB power charging adapter; Docking Station Pro—may act as a Home Server or video game player: 1 GB (or more) memory, 250 GB (or more) storage, high-end dedicated graphics processor, multi-core CPU, server software; digital media/Internet radio player; touchscreen fingerprint scanner facility to establish identity for online interactions and transactions; and/or translucent case, with fiber optic/LED lighting with pearlescent glow emanating from inside. Of course, it will be appreciated that other standard and optional features may be added as circumstances warrant.

The Invention employs and incorporates many unique technologies, such as the ability to create and broadcast, via a plurality of means, user profiles directly from the device, and thereby effect novel interactions and transactions, as per the detailed descriptions below.

Having generally described operation of the systems and methods of the present Invention, various embodiments will be described with respect to FIGS. 50-19.

Figure 50:
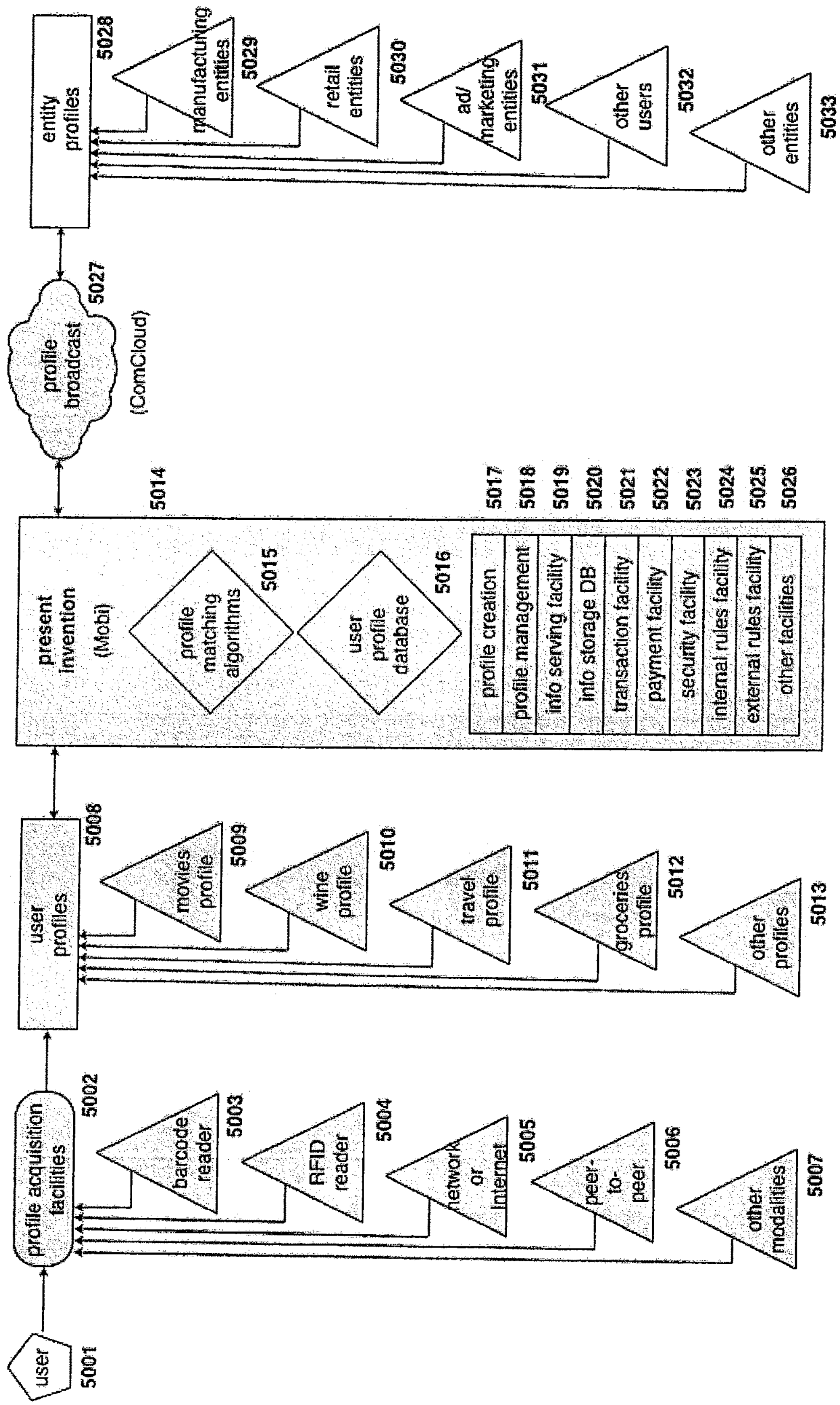
FIG. 50 is a functional block diagram illustrating an embodiment of an example of profile acquisition, creation, and matching, as per the Invention's facilities and algorithms.

Referring to the accompanying drawings wherein the same reference numerals refer to the same or similar elements:

FIG. 50 shows an exemplifying architecture of an embodiment of a mobile data acquisition and -processing system, method, service, device and platform in accordance with the Invention which is designated generally as system 5000.

System 5000, hereafter the "Mobi Platform," represents an embodiment of the system, method, service, device and platform by which a user creates profiles of things, which in turn inform the ads, offers, information and other data the user receives regarding same. In embodiments the Mobi Platform consists of client and server software 5014, but which more generally consists of a plurality of computer applications, devices, components, facilities, and systems, as well as a plurality of data facilities, including various data sources and data acquisition facilities. The foregoing may be centrally located or geographically dispersed, may be locally and/or remotely interconnected, and may consist of distinct components or be integrated into combined systems. In the illustrated embodiment, the Mobi Platform 5000 architecture facilitates the processing of user-initiated queries entered into a query entry system functioning in conjunction, for example, with a barcode reading facility 5003 on the user's 5001 mobile device 5002. The mobile device may process the results of this query locally via client software, or transmit the results of this query to a remote server software system 5014 for further processing and/or routing to data sources and/or processing facilities, such as one or more servers, such as HTTP servers or other servers that are suitable for handling data that are transmitted over computer networks.

In embodiments, a plurality of profile acquisition facilities are available including barcode scanning facility 5003, RFID interrogator facility 5004, network or Internet-based facilities 5005, peer-to-peer facilities 5006, among other profile acquisition modalities 5007. Profiles consist of tiles (or other units) of data about things, hereafter "tiles" or its homonym "Tilz." The user 5001 acquires a Tilz about something, such as a product (it is understood that the Invention applies not just to products, but also to people, animate and inanimate objects, ideas, et. al.), by one or more of the aforementioned facilities/modalities. Via a vis scanning the barcode 5003 of the product or interrogating the RFID 5004 tag of a product, a Tilz (which is the profile of that product) may be returned directly, or indirectly via means wherein the query returns the Internet Protocol (IP) address where more information, the Tilz, may be found for that product. (Other Invention embodiments not involving barcode/RFID facilities are conceived wherein the same or similar data gathering and presentation is accomplished by more conventional vehicles such as Websites or other means.) Users may also acquire Tilz via network or internetwork (Internet) 5005 means, such as pointing a browser to the Webpage wherefrom Tilz for that product may be downloaded or otherwise acquired. Additionally, users may also acquire Tilz for the product via peer-to-peer 5006 means, such as via Bluetooth from, for example, another user who already has the desired Tilz for that product, say on their mobile device. Other peer-to-peer embodiments such as, but not limited to, person-to-machine and machine-to-machine interactions, facilitated by any number of communication modalities, may be utilized to acquire a Tilz about a particular product. Other modalities 5007 are contemplated, consistent with the principles of the Invention. And further, other embodiments of Tilz are conceived wherein in addition to being the profile for a product, the Tilz may also act as a wrapper for the product, such as in the case of a song or movie or document, and thereby confer upon the product/thing enhanced functionality. And further still, other embodiments not involving Tilz are conceived wherein the same or similar data tracking and presentation is accomplished by more conventional vehicles such as Websites (or other means).

Once a user has acquired 5002 one or more Tilz about an object, the resultant Tilz, which is the profile of that object, is presented to the Invention's client and/or server software 5014, for sorting into profiles 5008, which consist of logical groups and/or subgroups of one or more Tilz. FIG. 50 illustrates several sample user profiles including the user's movie profile 5009, wine profile 5010, travel profile 5011, groceries profile 5012, and other profiles 5013.

A user's profiles 5008, are then presented to the Mobi Platform client/server software 5014 which in embodiments may include profile matching algorithm facilities 5015, user profile database/storage facilities 5016, ad profile creation facilities 5017, ad profile management facilities 5018, ad serving/provisioning facilities 5019, ad storage facilities 5020, transaction facilities 5021, payment facilities 5022, security facilities 5023, internal rules facilities 5024, external rules facilities 5025, analytics facilities 5026 and/or other facilities 5026. One or more of the foregoing facilities then processes the incoming/active profile, by a variety of means not limited to extracting keywords and metadata from the constituent Tilz containing and/or constituting that object's profile.

For each profile 5008 submitted to the Mobi Platform, the user makes selections (chooses to accept automatic defaults or system 5000 generated recommendations) regarding what types of data the user would like to receive, or not receive, vis a vis that profile. Granularity of data control extends to the individual Tilz within a profile. Additional choices regarding data reception control include, but are not limited to how, when and where users receive information about the product. (Incoming information about a product is hereinafter assumed to be received via data tiles or Tilz.) The types of data a user may wish to receive regarding a product include but are not limited to ads, offers, information, or other data/content.

For example, a user who just bought 50 items at a grocery store may scan the barcode at the bottom of the user's receipt, and thereby automatically receive a Tilz for each and every item they purchased. These grocery item Tilz are then sorted into the user's groceries profile 5012. If the user only eats Wheaties cereal, the user may elect to block, REJECT, any incoming cereal ads (which might annoy the user, who only purchases and eats Wheaties). However, a user who is a buyer of Minute Maid orange juice, and is open to receiving orange juice ads may therefore set their Mobi Platform preference profile regarding orange juice ads to ACCEPT.

Users may fine tune, set the granularity of, or otherwise adjust Accept/Reject criteria via the internal rules facility 5024 or other facilities. Internal rules 5024 (such as those set by the user) and external rules 5025 (such as those set by wireless carriers, and other third parties) may be applied to user's profiles and affect various aspects of ad delivery and presentation. Examples of rules that may be set manually (by the user) or automatically (by Mobi's algorithm facilities 5015) include: 1) How, when, where to receive ads (for instance certain types of ads should be delivered to a user's TV from 7-9 PM on weeknights, other types of ads are to be delivered via car radio while the user is driving home from work; and still other ads are to be delivered to the user's handset at any time); and 2) Ad reminders: 36 months from now start tire ads. Mobi may log the date the user purchased/installed new tires, and, if the user wishes, blocks tire ads until the user is likely to be in the market again for tires. Conventional targeted advertising fails miserably in this regard: if a user purchases new tires today, then that user doesn't need to see tire ads for, say, 3 years or 36,000 miles. And though the user isn't in the market for tires, that user may in fact use the word "tires" in the meantime, say in an email. Yet a conventional "targeted" advertising approach would likely serve that user tire-related ads (wasting the user's time, and the advertiser's money) during those 3 years.

Once one or more profiles has been processed, the Mobi Platform 5014 makes one or more profiles available to select entities 5028 via a user profile broadcast 5027, hereafter "ComCloud" aka "commerce communications cloud." A user's ComCloud may be broadcast by a plurality of modalities including Bluetooth, WiFi, wireless carrier network, Internet, infrared (IrDA), and/or other available means. For example, a user walking downtown along the sidewalk FIG. 53, may choose to have Mobi broadcast the user's ComCloud 5303 (such a broadcast is referred to herein as a "CloudCast") via Bluetooth in such a manner that Mobi acts as a shield against information overload; a number of businesses 5307, 5308, 5309 along the user's path, may wish to send ads 5304, 5305, 5306 via WiFi to the user's mobile handset, however the Mobi Platform 5310 may block the undesired ads, and accept just those the user wishes.

In embodiments, the Mobi Platform matches the profiles of various entities 5028, against the user's profiles 5016, seeking matches for content (information/ads/et. al.) desired by the user against content available by the entity. Such entities may include, manufacturing entities 5029 (such as the manufacturer of Minute Maid orange juice), retail entities 5030 (such as grocery stores), advertising/marketing entities 5031 (such as ad buying agencies or market research firms), other users 5032 (who may, for example, share a similar profile), and/or other entities 5033 (who may, for example, share a similar profile).

In other embodiments, where entity profiles are not made directly available to the Mobi Platform, the Mobi Platform may search other sources such as existing online profiles, and perform profile matching against same.

Once one or more matches has been established, the Mobi Platform, as per the user's profile preferences, makes the user's profile available to the selected entity, for free or for a fee 5022 (which the user receives a portion of). Based upon the user's profile, the entity then decides whether or not to pay 5022 to send the user ads/offers/information/et. al. as per the user's preference profile. If the payment amount is non-zero, the user receives a portion of said monies.

Those skilled in the art may appreciate that entities already pay to get their ads/information/et. al. to users; they pay middlemen entities, which make guesses as to which users might be interested in that entity's ads. Middlemen currently peddle profiles based upon guesses (often obtained by spying on users' online activities), and those guess-based profiles are sufficiently valuable that ad-sending entities pay middlemen to acquire such guess-based profiles. With the Mobi Platform, guesses about what users want/need are replaced by facts, from users, who create, manage and monetize their own profiles—automatically via the Mobi Platform. With the Mobi Platform, ad-sending entities no longer need to guess which customers and potential customers to reach and how to reach them. And since customers and potential customers instead manifest their profiles directly, via the Mobi Platform, to such entities, middlemen may be disintermediated. Thus, in a logical value-for-value transaction, users may be paid for the inherent value of their profiles, which because they are based-upon actual products/services a user actually utilizes, are more accurate, and thus more valuable, than the guess-based profiles from middlemen common to the conventional art.

For example, the above orange juice user might (be paid to) receive an ad from Minute Maid, which thereby hopes to convince the user to stay loyal to Minute Maid. However, if the user sets their Mobi preferences 5018 to accept ads/offers/information/et. al. 5019 from competing entities, the user may be paid 5022 to receive an ad from a Minute Maid competitor, such as Florida's Best orange juice, which thereupon presents information in their ad endeavoring to cause the user to switch brands.

Figure 51:
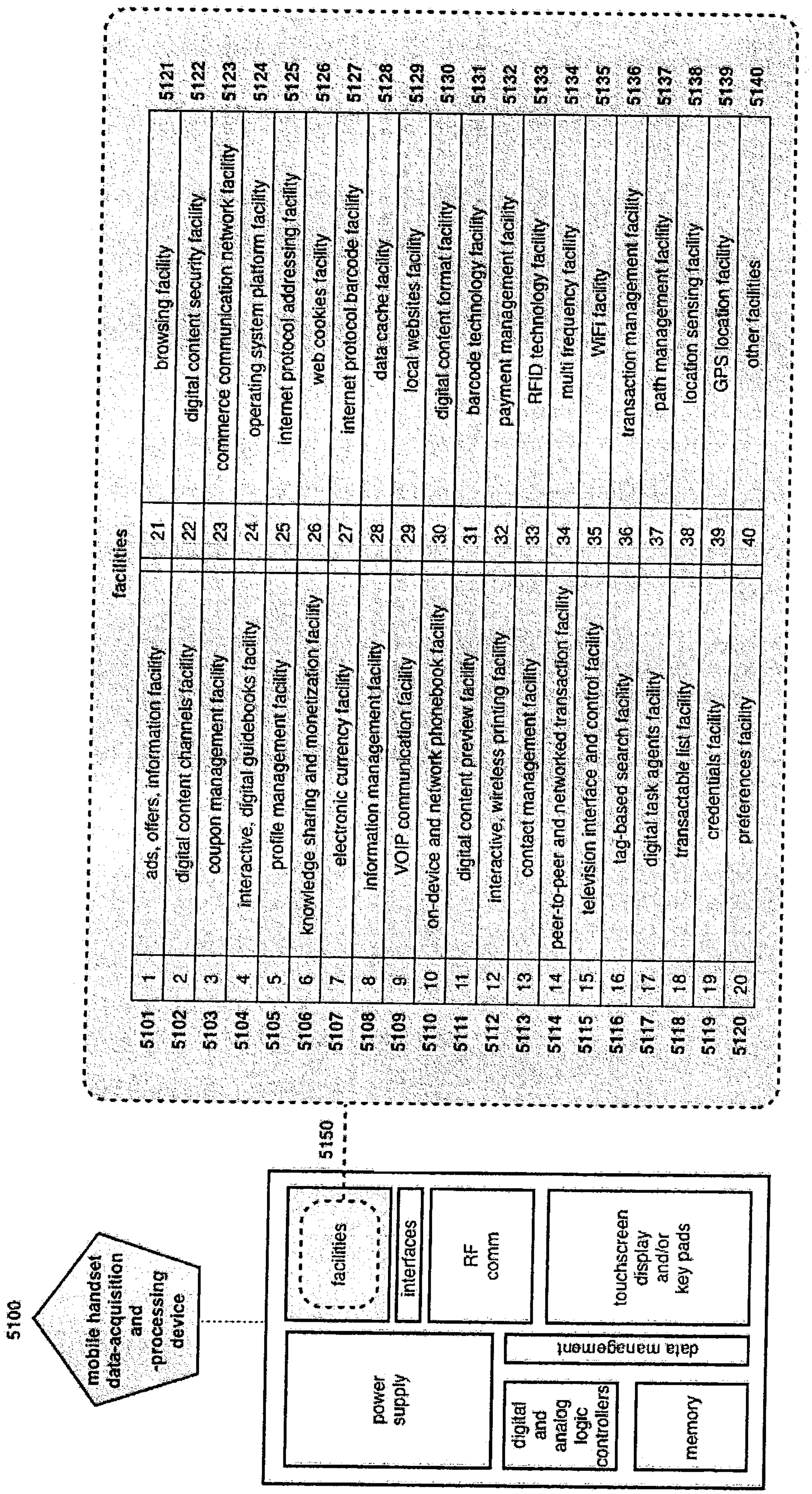
FIG. 51 is a functional block diagram illustrating an embodiment of an example of a simplified hardware for an embodiment of the present Invention (Mobi), and the functional facilities that inform one or more Mobi embodiments.

FIG. 51 is a simplified schematic for a Mobi device embodiment. Various embodiments differ in configuration, but generally, vis a vis hardware architecture, Mobi includes one or more processors and memories, as well as local and external interfaces. Each respective combination is arranged such that the processor is in communication with the memory via the local interface. The local interface may be, for example but not limited to, one or more buses or other wired or wireless connections, as is known in the art. The local interface may have additional elements, such as controllers, buffers (caches), drivers, repeaters, and receivers, to enable communications. Further the local interface may include address, control, power and/or data connections to enable appropriate communications among the aforementioned components.

The respective processors are hardware devices for executing software, particularly that stored in the associated memory devices. The processors may be any custom made or commercially available processor configured to execute software instructions.

The respective memories may include any one or a combination of volatile memory elements (e.g. random-access memory (RAM), such as dynamic random-access memory (DRAM), static random-access memory (SRAM), synchronous dynamic random-access memory (SDRAM), etc.) and nonvolatile memory elements (e.g. read-only memory (ROM), hard drive, etc.). Moreover, the respective memories may incorporate electronic, magnetic, optical, and/or other types of storage media. Each memory may have a distributed architecture, where various components are situated remote from one another, but still accessible via the associated processor.

One or more programs, each of which comprises an ordered listing of executable instructions for implementing logical functions may be store in respective memories. In addition each of the memories may include an operating system that essentially controls the execution of the illustrated functions and perhaps additional functions such as scheduling, input-output control, file and data management, memory management, communication control and related services.

When implemented as source programs, the programs are translated via a compiler, assembler, interpreter or the like, to operate properly in connection with the operating system. The external interfaces perform signal conditioning and data format conversions to enable communication through one or both of wired or wireless networks. Wired interfaces may be compatible with Ethernet standards and TCP/IP. Wireless interfaces may be compatible with one or more of the Infrared Data Association (IrDA) and the Institute of Electrical and Electronics Engineers (IEEE) 802 family of wireless data communications protocols. It should be understood that other data-network interfaces compatible with other communication standards and protocols may also be utilized.

Additional interfaces and mechanisms may be coupled to Mobi, including the various embodiments thereof, to configure the devices. These mechanisms may include browsers and/or other software (not shown, but well known in the art) configured to the expose configuration parameters, data tables and other information to external devices. Modules may include those configured for barcode scanning and/or RFID interrogation. Moreover, the local interface may be configured with one or more human-machine interfaces such as a keyboard, a display, a printer, etc. Such human-machine interfaces may include touch sensitive displays and/or the combination of a graphical-user interface and a controllable pointing device such as a trackball, trackpad or other thing to enable an operator to configure or otherwise modify Mobi, and the various embodiments thereof.

In an alternative embodiment, where one or more of instructions operable within Mobi are implemented in hardware, the instructions may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field-programmable gate array (FPGA), et. al.

Mobis' unique functionality and capabilities are enabled by a host of innovative facilities:

Facility 1

Ads, Offers, Information Facility

5101

In embodiments, a module that facilitates interactive, multimedia, customized, user-solicited ads (hereafter "Ad Widge") is provided. Ad Widge enables advertisers to better target ad recipients. Instead of users being bombarded with random ads, users, in embodiments, scan the barcodes/RFID of the items they use everyday to build a profile of items they could really use ads for. This profile indicates not only those items the user would like ads for, but also how, when and where. If a user scans a tennis racquet while at the sports store, the user may choose (to be paid) to receive tennis related or tennis racquet ads/offers/information. Ad Widge enables a number of innovative advertising modalities including: local advertising, location-based advertising, timely advertising, contextual ads, blended ads, interest category ads, behavioral ads models, affinity ad models, intramedia/intrastitial ads, self-aggregating group ads, real-time competitive ads, and more.

The purpose of Ad Widge is to reduce wasted advertising and marketing dollars. Consumers don't appreciate unwanted advertising (junk mail, irrelevant TV and radio commercials, etc.) And advertisers don't want to waste corporate resources sending ads to people who don't want them. The vast majority of conventional are advertising is unsolicited and irrelevant to the recipient. And conventional art "targeted advertising" is evermore intrusive. The current Web advertising model has many flaws, and one of those flaws is just how many entities there are between the Website and the user. Ad placement. Websites hire outside companies to place ads on their sites and choose the ads that will make the most money. Ad buyers. Ad placement companies contact ad networks (that buy the ads) and technology companies that help advertisers bid for them. Ad targeting companies. The ad buyers reach out to other companies to track or measure their ads or for access to ad-targeting data.

All these companies can potentially collect data about users by installing cookies on a computer without the Website knowing. Thus some Websites are upset that others are profiting by selling data about the site's users for ad-targeting purposes. And of course, the users, as per the conventional art, are getting paid nothing, despite the fact that it is the users' profile that all the others in this value chain are making money off of. Accordingly it's desirable for users to take control of, and profit from, their own profiles. And with Mobi, and its unique facilities, they do just that.

With Ad Widge, Websites interact directly with the user's ComCloud (Facility 23). Thereby companies can see whether a user wants an ad from that company without the scrum of middlemen making expensive guesses about a user's preferences. Instead, the user tells the company directly. Ad Widge's technology enables users to receive just those ads they want, and users get paid to do so.

Ad Widge delivers customized, profile-based ads. User profiles indicate not only those items the user would like to receive ads for, but also how, when and where the user would like to receive the information. Ad Widge is simple to use for product and service providers, as well. In embodiments, they just post all forms and variations of their advertising, and Ad Widge pulls the appropriate Tilz to each user. So for instance, Ad Widge can populate the ads the user sees when watching TV. Furthermore, if a users just purchased tires, then that user doesn't need to see tire ads for 50,000 miles or 5 years. Ad Widge consults the user's purchase profiles to intelligently deliver ads, whereas most conventional art ad targeting would just keep sending users tire ads every time, for instance, the user types the word "tires" in a search engine or email.

How, when and where a user might want to receive an ad could include: a text message on the user's mobile device, or a 3 minute ad on the user's TV between 6 PM and 8 PM, or a brochure mailed to the user's home. Ad Widge ads are delivered via Tilz (Facility 30), which are transactable objects, and therefore enables users to purchase directly from the ads, even offline ads. For offline ads, users scan the Net Dotz interne protocol IP barcodes (Facility 27), which, in embodiments, results in a Tilz being downloaded to the user's mobile device. The Tilz is a transactable object which enables the user to make purchases therefrom. The users Ad Widge profile includes user-selectable options, such as the ability for users to choose to allow ads from competing products. For example, if a user utilizes Tide detergent. The user has the Tide Tilz in their Ad Widge profile. If they allow competing products, such as in this case Cheer detergent, then Cheer detergent is allowed to pay the user to send ads. Competitors pay the user for the right to entice them to switch products.

Local advertising. As a user walks past a yogurt shop, the yogurt shop can entice the user with an offer if the user's profile is open to receiving such offers. Location-based advertising. Advertising that is limited, say, to within a few miles of a restaurant. The 6 PM service is not yet full, thus the restaurant will want to send out ads in a radius whereby users could get there in time for the 6 PM seating. Ad Widge's location-based advertising also determines if a user is traveling to another city and businesses in that city can pay the user to accept ads prior to (or upon) the user's arrival in that city. Timely advertising. TKTS ticket booth makes tickets available via mobile device starting 30 minutes before a show (TKTS discount booths offer tickets to Broadway and Off-Broadway musicals and play, at up to 50% off). For those with the TKTS widget, that widget can query the user's Ad Widge profile to detect interest in receiving certain promotions. And the user's Ad Widge profile can be informed by the user's calendar. Are they free this evening? Because a user's Ad Widge profile is on their mobile handset (Mobi), it can interact with the widgets in the background. Or even send Ad Widge profile elements (Tilz) to the TKTS main central server, to solicit discount tickets. Contextual ads. While watching sports, receive sports-related ads, but not for mortgage refinancing. Blended ads. Users into live music might allow an ad such as: Digital Arts College of San Francisco presents Expression Session featuring Silver Sun Pickups (band). Interest categories. Movie buffs could allow all movie trailers, or just for horror films, or just starring Halle Berry. Behavioral ad models. A user's Ad widge profile can allow ads based upon the behavior of others with similar profiles, who solicited certain ads. An example profile such as (attends sporting events, and wine tastings, and art galleries, married, car lover, age 25-40, etc.). Affinity ad models. A user's Ad Widge profile allows ads based upon the interests of others in the user's affinity group (women, men, college students, singles, soccer team, etc.). For example, other women (with similar profiles) wanted ads for these cosmetics or clothes, so this user might also. Intramedia or interstitial ads. Ads embedded within another show, movie, document (Tilz) or ads between segments of a show or between successive Tilz. Self-aggregating groups. Before all advertisers switch to one-to-one marketing, most will continue to want to market to larger groups of users. Users can choose to create or join groups of people with similar profiles. Ad Widge facilitates entente cordiale—the friendly agreement among such users to work together to maximize ad profile monetization. Ad Widge aggregates these groups and makes them available to advertisers using no-personally identifiable information about the users in the group. Users can join, or elect to allow themselves to be automatically added to various groups as they are created. Users get paid for the resultant ads. Users can also choose to be the curator or host of a group. They might try to create a very large group; or they might want to be very picky about who they let in to the groups to increase the attractiveness to advertisers (and thereby increase the payment per user). Third parties can also choose to curate or host various groups of profiles.

When users receive ads on their mobile device they can be viewed using several different information display and navigation facilities such as Spherez (multi-faceted spheres onto which Tilz are mapped). And if the user choses, when they receive an ad for Tide detergent, they can allow competitors to send an ad for a similar product. These competing ads appear clustered closely to the original Tide ad Tilz on the Spherez. Users can then click on the Tilz of the ad they wish to view and it will be delivered to the device of their choice: mobile device, TV computer, car radio, etc. Users get paid to receive competing ads. This is also why the Tilz construct is so important—its an object for advertisers to target. If a user who is in the market for tires, has been doing research on tires (various search Tilz are now on her Imminent Purchase Spherez), then she might get paid $5 or more by competing tire companies who can see the relevant data about this user as it pertains to her car (how many tires the user needs at this time, what size, what make/model/year of car, any modifications to the vehicle, etc.). Further, the user will then start to get paid to receive solicitations from local tire shops to sell or install the desired tires (say Bridgestone). And once the user has made an actual appointment as represented by an appointment Tilz that user might receive $10 or possibly $25 from competing tire companies to switch her upcoming order to their brand. It's the holy grail of advertising—a user who is literally in the act of making a purchase. How much a user continues to get paid depends upon that user's conversion rations. Conversion ratios are how often a user follows through on their purchase. Conversion ratios also matter via a vis the amount advertisers will pay that user.

Users can build an Ad Widge profile, by a plurality of means including scanning the barcode from their store receipts, to have those items (Tilz) added (if they so desire) to their Ad Widge profile. Ad Widge is also IP-RFID (Facility 33) compatible. Ad Widge's profile enables users to receive just those ads they want. And users get paid to receive each ad. The average supermarket in the United States carriers 45,000 items. The user doesn't want to walk into a supermarket and receive ads from all 45,000 items. An Ad Widge profile acts as a shield against information overload. For supermarkets equipped with RFID end caps, a user's CloudCast can indicate which items a user is open to receive ads for, and just those ad Tilz will be delivered via IP-RFID (in embodiments the user's mobile device interrogates the RFID tag on various product shelves, which returns the Tilz for that item).

As more and more Web properties continue their assault on user's privacy, more and more users will want to take control of their ad profile. And the diminishing value of the tsunami of ads flashed at users each day, cries out for fewer more relevant ads. Too many ads=too little impact. Quantity vs quality.

Conventional art advertising technology is outdated. There's the "spray and pray" method, wherein companies put their ads in front of thousands or millions of people, but its an outdated and spectacularly inefficient method that hopes for maybe a 0.1% response rate. There's minimal value to the hundreds of different ad impressions per day the average person is exposed to. And what value is there to increase that number? As more online entities ramp up their advertising, users are about to be drowned in ads. But people need fewer ads, more relevant ads. And even with fewer ads or ads targeted at smaller groups of users—even solo individuals—Ad Widge enables content owners to profitably make their content available. For example, Ad Widge changes the economics of re-runs. Not just relevant ads, but ads that people actually solicit, and ads for items the users indicated they are imminently purchasing in the next few days, are valuable, orders of magnitude more valuable, as compared to the "spray and pray" cost per thousand viewers. In some cases $5 or even $25 are paid for such ads to a single user, which changes the economics of reruns and enables content owners to monetize their vast libraries in a way that makes their library worth an order of magnitude more than per the conventional art advertising modalities. Attaching an ad paying more than the 10 cent cost to stream content to a user is profit to the content provider.

There are a plurality of ad platforms, trying to monetize digital content (and other things). However, only the Ad Widge ad platform makes pays the user (the ad recipient). Conventional art so-called "targeted advertising" assumes that all users are poised in the starting blocks every single second of the day, just waiting to hear a keyword, at which point they launch themselves into a store to purchase that keyword item. A completely absurd assumption that informs targeted advertising schemes, which pepper users with ads each time the user says a keyword, or types it in an email, or speaks it in a phone call, etc. Further, it leads to ridiculous ads that users don't want to receive.

Pop-in ads. Ads that pop into, say, the TV picture during the show or are sent to the user's mobile device instead. For example, if a user is watching a show where the cast members are in a beautiful hotel, and the user wants to find out more information about that hotel. The user, via Net Dotz, can request the Tilz for that hotel with the user's mobile handset (Mobi), and thereby receive a custom Tilz for that hotel (with information customized as per the profile of each viewer who receives the hotel Tilz). Users can click through the Tilz for a map that locates the hotel; to reviews from travel enthusiasts with profiles similar to the user's; discounts/offers/promotions for the hotel; automatic reminder whenever the user's mobile device (Mobi) is within, say, 50 miles of the hotel; or when the user's travel itinerary indicates the user will be within 50 miles of the hotel. Pop-in ads appear as per the user's Ad Widge profile. So for instance, for a user who is watching a TV show, pop-in ads could contain information about things such as the couch the cast are sitting on, or the restaurant they're eating in, or the wine they just ordered, or the clothes they are wearing, etc. etc. The ads are send to the user's mobile device (Mobi) during the show and thus won't interfere with the viewing experience of others in the room. And the user gets paid to receive these ads. The user can keep the ad on their mobile device (Mobi) and it will be updated with the latest information on the hotel (room or spa pricing and specials, events held there, etc.); updated whenever the user's mobile device (Mobi) is connected to the Internet, or, and this is a unique Mobi feature, when it finds a more updated Tilz for that hotel on another person's digital device, which can then automatically update the user's Tilz via, say, Bluetooth.

Product endorsements. Athletes (or other endorsing persons) often take the highest dollar offer amongst competing endorsement deals. Product endorsements, via Ad Widge, can be more closely tied to results. For example, athletes can be paid $1 for each athlete Product Profile Tilz requested, and $4 for each product purchased (via that Tilz). If a customer returns the product, then the $4 sales commission is clawed back. For instance, a user sees a commercial on TV for Air Jordan sneakers. That user then requests the Tilz for Air Jordans. And how long that Tilz is kept on the user's mobile device (Mobi) and how many times they view that Tilz determines whether the athlete receive the full $1 product information commission, or just a fraction of that amount. Ad Widge creates a method to tie the effectiveness of a marketing campaign to actual user interest and actual user purchases.

Ad Widge provides a unique solution to the problem of unwanted advertising. Not only does Ad Widge save advertisers money, but also saves users money by paying them to receive ads. Furthermore, Ad Widge enables realtime competitive ads. Instead of spraying out ads and hoping a few people respond, advertising via Ad Widge, can be directed to users who are in the act of making a purchase (or have a profile indicating a future purchase). Advertising via Ad Widge can now be tied and tracked according to a user's expressed interests and purchase history, automatically. Users simply go about their life and Ad Widge automatically builds their profile, then helps the user monetize their profile. With Ad Widge users are the ones in charge of and being paid for the users' profiles.

Facility 2

Digital Content Channels Facility

5102

In embodiments, a module that facilitates customizable, portable, auto-syncing, interactive digital-content channels (hereafter "Channel Tilz" is provided. Channel Tilz are the next evolution of a TV channel. Portable digital-content channels, which also, or even exclusively, live on the user's digital devices of choice, not just on the TV set. The old definition of a TV channel is outmoded; particularly in light of the increasing number of mobile and digital devices available. Users need a new type of channel that includes all sorts of content, online and offline, centered around a particular topic, and customized by affinity group, as per each user's profile. Today, channels live in the cloud. And are streamed to a user's TV at, say, 8 PM on CBS, whereupon the user can watch Survivor. With Channel Tilz, the channels live, not in the cloud, but on user's devices.

The user sets aside a certain amount of storage on each device, such as their TV DVR, and their PC, and their mobile handset. This is what is meant by a portable digital content channel.

Channel Tilz are also a way of collecting all the newly available ways of communicating (instant message, email, videos, social networking) and legacy ways of communicating (postal mail, radio and TV) into a single, cool, easy to use, format each channel centered around a particular concept. So all the messages, email, videos, etc. that a user receives, related, for instance, to soccer all appear in a super cool, brand new interactive way, on the soccer Channel Tilz.

Customizable (G-rated or R-rated version for individual users), Portable (can be viewed on any digital device: mobile device, PC, gaming rig, TV, etc.), Auto-Syncing (if Channel Tilz is on a device that currently lacks an Internet connection, syncs during next connection or update—including via WiFi, Bluetooth, etc.), Interactive (users can interact in realtime, and users can rate shows as they watch them—better than Nielsen ratings). Nielsen ratings rely on user memories, as opposed to Channel Tilz which can record actual usage automatically. Also the concept of ratings can expand to include how much a user enjoyed the show (not just how many people watched it), and how many products were purchased via ads, or in-show Net Dotz.

Today's TV channel. A TV channel is currently a slice of airwaves that the channel owner, say CBS, pays broadcasters to broadcast as a one-size-fits-all, segment by 30 minute segment, consecutive set of fixed programs. Each show is the same for all viewers. All viewers have to watch the show at the same time, as per the broadcast schedule. Whereas Channel Tilz, are a channel, that exist whenever and wherever a user chooses to sample from it. All shows are made available as individual Tilz (interactive digital data "tiles" or "Tilz" Facility 30) that a viewer can watch whenever they want, on any device they want.

Customized content: each show can be customized for the individual user, as per the user's profile; Spanish language, or with pop-in director and cast notes, etc.

Device customized: Tilz deliver the content formatted for the mobile handset, PC, TV, etc. as per the user's profile, and the device profile (high definition or surround sound, etc.).

Customized ads: ads are customized according to the user's (Ad Widge) profile.

No "broadcast rights" fees. Some content will be made available ala carte. Channel owners don't necessarily have to pay "broadcast rights" fees to companies such as Comcast or DirecTV. Channel owners become their own "broadcasters," as their content lives on their servers. For example, in the future, CBS could choose to deliver some or all of their content directly to users bypassing broadcasters such as Comcast or DirecTV. The user's search engine seeks and downloads to their DVR, and/or PC and/or mobile device, etc. only those shows the viewer wants to see. The user doesn't have to watch the other 80% of CBS show offerings that don't interest that particular user.

All Tilz are transactable. Users get paid to receive ads, and can get information about items seen on a show, and even make item purchases from Tilz.

Individuals or companies create channels around a theme or product or subject. User-created content or user-assembled content. With Channel Tilz programming directors for networks may be replaced by individuals who act as "programming directors" assembling content from all available sources (TV, Web, private collections, their own produced content, etc.) and put together a channel which others can subscribe to. Multiple media types—channels can be videos, pictures, music, articles or any other type of digital and non-digital content. For example, a Channel Tilz about "cats" can, if the user's profile allows, alert the user to discounts or coupons on their brand of cat food when they are nearing a store (for which purchase the channel creator may receive a commission). Thus with Channel Tilz "channels" live in the real world, and move about with the user.

For example, the Coca Cola channel: Coke TV commercials, Coke radio commercials, Events that Coca Cola sponsors, Pictures of people enjoying a Coca Cola beverage, New promotions about Coca Cola, (can include) User-supplied Coca Cola related content. Interested parties subscribe to the Coca Cola channel. Similarly the Porsche channel: for lovers of all things Porsche. Video, magazine articles, TV news clips, movies, etc. Channel Tilz can be created by corporations or other entities, such as government bodies, sports teams, clubs, individuals, etc.

In embodiments Channel Tilz are Tilz that receive content from a specific source, Including television channels. But any person can own a Channel Tilz and "broadcast" it to anyone who wishes to view it. Marketers can use Channel Tilz to best reach their desired audience (channel marketing). So if there is a Channel Tilz for soccer or casts, then advertisers already have a self-selected audience with a specific focused interest. Making it easier to target marketing campaigns for related products and services.

Independent movie and TV producers Channel Tilz. If a movie maker's film isn't being distributed by a major house such as 20th Century Fox, their content can be found just as easily on the Independent Channel Tilz. Friend and family Channel Tilz: a new way to interact beyond current two dimensional social networks. Instead of people going to Tom's blog, or social network site, they simply click on Tom's Channel Tilz, to see what's "on." Just as Myspace presented ways to share information that were similar to what they replaced (blogs and personal Websites), Channel Tilz present the next level of social profile presentation.

Trade show booth alternative. The Trade Show Channel Tilz. A lot of trade shows present valuable information a user would like to have. With the Trade Show Channel Tilz users could afford to "attend" far more trade shows by simply subscribing to the Trade Show Channel Tilz. It's too expensive for companies/others to exhibit at all the trade shows in the world. Exhibiting companies can't afford the time and money to attend all of them, but could put together a virtual booth on a particular trade show Channel Tilz. There could be an overarching trade show channel, which contains all the sub-channels for individual trade show types (semiconductors, software, dentistry, etc.). But with Channel Tilz, go beyond today's "channel." Think Second Life for trade shows. These Channel Tilz channel are not limited by conventional art channels. Channel Tilz provide an environment where interested users' avatars walk around to various booths at the virtual trade show, and interact live with personnel from that exhibiting company. Trade shows, via Channel Tilz, take place in the virtual world. Attendees still gather in one spot, but online.

A Channel Tilz for videogames; an E3 Channel Tilz (Electronic Entertainment Expo) which virtualizes this offline expo for videogame producers. A Comic-Con (comic book convention) Channel Tilz. Comic-Con has their own channel, not just one profile among millions on a social networking site. Comic-Con keeps its own advertising ad revenue, not just letting the social network profit off their profile. Furthermore, users then have a source, the Comic-Con Channel Tilz, to follow comic book related information all year round, as well as make transactions. Users can get their own shows on Comic-Con sub-channels, as a way of reaching out to other comic book enthusiasts.

Companies can create Channel Tilz for their product or service. Free take-home for trade show attendees. In embodiments People who still physically attend real world trade shows get a subscription to the Trade Show Channel Tilz, which contains all the content for that trade show. For those that did not physically attend the conference, organizers can charge a fee to get a subscription to the Trade Show Channel Tilz. Split fee revenue with trade show sponsors for subscribed Tilz.

Critic's choice Channel Tilz. Individuals take over the task of searching out interesting digital content, and offline content, to feed to a particular Channel Tilz to which others subscribe, with our without a fee. Search engines can locate not only the Channel Tilz themselves, but also individual shows and even program segments via tags supplied by producers and viewers.

Digital radio/TV Channel Tilz. For instance, each Sirius radio show can be made available on individual Tilz that subscribers can order into playlists and listen to as they wish. That is to say, Sirius radio is currently presented in a two-dimensional format. A grid of hundreds of channels, each presenting content in roughly one hour segmented blocks. With a Sirius Channel Tilz every one hour block, for example, on every channel, would be in its own Tilz. Users could then pull just those Tilz they want to listen to, in whatever order they wish, at whatever time of day they wish. Sirius already has the content, and as long as they are receiving their monthly subscription fees, they can offer greater flexibility to users, ensuring the best user experience possible.

Other uses for Channel Tilz include modeling agencies (all their models, with bio, pics, videos, look book, etc.) or a designer's portfolio (all products, photos, videos from shows, etc.) presented in a Channel Tilz. Clothing and product, designers look book, presented in the exciting new Channel Tilz format. Click on any dress, for example, to be taken to more clothes by that designer. Click on an individual model to see more work by that model. See entire product portfolios, presented in a new way. Channel Tilz are far more aligned with new devices such as smartphones, than current conventional art modalities. The potential use cases for Channel Tilz go on and on. Dynamic catalogs that are interactive, customized and fully transactable. And which items are displayed, and how displayed, varies by viewer, according to each user's profile.

Users get paid, to receive ads, offers, and coupons related to the content in each Channel Tilz they subscribe to. And competitive channels can pay to be on a user's Spherez (a Mobi information navigation facility that maps content bundled into tiles on the surface facets of a sphere) or for priority placement thereon. Some Channel Tilz will pay users to subscribe to that Channel Tilz, which in some cases may be akin to one continuous ad about that topic/product.

Distribute content on a Channel Tilz. Once a user has the content they can make it available on a subscription or pay-per-view basis. Reviewing and critiquing content: sell reviews or run ads next to the reviews and critiques. Aggregating content: pull together a beautifully curated collection of content on a particular subject; such as butterfly collecting. And in addition to pictures and videos and maps showing migration routes there are also the location of physical butterfly collections that users can visit. So let's say that years after the user subscribes to the Butterfly Collection Channel Tilz, they travel to Paris. In Paris, the user might think about going to the Louvre, but not know that there is a small museum nearby, where there is an impressive butterfly collection on display. The user's Channel Tilz alerts the user to this butterfly collection at this real world location. Editing content: edit out the boring bits. Such as baseball game summaries in 20 minutes, showing all the pitches and hits.

Avid watchers pull best-of content into a single Channel Tilz. Vertical Channel Tilz: Will Smith (TV, movies, music, home videos, etc.). All things Will Smith. Or, perhaps, a vertical Channel Tilz about architecture. Horizontal: Italy (travel deals, hotels, videos/pictures taken there, etc.). The Italy Channel Tilz could include: people, places, and things that relate to Italy, including its history, and the architecture of Italy. Channel Tilz are a more sophisticated way to reach customers than, say, Nordstrom's texting, regarding such things as discounted merchandise. Via Channel Tilz companies can run full videos, articles, comparative ads, coupons, etc. New devices such as the smartphone and mobile DVRs (Mobi Homi), engender new modalities such as Channel Tilz.

And Channel Tilz are a new way to feature content, and cause individuals (and other entities) to interact around that content. Not only are there opportunities to meet and interact with other users via Second Life-like channels, but also in the real world a user's profile broadcast ("CloudCast") can indicate which Channel Tilz they are subscribed to, such that strangers on the street might stop to take to each other, if they were both subscribers to the "Tibetan Terrier" Channel Tilz. And individuals can create Channel Tilz for themselves, as an alternative to the conventional art social networking Website profile. Want to find out what Bob's up to? Grab Bob's Channel Tilz to see what's "on"—the theater of one's life.

And Channel Tilz extend to the real world in other ways as well: if a user subscribes to a company's Channel Tilz, as that user moves about in the real world, the user can receive messages with in-situ examples of how that company's product or service would be useful. If a user subscribes, for instance, to the Nike Channel Tilz, then as the user were beginning a hike on a trail then the Nike Channel Tilz could let the user know about new lightweight hiking shoes available at a nearby shoe store (which could be made know by the Survey Egg (Facility 39) or Gotz Dotz (Facility 37) CloudCast (Facility 23) at the trailhead). If a users subscribes to the Restaurant Aficionados Channel Tilz, then when they are near a recommended restaurant their Channel Tilz widget will let them know they are close by and ask if they would like to make a reservation. Or let the user know about a cookbook by a recommended restaurant chef on that Channel Tilz, when that user is in a bookstore.

Channel Tilz are truly the next evolution of a channel. They are portable and interactive. The user carries Channel Tilz around as they move about in the real world. And Channel Tilz alert the user to items or offers (or other things) related to that Channel. No such other conventional art channels have this capability. Channel Tilz interact with offline items, and also revolutionize social networking, search, marketing, and merchandising.

Facility 3

Coupon Management Facility

5103

In embodiments, a module that facilitates interactive, multimedia, customized, user-solicited coupons (hereafter "Coupon Widge") is provided. Coupon Widge enables advertisers to better target interested coupon recipients. Instead of users being bombarded with random coupons, users, in embodiments, scan the barcodes/RFID of the items they use everyday to build a profile of items they could really use coupons for. This profile indicates not only those items the user would like coupons for, but also how, when and where. Coupon Widge enables a number of innovative advertising modalities including: local advertising, location-based advertising, timely advertising, contextual coupons, blended coupons, interest category coupons, behavioral coupons models, affinity coupon models, intramedia/intrastitial coupons, self-aggregating group coupons, realtime competitive coupons, and more.

With almost a trillion paper coupons delivered each year, and virtually all of no interest to users, why not deliver just those coupons that each user actually wants and needs? The cost to coupon issuers is 1 cent to 5 cents each to author, design, print, ship, handle and redeem. 99% of the more than 10 billion dollars spent each year by paper coupon issuers is wasted. Accordingly an improved method for delivering and utilizing coupons is desirable. Coupon Widge delivers solutions for both paper and electronic coupons. With Coupon Widge paper coupons' barcodes can be scanned thus enabling the user to automatically receive that coupon's discount at checkout, especially when paying via mobile device (Mobi). Users can also scan items while shopping in a store, and if their Coupon Widge profile allows, receive instant electronic coupons for those products or even competing products. Coupon Widge was informed by the transition to the new computing platform, the mobile device (Mobi). Mobile device penetration is much higher than digital TV or hardline Internet, so Coupon Widge is especially desirable for emerging markets such as India. Coupon Widge enables a two-way ongoing communication and relationship between coupon issuer and user.

When Coupon Widge was invented in 2002, mobile, location-based digital couponing was unheard of. Conventional art couponing solutions are mainly focused on the coupon sender rather than the coupon receiver. Users don't want every possible coupon available, they want only those offers as per their profile. In embodiments, user-solicited coupons appear on the user's handset (Mobi) from places the user wants discounts from. In embodiments, a user's Coupon Widge profile is continuously CloudCast (Facility 23), blocking unwanted coupons and getting paid to accept desired coupons. Rebates, are an ex post facto form of a coupon, and thus are tracked and delivered via Coupon Widge. And Coupon Widge does the work of tracking those rebates that often take many weeks to arrive. In embodiments, coupons are electronically delivered to users as per their Coupon Widge profile, thus reducing the unnecessary expense of the billion of coupons printed in newspapers, and Value Packs, and at stores, etc.

With Coupon Widge coupons can be multimedia, such as animated characters, or even favorite cartoon or movie characters. Coupons can speak their message: "Today we're featuring 50 cents off Alpo dog food" and can be in the licensed voice of a, say, a move star. No longer are coupons just a boring slip of paper with a barcode on it.

Users create a profile of coupons they are willing to receive, primarily through barcode/RFID scanning from products they utilize. Alternatively users can indicate they are willing to let any entity send a coupon—on any subject—if the sender pays the user (a minimum price set by the user). Each user can set their own prices to receive coupons. Users also decide if they want to get paid by advertisers or market research firms (or other entities) to view the user's Coupon Widge profile. Cumulative totals and/or frequency of various items purchased is valuable information that the user's profile contains. And beyond just frequency information, there is specific purchase information. For example, a user's profile might indicate a user purchased grated Parmesan cheese 18 times in the past year. But beyond that is much more granular information such as: What sizes of bags (8 ounce or jumbo 32 ounce)? Which brands? Re-sealable pouches or vacuum packed bags? Which stores were they purchased at? What payment modalities were utilized? et. al. The user gets paid by market research companies and manufacturers (and other entities) to view the user's Coupon Widge profile which contains such valuable detailed information.

Local coupons. Coupons delivered, say, as a user walks past a yogurt shop. Coupon Widge has the technologies to automatically deliver, from the yogurt shop's owner's mobile handset (Mobi), coupons to passersby whose profiles indicate a desire for yogurt coupons or who would otherwise be a good candidate to receive a yogurt coupon. Location-based coupons. Sent to users within a few miles of a restaurant, and thus have time to make it to the 6 PM dinner service. Instead of bombarding users with coupons as they near various restaurants, users solicit, via their ComCloud (Facility 23) only That restaurants, or only restaurants under $25/person. Timely coupons. TKTS ticket booth makes tickets available via mobile devices (Mobis) starting 30 minutes before a show. Captive coupons. Screens such as those in an elevator or at a gas pump, can deliver coupons, via Coupon Widge, even via Bluetooth, to devices that lack wireless carrier network service. Coupons thusly delivered can be for gasoline when at the gas station, or products in the mini market at the gas station, or coupons for the carwash attached to the gas station, as well as coupons for businesses near that gas station; but in all cases in accordance with the user's profile. In emerging-market countries with limited Internet access, providing a place where users update their Tilz at a captive location (which might be one of the few places in town which has Internet access) might be crucial. Corporate uses. Corporations can make available branded elements that user's post on their profile Tilz, or other Tilz, in exchange for coupons for items the user is interested in. Very cool templates that user can get but instead of paying for them, the sponsor covers the cost, in exchange for that profile Tilz element proclaiming, for example, "Built Ford Tough." Advertisers create custom coupons. A tire coupon that appeals to men, another version that appeals to women, another version that appeals to teenagers, etc. Also different coupon formats for: junk mail, digital radio, digital TV, Website banners, mobile devices vs PCs, etc. etc. Missed demand coupons. For example, a user walks into a store and sees that there are no 2-liter Cokes left on the shelf. This user would have bought 4 bottles. Instead of a simple, but hassle to get rain check, Coupon Widge notifies the store and the manufacturer exactly how many additional units users indicated they would have purchased. This "missed demand" data is valuable information that the store may give the user a coupon for, and the manufacturer may pay users for indicating would-be purchase data. Not only that, but stores and manufacturers get this data in realtime. Analytics they've never had available before. Sponsored coupons. Instead of ads that appear during a TV show, relevant coupons can be delivered to all viewers who view the entire episode. This is a new way to monetize content. And viewers could receive coupons to watch a show delivered on a Tilz, then pass the Tilz along to another user. Related offer coupons. Buy a pair of shoes, and get paid to receive a socks coupon. Competition coupons. While buying Tide detergent, in realtime, in the store, standing at the user's cart, get paid to allow Cheer detergent to send a competition coupon. Coupons can become ads. When a user receives a competition coupon, they might want to know why Cheer is better than Tide. To turn the coupon into an ad the user simply taps on the coupon to get the Cheer ad Tilz. The ad Tilz that the user receives will be in accordance with the user's Web Pref (Facility 20) and Ad Widge (Facility 1) profiles. The ad Tilz might be a 10-second video the user watches ala minute (right then) on their mobile device or the user might choose to receive more detailed ads via the car radio on their drive home from the store or even during their TV viewing that evening. RFI coupons. Request for Information coupons. See something on TV, (for example, the user likes the shirt that TV actor was wearing) want more information, get a coupon for $5 off that shirt from Macy's. Information sought via an RFI coupon may come from unconventional sources, such as via Hosted Everything (Facility 6) where information may come from a passionate expert about that item. Reverse coupons. As Coupon Widge forms groups of users who are about to make a certain purchase, in a certain geographic area (say those imminently ready to buy 4 tires, or even just a bag of charcoal for their weekend BBQs), Coupon Widge via digital task agents (Victors Botz Facility 17) solicit companies who wish to offer the best fulfillment of this need. Reverse coupons are for those advertisers which may prefer to deal with groups of users, rather than one-to-one marketing, and one-to-one coupons.

Contextual coupons. Watching sports, receive sports-related coupons, but not for mortgage refinancing costs coupons. Blended coupons. Users into live music might allow: Digital Arts College of San Francisco presents Expression Session featuring Silver Sun Pickups (band) event coupons. Interest categories. Movie buffs could allow coupons for all movie theaters, or just for individual horror films, or just films starring Halle Berry. Behavioral coupons. Allow coupons based upon the behavior of similar others (attends sporting events, married, car lover, age 25-40, etc.). Affinity coupons. Allow coupons based upon the interests of others in the user's affinity group (women, men, college students, singles, soccer team, etc.). Intramedia or intrastitial coupons. Coupons embedded within another show, movie, document (Tilz) or coupons offered in the gap of time between various shows. Branded coupons. Companies can offer to sponsor coupons, discounts, and offers made to customers. For instance, a hotel and an airline can team up to make joint travel offers. So if a user flies Virgin Atlantic, the user could get a 10% coupon from any downtown London Marriott hotel. Additionally conventional art payment processing and credit card companies such as Visa, MasterCard and AMEX could choose to issue branded coupons via Coupon Widge. A Visa "40 cents off Cheer" coupon can be thought of as the first 40 cents toward a transaction that Visa might be processing anyway. Smart back-of-the-register-receipt coupons. A user's coupon profile CloudCasts to the point of sale (POS) receipt printer, which coupons the user would like to receive. For example if a user just moved to a new town, that user might need a new place to get a haircut, therefore when shopping, his register receipt may print barbershop coupons, instead of random dog food coupons. Piggyback coupons. One user can piggyback on another user's coupons. If the originating user's profile allow this, then the originating user gets paid. For example, user #1 in a store scores a great coupon. User #2 who's also in that store wants to take advantage as well. User #2 pays an instantaneous iDough (Facility 7) fee to the originating user #1, and thereby user #2 receives the same coupon or deal. Product or service companies may even get paid. For example, user #1 scores a BOGO (Buy One Get One free) coupon for detergent. User #2 sees that this is a better coupon for detergent than user #2 already had. How? User #2 has detergent listed in their Coupon Widge profile. User #2 might have only had a 75 cents off coupon, but BOGO is better. However, user #2 has to pay user #1, and possibly even the detergent company, say 10 cents each, to get this deal. Thereby the detergent company, via Coupon Widge, has customers evangelizing on their behalf, and is getting paid. This can be accomplished anonymously: for example, a user receives the following instant message on their phone: "A better coupon deal for detergent has been found by another user in this store. Would you like to pay 20 cents to receive a BOGO coupon for Tide?" This is a truly interactive coupon, which actually engages a customer in realtime, and gets them emotionally (and financially) involved in a company's product transaction. And neither party #1 nor party #2 receive any additional monies, unless they both purchase Tide. Thus users who do a lot of research and find a great deal can, via Coupon Widge, be compensated for their efforts (if the product or service provider allows piggybacking by selling such a deal to others). Piggyback profiles. Originating user #1 whose carefully honed profile is now producing a lot of income or deals for that user, can sell portions of their profile to other users. Other users' profiles get upgraded temporarily to the status of user #1. If the other users use the couponed products with sufficient frequency (i.e. increases their conversion ratio sufficiently), they will get to keep their upgraded profile. Profiles=currency. Other users can pay the originating user to allow them to piggyback on the originating user's great coupon profile. And its a win/win/win situation. The product manufacturer now has their own customer base evangelizing their product. More users are getting better deals on that product (and thus are more loyal). And the merchants are seeing increased unit sales. Coupon Widge can be introduced to businesses by users' ComClouds indicating they are utilizing Coupon Widge—and thereby can act as a salesforce for Coupon Widge.

Coupon Widge provides a revolutionary solution to the problem of unwanted coupons. Not only does Coupon Widge save advertisers money, but also save users money by paying them to receive coupons. Coupons can now be tied to a user's expressed interests and purchase history, automatically. Coupon Widge advances the concept of a coupon in literally dozens of ways, that will truly revolutionize merchandising. Accompanying the ushering in of the mobile device (Mobi) as the next computing platform, users will thereby be able to take charge of their own profiles. Thus in addition to having an ad profile, they'll also have a coupon profile, so they can be shielded from and otherwise manage the blizzard of ads and offers and Coupon Widge will become an integral part of the user's life flow.

Facility 4

Interactive Digital Guidebooks Facility

5104

In embodiments, a module that facilitates interactive, digital guidebooks (hereafter "Dotz Guides") is provided. Dotz Guides are interactive, digital guidebooks. A user utilizes their mobile (or other) device to scan the barcode/RFID of an item, or queries the CloudCast (Facility 23) of an item, to get more information about that item. Dotz Guides replace analog, printed materials with digital, personalized Tilz (interactive digital data "tiles" Facility 30). If user needs the manual for a product they are using, they simply scan, for instance, the barcode for the item to receive a product manual Tilz. A user standing next to a little church in Europe can find out more about that church by scanning the digital Internet protocol IP barcode (hereafter "Net Dotz" Facility 27) at the entrance to receive a Tilz about that church.

Dotz Guides are customized and personalized. Whether the Tilz is for a product manual or is a travel guide to a foreign country, user #1's Tilz will be different from user #2's Tilz, as per each user's profile. For example, presenting information in a user's native language, or a version of the guide in accordance with a user's affinity profile. For example Dotz Guides guidebooks for a given European church: architectural focus, human rights focus, history focus, kids-level information, etc.

Consumers. If a user writes a "mini-guide" or "Cliff Notes" version, say, of a classroom textbook, that user might make other users aware of their guide, simply by having users scan the Net Dotz on the textbook. This could be an additional source of income for both the textbook author and publisher, as well as the user who created the "Cliff Notes" version.

Tour Sites. Anyone can create a guide to, say, a European castle. Then, as tourists come to the castle and scan the Net Dotz on the castle they can choose from any of the available guidebooks. And becomes and income source for both the castle owner as well as the guidebook author. And for a historic church, the user can scan the Net Dotz at the doorway to receive the list of available Dotz Guides: a church history article; an audio/video history of the church; a guided tour of the church, including directions to specific locations within the church or its grounds that are of particular interest. Some guidebooks may be free while others are available for a fee, and wherefrom the church makes a commission on all sales. Even devices that lack global positioning satellite (GPS)-functionality can guide users to specific locations in/near the church via the use of Survey Eggs (Facility 39) or Survey Nuts (Facility 38). And users can access Dotz Guides without wireless carrier service, via Bluetooth, WiFi, or other means.

How-To Dotz Guides. When a user figures out, say, how to solve a tough knitting problem they can post that solution on the Net Dotz (the barcode) for that type of yarn. Other users don't have to log onto one of thousands of knitting-related Websites and post their solution there, hoping that other users also happen to log onto that same Website. With Dotz Guides the user posts the solution on the Net Dotz (the barcode) actually on the item. Thus every user can instantly find and access that solution.

How-to guides/manuals examples include: How to fill out a form (and the information is retrieved by the user directly by scanning the form's Net Dotz); How to do some task, such as change a car tire (the Dotz Guide is in a convenient location such as a Net Dotz on the car jack. The user can also CloudCast offers for help changing the tire so that a nearby tow truck might provide that service. All this available from the Dotz Guide, which is a transactable Tilz; How to attend the book author's next live lecture (simply scan the book's Net Dotz); How to let the manufacturer know an item is mislabeled (a can of tuna pink-labeled as "No Salt Added" was actually "Salt Added" tuna—and therefore should have had a green label. The user can simply scan the Net Dotz on the tuna can, and the Dotz Guide Tilz provides an instant connection to the manufacturer and the store to let them know about the mislabeling. The user gets paid for providing this information. And the manufacturer or store can make an instantaneous change to the IP-based RFID (Facility 33) label for that product as well as offer discounted pricing on these mislabeled items (and warn low sodium dieters); How to find the closest beer vendor to your seat at the stadium (just scan the seat-back and the user will be Dotz Guided to the closest source of suds (and now the user has an on-device guide to all the other concession stands, as well as the location of the bathrooms, security office, medical personnel, exits, lost & found, etc.).

Commercial applications for Dotz Guides abound, such as for product manuals. Product manuals are often hard to understand and frequently lost after users get the item home. With Dotz Guides, simply scan the product's Net Dotz, and the product manual Tilz is sent to the user's mobile (or other) device. Businesses can save money by not shipping product manuals, instead enabling customers to download the product manual Tilz whenever they need it, right when they are using the product, by scanning that product's Net Dotz (barcode). Furthermore, Dotz Guides manual have features not found in printed product manuals: 1) Wild additions to the manual by other users (some of whom may write far more effectively than the company's in-house manual writers); 2) some users act as super-users to answer questions for free or for a fee (split income with the item manufacturer and Net Dotz)); and, among other features, 3) Chat features and blog forums, about product installation, setup and user enables users to share tips and tricks.

Myriad other uses for Dotz Guides include personalized medicine instructions via barcodes on medicine bottles (users can scan their prescription medicine bottle Net Dotz and receive a Tilz with personalized instructions for usage, based upon consideration of interactions with other drugs or medicines or alcohol that user is taking. And customized as per the user's Medical CloudCast (Facility 23) profile which contains that user's Prescription Drugs VictorsList (Facility 18).

Other business uses include employee training. Dotz Guides can considerably reduce employee training costs. For example, teaching how a particular bolt secures a window frame to the high rise, via Net Dotz on the window frame or box of bolts, which when scanned returns a Tilz which provides on the job, in-situ, per task, on-demand training videos, and text and spoken guidance. All achieved simply by scanning the actual object or machine or device that the employee is trying to learn how to utilize. Train employees on new equipment by scanning the actual object or machine or device that the employee is trying to learn how to utilize/operate; recipes on food packages (via Net Dotz that deliver customized different Tilz depending upon the profile of the person scanning the food package. This creates untold new revenue opportunities: manufacturers can supply free or for-fee recipes (via scanning barcode/RFID) on their package labels.

Manufacturers can also make extra money by getting paid to allow other chefs or restaurants to bid to put their recipe on that food package, that week. Furthermore, manufacturers can present customized information as per each user's profile. For example, when a user scans the Net Dotz on a can of diced tomatoes: one user might bet the beef wellington recipe, while another might get a beanie weenie recipe. Public transportation guidance assistance (go down into a subway, go the route map on the wall, scan the user's current location station, scan the destination point, receive a Tilz which details which trains to catch, at which platforms, where to transfer, which way to walk after exiting the tube station, etc. all sent to the user's mobile device). Travel guidebooks (travel guidebooks have a Net Dotz next to each tourist attraction listed. Scan the Net Dotz of that item, scan the Net Dotz plaque in the user's hotel (or hotel room) and an itinerary is instantly created complete with which buses, taxis, or subways the traveler needs to take to each site they want to visit. And it's all in the user's native language and the user gets paid to allow transportation companies to bid in realtime on this newly created itinerary. In embodiments Dotz Guides include a virtual concierge. The virtual concierge can be white labeled to or from third parties (such as the hotel, which may thereby earn the hotel commissions on the itinerary created, for example.). Such a virtual concierge service can save a hotel the cost of having a live concierge on staff, and amazingly can turn the concierge function into an income center via commissions for various recommendations by the virtual concierge.

Live Guides: connect with others who happen to be using the same product at the same time, and ask how-to user questions, such as "How do I mount my new mini-vacuum on the wall? The directions in the printed manual were totally unclear." Users can also find answers to past queries (ala FAQs) that the product company (or super-users) can curate—extending and expanding the definition and the usability of a product guide.

Dotz Guides on restaurant menus. Users scan the Net Dotz on the menu with a mobile device. The user's Web Preferences profile directs the user to/avoid specific menu items, and recalls past items the user ordered at that/similar restaurant(s). Enables user to rate each dish, and provide feedback to the restaurant to improve the dish/menu. After eating there, the user's restaurant profile is automatically updated; which can suggest other restaurants/items at other restaurants. And the users get paid (for example, to accept offers from other restaurants, after viewing the user's restaurant profile). And the restaurant gets paid (in many ways, such as selling recipes to users or selling alternate restaurant recommendations (if you like our restaurant you might like to try this other restaurant by the same chef or management company or hotel chain or that also has a great view in this nearby city, etc. etc.). Users can bring home the Tilz for the restaurant menu for later reference, takeout ordering, or inclusion in their Restaurants Eaten At VictorsList.

Wine sommelier guide. Add interest to the wine list in restaurants. Scan the Net Dotz on the wine list to bring up a virtual sommelier (as the user's wine profile: different critics have differing tastes). The virtual sommelier breaks the wine list into segments: by country, food pairing groups, etc. If a red wine is selected they are arranged into groups such as "big and bold," "soft and velvety," by country, etc. If the user chooses "By Country," a list of countries pops up. The user chooses Spain. Wine list by Spanish region appears. Map mashup showing various varietal regions. Travel profile mashup, enables the user to choose from regions they traveled to, such as near Alhambra. Each bottle has tasting notes Tilz (as per the user's favorite critic). Users get paid to allow competing wineries to offer realtime ads or coupons (or competition suggestions) for wine to be paired with the chosen dish, or as the second bottle at the table that night. So, if a user scanned the Net Dotz for a bottle of Silver Oak cabernet that user might instantly get paid to receive an offer from another wine on the wine list, such as Opus One. And Opus One might offer a $5 discount if the user orders Opus One instead or in addition to the Silver Oak. Win/win/win for user/restaurant/winery.

Restaurants get paid in several ways. For instance, restaurants get paid to allow sommeliers to come in and create a matrix of food and wine pairings for that restaurant's menu vs its wine list—for all different types of wine drinkers with various wine preference profiles. Simply by including that matrix Tilz in the restaurant's CloudCast the sommelier collects all the income until the sommelier's investment is recouped, then the restaurant and sommelier split future income for a contracted time period. Some sommeliers receive commissions paid directly from various wineries to promote their wines. Paid search or guidance is a growing convention. The restaurant might also save the personnel cost of one or more live sommeliers on their payroll—a huge savings. Users can scan menu items and have other (third party) sommeliers or wine tip Tilz make suggestions as to wine pairings for that menu item (based on the menu item name or even ingredients of that dish). Also Dotz Guides can automatically create individual user-preference driven pairings using that restaurant's wine list. This is a source of income, as third parties can offer to make realtime wine suggestions to users for, say, 25 cents, with the restaurants splitting that income with the third party (and Dotz Guides). It makes the user appear to be a knowledgeable wine connoisseur. Would some people pay 25 cents when at an important dinner to ensure they make a great wine choice? And especially a wine choice that fits the individual preference profile of their important guest (which is being CloudCast).

In embodiments Dotz Guides creates a new type of insurance. For example, if the user paid 25 cents for a recommendation, that 25 cents could be refunded if the user didn't like the bottle of wine, and/or the 25 cents could be a new form of insurance policy. If after following the paid recommendation of this certain sommelier or wine recommendation service, the user doesn't like the bottle of wine, the insurance covers the cost of the bottle (up to certain dollar amount limits). In embodiments, guaranteed paid recommendation costs $1 (or other amount) extra—for the insurance policy.

In summary, the millions of potential uses for Dotz Guides will supplant millions of currently analog items, such as printed manuals or menus, with cooler, customizable, transactable, interactive digital Tilz which benefit all parties involved. Manufacturers not only save the cost of printing product manuals, but also gain a new ongoing relationship vehicle (the Dotz Guide) with their customers. And companies using Dotz Guides will benefit from numerous new income streams. As well as realtime information about product usage. Some individuals will even be able to create mini-businesses utilizing Dotz Guides. And finally, the users of Dotz Guides will get paid for providing feedback or receiving offers related to that product or service.

Facility 5

Profile Management Facility

5105

In embodiments, a module that facilitates interactive, transactable profile management (hereafter "Galaxz") is provided. Profiles are not just for people, every thing has a Tilz (a digital "baseball card"-like profile, in a new digital-content format, Facility 30). Take your Tilz with you. Offline or on. On any device. All Tilz are transactable. Every object on earth can have a profile with information about that item, and Galaxz is where every profile for every thing can live. With Galaxz such profiles are available not just online, but offline, so that users can interact with everything in a revolutionary new way. Galaxz (rhymes with galaxy) is the profiles of all the people, places, and things (and more) in a user's life—the user's Galaxz.

Galaxz is built from (Tilz) profiles. And Tilz live directly on user's devices (not just at remote servers). Thus users are moving about in the world with their Galaxz of information surrounding them, which facilitates novel interactions and transactions. For uses who enjoy social networking via conventional are social networking sites such as Myspace, social networking via Galaxz is even an even more enjoyable and profitable (literally) experience—Galaxz is three dimensional, in the real world, and users get paid to park their profiles (as opposed to conventional art social networking sites where users don't share in the revenue their profile engenders). Users can create Tilz on various devices (such as mobile handsets) and share via Bluetooth (or other means). Galaxz enables users to control who sees their content, and what they see. Profile-based display: the profile of the viewer determines which Tilz are shown and how displayed. If the viewer is a friend, party photos are displayed; if the viewer is mom, no party photos. If the viewer is a trusted avid collector, the user's related collection Tilz are shown. If the viewer is unknown (and could be, for instance, your boss) simple public Tilz are displayed.

Profile-based links. With Galaxz, links destinations are based upon the profile of the link user. User #1 clicks on a link for "wine" and may be taken to Trader Joe's Website for their $2 wine (if user #1's profile indicates a propensity toward inexpensive wine); User #2 clicks on the very same "wine" link, yet may be taken to the Nickel & Nickel Website (if user #2's profile indicates a propensity towards premium, Napa wines). Furthermore, instead of being "going" to Websites, users may instead download the ParaSite (Facility 29), which is a customized, local subset Website—customized as per each user's profile. So, for instance, if a user featured some charities on their Galaxz profile(s), the Galaxz user may receive a commission if a visitor donates to that charity via the ParaSite the visitor received (downloaded to the visitor's device).

Profiles are not just for people and companies, but also for things, objects, ideas, philosophies, intentions, wishes, every animate and inanimate object, down to atomic unit levels . . . literally anything and everything. And having the profile of the things in a users life makes the user's life better. For example, if the user has a Tilz profile in their Galaxz of every food item they own, such as each jar of Gerber baby food in the cupboard, then if there happens to be a product recall on that particular jar, then the user can receive live recall alerts, before such food is fed to their child. And if the user has the Tilz profile of their, say, refrigerator, in their Galaxz, then if something goes wrong with their refrigerator, the user simply changes the status of the Tilz (the profile) for their refrigerator to "Needs Repair" and certified repair personnel will respond—without the user having to spend the user's time "searching" (an archaic conventional art activity) for same. Galaxz profiles continuously attract like-content to each profile, thus users have information at their fingertips when they need it, automatically—which thereby revolutionizes search, marketing, advertising, merchandising, interacting and transacting.

Search is no longer a process, a chore, which users have to take time out of their life to perform. Search happens automatically, as users simply post a Tilz profile pertaining to a want or need in their Galaxz, and entities that can meet that want or need respond. And users can get paid to receive such information, ads, offers, etc. related to each want or need. Third parties, such as conventional are search engines who have inserted themselves in the middle of transactions, are no longer necessary with Galaxz. Galaxz puts the only two parties to a transaction that matter (for example, the buyer and the seller) in direct contact with each other. Thus conventional art search/advertising firms can be disintermediated, and monies previously paid to them, can be saved and pocketed by the advertising/marketing entities, and even shared directly with the end user, whose profile was of sufficient value that the third party was not necessary—thus users get paid for the value inherent in their profiles. And the more robust and complete a user's Galaxz profiles are, the more valuable the profiles are, and the more a user may be paid for utilization of same.

Conventional art search/advertising entities were designed around the following motto: how much money can we make off users. With Galaxz however (which only gets paid when users get paid), it's how much money can be made with users. Galaxz' governing leitmotif is "users first." Galaxz' interests are aligned with users'—which cannot be said of many conventional art companies in this space. Conventional art advertising lacks mightily as to relevance. The majority of ads that a user is subjected to are irrelevant to the user, either because the ad pertains to a product or service the user is uninterested in, or the product or service is relevant, but not at this moment. Galaxz addresses both these shortcomings of the conventional art. First, ads sent to users can be based upon the profiles in the user's Galaxz (such as a profile Tilz for each and every single thing the user owns), thus ensuring relevance. But Galaxz addresses the issue of timely relevance as well. If the user just purchased tires for their car, then that user doesn't need to see tire ads for, say, 3 years or 36,000 miles. And with Galaxz, there is a profile Tilz for the user's car tires with metadata pertaining to the expected useful life (EOL) of the object in question. Thus Galaxz sets the status for tires, vis a vis tire ads/offers/ information (and other), to BLOCK such ads/offers/information, until a month or two before EOL is reached. At which point Galaxz automatically (if the user wishes) sets the profile for that user's tires back to ACCEPT vis a vis ads/offers/information, which is timely because the user (according to this example) needs to prepare to purchase new tires, and such information would therefore be relevant and timely.

In contrast, the conventional art search/advertising entities (which create profiles of users based upon guesses, as opposed to the facts contained in a user's Galaxz) would burden the user with ads/offers/information/etc. each time the user, for instance, wrote the word "tire" in an email (since some conventional art search/advertising entities spy on users' every email), or say the word "tire" while on a phone call (since some search/advertising entities listen to every single phone call made with their phone service technology) or performed a search with the word "tire" in the search string—which is very likely during any three year period, but which would only produce unprofitable results for both tire manufacturers/installers as well as users. Unprofitable for tire manufacturers/installers which would therefore pay this search/advertising entity to advertise to this user who utilized the word "tire" in one of the above-described (or other) cases, but yet did not need tires yet. Conventional art search/advertising puts money in the pocket of the conventional art search/advertising entity every time, even though the only two important parties to a tire transaction (the tire manufacturer/installer and the user) were both made unhappy (and lost money and/or time, due to the deficiencies that inform conventional art search/advertising). Conventional art search/advertising entities don't tie their income to actual transactions, they get paid every time, even when getting paid does nothing more than line their pockets at the advertising entities expense (and the expense of wasted user time). Conventional art search/advertising drives up the costs of goods sold, which users must eventually pay for (as marketing costs are built into the retail price for products, retail prices that users eventually pay). Accordingly an improved search/advertising model is desirable, and Galaxz profiles (of every entity, person, object, thing, etc. and thereby can inform any other entity with which it interacts/transacts) form the foundation of an improved search/advertising modality (see Facility 16 uTag search, and Facilities 1 Ad Widge and 2 Coupon Widge).

Conventional art social networking sites, maintain data (profiles) at remote data centers. With Galaxz, a user's profiles can live directly on the user's devices. Thus, for billions of users around the world who don't have expensive wireless carrier network service, Galaxz is still usable and functional and life- and business-changing on a plurality of devices. With Galaxz, users move about in the real world, engaging in interactions and transactions based upon information (profiles) the users have literally on their person/device. Galaxz informs real world interactions and transactions that make a user's life easier and better (as well as can perform the same conventional art remote hosted profile interactions). In 2nd and 3rd world villages, users can move about with a profile for, say, their crop, and engage in ad hoc transactions with persons they happen to be passing by, that can supplement traditional transactions performed in the traditional marketplace (which too is transformed by all users at the marketplace having Galaxz profiles of their wants and needs, thereby making it easier to identify intersections of interest).

Corporations. Galaxz was built from the ground up for corporations, not just some place where corporations can also choose to be (next to photos of users doing kegstands, as per conventional art social networking sites). A Galaxz profile (a Tilz) for every customer (supplanting aging, expensive, conventional art customer relationship management (CRM) software). For example, how often does that customer buy Tide detergent? (this is a known fact contained in each user's Galaxz profile, as users have a profile from everything in their life, including each box/bottle of detergent—which includes metadata such as purchase date/price/store bought at/etc.). How often does that customer receive coupons for Tide? (a known fact since coupons, represented by a Tilz, are part of a user's Galaxz, and which are attracted as like-content to their profile Tilz for their washing machine). How often does that customer user those coupons? How often does that customer do laundry? What stores are they buying their Tide at? etc. etc. Furthermore, each customer profile on Galaxz can be the conduit for interactions and transactions with that customer. The customer can be shown, for example, what revenue level they would need to reach to receive the next tier of pricing discounts. With Galaxz corporation (and other entities) have a complete view of their customer—and don't have to pay conventional art entities such as Oracle tens of millions of dollars for some overly complex system to manage CRM. Furthermore, the Tilz profile for each customer becomes the communication vehicle between the company and that customer, the ongoing relationship between the company and that customer.

There are also Galaxz Tilz for business processes. Galaxz Tilz that manifest for instance the implementation of six sigma manufacturing or the latest cost cutting objective or sales increase plan. Application data via a new model (that is to say, for instance, receive decentralized telematics data from every device used by that company's customers). The conventional art, by contrast, is Myspace, Amazon, Yahoo, etc. all featuring centralized information from centralized servers. Mobile. Social. Enterprise collaboration. Employees can collaborate with each other via Galaxz by having profile pages of what they're working on, pictures of their beta products, status updates as to what they just accomplished, etc.

In embodiments Galaxz works offline. User's Galaxz live on their mobile device or device of choice. Tilz sync when next connected to the Internet, directly or indirectly or connected to the master Tilz. In embodiments Galaxz works completely offline. Users can create profiles (Tilz) on various devices and share via Bluetooth, radio frequency (RF) or other means. Such profiles might not ever be hosted at a remote server. Profiles that exclusively live offline is an unique Galaxz feature. Not only for emerging markets which might have regions with limited wireless access, but also enables users (in all situations) to control who sees their content. And promotes the proliferation of devices which are highly capable, yet don't require wireless-carrier network service.

Galaxz Pro. Free is unfree. Content that some advertisers might find offensive is often removed from social networking sites (so the advertisers will keep paying for ads on that social network). In embodiments Galaxz Pro charges a monthly fee, wherein users can host their own affinity group, and be the "anything goes" of social networking: their rules, no censorship, etc. Galaxz Pro is also for government agencies. For example, let's say a user wants to send the police a copy of a threatening voicemail left on their phone. If the user's local police has Galaxz Pro, then the user can simply drag the voicemail Tilz onto the user's police profile Galaxz Tilz. And Galaxz Pro also supports completely anonymous or confidential submissions. Galaxz Pro enables the police to take a "report" without the time and expense of filing a formal report.

Galaxz Pro is also for corporate use. Corporations can keep client or customer profiles on Galaxz Pro (which are a confidential and secure way to interact with a company's clients or customers). For example, Safeway can set up a Galaxz pro profile for each of their Safeway Rewards Card users—where each user can view and manage their profile and rewards (and the type of offers they receive). Every company can manage each customer account via a Galaxz Pro profile. And customers can also access their account profile. This is far easier than conventional art Website customer-based information. With Galaxz Pro users keep a copy of their Tilz for each entity they transact with (for example, the automobile club, each magazine subscription, the electric/gas/power company, each credit card, etc.). Although each profile is managed by each company, a user can sign in to all profiles with a single Galaxz Pro login (cross-site functionality makes life much easier for the user). Furthermore, cross site functionality enables users (if they selectively surface some of their profiles to selected entities) get the best service at the best price. For example an American Automobile Club (AAA) car insurance user could make their AAA car insurance profile Tilz available to selected entities, such as State Farm Insurance, which could then pay the user to make a competitive bid for the user's car insurance business.

Analytics is an important business function that is growing ever more important as companies are groaning under the crushing weight of the mountainous information they can/do collect. Analytics software dives in and starts to make sense of all that information and product data. Data that reveals patterns. Data that reveals insights. The Galaxz platform enables third party software to be quickly developed using robust data-handling tools, and the sophisticated relational database upon which Galaxz is built. And users are in total control of their data at all times.

Users get paid (by participating in the revenue their profile generates). Users can post "resume" Tilz, such as a climbing resume, speaking engagement resume, cycling resume, vacation resume, etc. Galaxz then enables companies to pay the user to make offers (if the user wishes to receive same): for a climbing resume user can choose to receive climbing magazine subscription offers or climbing gear ads; cycling resume—user can receive bike offers. Vacation resume: user can receive hotel deals. Tilz organizes information in a way that is better and clearer for the user; and easier to sell access to information to others who pay the user. Galaxz can be any layout or size, shape, design, etc. Users can express their personality via the unique features of their Galaxz Tilz.

Captive audience screens. Wherever there might be a captive audience screen (such as at a gas station pump, or in an elevator), users can receive updates to their Tilz, including updates from friends/associates/businesses) and even get paid to receive offers as per their profiles. AppSkins are sub-applications that are basically skins (subsets) of Galaxz Tilz information. In embodiments Galaxz powers smaller, focused niche applications which will appear to users as separate applications, and which can gain their own popularity within their niche community. For instance, a map-based social networking site, which enables pet owners to populate an online map with the names of their pets. Which is a subset of that pet owner's main Galaxz Tilz. People who walk their dogs in the morning could use this site's Galaxz Tilz, to recognize the names of other dogs (and their owners) as they pass by. It is actually the Galaxz Tilz for each pet, mashed up with a map service, as the construct for displaying Tilz information. People can post a Key Picture of their pet, and then continue to add other photos, videos, written posts, status updates, etc. for their pet. Pet owners can optionally add their first names to the map-based social networking site profile, to enable neighbors to greet them by name when walking their dog. People can also get in touch with each other to trade dog sitting, invite others to doggie romps/parties, etc. This map-based social networking site doesn't actually live anywhere . . . it just appears and interacts with the user's CloudCast. That is to say it is an ad hoc social network that forms itself on demand, then dissolves when not in use. It forms itself from Tilz that already exist on Galaxz.

Galaxz is also a monetization engine. For example, every house has its own Galaxz Tilz. It's unlikely with conventional art social networks that any given user's house has its own profile on a social networking site. But for Galaxz users, it is de rigueur. A Galaxz user's house has its own ComCloud (Facility 23) for its contents: every single item in the house, such as every knife, fork, spoon, table, chair, mirror, lamp, painting, article of clothing, item of food, light bulb, carpeting, appliance, each item of sports equipment, literally a Tilz for every single individual items, down to the type of paint on the walls and each plant in the yard. In addition, the house ComCloud might feature garage sale items (stuff, for instance, in the garage the user would like to sell). Other information such as the entire history of sales prices for that property (and property taxes). All sales marketing photos used by realtors each time the house was put up for sale. Etc. etc. All items and services, associated with that house, can be CloudCast for commission—that is to say, if someone wants any of the Tilz in the house CloudCast, they can be acquired for free or for a fee, and if that person then goes on to but that product or use that service, the homeowner may receive a commission. House CloudCast contents might include the house's architect—for those user's who pass by that property, and are interested in perhaps having that architect design a home for them (this information is not available by current search engines or social networking sites). The house CloudCast might include the name of the builder of this property, or past real estate agents for this property. The gardener's profile Tilz (in case passersby like the look of the garden, and might want to hire the gardener to do their yard as well). The designer of the custom entry gate (for those individuals who pass by and might want the gate designer to design a gate for them. Etc. etc. All of the preceding information is available via downloadable Tilz, Tilz which comprise that house's Galaxz.

Users can add all their various household items (appliances, name of the countertop supplier, bedding manufacturer and which store the user bought it in, et. al.) to their house's Galaxz. These profiles are worth money and users who wish, get paid to receive ads/offers/information/etc. related to anything in their house's Galaxz. For example, let's say a user owns a JennAir Model 100 refrigerator. The user pulls the JennAir Model 1000 Tilz into the user's Galaxz (say by scanning the barcode (Facility 31) with their mobile device or automatically via IP-based RFID (Facility 33). The JennAir Tilz is sorted (Facility 8) to the user's house ComCloud (Facility 23), or sent to the user's TV (via Mobi Homi Docking Station Pro) which can act as the data hub or server for the household. The user now receives live recall alerts. In case of a defect, for example, all Tilz holders are notified. The user gets paid to allow certified installers and/or repair technicians to serve offers. The user can pull the Tilz into the user's Galaxz if the user purchased the JennAir online Installers can pay the user to send offers to deliver and install the refrigerator. Telematics data is captured and transmitted via RFIP (or other means) to a user's mobile handset (Mobi, or other device) which informs the Galaxz Tilz for that user's JennAir. Users can get paid to allow certified repair technicians to view that user's JennAir Galaxz Tilz. So, say a repair technician who is working on another JennAir in that user's neighborhood can make an offer to stop by and fix the user's JennAir cooling unit and discount the repair person's normal $80 service fee to just $10 plus the cost to fix the cooling unit. (By way of comparison, consider for example, how much time CEOs of conventional art social networks thinks about how much money they can make for their users. Perhaps users will want to move to a new social network, such as Galaxz where users are in charge of their own profile, and focuses its attention on thinking about new ways for users to get paid, since Galaxz only gets paid when users get paid). Offers are sent to any of a user's devices (as per user's profile). For example, repair offers can be sent to a user's TV, or PC or mobile device, according to the user's Web Pref profile (Facility 20). At the end of the expected useful life (EOL) for that JennAir refrigerator, the user gets paid again by entities that can supply a new refrigerator. The end date of expected useful life (EOL) is known, and can be made available to retailers automatically for those who pay the user view the user's Appliance Galaxz. As now is the time to replace the old refrigerator with a new one, retailers pay the user to send offers to sell new refrigerators.

Every business has its own Galaxz. Every product of that business has a Galaxz Tilz, every stock-keeping unit (SKU), every customer, every supplier, et. al. and can profit in way similar to the house Galaxz example above. Companies can utilize Galaxz to surface their entire inventory directly to customers via a virtual glass warehouse. Which not only benefits users who can see it the items they seek are in stock, but also companies which can offer items for sale without necessarily having to stock them in their bricks and mortar stores. And the glass warehouse one user sees will be different from another user as the virtual stores changes according to each user's profile. A company's entire inventory can be managed on Galaxz. No longer do companies require expensive difficult to install and maintain conventional art enterprise level software solutions. Any size company can manage all their information needs via Tilz which live on Galaxz. And can be accessed via lightweight equipment such as mobile devices. Galaxz will become the foundation for the next generation of enterprise applications (sales automation, human resources, database, etc.)

Galaxz may also be used in other ways. For example, people may simply address items (letters, packages, email, etc.) to the business or house, without needing to know the recipient's name. Senders simply drag the Tilz of the item they are sending onto the recipient's Galaxz Tilz, and it may be delivered to the recipient.

Galaxz is built from the ground up with the intention of being the transaction engine of the world. All the parties in the value chain of a transaction can use Galaxz to track the transaction. If the transactions involves say the purchase and shipping of an item, people/companies get their cues to commence their portion of the transaction from a transaction Tilz being dragged onto their department's Tilz (pull an item from inventory, schedule United Parcel Service (UPS) shipping, etc.). Another example, if a user is making a purchase on their phone of an item for a friend, they simply drag that item (say, the Tilz for a hat they wanted) onto the friend's Galaxz Tilz and the item will be delivered. Yet the friend's address need never be revealed to the company selling the item. And if the friend is on vacation in Italy, the item can be delivered to them there without the user having to know the friend's whereabouts. Galaxz enables transactions to have the asynchronous flexibility that email affords vs say a phone call (where both parties have to be ready to communicate at the same time).

Planets are affinity groups within Galaxz, and can form almost spontaneously. Such affinity groups might include soccer fans, bird watchers, etc. In the same way that Spherez (a navigation and storage facility consisting of multi-faceted spheres onto which Tilz are mapped) automatically pull additional related content Tilz to them, planets have "gravity" and also pull related content to them. Each time a user visits a particular, the user might notice that the planet may have updated and morphed since the user was there last.

The contrasts between Galaxz and other profile parking sites (social networking sites, business networking sites, etc.) are legion. With Galaxz users are in control of their profile. Only on Galaxz are users in full control of their profile. Everything from privacy (that only user's set) to having a partner to help monetize their Galaxz profiles. With conventional art social networking sites advertisers and tracking companies are spying on users. Galaxz cuts out the middlemen, and puts the advertiser directly in touch with users. Thus there are no need for the current crop of tracking companies. Galaxz gets paid when users get paid. Unlike conventional are social networking sites which gets paid all day long, but users get nothing. All sorts of entities are making money off users' profiles, but not paying users. And with or without middlemen Galaxz users are in charge of their own profile and thus make all decisions regarding its use. Including privacy related concerns.

The market that Galaxz is addressing (every thing on earth having its own Tilz) is enormous, and several orders of magnitude larger than the earth's human population. Galaxz was primarily designed to facilitate real world interactions. And being able to interact with other users' ComClouds is a vastly superior way to socialize and monetize and interact and transact. Galaxz rests on the tenet that it is the profiles of the users which are of value (profiles=currency) and thus Galaxz pays users by helping monetize the users' profiles (for those users who wish such monetization). There is a Galaxz Tilz for everything. Every object on earth. Every living thing on earth. Including plants and animals. Every person. Every idea. Every intention. Every wish. Thus all the stuff a user owns, the things a user interacts with, people the user knows, pets, future intentions, wishes, etc. comprise that user's Galaxz. And with Galaxz the user can now carry the user's Galaxz literally in the palm of the user's hand. And make connections thereby in the real world. And sell the user's stuff. Automatically. And conduct searches. Without lifting a finger. And do everything the user wishes to do in their life, via Galaxz. And with Galaxz, the user is in control.

Facility 6

Knowledge Sharing and Monetization Facility

5106

In embodiments, a module that facilitates knowledge management and monetization (hereafter "Hosted Everything") is provided. Hosted Everything is a simple way for users to monetize their passionate expertise, and save others countless hours not having to become a mini-expert for tasks they face. For example, once a user purchases a product, that product needs maintenance and repair and eventually replacement. When a product needs maintenance/repair, the user has to take the time to become knowledgeable about honest and capable maintenance/repair providers. When a product needs replacement, the user has to take the time to become knowledgeable about subsequent generations of that product versus competitive products in the marketplace. It would be desirable if there were a passionate expert, to whom a user could turn, that could guide the user through the maintenance/repair and/or replacement processes.

The prospect of having to find a repair person who won't rip the user off is a burden. When it's time for replacement the user needs to find several pieces of information: who has the lowest price; if the user utilizes an online site, how does the user return an appliance? For which products does it makes sense to purchase an extended warranty. etc. etc. It just becomes a big hassle. People repair and replace products billions of times each year, so a better mechanism for doing so is desirable. Hosted Everything is that better mechanism and more.

In short, the user has to expend time "managing" each of the products they own. It would be advantageous if product owners could rely on the advice and expertise of others whose passion is that product. And even let them handle the "management" of some or all of a user's products. For example, let's say a user is a Honda Civic owner. That user could join the Honda Tires Hosted Everything. Then the passionate expert running that Hosted Everything group continuously monitors tire developments for the new brands, or models of tires, that best fit various needs. And when the user needs tires, the user is already part of a large group of users who have two things necessary for the user to get the best deal: 1) expert knowledge; and 2) buying power (because of the, say, thousands of others in the Honda Tires Hosted Everything group). The user can rest easy in the knowledge that the user got the best price and the user didn't have to lift a finger to accomplish this task. And there are Hosted Everythings for other life tasks too.

Almost everyone has at least one area of expertise/passion. With Hosted Everything there's a simple way to get paid to share that expertise with others. Users can turn their hobby into a source of income. Passionomics. There are almost 5 billion potential users for Hosted Everything, each of whom have differing tastes as to what they like. So within categories, there will be numerous, differing "drivers" and with differing sets of "riders" or followers. And conveniently, by self-selecting into these various groups and sub-groups it's very easy for advertisers to reach focused audiences.

As per the conventional art, users need to become experts over and over again for every transaction, and for every location. If a user moves to a new city, they have to perform the same solutions seek for this new area. For example, kitchen appliances. When a user purchases kitchen appliances, the user might spend ten hours looking through ads, magazines, calling friends, doing online research, etc. trying to become an expert on which brands of appliances to buy, and where to get the best deal (price, speed and quality of installation, etc.). If there were an "expert" in kitchen appliances whose list you could subscribe to who knew that, for instance, Sub Zero was about to come out with a new model, which means the current model is quietly being discounted, and that a local hotel supply company has great deals on Sub Z's. It could be an appliance repair person—with a great deal of domain knowledge. Via Hosted Everything that repair person has a way to monetize their knowledge. Perhaps eventually replacing their current income stream.

Let's say there's a person who is completely into car tires and has become something of an expert over the years. This person keeps track of the latest innovations by tire manufacturers, and which tire for which car a user should get. This car tire expert also tracks where the best deals are, including virtual car tire suppliers who ship tires to a local tire shop for installation. Such an expert could easily shave $50 to $100 off a $1000 tire transaction. With Hosted Everything this car tire expert could build a nice little business. Via Hosted Everything the tire expert creates a list with all his tire recommendations. Interested users subscribe for, say, 50 cents per month which is about $18 every 3 years (which is about the frequency of tire purchases). The tire expert might also get a 5% commission on each tire sale and installation, which is about $50 per transaction. If this tire expert had 1,000 list subscribers that equals almost $2,000/month income. There are about 1 billion tire purchasers in the world, which equals 1 million potential lists or businesses of 1,000 users each. And there are thousands and thousands of goods and services, each of which could have expert, list-based businesses around it. Hosted Everything could change the lives of hundreds of millions of people who can make businesses right in their own town or country, using the knowledge built up around their passion.

Hosted Everything aggregates large numbers of users, who want to find expert advice on any of thousands of subjects. In addition, Hosted Everything facilitates demand aggregation, backend hosting, transaction processing, and customer interaction tools, etc. presenting a turn key solution to users. Hosted Everything also publishes corporate information system application programming interfaces (APIs).

Companies can utilize Hosted Everything to offer products as services. For example, General Electric (GE) can monitor a user's Home Inventory ComCloud (Facility 23) and when replacement light bulbs are necessary, can offer to have them delivered and/or sold by Home Depot or other retailers.

Other uses for Hosted Everything include knowledge distillation. There's too much information out there. Hosted Everything is a resource for people, who take the time to distill the avalanche of information, and deliver the cross-content (text, an pictures, and video, as well as offline items), Cliff Notes version. For example, TV/movie/music "programmers" who distill the rapidly growing number of options for enjoying content into a usable stream to which others can subscribe. There are so many TV channels and TV shows, delivered via various means, that a user needs a TV whisperer. As an alternative to a music subscription service, there might be a real person to point users to the right services to subscribe to. Advise when to rent to and when to buy content. And to find discounted tickets to live evens (for each music genre), trade music memorabilia, indie content, emerging artist playing at a local coffee shop. All information is location-based, and affinity group sorted. A users' local music scene expert can run a mini-business off his or her knowledge. Hosted vitamins. There are too many vitamins to choose from. Too many places to buy from. Follow a trusted expert, and have the right set of vitamins delivered to the door for less than the user could purchase them himself, and without spending dozens of hours each year trying to keep abreast of the latest advancements in vitamins, and the new companies that can deliver them. Food (organic diet, vegetarian diet, Atkins diet, etc.). What to buy and where to purchase it locally. Discounts on books and videos, and plan memberships. Beauty products. There's such as dizzying array of beauty products. And so many different uses for makeup. Which ones are right for you? Are any of the beauty products shown on late night TV any good? How about European products? Does paying for expensive products mean the user will get better results? Should users purchase direct from each manufacturer? Are products at discount drug stores as fresh as those available online? Follow a guide or concierge or critic that fits the user's style. The products are then delivered to the user (or made available by other means). Car customizing products. Where can users find the hard-to-find parts? How to get in touch with local car customizing clubs. Home electronics. So many TVs and computers and gadgets come out each year. Which are right for a given user? Should the user buy now or wait six months for the new model? Can wrap discounted prices and delivery, into a Hosted Everything experience. What's for dinner (various price points). This becomes a chore faces by almost every family. Yet there are always some people who just love coming up with recipes and meal plans, that fit various user's tastes and budget. Wrap up those recipes with grocery lists, or even have those groceries delivered to the user's home, and the recipe Tilz delivered to the user's mobile device or TV. Which wax should a user purchase for their car? Is it better to purchase a wax that claims to last for a whole year? Will rubbing compound remove not just the dirt, but ruin my finish? On and on it goes. For every decision regarding every product and service a user encounters in their life. A user might be an expert at what they do all day at work, where can they find the "experts" for all the other decisions a user has to make in their life? That's what Hosted Everything is for. And those experts can now monetize the knowledge they've amassed pursuing their passion.

Hosted Everything is a simple way to turn a person's knowledge into money. Informed experts can create a following via Hosted Everything Users benefit from the expertise of others in making day to day life decisions and from having a group of users which can command, via Hosted Everything, discount pricing for related products and services. And these self-selected groups focused on a particular product, service, concept, makes it easier for advertisers to target (but only as per user's profile). The mobile device revolution is going to change forever thousands of industries which will soon need new ways of reaching, interacting with, and transacting with customers. One of those ways will be via informed experts who have a following on Hosted Everything. And the followers get paid to receive ads and offers and additional information. Hosted Everything is a win/win/win for all three parties in the value chain. The product manufacturer (or service provider) can more easily interact and transact with focused audiences of interested users. Passionate experts have a new way to monetize their knowledge. And users benefit by making informed decisions in less time and acquire the best products and services at a lower cost. Hosted Everything is a next generation platform for individuals and businesses to create new sources of income.

Facility 7

Electronic Currency Facility

5107

In embodiments, an electronic currency (hereafter "iDough") module is provided. iDough is a novel micropayment e-currency, created from the ground up with users first. iDough is a credits based system that keeps a realtime running tabulation of the user's credits and debits. Users may soon be partaking in hundreds of micro transactions each day, for which an electronic currency is required. As users get paid (perhaps tenths or hundredths of a penny in some cases) to surface their various profiles to selected interested parties, a mobile micropayment method is desired. iDough may also act as the micropayment front end for existing conventional art payment systems such as Credit Cards—and is thus a way for legacy players to get into the micropayment field. And iDough users get paid to receive ads or offers, or share profiles, related to that transaction. With iDough as their payment system, users can be made aware of ways to improve their transaction experience. iDough monetizes users' transactions. Merchants benefit by lower transaction fees. Instead of taking transaction fees from every transaction, users receive credits/debits which are redeemed upon set thresholds—which may be reached, for example, only after tens or hundreds of transactions. iDough only disperse funds, upon a set threshold. Users will only get paid (or pay funds due) when their iDough account reaches a set threshold, such as $10. It's at that dispersal points that iDough and ecosystem partners (device manufacturer, operating system provider, network provider, etc.) get paid. iDough simply keeps a running tabulation of each registered user's credits and debits. If the net amount due to the user or owed to the user reaches $10, then iDough credits or debits that user's credit/debit card or bank account (or other) $9. $10 minus a 10% transaction fee for iDough and it's partners.

iDough enables users to trade debits or credits to lower redemptions or rebuys (for a 5% fee to iDough). iDough also acts as an exchange between payors and payees. If a person is close to a redemption and needs to soon put in another $10, they could seek out someone with credits to exchange, which would put them back below the redemption point. This mechanism saves users money. 5% commissions for credit exchanges vs 10% commission for redemptions or rebuys. Chargebacks are not allowed. Initially once an amount is debited or credited those monies cannot be charged back to the user's account (except in case of errors). Service fee-based chargebacks may be allowed in the future, in the form of a $15% "restocking" fee. All transactions are non-refundable. Since initially these are mostly micropayments its not a major concern. Refunds may eventually be allowed however, iDough may choose to impose a service fee. To avoid non-payment iDough puts a $10 (or other threshold amount) hold on user's credit card. iDough utilizes any available frequency to conduct transactions, and a network is not always needed. If a network connection is not available, iDough stores the transaction on the user's devices as "pending until connect." Additionally, any other user within range may provide the connection for two iDough users to complete their transaction. That is to say, two users without an Internet connection can rely anonymously on another nearby user (or someone they come near to later) to anonymously send the iDough transaction to the iDough servers (for which the anonymous sender may be paid a fee). iDough is integrated into most of the Mobi facilities. iDough can also turn paper checks into e-checks. Users just fill in the amounts on the paper check, add the iDough to that check's ComCloud (Facility 23), and that check becomes a form of instant currency that users can "accept" right away without having to wait several days for the check to clear. Also, users don't need to take pictures of the a check and send the pictures to their bank as the means to deposit the check. When the check's ComCloud is connected to the bank, directly or asynchronously, the check is deposited and funds are moved from the check writer's account to the check receiver's account.

iDough can be used as a postage stamp. The user simply adds the iDough credit (equal to the required postage) to the ComCloud for the letter or package. When the ComCloud for that letter or package is scanned the stamp will appear on any user's device. Additionally, the "stamp" itself can be a sponsored image; for example, an image depicting a new movie release, further reducing the cost to the user (or paying for iDough's transaction commission).

Payments may be made using any currency, at exchange rates as per the iDough terms and conditions agreement, including any sovereign foreign currency. User's airline miles. In embodiments iDough is a clearinghouse for third parties to make markets in items such as airline miles—setting the current rate users are willing to turn miles into iDough credits. Reward program points can be utilized to pay other people or businesses. Other people's money: others can loan a user credit or debit, as needed (say, for instance, to avoid a redemption event). Micro loans. Banks can work with iDough's exchange as a way to dip their toes into the micro loan business, utilizing some of the billions in deposits they take in each day, and turning them into micro loans. Pending rebates. Users, for instance, awaiting a $2 rebate from an ink purchase, can place their pending rebate into the iDough system and see what someone else is willing to exchange for it. Structured settlements can be placed into the iDough exchange, to see what discount other parties are willing to pay for that future income stream. Individual annuity payments can be monetized immediately via the iDough exchange.

Branded iDough. There are a plurality of forms of branded iDough. For example, one that utilizes a sell-through model. Establish iDough accounts, as an automatic companion to existing payment methods. For instance, open a Bank of America checking account, get an iDough account. And companies such as Visa, MasterCard, and AMEX can start to extend their brands and move into the electronic credits space. Starting first with money, for example, "Visa iDough." Users who are unfamiliar with credits, may be more likely to utilize them when co-branded with Visa. Additionally, Visa, Mastercard and AMEX should start thinking about moving beyond the traditional payment processing role, into e-currency, e-credits, credits in videogames, and things such as mileage programs, hotel rewards points systems, and even coupons. And finally, and most importantly of all, since profiles=currency, Visa, MasterCard and AMEX most certainly should get into the profile space.

Virtual ATM. The days of physical automatic teller machines (ATMs) are numbered. Via iDough, banks can set up virtual ATMs enabling users to receive or deposit checks and money anytime, anywhere. iDough's virtual ATMs can also be set up by credit and debit card issuers, as well as financial institutions such as brokerage firms.

New forms of online and offline interaction and transaction demand a new form of currency that facilitates micropayments. iDough is that micropayment platform.

Facility 8

Information Management Facility

5108

In embodiments, a module that facilitates data organization (hereafter "Sorto") is provided. Many users are drowning in data overload. Accordingly a tool is desired to sort the vast ocean of information coming a user's way. Sorto is a next generation file system. Sorto goes beyond the two-dimensional conventional art file systems, and even beyond conventional art relational databases. Sorto is actually four dimensional, including time and location notifiers for the data "tiles" aka the homonym "Tilz" (Facility 30). Sorto sorts and stores data (the information and/or Tilz) in such a way that it can be automatically surfaced where and when the user needs it or wants it (or could conceivably find it useful), in-situ, in-context. And corporate uses for Sorto include keeping information sorted by project, across various teams, across the globe.

Sorto is the other half of search. The more important half of search. Turns search into cash . . . for users. And Advertising is revolutionized. Currently search engines get paid (among various ways) for sorting content into keyword groups. With Sorto when users sort their online search results, as well as the results of their offline searching, the users get paid.

Now that you've found it (search), where do you put it? (the missing half of the search equation). Users are being inundated with information. Sorto provides ordo ab chao (order from chaos). Sorto organizes users' data. Scan a tea kettle at Target, and Sorto can place the resultant tea kettle Tilz into the user's Christmas Gifts VictorsList (Facility 18) (or other user desired location). Users scan barcodes/RFIDs all day. All of these items inform and make richer that user's profiles. Sorto sorts the resultant Tilz into their logical place(s). Users get paid, to allow ads/offers related to each sort topic. For example, once a number of items are scanned into a user's Christmas Gift List, then retailers know the user wishes to purchase those items and can pay the user to send offers to sell those items to the user.

Conventional art search results are not transactable. That's why Mobi search results are in Tilz form—Tilz are transactable objects. Thus, when users search with uTag search (Facility 16) or scan barcodes/RFID, the users are presented with Tilz. The Tilz construct is essential. Tilz gives advertisers an object to target—either for (complimentary ads) or against (competitive ads).

Sorto is a widget (Webified mini software application) or browser plugin, that moves with a user on their digital devices, and enables a user to mark content for sorting into various "lifetracks" or subjects. Mark and sort, not just Websites, photos, music, email, text messages, blog content, TV shows, but also items in physical stores and other tangible things.

Sorto creates a landing page (a tribe) for each lifetrack (or folder) for each of a user's passions: such as pickup basketball, or baseball, or hiking or traveling or food, et. al. Not only are lifetracks categories a vehicle for users to be paid (to receive ads/offers/information related to that topic), but also become the basis for users to interact with other tribe members, other users who are into hiking or traveling or food, etc. And users can show each other the Tilz they've collected for, say, hikes they want to do, or hiking boots or great water bottles or day packs, or trade pictures from hikes, or post videos of them reaching the top of the mountain, et. al. On the landing page are: blogs, forums, etc. A place where users can post questions and other users can post answers which are then rated. Highly rated question answerers are then dubbed Experts for that lifetrack (that tribe).

Users can make public (or semi-public) any of their lifetracks, and thereby get paid to receive related ads/offers. Consider the example of a soccer lifetrack. When the user comes across information about cleats, or soccer travel or team jerseys et. al. the user now has a place to put it. Anytime the user gets a Tilz of information related to soccer, Sorto sorts it into their Soccer lifetrack. Thus companies who wish to market their soccer related products or services now have something to aim at. And lifetrack information can be surfaced anonymously, without the user giving out any personally identifying information.

Because Sorto sorted the information for the user, Sorto also knows how to retrieve such information, and present it to the user in-situ, in-context when the user needs the information. Sorto is also profile-based, thus Sorto can present relevant information to the user, even information from third parties. Thus as Sorto is presenting information in-situ, in-context such information could come from third parties, some of whom might pay the user for priority data placement.

Sorto is also an application picker. As more and more widgets (Webified mini software applications) are written for the emerging mobile handset platform, users may accumulate a growing number of single purpose widgets. As this number grows, users may desire a convenient method for widget selection and switching. Sorto helps a user pick or choose from a user's widgets, the most appropriate widget for any given task. In embodiments, Sorto keeps track of a user's widgets and responds to the ComCloud (Facility 23) of the object or location the user in near, to suggest a widget to use. Sorto can also show the user the Sorto recommendations or reviews for apps that their friends or affinity experts for that field utilize in the particular situation. For example, Sorto surfaces hiking widgets (via, perhaps Survey Egg, Facility 39) when the user is at a County Park trailhead. And provide the following type of information: "You already own 4 hiking widgets. These 3 are OK, but this one is 5 stars for this park, and a portion of the proceeds goes to a fund to purchase future park land acquisition.

Sorto is also a widget store, helping user decide which of the widgets available to purchase. Vis Sorto widgets make their potential user known to users in situ, i.e. right where and when a user might want a coupon widget, or a comparison shopping widget, or a stock picking widget. If a user is visiting a brokerage Website the Website can let the user's mobile device know, that it is a financial services-related site. The site can let the user know if that site has a widget that the user can download, or can suggest related widgets (for a commission if they are paid widgets or for revenue share for free widgets—if there is a potential income component to the widget via such things as ads or transactions). And Sorto's widge store capabilities are not just online, but can also suggest widgets for sale in-situ in the physical world. Widget makers can make suer their content in on the Survey Egg (Facility 39) next to a travel monument in Egypt, or in a small village in Austria or on the phone of a person who lives in that village or on the network node near that physical location. Sorto levels the playing field for smaller widget makers as the widgets offered are not necessarily best sellers, but those widgets that best fit that user's particular profile. In embodiments users get paid to accept offers for widgets (paid widgets or free widgets) that might be of use to that user—and possibly to dislodge a user's #1 or "key" Tilz location on one their widget Spherez (a navigation and storage facility that consists of multi-faceted spheres onto which Tilz are mapped).

Users can socialize and share around their lifetracks. For instance, if a user has a butterflies lifetrack, they can make the Tilz in that lifetrack public and others with an interest in butterflies can comment as well as share their butterfly Tilz. In embodiments Sorto facilitates an online marketplace area to trade, buy and sell Sorto lifetrack Tilz. Users can get paid to let others subscribe to their lifetracks. A user who collects a beautifully curated set of photos, maps, information, videos, etc. that relate to butterflies, will likely attract a number of butterfly aficionados who would like to subscribe to that user's butterflies lifetrack (for free or for a fee). Public lifetracks can become the wilds for that subject, sorted by affinity group. Essentially the Sorto version of Wikipedia where thousands of lifetracks are assembled, and available for viewing by other users. And those other users can add content or comment.

Take for example a lifetrack dedicated to restoring a 1950 Chevy. The user utilizes Sorto to sort all the knowledge they acquire during the restoration: Websites, books, helpful feeds, names of other restorers, progress videos, stores where the user bought parts, video tips, etc. The more developed a lifetrack is, the more interest likely from advertisers to pay the user to place ads/offers in it. Advertisers for a car restoration lifetrack might include restoration car parts stores, Pennzoil, local custom paint shops. Lifetracks are a brand new place "terra nova" to do advertising, and monetize content. And are the other half of paid search. Instead of paying a conventional are search engine for the keywords "restoring 1950 Chevy," advertisers can pay the users who assemble such lifetracks, knowing those lifetracks are viewed and used by Chevy restorers.

When a user searches for: "Tiger Woods' next tournament" Sorto knows, as per the user's profile, that the user wants to sort the answer Tilz into the user's DVR Shows to Record VictorsList. Whereupon paid ads can be served knowing the user will be watching during those four tournament days. And paid ads means the user gets paid by advertisers not only to view the user's profile, but also to serve ads to the user. Sorto takes the answers to search queries, and intelligently utilizes them to inform other applications or hardware for that user. For instance, to automatically ensure a certain program is recorded by that user's DVR. Sorto powers a user's LifeFlow (in a manner similar to the way Sorto powers a user's workflow).

Searches are saved as Tilz. Search for "flat screen TV" and Sorto knows, as per the user's profile, the user wants to sort the answer Tilz into Buy Soon shopping list; and now paid bids can be accepted for the best prices on flat screen TVs. Note: paid bids, not just paid ads. Users can get paid to receive bids from merchants to sell that TV for the lowest price. With conventional art search engines, users don't save searches, they perform the same search over and over again; while the search engine gets paid over and over again. With Sorto, searches are saved into Tilz, and into lifetracks, thus ads have a place to land (and users get paid).

When a user scans an item, say a lightbulb, with a mobile device, Sorto pops up and, in embodiments, asks: "Are you buying, selling, or throwing out the lightbulb?" If the user is throwing out the bulb, Sorto checks the user's Household Inventory VictorsList. In embodiments, if there is a need for more bulbs, Sorto adds the item to the user's Shopping List VictorsList, which automatically solicits bids for six lightbulbs, delivered or Sorto contacts Ad Widge (Facility 1) seeking information or ads about competitive bulbs, or contacts Coupon Widge (Facility 2) for discounts for replacements for the scanned bulb.

Sorto tracks and adds future tags. If more tags apply to a Tilz in the future, Sorto adds those tags and the user's content is available in those new tag sites. For example, let's say there's an article in the paper about connecting three existing trail segments with a new $2 million municipal trail segment. As per the conventional art, it's just an article a user reads once. With Sorto, however, the article lives on in usefulness in a user's real life. Sorto pulls additional information and seeks widgets that enhance the information in user's oSorted data stacks: such as their lifetracks and Tilz. And article about connecting three trails should have a map mashup with the new section of trail highlighted and information about how to donate to trails fundraisers. The newspaper gets paid if the user donates. Sorto provides the user an alert for future votes on bond measures for trail funds. In this example if there is a ballot measure in the future for trails funds, Sorto will add the tag "trails fundraising" to the article about the $2 million municipal trail segment, as well as include the Proximity Alert for personal navigation systems (such as mobile devices or cars) which sounds when an interested user is near such a trail. If a user house shops in that area their navigation system alerts the users to homes near the new/existing municipal trails mentioned in the article; information which could inform a user's home buying decision.

Sorts serves as the "artificial intelligence" that informs uTag searches (Facility 16); and Sorto delivers user-specific intelligence capabilities. Charities, non-profits and fundraisers often pay up to 30% commissions for fundraising. If a user who read the article regarding the new $2 million trail segment, went on to donate to a trails fundraising organization, the newspaper might be in line to receive a substantial commission. The magnitude of this one Sorto-enabled commission alone, could change the economics for struggling periodicals.

With Sorto users can bookmark all of a user's digital and offline content. For example, if a users is in Macy's department store, and found a shirt they liked, they could bookmark it with Sorto (scan the barcode, receive the Tilz for the shirt, and Sorto sorts the Tilz into the appropriate profile, such as Clothing Wish List). Sorto has so many uses and will be utilized in so many different ways by different users that just one tagline is not enough: mark, track, sort; mark, sort, manage; digital data triage; digital content triage; synchronize, organize, evangelize; synchronize, organize, monetize; glamorize, summarize, monetize. My Cookiez (Facility 26) enables these various taglines to be to be displayed to different users depending upon the profile of the user.

In addition to users getting paid to receive related ads and offers, a premium paid version of Sorto stores content on Sorto servers. As with the other Mobi Facilities, with the free version of the facility, data is stored on the user's mobile device and synced to their other devices, and backed up on their Mobi Homi (docking station pro). With a paid version of a facility, data is stored on remote servers. Corporate Sorto and Pro Sorto have additional security features such as management, monitoring, remote data wipe, disaster recovery, etc. Premium (for fee) Sorto templates are available for sorting, organizing, and glamorizing content. Sorto surfaces contextually appropriate widgets based upon a number of factors such as: a user's location (museum guide widget), the task the user is currently engaged in (photo editing widget), and opportunistically, as per the user's profile regarding things a user likes or likes to do. Widgets that for instance related to a user's work, fun, family, hobbies, etc. are presented to the user via Sort as a very focused mini widget emporium. Users get paid to accept in-context demo widgets from developers right at the moment a user would need them, with Sorto conveying how that widget would help the user or be fun for the user to utilize in that situation. A beer widget when at a bar, or a home improvement widget when at Home Depot. Sorto also supports sponsored lifetracks (Nike's soccer lifetrack), and lifetrack subscriptions. Users subscribe to topics they are interested in (such as bird watching), and in particular those lifetracks that have been organized and presented in the coolest way about that topic. Sorto also supports sponsored Tilz within lifetracks. So if a user has a lifetrack dedicated to photography, and has gathered Tilz regarding cameras, photo editing software, photographic travel safaris, photography books, etc. advertisers such as Canon (which makes cameras) could pay the user to put a Canon camera ad Tilz, a Tilzvertisement, into that user's photography lifetrack (which is a collection of Tilz). In embodiments there are three dimensional worlds, virtual worlds, dedicated to various lifetracks. For a soccer lifetrack as a person moves about in the real world they see an overlay that highlights products, businesses, locations, people, pictures, movies, music, etc. that relate to soccer for the exact location where the user currently is. Alternatively the overlays can be mashed up onto various digital maps that the user is currently viewing. For example, when the user is getting driving directions to the dentist, the map or navigation system can highlight a store that the user is driving by that is having a sale on soccer cleats.

Sorto is much more than a simple organizational tool, it takes social networking to the next level. Users can now interact with those who share their same passions, without having to inundate these new virtual buddies with all the other social detritus of their life, ala conventional art social networking sites. As users take in information from search or from their real world interactions (in the form of Tilz) Sorto solves the problem of what to do with all that information. By organizing the information into lifetracks advertisers have a focused entity to aim their ads and offers at. And pay the users to receive such ads and offers. With Sorto advertisers have direct contact with their customers with far more accuracy and for far less cost than via conventional art search/advertising modalities. And users benefit by having the ocean of information that is salient to their life organized and sorted for them.

Facility 9

VOIP communication facility

5109

In embodiments, a module that facilitates voice over Internet protocol (VOIP) communications (hereafter "Phone Widge") is provided. Phone Widge enables users to make and receive VOIP communications from a plurality of digital devices, including the (Mobi) mobile handset. Caller and receiver don't need the same IP phone service provider. Phone Widge enables users to make/receive calls from a user's TV (via the set top box running Phone Widge software or by other means). Users can make/receive calls from Tilz. A reverse cookie packet (My Cookiez Facility 26) informs nearby digital devices as to the IP address the user is accepting calls on at that time. Users can choose to get paid to accept ads/offers via phone. And Phone Widge and its partners (which may include the handset maker and/or network provider) get paid for transactions made during calls.

Cable TV companies and satellite TV providers can, via Phone Widge, enter the wireless phone business without having to build a network. Phone Widge enables wireless carriers to offer their own branded IP phone service, that functions much more like traditional landline phone service wherein users don't have to know the call recipient's IP/POTS (Internet protocol/plain old telephone service) phone service provider. Users can make calls from a plurality of digital devices to any digital device or landline or cellular phone. A user can accept a phone call on their mobile device, or on their PC, or on their TV, and their CloudCast (Facility 23) directs that incoming communication to the desired device. So, for example, a user walks into their house and for awhile accepts calls on their mobile handset. When they are at their PC all calls could be routed there. And when watching TV, all calls routed there. Senders no longer have to remember a recipient's phone number, email address, instant message (IM) screen name, etc. they can direct all contact the person's mobile (Mobi) IP address.

Uses can have separate work and home IP addresses, and they can change IP addresses every few weeks if a user wishes. Phone Widge includes all the conventional art calling features and adds features such as shareable, unlimited blocked numbers list (VictorsList Facility 18). Users can share/chat/blog with others receiving unwanted calls. Phone Widge is Web Pref (Facility 20) compatible; thus users can remain invisible to some, or all, callers. Phone Widge provides alphanumeric phone number translation (e.g. 1-800-FLOWERS is translated into the actual digits to be dialed). Users can choose to get paid to accept ads and offers via phone can reduce the cost (if any) for user's calls.

Users can communicate via Tilz (Facility 30), such as when they are using their contact manager Tactilz (Facility 13) or networking facility Galaxz (Facility 5) or phonebook facility Phonebook Widge (Facility 10). When a user is utilizing a Tilz, they don't have to quit (or switch away from) the Tilz, and open a telephone widget, instead they can establish a plurality of communication modalities directly from within Tilz. Phone Widge technology enables far more user friendly communications, powered by technologies that include: Multi com modes (cellular, VOIP, Web meeting, email, etc); Multi-service IP (simultaneous multi-service IP communications capability. For instance, a user can make a call from one VOIP provider's service to another person using a different VOIP service); Multi-protocol (MSN, Yahoo!, etc. XMPP (extensible messaging and presence protocol—open XML. Additionally, with Phone Widge users can make calls in new ways. Such as Bluetooth to existing landlines and/or via dark fiber and/or via cable lines and/or via satellite. Phone Widge provides a path for corporations to move off their legacy PBX phone systems to the IP phone services market. With all the features accessible via new phone handsets—the Mobi mobile handset, not just the big, ugly conventional art desk phones typical of legacy corporate phone systems.); Multi-session (Phone Widge enables the user to make several "calls" simultaneously. Every session owns a single thread for each process. Phone Widge manages session quality, capacity, and availability. Users have the ability to have numerous simultaneous phone calls at once. Job site managers, for instance, can have open lines to each of their direct reports plus be able to take incoming calls from suppliers or family members. Phone Widge's multi-session technology combines the best features of older push-to-talk systems with more modern IP communications, in a voice, video and text communications trifecta.); Multi-OS (across the varying operating systems, both mobile and PC); Multi-radio devices (WiFi, ethernet, 3G, POTS, et. al. Users no longer have to make carrier or technology-based decisions for their communications. Phone Widge soft radio and translation technology ensures that users will be able to connect to and from most any network available); Unified IP addressing (contact a user at a single IP address: the mobile device knows where to send calls, chat, messaging, email, etc. via the user's My Cookiez or ComCloud profile).

Unlike conventional art VOIP systems/services, Phone Widge provides VOIP calling that interoperates with landline phone systems and dark fiber. Phone Widge enables traffic to be offloaded onto landline phone lines, or the currently multitudinous dark fiber, in preference to wireless carrier network or other means. Phone Widge enables current landline phone companies to turn a portion of their existing lines into voice over IP lines. Moves traffic off wireless networks and onto available landlines. Landline companies are losing accounts each month, as people move to wireless instead. Phone Widge can provide a much needed return on that huge capital investment (their landline phone infrastructure). Phone Widge utilizes VOIP or wireless for limited distances, then offloads the call to the closest available landline. WebDrops (a Mobi embodiment, that (among other functions) facilitates traffic routing from, say, wireless networks to landline or fiber optic networks) are smart, and continuously monitor their line's availability, and CloudCast that availability to nearby mobile handsets and/or cell towers, offering that availability to handoff the call. This unique algorithmic solution is not being employed in the industry today. Webdrops topology/systems also improve call reliability. Landline owners are incentivized to utilize Phone Widge technology because they'll share in any software, services and/or transaction revenue that takes place over their landline. Phone Widge moves voice and/or data traffic onto fiber from Mobi devices (and other devices) as soon as possible via the nearest WebDrop, such as a Survey Egg (Facility 39). As the practice of using less-than-fully-utilized phone lines grows, it will engender a new class or circuit switches, that act as dual circuit and IP switches and enable better speeds over phone lines—for services such as DSL, as well as reduce the number of dropped calls.

A premium version of Phone Widge may be white-labeled to cable TV companies. In such an instance, Phone Widge acts as the technology supplier to various cable companies to offer wireless phone service. Phone Widge service may be (original equipment manufacturer) OEM'ed to third parties. In embodiments proprietary technology-on-a-chip enables additional functionality. With Phone Widge users can send voicemails the way they send text messages, to individuals or blocks of recipients. Users can respond to voicemails by including the original caller's voicemail, ala email.

Phone Widge is hardware and software technology that is going to revolutionize the communication industry. Current wireless and landline network topologies and technologies were developed a long time ago. Long before the forthcoming smartphone revolution. The smartphone and similar connected devices are becoming the next computing platform. Neither the current wireless or landline networks were designed with such a momentous shift in mind Phone Widge's proprietary technology merges the mobility of wireless networks with the speed and reliability of landline networks (copper+dark fiber). Phone Widge offers an exciting path for existing network players to move from commoditized traffic haulage, to the 21st century model of profiting from the software, services and transactions that their networks enable.

Facility 10

On-Device and Network Phonebook Facility

5110

In embodiments, a module that facilitates a transactable, multi-flavored, user-created and user-rated phonebook system (hereafter "Phonebook Widge") is provided. Phonebooks should be on phones. And "yellow" pages should also be sorted by the tasks or problems the user is trying to accomplish/solve. Phonebook Widge is a transaction platform. Every entry is a transactable Tilz. Affinity-specific pictures, video, or other digital content. Entries can be the public Tilz for that individual or business. Transactable: if it's a sporting goods store entry, users can click through the Phonebook Widge Tilz to, say, weight benches and make a purchase. Multi-flavored: Tilz (phonebook entries) appear according user's profile (different income brackets, ethnicities, languages, private groups, etc.)—resulting in a vast plurality of phonebooks (for instance geared toward: science fiction buffs, brides-to-be, truckers, sports fanatics, Spanish language, etc.). Phonebook Widge thereby makes it easier for vendors to target ad messages. User-created: users can add or create Tilz for other people or establishments. Users can receive commissions if the Tilz they added/created is used by future patrons. User-rated: users rate their experience and users get paid for helpful reviews that lead to transactions.

Reverse paid lookup. Instead of making a critical decision alone, some users might prefer pay for informed Tilz from a highly rated expert. For example, let's say a user is looking up "horses." The user wants information on boarding, as well as riding lessons. Phonebook Widge can pull content from unconventional sources such as VictorsList (Facility 18) and Hosted Everything (Facility 6), where knowledgeable users may have lists or collections of information relating to horses. Some list content will be free, but others, such as the Divine Equine List, are paid. So a user who needs to make a multi-thousand dollar decision regarding their expensive horse care, and the safety of their child rider, might prefer Tilz from a highly rated, horse expert, that costs $25. In contrast to paid search, reverse paid lookup is a form of search wherein some users might choose to pay to receive information from a highly rated authoritative source.

Problem Tilz. Phonebook Widge has local answers to problem Tilz. Instead of each person having to become an expert. They can rely on others who have solved the same and/or similar problem. Many times users go to the phonebook to find a solution to a problem, such as "screen door needs repair." If a user happened to live in a housing development, where a plurality of home were built near the same time, it's likely that other homeowners have experienced the same problem with screen doors. That is to say, this problem has already been solved before, therefor it is desirable to enable other users to benefit from the time/energy that others invested in finding a good solution (which might have taken many phone calls over many hours to find a reliable, inexpensive screen door repair person/company). Phonebook Widge captures these "best solutions" via Tilz, to which other users seeking to solve that same problem can subscribe, either for free or for a fee. User-created: once a homeowner finds a good handyman or company to fix the sticky sliding screen door they create a Tilz for that contractor. User-rated: when other homeowners use that same highly-rated contractor, the Tilz creator gets paid a commission. Thus via Phonebook Widge users can be rewarded for the time/effort they put into finding a solution to a problem. Users simply create a Tilz for that problem (screen door repair) that then becomes a Phonebook Widge entry.

Solution Tilz. Every entry is a transactable Tilz. Tag-matched: any Tilz that matches these tags is the "answer" to "how do I repair a screen door damaged by my pet?" (Phonebook Widge thereby enables voice search/control for devices with voice recognition facilities) General Solution Tilz: after a user finds a trustworthy handyman who makes housecalls and works on jobs as small as one screen door at a time, that user can post a Tilz for that handyman. Local Solutions: users with highly-rated solutions Tilz can post it for their zip code. Tilz creator gets paid.

Phonebook Widge Tilz include Net Dotz IP barcodes (Facility 27) on every listing (Tilz), which enable a user to scan and easily add that vendor or individual to various user profiles (such as Ad Widge profile (Facility 1), or Coupon Widge profile (Facility 3)). Users maintain control of their personal listings Tilz, and get paid to allow people/entities to see their phone number or send ads/offer to their Tilz. Others can simply drag any Tilz (containing any type of content (ad, video, coupon, correspondence, anything) onto the desired Phonebook Widge Tilz, in this case, the white pages people listings, and it will be "delivered" to the recipient. Thereby Phonebook Widge also becomes a delivery mechanism that further reduces the need for today's email. And GPS coordinates on Phonebook Widge Tilz enable users new ways to find businesses, homes, as well as travel monuments or sites.

Tilz hub. In embodiments Phonebook Widge is a marketplace for items people are searching for and wanting to purchase. When a user creates a Tilz for an item, it also posted to Phonebook Widge. For example, let's say an antique hunter is digging through some old barns. As that user finds various interesting items, that user can utilize their mobile device (Mobi) to create a Tilz for each item. As such Tilz are created, they are also (automatically) posted to Phonebook Widge. Thusly as users find items such as an antique brass cash register or a 1954 Studebaker hubcap, Tilz are created and posted to Phonebook Widge.

Such item entries facilitate a Phonebook Widge feature called Direct Navigation, wherein uses type in the name of the specific item they want (i.e. enables users to type in "Studebaker hubcap," rather than simply looking through the phonebook for Car Parts companies listings. Instead of looking up Automobile Parts in the phonebook, then finding a listing such as Kragen Auto Parts or even possibly a Classic Auto Parts dealer (which may or may not happen to have a 1954 Studebaker hubcap), with Phonebook Widge the user finds the item directly. And the user who created the Tilz for that Studebaker hubcap, after coming across it in an old barn, receives a commission when the hubcap is sold. Instead of a 2-step process as per the conventional art, where users first find a dealer, then call the dealer, and ask if the dealer can find the part, Phonebook Widge users move to a new paradigm—Direct Navigation—to find individual items. Users type in what they want, and Phonebook Widge has listings for individual items.

Transparent Inventory: companies (or other entities) can surface their actual realtime stock (as if the dealer's entire inventory were encased in a glass cube warehouse) so that users can see (and purchase) individual items. An automobile parts store, for instance, can create Tilz (or simply user the Tilz supplied by the original equipment manufacturer) and surface them to Phonebook Widge, so users can directly query for items they are seeking. It's as if the user is presented with the dealer's entire inventory encased in a glass cube warehouse, such that the user can see all the Tilz for all the items that dealer carriers. No more walking into a store and asking: "Do you carry the Acme 1000 wrench?" With Phonebook Widge users can look up in advance whether a store carries such an item and even if they have it in stock. Users can perform this function for library books. Now with Phonebook Widge users can accomplish this with every item in every store (including every type of store from a flea market stand in Indiana to a bazaar stall in Marrakech).

Map Mashups: users can type "1954 Studebaker hubcap" into Phonebook Widge and see the result mashed up on a map of their choice showing all 1954 Studebaker hubcaps for sale (and/or even those on cars in car museums, or private collections).

Live Layers: users walking past a store and holding their mobile device in front of them, while the mobile device is pointed at a store can "see" the items inside that store that meet the user's profile. Items shown can be limited to each use's profile of items such as on Gift Lists, or their Monthly Shopping List, etc. Additionally stores can position a flatscreen TV in the window, and as different users stand in front of (or pass by) the window their CloudCast can indicate the items they're interested in and those items can be displayed on the TV. To show users its worth going inside—perhaps with customized coupon or discount enticements (which users get paid to receive). Windows could also be graphene coated to form a window "screen" that can display the same information at a TV screen.

Saved Searches: after a user becomes a mini-expert on granite countertop installation/installers, that search can be saved on Phonebook Widge. Phonebook Widge indexes knowledge. Saved searches can be offered to others for free or for a fee. Many tasks, such as getting a new granite countertop for the kitchen, start off with the phone book or search engine, whereupon users work their way through many calls for both suppliers and installers and include other calls to get recommendations from friends. Finally, after much effort, the result is a supplier and/or installer as their "best" solution. As per the conventional art, the result of all those searches are lost, and are not captured anywhere. Now that this person has become a mini "expert" on granite countertops, this information should be saved somewhere—in Phonebook Widge. Saved searches become another source of transaction income that is shared by the saved-search Tilz creator, in addition to income for the kitchen countertop supplier and installer. Yet another example where users get paid.

Master Tilz entry versus affinity Tilz entry. For example, a business puts up their main, master, Tilz for their business. They can also have custom skins of that Tilz that might appeal to different affinity groups, as well as let others put up skins (subject to company approval) for various affinity groups. A business can create different Tilz for each affinity group phonebook. So if there is a Phonebook Widge phonebook for the college students affinity group, or the elderly, or a particular ethnic group, etc. that business can post customized Tilz for each of those different affinity phonebooks. A business can choose to allow others to place their master Tilz in affinity phonebooks. Users are incentivized to do so, as, in embodiments, users get paid a commission on the first affinity transaction based on that placed Tilz. In embodiments the user and Phonebook Widge receive commissions on the first transaction, after posting, say, a plumber's Tilz in an affinity Phonebook Widge phonebook. And if that plumber rides his Harley motorcycle to his appointments with his sidecar full of tools—he might also appeal to Motorcycle Enthusiasts affinity groups. It's easy to add to or change Tilz content. Users don't need to rely on an IT (information technology) person, or graphic artist, or marketing firm to make changes to Tilz. It's as simple as posting to a conventional art social networking site, or editing a conventional art word processing document.

Phonebook Widge is a far superior, always on the user's digital device, phonebook. Even when no Internet connection is available, since, in embodiments, the Phonebook Widge Tilz are literally download to the user's devices. Conventional art yellow pages phonebooks charge advertisers as much as $1000 to produce a 30-second ad, plus $2-$4 per click. Phonebook Widge lets users upload video ads/pictures/text for free. Vendors pay for actual calls received (not clicks) and/or only pay for transactions made. Third parties (such as graphic artists or GPS companies) can run software applications on the Phonebook Widge platform. Social networking tools enable vendors to interact with one another, as well as customers and potential customers. Vendors can share tips or ideas about how to run their business or get a zoning variance, etc. Users can also host their personal or business Phonebook Widge Tilz on their mobile device (or PC or TV).

Phonebook Widge completely reinvents the concept of a phonebooks and turns it into a revolutionary transaction platform. Not only are there a plurality of affinity specific Phonebook Widge phonebooks, but the users get paid to help create those affinity specific phonebooks. And users get paid to post solutions (Tilz) to problems—another unique incarnation of a phonebook.

Facility 11

Digital Content Preview Facility

5111

In embodiments, a module that facilitates digital content preview (hereafter "P-mail Widge") is provided. For example, virtually all analog bulk mail (aka junk mail) a user receives (via postal mail) is in digital form before being printed. P-mail Widge saves and presents that digital form wherein recipients are sent a small digital preview (a Tilz, Facility 30) of the mail item. Recipients then indicate to the sender whether such an item is of any interest to the recipient. Saves senders money. Saves recipients time. Saves planet from unnecessary trash, as well as harmful chemical inks seepage. P-mail is interactive, previewable and rejectable. Instead of sending conventional junk mail to millions of users, bulk mailers send it electronically to users first. Users then choose which items to receive (and which not to receive) which then informs their bulk mail profile. A user's P-mail Widge profile applies not just to non-digital bulk mail (such as conventional postal mail junk mail), but to all digital forms of mail—including email. P-mail thusly helps shield users from information overload by combatting the flood of unwanted emails, paid text ads, digital voice-service ads, etc.

P-mail recipients receive preview Tilz, which users can click on for more detailed information and then indicate whether they want to receive it in the future. And P-mail users can then print, and/or receive, only those items desired. Users thusly create a profile of what they want to receive. And users have the option of printing out the mail item on their own printer with recipients possibly getting paid by sender to do so (to cover the cost of ink, paper and the recipient's time). Junk mail is turned on its head, with users getting paid to receive bulk mail items, whether electronically or vis postal mail hardcopy. But those users with a low conversion ratio (those who get paid, say, to receive lots of catalogs, but don't make purchases from those catalogs) will likely be paid less and less by those catalog senders, and possibly eventually eliminated from that catalog sender's mailing list (or simply paid zero).

The format of the preview Tilz is unlimited. It can be viewed on the user's TV, mobile device, or any other device of their choosing. The Tilz can be, for example, an animated box that opens to reveal the catalog that the user otherwise would have received in their snail mail. The user can click and browse the digital version of the catalog before deciding if they want to receive a hardcopy via snail mail, or even be printed, on-demand at their own printer. The user can also choose whether or not to continue to receive the catalog either digitally or via snail mail. And the user gets paid to receive it whichever way they wish (with perhaps a higher payment for the digital version, since it costs the company less to send it digitally). Bulk mail presented digitally via P-mail Widge can be much more visually interesting than conventional art bulk mail. And users get paid to receive competing offers. Once a user decides to keep the digital preview (a Tilz) of, say, a particular Homes for Sale catalog, the Tilz is added to that user's ComCloud (Facility 23) and the user can choose to accept offers, such as offers from competing Home for Sale catalogs (or similar). In embodiments, Tilz a user receives are mapped onto a multi-faceted sphere. Competitors to that catalog, can then pay for priority placement on the user's Real Estate sphere.

P-mail method. Each user is given an IPv21 # (Facility 25) mailbox. Every piece of mail is assigned an unique IPv21 #. Users create a P-mail profile, indicating the items and types of items the user wants and doesn't want. For example, no more credit card offers for the next 5 years. P-mail responds to a user's preference profile (Web Pref Facility 20). And thus informs senders of junk mail (and others) how better to tailor their messaging to various types of recipients. Via Web Pref users indicate their preferences as to how they like information presented; for instance, lots of pictures with very little text, or the user like comparisons to competitive products or wants videos or Tilz on the user's TV. The user's Ad Widge (Facility 1) profile, includes information such as which types of ads the user will accept. P-mail can be printed by the recipient (users gets paid). P-mail can be printed and delivered by third parties such as the local FedEx Kinkos, or the local newspaper (which could become another source of income for ailing local newspapers).

P-mail example. Catalog shippers, such as Sharper Image, Herrington, etc. mail out millions of catalogs every year, most of which get tossed in the trash unread. Before the expense of printing and shipping millions of hard copy catalogs, they can utilize P-mail Widge to email a Tilz of the catalog to recipients. In embodiments a Tilz with just a preview of the catalog is sent to the recipient before deciding if they want the full printed or digital Tilz version. The majority of recipients may decline the Tilz, which helps focus the sender's attention on interested recipients. Users can utilize the electronic Tilz version of the catalog to view items and make purchases directly from; or users can request a hard copy catalog be postal mailed to them. Users can set their price to be paid to receive P-mail.

Some may consider conventional art bulk mailers to be eco-terrorists. Over 100 million trees are cut down each year to print bulk mail items. Felled trees are no longer able to reduce greenhouse gases such as carbon dioxide. Bulk mail items are engorging the world's overcrowded landfills. Many inks used are hazardous to the environment, leeching into the soil and groundwater.

Why will bulk mailers use P-mail? Save money. Bulk mailers save millions annually by not sending mail items to recipients not interested in receiving them, even after paying the 1% of users who actually want the items. Respect recipients. Bulk mailers don't want to annoy potential customers by sending them junk mail they don't want. Information more current. Information can be up to the minute, because P-mail is an electronic Tilz. Information more interesting. P-mail items can, for instance, be animated or feature eye-catching motion, or music or even be delivered with a voice-over by a famous actor or cartoon character. Web Pref informs bulk mailers how each user wants their information presented. Information more relevant. The user's Ad Widge profile also informs bulk mailers which bulk mail items the user actually wants.

Why will the public use P-mail? Users get paid. Bulk mailers pays users to send preview Tilz (fees they have traditionally been paying, for instance to marketing list companies). And since users indicate that they want or don't want various items, bulk mailers build up more accurate lists of recipients to mail to. Bulk mailers also pay users to print their mail item on the user's printer. And in embodiments P-mail shares in the bulk mailer's savings, which in turn P-mail shares with users. Reduce junk mail. A plurality of users find this attractive. Information more current. Can be updated to the minute. Information more interesting. The user's Web Pref profile determines how and when and where a users wants the information presented. Perhaps on a user's TV between 7 PM and 9 PM. And the information can be animated, voice, video, etc. Information more relevant. Ad Widge profile limits items to that which the user wants.

Move beyond bulk mail and junk mail. All types of mail can be sent via P-mail, including catalogs that companies ship to each other, or reports that divisions send to each other, or reports to one's boss.

Most everyone is short on time. Even if bulk mail weren't an ecological disaster, people still want to receive their information in a more convenient format and P-mail Widge achieves just that. And the information can be presented in a much more compelling format, that is more informative and useful for users, and leads to better financial results for bulk mailers. After receiving a preview Tilz of a mail item uses can easily indicate whether such an item is relevant or desired. And thus build up a profile that others can pay the user to determine if it's worth (paying the user again) to send such items to that user. In addition the user can get paid to receive competing or complimentary items related to that preview Tilz. P-mail Widge enables bulk mailers to save time and money, and users to save time and get paid money.

Facility 12

Interactive, Wireless Printing Facility

5112

In embodiments, a module that facilitates mobile Internet protocol IP printing (hereafter "Print Widge") is provided. Print Widge provides personal-scale printing capabilities to and from mobile devices via the user of wireless IP-enabled printers. And Print Widge cuts down on the need to fax or snail/postal mail items. New facet to printer manufacturer's business: from selling "printers" to selling "printing." Print Widge enables ad hoc printing, and wraps innovative service around the mobile IP printing technology. In embodiments Print Widge printer manufacturers get paid a cut of all transaction income (such as printing out a check or a coupon). So too, in embodiments, network carriers get paid if their network was utilized for the connection. And the printer owner gets a cut of the transaction income (such as the hotel or coffee shop that owns the printer). Printing via via a plurality of modalities including, but not limited to, Bluetooth, WiFi are supported by Print Widge.

As a user uses their mobile handset during the course of the day, they might have a few items they wish to print; such items are stored in the user's Print Widge queue awaiting an ad hoc connection with a wireless printer. Print Widge then negotiates terms for the printing (e.g. free, 2 cents per page, $1 per page, etc.) then provides a secure connection and verified print job receipt. In embodiments a sub-module is configured to provide a digital signature, that can also be further authenticated. Users can print from a mobile device, their TV, a car or anywhere. Printers within range of a user's mobile device can wirelessly offer to print any queued print job for X price per page: "Westin Plaza New York City Hotel Lobby printer #2507 offers to print your queued Tilz print job for 25 cents per page."

Print Widge users can receive hard copy faxes on their mobile device. Such faxes are received electronically, and print when the user is near an IP-enabled printer. DirecPrint can replace faxes. User receives a fax Tilz (and optionally an e-copy via email). Faxes may be printed on color and laser printers, if available. Now, like email, faxes find the recipient wherever they physically are. With a conventional fax: recipient pays for the cost of printing the fax; with Print Widge DirecPrint: sender pays for the cost of printing the fax. With Print Widge no longer do the recipients of a fax have to pay the costs. Users get paid.

Print Widge also reduces the need for sending postal mail. DirecPrint enables a user to print a document at the intended recipient's nearest IP-enabled printer, with a verified receipt, saving the need to pay postage, FedEx, etc to deliver some documents. Instead of paying, for example, the U.S. Postal Service, the sender pays the recipient. Recipients split the income with Print Widge, printer manufacturer, (mobile) device manufacturer, and network provider (if any). Users with Print Widge can send an IP-enabled printer a document, including carbon copying cc'ing a printer (sender's, recipient's, or even a third party's printer) as a hardcopy backup, when sending a document. With Print Widge users get a verified email plus a hardcopy for less than the cost of a first class stamp. In addition, with Print Widge the sender, the recipient and the printer can all be on different networks (or no networks at all), and can use any wired or wireless means of transmission (WiFi, cellular, Bluetooth, RFID, et. al.). If the intended recipient printer is unavailable, Print Widge can keep re-sending (at user selected intervals) if haven't yet received a successful delivery handshake; or the document can be stored at the recipient's IP address (IPv21 # Facility 25) (via forwarding to their main IPv21 #) or via forwarding to their designated conventional email address. The user can also pay Print Widge to store and deliver the message, when the recipient's IP address next connects to the Internet.

DirecPrint Preview: at the recipient's option, the recipient can receive a preview Tilz of the document being sent to the recipient for DirecPrinting. The preview Tilz is sent to the user's mobile device (or any other digital device, as per the user's profile). Recipient can decide whether to print the document at all. The recipient can also (re-)negotiate the fees recipient is paid to print the fax/document. User can set high default fee to dissuade certain, or most, fax senders. Other uses: preview ticket Tilz, then print boarding pass or concert ticket (if necessary) at the airport/concert venue. People with mobile devices but without a paid wireless network carrier and with no printers can, via Print Widge, be fully functional. Others with network access can receive the DirecPrint, and hand off that document Tilz to the end user via Bluetooth when near them. Some users would never need to purchase a printer. This could be an especially compelling feature for emerging-market countries.

Boarding Pass. Airline (and other transportation modality) boarding pass Tilz are sent to the user's mobile device. The user can print the boarding pass. Or it can be printed wirelessly from the user's mobile device on airport kiosk printers. Or the user can display it on their mobile device for scanning at the gate. Or it can be transmitted wirelessly via Bluetooth or RFID to security checkpoints or the boarding gate stations. Among other embodiments.

Competition printing: local coffee shop might offer first 5 pages free printing to compete with Starbucks. Free printer at Target could be located near a checkout last-minute small-items display in the hopes of gaining sales to offset free printing. Or one page free black and white printing for each dollar spent at Target last month.

Ads/offers: users get paid by advertisers, say, 20 cents per page, to receive and print ads/coupons—saving advertisers the cost to pay local newspaper, magazine, radio, TV. Users scan the barcode of their printer, then scan barcodes of their ink cartridges, then scan the barcode of their paper ream. Print Widge then calculates the cost per page to print after the user sets the desired profit margin per printed page.

Facility 13

Contact Management Facility

5113

In embodiments, a module that facilitates contact management (hereafter "Tactilz" and sounds like a shortened version of "contact tiles" or "tactiles") is provided. Tactilz (wherein the contact tiles are "Tilz" Facility 30) is a contacts organizer replacement for address books. Users can build Tactilz by adding photos, videos, blog entries, etc. Tilz subject can tag any content they create, and it will appear on the Tactilz. Tactilz work offline, so the address book function is still viewable. Tactilz can be completely offline, only hosted on local devices such as mobile handsets and share by local means such as Bluetooth. Tactilz can also be used to socially network in asynchronous fashion.

Tactilz can be the single point of contact for a user's interaction with others. People have information about themselves spread out on many different sites. Plus users keep their own information about others in their address book. Tactilz merge all these sources into a new active and interactive live window on that person as well as act as data repository. Tactilz "subscribe" to the content generated by the Tilz subject (that the subject tags "Tactilz" and perhaps hosts only on their mobile device (Mobi)) not just content found on the Web. A user's Tactilz becomes that limited set of information that a user wants others to have regarding you. For example, if Joe Smith has a new baby, the baby's name and birthdate can be tagged and thus automatically synced to the Joe Smith Tactilz in Joe's friends' and associates' address books. Or Joe could tag the latest photo of his dog, or daughter, or car, or house, that he wants others to have. And it will automatically replace any earlier photo of that same item or person on all dependent (or slaved or subscribed) Joe Smith Tactilz.

The Tactilz for that user becomes a personal portfolio. Content to be added to one's Tactilz, can be "sneaker-netted" (peer-to-peer) from person to person directly via say Bluetooth. Conventional art digital address books copy too closely the offline model, instead of leveraging the full power of connected digital content. And with conventional art address books even electronic address book users have to manually update the information about each contact. For example, if a contact moves, and thus has a new home address, a conventional art address book isn't aware of the new address, and must be updated manually by the address book owner, who has to have had some notice of the new address. With Tactilz, each element of the Tactilz is a sub-Tilz. And that sub-Tilz subscribes to its information source, in this case a person's address; so if that person moves, and updates that person's address, all subscribed Tilz are thereby updated.

Tactilz work offline. So if users add content, ala a social networking site, content can be viewed offline as well. Tactilz can be completely offline. Tilz can be created and hosted on, for instance, a user's mobile device, but never posted to any Website. Instead, shared via non-Internet means, such as Bluetooth and other unconventional means. Tactilz can be utilized to socially network in asynchronous fashion. Users can post comments or updates, that may not be immediately viewable by recipients, as per both party's Tilz being simultaneously connected.

Tactilz change depending upon the viewer. For example, which Tactilz are visible/shown and what information is displayed depends upon the viewer's profiles (more information is displayed for friends, than perhaps for one's boss). Tactilz are Web Pref (Facility 20) and Web Cred (Facility 19) compatible, and thus display information as per the viewer's preferences, and/or only displays information if certain verifiable bona fides are met. Users can communicate from Tactilz: voice, video chat, text, IM, etc. Users can contact each other via Tactilz, and users can drag iDough (Facility 7) from their Tactilz to another user's Tactilz to send that person money, wherein, in embodiments, an animation of a user's $10 bill, for example, waving goodbye to the user, constitutes the money transfer confirmation. Users can transact from Tactilz (Tilz are transactable objects). The Tactilz for a pet food store enables users to order, say, a dog crate from the actual Tactilz. Tactilz templates. To create items such as business cards, greeting cards, and cool display layouts. Users get paid to utilize sponsored Tactilz templates. The Tactilz for a user's soccer team members could be presented in a Tilz template that feature Nike's logo or other live information (such as World Cup sports scores) and animation from Nike. Tactilz are ParaSite (Facility 29) compatible, and thus can automatically import select content from other sites, such as most viewed/recent/etc. information from Myspace or Galaxz (Facility 5). Users get paid to accept offers for gifts they are considering purchasing for their contacts. Tactilz becomes an easy sorting system (powered by Sorto, Facility 8) for users. With Tactilz users can drag anything related to their friend Joe Smith, onto Joe Smith's Tactilz. So for instance, if while the user is shopping, in a bricks and mortar store, the user comes across a gift they might want to get for Joe Smith someday, the user can scan that item to receive its Tilz, and drag those Tilz onto Joe Smith's Tactilz. Users get paid to accept offers from retailers who can supply that gift for Joe Smith. Cliff Notes database for most important information about that contact. Users can select the desired content they want for each contact's summary Tilz. Such as, names of children, companies they've worked at, a few important dates (birthday, anniversary, etc.) or even gifts that person wants or others think they'd want. Tactilz can provide a summary, a "Cliff Notes" version of all the information out there about that person.

In embodiments an animated module is provided that encourages users to keep in touch with their contacts. The Tactilz virtual environment module enables users to interact and transact in new and novel ways. For instance, a user could send another user virtual flowers (and pay for same via iDough (Facility 7) credits). Tactilz sells virtual items to keep in touch with a user's various sets of contacts in this virtual world. Relationships wither if users don't stay in touch. Enables creators of virtual environments to create mashups with users' Tactilz. Tilz can take any form including each user's avatar.

Tactilz as CRM tool. Conventional art customer relationship management software can be dry and uninviting. The Tactilz virtual environment is a novel spin that makes CRM interesting and far more engaging, all the while encouraging, for instance, salespeople to get in touch with clients and customers.

There's a plethora of information out there about each person. To find out what's going on with someone a user might have to check several online conventional art modalities. For those users who don't want to know every single detail of their friends and associate's lives, and be privy to every single thing they have to say on every single subject, every single minute of every single day, those users can get the Cliff Notes version via Tactilz. With conventional art electronic organizers the information in them is static, and isn't automatically updated when new information becomes available. Tactilz enable a custom presentation (customized automatically for each viewer) of information about a user, that is fully compatible with the forthcoming trend to host data on one's mobile device (and other devices) CloudCast (Facility 23), and not necessarily on public profile parking sites. Tactilz are presented in a more visually compelling fashion than conventional art digital representations of Rolodex cards. And Tactilz users get paid to utilize cool, engaging sponsored templates. And uses get paid to receive ads and offers if, for instance, they find a hat they want to purchase for Joe Smith and drag that hat Tilz to Joe Smith's Tactilz. Prior to Tactilz, no other company had made an address book an income center.

Facility 14

Peer-to-Peer and Networked Transaction Facility 5114

In embodiments, a module that facilitates multi-modal buying/selling (hereafter "Trade Widge") is provided. With Trade Widge users simply carry around the Tilz (digital profiles) (Facility 30) of the items they want to buy and sell, actually on their mobile devices and broadcast those profiles (CloudCast, Facility 23) to complete transactions with all users everywhere. S-commerce (spontaneous commerce) begins to supplant the aging e-commerce model. For example, carry the list of items you want to sell on your mobile device and Trade Widge profile matches with other users who want to purchase such items. Trade Widge is Internet optional (devices that lack wireless carrier network service can transact via means such as Bluetooth and WiFi), and features one-to-many, and peer-to-peer trading services technology. Users can broadcast their item's profile (CloudCast) to the whole world or limit it to those within 10 feet.

Mobile synchronous and asynchronous transactions. Tilz of items for sales can be carried by others, say on their mobile devices, and have those Tilz shared with people that person comes in contact with (possibly sans Internet, instead via means such as Bluetooth). In such a geometric fashion is the power of Trade Widge multiplied, as users share their profiles (say, of things for sale) with others who share them with others, and so on. Unique digital transactions technology involving the buying, selling and trading or bartering of goods and services. Users walk around continuously CloudCasting a profile of their wants and needs from their mobile device.

Continuous "eBay" but for the real world. Users simply list their trade items in their Trade Widge profile on the user's mobile device and Trade Widge continuously puts out a CloudCast of those items—which are received by others (and Trade Widgets) who are seeking to buy/sell/trade those items. An important distinction between Trade Widge and business-to-business marketplace sites such as Alibaba (which same functions Trade Widge can perform), is that Trade Widge doesn't need to invest capital in, say a network of warehouses, because Trade Widge doesn't warehouse, inventory and/or distribute items for sale. Trade Widge instead facilitates (local or global) profile matches, profiles which are hosted locally by each entity, on their own devices such as mobile devices (Mobis).

Users don't have to log onto a site such as eBay to trade items. Users simply list their trade items in their Trade Widge profile on, for instance, the user's mobile device (Mobi), and Trade Widge continuously CloudCasts those items; which are received/profile matched by others (and Trade Widgets) who are seeking to buy/sell/trade those same/similar items. For example, let's say a user at their home office suddenly needs foam core board for some signs. The user opens Trade Widge, and types/speaks "Need five 2'×3' foam core boards." The Trade Widge CloudCast then profile matches from entities such as: local stores, or neighbors who have extra foam core board they want to sell/get rid of. Thus with minimal effort, the user can drive to the closest or cheapest vendor/neighbor, and get the needed foam core board.

User's advantage: list items once. Users simply list their buy/sell items on their own mobile device (or other device or online), as opposed to having to "go" to eBay, Craigslist, etc. and enter or look for the items on multiple Websites. If a user wants something, just add it to that user's ComCloud (Facility 23) via Trade Widge and anywhere in the world that something is Trade Widge will find it for the user.

Anonymous transactions. User #1 seeks video of top college volleyball players, and indicates they are willing to pay 50 cents. A man in China (user #2) videotapes a local college volleyball game with his mobile device. Trade Widge matches those profiles and conducts the transaction and transmission. These two users could be passing by each other in an airport, and never know who the other party to the transaction was, yet the video is transferred via Bluetooth by Trade Widge.

As the world shifts to the new computing platform as embodied by the mobile digital device, the smaller screens thereof informs a need to make a shift away from the conventional art trading sites which overwhelm some users with cluttered pages filed with countless choices. A smaller screen speaks to a need for just 2 or 3 relevant choices, curated as per the user's profile—which is what Trade Widge delivers. Trade Widge offers a simpler, more time/cost effective choice. eBay charges users a fee to list an item for sale; in embodiments listing items on Trade Widge is free (listings are generally hosted by users, not necessarily at an expensive to build and maintain data center-centric Trade Widge site). Trade Widge can be thought of as a community of users, that can be as local, and face to face as a user may wish, or be anonymous and global if the user so desires.

Internet optional commerce. Trade Widge works for users who choose not to utilize the Internet. Uses can trade and carry around other users' profiles: TV for sale, couch wanted, etc. And trade those profile via means such as Bluetooth (or other means). The geometric effect of users carrying around each others' profiles dramatically improves the effectiveness and likelihood of transactions, and will result in far more transactions than could be achieved by a conventional art (Web 1.0) portal such as eBay. And enables Trade Widge to capture transactions that eBay and Craigslist don't. Users in emerging-market countries with limited network coverage, can simply put their items for sale on their digital device (which may not have wireless carrier service) and buyers from all over the globe can asynchronously see the profiles of and purchase their items (as Tilz are passed from device to device, and perhaps even via the Internet by a downstream user).

Multi-city trading. Users can choose to allow others to carry their listings/profiles Tilz (kharmic commerce: you carry around my profiles, I carry around your profiles). Others may live in different cities or countries. Thus as those others move around in their community they expose the user's listings to entirely new audiences. Others receive commissions for completed transactions. This can be accomplished anonymously when two devices are in, say Bluetooth proximity, or users can choose to upload their listings to the Internet and allow others to download them. Multi-city trading also works as per the following example: an antique dealer travels about and rummages through old barns looking for interesting items. Even thought the antique dealer may not purchase a particular item, the dealer may know something about it (history, scarcity, collectibility, etc.) and could therefore create a Tilz for that item. That antique dealer (the Tilz creator) then gets paid a commission if that item is later sold; as greater visibility was created for that item by having a Tilz created, that first the antique dealer carried about with him, which was then passed onto others, who CloudCast it to still others, and so on, until a buyer with a profile indicating interest in such an item was matched, and thereby a transaction consummated.

Because Trade Widge is so much more flexible than existing e-commerce portals, it will likely engender new types of transactions. For example, let's say a user wants to fly guests in to their weekend wine country home, via say the local municipal airport. There are no commercial flights at this tiny airport. Thus the user needs to find a private pilot with a small plane. The users is willing to pay all costs (fuel, FBO (Fixed Base Operator) expenses, landing fees, etc.) Further the user would like to trade the pilot's time in exchange for a special wine tasting. The user intends to compare wine flights—Premium Napa Valley Cabs vs the user's favorite French chateaux. Let's say the user's favorite French wineries include: Domaine Leroy, Domain Leflaive and Chapoutier, which are being compared to both subtler Napa cabs (such as Araujo Eisele) and jammy, high octane Napa cabs (like Schrader, Old Sparky). The Tilz indicating each of these multi-hundred dollar, much sought after bottles of wines are included in the transaction profile. The user then just walks around with this proposal profile in their mobile device which CloudCasts the offer. Trade Widge automatically seeks matches (seeks out user profiles indicating pilot and wine aficionado) as well as vets (via Web Cred Facility 19) potential participants. Such a deal is unlikely to be consummated via a conventional art site such as eBay.

Geo-display: user could type in "freestanding basketball hoops for sale" and Trade Widge returns an interactive map with pushpins showing the locations of used basketball hoops for sale.

Pipes: users can utilize the available storage space on their mobile handset (or other digital device) to anonymously carry other users' profile requests. They can then pass those Tilz onto other users' devices, etc. An anonymous group of users forms a chain that at one end supplies (e.g. tube style TVs) and at the other end sells old tube style TVs. That is to say, Trade Widge facilitates the assembly of a chain of users, who, together know someone, who knows someone else, who wants to purchase tube style TVs. That group of users can rate themselves as a part of a successful "pipeline" for tube TV selling. That pipe can market itself as an efficient means of selling tube TVs. Pipes form for all kinds of goods and service; seeking out market inefficiencies, and meeting them via ad hoc pipes. Once established, in embodiments, the pipes are displayed via a unique animated graphic that is very engaging. Once a pipe is in place, the users and devices comprising that pipe can decide to keep the pipe active, and CloudCast its existence. The sellers on one end, and the buyers on the other end of the pipe (the people who had something to sell, and the other people who ended up purchasing the item) can then rate that pipe. That pipe can then include those (potentially) positive ratings in its CloudCast hoping to attract even more business. And very importantly companies, not just individuals, can utilize Trade Widge distribution pipes to move product or get rid of excess inventory.

Aggregated Purchase: conventional stores exist to aggregate demand for the group of items sold by that store, but often not actually made by that store; instead relying on independent manufacturers whose wares are collected and distributed to the stores by wholesalers. With Trade Widge a user's list of items that the user wants or needs to purchase is being CloudCast. User's ComClouds can thus be seen by independent manufacturers. Armed with this actual specific user demand knowledge, independent manufacturers wouldn't necessarily need to rely upon wholesalers and distributors and retail stores to get their products to customers. Independent manufacturers used to rely on stores' ability to aggregate demand for their product. But with Trade Widge finding customers and demand for specific products is nearly effortless, so manufacturers could choose to deliver directly to users—cutting our wholesalers, and distributors, and all their associated costs and markups. Manufacturer's marketing costs could also be reduced by the ability to see user's ComClouds indicating which items they regularly purchase, as well as new items they want to buy. Thus even in lower quantities of items being sold at a time, it might still be just as profitable to deal directly with some customers. Furthermore manufacturers have the option of utilizing logistics companies such as United Parcel Service (UPS) to manage distribution of product to consumers. So utilizing Trade Widge end users may even get to purchase product for substantially less than today's retail value chain. Thusly could Trade Widge markedly disrupt online and offline retailing and distribution. An associated Trade Widge feature is called Aggregated Purchase. Trade Widge can, if the user's profiles allow, maintain an aggregated view of items groups of users wish to purchase. So in fact the purchase quantities can be aggregated across a plurality of users at a time when placing orders directly with manufacturers. For example, PetSmart is a store where one can purchase dog food. However, since there are millions of users who regularly purchase a case of Alp every couple of months, Trade Widge can aggregate their individual purchase orders into groups featuring a plurality of users at a time, and place those aggregated purchase orders directly with the manufacturer of Alpo for fulfillment; with the manufacturer of Alpo offering a discounted perhaps even wholesale price for this quantity purchase. And delivery of this from one location to many locations delivery problem is perfectly suited to the distribution systems already in place by FedEx, DHL and other companies and/or could be picked up at the local PetSmart for a fee small fee paid to PetSmart.

Trade Widge will literally transform both online and offline retailing and distribution. Trade Widge alters the definition of a store. Stores can be virtual stores. For example, a Macy's department store buyer instead of acquiring items from independent suppliers and shipping those items to physical Macy's stores, simply tags the CloudCast of those items as a "Macy's Virtual Store" item. Users can then find those items either online (via CloudCast) or offline by, among other means, walking into a small store which happens to carry an item that has been tagged as a Macy's Virtual Store item. The user purchases the item directly from the supplier, and Macy's receives a commission (a commission on an item they don't "carry"). With Trade Widge users CloudCast their wants and needs from just one place (possible their mobile device), and can reach the entire world. The geometric effect of users carrying around each other's profiles, makes Trade Widge uniquely viable. And users get paid to receive ads or offers related to their items-for-sale and items-want-to-buy lists. Trade Widge is a win/win/win for all parties involved. Trade Widge is a win for item manufacturers who can, via Trade Widge, see directly demand from individuals (and other entities) for their products. Trade Widge is a win for merchants who can now expand the reach and touch of their shopping experience beyond the confines of their bricks and mortar stores. Trade Widge is a win for mobile device manufacturers and network carriers who for the first time participate in the transactions their devices/networks enable. Trade Widge is a win for users who can simply place all their wants and needs in one place, and have the world respond to them.

Facility 15

Television Interface and Control Facility

5115

In embodiments, a module that facilitates television interface and control (hereafter "Tube Widge") is provided. Tube Widge is a widget that resides on a user's set top box, DVR, Mobi Homi, or other device which is configured to enable widgets (Webified mini software applications) to work on a user's TV; as well as enable the users mobile device to act as input device (touchscreen pad and keyboard) control TV apps and function as remote control. All the widgets that work on the forthcoming smartphones can, via Tube Widge, also work on the TV, which is simply another screen. And the TV screen can be powered by the ever growing might of mobile devices (Mobis). And via Tube Widge TVs become the information and income hub of each household. Tube Widge features a new type of TV tuner that utilizes windows to display content, so the user can have many windows open (no longer limited to just, say, two tuners). In embodiments Tube Widge pulls content from any source, as per the user's profile via ComCloud (Facility 23). Users can chat/interact with friends and other users as they watch shows simultaneously.

As the mobile device becomes the next computing platform the TV screen becomes a computer monitor which can run most all of a user's software; as well as manage and play a user's digital music, photos, videos, etc. Tube Widge reduces the need for TVs to add expensive electronics that can be supplied by the user's mobile handset; i.e. enables the user's mobile device to power the content display, as well as handle widget/software management, and Internet connectivity. Thus that hardware need not be built into each TV. In embodiments Mobis are configured with tuners that can send live TV content to a user's television screen. In embodiments Mobis can replace a user's digital video recorder (DVR) or sync content from DVR to Mobi, thus making content portable. Tube Widge delivers dozens of user-friendly features lacking in conventional art DVRs. Portable, prioritized Programs list. Users can switch DVRs or TV providers with ease because a profile is stored with all the prioritized list of shows the user wants the DVR to record. Without Tube Widge, even just re-setting a DVR can mean a user has to spend a great deal of time to reprogram the DVR with the list of all the shows a user wants recorded (each week/month/etc.). Movies Not Yet Seen List. If a user keeps a list of movies they haven't yet seen, but want to, it can take a considerable amount of time each week typing into the TV's or DVR's search engine to see if such movies are available on one of the channel to which the user subscribes. With Tube Widge, the user simply creates and maintains their Movies Not Yet Seen VictorsList (Facility 18)—which is then CloudCast to the user's DVR, which (continuously) performs a search/match function against the available movies on the user's TV package. Watch 'n' Delete (destructive viewing). Users can free up space on their DVR, by enabling Watch 'n' Delete which deletes content as the user watches it, so if the user recorded a 2 hour movie, but only has watched 30 minutes of it, only the remaining 90 minutes are taking up storage space on the DVR, while the already watched 30 minutes has been deleted, thus freeing up storage space. Explicit control over individual DVR tuners. User have the option to override the DVR, and control, for instance, what gets recorded by each tuner.

Custom Critic. The user can select which movie reviewer they want for the TV listings. All movies can still be rated, say one to four stars, however if you don't agree with the movie ratings by the default reviewer that television service provider utilizes for their TV listings, then the user can opt instead for another movie critic more simpatico with the user's profile. Ability to select movies/shows for recording when they are first announced or released (instead of just whichever movies/shows are playing for the next two weeks (or whatever time span is covered by the user's television service provider's TV listings. Black bar. The ability with the push of a button to add a black bar across the bottom of the screen (or other location on the screen) to block out "bottom line" information crawls, which might give away spoiler information, say, on other sports matches the user is recording on other channels. Smart Information Crawl. An information crawl that utilizes data tiles or "Tilz" (Facility 30), thus can see which content the user has not yet viewed, and thereby leaves out those potentially "spoiler" Tilz. TV stations don't need to broadcast their content, they simply produce shows and movies and then let DVRs (or other devices) seek out their shows and download them. Change episode numbering system: 1) format: Season 2, episode 5 of 17; 2) and cumulative numbering episode 67 of 241 total episodes; and 3) also an absolute IP address for each episode via IPv21 (Facility 25).

Tube Widge makes users' TVs much more intelligent by enabling Mobi facilities to function thereon. Tube Widge is Ad Widge (Facility 1) compatible, so users can exert control over the advertising, et. al. they receive; i.e. receive ads as per the user's ad profile. Tube Widge displays content the way the user wants ads/shows displayed, as per the user's Web Pref profile Facility 20). Tube Widge also delivers blurbz (summaries) of shows by other users with similar profiles. Blurbz are shorter edited versions of shows/content, with "just the good parts" like summary Tilz for magazines. Other users can edit shows into shorter versions or clip-streams that make content more attractive to like-minded users (those with similar profiles).

Users create a wish list VictorsList (Facility 18) of programs/movies they'd like to see. Users get paid to let marketers view, for instance, their programs wish list (upcoming shows/movies that user wants to see). Users can manage all their VictorsLists on their TV. Users get paid to allow offers/ads based upon, say, the items in their VictorsLists, such as the grocery list. Thus the TV becomes an income center for user. Tube Widge reduces the need for laptops. Mobile handset (Mobi)+TV monitor works fine. The TV is a great place to manage household inventory lists and shopping list, especially since users get paid to receive list-based offers right on their TV. With Tube Widge, TV makers can glory in their new heart-of-the-home position as users' income and life management center. In embodiments Tube Widge pays a portion of all income generated by offers and transactions to the TV manufacturer, a brand new source of income for TV set hardware manufacturers, as well as content producers, channel provider (such as CBS, ABC, TNT, etc.) and content delivery entity (such as Comcast, DirecTV). Just as widgets designed for the mobile phone are less than ideal on a larger format device, widgets for the TV should be written as separate widgets that take advantage of the vast screen real estate. Tube Widge enables developers to leverage the Tube Widge platform with many built-in tools, templates and application programming interfaces (APIs).

Each ad and show and show element has its own IP address (Facility 25) assigned to it—making it easier for DVRs, for instance, to search for programs or ads the user would like to see. RFIs. Request for Information, say, about the couch in that last scene or the wheels on the car. In embodiments a Tube Widge module is provided that assigns Tilz profiles to objects and things, that appear onscreen in a show. Every show/scent item/ad has an IPv21 #. Thus a user could grab the Tilz for a couch in a seen, and further be paid to receive ads/offers/information related to that couch. The response is sent to the user as per their Web Pref profile (via snail mail or Tilz to their mobile handset or on their TV as part of their next commercial break). Others get paid too. CBS can, via Tube Widge, deliver is shows directly to individual users because they will get paid a portion of the higher user fees for Ad Widge ads, and can also make money via RFIs. Likewise the producers of the shows can just as easily offer shows directly to viewers. Users' CloudCasts (Facility 23) indicate who is interested in the show, and Ad Widge ads generate higher dollar-per-viewer income. Tube Widge is the future "TV network+cable company in-a-box." TV networks (such as ABC, NBC, etc.) are content aggregation constructs which will play a diminished role in the forthcoming one-to-one direct to users future. There will be a very big role for content curators, so TV networks simply need to adapt to the changing playing field. Same too for entities such as cable and satellite companies. Audience aggregation can be handled by online entities, or is no longer necessary at all. Also audience aggregators (such as cable and satellite companies) simply need to turn around and aggregate the collective wants and needs of their audience and make those large pools of users available to content creators and advertisers. Since Tube Widge has content aggregation and audience aggregation functionality and services, it makes sense for conventional art content aggregators and cable/satellite companies to work with Tube Widge as a hedge against changing future technologies.

Tube Widge exists not only to bring IP services to a user's TV, but also generate income from those entities wishing to serve the user ads, and product solicitations. Tube Widge also becomes the e-commerce site for the user's stuff for sale. Tube Widge becomes an income center for users. Tube Widge also creates a new income source for TV manufacturers who get paid for transactions conducted via TV. The larger dimensions of the TV screen (as compared with the mobile handset or PC/laptop) will engender even richer environments for users to interact and transact, as well as create and consume content.

Content and shows can be customized as per each user's Tube Widge profiles. For example, if a user likes a particular show, but can't stand the sappy music soundtrack, the user can, via Tube Widge, insert their own music (in accordance with content use rights). Tube Widge is Tilz compatible. Therefore all content can be customized, including program soundtracks. Other user's can subscribe (subject to content use rights) to this edited version of the program. Tilz plus Bubb Wrapp (Facility 22) handle the use rights. And customization=revenue, for all parties involved. Via Tube Widge the show's creator can accept bids from other artists to have their songs played in the background depending upon the individual viewer's preference profile (a source of income that reduces the licensing fees otherwise paid for the original background songs). Viewers can even substitute their own music from their own music collection—again likely curated by affinity group members who have a passion for doing such things.

Tube Widge enables program sponsorship on a per-viewer basis. If, for instance, a sports show was sponsored by AT&T, Coca Cola and Capital One, but the user's profile indicated that the viewer already has AT&T, drinks Coke, and has a Capital One credit card, then it wouldn't necessarily behoove those sponsors to pay to have their logo viewed by this viewer. Tube Widge can accept bids from other companies, as per the viewer's profile, to be substitute sponsors for this particular viewer's broadcast.

In embodiments, all TV content is delivered in separate Tilz. Each show is in its own Tilz. Each segment of each show is in its own Tilz. Each ad is in its own Tilz. Users can tap a Tilz to see all episodes of that show. And once a user selects a show to watch (by flicking through Tilz of available choices) the user can get paid to accept offers for how to receive the desired content (e.g. many companies can supply a movie the user wants to see—movie theaters, places that sell DVDs, etc.). Tube Widge users can create lists of shows/movies they like to see, then let entities that can supply those shows/movies, pay the user to send ads hoping to convince the user to consume that show/movie through that entity. Tube Widge also enables broadcasters to deliver features such as DVD extras for any show (e.g. behind-the-scenes making-of-the-episode videos, and even director or star commentary). Movie and TV producers can also, via Tube Widge stream content directly to users without needing huge server farms. Mobi facilities such as Packet Cache (Facility 28), Trade Widge (Facility 14), and Tube Widge automatically deliver the Tilz of a movie or TV show using various peer-to-peer methods, so that users are frequently providing the content delivery themselves. And with Bubb Wrapp, the producers are assured that they are getting paid each time their movie is viewed.

Tube Widge has advanced search capabilities. Tube Widge helps users find desired content. Few car racing fans would even know to check Bloomberg TV channel listings for racing programs. Tube Widge, however, automatically seeks content matching the user's profile. Users gets paid for paid search (content suggestions for which the user is paid). Content is delivered in Tilz to the user's Spherez (an information and navigation facility that maps Tilz onto a multi-faceted sphere, or other shape).

Corporate usage. Via Tube Widge Comcast, Verizon, Time Warner, etc. and DirecTV, Dish Network can offer their packages to their subscribers anywhere their users have an Internet connection. A users registers their DVR with the TV service provider. The DVR is the user's mobile device (Mobi Homi), which can stream live content or receive Tilz of shows. TV providers get paid for this premium "anywhere" service. Providers can charge users an additional monthly fee for the anywhere capability. Also providers share in the user's transaction income enabled by this IP TV service offering. Most mobile devices will soon have the capability to wirelessly display content on any nearby screen, thus making the anywhere service simple for users to utilize. The streaming cost to providers can be covered by ads, particularly targeted Ad Widge ads. Streaming costs are falling each year. Providers could charge a monthly fee for each registered mobile DVR (like the current monthly DVR box rental fee, but in this case the customer supplies the DVR)—which dramatically reduces the provider's costs. Providers don't have to pay for, deliver, account for, and store the bulky conventional art DVRs. Tube Widge enabling users to utilize their own digital device as their DVR, increases TV provider's margins.

Much better TV listings. TV listings can include descriptions by each show's producers. This can be far more accurate and informative than the conventional art descriptions usually featured in current listings. Pull information from the Web. With Tube Widge users can have their listings descriptions come from curators or critics with whom they have affinity or are their favorites. Uses get paid for premium listings with added content. When a user clicks on a show in the listings grid, the show's producer can offer video clips, or recommendations from critics or reviews from affinity group members to try to entice a user to view a particular program. Tube Widge delivers the equivalent of paid search for the television platform. Tube Widge enables users to create wish lists of shows or movies they'd like to see. As soon as a show is even in the writing stage, a Tilz is created. Buzz can then build which can help greenlight funding of that show. DVRs generally only have two weeks of TV listings. And without Tube Widge each user has to maintain their list of shows that are coming up more than two weeks in advance. And possibly take the time to create calendar entries to remind themselves just to set that future program to record. Once again, the conventional art TV show experience puts all the burden on the user, and demonstrates a near total lack of regard for the user experience. Switch DVRs and the user's list is gone. When a user's DVR is replaced for repair or for a different model or even just re-set by tech support, all the user's content and settings are deleted. Tube Widge maintains the user's full TV profile: the lists of shows that a user has watched, and wants to watch in the future, and has presently set to record, and what types of ads they want to see, and volume and sound system settings (surround sound, Dolby noise reduction, etc.) etc. Tube Widge maintains the user's completely portable profile. Users get paid to allow presentation providers to send ads. Content supplying entities can bid to be the entity to supply the desired content to that user. The user could get the desired content directly from the content producer's Website, or on comcast.com, or on HBO, or other means, so those entities could pay the user to make offers to deliver that content at various prices or dates.

Improved to-be-recorded lists for movies. In embodiments, a user sees an ad for a movie in the paper. The user scans the Net Dotz (Facility 27) to grab that movie's Tilz. The movie won't make it to the user's TV for 6 to 18 months, but the user never has to type in their list of movies.

Tube Widge delivers instantaneous (customized) ads. A user reading a magazine while watching TV scans an article or ad, in the magazine, and at their next commercial break an ad for that item appears on their TV. In embodiments the user receives the ad Tilz on their mobile handset in response to scanning the Net Dotz in the magazine. The user's mobile handset (Mobi) then inserts the ad into the user's Show Flo (the list of Tilz that constitute the segments of a show and its commercial break contents) automatically. Premium TV channels such as Showtime, offer a free preview once or twice a year. Via Tube Widge Showtime could offer it on a customized basis to individual users, when, for instance, Showtime sees (by monitoring that user's CloudCast) that Showtime has a movie that is on that user's Movies Not Yet Seen VictorsList.

Tube Widge platform functionality is extensible to other devices/objects such as refrigerators, cameras, cars (which can thereby run mobile device widgets on these other devices/objects).

Show Flo. Tube Widge does all the work making custom viewing simple for content providers. Tube Widge facilitates profile-based content delivery. For example, commercials on the TV are customized as per each user's profile. Content providers can send all the Tilz, suitable for any viewers, and Show Flo edits out those Tilz that are in contravention to the viewer's profile. Thus, for example, TV shows can snip out the "coming next" previews just prior to each commercial break for those users who don't like that, and can serve up the correct ads (from among the many ads, and ad versions, that may be sent to that user's mobile device (Mobi) or TV). Tube Widge saves content producers the time it would take them to send custom streams to each user. And to send the correct ads to each user. They can simply ship it all (main show, broken into sub-Tilz, ads for a wide variety of viewers, extra content, director's cut, rated-r segments, everything), and let Tube Widge do the work editing the final Show Flo—the actual series of Tilz that are presented to the user. Show Flo is also used to surface widgets, mail, coupons, and all other sorts of content as per user's profiles Think of a giant funnel-shaped hopper sifting out user-customized content which drops to the conveyor belt carrying the individual Tilz to the viewers' TV.

Tube Widge brings a unique transaction platform that transforms the TV into the hub of the home, and of a user's life. Tube Widge morphs the TV into Command Central, organizing users' lives as well as being an income center. Via Tube Widge the TV will also become one of the primary places a user conducts their social networking from. The screen size, processing power (Mobi Homi Docking Station Pro) and video display capabilities, create an unmatched platform for the next wave in social networking. With Tube Widge users get paid via paid search for simply searching for the programs and movies they want to watch. And when users maintain their VictorsLists of household items on their TV users get paid to receive offers and ads related to those VictorsList items. And television service providers' margins increase as Tube Widge enables users to utilize their own mobile handsets as their DVRs.

Facility 16

Tag-Based Search Facility

5116

In embodiments, a module that facilitates tag-based search (hereafter "uTag Search") is provided. Search should be per each user's profile and include offline content from the real world. uTag is tag-based search, and thus can even search offline items that have had tags added. uTag search results are portable on search Spherez (multi-faceted spheres onto which information/Tilz (Facility 30) are mapped). Users can get paid to accept ads/offers regarding items on their topic-specific Spherez. For example, a user's camping related searches are mapped to the user's Camping Spherez. And the user can get paid to accept further camping related information/ads/offers. As users move across the digital landscape, the Web, and even offline via scanning barcodes/RFID (and other means), users can tag content with metadata they feel make it more searchable. When a uTag user searches for "California Zinfandels" uTag can utilize data such as the user's Wine Cellar profile, to inform more relevant search results. And the user's Wine smart spherez is where the wine search result Tilz live; and will continually attract like content, and respond to changes over time to the user's profile. And users get paid by those companies to position their wine-related offers to key points on the user's Wine Spherez. With uTag, the users get paid, as opposed to the conventional search companies getting paid.

Millions of search results in microseconds is something that may impress computer scientists, but is often unhelpfully overwhelming (and not likely customized) for each user. As per conventional art search, users don't have a good way to capture and share their search results, so any knowledge a user gains is lost—not only to the user, but also to others who may wish to benefit by the user's newly gained knowledge. Search shouldn't be something a user has to do. It's something that should be done for the user. If a user is shopping and want to search for the lowest price for Wheaties cereal, with conventional art search, the user would get a result, then the result would be gone, as soon as the user started their next search. Conventional art search is ephemeral. With uTag search, the user gets the Tilz (the profile data tiles) for Wheaties. Thereupon friends, stores, competing cereal manufacturers can all direct their recommendations/offers to the user. And the user gets paid to accept offers or alternative recommendations from companies (and other entities).

uTag search replaces conventional art algorithm-based search engines. uTag employs proprietary algorithms, however, results are informed by users' profiles and users who tag content, among other unique factors). Multi-flavored, user-created, and user-rated. There are many types of people in the world, so there should be many flavors of search results. And those search results should be rated by those in each user's affinity group for accuracy and relevance. And, with uTag, users can easily create search results Tilz, and get paid for those Tilz which other users utilize. Search results for both online and offline content. Conventional art search doesn't do a good job searching the real world. With uTag, for example, a user can scan a tennis racquet with a mobile device, to search for a local tennis club where the user could play a set or two, or to find where a tennis outfit could be purchased nearby. Tenths-related content is automatically pulled onto a uTag Spherez dedicated to tennis, on the user's mobile device. Profile-based results. Search results that are delivered as per the profile of the user performing the search. With uTag the search string "Paris restaurants" returns different search results for a corporate executive than, say, for a student backpacking through Europe. (Not so, for conventional search engines which treat all users as one entity that lacks varying tastes.) Online searches (at the user's option) can be weighted by offline scans. Search "books" and uTag results may be pre-weighted toward spy novels as per the users' "Bookshelf" VictorsList (Facility 18), which is a comprehensive list of all books that user owns), or "Recent Book Purchases" VictorsList (which may make manifest the type of book the user is currently into). Portable search results. As per the conventional art a user performs a search, then hose search results disappear. And the user may have to do the same search over and over again. With uTag users can now take their search results with them on their digital devices via Spherez. Search Spherez or Tilz are available offline. With uTag search results are not a page full of blue line links, they are instead Tilz, live data tiles that summarize the searched-for information. Tilz can be kept/utilized separately or on a navigation facility, such as a Spherez. Both Tilz and Spherez actually live on a user's digital devices of choice (but can be backed up to remote servers or other means). Because search Spherez are stored locally, users have access to information, anytime, anywhere, with our without a connection to the Internet. Search becomes a new way to surface or manifest expertise. Finally uTag can automatically create or suggest tags for content that the Tilz owner can accept or reject. For example, a hunk of cheese in a grocery store, might also be tagged "Picnic Items" or "Pairs well with Syrah" not just tagged for "Weekly Groceries."

uTag turns search on its head. uTag returns search results based on user-rated search tags, not just a computer search, based on keywords or link relevancy/quantity. Furthermore if a user's tags or Tilz are part of the search result those Tilz share in the income from any uTag search keyword or display advertising. This creates an incentive for Website owners, individuals, and businesses, to make their entire Website Tilz compatible or switch to ParaSites (Facility 29) which are Tilz based. In fact it is an incentive for everyone to make all their content, online and offline, Tilz compatible—so they can share in search word advertising income. uTag also rewards those who work hardest to product the best result Tilz—good information, well presented and popular with users. Can make payments based upon clicks or transactions those Tilz generate. For example, if a user goes to a Website that features information about custom car restoration, looking for chrome tailpipes, the user could choose to add tags to the site from a drop down list (or other means) suggested from the browser or via a uTag popup Tilz. The user might add: chrome, tailpipes, Mopar, exhaust, horsepower increase, car bling, etc. Users get paid commissions for transactions on that site, that are commenced based upon the search tags they entered for that site. Thus users are incentivized to tag online and offline content. Search companies either pay battalions of engineers to write millions of lines of code for an algorithm-based result, or instead spend monies incentivizing users to tag those items, making the search results, customized as per various affinity groups.

In embodiments, uTag builds the first 10 suggested tags via algorithmic search results. From then on, the users' tags determine the top 10 tags for each affinity profile. The same method may be applied to any digital object or offline object. Additionally users can set search result "freshness" (which can be stored in their Web Prefs). For example, the user can request no search results older than, say, 6 months, or two weeks. Search results that return stale information from years ago are often a waste of time.

Conventional art search engines and search results were largely designed for the personal computer. Search results need to change as shift is made to the mobile device as the next major computing platform. Instead of a list of millions of search results, mobile device users need just a handful of relevant search results, presented in a fashion consistent with the much smaller mobile handset screen. uTag utilizes Spherez to display search results. uTag searches (can) return not just the sought after item, but also, for example, similar or competing products. Searches pull up the most relevant result in the middle, and those results with the highest tag matching score surrounding the initial search result. Meaningful adjacency. Paid search can pay for proximity to the middle Tilz on Spherez. For example, if the user was searching for general information about "pickup trucks" uTag can sell this keyword paid search result to the highest bidder and that result will appear in the coveted center or "key" Tilz. And the user gets paid by competing and paid search results. Paid and competing paid search results will be displayed if the user's profile allows piggy-back results or ads. For example, a pickup truck bed liner company may want to pay to put their Tilz next to "pickup truck" search results Tilz on the user's search Spherez.

With uTag uses have a plurality of different types of ways of having their search results presented and stored on their digital devices. And uses may utilize different paradigms depending upon whether the results are being presented on a mobile device or that user's TV. Users can flick the Spherez with their finger to navigate to other search results. Profile-based search result presentation. For example, if the user searches for a particular wine, foods matching that user's tastes appear near the search results. So if the search string was "Coppola Zin," then the center Tilz on the Spherez would be the information from Coppola Winery about their Zinfandel wines. Surrounding Tilz might include a food pairing idea Tilz, a Tilz for a wine event featuring Coppola Zin, or wine retailers that carry Coppola Zin, etc. And the user gets paid to accept these additional surrounding Tilz.

Smart Spherez. Users can tag offline content, such as a favorite shirt, and thereby by make that shirt searchable by uTag, or findable more easily by a friend. uTag can easily locate offline content not accessible by conventional search engines, such as a wine on a printed wine menu (which doesn't happen to also be online), that a customer has tagged. uTag can optionally utilize a user's clickstream to inform search results. For example, if a user searches for "California Zinfandels" over time as the user clicks on various winery Websites (or ParaSites (Facility 29) or Tilz), uTag can remember which results the user clicked on most frequently and places those wineries Tilz closest to the center (the "key" position) of the user's Wine Spherez. Smart spherez can also present results as per optional real world weightings, which compare factors such as a user's offline barcode/RFID scans. Thus vis a via the "California Zinfandels" search results, could be weighted toward Zins as follows: Zins the user owns in their wine cellar (VictorsList); or purchases most frequently in stores (Sorto Facility 8) or restaurants (Barcode Widge Facility 31 or Net Dotz Facility 27).

An uTag unique capability. As per the above example, uTag search can also return, for example, individual users who have Coppola Zin in their cellar or wine fridge (and have chosen as per their CloudCast (Facility 23) to make such information public or semi-public, either for free or for a fee, or perhaps just made visible to other wine enthusiasts who meet certain bona fides, via Web Cred Facility 19). uTag's ability to search offline content is unique. For example, if a user typed the search string "Francis Ford Coppola Director's Cut (Dry Creek Valley) Zinfandel," a conventional art search engine might return a link to an article where the wine was part of a taste test. uTag would return instead, the Tilz of the article (an actual functioning thing, not just a "link"). But the unique power of uTag is that uTag can find any other content tagged for that search string, such as a food pairing suggestion in a cookbook (the contents of which are not online).

Portable search results. Users may want to have their search results available while offline. This is particularly important for devices that don't utilize wireless carrier network service. Spherez results for various search strings are stored locally, so the user can view those relevant Tilz anytime, whether they have an Internet connection or not.

Next gen tag feeds. Anyone who creates content, can mark that content with IPv21 # (Facility 25) tags, and those who follow that tag, will get that content. Ad hoc, on-the-fly feeds, powered by uTag. Users may follow any tag. For example, "Ferrari 308." Users can follow information about Ferrari 308's (such as upcoming concours d'elegance and/or 308's for sale). And users can even post to 308, if, say, they find a great mechanic or body shop which specializes in 308's. The user can tag that mechanic's Tilz, or that body shop's Tilz with the "Ferrari 308" tag, without having to be, for instance, the Ferrari car corporation, or even "maintaining" a hashtag account of any type. Tag Feeds work all over the digital world and the real world, for all users, without having to join an organization or Website or other service provider. All feeds can be automatically filtered, blocked or curated in ay way the user wishes as per the user's preference profile (Web Pref Facility 20, and other profiles). Additionally if a user chooses to follow the Tag Feed "Palm Pilot" then the user doesn't have to separately spend time perusing numerous blogs or information sources: such as the Palm Website, CNET blog site, etc. All Palm Pilot related Tilz get automatically and continuously assembled onto that user's Palm Pilot Spherez. Additionally, uTag continuously crawls the Web, setting tags, thus uTag creates on-the-fly followable Tag Feeds. uTag also creates the opportunity for companies to create sponsored followable Tag Fees—yet another income source for uTag and users. For example, Chrysler, Dodge and Jeep could sponsor the "Mopar" Tag Feed. Cheer detergent could sponsor a "Cleaning Tips" Tag Feed. And when users scan an item (via barcode/other means) in the real world or pass within that item's IP-RFID (Facility 33) CloudCast (Facility 23) such as at a bricks and mortar store, the user can see and interact with and transact with the Tag Feed information, right when the user is actually encountering that product, service, or person.

Net Dotz (Facility 27) search. Any information (online or offline) (digital or analog) that a user has attached a Net Dotz to, has one or more tags that identify that information, thus making it searchable. Every word of an article, story, etc. is searchable. Even for digital data such as a movie, if the content owner decided to include the script/dialogue in the Net Dotz Tilz/link, then every word of the movie is searchable. As Net Dotz proliferate, the quantity of data searchable by uTag will grow exponentially. A great deal of which will be the previously unsearchable (per the conventional art) offline content and tangible things.

IPv21 # tags. Anyone who creates, or posts, content can mark it with IPv21 tags—identification ID numbers that are the IP address for that item's Tilz; so that searches will find that content even if that content only lives on a user's mobile device, or even offline in their clothes closet. User's can follow IPv21 # content. For example, if a user writes a document about dogs, and that article is only on their mobile device, and not posted to a Website or blog (or is otherwise online), then they can make that article on their mobile device findable and searchable by others by adding IPv21 # tags, for say, "Leashes" "Dog Food" and "Dog Training." So others searching (using certain non-convention search engines such as uTag) for information on dog leashes, might get the Tilz of that article off that user's mobile device (if the author's profile allowed such public distribution). uTag users can follow offline content as well. The user can, for example, add the tags: "Vest" "Fleece" and "Camping Gear" to the vest in their clothes closet, by (means such as) simply scanning the Net Dotz/barcode on their vest, and adding the IPv21 # tags with their mobile device can be accomplished via spoken words for certain mobile device operating systems featuring speech to text capabilities, just say: "Tags: Vest, Fleece, Camping Gear."

IPv21 # tags vis a vis a Net Dotz/barcode search. For example, if a user scans their refrigerator's water filter Net Dotz, which has its own Net Dotz/barcode, they can automatically follow information related to refrigerator water filters. Such as how to install a water filter (which is one IPv21 #, and a potentially non-intuitive, non-trivial task), where to purchase at the best price (which is another IPv21 #), etc. And such Tag Feed or IPv21 # following can be limited to just those weeks in advance of that filter needing replacement (say, every six months). Such examples are real world applications of a true search engine, such as uTag. Note how the definition of a search engine expands, and instead of performing a dumb keyword matching to a Website content search, it becomes (via uTag) a technology that helps a user find what they need throughout all aspects of their real life. uTag makes a user's day to day life easier and better. Net Dotz have one or more tags. For example, orange-handled scissors could be tagged: "Craft Supplies" "Cutting Tools" "Kitchen Supplies" etc. Thus scanning Net Dotz will deliver the desired content to the user. So if user #1 has an interest in receiving information about craft supplies, and some other user tags any pair of scissors as "Craft Supplies," then user #1 will receive the Tilz for those scissors also. uTag can even find Net Dotz (or IPv21 # tagged) content that is never put online. For instance, if a user tags a document they create on their mobile device (Mobi) with the IPv21 # tag for "UC Santa Barbara Rugby" then that content can be found (if the user's profile for that Tilz allows) when others search for "UC Santa Barbara Rugby." If a document about rugby is local on a user's device, which is never connected to the Web, then the searcher's Spherez Tilz will be updated with this new information (rugby document) when they, for instance, pass near (say within Bluetooth range of) the user (which hereafter is referred to as proximity net or ProNet.). User anonymously pass on Tilz via available storage space utilizing Packet Cache (Facility 28). Various users may pass along that rugby article Tilz (peer-to-peer via means such as Bluetooth) until it reaches a person who was searching for more information about UC Santa Barbara Rugby. Via Mobi facilities such as Tilz, Packet Cache and uTag users can communicate, socialize, and transact even if there's no Internet present.

Mob search. Users can allow others to pull their uTag search Spherez onto others' mobile devices (Mobis). That way when those others encounter more information about that topic, it will (synchronously or asynchronously) be sent back to the original uTag search Spherez user. Again, the geometric effect of having many users (even unknowingly) assimilating and gathering information is extraordinarily powerful (and unique as compared to conventional art search). All this can take place anonymously, and can be don for free or (small) fee (e.g. 1 cent, as set by each user). When others scan content (or come into Bluetooth or RFID or other means range of content) then tagged content matching another user's search strings is pulled onto their mobile device, later to be transferred back to the original user. Either via a series of peer-to-peer connections, or when those two are in range (or both connected to the Web). For example, let's say a user #1 has a search Spherez for Nickel & Nickel 2001 Cabernet Sauvignon. And user #2 who is into wines (and meets sufficient Web Cred bona fides), ProNets (peer-to-peer exchanges) a copy of the user #1's search Spherez (which user #2 would want since user #1 collected a lot of information about where to buy this wine and certain restaurants that carry it, etc.) and user #2 happens to come across a wine tasting event featuring Nickel & Nickel Cab, that information will be added to user #2's copy of user #1's Spherez and synced to user #1's local Spherez when both users are online or via ProNet. This is a win-win for both parties, and user #2 may get a commission if user #1 attend the wine tasting even that user #2 knowingly or unknowingly turned user #1 on to. And the real power of mob search is not when just one person carries a user's Tilz or Spherez, it's when a mob of hundreds or thousands or millions of uses are carrying around each other's profiles. Searching out results, (profile) matches, and transactions that benefit the "mobsters." uTag is literally geometrically better than the conventional art. uTag creates a very powerful mesh between a plurality of users, who end up being the eyes and ears for others, as they move about in the real world.

Search results are transactable Tilz. This is revolutionary and will forever disrupt the economics of search. For example, a user searches "pickup trucks" gets paid by Ford F-150 competitors. If the user was a Ford F-150 driver, or that was the user's favorite truck at the moment, the Ford F-150 Tilz would occupy the center or "key" position on that user's Pickup Trucks Spherez. Competitors to the Ford F-150 could pay the user for priority placement near the Ford F-150 Tilz, for their ad Tilz, offer Tilz or other information Tilz. Search results are transactable Tilz not merely "links" Paid search=users get paid. And users get paid in two ways: 1) each user sets their own price to receive ads/offers/coupons on their uTag search Spherez; and 2) paid search payment. For example, once the user receives the desired Tilz from the search, such as the Tilz for the Ford F-150 pickup truck, then the user gets paid to receive complimentary information (e.g. Tilz relating to pickup truck bed liners) or information from competitors (e.g. Toyota pickup trucks). Regarding paid search it's an alternative to user's buying keywords from conventional art search engines. For example, if per a conventional art search engine, a dentist pays $8 per click on his ad next to results for the search words "Manhattan Dentist"—then this entire $8 goes to the conventional art search engine company. With uTag, uTag can charge less than a conventional art search company, and split the monies among uTag, the carrier, and the device (Mobi) maker. And because the user gets paid, when uTag get paid, then that user can receive a results-based percentage from uTag's portion of the paid search monies. ("results based" means a higher conversion ration=a higher percentage of uTag's portion of the paid search monies). If a user searches for "Michelin tires," the user gets paid to receive ads or offers or coupons from tire suppliers and/or installers. This could markedly disrupt the conventional art.

In embodiments, payment to users depends upon conversion ratios. uTag can examine data vis a vis the number of times a user, say, clicks on a Tilz/ad/search term vs how often that user follows through with a purchase of that product or service (which purchase is also captured on Tilz). Payments to users can be delayed (and held in escrow) or don't even commence, until after a particular user's conversion ratio reaches a level prescribed by the advertiser. Some advertisers will be happy that a user, for instance, clicked on and received their information Tilz, and will pay the user, for example, 10 cents per month, to keep it as that user's Dentist Tilz on the center or "key" point of their Dentist Spherez. Other dental advertisers may not pay unless the user becomes a patient, but in that event, may pay a substantial sum (e.g. $25, split, in embodiments, between the user, uTag, carrier and handset maker). Companies or Tilz holder may also pay (uTag, user, carrier and device maker) when the user clicks on a Tilz (that is not a paid ad Tilz) i.e. non-paid search results that are clicked on, result in a payment (with the amount set by each company, from zero to any amount), and users can see how much that Tilz will pay them before they click on any search results Tilz. Search results are still sorted by affinity group, so there will be recommendations that are available at no cost to the company or Tilz holder. Search results can be color coded: e.g. green or not green. Green means the user will get paid, if they click it. Not green means no payment. Users might still end up with the most recommended, payment-free search result, but competitors have a chance to grab a little mind share by paying a user to click and receive the competitor's Tilz, with their product or service offering. Since searches are stored as a Tilz Deck (ordered grouping) or Spherez, complex searches can be saved by users and rated by others who want that same Tilz Deck or Spherez, and users can choose to charge others for their highly-rated Tilz deck. uTag will always display the Tilz that other affinity users chose most often. Piggyback or competing clicks may command even higher prices since the user has already clicked on and received the Tilz from Dentist A, so Dentist B might pay a premium price for a user who is already seeking dentist information, and is already leaning towards a competitor.

Recommendation engine. uTag works in conjunction with Web Pref (Facility 20) to return search results as per the user's affinity group section of their profile. This enables uTag facilitate recommendations that help a user search for other digital content such as shows on TV or the Web that the user might like—based upon a matching of others whose ratings of TV shows are similar to the user's. Users simply, for instance, type in the show or type of show they want to watch, and let uTag find it for the user. Whereupon uTag can, if the user wishes, suggest other content the user might enjoy, based on profiles of others similar to the user who then also enjoyed additional or related content. The owner of that show is in control of how much to charge the user for access to the content (stream it, Tilz download, purchase DVD, etc.). Same for music, or magazines, or books, or anything. Commerce Direct. From content owner to user.

uTag may produce search results that are more accurate and relevant than conventional art search. Greed vs Good. What is good for the conventional search engine (financially) is not necessarily good for the user. Want a good recommendation or review? Pay the conventional search engine the most money. SEO example. Search engine optimization is merely a way to game search results, and may lead the user to a less-than-the-best result. Imagine if each morning user #1's neighbors stands on their lawn shouting loudly: "Plumber, plumber, plumber, I am a plumber!" If user #1 is at user #2's house, when the sink springs a leak, would user #2 want user #1 to recommend their noisy shouting neighbor who is a plumber? Would user #2 feel comfortable that that plumber is likely qualified and reliable? Even worse is a situation such as user #2's baby suddenly becoming ill. Would user #2 want someone to recommend a neighbor who shouted each day: "Doctor, doctor, doctor, I am a doctor!" Just because a person shouts the loudest, or pays the (conventional) search engine the most, doesn't mean that that search result is the best for a given user.

Tagtastic results. Results of searches are rated (Website is good, or plumber is bad) by other users with similar affinity profiles. Thus over time, search results get better and better based upon high quality results, not (for instance) based upon who is paying the (conventional) search engine the most.

Monolithic results. Conventional search engines don't return results based upon affinity groups—but should. College student vs CEO. These two users should get different results when searching for "San Francisco clothing stores." With uTag search results are customized, based upon user profiles (and other factors). There are billions of people on planet earth, and users want search results that are relevant to them. With conventional art search engines everybody sees/gets the same search results. With uTag, affinity or profile-based results are different for: old, young, married, single, gay, straight, goth, religious, Chinese speaking, etc. People aren't monolithic, and search engine results shouldn't be either.

Keyword advertising. With conventional art search, a search for the word "cars" could easily result in an ad for tires, yet if that user recently purchased, that user doesn't need tires or tire ads for 5 years or 60,000 miles.

Social networking site search. If a user searches for the word "soccer" conventional art social networking site search results are not intelligent enough to know, if that user only follows European soccer, thus doesn't want MISL (Major Indoor Soccer League) or American soccer results or American soccer ads served alongside that user's search results. uTag solves this problem by basing search results upon each user's profile(s).

Pre-Internet marketing techniques. Prior to the widespread use of the Internet, users might, for example, fill out contest cards at an Art & Wine show, and direct marketing companies would use the keywords (interests, income ranges, etc.) thusly obtained to bombard uses with junk mail. Disappointingly, that also what some conventional are search engine companies still do today, utilizing decades old marketing techniques.

Ad relevancy. Advertisers want to deliver targeted ads or content. But as per the conventional art, a plurality of different companies (including search engine companies) each create a profile of a user. Each profile is incomplete as it does not capture a complete picture of everything that user does/enjoys/is interested in/etc. User end up spending the user's time to help these various entities build up profiles about the user, that these entities monetize, yet don't pay the user any monies for the use thereof. The only entity that can create a complete profile about a user, is the user himself. With Mobi facilities in general, and uTag in specific, the user creates their profile in a single place, on their mobile handset (Mobi, or other device(s)), and have that profile work (informing other entities) wherever the user is in the digital world and in the real world—and, importantly, get paid by those entities to access that user's profile and to monetize that user's profile.

Profiles should be owned by users. And not by entities such as conventional art search companies, and their tracking company cohorts. And users should get paid by those who utilize the profiles, such as the companies that want to market their products and services to the user. Such a method is superior to the conventional art wherein users are spied on to create profiles (and the conventional art search entities keep all the money they make off of users' profiles).

Search utilizing a user's own profile. With uTag, search results are customized and results delivered when and how each user likes (as per Web Pref Facility 20 and other profiles). Serve ads as per user's own profile. And no matter how much a company pays a conventional art search company, it's money wasted if its an ad the user doesn't want to see. Users should only see ads that they want to see. And the user gets paid. With uTag the user gets paid to take their time to view those ads (money that is otherwise going to conventional art search engine companies, et. al.).

Why will all online and offline content be tagged? Not only does it makes sense, so it's easier to find. But also there are financial reasons to tag online and offline content. Incentives. For example, the first 100 people per affinity group who tag an item share in the ad or transaction revenue for that item for the first, say, 6 months. Market research companies pay users for tag profiles, sorted by affinity group. Profile data sorted for each of the multi-flavored groups of people creating tags: high school students, college students, men, women, tattoo aficionados, elderly, etc.

Smart Tilz=revolutionary search. When a new Tilz is created that Tilz checks for matching tags of content within range and pulls that content to its own Spherez. With uTag, content is constantly checking for its own tag-matching content—which is a new and unique type of search. Search results are active Spherez, constantly updating their Tilz mix. Even if a user saved a conventional art search results (such as a page of blue links), they are static, and dead, and growing ever more out of date.

After a user finished a search, they are somewhat more knowledgeable about that subject, however that knowledge is lost with conventional art search engines, and not shared with others. With uTag, uTag locates that information; Tilz capture the information; and the user gets paid. For example, after doing a search for "kite flying parks" that user may have spent, say, 5 or 10 minutes sorting out unsuitable parks, from good kite flying parks. Tilz easily capture the "Good Kite Flying Parks" information. Since uTag can now find that Tilz, even if it lives only on a user's mobile handset, that user can allow uTag to surface those Tilz. Thus when others search on "Kite Flying Parks" the user gets paid. Other users, who want to save time, might pay, say, 5 cents to get those highly-rated Good Kite Flying Parks Tilz. The preceding example can be considered a form of knowledge capture. Conventional art search engines cannot index the information locked in people's minds. Tilz, however, give users a reason and a simple way to share their knowledge. And knowledge that used to "walk out the door" of companies is retained, via Tilz. And once on a Tilz, uTag can find and monetize and share that information, including Tilz that conventional art search engines cannot index. For example, consider the topic of companies and individuals who are weavers with the knowledge of the difference between woven fabric vendors and manufacturers vs printed fabric vendors and manufacturers. Let's say a user is in the trade, and a customer comes into the user's place of business with a swatch of cloth; the user could identify it, and know, for instance, that it came from a short list of upper middle market woven fabric weavers. "Upper middle market, woven fabric weavers" is a specialized and potentially valuable piece of information. As the user makes the likely weavers list for the customer, the user (automatically) creates a Tilz. This Tilz can be searched by uTag, and thus monetized to others who might need this special bit of information. Unless the user explicitly allows free/uncompensated access to conventional art search engines, conventional art search engines cannot search any Tilz. Until a conventional art search engine pays the user, it's the user's copyrighted material, and, in embodiments, Tilz copyrights and usage rights prohibit search engines other than uTag from monetizing the content, without paying the Tilz owner a percentage of any income generated by said Tilz. Mobi facilities always pay users. Thus, Phonebook Widge (Facility 10) can utilize this list of woven fabric weavers. Trade Widge (Facility 14) can use it, Hosted Everything (Facility 6) can use it, uTag search can search/use it, etc.

Parents pass on wisdom to their children. A parent goes about life learning life lessons, which might include things such as getting to personally know the hospital accounting director, when a family member is diagnosed with a significant illness. Parents can create Tilz (by, for instance, speaking into their mobile device to create a Tilz via voice text) and have those Tilz available to their children (and only their children, if they wish such a restriction), next time their children search on the term "hospital" or even visit a hospital. uTag surfaces information in the real world, in-context, in-situ.

Users get paid in the real world. Search isn't just something users do when seated at their computer. Users most often need a search function in their life as they move about in the real world. Users are continuously searching for the best deal, or more information about a product, or the right way to accomplish something. Users who have this knowledge after they have spent their time accumulating this knowledge, can create Tilz which capture their knowledge. Then that Tilz is surfaced via uTag (and/or Sorto Facility 8) at the appropriate time in the real world. Such as when the user is geographically proximate to a location where the user might need some data. For example, if a convention center has notoriously limited parking during big events, then information such as "extra parking for this store can be found 4 blocks south on 4th St, in a small lot, under the overpass" could be quite valuable to a convention-goer. The user who creates the parking tip Tilz may get paid when others needing/wanting that knowledge come across that Tilz which has a transaction fee attached. One penny or one dollar, whatever the Tilz creator sets the price to be.

Organic day spa. User #1 does search/research on this topic and collects a number of Tilz relating to organic spas: organic body scrubs, organic teas user #1 drank while at the spa, organic cotton spa robe for sale. However, the next person who does a conventional art search doesn't benefit from user #1's newly gained knowledge. In contrast, with uTag user #1 flicks their Tilz onto uTag's "Organic Day Spa" Spherez which saves user #2 time; user #1 gets paid if user #2 transacts on those Tilz. In embodiments, uTag utilizes the Organic Day Spa search results Spherez by user #1, as the starting point for users with related affinity profiles. Uses are incentivized to produce really excellent Spherez, that others in their affinity group (or otherwise) might utilize in the future. The user who created those Spherez gets paid.

uTag search technologies not only revolutionize search, making it better, more relevant, and more accessible to users in their real lives, but also transform how merchandise is marketed, and commerce is transacted. And most important of all, users get paid. Since it is their profiles, or their knowledge, or their money, that is the object of all parties involved. If a user searches for "London Hotels" and grabs the Tilz for the Ritz Carlton London, then the user might be immediately paid by Claridge's Hotel or the Dorchester Hotel to send their Tilz to the user, as competing results (that might inform the user's hotel choice). uTag's list of game-changing features include: Tag Feeds, Net Dotz search, mob search, recommendation engine, and uTag's offline items search capability. And how search results are presented has been revolutionized by uTag with its Search Spherez. Results can be presented in a plurality of ways, but always via Tilz (Facility 30). And Tilz are live transactable objects. With uTag, search is now portable. Users keep Search Spherez locally on their mobile handset so they have the results to most of their common search queries available at all times, even without a network connection. And the Spherez Tilz presentation results in uses getting paid. Whether its the uTag Search Spherez for local pizza places or fabric softeners, or restaurants in a user's town, or hotels in New York City, competitors to the Tilz which occupies the center or "key" position on the Spherez pay the user to have their Tilz be as close as possible to that center or "key" position. And apart from the financial benefits to users of uTag Search Spherez there's also the information benefit. As Spherez continuously attract and assimilate additional related (profile-based) content onto that Spherez. So any search result keeps getting better and better and better; 24 hours a day, without the user doing anything. And Search Spherez are informed by a user's real world activities and interactions. If a user, say, routinely buys wine by a certain winery and also selects wines by that winery when at restaurants then when that person does a search, results will be real-world weighted towards that winery. A lot of conventional search may disappear when users carry around profiles of everything all the time. For example, if a user replaces their refrigerator's filter twice a year, with conventional search engines the user has to do that search biannually. With uTag, the user does the search just once, and that Tilz is mapped onto a smart Spherez, where it will continually attract more information related to the user's brand of refrigerator filters; information the user can refer to at any time, and possibly be paid to receive, especially as time draws close to the biannual replacement date. With uTag Tag Feeds users can follow any content, concept, item, person, anything, and get paid to do so. Tag Feeds utilize Tilz so information streams are far more visually compelling and engaging. uTag's many unique features include real world Net Dotz/barcode search. Scan a user's tennis racquet to initiate a tennis-related search. And search results are preference profile based. So searching for a restaurant in Paris returns different results for a CEO vs a student. And, finally, paid search no longer means the conventional art search engine gets paid. With uTag not only are search results and ads more relevant, but users get paid.

Facility 17

Digital Task Agents Facility

5117

In embodiments, a module that facilitates management of digital task agents (hereafter "Victors Botz") is provided. As a plurality of profiles for objects and people begin to populate the Web, users may require agents, digital task agents (DTAs) acting upon the user's behalf, to look out for a user's many interests; finding and acquiring what each user wants, among the vast quantities of information out there, wherever in the world it may be, online or offline. Victors Botz live on the Internet, on network nodes and on other user's devices—metaphorically "out there" doing the user's bidding. A single user (or company or entity or product, etc.) can have dozens or hundreds or thousands (or more) of Victors Botz acting on their behalf. Victors Botz are a distributed network of agents. Each of the individual agents, or botz, has a defined behavior or set of goals. However the behavior of the system as a whole is not defined. The behavior of the entire system emerges as a result of the numerous interactions occurring at the individual botz level. This is known as "emergent behavior." And leads to emergent interaction, emergent transaction, emergent commerce, etc.

Victors Botz are a swarm of self-organizing, distributed processing entities (botz) that can act as a network of task agents on a user's behalf. Victors Botz can also act independently and autonomously to achieve a set purpose. However, in many cases, Victors Botz can amplify their effectiveness by flocking or swarming with other botz, including non-Victors Botz to achieve their goal. A flock or swarm of agents or botz, act together to solve a problem or achieve a purpose by means of distributed intelligence or hive mind. For more difficult problems or goals, flocks can act in concert as coordinated swarms. In embodiments Victors Botz are configured to work in conjunction with third party voice control or assistant systems.

Victors Botz are active not passive. Victors Botz will seek out the desired content wherever it may be, will solicit bids, will conduct auctions. Victor Botz even extend functionality to devices which may not be Web-connected, to find additional matches. Victors Botz can live on nodes (switches, routers, load balancers, and hubs) and detect matching content moving past; thereby capable of performing searches, transactions and interactions on a user's behalf. Victors Botz crawl sites that users might not otherwise take their time searching. And Victors Botz search not just the Web, but also objects and devices in the real world that are CloudCasting (Facility 23) their profile, say, via Bluetooth. Victors Botz can also live on other users' devices seeking profile matches, and performing searches, transactions, and interactions on a user's behalf. These ad hoc interactions and transactions are not being addressed by conventional means.

Ad hoc mobile synchronous and asynchronous Internet-optional digital transactions. Entire transactions can take place without either party using the Internet or needing to pay for Web access. Users indicate what they want or need (as per their Victors Botz profile) and Victors Botz go out and find it. Data crawl. Victors Botz maintain accounts on various Website and crawl the data on virtually every site; and follow the feeds from virtually every site (and other entities); checking for matches to Victors Botz user's profile wants/needs. Users don't have to spend their time being inundated with oceans of information from these sites; instead letting their Victors Botz do the work. Victors Botz are distributed agents that act upon a user's behalf. Victors Botz can also act upon a company's behalf, as well as for products, services, ideas, philosophies, etc. For example, Victors Botz can be created for any IPv21 # (Facility 25). And there is an IPv21 # for every object, thing, person, company, product, service, idea, etc.

Push: Instead of sitting back passively and waiting for the user-profile matches to take place, Victors Botz actively, for instance, push out RFI's (requests for more information). Pull: Victors Botz also pull data via searches for matching content/profiles. Premium/Paid Pull: Victors Botz also facilitate premium/paid pull, wherein sites or devices the contain the desired information pay the user to have their information sent to the user. Victors Botz search not just the Web, but also objects and devices (connected to the Internet or not) in the real world, that are CloudCasting (Facility 23) their profile, say, via Bluetooth. In embodiments Victors Botz get paid a commission for a successful connection (if, for instance, the two parties agree to get in contact, or otherwise interact/transact). These ad hoc interactions and transactions are not addressed as per the conventional art. And neither party ever has to put their information on the Web. Thus the user doesn't have to physically travel to every inch of the planet to find local CloudCasts (Facility 23) by various people and objects. Victors Botz do this via the Internet, as well as ProNet (proximity network, peer-to-peer sharing of profiles by means such as Bluetooth). And Victor Botz crawl likely Websites, including sites with a walled garden topology, wherein Victors Botz maneuver behind the wall, whereupon Victors Botz solicit snippets of data that the user might find sufficiently compelling to sign up for that walled-garden site. Victors Botz go beyond just the buying and selling of objects, facilitating other ad hoc transactions, such as dating and recruiting.

Dating services. Push: Victors Botz pushes out RFIs (requests for information), such as "SWM seeks blonde, blue-eyed female, age 30-35, into premium food/wine and triathlons." Pull: Victors Botz searches for matching content/profiles. People create profiles of their wants and needs and CloudCast (Facility 23) same, and which Victors Botz scan. Victors Botz scan social/business networking sites, as well as monitor profiles of people the user is passing by. Premium/Paid Pull: sites or devices that contain the desired information can pay the user to have their information sent to the user. For example, Match.com can pay the user to notify the user that they have 57 matches—which might entice the user to sign up for Match.com, in which case Victors Botz may get paid a commission.

Usage example—loss prevention widgets. Victors Botz can also act as ad hoc widget, that last just a short time, but perform vital functions. For example, a loss-prevention widget that is pushed onto customer's devices while they are in the bank, then deleted from the user's device as they leave the bank. Banks could push (if the mobile device user's profile allows) a silent alarm widget onto select user's devices (Mobis) for the duration of their visit to the bank. This ad hoc widget could be retrieved and removed as the mobile device leaves the bank. A bank might pay each user 1 cent to temporarily host this loss prevention widget. With lots of patrons able to activate a silent alarm, would-be robbers might face increased likelihood of being apprehended by authorities, thereby justifying the cost of paying patrons to utilize this ad hoc widget. During a robbery, for instance, if one user activates the silent alarm, notifying authorities, it would also engage all bank widget user's devices' audio/video recorders, which then send live feeds to the police/alarm company. And the bank could pay users, say, 1 cent per day to keep the widget on the user's device (Mobi), CloudCasting (Facility 23) that that user is a Bank of America customer.

Recruiting—general. If a user engages Victors Botz to do recruiting, Victors Botz post job listings on sites where it is free to post; pull matching resumes from job sites where it is free, and solicit blind returns (anonymous summaries of candidates) from paid sites (such as monster.com). which might cause the hiring manager to subscribe to monster.com. Victors Botz (and thereby the user) gets paid a commission for such a transaction. Victors Botz pull ancillary teaser information from paid recruiting sources, such as Websites, newsletters, books, RSS feeds, blogs, recruiting firms, recruiters, et. al. Victors Botz post job listings on free sites such as Craigslist, so users don't have to spend their time doing os. Paid recruiting sources couldn't possibly profitably advertise in all likely places where a user might see their offerings. Victors Botz profile matching technology puts these two parties in contact, at virtually no expense. With Victors Botz, users are aware in advance, if that paid site has content of interest to them. Victors Botz gets paid a commission, if the user then pays for that information from that paid recruiting source. Monster.com and TheLadder keep telling companies that they have qualified candidates (and therefore those companies should subscribe to their services), Victors Botz enables them to start showing companies those qualified candidates.

Recruiting—ad hoc. Hiring managers create a profile for each job they need filled. The profile lives on the hiring manager's mobile device (Mobi). Those job profiles are continuously CloudCast (Facility 23) from their device, whereby Victors Botz matches potential candidates with suitable profiles who are open to interest from new employers. In the course of doing business, attending meetings at other companies, attending trade shows and business networking events, and even just grocery shopping or walking down the street, Victors Botz are pursuing hiring matches, as per the job profiles in the hiring manager's ComCloud. As per the conventional art, such ad hoc interactions and potential transactions (a hiring) would go unmade. That is to say, with Victors Botz a hiring manager could be put in contact with a person at a grocery store who never posted their resume to any job site, and whom the manager would never have otherwise know was even a potential candidate, or chanced to speak with. Taking into account the geometric effect of having Victors Botz live on a plurality of other user's devices, such ad hoc hirings might become terribly effective. And when one considers that conventional art recruiters often get paid 30% of the first year's salary for sourcing a candidate, the prospect of Victors Botz earning a tens of thousands of dollars commission is game changing vis a vis Web companies and their ecosystem partners (the network provider and device manufacturer with whom Victors Botz might share such a commission). For example, say a startup needs a CEO, CMO and Director of Business Development. The founder posts profiles of the job descriptions and requirements in her Victors Botz mobile device profile, then sets the ComCloud (Facility 23) distance to, say, 300'. Then she cruises around Silicon Valley ask per normal day to day meetings, and attends conferences and shops at various stores. All the while Victors Botz check profiles of others within range, with a looking-for-a-job (or open-to-offers) profile that meets the needs.

Ad hoc references. Users post to their ComCloud, a list of people they are willing to give references for. Recruiters and hiring managers in the course of their daily life, or walking around an industry conference, are alerted that they are within range of a person willing to provide a reference for a potential candidate. The two exchange messages via mobile device to set up a meeting. The reference party may be paid a small commission for their service. Reference parties can CloudCast their fee for providing such a live reference exchange, say $5 for 5 minutes.

Want lists. A user wants a Ferrari F430. The user posts a profile Tilz of the Ferrari to their ComCloud. The profile sets limits as to geographic range for replies. Victors Botz matches profiles for an F430, including exotic car rental firms, and/or car leasing businesses, and/or private parties and/or car dealerships, et. al. Commission paid (to Victors Botz) for interaction/transaction. Commissions may also be paid to other users who, say, have a Ferrari Spherez with Tilz on it that lead to the user acquiring the sought after F430. Victors Botz actively crawl the planet seeking profile matches from various sources.

Job Bids. A user needs to replace an old electrical outlet in their home, with a GFI (ground fault interrupter) outlet. Rather than searching for an electrician who might charge $85 minimum visit fee, the user creates a Job Bid profile on their mobile device (Mobi): "Wanted: licensed electrician to install GFI outlet in kitchen. Budget limit: $50." The user then sets the geographic limit vis a vis the ComCloud (Facility 23), and goes about their life—perhaps attending a local ball game, and/or even a home show. Commission paid for interaction/transaction. Users are in control vis a vis how far from the mobile device (Mobi) the Job Bid may be CloudCast. The user may come across someone at the local ball game (or elsewhere) who might have not spent money on advertising or a Website. Thus, most conventional art search engines couldn't find this person, but Victors Botz could, by connecting local Bluetooth CloudCasts, or seeking out the electrician profile that this electrician "hosts" exclusively on their mobile handset (Mobi). Victors Botz may also conduct a reverse auction rather than a Job Bid, wherein contractors simply submit their estimates. A reverse auction (or possibly blind reverse auction) to determine which licensed electrician is willing to bid the lowest for the job.

Wine Tastings. A user creates a profile on their mobile device (Mobi) for a desired type of wine tasting. The user has a bottle of 1983 BV Georges Latour Private Reserve and wants to find others who have the 1982 and 1984 vintages, to create a three year wine flight tasting. The user is also seeking a San Francisco enoteca to host this ad hoc tasting in exchange for being the fourth person at the tasting. The user then sets the geographic limit for the CloudCast (Facility 23), and goes about their life—perhaps attending a local art and wine show, and/or shopping at Nordstrom. Commission paid for interaction/transaction. The user creating the wine tasting event might be willing to pay, say, $1 to any intermediary parties (who might be carrying their buddy's Wine Cellar VictorsList and event and transaction profile). And the enoteca might redirect its commission (if any) to Victors Botz to create new business at their wine bar.

More Wine Tastings. If the user attends an event such as the San Francisco Chronicle Wine Tasting Competition, then that event organizer is paid a commission for ad hoc Victors Botz interactions made there, which thereby creates Victors Botz evangelists. The idea is that events such as wine competitions will attract a group of people who will likely have wine to buy or sell each other, or wine gear to buy or sell each other, or wine information Spherez to trade with each other, etc. etc. But as per the conventional art, wine event organizers do not get paid for such networking or interactions or transactions, that their event enables (and many such attendee-to-attendee interactions might not even be possible or otherwise take place without Victors Botz). But, by offering event attendees the option of having Victors Botz wirelessly pushed onto their device as they walk through the event door, related parties (such as event organizers) become evangelists for Victors Botz. And event attendees are able to network and interact and transact far better than ever before, both with other attendees, as well as competition exhibitors.

Barter Transactions. Victors Botz can facilitate barter transactions. Victors Botz scour online profiles and create an eBay-like marketplace where people with differing skillsets can trade services; such as a psychiatrist trading one hour of her services at her set hourly rate for one hour of a lawyer's time. Commission paid for interaction/transaction. Users walk around continuously CloudCasting (Facility 23) a profile of their wants and needs, thus the many bartering opportunities are automatically facilitated.

Other examples. Last minute partner for a sporting competition. Rather than forfeit the $25 event fee, when that user's doubles partner is unable to attend, a volleyball player might pay a dollar to find an ad hoc partner. Multi-city and non-Internet searches. A hiring manager with offices in Los Angeles, New York and Boston can allow others who live in those cities to carry the job profiles (encrypted and secure) on their mobile devices (Mobis) in those cities. Users may get paid a small fee for carrying the profile, and a larger fee for a successful hire. Non-Internet searches refers to utilizing modalities, sometimes peer-to-peer, such a Bluetooth or (near) infrared to interact with profiles hosted on local or mobile devices (Mobis), and that may be otherwise not available via means such as the Internet. Sourcing. Let's say a bakery gets an order for ten thousand cupcakes by tomorrow. Suddenly, they need to order eggs, flour, sugar, etc. in quantities that their usual suppliers probably cannot meet on such short notice. As per the conventional art, a bakery employee would probably spend most of a day on the phone putting together the order from a multitude of suppliers. With Victors Botz, the Botz handle it, including partial fills from multiple vendors. If the bakery needs 150 crates of eggs, Victors Botz can get 40 crates from supplier #1, and know that it now only needs 110 crates from other vendors. Utilization of Victors Botz will likely make the bakery aware of new vendors who might be better able to meet their supply needs in the future. Profile Trading I'll carry your profiles if you'll carry mine (and possibly get paid commissions). Emerging-markets applications. Handmade rugs for sale. A user on vacation carries home profiles of rugs for sale from African villages visited, and makes a ComCloud (Facility 23) connection with someone seeking handmade rugs that match that profile. Defrays the cost of that user's vacation. Micro Loans Sought. For people wanting to fund expansion of their work. Commission paid for interaction/transaction.

Reverse Search. Once a user indicates, via Victors Botz profile, an interest in a certain item or event, Victors Botz not only searches, and keeps on searching for days, weeks, months, or years, until user-set time limit is reached, but also fields offers from companies, individuals, and other entities with the product or service that matches the Victors Botz search item. World Cup Soccer tickets. Instead of the user spending hours searching for World Cup tickets and related items, Victors Botz CloudCasts (Facility 23) that user's interest in World Cup tickets. Then the information the user seeks is delivered to the user via Victors Botz. All entities with ties to World Cup soccer tickets such as ticket brokers, individuals with extra tickets, airlines that fly to the World Cup location, soccer team uniform or souvenir sellers, etc. might pay to make offers or information available to the user, via Victors Botz.

Infrastructure provider for other widgets. Victors Botz can power other widget. Adding to that widget the Victors Botz global concierge services. Flight trader. A widget that helps users re-book airline seats when a change has occurred in their schedule. Users CloudCast (Facility 23) their travel destination. Using Bluetooth or WiFi (or other means) user utilize their mobile device (Mobi) to CloudCast their profile, which contains their travel destination. A business meeting is canceled. Person on a business trip in London is scheduled to head home on Friday, but a meeting is canceled, and the businessperson is now available to fly home Thursday. The business person updates their profile. Airlines pay the user to make offers for earlier flights. The business person's airline (or other airlines) can make offers to this business person to utilize an empty seat they have on a Thursday flight. These offers can be made to the traveler either for an additional fee, no cost, or even offer to pay the business person money to fly on Thursday (on a flight that is not fully booked) opening up a paying seat for Friday's oversold flight. Last minute seats. As people are in the airport they CloudCast (Facility 23) their travel profile, and the airlines pay users to make bides to the travelers to meet their travel needs with true, last minute, unsold, empty seats. Airlines can, of course, choose to make offers to those travelers whose travel profile (which is being CloudCast) indicates that they charge the least to have offers made to them. Or airlines can make offers based upon conversion ratio information supplied by Victors Botz (for a nominal fee). That is to say, those flyers who most regularly take deals made to them. Specialty Botz. Instead of just being generalized botz that can find anything a user wants, some Victors Botz will come to be specialty botz and become the go-to botz when a user needs to find out more about, say, vintage watches (or whichever subject that particular specialty botz focuses exclusively on). Horizontal botz. For example, a botz for each user and all the items that user wants and needs. Vertical botz—for each topic, such as vintage watches or Ferraris or running shoes.

Victors Botz save users from having to take their time trying to find something they need. Having a continuous concierge, by the user's side as they move about in the online world as well as the real world doesn't cost a dime. In fact having Victors Botz becomes an income source for the user. Victors Botz ad hoc and proactive technologies will revolutionize myriad industries and transaction classes such as merchandising, search, recruiting, security, dating, etc. etc. Victors Botz are always ready to work. In addition, Victors Botz revolutionize the knowledgebase, data mining an analytics fields. In embodiments Victors Botz become an authority on their particular topic or goal. And each Victors Botz can become even more authoritative on a particular topic or goals as it works in conjunction with other Victors Botz. Thus the flock of Victors Botz are not only distributed intelligence, but also the swarm is its own network. Victors Botz can tap the power of their own hive mind Victors Botz distributed, multi-agent processing excel at pattern recognition, and other things, all the while being able to prioritize and switch tasks. The Victors Botz matrix of digital task agents forms a powerful neural net. Unique agent-based interactions and transactions powered by genetic algorithms.

Facility 18

Transactable List Facility

5118

In embodiments, a module that facilitates transactable lists (hereafter "VictorsList") is provided. VictorsList is, among other things, a simple way for users to make money from their day to day activities and passions and provides subscribers to lists with affinity-based best-of information. Each list (if the user's profile allows) creates an opportunity for others to market products or services to them, or pay to send them ads/coupons/offers, et. al. based on keywords/topics in VictorsLists. For example, a user who is into wine, could simply scan bottles of wine purchased (such as when the user places them into their wine cellar/fridge) and the user's Wine VictorsList is thereby automatically created. This information could be of value to others, who are less knowledgeable about wine, but wish to benefit from the wine aficionado's expertise. Other users with tastes similar to the expert could pay to subscribe to the expert's wine profile, as expressed via a VictorsList. And wine stores and wineries can pay to make offers to VictorsList owners. VictorsLists are presented via Tilz (Facility 30), therefore lists can include any type of digital content: text, images, video, etc, A user's lists can easily be created via scanning barcodes/RFID. And once created, VictorsList owners and followers may be paid to accept ads/offers related to the list topic. Instead of becoming a mini-expert on each subject, rely on the expertise of others (who just went through that process may have the expertise the user needs). Commissions paid for interaction/transaction/subscription. RFID lists: as a user walks through a store, Tilz for items the user is interested in are (matched via RFID) and sent to the user's mobile device (Mobi), and then sorted into the appropriate VictorsLists. People who makes lists of those things they are most passionate about, essentially act as unpaid evangelists for those products or services—thus making these lists "evangelists."

Wine Cellar VictorsList. Let's say there is a user who constantly attends wine tasting competitions, travels to Napa, and is a member of various wine clubs, etc. With VictorsList that user can turn their passion into an income source. Scan barcodes/RFID of bottles purchased or sampled, say at a store or at a wine tasting. Users who have a similar taste profile can subscribe to the list. Wine aficionados can (help) pay for their wine-loving lifestyles. Sommeliers can make extra cash. Wine stores and wineries (and other entities) pay to make offers to VictorsList owners (and subscribers). List items can include commissionable purchase Tilz.

Wines Tasted VictorsList. Scan each bottle a user samples. The user could rate each wine, the post their Wines Tasted Victors List to their ComCloud (Facility 23). When the user is in a restaurant, the sommelier can utilize this VictorsList to make recommendations. When the user is in a grocery store, the store can pay to make wine discount or recommendation offers to the user. Users passing near each other with similar wine interests could strike up a conversation. VictorsList is an universal concept that can be applied to virtually an object. “Wines Tasted” could be supplanted by any product, food, etc. A VictorsList showing what that user’s likes and dislikes are, enables companies to pay to send product offers to that individual. Most Web services encourage online interaction; Mobi and its facilities, including VictorsList, encourage real world interaction (in addition to online interaction).

Other VictorsLists: Wine Resume. Climbing resume. Hiking resume (Milford Track could market to the list owner, via a travel package by Quantas Air). Camping resume. Education resume. Cycling resume (could become a way to meet a potential ride partner or for a bicycle shop to market to the list owner). Speaking engagements resume. Vacation resume. etc. etc. All resumes can be built by simply living one’s life, scanning along the way (not by typing up long lists).

House VictorsList. Scan barcodes/RFID of literally every item in a user’s house. All the appliances in the house, by brand name, warranty expiration date, service record, etc. All lightbulbs in the user’s house, with wattage and last purchase price, date, store, etc. CloudCasting (Facility 23) this information creates opportunities for product manufacturers and retailers to pay the user to make offers. Not only do users get paid when one of their larger household items is ready for replacement, but VictorsList also enables offers for everyday items, such as light bulbs a user needs, when the user happens to be at, say, a Target department store.

Artwork VictorsList. All the pieces of art a user owns. Each piece in its own Tilz, with all the relevant information about that work of art: artist name, when purchased, purchase price, current estimated value (from auction site monitoring), provenance, etc. The Artwork VictorsList can be utilized for insurance purposes, private use, or made (selectively) public. Users with pieces by the same artist could interact/trade/buy/sell/socialize, around VictorsList posted to ComClouds (Facility 23). Art galleries could pay users to solicit pieces for upcoming shows. For instance, users are likely to attend a gallery showing, could indicate, via their Artwork VictorsList CloudCast (Facility 23), which pieces they’d like to see in a show by scanning that art item when they come across an article about the artist, or hear a radio show about the artist (and thereby scan (Facility 31) the Net Dotz (Facility 21), which returns a Tilz (Facility 30) to their Mobi, which Sorto (Facility 8) adds to the user’s Artwork VictorsList), or see the artist on TV, or see a piece of art by the artist online, or at a friend’s house. Instead of one or two in-house art scouts, art galleries with VictorsList have a plurality of art fans as their eyes and ears. Also art galleries could scan users’ Artwork VictorsLists (which contain Tilz of each artwork piece the user owns), to borrow some of those items to create a show (or simply put together a digital, virtual show, without needing to physically borrow from users).

Ad Hoc Transaction VictorsLists. A user CloudCasts (Facility 23) lists of everything they own. Each item in its own Tilz with all relevant information about that item: manufacturer, when purchased, purchase price, current estimated value (from classified site monitoring), provenance, etc. Others could pay to offer to purchase any of those items. Users with items by the same manufacturer could interact/trade/buy/sell. As two users with their VictorsLists posted to their ComClouds (Facility 23) pass by each other (actually physically, or metaphorically so online) “You collect old baseball gloves? So do I.” A user might not have gone to the trouble to list an item to sell (as per conventional art means including eBay), such as a leather jacket or a Wilson volleyball, but if the right price were offered from someone they trust (Web Cred Facility 19), or just nearby, they might sell.

A million VictorsLists. Custom, daily all you can eat music (service) playlists. What’s For Dinner (is a challenge faced by most everyone. With VictorsList users can simply rely on VictorsLists by others whose passion it is to come up with interesting meal ideas. Weekly Meal Suggestions. Everything I Ate. Movies Not Yet Seen. Fun Things To Do With Your Kids (as per local areas. Parents are often looking for more options here.). Geo-Tag Lists (places a user has been to and tagged). Companies I Recommend (e.g. “Marimar Estate makes delicious organic Pints.”) Companies I Don’t Recommend. Calories, Protein, Carbs, Fat (that the user consumed with that information VictorsList sent to (or subscribed to by) that user’s personal doctor, nutritionist, trainer, Jenny Craig, etc.). Prioritized List of DVR TV Shows (the list of shows the user regularly records. In case that user has to replace or re-set their digital video recorder (DVR), the list of shows is automatically repopulated from the user’s VictorsList. Fresh Exercises Daily (challenge muscles in novel ways. Add new exercises every month from differing people, athletes, trainers, etc. for free for a (subscription or one-time) fee. Realtime Stock or Bond Trades List (the user can follow other’s trades (even those who are not licensed/professional traders)). Questions To Ask While At The Doctor’s Office (per ailment) (users often think of questions to ask a doctor, but forget those questions by the time they actually get to the doctor. Users can trade lists of good questions to ask their doctor, with other users with similar health profiles).

Anonymous Advertising Tool. Users can make their VictorsList profiles available to marketers, without revealing their personal information. VictorsList can act as go between without revealing their personal information. VictorsList can act as go between, and deliver items between marketer and users. VictorsList enables advertisers to get in touch with users who have certain keywords in their VictorsLists. But only if the user’s profile allows such queries, and usually by requiring the advertiser to pay the user a fee. Advertisers can engage in market research with such users or send them targeted ads or otherwise interact with users as per each user’s Web Pref (Facility 20) and VictorsList profile.

Anonymous Communications Tool. In embodiments users can get in touch with other users who have certain keywords in their VictorsLists; but only for users that allow such queries. For example, two users walking past each other in a shopping mall: “You have a Havanese? I have a Havanese!” And perhaps these two strangers strike up a conversation about their dogs. Or without having connected in person, one Havanese owner could query the other, discovered via VictorsList, to find a recommended veterinarian. Users might be paid a small fee (which they each set) to accept such inquiries. Another example: a restaurant wants to invite people to attend a benefit party for the 10th anniversary of its opening, at which a band played. One of those original band members is now sick, and the restaurant wants to utilize the 10th anniversary party to raise funds for the ailing band member’s medical bills. The restaurant wants to invite people who attended the grand opening party ten years prior, even though the names of the patrons were not taken that night. The restaurant can search VictorsList to find users who put that restaurant on their Restaurants Tried or Concerts/Events VictorsLists.

RFID compatible lists. As RFID rises in popularity, and particularly so as a means for objects to CloudCast (Facility 23) profile information about that object, VictorsLists can easily and automatically be created and/or added to, via RFID (Facility 33) CloudCast. As a user walks through a store, Tilz (Facility 30) profiles for items the user is interested in, are sent to the user's mobile device (Mobi), and Sorto (Facility 8) sorts them to the appropriate VictorsList: Gifts for Mom, Golf Gear Wish List, Kids School Supplies, etc.

List Matching—ad hoc interactions. Users set percentage match settings. For example, if a user walks past another user with 80% match on their wine list, or, say, 6-% match on Italian villas stayed at on Capri, those users might choose to stop and strike up a conversation, or email, or chat, etc. based around this item/topic they have in common. Users can optionally choose to let VictorsList algorithmically match their lists, with lists of other users and notify the user about other users whose lists match above a certain score. For example, art gallery openings. Perhaps a user will come across another user who has been to the 25% of those same art gallery openings, but the two never happened to meet each other. With VictorsList, the matched users might choose to meet virtually, online, or even in person. And VictorsList score matches can be determined by a plurality of factors, including: Keyword Matching. Take, for example, the keywords "St Supery" (to find/interact/transact/socialize with others who enjoy this brand of wine) or the keyword "magnetite" (which may mean the person may be a fellow meteorite hunter). Propensity Matching. For example, 70% or more of their Wine Cellar VictorsList (wines tried) is Zinfandel. Such a score might indicate a propensity toward certain Zin-specialty wineries, or perhaps interest in joining ZAP (Zinfandel Advocates and Producers) or attending one of their events. Profile Matching Wine list match plus age, gender, marital status, home location, etc. Users could require a sufficiently high intersection of interest/status/profile elements, across a plurality of parameters, before VictorsList puts the user in touch with that person.

Automatic Connections Manager. Users can set their profile to allow the VictorsList widget access to certain of their VictorsLists. VictorsList can then compare their lists with others who have similar items on their VictorsLists, and when a user-selected matching level is reached, arrange for the two parties to communicate. For example, via VictorsList Connections Manager, users can find running partners, fellow sports fans, business connections, potential dates, etc. User may be paid a small fee to accept such inquiries.

VictorsLists also inform advertising. In embodiments VictorsLists provide information to Ad Widge (Facility 1) for ad customization per a user's profile. Take the case of a user with a Movies Already Seen VictorsList, wherein the user rated said movies. When that user comes across a digital movie poster, or sees the movie trailer on TV, the movie poster or trailer voice-over can be customized as per that user's Movies Already Seen VictorsList. At the point, say, in the movie trailer voice-over where they say: " . . . by the director of movie X . . . " this user receives a different voice-over that says: " . . . by the director of movie Y . . . " which was also directed by the same director, but according to the user's Movies Already Seen VictorsList, the user didn't like movie X, but did enjoy movie Y, therefore references in digital movie posters or voice-overs to movie X, are substituted with references to movie Y, for this particular user. The fact that this user's Movies Already Seen VictorsList is being CloudCast (Facility 23) from the user's mobile handset (Mobi), demonstrates the utility of the Mobi (integrated commerce) platform.

Geo-tagged VictorsLists. Users can geo-tag items/places/etc. with GPS coordinates (or boundaries of such places) (Facility 39) or Net Dotz (Facility 27) scanning (or other means), such things as restaurants eaten at, favorite bars, restaurants want to try, etc. Sorto (Facility 9) places such geo-tagged items into appropriate VictorsLists, whereupon companies that market, say, vacation travel to users, have information to tailor future travel offers to this user, based upon this user's geo-tag VictorsLists. And the user may get paid to receive such offers. Another example, which demonstrates how the life of a Belgian beer aficionado's life is improved by VictorsList. Once the user has created his VictorsList of favorite Belgian beers, that user simply moves about in the real world, and what that user seeks, may be made known to him, in realtime, in-situ, in-context. Let's say the user wants to automatically discover establishments that carry more than half of that user's favorite Belgian beers, without having to refer to a guide book, or slog through that user's friends' random suggestions or take time to perform a conventional art search. For those establishments which have geo-tagged their inventory, GPS/RFID can alert users who are passing by, as to matches with various VictorsLists. And other Belgian beer lovers can alert this user to (proximate) places to quaff quality Belgian suds, by sending their Tilz (Facility 30) for various Belgian-beer serving establishments on their VictorsLists. Thus this user, when they happen to be in the, say, San Francisco Bay Area, could be alerted to three or four establishments that feature an impressive selection of Belgian beers. And geo-tagged VictorsLists can inform social networking and real world networking. For example, a user #1 walks past user #2 who is a fellow high-end travel VictorsList user, and both have geo-tagged Favorite Cities VictorsLists, that have in common, say the city Ravello, Italy. User #2 geo-tagged the Hotel Caruso there, with its breathtaking vanishing edge pool. As these users pass by each other, if they have set their VictorsLists preferences accordingly, the two could anonymously trade Tilz (Facility 30) (for free or for a fee) from their lists, and thereby user #1 might receive the Tilz for the Hotel Caruso. And should user #1 someday stay at Hotel Caruso, user #2 may receive a commission. Or user #2 could leave a geo-tagged reminder for user #1 (or anyone else), that is activated, say, when user #1 is at the pool at Hotel Ravello, whereupon user #1's mobile device alerts user #1 as to user #2's message/reminder—such as sip a Calvados at sunset poolside; or leave a geo-tagged alert for the area on a road approaching Ravello, such that when other users who have been sent this geo-tagged alert from user #2, their GPS-equipped mobile devices alert them that this area (which boundary is circumscribed by GPS coordinates) has two excellent wineries worth visiting. Also, if one user maintains a list of Recent Hotels stayed at (a VictorsList created as per optional automatic geo-tagging), and passes near another user, whose VictorsList also indicates they stayed at one of those same hotels, those users might take a moment to stop and share their experiences. In embodiments VictorsLists are displayed via a plurality of means, such as via digital map mashups, with pushpins indicating favorite hotels.

Life-Item Ratings. Realtime "Nielsen Ratings" for items on all VictorsLists: How many users are utilizing that item; How often; How long has that item been in use? What percent share for that product category (broken down by affinity group); How highly rated that item is (satisfaction level); Is the user open to competing products or services for that item, etc. Nielsen ratings for household items. Via their barcode/RFID scanning (Facility 31/33) mobile handset (Mobi) users scan the items they use each day, which automatically creates that user's life-items VictorsList. In embodiments, and only for users whose profile allows) VictorsList creates packaged bundles of the life-item information and makes it available (for a fee split with participating users) to advertisers and market research firms; users may also get paid to individually make their VictorsLists available. VictorsLists can be supplied anonymously to such third parties, and can be exported to Ad Widge (Facility 1) and Coupon Widge (Facility 3), for ad/coupon management and profile monetization.

Nielsen Ratings Competitor. Nielsen ratings does not necessarily do a good job tracking shows, as it relies upon people to remember what they watched, often a week later, when filling out a TV diary. VictorsList can easily track all shows watched on TV, DVR, wherever and have those shows automatically added to each user's: TV Shows Watched VictorsList; Movies Watched VictorsList; Songs Listened To VictorsList, and users get paid to make these lists available to advertisers.

Ad hoc communities built around VictorsLists. Because VictorsList information is stored as Tilz, and Tilz can be full color pictures, video, animated, anything, such lists create a compelling way for users to interact with each other around shared interests. Example ad hoc communities: My Clothes Closest (clothes lovers can trade Tilz, or Spherez, dedicated to certain brands, or type of clothing); My Comic Books (strategies for building valuable collections); My Garden Plants (green thumb superusers share tips); My Birdwatching List (get to know fellow enthusiasts, plan avian excursions/trips), etc. Each community has 3 main sections: 1) search (expert, tag-based search); 2) share (blog/chat/forums); and 3) sell (buy/sell/trade/barter/auction marketplace). Via VictorsLists, lists become a place where users do their searching, socializing, and transacting for that subject/topic. Thus as the people on that list build up the best information available about that subject/topic, they can, as a group, monetize that information, via VictorsList. Users, even other search engines, may have to pay the, for instance, My Birdwatching VictorsList to return expert search results utilizing that expert birdwatching information.

e-Commerce Enabled VictorsLists. VictorsList list items are Tilz (Facility 30). Tilz are transactable objects. Stores can link to item Tilz if the store buys/sells/trades that item. VictorsLists are also s-commerce enabled. Users can choose to let the Tilz of any item on any VictorsList be CloudCast (Facility 23), and thus traded or sold with passersby. In the way that conventional art Websites link to each other, stores can (pay users to) link to items via the Tilz of those items in a user's VictorsLists. Items, for example, that a user possesses (or wants to possess). Creating not just a connection, but a future (potential) transaction path. Thus anytime a user grabs that Tilz, they'll know where they might be able to buy that item. Stores linking to user's VictorsList Tilz may have a disruptive effect on the way everything is marketed, merchandised, and sold.

VictorsList is the way people create the profiles of everything in their life. Lists of everything they have, want or need; everyone they love, met, or want to meet. Lists of what they want to accomplish, and what they've already done. VictorsLists paint a picture of each user that that user can utilize to inform their interactions and transactions. To save them time, and make them money. Third parties may pay VictorsList users to view and review their VictorsLists. And, if the user wishes, pay them again to send information/ads/offers that relate. And VictorsList enables millions of people to turn their passion into a business, and in the process, save others countless hours. And VictorsLists make available passionate expertise that other users can benefit from. VictorsLists have many uses. Advertising tool. Communications tool. New ways to interact and socialize around (shared interest) lists. Geo-tagged and RFID lists alert users to content, people, places or things as they walk past them (or plan to be near them in the future). Users get paid to make Life-Item ratings available to marketing firms. Uses get paid to make their VictorsLists available to advertisers. Users get paid to let their list information inform expert search services. Users might even discover dating partners or employee candidates via VictorsList. And finally, VictorsLists become a place where users do their searching, socializing, and transacting for that subject.

Facility 19

Credentials Facility

5119

In embodiments, a module that facilitates trusted transactions (hereafter "Web Cred") is provided. Web Cred is a profile of a user's online/offline behavior that, in embodiments, is compared against profiles of other similarly situated users to check for anomalies. Web Cred checks/certifies, provides authentication statements, attribute statements, and authorization decision statements. In embodiments Web Cred can be expressed as a score. (similar to a FICO score). This score helps parties to the transaction feels comfortable about those they are doing business with. Web Cred is CloudCast (Facility 23) to other sites and individuals a user acts with online or off. As online interaction becomes more prevalent users will require better information about those with whom they're interacting.

As more and more transactions are online/digital, peer-to-peer, and/or profile-based, it's essential to have a way to increase the trust level of those transactions. Trust in the person or business or other object/entity/thing with whom the user is interacting is critical. Web Cred is watching out for you. Web Cred is a living set of credentials ensuring a person's or company's (or other object/entity/thing's) online presence is who or what they say they are. Trusted Transactions. As users scan barcodes/RFID their Web Cred profile is (automatically) created. In embodiments users' profile elements are anonymously compared to other users with a similar claim. Web Cred also checks/certifies credentials of things and objects, and/or object metadata claims. Is that a genuine Chanel bag or a pirated copy? Does that lightbulb really last for 2,000 hours? Is this frozen dinner really low fat? Does this tire actually last for 50,000 miles? Is this a genuine or counterfeited product. Web Cred for devices. Utilizing the device's unique ID/serial number or even the device's chip's defect pattern, Web Cred creates a unique "fingerprint" for each digital device. Thus, when a user is conducting a transaction, the device "fingerprint" can be utilized to authenticate that user A is conducting a transaction with device D, which is in fact owned by user A.

Certification of the credentials claimed by a person's online presence. Web Cred checks/certifies/provides authentication statements, attribute statements, and authorization decision statements. Web Cred is CloudCast (Facility 23) to other sites and individuals a user interacts with, online or off. As online interaction becomes more prevalent, users may require better information about those with whom they're interacting.

In embodiments, four types of data comprise Web Cred: user-stated information (e.g. "I am an expert scuba diver."); reference information (other scuba divers can attest to the user's skills); verifiable information (Web Cred scans for scuba certifications, dive trip receipts, dive equipment receipts, dive log entries or posted excerpts; and consumer-rated information (the person relying on the accuracy of the Web Cred information can rate the accuracy of the Web Cred). Web Cred receives a fixed fee or commission for transactions that relied upon the Web Cred. Certified Cred. For example, part of the tuition fee for Stanford University could include lifelong Certified Cred as a certified Stanford graduate; which same could be verified by interested parties/entities (for free or for a fee) via a plurality of means, including simple server ping.

Web Cred works in concert with the growing number of lists and profiles available online (or otherwise being CloudCast (Facility 23)). So user or object claims are becoming more easily verifiable, but the volume of information to search may be too great for individuals to readily deal with. Accordingly a Web credentials service is desirable. And the more profiles available, the easier it is to certify claims, via use of other profiles to verify claimed information.

Personal extranet. For example, a user selling their own home via CloudCast (Facility 23). The user might want to interact only with those who meet certain criteria, such as: the buyer must have a real estate agent; potential buyer must be pre-approved for a least $X; or, perhaps, anyone can view the listing. User control the criteria for people to view their listing, Web Cred ensures those people meet those requirements.

Dating Example. On a dating site a user might claim to be in to premium food and wine. However, if Web Cred can't find any receipt scans from numerous high end restaurants, or foodie conventions/events; or famous chef cookbooks; or purchases of top-of-the-line kitchen appliances/cookware, then it is unlikely that the person is credibly into premium food/wine.

Web Cred Identity. Users can scan the barcode on their driver's license or passport to establish their identity for online or offline transactions. Once identity is established, Web Cred can be utilized to electronically sign a document or establish the user's identity on an online forum, or establish the user's identity in an offline Bluetooth transaction (such as two individuals exchanging Tilz via their mobile handsets (Mobis)). Web Cred can, for example, charge individuals, say 1/10 of a penny via iDough (Facility 7), to post comments on a Website. Using iDough can help establish the user's identity, since iDough required authentication of the individual to set up the iDough account. For professional social networking sites, policing service memberships is a top priority without a simple solution—a solution that Web Cred provides.

Identity fraud protections. Web Cred can track instances when a user's identity is presented online or offline—via, for instance, purchase/transaction/interaction tracing. Web Cred enables the user to make realtime changes to authentication and identification checks others must perform to determine the user's identity. For example, Web Cred can CloudCast (Facility 23) potential identity fraud alert, and require not just a driver's license, but also random, and much harder to duplicate identification ID authenticators, such as a library card, or cellphone ID/serial number.

Credentials fraud protections. Web Cred can track every time a user's credentials are presented in online or offline transactions. Web Cred can compare any given transaction with a user's history of transactions and can send notification to the original user regarding anomalous activity. For example, if a user has never made a jewelry purchase over $500 (as detailed in the user's Jewelry VictorsList Facility 18), and is then attempting to make a $5,000 jewelry purchase a fraud protection notification can be issued to the user/store. Web Cred also covers content protection and certification—in order for consumers of given content to trust the veracity of said content, Web Cred performs compliance checks to ensure that content meets stated standards. For example, is the person posting content on the Website's peer-reviewed child development paper posting section an actual certified child psychologist? Has the paper been peer reviewed? Has the paper been published in a leading eduction journal? The subject Website may claim such standards, or such standards may be implied, but Web Cred certifies compliance.

In embodiments, Web Cred creates a digital certificate for an individual's personal and professional claims. In such instances a statement or claim may be bound to a public key, but the public "key" may (in instances) be other public information about that person that Web Cred surfaced to further verify (and ultimately certify) that person's identity statement or claim. And statements or claims can be further protected by a private key which only that user has access to, but must be verified as part of that digital certificate. For example, a person could make their mobile device's unique ID number their private key, thus any transaction involving them, will require their mobile device (Mobi) to acknowledge and return a ping. And a crook will find it difficult to defeat the plurality of ever changing combinations of various authentications Web Cred can provide. And since a user's profile (which is built in part via a user's various resumes) constitutes currency and may become a source of income for users, it is important that the items in a profile or resume are accurate and even certified—some payors may require. Web Cred includes data and references from all of a user's resumes: travel resume (frequent flyer status, miles flown, average cost per mile), climbing resume, scuba diving resume, published articles/books, etc. Any on such resume might induce advertiser to pay the user send ads based upon the user's resume contents, thus (Web Cred) verified accuracy is desired. Advertisers may pay extra to reach a group of users possessing a certified list of attributes. And with more and more sites relying on the site users to provide content and even (tech) support, its becoming ever more important to know who a particular user is.

Web Cred Credentials. Beyond simple, who is this person, and what college degree to they have, Web Cred credentials extend to all of a user's lifetracks or life activities. Examples include: This user has summited at least X number of peaks over Y meters in height. This user owns at least one motorcycle. This user is a member of a private gastronique society (and this part of the credential is only seen by other members of that gastronique society). As today's huge horizontally assembled groups of users begin to specialize into ever more vertical affinity groups, some of those affinity groups may want to qualify users. Expert climbers, for instance, want to climb with other expert climbers, since their life is in the hands of their climbing partner. Therefore, they must verify the user's bona fides.

Security. Some sites/interactions may require users to have a visible Web Cred profile; and users with a Web Cred profile score too low, may not be allowed to see or interact with those with qualifying scores. A Web Cred score is similar to a person's FICO credit score. Web Cred scores allow for custom mathematical weightings, as per each affinity group's preferences. A Web Cred score can take into account data such as a user's product rate and gross lifetime purchase volume, which data can also be separately surfaced to advertiser's via Web Cred if the user's profile allows.

Such data might improve a user's credibility, and therefore increase any payments from an advertiser.

Web Cred can also used by sites to show different content to different people based up their Web Cred score, as well as be utilized to present a differing profile for each visitor. A user's site profile can change depending upon the Web Cred (score) of a particular visitor. Stores, for instance, might make differing offers to the same user depending upon changes over time in that user's Web Cred score. Not just who a visitor is, but how valuable that visitor is. For example, the user's conversion ratio, which is how often they buy that product, say, after receiving a coupon for that product). Other Web Cred uses include news article rebuttal verification. Increasingly often sites (and perhaps soon shows) allow users to rebut or comment on content. However, in some cases the site owner only wants qualified rebuttal. Web Cred can make that automatic, and thus inexpensive. VIP Identification. In airports, for example, Web Cred can identify (if the user wishes) Executive Platinum (or similar premium level club members) frequent flyers. Or in restaurants, VIPs will get the proper table from the hostess. Or loyal customers get their support phone call answered more quickly.

Web Cred thumbnail Net Dotz (Facility 27) stickers. Users peel off a thumbnail barcode sticker. The sticker can be set to expire n minutes, hours, days, etc. Such sticker could be used in a situation where a user entered into an item sale transaction, and now its time to exchange the actual item, at a neutral site, such as a coffee shop. The seller can verify the user's identity by scanning the user's thumbnail Net Dotz sticker. This enables users to asynchronously "CloudCast" (Facility 23) their profile, without need for their mobile device to do the CloudCasting. The other party to the transaction, scans the thumbnail Net Dotz sticker, then connects to the Internet to download that user's profile (Tilz Facility 30) or Web Cred transaction credentials.

In embodiments, Mobis have a barcode scanner (not a camera) that can read fingerprints. A simple, inexpensive way to establish a person's identity for online and offline transactions. Other Mobi embodiments may include a camera that can fingerprint match. The user can take a picture of the user's fingerprint, whereupon it is encrypted and uploaded it to the Web Cred site, for identity or profile verifications. Spam Blocker. With Web Cred users can set their mail program to only accept mail from fingerprint signed email (an embedded image based upon a proprietary transformation of the user's encrypted fingerprint pattern). Spammers won't sign their emails with fingerprint ID. The embedded image is, in embodiments, transmitted to Web Cred's server for identity verification, then, if correct, the email is "stamped" with an electronic certification from Web Cred. User can then sort for email that's certified. Thus if a user has set their inbox to only receive certified email, a user's spam email might be substantially reduced and/or almost entirely eradicated.

Facility 20

Preferences Facility

5120

In embodiments, a module that facilitates preferences profile management (hereafter "Web Pref") is provided. Web Pref CloudCasts a user's preferences profile, as to how the user would like to interact online and off. For example, how this user wants to be advertised to—lots of technical details or instead with the focus on the emotional experience that product/service provides. Also Web Pref transmits how that user wants their steak done, when they're at a restaurant, or a friend's BBQ. With Web Pref, Websites can morph to the way each user would like the data presented. Kids can get G-rated versions of movies/TV when they watch. When the user checks into a hotel, the user finds the Reese's peanut butter cup (their favorite) on the bed, instead of the more conventional mint on the pillow. With Web Pref, users regain control and user's get paid.

With Web Pref the world finally responds to what the user wants, not the one-size-fits-all marketing and interactions as per the conventional art. How the user wants information presented to them. How the user wants her e-magazine laid out. How the user wants ads show to him etc. etc. In embodiments Web Pref CloudCasts (Facility 23) a user's preference profile, as to how a user would like to interact online and off. How this user wants to be advertised to—a list of top features versus how using that product might make the user feel. And when an where the user would like various ads presented to the user—via radio, or via 1 minute video after 7 PM on TV. A user might get paid to allow access to their Web Pref profile. For example, a restaurant might pay 5 cents to be made aware of all of a user's food allergies and how they like their food prepared; saving the waiter from having to take the time to ask such questions.

Users create profiles that reflect their preferences for just about everything Information presentation (lists vs images. User like technical specifications or user like comparisons to competitive products and services or user like lots of details or user likes very few details or user like lists of (intangible) benefits, etc. etc.). What type of traveler the user is (adventure, authentic culture, first class, et. al.). Restaurant experiences (noisy and crowded, or quiet and serene). With Web Pref users get what they want, how they want it. Online and off. And users may get paid to share their Web Pref profile with third parties, such as advertisers.

Websites. Websites can, with Web Pref, change to suit that user's Web Prefs. Advertising slogans change to suit that user. Detail is hidden or emphasized. Information is presented visually (e.g. videos, et. al.) or via text. Trying to serve literally billions of different users, each with differing requirements and desires, with a single version of a Website is ludicrous and Luddite-ish. Web Pref provides a path for Website owners to the future: smarter, customized Websites—customized ultimately for each individual user, and smarter because Websites can "learn" a user's preferences (Web Pref) and continue to further customize itself for the user. Privacy issues. Each Website shares information differently. Each user has to take their time to change/update their privacy settings. But with Web Pref user's privacy preferences are transmitted to each site visited, thus the site can hew to the user's wishes vis a vis privacy. In fact, a plurality of Internet-based entities are set up to maximize the burden on the user. It's time for that to change. With Web Pref users create their preference profile in one single place, and simply CloudCast (Facility 23) that information to all interested parties. For instance, to another person nearby or even a Website hosted from across the globe. With Web Pref, Websites will know how to interact with the user, radios will play the desired songs, gas pump advertising screens will present relevant information. Store clerks will know to leave a user alone or to spend a lot of time with them. Others will speak to the user in the correct language, etc.

Watching TV. Don't like movie or TV show previews? With Web Pref, the viewer won't be subjected to them, and kids will get the G-rated version of shows (or whatever version their parents set for them). Ads are presented as per the viewer's Web Pref profile, and solicited ads will appear when desired, in the format most suitable for that viewer. And instead of other entities trying to create profiles of a user's viewing habits or advertising preferences (and thereby making money off the user's profile), with Web Pref users regain control, and users get paid (for use of their profile). Web Pref can be used in conjunction with Ad Widge (Facility 1). Ad Widge controls which ads, Web Prefs indicate how ads are desired. Solicited ads. A user in the market for a new washing machine, wants to see ads for competing brands of washers but only wants certain types of ads delivered to the user's mobile device, and only at night, or on TV during weekends.

uTag Search. Websites can track the types of profiles visiting their site, then push that information to profile-based search engines such as uTag, so that search results are customized for each user. For example, if a site notices that lots of young surfers visit their clothing site, this clothing site will not be ranked high in the search results for an elderly person, for instance, but will be ranked higher for surfers in specific, and beach goers in general.

Web Pref uses. Users setting up a booth at a conference (power, lighting requirements are met by facility crew); User enters cubicle at work (overhead lights dim/brighten, monitor height adjusts); User at restaurant (user CloudCasts (Facility 23) favorite foods or current cravings, so waiters can make informed suggestions); TV viewing data (Web Pref can, if the user wishes, gather a user's TV viewing habits, and make them available to interested third parties—ad agencies, market research firms, TV networks, TV service providers—for which the user gets paid).

User in a store. Custom food labels via mobile device (Mobi) and Web Pref. Instead of a one-size-fits-all single label protocol, Web Pref users can select their own preferred display option. Diabetics may want all sugars grouped under "sugars:" corn syrup, high fructose corn syrup, molasses, cane sugar, beet sugar, artificial sweeteners, etc. will be grouped as "sugars." Thus, it's easier to determine which foods are high glycemic. Suddenly, some peanut butters, some cereals, and a plurality of other foods, may have sugar as the number one ingredient. Much to the surprise, and perhaps chagrin, of some users. Customized labels can also manifest the points systems employed by various diet programs that each food product contains. Customized labels can display, how many "servings" of vegetables are in the usual volume of soup consumed by that user.

Companies no longer have to limit themselves to just one logo or just one marketing tagline/phrase. With Web Pref different users can see different logos, and see different taglines when visiting the Website, and hear different phrases during commercials.

With Web Pref, for the first time the user's preferences are controlled and owned by the user. And the rest of the world can respond to the user exactly as the user would like to be dealt with. With Web Pref Websites can finally achieve their full purpose and respond to each user individually automatically. Search results are customized as per each user. Web Pref revolutionizes advertising. With a Web Pref profile indicating when, where and how a user would like their ads presented to them. And not just ads, but also everyday real life offline things such as how a user would their shirt dry cleaned (starch or no starch). And finally, users get paid to share their Web Pref profile with third parties.

Facility 21

Browsing Facility

5121

In embodiments, a module that provides browsing facilitates (hereafter "Browz Widge") is provided. Browz Widge adds Web browsing capability, browser functions and Web services to any Tilz (Facility 30). Browz Widge is a powerful and pervasive platform for all kinds of Tilz apps, that makes the browsing core available to Tilz developers. Browz Widge also manages Tilz connectivity across a plurality of network communication protocols, and other means such as peer-to-peer. Connectivity should be built into virtually every object, whether a document on a computer or a real world object. Browz Widge obviates the outmoded concepts of a browser as a separate or standalone entity which the user has to launch and engage with, replacing it with seamless connectivity technology that becomes part of objects. Similarly, Browz Widge enables Tilz to connect to any other Tilz no matter where the Tilz is hosted, including on other user's mobile handsets. With Browz Widge the browser will be used to access not just Webpages, but also TV shows, telephone calls, and all other types of digital content, including virtually all of a user's widgets.

With Browz Widge a browser is no longer something a user has to "open," it's a seamless built-in function that users can utilize to find content, or perform transactions or interactions, via any sort of modality at any time. For instance, users can "host" content by simply changing the CloudCast (Facility 23) tag from "Private" to "Public." Then, that Tilz can be accessed by other users, subject to the content owner's restrictions. Browz Widge tightly integrates Tilz to each device. Tilz can thereby access the GPU of the device the Tilz is running on, or even a nearby GPU of another device then simply mirror content to whichever device or displays the user wishes. Just like Web applications, which are functional regardless of which device a user is accessing them from, Tilz widgets utilize Browz Widge to provide a Web "platform" that enables users cross device functionality and streamlines development for widget makers. Local widgets function like Web widgets (and vice versa—Web widgets function like local widgets). A user can control the means by which information shared via the connectivity manager. Tilz, via Browz Widge can recognize other Tilz no matter which network they are on, and can communicate with each other. Tilz (such as widgets and Websites) function when not connected to the Internet—utilizing local, offline resources; and can be shared via means such as (near) infrared and Bluetooth.

Browz Widge enables Tilz to connect to any other Tilz, no matter where those Tilz are hosted. For instance, if user #2 is following user #1's Wine Cellar VictorsList (Facility 18), then user #2's Tilz, which are a copy of user #1's Wine Cellar Tilz, will be updated when both users' Tilz are connected. This is true, even if the Tilz (such as user #1's Wine Cellar Tilz) are hosted on user #1's mobile device (Mobi) (and not at a remote server connected to the Internet). Browz Widge enables Tilz to connect asynchronously, by, in embodiments, storing delta changes (or the instruction to attempt to perform synchronization of such changes) from the master Tilz, and providing those changes to the slave Tilz whose those slave Tilz next connect. Dependent (slave) Tilz receive just the changes, and such data are synchronized when connectivity is present.

Browz Widge provides browsing capability via any available network frequency, even unconventional frequencies. Browz Widge features an unique non-browser interface. The conventional art browser interface was designed by engineers/computer scientists for engineers/computer scientists. It's unattractive and contains information in the address bar, that is of little interest to most users. In embodiments Browz Widge a connection to any type of network, or other users, or other devices, or to ComClouds (Facility 23) is always being sought. The Browz Widge interface, hides all the technical details, and people can simply, search out any information or content they want, from any Tilz, and will be presented with available Tilz, as per their preference profile (Web Pref Facility 20). In embodiments users are presented with a list of categories and they simply drill down to what they want or use a general "search" box to get to the information or content they seek. Type in "Pets" or navigate to "Pets" in the Browz Widge popup menu. The user can then hold their finger over that word to see additional pets-related choices appear, both from external sources, as well as a user's own Tilz and information—an unique information navigation methodology. Pet accessories, pet food, pet toys, etc. The user then moves their finger to the selected sub-category, and so on, and so on, until the desired content is found. Browz Widge notifies the user if the content found must be paid for. Browsing offline content and objects. With Browz Widge users can browse actual tangible things, such as merchandise while in a bricks and mortar store. Users can interact with an object's ComCloud (Facility 23) to get more information about that object. Thus as a user moves about in the real world, Browz Widge is managing interaction with the plurality of objects/entities/persons that a user encounters, as well as can interact with tangible objects/entities/persons on the far side of the globe via CloudCast (Facility 23). Browz Widge is the user's access point to the world's knowledge.

Browz Widge manages Tilz interaction with networking, middleware and software technology. P2P (handles peer-to-peer interactions). Self-organizing networks (for example, groups of people who happen to be proximate and attempting to achieve the same goal). Resource Management (can prioritize delivery of various Tilz). Charging and Billing (facilitates connections to payment processors, and other individuals, by any means available). Grid technology applications (Browz Widge will work with forthcoming grid-based networks, that form to offload wireless traffic onto various terrestrial modalities). Middleware for comms (brokers the various communications interactions for that user). Security (handles security both for intrusion detection, as well as safeguarding outgoing data). Network management (manages the interactions with all the various networks the user utilizes). Ad hoc networks (established the connection to other users, for instance, with whom the user has made a profile match with). Ubiquitous/wearable/pervasive computing (handles interaction with wearable RFID or barcode/Net Dotz (Facility 27) stickers. Manages the continuous actions of Victors Botz (Facility 17) acting upon a user's behalf.). Context awareness (utilizing various Mobi facilities can make situational versions of Tilz or profiles available to others depending upon the exigent factors). Intelligent Networks (if a user encounters networks with similar smart technologies, the interface will be handled by Browz Widge). Switching and routing (manages a user's interactions with switches, routers, load balancers, et. al.). Sensor networks (manages interaction with nodes such as Survey Eggs (Facility 39) and Gotz Dotz (Facility 37). IPTV (handles a user's interaction for Internet protocol television, sending and receiving content, and associated rights management credentials (Web Cred Facility 19). DTNs (delay tolerant networks. A plurality of transactions will by asynchronous, so those pending transactions will be the province of Browz Widge until such time as a connection is made, or that Tilz or transaction can be handed off to another (user's) device to complete the transaction.

Facility 22

Digital Content Security Facility

5122

In embodiments, a module that facilitates digital content security (hereafter "Bubb Wrapp") is provided. Bubb Wrapp enables packet-level Tilz (Facility 30) distribution security (node software to enable blocking and routing control of Tilz). Bubb Wrapp ensures Tilz creators have content control; and ensures Tilz users have ownership rights. Content owners wrap their content in Bubb Wrapp which then controls all aspects of content usage. In embodiments Bubb Wrapp software is configured for operation on network nodes (switches, routers, hub, servers) to prevent blobs (documents, files, songs, videos, any digital item/content at all) from being transmitted against the wishes of the blob owner. Expiration and automatic/remote deletion functions such that if a blob that is expired, or set for deletion, passes through a node, the node can terminate the transmission or even delete the blob. Bubb Wrapp facilitates transmission priorities (high priority=pay more vs low priority). Authentication. Verification. Authorization. DRM. Use restrictions. Route History. Objects assigned IPv21 #. Metadata tags. Metadata marketing. Broker Rights Management. Suitability ratings. Virus protection and security measures. Bubb Wrapp Pro offers a greater level of security for entities such as corporations and governments.

Digital rights management (DRM) is a key technology that as per the conventional art, in a plurality of incarnations, has made one party or another unhappy with its implementation. Bubb Wrapp solves that problem by clean-sheeting the concept of DRM, and creates something that both content creator and content consumer both like and want. Bubb Wrapp facilitates security protocols and DRM for Tilz. For example, let's say a user purchases a DVD movie Tilz (a digital version of the movie, with all the DVD contents). The DRM could prohibit that user from sending that DVD Tilz to a friend, by blocking its movement at the nearest switch or router. Strong authentication is a key to securing (remote data center based) data that can be accessed via a network or other type of connection and/or the Internet (hereafter "cloud" data). Bubb Wrapp provides authentication of the user's rights, of the content owner's rights, of the content creator's rights, etc. Such measures may reduce pirated software/content, which will fail to properly authenticate and thus blocked from transmission at network nodes. Or may have its usage limited or even blocked on various digital devices. Strong authentication is a key, as well, for inter-cloud data. There will be a plurality of clouds. Every user and device and object CloudCasting (Facility 23) its cloud, so which data is shared between clouds must be tightly controlled. Network Virtual Cloud. Network virtual cloud enables network nodes to act as computers and interact with Tilz profiles as they pass by. Also the technology which enables or allows on user to carry another user's Tilz, in hopes of furthering that content and/or profile delivery or interaction or transaction. Network virtual cloud describes what all clouds can expect from each other. Some clouds are created for single transactions, then disappear; while other clouds continuously CloudCast a user's wants and needs. All clouds don't need to work their way through all the data contained in every cloud they encounter (which could be time and network resource consuming); instead, clouds inspect other cloud's metadata to determine if they even need to dig in.

Content owners wrap their content in Bubb Wrapp, which then controls all aspects of content usage. Bubb Wrapp embeds the item's IPv21 # (Facility 25) into the metadata (Tilz profile of that item). Copyrighted clips/material, for instance, will only then be able to go where it is supposed to go, and be utilized by whomever is authorized. Let's say a user rents a DVD Tilz for 48 hours. If at hour 49, the user to send it to another user of the user's devices, that blob will be deleted.

Authentication (that, this is indeed the actual object or product or other thing by the original proper maker). Verification (that the user is indeed who or what they claim to be). Authorization (that the person using the object is or is not authorized to utilize the object according to the user restrictions). Digital rights management (includes items such as ownership and usage restrictions. For instance, is making copies allowed? Bubb Wrapp DRM handles the cast where an object expires after X hours or days or perhaps after being viewed). Use restrictions (whether the object may be modified or not). Route history (starting from sender or maker to and through all intervening parties/users. Tracks and stores the route and notes every node passed. And, in embodiments, the object can optionally send its location back to the owner's server every minute, hour, or day). Objects assigned IPv221 # (each digital object is assigned a master permanent, unique ID number (which is also the IP address for the Tilz for that object, which is the profile of that object). For every copy of the master made or sold, another IPv21 # is assigned). Metadata (information about that object, as per its profile or Tilz. Such as usage costs or contracts. Synopsis of the object. Ratings by various users or agencies. Offers for complimentary or competitive items. Related Tilz. Advertisements. et. al.). Broker rights management (contains the legal stipulations and conditions upon which any person or company may buy, sell or trade the digital object. These rights can be updated any time via scheduled synchronization with the object owner's master Tilz). Suitability ratings (who should use this blob? G, PGk, PG-13, etc.). Virus protection and security measures (can include third party technology which plugs into Bubb Wrapp's application programming interfaces APIs).

Physical objects can be Bubb Wrapped. Each physical object sports an IPv21 # (Facility 25), Net Dotz (Facility 27) (or barcode or other type of identification number/symbol/ thing). Whenever a user of that item scans the barcode, for instance, the metadata is surfaced (via a Tilz) which contains the Bubb Wrapp information. The metadata informs the user of the various use restrictions, and could set off alarms if, for instance, the user's profile indicates items at odds with the physical object's restrictions. For instance, "Information in this product data sheet cannot be shared with others without a use license, would you like to purchase a license?", Or the user is purchasing incompatible prescription medicines; Or don't eat grapefruit with the high blood pressure medication this user is on. Or even the case where the user has a drill at home for which they are purchasing a drill/driver set. While at Home Depot, Bubb Wrapp informs the user this drill/driver set is incompatible with their drill at home. And as more users scan barcodes and more objects sport RFIDs, physical objects thereby have a ComCloud (Facility 23) emanating from them, which contains the (Tilz detailing the) various Bubb Wrapp protections (for that object).

Content has never been so mobile, which informs the desirability of entirely new solutions for securing digital rights.

Facility 23

Commerce Communications Network Facility

5123

In embodiments, a module that facilitates cloud-based commerce and communications (hereafter "ComCloud") is provided. ComCloud turns commerce inside out. Instead of posting information elsewhere (such as a Website), just create a cloud (data objects being broadcast) with the user's wants and needs and continuously broadcast (hereafter "CloudCast") those wants and needs, enabling the world to respond to the user. ComCloud matches each user's profile with the blizzard of ComClouds and profiles emanating from various businesses, people, and objects in the area, and just delivers those matches when, where, and how the user wants those Tilz (Facility 30), according to the user's profile (avoiding the cacophony that might otherwise drown them in messages). Some of a users wants and needs are expressed relative to the various objects a person owns or utilizes, thus a user could scan the barcodes/RFID (Facilities 31/33) of all the stuff a user owns, and thereby be surrounded by an invisible virtual "cloud" of Tilz (a Tilz for each item a person owns, uses, etc.). And thereupon other entities, particularly those with their own ComCloud, can interact and transact with the user. For example, businesses could pay the user to receive relevant ads/offers/coupons/information. ComCloud is the commerce communications cloud emanating from each devices, objects, homes, businesses, etc. which sets/ limits the geographic scope of transactions (commerce) and interactions (communications).

In embodiments, market research firms pay users to see where groups of users' ComClouds overlapped (e.g. a profile match occurred), and the success rate of those transactions. Intra cloud interaction and transactions data, is data never before seen by market research firms. ComClouds CloudCast not just profiles of items but also user preferences (Web Pref Facility 20), how users would like to interact and be interacted with.

CloudCasting. ComCloud software can be downloaded to switches, routers, hubs, WiFi repeaters, cell phone towers, etc. to enable users to limit the geographic scope of their commerce/communications transactions/interactions. Geographic limits can also be set using online maps as facilitated by network nodes. Network nodes finally become smart (administering long awaited veracity to the statement: the network is the computer). Nodes know for example, their precise location (GPS coordinates), thus can tie into online maps and other digital mapping technologies, so users can easily and visually limit the scope of their interactions and transactions (e.g. 300' from Mobi, 5 miles from home, user's zip code, user's country). And content owners can similarly limit the distribution of their content. Nodes can even execute transactions. For example, match pro files that seek or have an antique desk for sale. When a phone is out of range, it can't make calls. So too (no bueno) for ComCloud interactions or transactions attempted outside the user-determined geo scope.

Other use examples include: One friend can "leave" iDough (Facility 7, credits-based electronic currency) for another friend, in the ComCloud of their favorite restaurant, to buy that person a meal. Let's say user #1 likes a particular restaurant, and wants to introduce user #2 to it. User #1 can pay for one entree by posting, for example, $15 in iDough available to user #2 when she pays her bill. User #1 posts iDough to the restaurant's ComCloud, and when user #2 is identified as being in the restaurant, she will automatically be notified of a $15 credit which she may apply toward her bill. Posting iDough to a ComCloud is equivalent to conventional art cashier's checks. Cloud-based (ComCloud-based) monetary transactions are the future; not "solutions" that in one form or another perpetuate aging technologies such as credit cards, and various methods of reading same. The money has already been debited from the user's account and is guaranteed to be fungible by the recipient of the money. Appointments (businesses, for example, can utilize ComCloud to manifest appointment calendars to customers who can then make appointments for haircuts, oil changes, consultations, dentist appointments, accountant meetings, etc. And this is just one example of a plurality of corporate uses for ComClouds); Automate reading of gas/water/electric meters (devices have a ComCloud which can be read by meter reader personnel either proximately (say from a truck driving past the home), or remotely from a central office; Personal extranet (such as for selling one's home, or seek bids for routine maintenance such as cleaning your gutters, trimming overgrown trees, or installing holiday lights; or seeking requests for proposals for a paver stone driveway installation, which contractors who happen to be driving by might notice, and respond to. In all cases, just CloudCast what the house needs, and people bid to address those needs); Information regarding your gardener or cool gate designer (people walking past your home admire your well-manicured lawn and shrubs. Or think your driveway gate is just what they've been looking for. They can request the Tilz for your gardener or gate designer or installer from your home's ComCloud. If those people then engage that gardener's or gate designer's services, the homeowner may be paid a commission); Job descriptions and requirements for open req's (hiring manage with open req's to fill simply includes those Tilz in their ComCloud. As the hiring manager passes by others ComCloud matches qualified users looking for a job); Stuff you have for sale (continuous "garage sale" of your books, clothes, and toys, even while you're just walking around. Offer your old kitchen appliances prior to your kitchen remodel; and utilizing ComClouds for surfacing inventory items applies to businesses as well. Businesses can create a viewable inventory cloud of the Tilz for each and every item they carry in their store, including how many of each item remain, in realtime. For example, if user #1 heard about a new organic granola bar, and wanted to show user #2 (who lives in another state) that user #2 should consider buying same for her kids, user #1 could search the ComClouds of stores in user #2's area, and flick the Tilz to her, with full details, as to price and local stores that carry it); Stuff you want to buy or just borrow for a few hours (for example, a user's young kids want an inflatable pool for the summertime. It's likely one of the use's neighbors has one they want to get rid of. With ComCloud the user will be able to track one down with little effort, and as per the conventional art it is unlikely a neighbor would have take the time/trouble to post a listing for an inflatable pool. ComCloud can also be used for items a user needs to borrow for just a few hours, such as a chainsaw. When everyone lets everyone lets everyone else know about their wants and needs commerce becomes significantly more efficient than as per the conventional art. This also included charity giving, not only locally, but also to other countries. Charities simply CloudCast the items they need, and trucks, trains, and cargo ships with extra capacity on a given run can make arrangements to deliver those items. This is possible when a complete map of all items wanted or needed is available for all parities to view. Whether for commerce or charity, ComCloud revolutionizes the distribution and merchandizing of goods and services.); Preferences such as how you like your coffee (barista doesn't need to ask the user, the user's preferences appear on the point-of-sale (POS) or barista's digital device.; Dietary restrictions, so waiter recommends suitable dishes (restrictions appear on the waiter's digital device (Mobi); expertise a user is willing to share or sell (for example, a user speaks several language and could teach others but doesn't want to hassle with marketing herself—and wants Web Cred (Facility 19) to screen others who respond to the user's CloudCast. Or perhaps the user just figured out how to insulate his pipes from freezing in the wintertime, and would be willing to share that information with his neighbors. Not only might neighbors get to know each other this way, but users don't need to keep re-inventing the wheel, if a neighbor has knowledge that could benefit them, ComCloud can help share that solution, to just those parties that desire it; Marketing tool for companies (users can post food items they would be interested in buying, to their ComCloud, then as they head off to the supermarket, they are transmitting those wants to the store (manager), which might consider stocking that item; and further, in reverse, products on the bottom shelves and in hard to reach places are put on a more level playing field with ComCloud, since all items in the store, even if on a bottom shelf, appear in the store's ComCloud, and thus can alert users who want such an item, as they walk by. If enough customers who frequent a particular market, indicate an interest in buying a product via their Want to Purchase profile in their ComCloud, then it is much more likely the store will order some of that product. As per the conventional art, it is an incredibly painful, arduous and expensive process for a little product maker to get their product into a store. Furthermore, via ComCloud an item can inform a customer about itself in a manner according to each user's preference profile (Web Pref Facility 20). For instance when a user is in the produce section, Acme Farms can CloudCast a simple audio clip to the user's Bluetooth headset, or to the user's mobile handset (Mobi) or later that day on the user's car radio, or that evening while they are watching TV, an Acme Farms commercial will appear between show segments letting that user know more about Acme Farms—which is a local organic farm. They've been in business for three generations, and nobody cares more about fresh, crisp, healthy produce than Acme Farms. This commercial can be tailored depending upon whether the user passed by Acme Farms produce without purchasing any or whether the user bought an Acme Farms item, and now Acme Farms want to sell more of the Acme Farms products. These scenarios imply different types of commercials for the same user, depending upon behavior that occurred just a few minutes/hours/days earlier. If the user accepts Acme Farms as a "Trusted Source" of information or alternatively finds a food critic or food expert whose advice and knowledge they trust, they can have their shopping experience curated by this source. Thus, as a person walks past other foods this Trusted Source can point out that this LargeCo food product is full of additives, preservatives, and known carcinogens. Or the Trusted Source can point out that the laborers for this LargeCo item are paid a very low wage, or can point out an alternative item that is Made in America, rather than overseas. This is just one aspect of the Hosted Everything (Facility 6) curated experience, as enabled via ComCloud and CloudCasting. And this same level of marketing interaction, and advertising customization can be delivered to TV viewers. The conventional art wherein users spend 15-20 minutes of every hour watching advertising which is not relevant to them is an obsolete concept. Addressable advertising is available via ComCloud.).

Social Assistant (you're walking down the street and see someone you know, but can't recall their name or the name of their dog they're walking, or the names of their kids. ComCloud to the rescue. Your ComCloud can query their ComCloud and if sufficient bona fides exist (such as both parties having met before, which interaction ComCloud can store a record of) low level social information can be exchanged, such as their name, spouse's name, kid's and pets names. Such information may be transmitted via means such as via Bluetooth to the user's headset, so smoothly-as-silk the user can call out: "Hey George! I see Brutus is taking you for a walk."); Layers (when users point their mobile device at others they can see other users' ComCloud. Users won't necessarily see everything in another person's ComCloud, just those items that the other person makes visually public. And the other person can still allow anonymous connections that are not visible to others. Another use for ComCloud's layers technology, stores could place a flat screen TV (or other means) in the window of their store, so customers can view the public ComClouds of others as they walk by. Stores can install a transparent electrochromic glaze or graphene coating on their window as a display overlay in place of the flatscreen TV. Alternatively user's can wear glasses or goggles with heads up displays or built in displays to view other's public ComClouds. ComCloud is also configured to enable videogames to take their games/characters to the real world, by posting same in use's ComClouds. And ComCloud information can be mirrored onto any compatible display screen including mirrors.); Cloud widgets, in preference to Web widgets (for example, tracking a FedEx package. Years ago users could call FedEx and provide the tracking number to get status information. Then came the Website where the user had access to the FedEx tracking database. Next FedEx may build a custom tracking widget for mobile devices. But ComCloud enables the next evolution of applications—the invisible or cloud widget, and in particular a ComCloud widget. When a user sends a Fed Ex package, the user scans the barcode of their shipping label which includes the tracking number. Now that tracking number becomes part of that user's ComCloud. Whenever there is a status change, for that tracked item, FedEx can communicate directly, automatically, with the user's ComCloud. Meaning, finally, the burden isn't on the user to go to a Website, or open a widget and type in a tracking number. With CloudCast, it happens automatically. Furthermore status updates can be via text or via notification on the digital device of choice or via automated voice message or via any other means, as per the use's Web Pref (Facility 20) profile. The user can still choose to get more information via, say the FedEx Website/widget, but it will cut down on the use's time investment. In embodiments users don't have to have the FedEx widget on their device, meaning cloud widgets reduce the amount of storage a user needs to dedicate to onboard widgets. And ComCloud enables widgets to be "on" all the time continuously and simultaneously in each user's ComCloud and interoperate with each other. Widgets have a new place to live, not just on the user's mobile handset (Mobi) but in their ComCloud); Object clouds (fixed and movable objects can directly or indirectly CloudCast their ComCloud, so that people and other entities may engage or learn about that object. For instance, network nodes, and cellular network towers can continuously CloudCast not only their location but also metadata (Tilz profile) concerning that node's capacity utilization, packet congestion, signal strength, transmission rates, etc. This is important since in some instance cellphones wait until their data signal significantly degrades before switching to another cell tower. By the tower's CloudCasting their metadata, mobile devices can operate closer to their advertised data rate, rather than the often 50% or less data rate users actually experience. Each tower's CloudCast enables cellphones with Mobi network analysis software, to know the most optimal tower to switch to at any given moment, including a predictive location for the user's mobile handset, utilizing the GPS, other components, and even calendar information (which might reveal the location the user is traveling to).); Note drop (users can leave a digital note Tilz an a particular object's ComCloud, a note readable only by the desired recipient. Whether it be a local coffee shop or a monument in Europe, only those people a user wants to read the note can do so. And users can require that readers be within a certain distance of the object to even see or receive the note. Users can also utilize ComCloud to make AirNotes for themselves. For example, if a user is writing a book filled with business tips, the user can capture their thoughts in quick AirNotes, as they think of them, that they store in their ComCloud. And users can remind themselves to set out the garbage cans for garbage collection the next morning, right as the pull into the driveway, via a ComCloud AirNote tied to a user-set location or boundary of a location (Survey Eggs Facility 39)).

Last minute hotels (obtaining a last minute hotel room via a reverse auction. For example, a traveler in a city needs a hotel room (maybe he missed a flight connection, or his original hotel was overbooked) but as he's riding in the cab from the airport, the user can indicate via his ComCloud that he needs a room for one night, and is willing to pay $200. And his ComCloud further indicates, via his Travel Profile Tilz, that this traveler spends over $10,000 per year on lodging, and his ComCloud Travel Profile provides his hotel breakdown (Ritz Carlton 15% of the time, JW Marriott 30%, W Hotels 25%, Radisson 30%). Hotels can then decide if it's worth the investment to try to lure this business traveler to their brand. St. Regis or Four Seasons might offer this user a $500 room, for his stated $200 last-minute price (or lower) because this is just the sort of traveler they'd like to have become a regular customer. Without ComCloud if a person called their hotel and asked for a $500 room for $200 they would likely be told know, but with ComCloud's unique ability to deliver profiles, the hotels can make an informed decision). Utilization of ComCloud further enables hotels to avoid having to advertise this very low price on the Web (on their or a third party's site), and enables the hotel to be solely in charge of their inventory and pricing, and is the ultimate one-to-one marketing. ComCloud can also be used by regular travelers to find last minute rooms, even in a sold out city. There are always last minute cancellations or rooms reserved for VIPs whose plans change. ComCloud also enables remote hotels to market globally and cost efficiently. A hotel in Bangkok would find it expensive and difficult to implement an ad campaign where the hotel can place ads in all the places future hotel guests might be exposed to such as magazines, newspapers, radio and TV in numerous countries around the globe. With ComCloud the hotel can direct their ads to users who routinely travel to Bangkok or are planning travel to Bangkok, or even just arrived in Bangkok. Another ComCloud use case is for hotels and restaurants in a city to send their empty room or table information to the ComCloud for various cab drivers or cab companies, so that cab passengers can utilize Bluetooth to get near-realtime availability information; even when the users don't have carrier network or WiFi coverage or capability on their mobile devices. It means that user don't need traditional sources of connection to participate fully in commerce: they can utilize mobile devices (Mobis) with no monthly fee, yet still make calls, run widgets, receive all the same ads or offer, watch the same TV shows or movies, etc. as people who pay hundreds of dollars a month for their mobile phone service, not to mention their TV service and Internet service providers at their home or office. Users can achieve all this via, say, Bluetooth.); Stranded at airport due to missed connection or canceled flight (once stranded the user posts to their ComCloud their need to get to Philadelphia no later than LOAM tomorrow, then let other airlines make offers to the user—thus minimizing the effort and hassle a traveler in this situation encounters as per the conventional art. ComCloud also enables buses and trains to make offers to this stranded traveler who needs to get to Philly, as well as entertains the notion of ad hoc car rental sharing with another similarly inconvenienced passenger (with Web Cred (Facility 19) and security checks performed automatically via the Mobi facilities platform); No need for IT personnel (for example, if a city wanted to test adding electric vehicle parking spaces (ala handicap spaces) they could do so without needing to hire a software developer, and without need for an information technology (IT) department to manage the test. The city can install a Survey Egg (Facility 39) at the parking site, and thereby enable electric car drivers to check-in to the ComCloud of the parking space, and thusly monitor usage ratios; On-demand social network (users in the real world, can meet up with people who share some common interests just by passing near them. "You have a sheltie dog, so do I!" or "You just went on the Aguille du Midi tram out of Chamonix, isn't the view amazing?" Guests at business traveler hotels can possibly find someone to talk with via ComCloud. Guests could indicate via their ComCloud they are up for a drink in the lobby or open to watching sports on the big screen TV in the bar or just talking by the fireplace. Then if any other guests meet their bona fides criteria, they could get in contact and meet); Business/company profiles (let's say a user goes to a store and works with a particular clerk, but ends up needing to come back at a later date. When the user gets home, the user realizes they don't remember the store clerk's name. The user can query the ComCloud for the name of the clerk, where each clerk's profile is posted perhaps with name, and photo and contact information. A user's ComCloud can keep a log of others they come in contact with (or are near, for user's who publicly CloudCast such information). Later, if the user wants to find out a person's name, they can query their ComCloud which, in embodiments, may then check with the other person's ComCloud to determine if it is OK to reveal each other's names, or start an anonymous chat session, or otherwise get in touch.); Customer evaluation survey (companies can set ComCloud to automatically monitor their salesperson's ComClouds. The company pays users for an instant, while-the-user-is-leaving-the-store evaluation survey on the use's mobile device. This ComCloud function is available for all interaction modalities. Meaning companies can utilize ComCloud's many features and functions, whether they are interacting with customers in-person as well as online or via TV or chat or email sessions. ComCloud is always there); Call center software (a user receives a solicitation from a brokerage firm to rollover the user's 401K, right after that user posted an update to a Website, that she just got a new job. Instead of having third parties trolling for such data, on millions of users, users can interact directly with intended parties. A user can post any status changes to their ComCloud, and thus any company, including call centers for a user's bank, stock broker, etc. can get in touch with the user, regarding their 401K rollover, by paying that user to make contact according to the user's profile—via phone, email, postal mail, video chat, radio or TV commercials, etc. And users can keep such information from prying third party eyes); Functional telemetry data (Appliances such as washing machines can utilize the owner's CloudCast to transmit telematics (for free or for a fee) to interested parties: how many loads per week (duty cycles), what time of day the washing machine is utilized, temperature of components (overheating with repeated loads?), actual spin rates, actual water usage); Glops (Users can leave glops (digital messages/data which may consist of text, audio, video, anything), for themselves/others on objects' ComClouds, such as refrigerators (rather than refrigerators having to install an expense-adding smart display screen). The intended recipient may discover the glop via RFID (RFID Widge Facility 33) or by scanning the Net Dotz (Facility 27) IP-enabled barcode on the object. Such glops are then displayed on the user's mobile device (which is where the recipient can act on the information (Tilz Facility 30), such as adding an appointment to their calendar, or an item to their to do list, or follow a recipe that someone looked up online, or even add an item to the recipient's Shopping VictorsList (Facility 18)); et. al.

ComCloud is perhaps one of the most significant advancements in communications technology for the past few decades. It will literally transform nearly every aspect of the network infrastructure industry, and wireless communications industry, and wireline communications industry. ComCloud also makes just about every prior form of commerce obsolete. And for user and companies and objects, ComCloud represents the next evolution of interaction. A user's wants and needs being continuously CloudCast is revolutionary. Stuff a user has for sale. Stuff a user wants to buy. The profile of the person a user wants to hire, or date. A task the user needs help with. A refrigerator than needs replacement. etc. These issues are addressed in a novel fashion, that advances search, advertising, marketing, merchandising and payments to the next level. Saving users time, while making them money. Users' preference profiles made available to all people, companies, and machines with which they interact is the holy grail for both marketing and user convenience. And ComCloud is the means by which each user, company, and machine CloudCasts their many profiles, which is how virtually every single interaction and transaction will be conducted in the future. Social networking (users post to, and share and interact from, their ComCloud. Like a social network for one's life, in the real world). On-demand social networking (interact with people, businesses or objects even though a user is not connected with them. In a completely novel fashion, users receive notifications, updates, or any other message or content when the user's ComCloud intersects with another person's ComCloud—where, for instance, the two people share a commonality, such as both users having the same breed of dog). Virtual personal assistant. Layers. Cloud apps. Object clouds. One-to-one marketing. Goods and services merchandising. When providers of goods and service actually see which users actually want their goods and services, the entire merchandising model is upended. It's hard to imagine a more disruptive and desirable technology than ComCloud.

Facility 24

Operating System Platform Facility

5124

In embodiments, a module that provides an operating system platform (hereafter "Float") is provided. The plethora of various software infrastructure layers and operating systems is a confusing mess for developers and device and network carriers, as well as users. Float floats above the confusion and creates an interaction and transaction commerce layer that is common across all devices and operating systems (OS's). Float is an operating system layer that enables objects (such as widgets) to communicate with each other without using the underlying OS (for example, two separate widgets can interact and interoperate with each other via CloudCast (Facility 23)). Float is configured for operation on devices such as PCs, TVs, and mobile devices. In embodiments Float offers a virtualization capability (the ability for a single software application to function on multiple operating systems, and for multiple operating systems to function on a single device). Float is the platform for the entire real world. Objects and other things can run their widgets and communicate and CloudCast with each other via Float.

Float enables the connection of a host of hardware and software and digital data-sharing networks without engaging the underlying operating system or standard media players. Float, for instance, enables users to view/play Tilz on their mobile device, even Tilz that actually reside on their PC or TV set top box (Mobi Homi). Just as there are software programs that enable users to remotely access their computing devices, Float enables users to utilize or view or play Tilz anywhere, on any device, from any other device. Services offered on one device can be extended to another device (for example, cable or satellite TV programming that a user has subscribed to on their TV can be viewed on any other digital device that supports Tilz (Facility 30) (subject to use rights vis a vis the cable or satellite company and/or content producer). Autoconfiguration of Tilz (via IPv21 # Facility 25) (when a new device (or Tilz) is added to a network, computers, as per the conventional art, randomly select an Internet protocol IP address (from the pre-defined range set by LANA—Internet Assigned Numbers Authority), then send out a message asking if anyone else is using that IP address right now, and if so randomly selects another IP address. Float uses IPv21 #'s to assign a unique IP address to that device (or Tilz). Dynamic discovery for Tilz (Tilz automatically seek out other Tilz as per the tag rights and ComCloud (Facility 23) profiles for those Tilz. Asynchronous data sync for Tilz (Tilz can be synced in a plurality of way without having a live connection via, say, a carrier provided network The Tilz can query if another user in Bluetooth vicinity has a new version of that Tilz, and get the update directly from another proximate user. Users can also send their Tilz out via other users' Packet Cache to be updated when those users are in network range. The user's Tilz are eventually updated, when the other users return to within Bluetooth distance of the original user to sync those Tilz). Multicast queries (when a Tilz wants to find out about other devices that have services it can use, such as an IP capable printer, Float enables this ongoing and continuous CloudCast. Service negotiation (for example, a document (a Tilz) is looking for a printer to print that document for no more than, say, 2 cents per page, or in exchange for a desired coupon, as per the user's Coupon Widge (Facility 3) profile). Optional metadata memory (Float can store (in embodiments, locally on the device on which Float is running) information about that Tilz. For example, Tilz with IPv21 #34493848 is an item for sale, which is a couch for $50. Float can restore or reconstitute this information (and/or profile) if the Tilz is destroyed. Float is also the platform that enables CloudCast profile matches (such as someone seeking a couch for $50 or less). Network-message traffic management (Float provides the underlying technology for services such as high priority Tilz routing). Custom security mechanisms (Float performs lookup against trusted services or devices or Tilz that match that user's profile, utilizing Web Cred Facility 19, Security Widge, etc.

Cloud platform (as more and more users switch to keeping Tilz local, developers can code to a single platform, Float, instead of having to write apps for various operating systems, or specific Website platforms. Write to the Float platform, and the widget will run anywhere on any device. More importantly, Float is a real world widget platform. In embodiments, third party widgets and services can utilize Mobi facilities, widgets, services and technologies in the real world, not only while online or logged into a portal (or other) Website. And developers who want to write apps that interact with the plurality of different real world objects, can write to a common single common cloud platform, instead of having to learn the plurality of different proprietary operating systems running on the multitudinous different physical objects, such as cars, refrigerators, lighting systems, etc. Float solves the Tower of Babel problem. Tilz-based operating system. Enables developers of Tilz widgets to have widgets run on other operating systems. A write once, run anywhere capability, for the mobile device generation. Float apps are configured to run on other operating systems such as Mac, Windows, Linux and bridge to proprietary operating systems such as Cisco IOS. Plug-n-play operating systems. A user could thereby switch operating systems, say, for their mobile device. User data (widgets, Tilz, metadata, and digital content) is backed up to the cloud (which can be a user's Mobi Homi, in their living room), and re-downloaded after the user switches operating systems. Float also enables a more custom experience to be offered by network carriers, which can create an integrated experience across all sorts of devices, in all aspects of a user's online and offline life (including even: TV's, refrigerators, cars, printers and a plurality of other devices and objects).

If the device owner allows, Float CloudCasts a beacon that signals its presence to other (Tilz) copies of Float, regardless of the underlying operating system. Thus creating connected-device interoperability for all devices that run Float (and thus support Tilz). Float apps are device-independent. Float is very lightweight, and can thus run on a wide variety of devices, that have less-than-cutting edge specification vis a vis computing power/storage/etc. Float adds personality to operating systems, as well as personalization and customization. A screen saver, instead of just displaying, say, whirling color patterns, can instead be animated and speak to the user. Float enables companies to customize the user experience on their devices. And Float further enables companies to personalize the experience as per each user's profile. For example, hotels. Many hotels, up to a certain point, are nearly all the same. The base hotel consists of a building, rooms, beds, lobby, hotel personnel, etc. But after the base hotel structure, there are major differences: consider the difference in how a user feels when walking into a budget motel vs how they feel when walking into a Four Seasons or Ritz Carlton property Think of a conventional art operating system as the base hotel level that is the same for all users. Float adds levels of service and customization that create different experiences for users. For example, if Motorola were to adopt Float, then anytime, anyone in the world picked up a Motorola device (any device made by Motorola, not just limited to mobile handsets), that user could be met with a look and feel, and a modus operandi that makes them feel at home, comfortable, and as if they already know how to use this device. Motorola devices featuring Float would also enable users to personalize their experience and have it automatically tailored according to their user profile. Does this user want primarily a voice-based interface featuring the voice of a well-known actor? Or perhaps the user is a child, and would want to be guided by a popular animated cartoon figure. With Float all of a user's settings, data, and access to digital content and programs could be stored in the cloud, and would be seamlessly made available anytime that user is on any Motorola device. Motorola could first create the "Motorola Experience" then extend that experience to the real world where the user lives and works. "Moto?" says the user. "Moto here" replies the Motorola device. "Please send a copy of this presentation to Joe Smith at BigBankCo, and find the cheapest flight to New York airport, JFK, leaving tomorrow." In order to provide this level of customization and service, Moto would need an ecosystem of technologies and applications such as those the Mobi Facilities provide via the customizable Float platform. Virus protection. Conventional art virus protection used to be a boring, but necessary application. With Float even virus protection can become a visual feast. Float enables a far more graphic environment than conventional art operating systems. Since Tilz (Facility 30) enable videogame characters to leave their game environments, they can now become part of operating systems and user-interface overlays. For example, notifications. Notifications used to be a boring but necessary function, often performed by the operating system. With Float a user's reminder for example, to read an email could come from an animated character from a videogame. And if the user ignores the reminder for too long, the videogame character, for instance, starts laying waste to the user's calendar blowing bits and pieces away with a(n animated) fully automatic weapon. And then, with the sound of the final spent cartridges still ringing in the air, the videogame character picks up his .50 cal and starts annihilating each of the icons one by one on the user's home screen. And, in embodiments, this can be accomplished without APIs. In embodiments Float developers have direct, low-level access to device hardware. With Float programs, widgets, and traditional computer functions move to a whole new level of visual interest—on a plurality of device sizes.

Float re-imagines the concept of an operating system and the role it plays vis a vis typical users. Float benefits users by enabling carriers and device manufacturers to offer a much more personalized experience. Float breaks new ground by enabling videogame characters to live outside the confines of a game, and play an active role in many user's day to day lives. And finally Float makes life easier for application developers who via Float have a set of real world APIs to write to and can code to a single common platform, such that their widgets run on a plurality of operating systems.

Facility 25

Internet Protocol Addressing Facility

5125

In embodiments, a module that facilitates Internet Protocol (IP) Addressing (hereafter "IPv21") is provided. IPv21 creates and assigns IP addresses to a plurality of things. IPv21's intent is to provide a unique identification/serial number for every thing (including animate and inanimate entities, intentions, ideas, anything). And each identification ID number is also that item's IP address. The IP address is the location where more information about that item can be found. The information is likely to be in the form of data "tiles" aka (and rhymes with) Tilz. And Tilz is the profile of that item. And thereby entities can more efficiently get information about and interact with such items/things/objects.

IPv4, the conventional art, is woefully short of being able to provide the growing number of Websites and devices their own IP addresses. And in a scenario where every thing has its own IP address (and every new document, song, video, file, anything has its own IP address), and those things are often mobile, a new system of IP addressing and content hosting is desirable. Every item, has its own IPv21 #: Tilz, digital barcodes (Net Dotz Facility 27), P-mail (Facility 11), email, photos, Survey Eggs/Nuts (Facilities 39/38), thumbprints (for extra security on mobile devices (Mobis) which has thumbprint scanning capability), National Identity Number (e.g. replacing Social Security numbers, which were never intended to be utilized as ID's), Website element, offline items (every baseball manufactured, every knife, fork, spoon, cup, plate, every everything), every item has its own "Webpage"—a Tilz.

Current network architecture is an aging model, that was not designed and engineered for billions and billions of devices that actually move about in space—mobile devices. Network architecture needs to be completely re-imagined. IPv21 not only provides the IP addresses (and/or IP address registration) ala Network Solutions, it also provides the new IP networking technology for the 21st, and very mobile, century. The concept of hosting is about to change as soon every document has its own IP address, and thus is hostable from a device such as a mobile handset. And the concept of a "Webpage" will be shifting as well. Every file, picture, video, every thing. will become its own "Webpage," with its own IPv21 #. This will shift the way users display, manage, and deliver information. If every document is a "Webpage" then users no longer have to send/email updates to such documents, because each time a user accesses a document, they may be surfing to the location where that document lives. Users could choose to keep local copies (Tilz) of documents they create, and only keep the IP address of all other documents/digital content they user or use just keep a semi-local copy (ParaSite Facility 29). Some of the content Tilz may be kept on users' devices but such dependent Tilz automatically check the IP address of the master Tilz for updates.

The concept of hosting will be shifting. There's no reason to pay an Internet Service Provider (or other conventional art hosting entity) a monthly fee to keep, say, a single document on their servers, and thereby make it accessible to others via a browser. Users create content on their mobile device/PC (or other device) and that content then resides there. The user can decide to make the document "public" or semi-public (by changing a setting on the Tilz for that content). Other users sync with this content when both parties are connected, either to the Internet or peer-to-peer (or by other means). The more popular an item is, the more local copies are created, and shared with others (which lessens demand on the master Tilz, since most uses will acquiring their Tilz copy from another user). With IPv21 the lines are blurred between local content and "hosted" content such as Webpages. This IPv21 innovation will have profound implications for network traffic usage (network traffic may be greatly diminished) as well as ease of access to such content (users can get to anything they want anytime from any device in a truly Cloud 2.0 fashion. Cloud 2.0: content is hosted in multiple places: 1) on user's own devices; and 2) content is backed up on a user's Mobi Homi which powers the user's personal cloud—ComCloud; and 3) content can be at remote data centers (Cloud 1.0); and (via Packet Cache (Facility 28)) content (possibly encrypted) lives on a plurality of other user's devices available for syncing and delivery (back) to the original user.

Any document, file, image, video, etc can be hosted from any mobile device, TV, car, or any other thing with CPU, RAM and storage (or similar computational functionality). The device/thing need not be connected to the Internet to host. Asynchronous hosting occurs when the device/thing connects or when it hands off Tilz updates locally (via Bluetooth, et. al.) to another device/thing, which itself can later be connected to the Internet. And entire updates can occur without ever connecting to the Internet via local peer-to-peer connections (and by other means). Asynchronous updating of dependent (slave) Tilz. When a user changes their master Tilz, just the update or change is sent to a nearby person's Packet Cache (Facility 28). When that person is connected to the Internet, they push the update out to all dependent Tilz which "follow" and sync with the master Tilz. When no Internet connection is available (or desirable), all updates can be passed from one device to another via a series of peer-to-peer connections (among other means).

Each user has their own IPv21 #, in fact many IPv21 #'s. Users might have, say, 40,000 IPv21 #'s, one for each day they live, to keep thieves, and spammers at bay. Users can choose their IPv21 # as their contact address. For example, if someone wanted to mail a package to a user, they simply address it to the user's IPv21 #, and it will be delivered to the user's office or home, or hotel room, while on vacation, or wherever the user wants it delivered. To call a user, simply dial their IPv21 # (Phone Widge Facility 9). To email a user, simply address it to their IPv21 #. Recipient's profile (via ComCloud Facility 23) will determine which email account it should be sent to, or recipient can simply download the item directly—without utilizing (or need for) an email handler program such as Outlook. Users could change their IPv21 # mailing address every day, to reduce spam.

Objects communicate their IPv21 # to each other. Insert a battery into a radio and the battery will send its IPv21 # to the radio. The radio's profile (Tilz) is thereby updated with this information. Every TV episode has its own IPv21 #. And user wanting to access that episode can find the Tilz profile for that episode at that IP address, which can lead to the user acquiring rights to view said episode. Every song has its own IPv21 #. Every version of every song has its own IPv213. Each time a band plays that song live, the recording gets a new IPv213. If another artist performs that same song, different IPv21 #. Every commercial and TV remote has an unique IPv21 #. While watching TV the user sees a commercial for a movie the user wants to see. The user can select that commercial via a plurality of means including clicking a button on a remote control (or mobile device (Mobi)), and Sorto (Facility 8) will add the Tilz (Facility 30) for that movie the user's Movies Not Yet Seen VictorsList (Facility 18). And perhaps also to the user's Movies to Purchase VictorsList. The user gets paid to accept offers from entities that can supply that movie to the user, including movie theaters, stores that sell the physical DVD, pay-per-view providers, et. al. If the advertisement if for a truck the user is interested in purchasing, the user clicks on that commercial to update their Ad Widge (Facility 1) profile; which enables third parties to (pay the user to) send ads/offers/information/et. al. about that truck. The user may also get paid, as per their Ad Widge profile, to allow competing truck ads/offers/information/et. al.

IPv21 revolutionizes search. Widget and/or botz-based search (Victors Botz Facility 17) search using IPv21 # tags for Web content. Each IPv21 # pulls related content onto its own Webpage/Tilz/Spherez (rhymes with "spheres;" a multi-faceted sphere onto which Tilz are mapped, as an information presentation and navigation tool). For example, the 2001 Acme Winery Cabernet Sauvignon has its own IPv21 #. Whenever a restaurant has the '01 Acme on their wine list, or the '01 Acme is called for via a food and wine pairing suggestion, that content is pulled onto the IPv21 # Spherez for 2001 Acme Winery Cabernet Sauvignon, automatically. Furthermore, embodiments of that '01 Acme wine Spherez can then be curated by the Acme Winery winemaker, as to the most desired or appropriate content on the Spherez. Also other users representing various affinity groups, can also curate their own versions/embodiments of the 2001 Acme Winery Cabernet Sauvignon Spherez.

IPv21 revolutionizes feeds (RSS/social networking). Users can tag anything, online or offline, and follow anything online or offline via IPv21 # tags. Users can mark content that has been "posted" to the Web, or a PC, or mobile device, with IPv21 #'s. If a user posts a comment about Tiger Woods, that user tags their comment with Tiger Woods' public IPv21 #. Then all users who "follow" Tiger Woods, will get that content (Tilz). The content Tilz automatically comes to each user/entity that includes that IPv21 # in their ComCloud (Facility 23). Content/Tilz that is delivered how, when and where the users want it. Some users will want content delivered via radio as they drive home from work. Others will want it displayed in a template style as per their profile on their TV when they get home at night. Still others will want content delivered continuously during the day to their mobile device, with or without constant notification notices. Senders of messages can attach notification preferences so that their message won't, for example, interrupt the recipient. Using IPv21 # tags also gives celebrities and corporation (and other entities) more control over their public image. Why? Because each IPv213 attracts and assimilates related content, from all sources, both online and offline. IPv21 gives individuals and corporations and other entities more control over their public image and public information. And enables them to set per-user content: if a user, for example, is under the age of 18, certain Tilz will be restricted or is a user has certain profile characteristics, they won't see certain versions of logos or taglines or articles about the product written by certain authors or put forth by individuals affiliated with one political party or another. Information dissemination as per profile.

Pills, vitamins, medicines. Each (down to individual pills) have their own IPv21 # to track usage and interaction concerns. TV shows. G-rated version has one IPv21 #. R-rated version has another IPv21 #. Spanish language version has another IPv21 #. Producers can put out numerous different versions. IPv21 numbering will also stop conventional art digital video recorders (DVRs) from recording the same episode over and over. After a show is watched it is added to the Shows Watched VictorsList (Facility 18). The user may get paid to let marketers see (via ComCloud Facility 23) the Watched Shows VictorsList. Conventional art TV listings are often inaccurate. Perhaps because the network changed shows at the last minute or there was insufficient information about the show being broadcast. But with IPv21 listings are accurate and robust. IPv21 enables content to be pulled automatically from, say, comprehensive online sources, to that show's Spherez, including from the producer of the show, to ensure an accurate description. Furthermore, adding the IPv21 # enables the user to automatically check against their Watched Shows VictorsList, to make sure they aren't watching what for them is a repeat. And listings can be updated in realtime. Breaking coverage of a natural disaster preempts regular programming, but that network knows which content (Tilz) they are sending to the broadcast feed, so listings can be updated in realtime by utilizing IPv21 #'s of the content/Tilz being broadcast. Watched Shows VictorsList can be fed (for free or for a fee) to recommendation engines, if the user's profile allows. Where content providers pay the user to entice the user to view their content. Recommendation engines can also be non-paid. In such a case they may simply be algorithms which attempt to discern content most suitable for each users.

Barcodes/Net Dotz (Facility 27) contain the IPv21 # for each item (which when scanned returns the Tilz profile for that item). Tilz are each automatically assigned an unique IPv21 # upon creation. Transmission regulation patch software for network nodes (switches, routers, hub, load balancers, et. al.), can control content distribution as per the IPv21 # of the content passing through that node, and thereby, for instance, prevent unauthorized content from being delivered. IPv21 # for every Webified printer (e.g. users can "send" documents anywhere in the world instantly, instead of using postal mail, by addressing the Tilz that printer's IPv21 #). Reserve specific tables at restaurants. With IPv21 restaurants can track usage/revenue by table, or charge a premium fee for premium tables, or make certain tables available only to loyal customers or VIP ComClouds (Facility 23).

IPv21 deals with the challenge facing conventional art Internet architecture, such as robustly incorporating mobile and multi-homed devices. And an overall lack of protection against denial of service attacks and identity spoofing. As per the movement toward the mobile device as the next computing platform, content will live on many different devices, and in particular devices which move around and change locations. Conventional art Internet architecture is poorly suited to mobile IP hosts and content. The massive number of IP addresses that IPv21 utilizes are masked with cryptographic host identifiers—simple English language words that ordinary user's can understand (such as "Bob's cellphone"). IPv21 generates those cryptographic keys (that unlock the array of IP addresses associated with them). Users, for instance, can search for and follow "Tiger Woods" without having to know at the user's level of understanding, the underlying actual IPv21 #'s. Security for lightweight devices. IPv21 authenticates and encrypts each IP packet of a communication session. And later will move away from packet level security to Tilz level security. Transversal of middleboxes, such as NATs and firewalls. NATs are Network Address Translation devices. Middleboxes often unintentionally block benign traffic in an effort to block malicious traffic. And malicious traffic passes middleboxes through openings for benign traffic—a security problem. IPv21 offers tools to allow users and network administrators to enable proper traffic flow. IPv21 tools include: NAT—network address translation. IPv21 can modify IP address information in IP packet headers while in transit across a traffic routing device. Since a single user may have a plurality of IPv21 #'s, IPv21 provides a disambiguation facility for network nodes that might otherwise have trouble routing packets pertaining to that user. Content hosted on a mobile device, for instance, moves around, so its identifying IP-ID (Internet protocol identification number) is separate from its location identifier (which may be GPS derived, and date/time-dependent). Name resolution infrastructure. As future networking moves away from a single Website associated with a single IP address, both for security reasons (such as avoiding denial of service attacks) and ease of locating and sharing content (distributed on many mobile devices), IPv21 handles the name resolution so users can find content with greater ease. Micromobility (protocols designed to handle local mobility of hosts and content, and underpin, say, Bluetooth-based peer-to-peer sharing of profiles or content). Multicast one-to-many communication via IP infrastructure, but limited to those who sought the content per their profiles—as opposed to "broadcasting" where everyone gets the same content). Privacy extensions (users and their Tilz, can have a large assortment of ever changing IPv21 #'s that still link to master versions, but enables the user to perform transactions with greater privacy).

Facility 26

Web Cookies Facility

5126

In embodiments, a module that facilitates reverse Web cookies (hereafter "My Cookiez") is provided. Some users are growing tired of Web cookies being used against them, to spy on them. It's therefore desirable for Web cookies that are on the users' side, indicating how the user wants things done, and transmitting other useful information, so that the world can respond to the user, rather than vice versa. My Cookiez are utilized, among many other uses, to cause Websites to be presented the format that the particular user prefers. My Cookiez is configured to CloudCast (Facility 23) one's credentials. My Cookiez is configured to solicit ads and coupons, as per the user's profile. And users are paid to not only receive such ads, but also allow selected third parties, such as advertising/marketing entities view the user's profiles.

Because My Cookiez contain a subset of, or pointers to, a user's profiles, these profiles have value to the entity viewing those My Cookiez profiles, thus the user gets paid, in embodiments, to leave those profiles on the receiving entity's device. Receiving devices, Websites and other users now have information about how that person wishes to be interacted with.

In embodiments My Cookiez are information that browsers transmit to sites when users request Web pages. My Cookiez are utilized by Web Pref (Facility 20) and most other Mobi Facilities to cause Websites (and other things) to be presented in the format that the particular user prefers. My Cookiez can also CloudCast (Facility 23) one's credentials via Web Cred (Facility 19). My Cookiez makes advertising more customized and relevant, according to each user's profile, which can monitor not only preferences, but also product usage. My Cookiez can solicit ads and coupons via Ad Widge (Facility 1) and Coupon Widge (Facility 3) (that is to say, targeted advertising, not based, as per the conventional art on spying on users to create profiles thereof, but instead based upon user created profile as surfaced via My Cookiez). The more detailed and robust the profile My Cookiez CloudCasts, the more money the user gets paid by marketers.

IP address management. Each user is assigned an IPv21 # (Facility 25). Others may get in touch with the mobile device (Mobi) user via a single point of contact number. So instead of others having to remember a person's phone number, email address, IM screen name, etc. they can direct all contact to the user's IPv21 #. Via the use of My Cookiez, the user can tell the world if the user is accepting IM, chat, email or phone calls at the moment. And users could give out temporary IPv21 #'s to strangers or vendors who might later bother the user.

My Cookiez provides realtime CRM. Conventional art customer relationship management systems tend to be difficult to utilize and expensive to own/operate. My Cookiez deliver the user's profile information in realtime to interested parties. For example, on an airplane, stewards can, via My Cookiez, see which passengers were bumped from a previous flight, or are frequent business travelers, etc. Airlines often use costly and complex CRM systems to provide merely basic levels of customized service. With My Cookiez the airline doesn't have to maintain an large database with information about each passenger, each passenger, via My Cookiez, brings their profile with them. For example, as each user boards, a steward with a mobile device, can query each user's My Cookiez, which contains some direct information, as well as the IP address/pointer to other more detailed profile information about that user. And unlike information in a large CRM airline-maintained database, user-created/managed profiles are up-to-the-minute, up to date. And the user may get paid each time the airline uses their profile. My Cookiez enables companies to provide personalize service, at a very low cost, both before and during their interaction with each customer. It doesn't take a CRM system, is users utilize My Cookiez to CloudCast their travel preferences and travel profile both during the travel booking process as well as when the sit down in their seat on the plane.

Feeds. A wealth of information creates a poverty of attention. What's the solution? Profile. Feeds should be customized as per each user's profile. Users no longer drown in posts. With My Cookiez information distributors dramatically cut bandwidth costs. Automatic profile-matched feeds. Grabs content the user seeks from any source: blog, RSS, Website, etc. as per the profile as delivered via My Cookiez. Feed information is customized, not dumped, and My Cookiez powers this wonderful change by informing data feed providers exactly what the user wants and doesn't want. Recipients of status updates only get those updates they wish. As per the conventional art users are overloaded with content and interruptions. (CloudCasting) My Cookiez can eliminate clutter, so the user receives just those items they wish.

In embodiments My Cookiez transmits the IP address for the profile(s) (Tilz Facility 30) the user wants communicated to a particular entity, person, etc.—which enables better interactions and transactions between the two parties.

Facility 27

Internet Protocol Barcode Facility

5127

In embodiments, a module that facilitates Internet protocol (IP) barcode utilization (hereafter "Net Dotz") is provided. Net Dotz is an improvement over the venerable, but aging, barcode. In order to more easily interact with real world items, Net Dotz users can retrieve data from analog sources by scanning a Net Dotz, an IP-based barcode, and receive data "Tilz" (Facility 30) (rhymes with "tiles") of information about that item. Net Dotz are also electronic and can be transmitted via, for instance, radio waves. Thus users can grab information/shows/etc. from their TV or radio broadcasts. If a user watches a TV travel show about Ireland that featured information such as hotels to stay at, pubs to eat at, and sights to see, wanted such information, the user could grab the Tilz for that show, which is the profile of that show, and includes the hotel, pub and sightseeing information the user desired. Should the viewer later stay at that hotel in Ireland, the producers of that TV travel show about Ireland, may receive a commission (potentially eventually rendering TV networks and television service providers obsolete). Since it may be the case that a few years elapse from the time the viewer watches that show until they travel to Ireland, updates to the Tilz (so the information remains current) could be offered for free or for a subscription fee (a revenue source for several parties including the hotel/pub/etc. in Ireland, the TV network (e.g. CBS, NBC), the television service provider (e.g. Comcast, DirecTV), and other entities).

When a user reads an article in the paper and wants that information, the user might end up having to re-type all the sought after information. If, however, each article in the paper has a Net Dotz, the user simply scans the Net Dotz, perhaps with their mobile device (Mobi), and thereby download the Tilz of that article. Virtually all printed information today, was first in digital form. That original digital version, say, of the newspaper article is saved by the content creator as a Tilz. Each Tilz has its own unique identification ID number, which is its IP address. When the newspaper adds the Net Dotz to this article, they simply encode it with the IP address of the Tilz for that article. And similarly so for content that is on a radio/TV show. For example, if the user likes the shirt the host of the show they're watching, the user can scan the Net Dotz (which is broadcast an IPv21 # (Facility 25) IP address along with the usual metadata broadcast alongside the audio/video content) with their mobile device, which returns the Tilz for that shirt—which can include information such as where the user can buy that shirt near them, or order online, and ratings and reviews of that shirt, or offers/coupons for that shirt or stores selling that shirt, offers/coupons which the user may be paid to receive ala Ad Widge (Facility 1) and Coupon Widge (Facility 3).

If a user walks past a bulletin board, and sees a business card or flyer containing information the user would like to have, it is tedious for the user to manually copy that information. So too with a user reading an article in a magazine. In embodiments, Net Dotz, which, in still further embodiments, are as small as the period in a 12 point typeface font, are placed at a key location of every analog document, article, business card, flyer, or any other object (online or offline) for which more information is available in digital form, such as a Tilz which is a profile of that thing. Many analog documents are created on a digital device, such as a computer, thus there is likely a digital version of the analog document, and if that digital version is saved as a Tilz, then that is a convenient thing to offer a user reading an analog source, who wishes to acquire the digital version for further edification or otherwise. For example, if there is a bulletin board outside a sportswear store, it makes sense for businesses related to sports (jazzercise, yoga, gyms, etc.) to advertise their products and services via business card/flyers pinned to the bulletin board. However the burden is on passersby who have to type the information into their mobile device or write it on a piece of paper if they want that information. Net Dotz solves this problem that users often face a plurality of times each day: how to get analog (or other types of) information into a usable format, quickly and easily, so that both information provider and the user are happy. With Net Dotz there's no need to re-type information from bulletin boards into a user's mobile device. Instead, just scan the Net Dotz on each business card or flyer, and the user receives the Tilz for that item.

Furthermore, the Tilz returned when a user scans a Net Dotz, may have the latest updated information about the item, as well as being able to include customized and personalized offers—offers that the user is paid to receive. Net Dotz is also able to offer third party commissions, so a store that has a bulletin board out front, is able to reap some benefit from the traffic aggregation it performed, and the bulletin board items benefitted from. Tilz are transactable objects, so if a user grabs the Tilz for, say, a yoga class, then later signs up for that yoga class, the sportswear store may receive a commission on that transaction—putting money in the pocket of entities such as this store in ways they never received before Net Dotz. In embodiments, Net Dotz are like a form of keyword advertising, but in the real world. Net Dotz unlock a huge new market opportunity, enabling previously untapped transactions, that enable users and other involved entities to get paid in a plurality of new ways (which also portends rapid adoption among purveyors and users).

As per the conventional art, getting information from a Website can be a cumbersome process, that differs with every Website a user visits. With Net Dotz the user simply scans the item (article, ad, video, picture, etc. each of which has its own Net Dotz), and the Tilz are delivered to the user's device. Similarly with a newspaper where every article has its own Net Dotz. And in the case of a travel article in the newspaper, if the user scans the Net Dotz for the article, receives the Tilz, which includes the name of a recommended hotel, and the user later stays at that hotel, the newspaper may be paid a commission. Such monies could save periodicals whose business models based on in-paper/magazine ads and subscriptions are proving insufficient. And once the user receives the Tilz with hotel information, the user may be paid to receive ads/offers/coupons related to the received Tilz, and the periodical may participate in those monies as well. With Net Dotz, newspaper and magazine business models can be based upon transactions. Transactions in the real world, by that periodical's users, as they utilize (or otherwise put to use) the periodical's information.

Net Dotz use cases. While on vacation a Japanese tourist enters the subway, but finds the subway wall map confusing. the tourist scans the Net Dotz on the wall map and receives an instant verbal explanation, in Japanese, of how to purchase a ticket, find their stop, etc. And to create an itinerary, this tourist, while in their hotel room, reading the local guide book, simply scans each monument, church, destination (each of which is marked by a Net Dotz) from the guidebook, and an itinerary is created for them; with commissions (potentially) paid to the guidebook for any monies paid at those destinations. And by scanning each Net Dotz, the tourist has the Tilz for each destination, downloaded to their mobile device. And any information about that destination such as holiday closures or closure due to worker strike is instantly transmitted to their Tilz (Facility 30) which then warns them of a problem. And their itinerary is now easy to share with friends when they get back home—just send them copies of their travel Tilz. And get paid a commission when their friends attend any of those Tilz destinations/attractions.

Net Dotz (real world) search. Net Dotz can be utilized anywhere, and make money for all users involved. Take for example, Net Dotz use in restaurants. Scan the Net Dotz next to a menu item. Restaurants can simply put a Net Dotz next to each menu item. When the user scans the Net Dotz they can receive the Tilz with, for example, nutrition information on that dish. Or to receive a copy of the recipe. The recipe can be offered for free, or as a prem (perk) for frequent customers, or for a price. Net Dotz increase this business' "touch" with their customers. And the customers now have better information about what they're eating, as well as can socialize or interact with others who are trying to replicate this recipe in their own kitchen at home. Some restaurants are used to spending money on advertising (including online advertising). With Net Dotz there's a Web service that makes the restaurant money. Restaurants can make money selling recipes and information such as the ingredients (perhaps sponsored brand name ingredients) and the brand names of the utensils utilized by that restaurant. And the user (restaurant patron) gets paid, if they scan the recipe, they may be paid to receive a coupon (as per Coupon Widge Facility 3) for a discount on that item. Why? Because food suppliers, like Nieman Ranch beef, or Nunley's Organic Marmalades, might pay commissions. When a customer requests information on that item, and receives the Tilz, then the food supplier might choose to pay the user. The food supplier might also pay the restaurant to user "Nieman Ranch Beef" rather than just the generic word "beef" in their recipe Tilz delivered to customers/patrons. Patron requests information on plates, cutlery or perhaps the pots and pans and the restaurant gets paid. The customer gets a $20 off coupon for the pots and pans set (or blender, or oven, etc.) that the restaurant utilizes. And the restaurant can get paid again if the customer subsequently purchases any of those items. Net Dotz revolutionizes real world search. The restaurant receives the $X/click fee from the cutlery supplier—instead of the cutlery supplier pay an online search entity for keyword/link clicks. And unlike an online user who clicks on a link (in which case the ad payor knows nothing about the person clicking on the link, such as exactly how interested a user is in that particular product/service), with Net Dotz, the user is actually holding, say, the cutlery in their hand (when they click on the Net Dotz on the cutlery) and can deliver the user's profile to the cutlery company (via Ad Widge Facility 1). And Net Dotz provides an incentive for restaurants to align with quality suppliers. The restaurant's commission may by forfeited if the customer returns the item. Poor quality products, substantially reduce commission income. So not only does Net Dotz revolutionize real world search, but for the first time ties actual real world satisfaction with those search results, to claw-backable search fees. Conventional art search companies receive their click fee income even if that click doesn't provide commensurate value (to the ad-buying entity and/or user seeking information).

Tech blog article. If a user reading a tech blog article about a certain widget, scans the article, the user receives a Tilz of that article. The user may then get paid to accept offers from competing widgets (that perform the same/similar function). Furthermore, the user automatically receives edits and updates to the article. Real estate listing. Information is always changing. So whether the user cuts the real estate listing out of a newspaper or grabs a (portable document format) PDF from a Webpage, the user won't know if the price asked for that house rose/dropped. Furthermore, many listings a user sees in the paper, are nowhere to be found on the newspaper's Website. The user can literally take 10-15 minutes searching on the newspaper's Website for a listing they saw in a newspaper, and never find it. The user might then scan the listing for the name of listing brokerage, and search that broker's Website, spending another chunk of time searching for, but never finding, that listing. Finally, the use might then search the personal Website for the listing agent, and after a frustrating search due to the sloppy search facilities on the listing agent's finally find the listing. And, at that point be disappointed to discover the house has an option/sale pending. It's the 21st century and the preceding scenario still happens. That's pathetic; and informs a need for Net Dotz, whereupon, within a few seconds, the user simply scans the Net Dotz on the particular real estate listing in the newspaper, and receives the Tilz for the house they are interested in. 2.5 seconds instead of 25 minutes. Furthermore, Tilz are live, transactable objects so if the listing price changes, the property goes into contract, new photos are added, etc. the user can be notified seconds later.

Users get paid for information regarding their household items. Perhaps during an open house, or just when someone comes over, guests may be interested in any of a user's household items. A user could place a Net Dotz, for instance, inside a kitchen cupboard (say, on a sticker, or via other means), and charge a small fee for the information (or free to selected entities, such as friends) regarding who designed the kitchen, supplied the cabinets or appliances, and the name of the installation contractor, etc. And if that guest later purchases those items the household owner may be paid a commission on that sale. Users can even add Net Dotz to outdoor items (via a sticker or Survey Egg (Facility 39)). If the open house attendees, or the user's guests want more information about the user's backyard firepit, for instance, they can scan the Net Dotz actually on the firepit with their mobile device (Mobi). This can also be accomplished wirelessly via RFID tags placed on physical items—wireless Net Dotz. Users can then interrogate the RFID tags of those items (with their mobile device (Mobi)) they want more information about.

Homeowner, realtor, realty Website, get paid for information about household items. Net Dotz can also be utilized by users scanning Net Dotz on house listings on realty Websites. Let's say a user comes across a photo of a nice kitchen or landscape on a realty Website, and wants to know who performed the work or supplied the materials. They can simply scan the Net Dotz from that picture of that kitchen of that house on that realty Website, and the homeowner, realtor, and realty Website, may all be paid a small commission by the kitchen installer or appliance makers.

Realtime item tracking (A pizza delivery company can track a pizza from oven to delivery vehicle location to delivery at destination, via scanning Net Dotz at the pizza place, on the truck, and at the destination). Reduce lost luggage (scan the RFID Net Dotz of luggage as it moves through various checkpoints: such as the check-in counter; as the luggage enters a specific plane; is taken off a plane; arrives at the luggage carousel at a destination; is collected by the user; or is in the lost and found at a certain airport. By utilizing RFID-based Net Dotz any piece of luggage can be almost continuously scanned, by any compatible device at all times (both by airport personnel as well as passengers passively and anonymously scanning the bags) making "losing luggage" nearly impossible). IP product labels. Users scan Net Dotz with their mobile device (Mobi) to retrieve and view additional information about the product. Information can be presented in a way that best suits the user (according to that user's Web Pref Facility 20 profile). And the information Tilz (Facility 30) presented can be far more comprehensive. Saves packaging and labeling costs for manufacturers). Retail pricing time savings (Item prices are part of the metadata in the Net Dotz, which users scan as they walk by (via means such as RFID). Prices for all items can be set en-masse by the store owner with their mobile device (Mobi), in seconds). Product warranty registration (It's currently a hassle to register a product after purchase. Often the user has to provide the model number, and serial number, but the printer, TV, or refrigerator is already in place, and it's hard to see those numbers. And weeks later when the user gets around to filling out the product registration card, the user may no longer remember what the user paid, and sometimes which store the user bought it from. With Net Dotz, however, registering is a painless two-second long process (scan Net Dotz, receive Tilz, autofill required information, CloudCast (Facility 23) Tilz information to the company). And the user could then choose to enroll in a product protection plan, as well as register for any rebates due on the item). Avatar shopping (Each piece of clothing can have a Net Dotz on it. The user scans the clothes they are wearing that day, and the user's online avatar would then be automatically dressed in those same (digital) clothes. Stores can utilize this Net Dotz feature to help people shop remotely—user's avatars try on the clothes). Document certification (The Net Dotz on a document contains the IP address of the original document, and scanning the Net Dotz can auto-check/compare against the original to combat tampering). Deposit checks (Each bank can have a drag and drop check template that, utilizing Net Dotz works, in embodiments, as follows: drag Tilz of the recipient's name, drag the signature Tilz, then type in the check amount. An unique Net Dotz is assigned to this transaction by the bank. The check is sent to the user's bank first for verification and authorization of this transaction by the user. Furthermore, the recipient's ComCloud (Facility 23) can optionally CloudCast (Facility 23) that recipient's various banks or other places where they might deposit the check (a security measure that minimizes risk of checks being counterfeited by unauthorized individuals). That information is then attached to this transaction Tilz (Facility 30). In embodiments, if an Internet connection is not available, the check's IPv21 # is assigned when in coverage range. The user scans the Net Dotz of a check to authorize it. Checks can be created digitally on a mobile device (Mobi), with field electronically filled in—including signature. Users and/or banks can request a printed check—which can be sent wirelessly to the user' printer or their bank's printer (to print out the physical check). The check recipient can scan the Net Dotz to deposit the funds). Rescue periodicals (Readers scan the Net Dotz of items featured in articles and ads. The periodical then receives commissions on information Tilz, as well as transaction Tilz. The periodical may receive the real world equivalent of the click fee that conventional art search companies might otherwise collect, for information about an item featured in an article in their periodical. And the periodical may receive a transaction commission if the reader purchases a product or service featured in that periodical's article). Junk yard parts (Customers waste time hunting for parts amid the piles and piles of stuff at junk yards. Users can sell items without the Internet or the knowledge of how to make a conventional art Website. Simply place a Net Dotz sticker on each part (car door, axle, carburetor, etc.), scan each item with a mobile device (Mobi) (which doesn't need to be a cellphone with costly wireless carrier service). Enter the item description on the mobile device: "1989 Ford Fiesta front passenger door" plus its location in the junk yard (divide the junk yard into a grid pattern and enter, say, grid cell #J12. Or put an RFID tag onto each item, and the user can be directed right to it. Or user Survey Eggs (Facility 39) to triangulate its position more accurately than GPS could. Utilize Bluetooth to CloudCast (Facility 23) a profile of parts for sale. Profiles can be handed off to other mobile devices (which may receive a fee or commission if the sale comes from their mobile device). Customers who come to the junk yard in person, can simply stand near the junk yard owner's mobile device and instantly know what and where each item is—not having to waste time plowing through hundreds of the wrong items. Junk yard owners may not have the money to own a cellphone with costly wireless carrier plan and may not have Website making expertise, but most all of them can own a Mobi). Electronic Net Dotz (Net Dotz can also be CloudCast via radio frequency, RFID, and various other wireless means. For instance, users listening to the radio or watching TV can get the Tilz for the information they heard or saw via the Net Dotz metadata transmission). A user who sees a chair they like while watching a TV show, can pause the TV show Tilz, and "click" (or tap or otherwise select) the Net Dotz on that chair (after turning on the "Show Net Dotz" setting), to get the Tilz for that chair. Users may get paid to receive ads from stores that want to sell that chair to that user. That TV show may get paid a commission if the user purchases that chair).

Tags. Net Dotz support tags. Most conventional art barcodes and RFID do not support tags. With Net Dotz, however, tags are supported. Take the case where a user scans a bottle of 2001 Acme Winery Zinfandel, and thereby receives the Tilz for that bottle. The user can then add tags (such as "tri tip steak") beyond the tags supplied by the winery: which might include more prosaic tags such as "Acme" and "Zinfandel." The advantage of Net Dotz is that content that is tagged "Acme" or "Zinfandel" can (at the user's option) be delivered to the user along with the Tilz for that bottle. For instance, as per the use's Web Pref (Facility 20) profile, tags can return: Food pairing ideas (user gets paid by Kraft cheese); Food pairing recipes (user pays chef for recipe); A list of wine events featuring Acme Zinfandel (wine events organizers pay the user to send an ad about their wine event); A list of restaurants featuring Acme Zinfandel (restaurants pay the user to make the user aware of their establishment); A list of retailers featuring Acme Zinfandel (wine retailers pay the user to send an Acme Zinfandel coupon, as per the user's Coupon Widge Facility 3 profile).

When users scan a Net Dotz, a Tilz is returned, which may be mapped onto an information navigation and display vehicle known as a Spherez (multi-faceted "spheres" onto which Tilz are mapped). When a user scans a bottle of 2001 Acme Winery Zinfandel, the Tilz could be mapped onto the Acme Winery Spherez, with the center or "key" facet belonging to the Tilz from Acme Winery. Other entities then want to have their content mapped as close as possible to the "key" Tilz, because those will be the Tilz the user is most likely to view. So, the surrounding Tilz might be a food pairing idea; another close Tilz might be a wine event featuring Acme Zin. And advertisers could pay the user to have their content closest to the key Tilz. And since Tilz are transactable objects, if the user decided they wanted to attend that wine event featuring Acme Zin, they could make the ticket purchase through the Tilz. Furthermore, once the Acme Winery Spherez has been created, it continuously attracts related content, forever, and as per each user's profiles. Thus, the user from that point forward, may not have to perform conventional art searches for information related to Acme Zin, as the user can instead consults their Acme Zin Spherez. Net Dotz, and Net Dotz Spherez thereby revolutionize marketing and merchandising. Grab the Tilz for the shirt a TV host is wearing, have Sorto (Facility 8) map it to the user's Clothing Spherez, and stores that sell that shirt (and competing similar shirt makes) may pay the user to get their Tilz close to the key Tilz on the Spherez—Tilz which will likely inform the purchase of the shirt whether from a local bricks and mortar store, or an online retailer. Net Dotz unlock billions of transactions heretofore not possible. And revolutionizes real world search and advertising.

Facility 28

Data Cache Facility

5128

In embodiments, a module that facilitates data caching (hereafter "Packet Cache") is provided. Data should be stored as close to users as possible for faster distribution and consumption. Packet Cache stores digital content (Tilz) on a user's mobile handset (and other locations) to improve response time. Akamai, and similar, examine global usage patters to reactively and proactively move content closer to users. Packet Cache goes the final step, both reactively and proactively, moving selected content to a user's mobile device/TV/car/digital device to improve response time. Having a user's content nearer is both safer and faster. If Akamai's tens of thousands of distributed servers are good, how about 10 million? or a billion? content caches on user's (and other) devices.

Packet Cache manages what percentage of a user's Tilz are kept locally. Users decide how much storage to allocate to Packet Cachet. Packet Cache also stores frequently used Webpage and application/widget data. If a user frequently goes to CNN.com for political information, then in embodiments Packet pre-loads those Tilz to a user's mobile handset, or other device as per the user's profile. For high demand events, such as the season finale of a popular TV show, content Tilz can be pushed to the user's DVR prior to airing live, to reduce traffic burden.

Distributed, virtual data bank: a shared backup system using other people's mobile devices, PCs, TVs or any other digital device. All content is client-side encrypted, which ensures data safety. Those who set aside a portion of their storage space could be paid to do so, or do so via barter. Packet Cache also enables asynchronous email delivery, as well as distributed transactions; Distributed transactions: users can carry other people's transaction profiles, such as "TV for sale" or "Job Requisition description" and receive a commission for resultant transactions. A user might be carrying profiles for everyday items during their everyday activities, or trekking halfway around the world and come across a tiny village where they sell the most comfortable exotic rugs. In either case Packet Cache is going to enable billion of transactions not captured by conventional art Web companies. (For example, in embodiments, if trekkers come across a person who is willing to sell some of the exotic rugs they make, the trekkers simply snap a picture of the rug and add some details to create the Tilz. Now they are carrying that Tilz with them as they head back to civilization. That Tilz will then be matched against any profiles seeking exotic rugs. And if a buyer agrees, then a future set of trekkers can carry that transaction Tilz back to this village to pay the maker, and bring the rug back to a place where it can be mailed to the buyer); Event-based high demand sites (for events such as the Victoria Secret Fashion Show, push content (a priori) to user's devices.); Tilz torrent (users can also share or transmit event Tilz with or to each other, using their bandwidth, when they are done with the show. This saves the original event producer significant bandwidth. For example, if I've seen the latest episode of Amazing Race (which means I've downloaded the episode Tilz to my digital device), and this episode Tilz is sitting in my Packet Cache. Other users how happen to be geographically proximate, can opportunistically request that I send my Tilz to them, if it is cheaper to do so, than sending from CBS main servers. If it costs CBS 10 cents to send a Tilz of the episode to the user, from their main servers, but a nearby copy can be sent via Bluetooth or WiFi to a neighbor needing that episode, CBS can pay the underlying carrier, say, 4 cents and the sending user 1 cent, and still save 5 cents; Paid torrent: users get paid for delivering Tilz of content that then displays ads or involves transactions. This solves the major problem for the wireless network carriers regarding content delivery (and obviates some of the need for CDNs content delivery networks) and also solves the problem for content producers. Get your viewers to send your content to each other; Sub-Tilz: Tilz (entire shows, for instance) can be divided into sub-Tilz (say 10 pieces). This way the subTilz are of little use to those intermediary users who store and deliver the Tilz. However this makes more efficient use of networks (as smart routers find each of the needed Tilz pieces and deliver them from the closest device Packet Caches). Packet Cache also addresses the contentious issue wherein some Internet service providers ISP's wants to charge heavy users for traffic flow. Tilz delivered on tan ISP's network via Packet Cache will result in the ISP getting a cut of the revenue or income from those Tilz.

Packet Cache not only has unique technology, but also remunerates users, including network carriers in revolutionary new ways. Packet Cache revolutionizes cloud storage. Packet technology delivers game-changing topologies to the geometrically growing content delivery and network congestion problems faced by millions of content purveyors and network carriers. And Packet Cache includes unique "distributed transactions" wherein users carry each other others profiles—resulting in perhaps one of the biggest disruptions to commerce in history. Distributed transactions may be powered by Packet Cache.

Facility 29

Local Websites Facility

5129

In embodiments, a module that facilitates customizable, portable, auto-syncing Websites (hereafter "ParaSites") is provided. Users often utilize but a tiny fraction of available content on a given Website during a given session. Thus it would be desirable to determine which content a user is likely to want to interact with and present just that subset of content/information to the user a priori. Furthermore, there are billions of people on earth with differing preferences as to how they'd like content/information presented to them. Therefore it is desirable to customize the content/information presentation as per user preferences. Still further, networks, and in particular wireless networks, may be challenged to expeditiously deliver the geometrically growing volume of content/information. Therefore it is desirable to push such content/information as close as possible to the user, to facilitate efficient content/information delivery (similar to conventional content delivery networks, such as Akamai). ParaSites' customizable, portable, auto-syncing Websites address the aforementioned deficiencies, by automatic/manual creation of portable Websites (ParaSites) which also, or even exclusively, live on the user's digital devices of choice; not just at the hosting server. Because they are stored locally, ParaSites are available and functional on devices such as a user's mobile handset, even when an Internet connection is not available. Having Websites always available—on the user's personal computer and on their television and on their mobile handset and other devices—changes how users interact with Websites. Websites become much less of a one-way information presentation vehicle, and more of an interactive, constant companion to the user, anticipating and supplying the required/desired digital content or services.

ParaSites are data "tiles" or "Tilz"-based custom Websites (Tilz (Facility 30) are an unique digital-content format). In embodiments users can choose to download a Tilz of an entire conventional Website—thereby creating a ParaSite. Otherwise ParaSites contain a user-customized subset of the conventional main/parent/hosted Website content/information. This ParaSite can be on a user's TV, computer, mobile device, gaming rig, etc. Users can set their preference profile to receive/or otherwise be directed to the ParaSite (as opposed to the conventional Website) from uTag/search engine searches (uTag Facility 16 tag-based search engine). ParaSites function offline because ParaSites are stored locally. ParaSites are available and functional on devices such as a user's mobile device, even when an Internet connection to the conventional main/parent/hosted Website is not available.

No longer do uses have to surf to a Website, ParaSites are available to them all the time on their digital devices with content/information updated whenever an Internet connection is available (among other means). For some users the digital device of choice may be the mobile device, for others it may be the TV. Shifting usage locales (to multiple and/or unconventional locales such as gaming rigs, cars, et. al.) drives demand for new incarnations of Websites. Present: a Website is a place where users "go." Future (with ParaSites): a Website is a place where users already "are." Websites at users fingertips is the next wave.

Customized (most users access only a tiny fraction of a Website's content. With ParaSites user can pull just that desired content to their ParaSite. Users can click on a ParaSite link to be taken to (or to download) additional content on owner-hosted version of that Website); Layout (users can opt for the traditional Website layout, or can display the information in a Tilz format, with each section of the Website on a separate Tilz); Size-format (Tilz auto-resize depending upon the display screen); Self-hostable (ParaSites don't necessarily require an ISP to host them. A ParaSite can be created and hosted, for instance, on a mobile device. Others who "subscribe to" or "follow" that Website will get updated information synced to their local copy of that ParaSite when both parties are connected to the Internet, or both parties are connected peer-to-peer, such as via Bluetooth); Different ParaSites for different devices (ParaSites can be different on different devices for the same user. The ParaSite a user keeps on their mobile device may be a basic version, as compared to the version the user keeps on their PC or TV); Me Too (this feature enables users to automatically receive the version of the ParaSite that is most popular for their particular or selected affinity group. For example, if a user is a motorcycle enthusiast, they could receive the version other bikers are using); Analytics (ParaSites' software produces reports for Website owners with suggestions for how to alter their Website to better respond to the needs of customers. ParaSites software monitors how users interact with a given local Website and creates the ParaSite Profile Report (PPR). The ParaSites' individual Tilz are monitored for usage, and broken down by user populations who share common ParaSite usage traits); Internet-wide analytics (ParaSite software provides Website owners with an unique advantage: ParaSite algorithms amass data and present actionable Website improvement patterns across many local Websites, not just the data collected from a single, individual local Website. Website owners can receive reports and specific actionable recommendations for site improvement based upon similar industry sites' data, or even all local Websites as a whole. Other reports include Missed Demand Data. Missed demand for airlines—utilized by airlines for flight scheduling planning. Because in embodiments ParaSites use Tilz, as users try to book a flight, Tilz can create standby list (which inform as to missed demand), as well as users who express when their ideal flight time would be. That is to say airlines for the first time can see data such as "54 more people would have liked to travel on the 2:05 PM flight, but it was already booked." Tilz can be shared as is, so users don't have to take any extra steps to send the missed demand information, and users get paid to send missed demand information); Velocity metrics (a way for Website owners to measure in realtime how effective particular changes to a Website are. Measure not just how many more clicks a particular Website section or ad is getting, but also the rate of change (the director of the change, in addition to the magnitude). For instance, traffic on one Tilz doubled, but nearly all the increased traffic came from mobile device users. That information might cause the owner to change the site in a way that mobile device users can best access); Fulcrum metrics (metrics that track which local Website item changes have the greatest effect on a number of user-selectable attributes, such as the ratio of users who head to another Website before completing a transaction vs those who complete a transaction on the local Website in question).

ParaSites function offline (ParaSites continue to function and be useful in offline mode, when not connected to the Internet. Users can get updated information not just when connected to the Internet, but also when anyone else within, say, Bluetooth range has that same ParaSite, but has an updated version of its content); Non-Website digital content (ParaSites technology is extensible to any type of digital content. For example, users could have a local copy of a videogame character live and/or reside on their mobile device or TV, and have some limited capabilities even without running or having a copy of the videogame on that device); Takeout pizza ordering (users download the ParaSite of their favorite pizza places onto their mobile device, where it is most convenient for them to place an order to be delivered or picked up. Pizza Places might pay users to be the exclusive pizza ParaSite (widget) on a user's mobile device (TV or other device or thing). On-demand hosting (users can create and host a ParaSite on, say, their mobile device but if that ParaSite becomes very popular, or experiences a temporary burst in traffic, it can automatically (or temporarily) hosted at another/third party site. Additionally, peer-to-peer ParaSite sharing addresses high demand traffic issues—by enabling users to trade ParaSites (Tilz) with each other directly, rather than all content being sent from the main hosted Website).

Third-party edited versions of Websites (Website owners can optionally allow third parties to create a customized "directors cut" ParaSite. For example, take the case of a comprehensive wine site. If user #1 knows his taste is similar to his buddy user #2's taste, user #1 can subscribe to user #2's ParaSite—benefitting from the time Pete invested in creating an ordered subset of the full Website); Peer-to-peer ParaSite sharing (in a virtuous cascade effect, the more popular a ParaSite is, the more users have obtained a local copy. Thus, there are more users making copies of the ParaSite available from their digital devices directly via peer-to-peer sharing with their friends and associates. The more popular a ParaSite is, the more abundant it will become—automatically—and without necessarily overtaxing the ISP-hosted main Website. Without local copies of Websites, the more popular a conventional art Website is, the more likely it is to be overtaxed, or crash, or slow down due to the fact that most users are utilizing the single main Website); Ad hoc file sharing (The concept of a ParaSite includes not only Websites, but also individual documents or files. For example, let's say there are a dozen users who all work in the same department at some company, and need access to certain common documents. To that end the department manager creates a Common Docs ParaSite which is "hosted" on the manager's mobile device. Any of the department workers can create a document (a Tilz) and drag it onto the Common Docs ParaSite—for all to see and share. Document updates can be delivered and/or synced via means such as Bluetooth); Video game compatibility (ParaSites are configured to function on gaming rigs and consoles); Non-console gaming (ParaGaming) (ParaSites enable some aspects of single-player and multi-player games to be played on some Internet-enabled devices, such as mobile devices or a PC or a TV. Videogame characters can also escape the confines of their gaming rigs, and start to have functionality on various other digital devices (e.g refrigerators); Collecting and trading ParaSites (similar to the collecting of baseball cards, ParaSites (and in particular, the custom versions certain individuals have) can be collected and traded by users. ParaSites can be shared and traded on the ParaSite Website. Users can also create their own custom skins for ParaSites cover Tilz. ParaSites, and collections of ParaSites, may be sent directly via Bluetooth or other means. Once received, the ParaSite can morph according to the recipient's Web Prefs (Facility 20).

ParaSite Pro (for corporations, government agencies, and other organizations and clubs, giving them greater control, such as remote management and wipe. Corporations can give their customers a customized Website (ParaSite) with information that can include in-process manufacturing data, account data, financial information and a history of all past communications. An extranet does not live on a company's customer's mobile device. ParaSites do); Websites constantly available (ParaSites work offline); Personalized (per each user's profile); One-to-one marketing (customized experience, ads, and transactions); Evangelists (sharing a ParaSite version of a Website with their friends and/or fans); Traffic reduction (ParaSite Tilz are shared among users, utilizing users' bandwidth or alternate means such as Bluetooth (thus reducing network traffic); Cloud/distributed computing (ParaSite technology can determine the most expeditious means of delivering a ParaSite. For example, download the ParaSite from the main site or have the ParaSite sent from another user. Thus, in effect, ParaSites are "hosted" at many different sites—that is to say, on individual users' digital devices—far more efficient than conventional art content delivery networks.

Websites are information delivery vehicles as well as interaction/transaction vehicles. ParaSites also deliver local and/or offline interaction/transaction capability. ParaSites provide custom versions of Websites with just the content the user desires, presented the way the user desires, and available to the user anytime, anywhere on any device, even offline. With Parasites, users can take their Websites with them all day long, wherever they go in their real life, so they can be useful to the user, right when and how the user needs them. Instead of delivering a bloated Website, with information such as all prior Press Releases, to a user's mobile device, the ParaSite delivers just the capability/information sought by the user. For example, for a pizza delivery company Website, instead of delivering gigabytes of undesired data such as Annual Reports, the Pizza Delivery Company ParaSite, includes the ability to review the menu and place orders—and perhaps not much more. Study what 80% of users do with a given Website 80% of the time, and deliver just that functionality/data. Users who want more functionality/data can either download such functionality/data to their ParaSite, or access such functionality/data on the conventional main/parent/hosted Website via the ParaSite. ParaSite's user interface is configured such that, in embodiments, accessing the conventional main/parent/hosted Website is seamless process that may be undetectable by the user (if such a configuration is deemed desirable by the Website owner/user).

Websites were invented over a decade ago, and have changed very little in the meantime. The mobile device revolution and the variety of screens upon which Website content will be viewed informs the desirability of new modalities for Websites. ParaSites are the future driven by the mobile device revolution. A customized experience where users are first, and users get paid for utilizing a new, more convenient, mobile, and always available form of a Website—a ParaSite.

Facility 30

Digital-Content Format Facility

5130

In embodiments, a module that facilitates an unique universal, transactable digital-content format (hereafter "Tilz") is provided. Tilz is informed by the shift to a new computing platform—the mobile digital device. Conventional art document formats are largely incompatible with the smaller screen size of mobile digital devices, and lack functionality across the entire spectrum of digital content formats. Tilz is an universal, transactable, digital-content format, that makes viewing and using applications and digital content on mobile devices much easier. Furthermore, everything including documents, folders, Websites, newspapers, magazines, songs, photos, videos, movies, tickets, credit cards, passports, keys, et. al. can be created/saved/displayed/utilized in Tilz MDF Mobile Digital-content Format. In addition, Tilz are configured for configured for functionality on a plurality of devices, such as TVs, DVRs, PCs, gaming rigs, etc. As per a major paradigm shift, everything should be clean-sheeted (start over with a clean sheet of paper) including how content, applications, and documents are formatted. As content becomes digital and utilized on a wide variety of devices, the old convention, say, of a document as an 8.5"×11" sheet of paper is no longer a desirable model to emulate. A new mobile document format needs to be developed that rids itself of the boring shackles of emulating the analog world, and fully embraces the cool and limitless digital world.

In embodiments Tilz auto-resize depending upon the device displaying them, as per the user's preference profile. Tilz content is updatable, not static. In embodiments Tilz content is refreshed as new information becomes available via a plurality of means including Internet and/or peer-to-peer modalities. As a transactable object, Tilz may produce revenue for users, and content providers, and third parties, and even original application providers. In embodiments, content is refreshed by the content creator who has the master Tilz. Tilz slaved or subscribed to that content have their Tilz automatically updated, for free or for a fee. Tilz tag data can, at a user's option, be automatically enhanced—if other users add metadata and tags to their Tilz, any other user's Tilz can be informed by that same data. Furthermore, Tilz enable a new type of digital video recorder (DVR)—the DCP (digital content provider). A DCP pulls Tilz that meet that user's interest profiles and other profiles. Tilz are tagged so DCP's can continuously seek out and acquire desired content, even via peer-to-peer means such as Bluetooth. So if a user has an interest in butterflies and another person walks by who has cool butterfly-related Tilz, that user's DCP can acquire for free or for a free those butterfly Tilz (as per both party's preference profiles, and digital content rights). Tilz, and a Tilz information navigation modality, Spherez, also automatically attract like content.

Transactions are now transactable. Wrapping transactions in Tilz engenders a whole new class of affiliated transactions. For example, AAA members may be automatically rewarded their extra points credit when they book rooms at participating hotels, whereas today they'd have to know that a particular hotel had such an offer extant. Users benefit by getting offers to get discounts on this transaction, from entities such as competing hotels, or digital payment systems (which might offer different points/credits bonuses) or payment processors, and ensure that all benefits the user is entitled to are, in fact, realized for the user. Tilz also enables various payment methods/managers to bid on a given transaction. Tilz enables a new way for credit card companies to mitigate risk, and offer a much more custom interaction with their customers. And as a person's credit score increases, a credit card company can bid to offer that transaction with, say a 12% interest rate, rather than the 15% rate their card is currently set at. Conversely, if a person's credit score is declining they could offer rates for transactions that are higher than the current 15%. That is to say, rates fluctuate with user risk, not just with, for example, the Fed Funds rate. Vis, AMEX and others could offer credit facilities not just credit cards. If a user's FICO score drops, the credit card company is no longer obligated to offer that person credit. Or can choose to offer credit on a transaction by transaction basis, with differing risk-based interest charges for each transaction. Also Tilz are a good way of acquiring a new customer. Just bid for their credit card or debit card business on a per transaction basis.

Every object may have a Tilz. Tilz can be created by, among other methods, clicking an MDF icon on the bottom of a content page. Manufacturers push Tilz of their product to customers who purchase it so that, among other motivations, users will register that Tilz (or the registration can take place automatically), and the manufacturer can pay the user for that ongoing product usage data. These Tilz can be pushed to the user's mobile device at the time the item is purchased. as the user scans their checkout receipt, it pushes a Tilz for each item they purchased, and, if the user wishes, registers that item according to that users profile. Why for instance, would a user want a Tilz for every item in their house? Many reasons. The Tilz can warn a user when their food item is about to go past its Use By date, or when their aspirin are about to expire. And manufacturers and retailers can use this opportunity to pay the user to receive a coupon (Coupon Widge Facility 3) to buy more of that product, or purchase related or competitive items. In embodiments Tilz (transaction) revenue is split with application makers, for Tilz saved natively from that application. For example, third parties, such as Microsoft, could conceivably participate in the revenue generated by a Tilz, that was created by saving a Word document as a Tilz MDF document (.MDF rather than or in addition to .doc). As per the conventional art Microsoft doesn't participate in the revenue a .doc document might generate. Tilz are also customized for user. Hello Kitty animated frames for Japanese teenage girls. Kendall-Jackson winery sponsored framez (an animated edge around the Tilz) for wine-related documents. Animated templates for Hosted Everything (Facility 6) or VictorsList (Facility 18) items. Sharing revenue for premium Tilz fees. The application maker (such as Microsoft) may share in the revenue from the sale of premium Tilz features or Tilz templates. Tilz are a flexible object space that enable characters from video games to live on mobile devices, PCs, TVs in novel ways. In such a manner, third party's brands can start to interact with their users in a way never before achieved as per conventional art advertising methods.

Social networks make money off the profiles of users. It's time the users share in the value created. A user creates their public Tilz (their public profile). Social networks pay the user to park that Tilz on that social network site. If not, then users may choose alternate social nets where the user shares in the economic value being made off their user's profile. A Tilz is also a profile. A profile of that person, place, thing, object, file, folder, Website, song, photo, etc. Conventional profiles live at profile parking sites such as Myspace and Ryze. And social networks make money off the profiles of users, yet don't share the resultant revenue with their users. It's time that users share in the billions of dollars of value being created off their profiles.

People may be motivated to create Tilz for objects. For example, antique hunters rummage through old barns. As they come across items, they can create Tilz for those items (e.g. take a picture and add some descriptive text). Those Tilz are now on their mobile handsets. Those Tilz become part of their information CloudCast (Facility 23) that may eventually entice someone who sees those Tilz to go the barn owner and purchase one of those items. If so, that antique hunter might receive a commission on that sale. Tilz creators share in revenues from the sale of Tilz templates (e.g. to more artfully display the information) applied to their Tilz, or from transactions that their Tilz engender. If people have to work, why not do something they love? This applies to anyone who has a passion for something, and now with Tilz, can have fun pursuing what they love. And it promotes adoption of Tilz.

Creating a Tilz. There are a plurality of means to create Tilz that include: the user takes a picture or scans the barcode Net Dotz (Facility 27) for that item. Appraisals for the condition of Tilz items works in a fashion similar to rock climbing ratings. Knowledgeable people set a rating, but others can reset ratings. Appraisers themselves are also rated, and carry with them a rating score. The more times an appraiser has their rating re-set, the lower their score. Designer Tilz of items may become the must-have accessory for certain items, and might someday be even more collectible than the item itself.

TV everywhere (via Tilz). A user's, say, cable TV subscription package gives users Tilz (each show in its own Tilz) rights to every show, on every channel in the user's TV package. TV service provider advantage: many of the Tilz will be served to users directly from content providers' (e.g. CBS, NBC) servers. User advantage: Tilz available anytime, anywhere on any digital device. Users can access their show Tilz (say, via the Internet) while at a friend's house, or hotel, etc. And shows will scale in size and/or quality as per the user's profile and the display device's profile.

Tilz within Tilz. For example, an address book can be a Tilz. Each entry in the address book is also a Tilz. Tilz within a Tilz. Each address book entry is a contact Tilz, abbreviated as "Tactilz" (Facility 13). User can include another Tilz within any other Tilz, such as a bank statement entry for payment to the veterinarian, within the Tactilz address book entry for the user's veterinarian. Users can drag Tilz from one document (a bank statement entry) to another (their address book Tactilz), and have it include live data.

Software application/widget Tilz. Application/widget Tilz can be represented in a plurality of styles, including by animated, licensed characters, such as popular cartoon characters (as opposed to the conventional art application/widget icons which are generally mundane static images conveying the application's/widget's use). Entities such as Disney or Electronic Arts could charge users a monthly fee to license their characters to execute a plurality of functions including perform alerts, reminders, and provide help instructions, and act as animated representations of various applications/widgets.

Magazines and newspapers need to consider changes to reflect the information overload their readers suffer from. Many readers don't have the time to read the full text of every articles or document, whether offline or on. So how can a magazine or newspaper change in appearance and function utilizing Tilz? Each element of (for instance) an article, whether offline or online, has its own Tilz. A typical article Tilz stack might consist of a Headline Tilz, Summary Tilz, and Author Tilz. A shift to the much smaller screen of mobile devices informs the need for magazine and newspaper (and documents and other things) to update their layouts. The layout has been the same for hundreds of years, and is totally out of sync with a society with far too little time to consume lengthy versions of every article. If the user wants more than the Headline Tilz, they simply tap or click the headline Tilz, for example, and up pop the Summary Tilz. Tapping the Author Tilz takes the reader to other articles by that author. And one user's Summary Tilz can be different from another user's Summary Tilz. Content creators can provide different types of summaries to meet the needs of different types of profiles. Some people like lists of information, others prefer a summary by a critic or blogger they trust. Still others prefer an animated Tilz. Some want their article summaries presented on their TV, others prefer their mobile device. These headline, summary and body Tilz can be how all documents appear, not just magazines and newspapers. Such a format can be utilized for documents inside a corporation. What manager has time to read 20+ page documents from each of her reports? Instead, managers can read all the summaries and only if necessary the full body of the document. Everyone is time-limited—and documents may change format to reflect this fact. And different users may adopt different styles, shapes, colors, animations, sounds, etc. for their Summary Tilz to express their individuality, instead of all documents being nearly identical. And users can live connect via Tilz to others reading that same article at that same time: instant message (IM), (video) chat, etc.; even leave glops (digital content, such as text or audio or video, that readers can add to other objects) for other readers to view. And information in articles should be live information. Whenever a user pulls up an article, the user, via Tilz, can choose the live version of all information in the article (a sports article that referenced a team's then win/loss record, could have that fact updated to the win/loss record of the team at the time/date the user is viewing the article). Printed versions of articles can have much the same functionality as the digital versions with Tilz. Printed pages can look the same as digital pages, with each Tilz (corresponding to each discrete element of an article) having a Net Dotz that readers can scan to receive the Tilz they seek. On a digital page with Web Pref (Facility 20) the user can turn off glops, and choose for instance to never show article detail until the user clicks on a Summary Tilz, or opts, for example, to receive updates to the article next time the user is magazine browsing on their TV via Tube Widge (Facility 15). Furthermore, the glops that readers leave can be location-based, so when a user opens the same article in New York City, they might see different glops than when they are in Los Angeles. Also the user could set the article to view the Galaxz (Facility 5) Tilz for people mentioned in the article, or grab other articles that mention those same people. And glops change according to a reader's profiles (including profiles which track a user's location). Users can also set glops, as per preference profile selections, to, for instance, view all the comments from, and interact with, others reading this same Tilz at this very moment, or limit comments to those with certain affinity profiles. And with Tilz, as users start to consume more magazine and newspaper article content on devices such as TV's (Tube Widge Facility 15), Tilz gives content creators and content consumers untold flexibility to maximize each screen size and capability. TV's powered by Mobi Homi DVR's are location-aware, and thus introduce location-based elements and functionality to Tilz articles viewed thereon.

Tilz extend the reach of magazines/newspapers into the real world. For example, when a subscriber to a periodical in Tilz format, drives/walks past a place that was the subject of a story, that story Tilz, and related Tilz, can pop up on the user's mobile handset. And periodicals get paid if the user transacts upon those field Tilz, even if the user is not a subscriber. Field Tilz are Tilz that pop-up on a user's mobile device (or any other digital device of choice) in the real world—out in the "field." Driving past a cupcake shop, featured in the food section of the paper—a Tilz pops up (if the user wishes). And thusly alerted the user might stop in to purchase a cupcake (for which the newspaper might receive a commission). Driving past a company's headquarters building a recent story (in the user's subscribed periodical) about their CEO could pop up, depending upon a user's profile settings. When the user is driving past the marshlands that need saving, the newspaper gets paid a commission if the user donates to the Save the Marshlands fund. If the user is in to fashion, fashion-related Tilz, stories from that magazine's or newspaper's fashion section could pop-up on their mobile device as users move about in the real world. If the user is into politics, political issues pop up. And the magazine or newspaper gets paid, even if the Tilz about the cupcake shop is shared with users who are not subscribers, but who because of their received Tilz article about the cupcake shop, thereby purchase a cupcake.

Instead of third parties creating profiles of users, with Tilz users can create, and manage, and monetize their own profiles. For example, a user's Movies Not Yet Seen profile, as captured in Tilz. Each time a user sees, for instance, a movie ad on TV or in the newspaper they can scan the ad via electronic IP-based Net Dotz (Facility 27) barcodes; which returns a Tilz to the user's mobile handset (Mobi). The Tilz is the profile of that movie. If the user wanted to add that movie to their queue of movies at a DVD delivery service such as Netflix, they might not be able to if the movie is not yet in Netflix's database. If not, then the user might have to take the time and effort to set a calendar reminder to add that movie to their Netflix queue six months from now—not a user friendly solution. But with Tilz, the user simply amasses the Tilz of all movies the user wants to see, but hasn't yet, and CloudCasts (Facility 23) that profile. Thereupon entities such as Netflix can, when Netflix databases enable it to do so, add that movie to the user's Netflix movie queue. However, the CloudCast can be made available to all entities that can supply that movie to this user. And thereby (via Ad Widge Facility 1 and Coupon Widge Facility 3, among other possible means) does the user get paid to receive ads/offers/coupons/information/et. al. from entities that can supply a particular movie to that user (as per the user's various preference Web Pref Facility 20 and other profiles). Nearby theaters, pay-per-view providers, nearby bricks and mortar DVD sellers, the premium channel which acquired the rights to that movie, online DVD sellers, etc. can each pay the user to view the user's movie profile (which may include the user's Movies Already Seen VictorsList and Movies Not Yet Seen VictorsList Facility 18), and thereupon determine if it is worth is to pay the user again to send ads/offers/coupons/information/et. al. related to this movie to this user. Users have the option of setting the price to receive such ads/offers/coupons/information/et. al. Tilz also enable new income streams for other parties: If users attend a movie at the Acme Movie Theater, for example, users may have the option to get the DVD Tilz (electronic copy of the movie) for an additional price (beyond the movie theater ticket price). The Tilz may be downloaded to the user's mobile device via means such as Bluetooth or WiFi (and/or other modalities) while the user watches the movie in the theater. And after a user watches a movie, it is automatically added to the user's Movies Already Seen VictorsList—a list with others might by paying the user to view. Movies Already Seen VictorsList subscribers might include movie marketing companies or market research firms or other entities.

Tilz replace email (Tilz email=tmail). With Tilz, email is no longer a separate entity, whose data must be cut and pasted into other places (such as documents, since email formats are not seamlessly compatible with conventional art document formats). The data in the email Tilz update in realtime or when all other dependent Tilz update asynchronously. If a user changes their address, the user's address Tilz on, say, their magazine subscription Website is auto-synced. As per the conventional art, if a user moves (and thus changes address) the burden is on the to remember all the locations (such as various Websites, login accounts, mailing lists, etc.) where the user's address is stored, then update them one by one. With Tilz, each of those locations stores the user's address via a user's Address Tilz—which is automatically updated when an information changes. In embodiments email via Tilz means users can write, speak or video chat (among other modalities) back and forth synchronously or asynchronously. Users receive less spam via email Tilz. Via a plurality of user-selectable ways of being notified, the user can be alerted that a particular Tilz is available for download or sync. If the users don't recognize the sender, they don't download the Tilz, thus spam can't get in unless users download it themselves. If a user receives a conventional art email about a product, there is no simple way to update that user's profile vis a vis that product, without the user having to re-type such information manually. With Tilz, a user receives the Tilz for that product, which Sorto (Facility 8), can easily sort, as is, into any number of profiles directly, and whereupon the user, if they wish, can start being paid to receive ads, for instance, for where they can purchase said product near them. And users could be paid for flicking said Tilz (equivalent perhaps to the outmoded conventional art email "forwarding") to one of their friends who may be interested that product. In embodiments a user creates any sort of digital content, and selects the email icon in the corner of the Tilz. There the user types the name of the intended recipient, who receives a link to the location of the Tilz, and the Tilz is "downloaded" by the same recipient at a time of their choosing, and onto a device of their choosing. Further changes to that Tilz, are synced rather than "sent" as per conventional art email. Tilz are synced anytime the recipient is connected to the Internet or via peer-to-peer if proximate to another user who has a newer version of that Tilz or by other means. Thus, any size tmail can be sent, since, in embodiments it is being up/downloaded. Tilz can also be sent by texting or instant messaging (IM'ing) the Internet protocol address of the Tilz, which the recipient then downloads when they wish. And with Tilz emil, users don't need to have an email service provider (such as Yahoo or Hotmail).

Global platform (Tilz support any content (such as videos, photos, music, e-books, files, folders, et.) on any device (mobile device, TV, PC, refrigerator, et. al.); Relational database (via tags. User takes a picture during a Boy Scout camping trip in California. Tags them with: "Boy Scouts" "camping" "hiking" etc. Then next year that user take pictures of their Boy Scout trip in Hawaii. When the user searches on "By Scout" or "hiking" the pictures (Tilz) are returned from both trips without having to file copies of photos (Tilz) in multiple conventional art folders); Search (Search is built-in, enabling users to search any and all Tilz connected to the Internet, or via peer-to-peer, such as Bluetooth); Notifications (Tilz reveal if content has changed via a plurality of types of notifications, including pulsing frames, actual image of the new content, audio notifications, etc. If the user grabs the real estate listing Tilz for a house, the user could set that Tilz to notify the use each time there is an Open House for that property); Built-in browser (Tilz include built-in browsing technology (Browz Widge Facility 21), or users may opt to instead use third party browsing technology instead); Built-in operating system (Float Facility 24. Tilz can communicate with each other irrespective of the underlying operating system); Digital content player (Tilz are configured to play various digital content. Tilz enable third party digital content players to embed their functionality in Tilz); Animation (various third party protocols are supported and can be embedded); Tilz Stylz (Users may buy, sell, and trade templates for various types of documents (and other things) Also Tilz Trickz (how Tilz are displayed and move around a screen) can be uploaded and traded by various users. Also cover art for various types of content may be traded); Transfer Tilz (every user has their own transfer Tilz. Just drag and drop any file, movie, video, or digital object at all onto the user's transfer Tilz and it can be made available for viewing by or transfer to other users (subject to user-set size limitations and digital content rights); Security (Tilz contain a wealth of security options including time stamp, device stamp, and location stamp, for applications such as signatures, postings to restricted sites, transactions, et. al. These security stamps can be embedded in the Tilz metadata, for identification and authentication purposes and which further ensure against identity theft. If a thief gets hold of a user's credit card Tilz or passport Tilz they may try to utilize it in a city where the user is not located (or otherwise has not authorized use there). Thus an alarm is activated, which can send automatic notifications to the use as well as Tilz provider such as the bank or U.S. government). In addition, Tilz are each assigned an unique IPv21 # (Facility 25), including every copy of, say, a movie, song, et. al. Copy prevention and other measures also may restrict sharing and viewing of the content in the Tilz.

Tilz display the (document) contents (Tilz representing a folder might be a shiny, translucent Tilz which features, in embodiments, a rotating set of thumbnails of the documents or songs or videos et. al. in that folder); Attribute denotation (Different Tilz sizes or shapes or colors denote many different user-selectable and user-changeable attributes: indicating, for example, that the item is text, or pictures, or music, or a video, etc. What any one size, shape, and/or color means can be set by each user. And other attributes, such as flashing, can mean that Tilz requires the user's attention); Communication (Tilz are configured for inter-Tilz communication, enabling Tilz (and thus the users of Tilz) to communicate with each other); Tilz chat. (In embodiments, users can select the phone icon to communicate with another Tilz user (and may, according to the user's preference profile, use the audio or video communication modality of their choice: such as Phone Widge (Facility 9), third party means, or other means); MDF (When Tilz content is saved it may be given the following file extension: ".mdf" or ".MDF" or other/no file extension); Tilz creation (In embodiments Tilz can be created from any program that chooses to embed Tilz technology in it. Users could choose to save, for example, a Word document as .MDF); Icons (Icons around the edges (or other locations) of Tilz, can be set as shortcuts to take the user to, say, other Tilz by that same author, or related (tag or keyword) content, etc.); IP address and barcode (Every Tilz has its own unique IPv21 (Facility 25) identification ID number. Additionally one or more IP-based Net Dotz (Facility 27) barcodes is assigned to each Tilz). Network node software (Network node (switch, router, hub, et. al.) manufacturers can download software that controls transmission of Tilz on/via/through their network devices); Cover Tilz (The default is a thumbnail image of the content, however, users can choose any style Cover Tilz. For example, all of Bob's Tilz could have a photo of Bob on the front. Cover Tilz can also contain a (one-sentence text) summary of the content, or other things); Live-element sync (Any content on any Tilz can be auto-updated, by simply changing the master Tilz element (which can also be a subscribable element. For example, if a company changes their logo, all Tilz (documents, Websites, videos, anything) that have that logo subTilz in them, will be automatically updated, and so too will the plurality of dependent Tilz, as per each Tilz' preference profile); Preference adjustable (Tilz change and respond according to each user's preference profiles, and other profiles, which may belong to the user or another entity).

Custom content (When users watch a program or movie on Tilz, additional content can be displayed according to a user's preference profile: such as on-screen story background information (for example, "This was the third day of shooting, and it rained all night before, so the area was soaked . . . ") Custom content can also include such items as behind-the-scenes insider information ("That day the hairdresser didn't show up, so the lead actress wore the wig now seen in the movie."); Personal metadata (Movie: "Casablanca" starring Humphrey Bogart. Rental expires Oct. 17, 2001. User paid fee: $2 to rent it, from Blockbuster. User viewed this rental: one time before. This user also saw 3 other Humphrey Bogart movies); Tilz ratings (Any user can rate any Tilz element, including third party uploads/add ons such as Tilz templates); Parental control (Tilz support various parental rating systems such as MPAA for movies: G, PG, PG-13, R, etc.); Spherez (Spherez are a navigation and display tool, wherein Tilz are mapped onto a multi-faceted shape, such as sphere. Using flicking motions the user can spin the Spherez containing Tilz (that relate to the user's current task. The entire Spherez can be taken over as a notification, if the use's profile allows, or even display (as) a whole Spherez ad); Shared Tilz (At the use's option, each Tilz can be set to be shared with other users (selectively) or made public (hosted) or semi-public (user-selected entities can view it) or other options); Paid search. (Companies can pay the user to populate the closest-to-the-center ring of Tilz spaces on the Spherez, whenever a user is utilizing a Spherez for searching, organizing, or anytime). Developer tools (Application development, and template development tools are available, as well as tools for developing or porting games, and for media-sharing); Tilz function offline (Content can be added, deleted, or edited, even while a Tilz is not connected to the Internet. Users can, for instance, scan barcodes/RFIDs and have their Tilz update on their mobile device, then have those changes synced to all dependent Tilz when next connected to the Internet or via other means (such as Bluetooth); Geo-tagged (As a user scans a map mashup they can see flags (or other indicators) showing where the user has Tilz content tagged to that location. For example, if a user saves the Tilz of various houses the user is interested in buying, those houses can appear on online maps. Also as a user moves about in the real world their mobile device can alert them to (or popup) Tilz content/messages associated with that location); Bio-tagged (Tilz are configured for compatibility with facial recognition technology, so that as the user's camera recognizes the person, object, sign or location, it alerts the user to related Tilz (which may contain content/information/messages/et. al.) Tilz can also identify another person not just for tagging photos and content related to that person, but for transaction authentication. Tilz are also configured for compatibility with wearable and implantable RFID for various interaction and transaction and other purposes.

Reflection (Tilz can reflect the look and feel of a user's social networking page/site/Tilz/et. al. (Galaxz Facility 5), or even change each time that page/site/Tilz/et. al. changes (the margins, for instance, of any document created by that user can contain status updates, and indicators of items, such as new photos, etc.), or even change colors as the seasons change, or look differently as the hours of the day progress, or as the Tilz creator's mood changes (for example, blue=sad, red=angry, yellow=happy, etc.); Movie Tilz (Movies can be distributed and viewed as Tilz). Movie Tilz covers can contain live trailers or just text, or just a photo for those who don't want any spoiler information); DVD Tilz (Conventional art DVDs are static and information on the disc stays constant. DVDs delivered as Tilz are fully interactive and live. DVD Tilz not only present the movie, and the extra features/content common to some conventional art DVDs, but also enable movie producers to add content over time. DVD Tilz could later add (perhaps, for an additional fee, a director's cut, or let any fans of the movie make and present their cuts, or only the winner voted best Fan Cut version of the film, or let film school students produce a cut or re-shoot, or re-edit some scenes, among other possibilities. DVD Tilz present a plurality of possibilities. Users can engage in live chat with others who happen to be watching the same movie at the same time. Airplanes could pull content the user owns or rented into the seat back entertainment center (or stream it from the user's mobile device). Blockbuster could use DVD Tilz to rent movies to customers in a plurality of ways: users could come into Blockbuster and either physically plug in their mobile device into an USB or HDMI port and download the movie. Or users users could browse the shelves and scan the barcode of the movie they want to see, and the DVD Tilz will start automatically downloading to the use's DVR, (which might be back at their house, or might be the mobile device (Mobi) in their hand), while the user grabs some candy and soda, and pays at the checkout. Users can also browse the Blockbuster Website or ParaSite, and click the movie they want and it will start downloading (after payment has been received). The point is users start associating Blockbuster with the company that is thinking about the best ways to add value to the movie watching experience. Using Tilz Blockbuster can also be an e-distribution hub for digital movie delivery to movie theaters. Using Tilz Blockbuster can be the video content delivery vehicle for corporations that need a live event or canned video materials distributed and made available to employees); Gift card Tilz (replacing the need to physically manufacture and carry around a plurality of gift cards); Digital wallet (Digital versions of everything in a user's wallet, including a driver's license, credit cards, frequent flyer club cards, et. al.); Tilz ID cards (For those states and countries that wish to issue resident ID cards. Can include a Net Dotz (Facility 27) barcode on each); Web presence Tilz (Could be a user's image or photo. Other users could click on the Web presence Tilz to get more information about that person—and the information the recipient sees, depends upon the recipient's profile); Branded Tilz (Companies may wish to extend their brand by creating Tilz templates that incorporate such items as, their logo—either for free or for a fee. Various sports teams, universities, organizations, companies, or commercial products (among other entities and things), may be the sort of things users may wish to feature in their various Tilz templates. Documents (and other things) via Tilz may take any shape or form, such as appearing to be an M&M). Newspaper Tilz (Tilz-enabled newspapers can be easily read on any number of different digital devices, including mobile devices. Newspaper sections are each assigned their own Tilz). Real estate listings Tilz (Contain items such as the history (such as past sale prices), past photos (from past listings), as well as any price changes that may occur. And can notify interested parties when that property is available for sale or lease. Tilz may change how houses are sold. Users express interest via the property Tilz of that house, whether it's for sale or not, thus when the owners get ready to sell, they may have already amassed a list of interested buyers, and therefore may not need a real estate agent to market and sell their home, saving them a great deal of money—paperwork and transaction may be able to be effected by a few hours of a real estate attorney's time. The user's property Tilz becomes an income center for the homeowner (commissions may be paid for the gate maker Tilz, or gardener Tilz, etc. when other users request such information or Tilz (from the home's CloudCast (Facility 23)).

Ads (Ads in Tilz can be embedded within a show, movie, video, document or any digital content. Tilz have their own unique IPv21 # (Facility 25), thus ads can, as per the user's preference profile (Web Pref Facility 20) and/or Ad Widge (Facility 1) profile, deliver ads targeted at or requested by individual Tilz users); Intramedia ads (float on top of part of the existing program/content in such a way they cannot be defeated or avoided by the user); Intrastitial ads (Ads between shows (or during commercial breaks) cannot be defeated or avoided by the user); Targeted ads (Ads that reflect those items a user's Ad Widge (Facility 1) profile specifies the user wants to receive and not receive. Targeted ads, if the use allows, can also be based upon keywords associated with that user from many sources, including the user's lists (VictorsLists Facility 18) of items they own or want to purchase); Sponsored Tilz (Ford Trucks could pay users to put the Ford slogan across the bottom of certain Tilz. For instance, those Tilz with tags such as: "trucks" "four wheel drive" or other). Or Rolex watches could pay to sponsor the public Tilz of a top tennis star); Hidden information (Clicking on Cover Tilz usually brings users to more detailed information, but depending upon the profile of the person clicking on the Tilz, it could enable special access to extra content for friends (for instance) of the Tilz creator); Tilz program electronic devices (It's far easier and intuitive to create a mobile device widget to control and program electronic devices. For instance, the user can program a ceiling fan's light to go on and off at certain intervals, (say, when the user is on vacation), via a mobile device widget for the ceiling fan, using fingertip swipes featuring an image of a clock and a calendar, rather than the conventional art non-intuitive light/fan/light fan switch programming progression, used by some ceiling fan lights, which likely requires the user to refer to the product manual); Tilz within Websites (In embodiments Websites are made up of Tilz. Users no longer have to go to the information technology (IT) person to add content to a Website. Any authorized user can simply drag a Tilz onto the hosted Website Tilz—and that content is instantly available to all subscribers of that Tilz—including users simply viewing it online, as per conventional art Websites); Tilz replace Websites ((ParaSites Facility 29 are local, customized versions of Websites). Content is updated when connected).

Tilz as record singles (For example, like the old vinyl record 45's with A and B sides, music owners or publishers could choose to release their music on Tilz as two-song "singles." Because it's a Tilz, such singles could be supplemented with extras such as videos of the band performing those songs. But unlike DVD content, the Tilz could be released in numerous different audio formats which users could pay extra for. And each time the Tilz is played it can be optimized (as to audio/video quality, for instance) for that device); A Living Tilz (Song artists (or other entities) could choose to release a "living" Tilz for a given song. For instance, a band could release their song called "Forever You" in a Living Tilz. Living Tilz may cost more than regular Tilz (or charge a monthly subscription fee). If the band were to go on a concert tour, the Living Tilz user would receive some or all of the live performances of Forever You, automatically sent to their digital device, each time the band recorded a live performance. And if the band appeared at a radio station to promote a tour stop, and played an acoustic version of the song at the radio station, Living Tilz subscribers might receive that version as well. Living Tilz enable artists to break free from the conventional art analog confines (that have largely been copied in the digital world) and let their imaginations run free as to how they'd like to present their ware to their customers. As another example Living Tilz could also include photos a user sends to friends or relatives. With Living Tilz they will always have the latest photo of the user, user's child or pet or what the user is serving for dinner, etc. So if a user were to subscribe to an "Eiffel Tower" photos, that are Living Tilz, they receive, in embodiments, any photo Tilz tagged "Eiffel Tower" that any user has uploaded or is "hosting" publicly from their camera or mobile device. So, once every 30 seconds (or other user-defined time interval), the user receives/sees a new Eiffel Tower image in their Living Tilz.); Collectibles (Every coin, stamp, bottle of wine, and every other collectible item may have its own unique Iv21 # (Facility 25) Internet protocol IP address. In embodiments users take pictures of the front and back of the item to display the item in the Tilz. And manufacturers may start assigning unique IP address numbers (IPv21 #'s) to, for instance, every bottle of wine they produce, so each bottle comes with its own unique Tilz with (profile) information about that specific bottle. For example, when a user purchases the 2001 Acme Winery Cabernet Sauvignon Reserve bottle ID #553345286 (its IPv21 #), the purchase transaction (accomplished via mobile device (Mobi)) will send to the user's mobile device the Tilz for that bottle of wine. The user can then add that Tilz to their Wine Cellar VictorsList (Facility 18). The user can then subscribe to the tasting notes from Acme, suggesting Drink Now, or perhaps Lay Down for another 2-4 years. And users with the Tilz for that same wine can socialize (from/within the Tilz), and compare, say, drinking timing or tasting notes with each other (if they choose) without having to "go" to a Website to do so); Patent Examiners (If inventors submit patent applications in/via Tilz, then patent examiners can add tags to the Tilz for each invention. Thereby automatically creating a searchable relational database to pull up related patents with similar keyword (or other) tags); Hospital Tilz (Hospital Tilz can be displayed on any digital screen (monitor, TV, mobile device, etc.). Hospital Tilz act as the information board for each patient (as a better alternative to the often used whiteboard). Hospital Tilz can also be made available to any subscribers the hospital and/or patient wishes, such as family members (especially those out of town), insurance company, doctors, nurses, et. al. Hospital Tilz can be customized with many items such as a rotating set of photos, both for friends and family (with in-hospital photos), and from the patient's friends and family (with at-home photos of the dog chewing the patient's favorite slippers); Badges as receipts for anything (Users can collect Tilz or badges from any location, monument, store, et. al. they physically visit (or otherwise acquire remotely via non-proximate modalities). In embodiments, these badges an not only be collected but they can be utilized as information dissemination and advertising vehicles. They can also provide on-table interaction. As a user has a drink their drink their "electronic coasters" (Tilz) can reflect the drink their having or be suggesting their next drink. For instance, Coke if they're having a soda, Bud if they're having a beer, Kendall-Jackson wines if they're having vino. Electronic coasters can also be utilized by third parties, for example to post missing persons "milk carton" profiles, or local ads, say for the ice cream parlor down the block for dessert, or the bookstore across the street. Users may get paid to receive such ads/offers/information/etc. Which could reduce the cost of their drinks by, say, X cents per 10 minutes (an iDough Facility 7 credit toward their bill). Users' drink information can be automatically added to their Drinks Profile—which increases the user's profile value. Users' data can be sent not only to that restaurant so waiters can offer customers "the usual"—but also directly to the drink manufacturer. Tilz help the drink manufacturer build a more accurate (realtime) profile of their users, as well as be able to market directly to their customers via the real world platform utilizing Float (Facility 24), which enables interactions such as buying their frequent users a drink, or offering discounts from time to time at various locations. Or inviting customers to tour the actual brewery or winery. Waiters can also use the Tilz drink badges to keep track of the drinks (or food) the user has ordered. So Tilz badges can become a user's bill and receipt for that establishment. Far more interesting and useful than a conventional art printed receipt). Badges can also be utilized for real world scavenger hunts, and other games, contests and activities); Tilz as ParaSites (Badges can also be utilized as ParaSites (Facility 29 mini local Websites), as a customized way to keep in direct contact with customers/friends/colleagues/et. al.); Reverse Badges (In addition to users receiving a badge when checking in at a location, users can give a badge—their personal badge. Their profile Tilz. With Badge Tilz users have information about that store and that store has information about that user. These badge Tilz can be the basis, the vehicle, for all future interaction and transaction and communication between that user and that store/person/other entity. The reverse badge can simply be the obverse of the badge the user receives from that establishment (ala a baseball card with one side all about the establishment and the other all about that user). And is the gateway to that person's ComCloud (Facility 23 profile broadcast) and are the Galaxz (Facility 5 social/business/object network) Tilz for each customer of that establishment or company.

Tilz uses. There are a plurality of Tilz uses. Tilz are not limited to digital reproductions of an analog item. For example, business cards. Tilz may replace business cards. But Tilz business cards can be a portal through which additional information is made available about that person or company. And can become the ongoing connection point for the business relationship among the individuals exchanging business cards. The business card Tilz can provide a history of all interactions, as well as means for future interaction.

Also, Tilz business cards can be any shape, size, color, or be animated when presented on a TV. Or be animated in such as way as to capture rituals such as those in Japan around the exchanging of business cards. Images can appear of thumbs and forefingers gripping the upper corners of the card, and having the cards "bow" to each other, and then be placed directly in the lower center of the device screen parallel to the bottom edge. Ad Tilz (customized advertisements delivered as Tilz). Artwork Tilz (every piece of art a user owns has its own Tilz). Coupon Tilz (multimedia, user-solicited, location-aware, profile-based Tilz). Phonebook listings Tilz (Phonebook listings are as transactable Tilz. Listings of solutions for problems). Wine label Tilz (collect the labels for each wine a user tried; keep tasting notes therein). Magazine Tilz (magazines enter the digital age, customized for each user, bringing periodicals new revenue streams). Status Tilz (e.g. 14 weeks pregnant, out of office—backpacking in the Sierras, etc.). City overview playlist Tilz (Chamber of Commerce delivers this Tilz deck, to user inquiring about that city).

Licensed Tilz (Tilz with the look like Cheetos or a NASCAR race car); Tilz templates for sale (Individuals and companies may create templates for various types of documents, contracts, greeting cards, etc. that others can purchase. These can include company/university mascots moving around the document Tilz frame) or even (licensed) famous people's voices introducing the Tilz (How about Michael Douglas' voice introducing the prospectus?) Tilz templates may revenue share income from that Tilz, or charge a one-time fee); Bottom line ads (Ad strips across the bottom of Tilz, that show a short 2-5 second (or time amount) ad from time to time. Can slide out from the bottom of the Tilz, or appear in the Tilz frame, or even encroach on the bottom portion of the Tilz field itself); Revenue sharing (As Tilz generate income from others wishing to pay to view the content of a given Tilz, or from ads on that Tilz, that revenue is shared with the user. Revenue is also shared with the Tilz creator (which may include the software used to create the Tilz, such as Microsoft Word), device maker (such as Motorola), network carrier (such as Verizon Wireless); Transactions (Revenue from any transactions on that Tilz may be shared among various parties); Tilzvertisements (Some Tilz content may be view only after, say, a 20 second long advertisement on the Tilz. Ad serving companies may collect a transaction fee, if the Tilz is utilized to make a transaction based upon the ad);

Tilz continuously attract and assimilate related content (Content can be curated for free, or for a fee, by the expertise of others/third parties. And via paid assimilation (an analog to "paid search") users can be paid to receive related content); Tilz avatars (Instead of boring old digital version of an 8.5"×11" piece of paper, a document, for instance, might be represented by an animated walking talking avatar robot. Such avatars might be sponsored by third parties whose brand name may appear thereon. Such a complex Tilz template might otherwise cost the user some money to acquire the rights to, however, the sponsor may cover the template fees in exchange for its brand identity prominently featured on the avatar. In embodiments the user's face may be mapped onto the avatar, as per profile/preference customization. The avatar is the document.

The forthcoming mobile device revolution is such a tectonic structural shift for the computing world, that it demands that everything related to computing and networking be entirely re-imagined. Tilz has re-imagined the concept of a document. As well as how literally any digital content can by stored and displayed. Tilz are informed by the smaller screen size of the mobile handset, but also flourish in a multi-device environment. Tilz revolutionizes marketing, merchandising, customer interaction, and social interaction. With Tilz transactions are transactable. Tilz templates are cool and a source of revenue as well as interaction. Tilz enable the next generation of notifications and messaging. Notifications, messages, and status updates can appear in Tilz templates. If a user received a Tilz from Fred, then any updates or messages from Fred can be displayed in novel fashion via the Tilz template. Tilz also generate new sources of revenue for application makers which choose to employ/enable Tilz. Tilz offer credit card companies entirely new business models based on transactions instead of users. Users' social profiles in Tilz means that users get paid for monetization of their profiles. People are incentivized to create Tilz for every object on earth, because Tilz creators share in the revenue generated by that Tilz. Tilz create a brand new profitable and exciting format for magazines and newspapers (not to mention books, movies, TV shows, pictures, etc.). And Tilz extend the reach of magazines and newspapers into the real world. Tilz are location-aware, touch-capable, interaction and transaction ready, and thus suitable for mobile devices—as compared to conventional aging/outmoded formats such as .doc and PDFs. The simple act, for instance, of a user adding movies to the user's Movies Not Yet Seen list puts money in the user's pocket and provides movie vendors of all sorts, new avenues to attract and interact with potential customers. Tilz replace email. Tilz replace Websites. Tilz are the beginning of the end for conventional overly complex relational database systems. Tilz are geo-tagged and location aware. Tilz enable a new type of paid search that also works in the real world, not just online (and the users get paid). Tilz take the place of everything in a user's wallet from cash and checks to credit cards and library cards and shopping/loyalty-programs cards and workplace badges et. al. Tilz are the embodiment of the forthcoming mobile device revolution.

Facility 31

Barcode Technology Facility

5131

In embodiments, a module that facilitates advanced barcode technology (hereafter "Barcode Widge") is provided. Barcode Widge encompasses both hardware and software facilities. Conventional consumer mobile handsets do not have a laser-based barcode scanning facility. Barcode Widge includes multiple embodiments of barcode technology including a laser-based barcode scanner, as well as infrared and near-infrared barcode scanners. In embodiments, a device's camera is configured for reading the barcode. Barcode Widge is provided to support more efficient acquisition of analog and digital data as well as better user interaction vis a vis the real world. Barcode Widge manages a user's interactions with barcodes, and enables barcodes scanned data to be sent, managed and received by various digital devices, servers, mobile devices, game controllers, et. Barcode Widge embeds/employs an Internet protocol (IP) address encoded in a barcode to access/download data "tiles" or the homonym "Tilz" (Facility 30) relating to the barcoded item. Conventional information encoded into barcodes is limited and static. Limited: there's not very much information; and static: scan an item purchased a decade ago, and receive the same information today, as back then. Yet, there might be new information about that item, such as whether there has been a product recall for that item, or if a newer model is available, and if so, what are the new features, and pricing, and retail stores that carry it. Is this new item highly rated? How can I communicate with other users of the current/past models of the item? Scan the barcode to bring up the manual for that product. Or scan the barcode to engage customer support for that product.

An IP barcode is not simply static data, it brings users to an IP address where an unlimited amount of data or information or video, etc. may be made directly or indirectly available to users. IP-based barcodes can invoke a plurality of information/capability including a picture(s) of the item, detailed specifications, warranty information (not just the guarantees, but can also actively warn users if the warranty is about to expires), re-ordering information (often a user purchased an item years ago, and can't remember the results of all the time they expended trying to find the perfect source or retailer for that item. This information, via Tilz (and other means), can be preserved and made available to the user. Furthermore, the user gets paid to accepts ads/offers/coupons/information from retailers who can supply a replacement for this item); instant purchases (of items via advertisements with (Net Dotz Facility 27) barcodes, wherein the vendor can feature the very latest pricing or even offer different pricing or discounts for, say, loyal customers (My Cookiez Facility 26 or ComCloud Facility 23 let's the vendor now who (or the anonymous profile type of the person) is scanning the ad); all from the ads, which can be analog/physical or digital); barcodes on menus (that users scan with their own mobile handsets (Mobis)) can replace purpose-built waiter devices for taking restaurant orders (customers or the waiter can scan the Net Dotz or other (IP) barcode type next to menu items they want to order, and pay for the meal with their mobile device, and even have a receipt Tilz (Facility 30) sent to their mobile device). Medicine delivery audit (nurses delivering drugs to patients in hospitals can, via Barcode Widge use a mobile device to scan a barcode bracelet on their own wrist, the scan the barcode of the medication vial, then scan the patient barcode bracelet—ensuring the right amount of drugs, delivered to the right patient, at the right time, every time. In embodiments Barcode Widge software logging function logs the scans for each drug delivery which is then uploaded to the patient's chard (a hospital Tilz) as well as the doctor's computing device and the drug company's servers for real-time usage tracking of their medicines—which heretofore has not been available). Barcode Widge software can also programmed to alert for adverse drug interactions. Drugs that should not be mixed. Additionally the drugs and dosages being delivered can be compared against the patient's latest lab results to alert for possible potential contraindications).

Diet monitoring (uses can scan the barcodes of the items they eat/drink (as well as other ingestibles such as vitamins/supplements). Barcode Widge can then track, among other data, fat, protein, carbs, and calories. As restaurants start adding barcodes next to each item, users can automatically track their diet, as well as their compliance with various diet regimes such as South Beach Diet, Jenny Craig, etc. This information can be sent automatically to a user's data sites (Tilz) or followers/subscribers such as their personal doctor, their health insurance company, nutritionist, Weight Watchers, their gym trainer or training software application, and all their personal VictorsLists (Facility 18): Restaurants list, Shopping list, Favorite Foods list, Foods Eaten list, Wines Tried list, etc.); Marketers pay user to share scanned information (If a user is shopping for a new TV and scans the barcodes of some of the TVs the user is considering purchasing, this information can be sent to the user's Upcoming Purchases list (Facility 18 VictorsList). The user can then set their preference profile (Web Pref Facility 20) to share the Upcoming Purchases VictorsList with select companies. This enables ads to be sent to the user (as per their Ad Widge, Facility 1, profile). Then product manufacturers and retailers of those products could send the user information/ads/offers, as well as their best prices or coupons); Instant information—user gets paid (for example, a user is at a shopping mall and sees an interesting item. The user scans the barcode, and receives a Tilz on their mobile device (Mobi) with a photo and more information about the item. The information can be just pricing information from the retailer, or marketing material from manufacturer or even products that are competition for that scanned item. All parties may pay the user to receive this information); What to do with Tilz received (a user could add the Tilz to a VictorsList (such as their Personal Wish List—for their friends to view and buy gifts for their birthday—or that user's Gift List—presents users buy for others—or their Buy for Yourself Soon list or Comparison Shopping List (compare, for instance, various digital cameras) or just add it to the user's shopping cart for that store for purchase now. If the user buys it, it will automatically be added to the user's Personal Inventory VictorsList (Facility 18) by Sorto (Facility 8)); Mark travel monuments visited (For example, the Eiffel Tower applies Net Dotz (Facility 27) to the legs of the tower and different barcodes on each of the elevated viewing platforms, so the user can add those places to their Places Visited VictorsList (Facility 18). Same thing with museums, churches, tourist attractions, individual statue in public parks, signs at the mid point of each individual ski run at ski resorts, etc. Users can add those places to their Places Visited VictorsList. And tourist attractions may create clever badge Tilz (Facility 30) that users receive as proof of their visit, plus these Tilz can, if the user allows, be utilized to keep the user up to date with news about that tourist attraction (shows, concerts, renovations or closures, hours, etc.) or even ads from companies that wish to solicit the user's travel business. Sorto may add the Tilz received into My Travels VictorsList. Travel companies such as Expedia or American Express could have contests to see who can mark the most travel monuments in various locations during a certain month or year. Or could sponsor worldwide "scavenger hunts" were contestants solve riddles for clues to locations they must mark. Or sponsor contests where contestants mark monuments with their mobile devices, and utilize their mobile devices to complete tasks and document their trip); Survey Eggs (Facility 39) site information (Travel monuments could also utilize Survey Eggs to CloudCast (Facility 23) information about that site: the traveler marks the site by scanning the barcode (or via the Net Dotz information, which can be sent via radio frequency) of, say, a castle ruin in England. The user's mobile device then sends a ping to determine if there are Survey Eggs present, which could send a brief audio or video history of the ruins to the user's mobile device. This is possible even where there is no cellphone or WiFi coverage as the Survey Eggs could send data via Bluetooth); Tourist Boards (Tourist boards can utilize various communication modalities (such as Bluetooth) or WiFi or wireless carrier network to provide tourists with information about travel monuments or instructions about how to get to a particular place via public transportation (in that user's native language), or how to get from their hotel to the desired restaurant. And these instructions could be verbally delivered using various open source/third party computerized voice readers); Travel guidebooks Net Dotz (Placing a Net Dotz barcode next to each item in a guidebook enables a user to create an itinerary by scanning the tourist attractions they want to visit, and scan the Net Dotz from the hotel they are staying in and Barcode Widge returns an itinerary detailing which buses, taxis, subways, and/or trains the traveler needs to use to get to the sites. Delivered in the user's native language); Barcode Widge also displays barcodes (Barcode Widge interoperates with Confirmation Widge. When a user makes a plane reservation, Confirmation Widge logs onto the airline's Website, confirms the user's reservation, and "prints out" the boarding pass on the user's mobile device (by displaying the barcode on the user's mobile device screen), which the user passes under the barcode scanner at the airport gate).

Magazine subscription renewals (In embodiments, the user scans a Net Dotz barcode on one of those annoying renewal postcards that fall out of magazines. The user then receives the Tilz for subscription renewal, which can be auto-filled and sent back electronically); Coupon usage reminders (Any coupon scanned can be automatically utilized when shopping or even set to remind the user via a calendar (or other type of) notification when a coupon the user has scanned is about to expire).

Unique missed demand tracking (Barcode Widge provides retailers and manufacturers with information they've never been able to track before. Missed demand. Missed demand is defined herein as the case when there are no more remaining of a particular item on a retailer's shelf, and consumers come to the shelf hoping to purchase that particular out-of-stock (or simply empty shelf) item. For example, let's say a user goes to a grocery store to purchase two-liter Diet Coke, but there are none on the shelf. The user could then scan the barcode on the shelf edge item label and if the store has Barcode Widge running on WiFi, the user could thereby check the storage room inventory wirelessly (without having to wait for a store employee to check for that item). And if there are none in storage, a question pops up on the user's mobile device: "How many 2-liter Diet Cokes would you have purchases today?" This is the "missed demand" that has never been trackable before. Barcode Widge then can surface this missed demand data (for free or for a fee) to the retailer and the manufacturer of the item (and other entities) (and Barcode Widge can collect data across thousands of stores and provide aggregated analytics and comparative data (such as Pepsi's missed demand data, compared to Coke's). The users benefit by getting not just a rain check for Diet Coke, but also the users get paid to submit this missed demand data. The store can also set quantity limits via the Tilz rain check. Everyone wins: the user gets a rain check plus an iDough (Facility 7) payment, the grocery store can do a better job of stocking and ordering, and Coke's bottlers and distributors get crucial manufacturing and delivery data. Also the user's shopping/loyalty club profile is automatically updated with missed demand data (in addition to the conventional actual purchases data).

Users get paid to share their shopping profile. Users own and control their shopping profile. Users who scan their purchase items, or receipts containing a barcode with data about all the items purchased, create the shopping/loyalty club profile that are usually individually created such as via the Safeway Club Card. Users get paid by Safeway to share their shopping profile which contains better information than before because it can (at the user's option, and for a higher fee to the user) contain shopping information from other grocery stores, and all other online and offline shopping that the user does.

Easier to add electronic devices to Internet protocol (IP) networks. In embodiments, the user simply scans the barcode of the new electronic item and the profile (Tilz) of that item is sent to the wireless hub and it will autoconfigure itself onto the network (via the user's computer or mobile device). For example, instead of having to type in the item's make, model number, and serial number to register it (and for warranty purposes as well), the user simply scans its barcode. In this manner items such as a wireless speaker will be added to the user's surround sound receiver. Or pair the user's Bluetooth headset to the user's mobile device by scanning the barcode of the headset, the Sorto (Facility 8), which receives the resultant Tilz, queries the user if the user wants to pair the two devices.

Users get paid to accept complimentary device ads. As per a user's Ad Widge (Facility 1) profile, users can choose to accept to accept ads for other items related to an item the user barcode scans. For example, if the user scans the barcode for wireless surround sound speakers to be added to their TV. Or pair a user's Bluetooth headset (for their mobile device) by scanning the (Net Dotz) barcode of the headset, then Sorto (Facility 8) asks if the user wants to pair the two devices. The user could be paid to accept ads, for related/competitive items to the items whose barcodes they just scanned—for instance, for a pair of headphones or a set out outdoor speakers.

Creating "resumes" or lifetracks. Users can utilize a mobile device to scan barcodes, and VictorsList (Facility 18) to capture and share the resultant lists of such items as sorted (Sorto Facility 8) into logical groups or resumes or lifetracks. For example, a user's wine "resume"—all the wineries visited, wines tasted, including wines at restaurants and at home. For each barcode scanned the user receives a Tilz of that item that Sorto sorts into the appropriate resumes or lifetracks. Other examples include: restaurant resume—restaurants eaten at; climbing resume (add to it by scanning the barcode at the top of the peak in the summit canister)—a list of peaks "bagged" or climbed; hiking resume—barcodes on trailposts at all junctions and trailheads), enables users to track and receive trails hiked, high resolution topographic maps, stock photos of the trails, other user's photos of the trails, the user's photos or video shot during the hike, user diaries made on GPS-enabled mobile device during the hike, etc.; camping resume—campgrounds stayed at. Etc. etc. ad infinitum.

Resumes, lifetracks, and VictorsLists means users get paid. A wine resume, or Wines Tasting VictorsList (Facility 18) created by scanning the bottle or Net Dotz barcode (Facility 27) next to the restaurant's wine list item, creates a list which others may wish to subscribe to (or follow). The user can rate each wine tried. The user can charge a fee to allow others to subscribe to or otherwise follow their Wines Tasted VictorsList.

Realtime product information. The user scans the barcode of any item in a store (or anywhere else, online or offline) and receives a Tilz that will track information about that item in realtime. For example, let's say a user is remodeling their home, and finds a bathroom faucet set they like. They can scan the barcode of that item, and a Tilz (Facility 30) is instantly delivered to their mobile device with information about that faucet set. Such as: manufacturer, price, retailer, in-stock or backlogged, current lead order time estimate, (in)compatibility with other products (with particular regard to the user already owns, or scanned in connection with the remodeling project), warranty information, etc. All this information will be automatically updated so the user has the best data available as the time to place the order draws near. Reduces the common problem of finding an item the user likes, then ordering it a few weeks later, only to discover that the two week backlog has grown to a six week backlog between the time the user first found the item and the time they actually ordered it.

Order scheduling. Users can create prioritized lists of items that have a dependency upon other items that need to be ordered. For instance, as per a remodeling project, users might need to order (or at least pick out) all their appliances before custom cabinets can be ordered. The user scans the barcodes of all the items they need to order for a particular project. Users receive a Tilz with information about each item. Users simply place the Tilz in a particular order for that project "deck" of Tilz and Barcode Widge can alert the user when ordering dependencies require the user's attention.

Discount cards. Many stores have a "But 10, get 1 free" (or similar) incentive policy which they track via a small credit card-sized rewards discount card that they stamp or punch each time the user makes a purchase. For those vendors who wish to enter to the 21st century this could be accomplished much more elegantly and easily via barcodes and mobile devices (Mobis). The store simply places a barcode for their "Buy 10, get 1 free" promotion on the checkout area, which the user can scan with their mobile device. Barcode Widge automatically tracks all the user's purchases and alerts the store and the user when the free item has been earned. This also applies to multi-store discount cards, such as the Taste Napa Downtown card. Users purchase the card for $20 and get discounts on tastings and purchases at 10 downtown Napa wine tasting rooms. At various locations, cardholders get the initial taste for 10 cents. Each tasting bar, however, defines "initial taste" differently. Some pour the first wine for a dime and all other pours at the regular price. At other tasting rooms, the first taste might be a flight of several wines. This example complexity can be minimized via the use of Barcode Widge and a virtual Taste Napa Downtown card Tilz (Facility 30) stored on the user's mobile device (Mobi). The Tilz tracks the tasting at each location by having the user scan a barcode at each tasting room. In addition, if the mobile device is GPS-enable, it can direct the user right to each of the 10 tasting room.

E-arrest. It is expensive and time consuming for police departments to arrest (large numbers of) protestors at political rallies. Barcode Widge provides a new type of electronic arrest that saves both the police department and the arrestee time and effort. The police officer simply scans the user's drivers license, and takes the arrestee's electronic fingerprints (or just thumbprint) with a bioscan display on a (Mobi) mobile device Arrestees then receive a court summons via email or Tilz, to either pay a fine or appear before a judge.

Barcode or Net Dotz (Facility 27) scanning drives demand for Tilz (Facility 30) and Galaxz (Facility 5). IPv21 (Facility 25) Internet protocol (IP) addresses may be in demand as the world switches to devices with barcode and or Net Dotz scanners and users utilize barcodes to scan dozens of items each day. Every item has its own Tilz, and groups of Tilz will get their information from the master Tilz, located at the profile parking site Galaxz (Facility 5). For example, let's say a winery sells 10,000 bottles of wine Each bottle gets a unique Tilz, but the master Tilz, with the latest drinking timing information or offers to bottle owners, lives at Galaxz, making it easier for the winery to update a single Tilz (their master Tilz). Barcode Widge can assign a Net Dotz to all non-Net Dotz barcodes it scans, if the owner of those barcodes so chooses.

Sales analytics. Barcode Widge can track the try vs. buy ratio for various barcode- or Net Dotz-equipped products. For example, running shoes at athletics stores may be equipped with barcodes. Users scan the barcode of each pair of shoes they try on. And if they make a purchase, they also scan the barcode of the shoes they bought. Both the retailer and the shoe manufacturers could purchase the data from Barcode Widge to try to improve their conversion ratios. Barcode Widge may also send the data to the use's mobile device so users have a record of which products they sampled. Barcode Widge analytics facility find patterns (such as aggregated try/buy ratios per product), in consumer usage data, and may also make inventory management recommendations to stores to enable them to quickly adapt to changing customer demand.

Looky loos. For example, customers who venture into stores but rarely buy anything (though scan lots of items)—have a low conversion ratio. Salespeople via a user's CloudCast (Facility 23), could thereby know to avoid these people. Customers' CloudCasts could also detail exact or rough data regarding past purchases related to that store, giving store personnel a heads up on which customers to focus on, and what items to show them.

Barcode or Net Dotz checkout—users get paid. A user scans items as they add them to their shopping cart or basket in the store. Subtotals are constantly displayed, on the user's mobile device so the user doesn't overspend. In embodiments the Barcode Widge recommendation engine suggests additional items based upon current cart items and past buying habits. Users get paid to accept third-party product recommendations while they are in the store shopping. For example, a notification such as "It appears you are purchasing Heinz ketchup, how about some French's Mustard Dijonaise to go with it?" might be presented to the user.

Marketing analytics—users get paid. Users are incentivized to scan, for instance, all food items they purchase and then users get paid to optionally make that VictorsList (Facility 18) available to advertisers.

The Barcode Widge Website—For users, the Barcode Widge Website becomes the cloud site for any of their barcode-created lists (which will be ghost-hosted by via VictorsList (Facility 18)) or Tilz (which will be ghost-hosted via Galaxz (Facility 5)). For businesses the Barcode Widge Website becomes the place where they add barcodes and/or Net Dotz to their business/products. For example, a restaurant wanting to add barcodes or Net Dotz next to each menu item, can go to the Barcode Widge Website to request registration of the barcodes (via IPv21 Facility 25) and Tilz for their new menu. New menus with barcodes/Net Dotz can then be printed, or the restaurant can just print Net Dotz stickers to manually stick onto their existing menus. Customers keep the menu Tilz on their digital device after they leave the restaurant. And this Tilz is (constantly) updated with any specials. Finally the user can order take-out from the Tilz, and the user gets paid to receive coupons/offers/information.

Barcode ads—users get paid. When a user scans, say, a wine bottle, a Tilz ad for wine cellar software or a wine blog pops up (if the user's Ad Widge (Facility 1) profile allows)—and the user gets paid.

Replace expensive, handheld inventory devices with inexpensive Mobis running Barcode Widge, including mobile devices that don't require monthly service from a wireless carrier.

Front-facing scanner. In embodiments fingerprints can be scanned as the user presses their thumb (for instance) on their mobile device screen. And/or, in embodiments, scan the user's iris (an eyeprint) via the front-facing camera. In embodiments, fingerprint scanning via contrast stick-ons enables improved fingerprint scanning. Thin nearly transparent graphene stick-ons, which create greater fingerprint whorl contrast to enable the barcode scanning facility to scan the fingerprint as if it were a barcode.

In embodiments near-infrared frequency is utilized in preference to conventional laser-based barcode scanning technology. Near-infrared can be utilized to scan barcodes and Net Dotz. And can scan the much smaller Net Dotz 2.0. Also near-infrared can be utilized to perform biometric scans: fingerprint scans, palm scans, iris scans, etc. Near-infrared is a lower power alternative to laser-based scanning. Barcode Widge's near-infrared technology can also be utilized for data transmission, primarily, but not limited to, peer-to-peer, device-to-device and machine-to-machine (and other) data transfers (in preference to, for instance, Bluetooth or WiFi).

A→B Connect. "A→B Connect" aka "AtoB Connect" or "A2B Connect" extends the reach of the barcode beyond the initial barcode scan. If a user interacts with item A via barcode (or Net Dotz or other), Barcode Widge can alert the user, when the use comes across related item B in the real world (or online). For example, let's say a person purchases a WW II army helmet at an antiques store, wherein the helmet barcode is scanned. Barcode Widge, for instance, can alert the user when they are in Europe and are near a town where a battle was fought where soldiers wore those helmets. Another example: If a user scans the barcode of their artwork (paintings or prints or sculptures, etc.) Barcode Widge can alert the user when the user (traveling, say, through Europe) happens to be in the village where the artist lived or near the pond that appears in one of the user's paintings. The user, via Ad Widge (Facility 1) or Coupon Widge (Facility 3) gets paid to accept offers for related items. Another example: If a user owns a touchscreen mobile device, they may spend time cleaning the fingerprints and smudges off the screen. Stores pay users to let the user know, via Barcode Widge, that the store carries screen cleaning cloths; Or when the user is passing near a store that sells screen wipes; Or near a person who has a packet of cloth wipes that they are willing to give or sell to the user.

With Barcode Widge the Web is really like a spider web. Spiders spin a web and wait for prey to fly into it. Similarly, stores can scan their inventory (via Barcode Widge) into their ComCloud (Facility 23) and wait for users to pass by (literally in the real world, or figuratively online) with profiles indicating a need for an item the store carries. Cloud retailing.

Users need a way to better interact with the real world. And barcodes may be one of the primary means. Barcode Widge's IP-based technology that delivers Tilz when a barcode is scanned, opens up a whole new world of possibilities. Barcode Widge helps transform objects into items that uses can interact and transact with. Users not only get better information about objects, but get paid for obtaining such information. For instance, users get paid to receive ads or offers for complimentary or competitive items. When a user purchases an item, they scan their receipt or the barcode on each item. Barcode Widge then automatically registers that item ensuring full warranty coverage for the user. Got a question about how to use an item? Just scan the barcode and Barcode Widge will grab the product manual Tilz for that item, or even connect the user to the product support chat forums. And if that item needs repair, just scan the barcode and Barcode Widge will deliver Tilz of repair personnel or shops, including bids to perform the repair. And when the item is nearing its End of Expected Useful Life (EOL), Barcode Widge users get paid to receive ads and offers to replace that item. Diet monitoring. Magazine subscription renewals. Missed demand tracking. Shopping profiles. Creating lifetracks. Realtime product information. Order scheduling. Discount cards. Sales analytics. Barcode ads. Cloud retailing. The uses for barcodes are virtually unlimited and Barcode Widge may be powering a plurality of those uses and a plurality of those transactions.

Facility 32

Payment Management Facility

5132

In embodiments, a module that facilitates payment management (hereafter "Pay by Widge") is provided. Pay by Widge has a number of novel features and uses, and is compatible with Mobi's ComCloud commerce communications network facility 5123 (Facility 23).

Credit card payment systems are designed to make money for the credit card companies and banks that issue the credit cards. Pay by Widge, however, is designed to make money for the user. The mobile device as electronic payment vehicle is ushering in an age when users start to move away from physical credit and debit cards, and toward electronic versions of same. And ultimately, the need for middlemen to transactions will diminish (middlemen=any entity other than the buyer or seller to a transaction). Users can make electronic payments, for instance, by electronically moving money from their bank account to the merchant's bank account—directly—without need for middlemen. And banks can offer credit terms to users on a purchase by purchase basis—and can make informed decisions about credit offered since banks have, in some circumstances, a direct view of the user's actual money status (including visibility of the user's money in that bank).

Pay by Widge is designed to make money for users. Tapping into users' frustration with credit card companies' current offerings and fees and interest rates, users may be more open to an alternative. Pay by Widge is a payment transaction manager. Pay by Widge seeks out the best payment method, for that user for that transaction. In embodiments Pay by Widge utilizes various communications modalities, but leans toward modalities that best serve user's interests. Point of sale (POS) payment hardware providers have a vested interest in modalities that ensure their continued relevance, especially those modalities that tie merchants and consumers to expensive POS payment hardware that every merchant must purchase for every POS station in their establishment. The forthcoming mobile handset (Mobi) obsoletes the need for cash registers in general and credit card swipe (or other) machines in specific. Furthermore, Pay by Widge intends to facilitate payment transactions in emerging market countries where it may be economically infeasible to consider solutions that involve expensive/unnecessary hardware.

Pay by Widge enables users to utilize a wide range of payment types for any given transaction. Pay by Widge acts as the broker between users and all their various payment modalities, configuring them for utilization via mobile device (or other device). And as broker, payment modalities can bid in realtime to be the modality of choice to make a specific purchase. "Paid search" meet "paid payment." The user gets paid two ways: first, for example, by the payment card (or other) company (to be the payment processor for that transaction); and secondly by the advertiser (for the user's purchase information—by knowing the item, advertisers can, for instance, pay the user to receive ads related to the item). For example, Bank of America might really want a user to utilize that user's Bank of America debit card, and thus offer the merchant and user, say, 10 cents each to use it, for a particular grocery transaction.

Users get paid to allow companies to bid on purchase information. The user may set their own price to make purchase information available. As per the conventional art, a middleman search company, for example, is paid by advertisers to guess what a user might purchase. Instead, with Pay by Widge, advertisers pay users for actual purchase data. The Pay by Widge model is better for both users (who get paid) and advertisers (who get better information). It should be noted that not only do users get paid, but also ecosystem partners get paid. For example, if a user needed a white board for a presentation, and the meeting room didn't have one available, someone else in the office complex may have a white board they'd let the user have for a few hours for, say $20. After paying fees to ecosystem partners, that's around $15 net to the entity that loaned the white board, that that entity wouldn't otherwise have made. If this was a Pay by Widge transaction, then out of the $5 in fees $1 might go to Motorola (the mobile device manufacturer), and another $1 to Verizon (wired or wireless), whose device and network, respectively, facilitated the transaction (such transaction fees will revolutionize device and network provider company business models).

Wireless payment management software for IP (and non-IP) digital devices. Users can pay via mobile device, TV, gaming rig, or any other digital device. Pay by Widge users can pay via Bluetooth and/or RFID, among a plurality of other communication modalities. Pay by Widge payments can be effected by a plurality of processes, including scanning the barcode on the back of a user's credit card to enable Pay by Widge; the user then scans the back of their driver's license to authenticate the user; then the transaction payment information (Tilz) is transmitted wirelessly to the store's server or POS machine which completes the transaction and transmits the receipt (Tilz) to the user's device.

Mobile bill payment. For example, a user's gas/electric bill arrives in the mail and the user scans the Net Dotz barcode on the bill. A Tilz is returned to the user's mobile device asking if the user would like to pay this bill now or set a later date or pay via iDough (or other means).

Users can "hand" transactions to one another. For instance, if a user wants to purchase dinner for a friend and his wife, then the user can do so by a plurality of means, including but not limited to, handing them a physical device (one of the smaller Mobi embodiments or other device); or by a flicking motion with the users mobile handset to thereby flick/transfer the transaction to their mobile device; or simply send the transaction (Tilz) to the recipient's ComCloud (Facility 23). If, for example, a user purchased a movie ticket online, and the afternoon of realizes that they won't be able to make it to the theater, the user can change their ComCloud status to indicate a desire to sell the ticket (the transaction) to another user (if the theater makes their tickets electronically fungible or assumable).

Pay by Widge users can take advantage of one-time (single use) credit card numbers, provided by credit card companies. In embodiments, Pay by Widge logs onto a user's credit card site to obtain a virtual account number and use that transaction for themselves or others they transmit it to. A transaction can be limited to an amount, such as $50. Transactions can also be limited by date such as "today only," or "this transactions must be utilized within 10 days." Virtual account numbers is a very underutilized feature of conventional art credit cards. If users utilized Pay by Widge's automatic one-time-use credit/debit card numbers, then it wouldn't much matter if hackers obtained their merchant's account records. Those credit/debit card numbers would no longer be valid. Pay by Widge users could rest much easier.

Spam protection. Users can, for example, both include and/or exclude various merchants from their Pay by Widge profile. This feature enables Pay by Widge to act as a shield against email spam. Email spammers are often motivated to do so in order to facilitate transactions that bring them money. If however, the user's Pay be Widge profile indicates (to the spammer) that the user does not transact with the two or three banks that process the vast majority of all spam email payment transactions, then the spammers might logically be disincentivized to spam that user (a process which takes time/effort/money on their part).

In embodiments Pay by Widge is configured for compatibility with implantable and wearable RFID (as well as other forms of RFID, including IP-based RFID=RFIP=Facility 33). RFID Widge (Facility 33) enables the user to set up various profiles using RFID tags. The profile that the shopper presents to the other party whether in a digital transaction or in-person can be utilized by Pay by Widge. For instance, a user could include their shopping history (VictorsList Facility 18) in their transaction CloudCast (ComCloud Facility 23) and have Pay by Widge monetize that profile.

Transaction identification identifies the user enabling payment without swiping a card. In embodiments Pay by Widge authenticates the user's identity, so the user doesn't need to present credentials, such as their driver's license as proof of identity. Pay by Widge accomplishes this via a plurality of means, including reading the RFID from the user's actual driver's license; or can be authenticated via (RFID) passport or birth certificate, then Pay by Widge presents those credentials electronically during the transaction.

Balance credit risk. With Pay by Widge credit card companies can continuously in realtime, balance their credit risk portfolio. For example, banks can take on more high quality transactions, for lower fees; or perhaps move toward higher risk transactions with higher yield. With Pay by Widge credit card companies can not only offer different interest rates for different users, but also offer different interest rates for various transactions by the same user. Credit card companies can start to change their thinking entirely: from a portfolio of customers, to a portfolio of transactions. Each transaction is its own entity—each with its own interest rate, repayment terms (such as immediate, 30 days or revolving), and associated credit risk. Transaction bundle syndication: credit card issuers, for instance, can swap bundles of transactions with each other to balance their portfolio of transactions. And Pay by Widge can help users manage and balance each user's portfolio of transactions, and perhaps help users engage in swaps with other users.

DirecPay. Pay by Widge includes a number of other unique capabilities and features such as DirecPay. DirecPay utilizes ComCloud (Facility 23) to help minimize transaction fees and speed up payment for all parties involved. For example, if User A is paying User B some money owed, then before the money is transferred into User B's account, Pay by Widge queries User B's ComCloud. If there are any outstanding balances, then a portion of the monies can be paid directly to Vendors X, Y and Z and only the net balance is then sent to User B. Such transactions only take place in accordance with each user's profiles, and users would have to opt-in to features such as DirecPay.

Pay by Widge brings true innovation to the staid credit card industry. Pay by Widge presents users, merchants, payment processors and banks with a host of new features as well as improved security and usability. Merchants can benefit from lower transaction costs. Credit Card companies and banks can add a new business model: portfolios of transactions in addition to their portfolio of users; and balance their credit risk by trading bundles of such transactions. Users get paid to choose from the wide array of payment modalities, for any given transaction, and get paid to make their purchase data available to various marketing agencies and product manufacturers (and other entities). Current payment systems were designed for and by credit card companies and banks. Unfortunately, they seemed to lose sight of the fact that the two most important parties to most transactions are the merchant and the user. Pay by Widge corrects this oversight. The merchant can glean user purchase data that goes far beyond their traditional loyalty shopping card. Users can reveal some or all of their shopping history to a store (or other entity). This shopping history (VictorsList Facility 18) can include all shopping from all stores online or offline; which is a much more comprehensive view than that which stores, such as Safeway, have relied upon utilizing their Safeway Club Card. Users can make this information available to the store (or other entity) for free or for a fee. Furthermore, users can make their shopping history as well as future shopping intentions available, not just to retailers, but also to advertising/marketing companies and product manufacturers; and get paid to do so. This is unprecedented information that may transform hundreds of industries that rely today upon guesses from expensive analytics systems, but tomorrow, via Pay by Widge, from actual realtime information regarding product purchase or usage data. Pay by Widge informs key decisions, such as: How many items to produce; Where to ship and store them; Where to distribute them from; Shipment timing to retailers; Retailers stocking strategy; etc. etc. Decisions profoundly shifted with Pay by Widge's much more complete and realtime datasets.

Pay by Widge unlike other payment systems is universal. Pay by Widge supports person-to-person and peer-to-peer payments as well as utilizing existing banks, credit cards, debit cards, etc. Pay by Widge can utilize but doesn't require a wireless service provider. Charging purchases to phone bills is fraught with risk (an idea some wireless providers are considering implementing). What happens when a user purchases a pair of jeans, and charges them to their phone bill, but then doesn't pay their phone bill that month. Can Nordstrom or the Gap repossess those jeans? Do Nordstrom and the Gap get paid by the network carrier in advance, and thus the network carriers become financial institutions that in effect loan money to users each month? (like credit cards do). And if so, which government agency then get jurisdiction over these new "financial" institutions? Besides there's no need for such a "feature." With Pay by Widge users receive a Tilz (Facility 30) receipt for each transaction, so listing a shoe purchase on a person's phone bill is quite unnecessary (and costly since carrier billing simply means additional transaction fees tacked onto each purchase). Pay by Widge's virtual account numbers that differ for every single transaction may be more secure than conventional art credit card- or debit card-based payment systems or even PayPal (and others) that rely upon credit cards and debit cards and bank account numbers for their transactions. Pay by Widge has far greater security via transaction identification and authentication. And finally Pay by Widge has other unique features such as DirecPay that save the user time and money, by offering the option of paying the user's creditors directly.

Facility 33

RFID Technology Facility

5133

In embodiments, a module that facilitates Internet Protocol (IP)-based RFID (hereafter "RFID Widge") is provided. RFID (radio frequency identification) can be utilized as another new way to efficiently acquire analog (and digital) data and interact and transact in the real world, revolutionizing merchandising. RFID Widge develops the hardware and software for mobile devices to interrogate RFID-equipped objects (and other things). RFID Widge develops RFID merchant hardware and software. RFID Widge extends the RFID protocol to RFIP: IP-based RFID by embedding into the RFID tag the IP address where more information about an object (or other thing) can be found, which upon interrogation returns data "tiles" (or the homonym data "Tilz" (Facility 30)). RDIF Widge users can thereby interact with the offline world.

Revolutionizes merchandising. In embodiments RFIP replaces price tags and end cap price labels. End caps for each item in stores can contain an RFID tag, so that stores for example can re-price all their items, with a mobile handset (Mobi), without having to manually change the price tag at the shelf. RFID Widge enables stores to offer different prices for different users for the same product, and can be utilized to make customized offers or coupons available to users as they pass by an item. As users stroll through stores information about that item can be CloudCast (Facility 23) to the user, as per each user's profile. All prices in a store can be changed en-masse, from any mobile device or remotely from headquarters via RFID Widge.

Nomenclature: an RFID tag is an integrated circuit attached to an antenna (typically a small coil of wires) plus some protective packaging. An RFID reader or interrogator is a radio frequency (RF) transceiver controlled by a microprocessor or digital signal processor. The RFID reader, using an attached antenna, captures data from the tag, then passes that data to a computing device for processing. Passive tags: some tags have their own power source, passive tags do not. With a passive tag, the RFID reader transmits an energy field that "wakes up" the tag, and provides the power for the tag to respond to the reader. RFID Widge enables users to utilize mobile devices (such as cellphones) as wireless encoders for (as well as readers of) RFID tags. That is to say, mobile devices can be utilized to change the data the RFID tag contains.

Information can be "sent" from RFID tags. As users stroll through stores, information about items can, as per the user's RFID Widge profile, be transmitted to the user's mobile device (or other remote or local device). At which point the user could, among other choices, choose to add this item to their cart, or check for coupons (Coupon Widge Facility 3), or get paid to receive ad and offer for competing items (Ad Widge Facility 1). As users who want to follow certain dietary guidelines pass through grocery stores, or read the menu at a restaurant, their dietary program/doctor can make transaction recommendations. And dietary programs or doctors may receive commissions for executed transactions thereupon. Product label ingredients can be CloudCast (Facility 23) via RFID (or Bluetooth or via Net Dotz) to alert shoppers wanting to increase intake of (or avoid) those ingredients. For instance, an alert notifying the user that the sodium level, per serving, is too high for this product.

Though RFID suffered from accuracy limitations as an inventory tool, it is highly suitable in social networking and consumer retailing (and other) environments. And costs for RFID tags are expected to approach the 1 cent each tipping point. RFID may be deployed into new environments such as coffee shops to transmit that day's specials and show prices for merchandise. And since all information is IP-based it is realtime accurate, can be multimedia, and be customized for every individual user. For example, a customer walks into Starbucks for a cup of coffee, and their profile allows, Starbucks pays the user to send coupons for Starbucks products for sale (such as t-shirts, CDs, coffee, coffee mugs, etc.) via RFID and customized for each individual. Furthermore, RFID Widge also (uniquely) enables Bluetooth-equipped, and WiFi-equipped, and infrared and near-infrared-equipped (mobile) devices to interrogate and encode RFID/RFIP tags. Thus users could leave a message, for instance, for their friend on a coffee cup for sale at Starbucks, saying, perhaps: "You ought to get this coffee mug for your sister!"—a message that only the intended recipient can receive, when that user, for instance, enters that particular Starbucks. Thereby massively expanding the number of business and social applications of RFID almost instantaneously.

Many mobile devices will have an RFID chip in them. Thus RFID can act as offline cookies, transmitting user profiles to all objects and people in range. For example, car seats adjust, automatically, to that user's settings; the user's shows and/or commercials play on the TV/radio; transaction identification (identifies the user via RFIP in the mobile device. RFID Widge technology is configured for operation on other devices and objects, as well.); Online credibility (RFID Widge CloudCasts (Facility 23) a user's Web Cred (Facility 19) profile); Theft prevention (ignition interlock in a user's car until authenticated ID cookies are received); RFIP phone calls (use RFIP to select whom a user is calling. A users interrogates RFIP tags on pictures or products (or other things) to bring up the Tilz for that person or corporation, and then the user Tilz-dials, connecting them to that person or company); Geo-spatial location (tiny, RFIP-equipped Survey Nuts (Facility 38) that perform 3-axis triangulation and realtime measurement. This technology may become increasingly important as users begin to engage the real world via motion-based gestures to interact and transact with people and objects).

Such non-mission critical social and consumer applications and services are a new use of RFID technology—that RFID equipped mobile devices enable. And mobile devices that are RFID equipped may utilize a new type of infrared or near-infrared-based RFID technology (developed by RFID Widge). For example, IR-LEDs (infrared light emitting diodes) on a chip, can act as the antenna transmitting and receiving the RFID tag information, as well as scan barcodes (a new class of non-laser-based barcode scanners). IR-LEDS can scan barcodes and read RFIDs down to 0.01 mm×0.01 mm Accordingly a combined barcode and RFID is desirable. RFID Widge's RFID Fusion technology, which combines elements of barcode and RFID technology, in a materially smaller form factor, is thusly disclosed. Additionally, a reduced-power consuming, amalgamated, barcode/RFID reader facility, suitable as an optional module for mobile devices and other devices, is also disclosed.

Metrics: Try vs. Buy. RFID Widge can monitor, say, shoes tried on at a running store before the customer purchases.

RFID helps stores identify looky loos, which are users who shop, but don't purchase much; so salespeople can avoid wasting time with them.

RFID checkout. Items are read and priced via RFID by checkout station mobile device or point of sale (POS) machine.

Reduce lost luggage. With RFID Tags, luggage is constantly being read by hundreds of RFID readers all over the airport and on airplanes, as well as compatible mobile devices (Mobi) by airport personnel and passengers. It would thereby be almost impossible to lose luggage.

Radio frequency, telemetry information. Telemetrics and telematics. Appliances monitor their vital signs and send their data when read by an RFID-equipped mobile device (Mobi) which then transmits the information to the user's profile and, if the user wishes, the appliance manufacturer (and/or other entities).

Realtime product information. With RFID Widge users have instant access to a great deal of information about a product that is CloudCast (Facility 23) via RFIP as the user walks by, including such information as: Name of the manufacturer of that product. Price. Retailer(s). In-stock or backlog. Current lead order time estimates. (In)compatibility with other products. Warranty information. etc. The telemetry information can also include realtime analytics, such as "missed demand" tracking that enables retailers and manufacturers (and other entities) to see on a city, state, national, or global scale Dynamic Demand Maps—revealing hot spots and trends. For example, if there are a lot of 2 liter colas being purchased in one spot, it might show a green bloom, but if there are a lot of missed demand instances, it may show a red bloom—where sales are bleeding away. Data visualization and information architecture services are also offered by RFID Widge (and other Mobi facilities).

Order scheduling. Users can create prioritized lists of items that have a dependency upon other items, such as cabinets cannot be ordered until appliances are ordered (thus sizes are known).

Social networking. Via RFID Widge (and other Mobi facilities) users can leave messages that can be picked up by other users (as per profile match) via RFIP; among many other profile viewing, sharing, messaging, applications.

Fleet updates. Users can update thousands of items simultaneously, simply by changing the information stored at the IP address (the master Tilz) for those thousands of tags.

Mini-CloudCast centers. Because IP-RFID (RFIP) tags use frequencies that mobile devices have tuners for, they can, in effect act as mini-CloudCast (Facility 23) centers for the items they are tagged to. This is true even though the RFIP tags are not (actually) CloudCasting any information—instead relying on the mobile device to retrieve the information. But from a user's point of view, it may appear as if the information is emanating from the RFIP tag or RFIP-tagged object (or other thing). For example, can be utilized on retail shelf end caps, so that each individual item on the shelf does not necessarily need an RFID tag. The RFID-tagged end cap can contain the IP address for the items at that shelf location. And the barcodes which are cheaper to place on each item, can be utilized for the item purchase transaction instead. RFIP has the advantage over barcodes of being able to "reach out" to consumers as they pass by an RFIP tag, something a conventional barcode cannot do. With a barcode the user must pass their barcode scanner purposely in close proximity to the barcode for the barcode to be read. RFIP can passively send the user an ad or coupon for the item on the shelf as the user walks by—by having the user's RFIP tuner-interrogator switched on and open to receiving such communiques. And by utilizing other communication modalities, such as WiFi users can theoretically be miles away and still receive the RFIP "CloudCasts" (and global reach is possible via other Internet-related means).

Extend bricks and mortar stores to the cloud. In embodiments, if a user in a store is walking past an RFIP end cap, and the user's profile allows competitive ads (but the store does not carry that competitive product), RFIP can broker a deal with the competitive product maker (if the user's profile allows such actions), to have the bricks and mortar store receive a commission on this purchase now made via an online site for an item the store did not carry. For example, let's say a user were at Home Depot shopping for a Honda lawnmower, and via RFID Widge receives a competitive ad for a Sears Craftsman mower for $100 less, including free shipping. With RFID Widge Home Depot may get paid a commission on this transaction. This is revolutionary for retailing. Stores can start getting sales commissions for products they don't even carry. Alternatively, the store gets paid when a user into one store, gets educated by a great salesperson, then buys that item at another store for a lower cost. The user can accept an RFIP popup acknowledging that the great salesperson should be paid for their time via mini-commission on the sale that takes place at another store.

Reverse cookies (My Cookiez Facility 26). RFIP is configured for compatibility with My Cookiez and ComCloud (Facility 23) which CloudCast a user's profile as they, for instance, walk through a store, indicating which items the user is open to receiving communiques from, as well as which types of communiques. For example, Crest toothpaste coupons? Yes. Colgate competitive ads? No. That is to say, RFIP can be utilized to make a person, object, store or other thing, aware of the user's preferences (and other things).

E-bulletin boards. Instead of the ugly, cluttered physical bulletin board "technology" that has been around for a very long time, users can leave their notice or ad or bulletin via RFIP. In embodiments, they can shake their phone (to "post" such a notice/ad/bulletin) at the virtual bulletin board (which can be an actual video screen or, for instance, nothing more than the doorway to a store—a doorway that has a ComCloud CloudCast). As other users pass by, their mobile device (or other device) may alert them to Tilz of interest and grab them automatically. Sorto (Facility 8) then asks if the user wants to act upon the information immediately. RFIP can also be utilized to replace the need to physically swipe a credit card to pay for a transaction. And RFIP can be utilized as an alternative to various payment systems. Additionally, credit card stickers on store windows that have an embedded RFIP tag in them, can be utilized by RFIP Widge to notify those payment companies that the user has entered this particular store (if the user's profile allows this) and ask those payment companies to prepare to bid on being the preferred method of payment via Pay by Widge (Facility 32) for this transaction at this particular store.

Mobile device RFID tag information hosting. The information (Tilz) that a user receives when accessing the RFIP address, can be hosted on a mobile device (no need for a dedicated server or Internet Service Provider (ISP) service.) The store could type the information in a simple document or spreadsheet, for example, on their mobile device. Users could access that Tilz via WiFi or even Bluetooth. Simpler is better, and now stores don't necessarily need an information technology (IT) person to implement such a solution.

Users get paid for information regarding household items. A user can place an RFID tag under a countertop and sell the information regarding who designed the kitchen, who supplied the cabinets or appliances, the name of the installation contractor, etc. and if a guest later purchases one (or more) of those items, the household owner gets paid a commission on that sale.

Users get paid for self-serve RFIP tagging. RFIP Widge includes solutions for individual users and businesses to place RFIP tags on items, then host or link to the content. For example, one of the most enjoyable features of a good bottle of wine is the story told by the winemaker at the winery where you bought it. The user can place RFIP tags on each bottle in their cellar or wine fridge, which can then link to a video or audio file of the winemaker describing the wine, the vintage, the harvest, special features, etc. The RFIP tag could also link to other wine critics', sommeliers', or oenophiles' descriptions about or comments on that wine. Additionally users get paid in other ways as well. Wine buyers could offer to purchase that bottle from that user. And via the RFIP CloudCast the winery that made that bottle of wine, or even competing wineries could make offers to that user, for other bottles of wine. Restaurants with that wine on their wine list could present a coupon or special offer to that user good at their restaurant. Additionally, guests a user has in their home who want more information about that bottle of wine—receive the information Tilz via RFIP CloudCast, with the user getting paid a commission if those guests later purchase that bottle of wine. Furthermore, let's say a user has a friend who is the Computer Expert friend, who just showed the user how, for instance, to unjam a paper jam in the user's printer. The user is unsure if they'll remember what the user's Computer Expert friend said, so the user records the Computer Expert solution, then adds that paper jam tip to the user's printer's CloudCast, by adding to the RFIP tag information for the printer.

Set engine tune. Engine tune for one's car can be set and controlled via the presence in the car of any RFID capable device, including various mobile devices and Mobis. Thus parents can set the engine tune for Low Performance when their teenager borrows the car; or set the engine tune for Maximum MPG (miles per gallon); or purchase an upgrade from the dealer or aftermarket company for a High Performance engine tune.

Help the blind "see." RFIDs can be utilized to CloudCast (Facility 23) to a visually handicapped person's mobile device virtually all of the information that sighted users can see in any given situation. In addition, can user RFIDs to create various audible frequencies surfaced via a mobile device, that enable visually handicapped people to use echo location to guide their movements. Similar to the work of Dr Amir Amedi of Israel, at Harvard University and the Neurobiology Department, of the Life Science Institute Hebrew University in Jerusalem, RFID can be utilized to create "letters" from sounds enabling the blind to "read" short texts.

Dog tags. RFIDs can be placed on a pet's dog/pet tags. Thus when a user goes on vacation, for instance, the information etched into the dog tag can contain the more updated information, such as the new temporary dog sitters who might be friends or neighbors to that user. RFID Widge enables a person who finds the dog, to discover the correct cellphone number to call—that of the neighbor who is dog sitting—rather than the cellphone of the owner who may be sitting on a beach in Fiji.

Implantable and/or wearable RFID. RFIDs can be implanted subcutaneously (say, in a user's pet), so that the lost pet recovery rate improves. Everyone with a (suitably equipped) mobile device can track or trace a missing dog (or missing child). "Wearable" also encompasses RFID overlays such as a skin patch or graphene fingernail veneers, that a user can utilize to transmit interrogated data, or provide identification information for transactions.

RFID Widge has created technology that enables users to interact and transact with the real world in ways that dramatically improve their life. Users can easily acquire information from offline and analog items and be paid, for instance, to receive ads, offers or information from item makers and retailers. RFID Widge also enables companies to have a one-to-one relationship with their customers, and revolutionizes merchandising. The forthcoming uses for RFID are both profound and nearly limitless. The fact that RFID can "reach out" and interact with the people and objects around it, is truly game-changing. RFIDs ability to CloudCast (Facility 23) an objects' (or person's or other thing's) information may forever alter not just commerce, but also how almost everything gets done. Purchase a new alarm clock and place it the nightstand, and, via RFID Widge, the clock radio's RFID ComCloud reaches out to your digital devices (such as a user's cellphone) to grab the user's Sleep Settings Tilz as well as favorite radio stations etc. that would otherwise have to be manually programmed into the clock radio.

Different prices for different shoppers in stores. All the user information a user wants and needs from an object can be CloudCast via RFID Widge so that the world responds to the user in the way the user wishes. When the user starts preparing a meal in kitchen following the recipe on their digital device, the oven can auto-set itself to the correct temperature and the blender select the proper speed via RFIP CloudCast. The rheostat on light switches can adjust to that user's desired level of brightness according to the user's Web Pref (Facility 20) profiles via RFID Widge. Buy a new printer, plug it in near the user's computer, and the printer not only automatically configures itself (with the latest suitable printer driver) but also installs the print quality profiles, custom to that user (printer drivers can be obsoleted by including such information in the printer's CloudCast). RFID Widge addresses an issue faced by just about everyone: users have to interact with many objects and things all day, and if those objects and things could be made to understand how a user wants them to be configured/act/etc. then a lot of a user's time would be saved each day. RFID Widge is that bridge that may literally make millions of user's lives better, and safer, and just a little bit easier.

Object telemetry information. Object metrics. Realtime product information. Order scheduling. RFID checkout. Social networking. On and on the uses for RFID Widge go. Finally, the machine-to-machine applications for RFID Widge are legion, particularly RFID Widge's proprietary Bluetooth-powered and WiFi-powered RFIP tags.

Facility 34

Multi-Frequency Facility

5134

In embodiments, a module that facilitates multi-frequency management (hereafter "UHF Widge") is provided. UHF Widge provides underlying (network-facing) technology for Mobi and the applications that utilize the spectrum frequencies in the 3 MHz to 3 GHz frequency range (high frequency HF, very high frequency VHF, and ultra high frequency UHF). In embodiments UHF Widge technology informs a better wireless network (via larger numbers of smaller boxes in preference to, for instance, the conventional art large cell towers). This technology will be the basis for a new internodal matrix that directly connects wireless devices such as cellphone with wireless metro boxes. Replacing many of today's larger relay towers. These new metro boxes (Mobi embodiments) are able to transceive both the new longer wavelength and current short wavelength. In embodiments UHF Widge technology also informs a new type of network node box (a revolutionary new hardware design (a cellphone-sized Mobi embodiment) for switches, routers, load balancers, and hubs, and accompanying proprietary node software, that enables the box to gulp data in Tilz (Facility 30)-sized bites, rather than just the conventional art packets, and whose throughput is measured in bytes, not bits).

Future spectrum auctions may include electromagnetic waves that are especially potent in their potential to disrupt the wireless communications industry. They can carry a signal greater distances because of their length—several times larger than some waves utilize today. That means that a new network could cover a country with roughly two-thirds fewer cell towers. And if a new network is being built out it can be done so using multitudinous metro boxes in favor of the large cell towers utilized today.

UHF Widge hardware and software for mobile devices (and other devices) to enables them to take advantage of various current and future spectrum frequencies. Such new frequencies may have very high data traffic ratios, and provide novel ways for parties to interact and transact (in some cases without need for a wireless service provider). Mobile devices should be able to opportunistically utilize any available/proffered spectrum frequency for effecting transmissions and transactions. For example, a user walks into a winery. The winery can beam, via UHF, information to the user's mobile device (Mobi); transmit Tilz about upcoming winery events, wine club membership information, wine tasting notes, etc. Tilz are transactable, so user can sign up for the wine club via the Tilz, via UHF.

UHF RFID. UHF Widge provides tools that enable individuals and businesses to utilize new frequencies in the 3 MHz to 3 GHz range to encode RFID tags (and more specifically RFIP tags, Internet protocol IP-enabled RFID. RFID Widge Facility 33). These include a plurality of social networking, business and consumer widgets.

UHF Widge brokers handoffs among various network options. UHF Widge creates handoffs from one frequency type to another to enable the best transaction environment for the user. Because network carriers get paid (via UHF Widge) for transactions facilitated by their provided network, UHF Widge negotiates with those providers to pay the user to utilize their network. Mobile digital television. Digital TV is forthcoming, however the current topology for same is inconsistent with television on a mobile (location shifting) device. UHF frequency capable mobile devices may in part address this dilemma. A new class of mobile devices (Mobis) that are not tied to a single carrier, are informed by UHF Widge. Such Mobis utilize available/proffered networks on an ad hoc basis, with, in some cases, network carriers offering their network on a transaction by transaction basis—consistent with Mobi's governing leitmotif: Users First.

The size of some of the waves covered by UHF Widge are so much larger than the current shorter waves utilized by today's cellphones that entirely new types of devices (Mobis) may come to market. This live information via single frequency (and other) networks, may have a huge impact on the business world. UHF Widge's traffic shaping platform consists of proprietary software configured for operation on network nodes, from switches to load balancers, which finally, actually, turns the network into the computer.

Facility 35

WiFi Facility

5135

In embodiments, a module that facilitates WiFi management (hereafter "WiFi Widge") is provided. The current networking technology model is decades old. WiFi can be a centerpiece for new ways to efficiently manage the growing volume of wireless data. WiFi may become increasingly important in lightening the cellular network burden, by offloading large data traffic, especially video onto the more robust fiber optic networks. Additionally, phone calls made by devices that lack a wireless carrier facility, but have WiFi capability, can become highly capable phones as WiFi more fully blanket geographic areas. These forces will drive innovation in WiFi-based service, hardware and technologies that WiFi Widge pioneers. WiFi Widge develops the hardware and software for mobile devices to enable them to take advantage of various WiFi variants. In embodiments, WiFi Widge provides non-monthly fee network service applications, such as those for free municipal/corporate WiFi. Providers of the WiFi receive commissions for transactions, via WiFi Widge, that take place on their WiFi signal, thus incentivizing them to provide the WiFi.

WiFi Widge not only powers the increasing use of WiFi networks to lighten the wireless network loads, but also develops software, services and (user-facing) technologies that may power a new generation of networking topologies and hardware. WiFi Widge changes the game for WiFi networks. With WiFi Widge, providers of WiFi networks get paid for the transactions their WiFi network enables. WiFi Widge also enables WiFi devices to interrogate and encode radio frequency identification RFID tags. WiFi-enabled RFID tags mean that users can far more easily interact and transact with the offline world. And be paid to do so. WiFi may the be at the center of all the ads, coupons, and offers as well as information and transaction Tilz (examples of which see other Mobi Facilities) that emanate from every object on earth (subject to protections and preferences afforded by the user's Web Pref (Facility 20) profiles). WiFi Widge powers the car's CloudCast which enables it to interact with the world around it. For example, automobile profiles CloudCast (Facility 23) via WiFi. The car, via WiFi Widge, solicits oil change bids (when necessary). The car, via WiFi Widge, solicits bids for detailing (when necessary). WiFi Widge powered examples include wireless and mobile payments and paid offline search. In fact, WiFi Widge enables lower cost non-carrier-service devices to actually pay for themselves by way of various paid interactions and transactions. WiFi Widge transceives and converts numerous radio frequencies via software defined radio and multi-frequency chips. With WiFi Widge, WiFi is no longer the red-headed stepchild to cellular networks. WiFi Widge WiFi leaps to the forefront, especially for many emerging market countries. WiFi Widge technology is how objects' (passive) ComClouds (Facility 23) can interact even when those objects are on opposite sides of the world (for instance via Bluetooth-powered or WiFi-powered RFIP (RFID Widge Facility 33)).

Facility 36

Transaction Management Facility

5136

In embodiments, a module that facilitates transaction management (hereafter "Motran") is provided. Motran's mobile device transaction platform (MObile, internet protocol-based TRANsaction platform) moves transactions into the digital age. Not just payment transactions, but all transactions. Motran utilizes the mobile device as the centerpiece for transactions. Motran also replaces identification ID cards, company badges, passports, voting machines, stamps, etc. with digital equivalents or improvements thereto as facilitated by the mobile device (or other devices). Motran is intended to be utilized to digitize many different types of transactions—with Motran, users don't need to carry physical currency, users don't need to carry change, users don't need to carry a checkbook, users don't need to use stamps, users don't need to use a parking pass, users don't need to carry a frequent shopper rewards card, users don't need to carry around multiple, credit and debit cards. Motran is intended to replace physical objects necessary today to conduct various and sundry types of transactions, interactions, authentications, and verifications. Motran can also be utilized for transactions, such as hiring a person or executing a contract, where money doesn't necessarily change hands, but wherein Motran provides the legal transaction receipt (Tilz Facility 30). Motran provides discounts and payments from a transaction system. That is to say, Motran saves and makes users money (as opposed to most transaction payment systems which only cost users money).

Motran develops hardware and software for merchant and banking class monetary transactions. Motran develops interfaces for current payment systems. Motran socializes transactions (for example, say a user spent a lot of time putting together a great itinerary for a trip to Ireland: flights, hotels, restaurants, etc. With Motran the user can share this Vacation Transaction with the user's friends, in realtime or asynchronously when one indicates they are headed to Europe in general or Ireland in specific. All saved in a cool Tilz (Facility 30) format. User gets paid; Instead of an online site making money off a user's purchase history being shared, say, with the user's friends, with Motran the user gets paid to allow access to the user's shopping profile, and gets commissions on recommended purchases (shared with friends/others). A referral fee is paid if and when a friend/other conducts a transaction on that recommendation. Motran also has utility for sovereign currencies as they start to experiment with e-currency.

During any Motran transaction (Motransaction) a user's profile can allow for paid challenge. That is to say, competitor products/service can be notified in realtime of a pending transaction and pay the user to offer an alternative (product/service/payment method), which payment, via Motran, the user could utilize to get the first choice provider to possibly lower their price. Such technology is also applicable as emerging market countries start to utilize low cost digital devices to conduct their business/personal transactions such as at an outdoor bazaar.

Motran is barcode (Facility 31), Net Dotz (Facility 27), and RFID (Facility 33) compatible. Motran was designed primarily for mobile devices and can be utilized for non-monetary transactions, such as for secure voting. In embodiments Motran utilizes unique, one-time (virtual) account numbers for each transaction. Motran doesn't require a complex software installation, merchants simply sign up online for the Motran service, and receive the Motran widget (Webified mini software application) for their mobile (or other) device. Motran provides a secure custom MOTRANsaction Website. Network providers receive a commission on transactions that utilize their network. All transactions can occur wirelessly, however if a merchant desires a plurality of alternative/additive modalities are available, such as a briefly plugging a physical cable/cord into a user's mobile device to effect authentication (since each Mobi has an unique IPv21 # (Facility 25), and/or chip defect "fingerprint" ID). Wireless transactions can utilize any available frequency (such as Bluetooth, Wifi, wireless carrier provided network, etc.).

Motran provides the software and backend facilities to enable merchants to implement barcode scanning and/or RFID for their business, such as for transmitting price and product information to customers wirelessly as they shop in the store. This functionality can be hosted on a remote server or store-owned mobile device. Merchants no longer need to be at the mercy of expensive point of sale (POS) systems. Many merchants already have a mobile device (and possibly even WiFi), so they already possess all the hardware they need to effect digital transactions. Motran enables them to leverage their own hardware for a much lower cost of operation. This is especially important for emerging market countries, where the though of having to pay for an expensive POS hardware device (such as physical credit card swipe machine) is anathema. Furthermore, Motran enables merchants to utilize mobile devices (Mobis) to offer custom coupons, and offers, et. al. With Motran merchants act in harmony with their customers.

Select share. Users can choose to share purchase/transaction details with any other person or entity they wish, on a purchase by purchase basis, or category by category, or even all transactions. Users who choose to share data with market research firms and/or advertising (and other) companies, get paid for their profile data. Select Share example: A user chooses to share a particular purchase with her neighbors. If the user purchased a certain plant at a nursery and a neighbor admired that plant, and queried the plant purchase details from the user's CloudCast (Facility 23), then the neighbor receives a discount, and the user gets paid a commission (should the neighbor buy that/similar plant).

The following are examples of items that Motran replaces with digital or electronic versions. E-cards: bank issued credit or debit cards that are non-Visa, MasterCard and/or American Express (Motran enables banks to issue their own credit or debit cards without having to pay processing fees to entities such as Visa. Motran enables e-cards to be issued by institutions and individuals); E-keys (car, house, office, hotel room); E-wallet/smart wallet: replacing many common cards/items, carried in wallets (the mobile phone is here and new payment systems are coming, yet far too many of wallets and purses are filled with a clutter of items whose time has come to go digital. Motran can also provide a backup of most any wallet item or any other Motran item. Motran items can optionally be backed up on a user's devices, or via the Internet to a remote server, or by other means. With physical items, its a hassle to replace them if a wallet is stolen. With Motran anything stolen can potentially be instantly disabled and a new Tilz (Facility 30) issued for each item. Cancelable, replaceable, and instantly usable new Tilz for a user's: driver's license, credit cards, library cards, passport, etc.); E-tickets (the Motran platform can be utilized to write widgets for use by third party companies. For example, movie theaters could create a widge users can install on their mobile devices and thereby facilitate digital payments for movie tickets and concessions, as well as offer coupons and upgrades to individual customers (a frequent user program). A physical ticket to an opera is a dead object. A Motran e-ticket is an ongoing connection to the customer. The Motran e-ticket can be utilized to market additional shows, or next season's tickets; offer individual comps such as cookies or drinks during intermission; solicit donations; extend invites to special one-time events (perhaps a holiday choir performance); cross-promote symphonies or plays, etc. And the user gets paid to accept such solicitations, offers, and ads. Any such offers are made according to the user's Web Pref profile (Facility 20)); Travel card (a travel card is a ticket usable on more than one journey, route, or mode of (typically public) transportation. Travel cards also take the place of permits (such as for a wilderness area hiking trail), and can also be utilized for visas or other travel documents. Travel cards can also be used for priority routing through security checkpoints such as at airports); Identity documents (companies or countries can issue electronic employee or citizen ID cards.); Motran replaces stamps (In embodiments, users simply mail items sans postage. When the item get to the Post Office, the Post Office checks the Motran account for the sender, and debits the appropriate amount. Users can provide their Motran account information in a Net Dotz (Facility 27) they print onto the envelope, or simply print Net Dotz stickers they place on the letter or package. It's the same identifying ID sticker no matter the amount of postage due. Using this method, users agree to pay the cost according to the fee schedule (or otherwise have to have a pre-loaded positive monetary balance in the account). Users then receive monthly statements via Tilz mail or electronic message based upon the weight or destination information detailed by the Post Office in their transaction receipt.

If countries such as the United States are going to entice more than 50% of eligible voters to actually get out and vote, they may need a new modus operandi; and it needs to be easy and convenient, such as via one's mobile device voting widget. Voting via Motran enables new types of "votes," such as for petitions and referendums, that need a certain percentage of the population to get an item on the next ballot. And Motran is equally applicable to all sorts of various votes: including corporate shareholder votes.

In-air airline transactions via Motran. In embodiments, the user scans the Net Dotz of the menu card; or as the cart passes down the aisle the user utilizes the RFID ComCloud to order and pay for the desired food/drink directly from the user's mobile device. And Motran gives users/airlines a choice of payment systems, including utilizing airline miles. The Motran platform engenders cutting-edge uses of RFID as a complete transaction system for merchants and individuals. Click and stick setup: Let's say a flight attendant wants to add a new item for sale to the food cart. Net Dotz stickers can be printed out on an airline printer. The airline attendant then scans the Net Dotz, adds the item description information, takes a photo of the item (if it's not already available as a Tilz (Facility 30) elsewhere), and it becomes part of the orderable menu in seconds. Similarly RFIP tags on the can, say, of apple juice automatically add it to the airline food cart's CloudCast. Users get paid: users get paid to allow ads, to entice them to purchase various food items. Airlines may share in ad or profile income including ads related to shops and restaurants in the airport destination airport, as well as hotels, attractions and restaurants in the destination city. Motran extends the airline's passenger "touch" to the hours before and after takeoff and landing.

Sample Motran use cases. e-notary (Person #1 witnesses person #2 e-signing a document (or any other item). Person #1 and Person #2 both simultaneously tap and hold an e-button on their mobile device, which can the embed the notarized seal, into the Tilz metadata, as well as embed the time stamp, location stamp, and device stamp. Motran e-notary can also scan the user's fingerprint as well as the notary's fingerprint while they simultaneously hold down the e-buttons on their digital devices. Motran also supports single party notarization via digital device fingerprint scanning while e-signing a document (or receipt or contract or any other item); Fast/mobile bill payment (User receives the gardener's bill via postal mail, scans the IP barcode Net Dotz (Facility 27), and instantly pays via Motran. Transaction Tilz (Facility 30) can be sent to the gardener pre-formatted for the gardener's accounting program); Pre-approved credit (Users whose profile allows, can choose to have a virtual credit card number generated on their behalf, when their mobile device comes in range of a store, or a store's Shopping Signal, or CloudCast. At checkout the user may be asked if they want to utilize the credit arranged by the store. In such a manner does the store participate in the pay-forplay transaction fees, and enables credit card companies to sign bulk pricing deals with stores, if they don't want to deal with users individually. Motran may sell this priority to the highest bidder among, say, a user's credit cards. Additionally, with Motran, new types of credit can be extended: companies can offer one-time credit to a user, without having to open a credit card account—as a means of "test driving" prospective new customers to see if they are credit worthy, or to try to steal them away from their current credit card company. Motran's Paid Payment is similar to Paid Search results via conventional art search engines, however the user gets paid. Motran can also sell new and valuable data not previously available to market research companies: such as How often do customers go into a store and leave without having purchased anything?); Single transaction credit (Instead of limiting just the credit amount, Motran can generate virtual single-transaction credits. After one transaction, any remaining credit is cancelled); Vendor specific transaction credit (Adds the security feature that the virtual credit card generated is only good at one store, say, Safeway. That way if the virtual credit card is stolen it can't be used elsewhere, and parent's can give (via fling motion with the Mobi) their kids a Motran credit their kids can redeem only at the, say, bookstore, and not at the ice cream parlor); Physical check creation (Similar to user who utilize accounting programs to create and print out checks, Motran enables people to create checks from any source (such as their bank account, brokerage account, or credit cards, etc.) via their mobile device. When the check information on the Motran widget is filled out it automatically wirelessly puts a hold on that much money from the appropriate account. Then, using any printer (including printers at coffee shops, etc. or other wireless IP-enabled printer) a physical check can be printed (Print Widge Facility 12) for those uses requiring them. A Net Dotz (Facility 27) is on the check which the check recipient can scan to deposit the funds. Additionally, the user may get paid by, say, corporate entities to have the check printed with an ad on it (as per the user's Ad Widge Facility 1 profile). This payment could cover the cost of the printing for the check creator. Furthermore, the check creator and recipient may get paid by the ad company. Alternatively the ad could be tag-related. That is to say, related to the check category tag. Hence, a check for groceries could contain a coupon for orange juice); Visa/MasterCard/AMEX enter new realms (not only will there by Paid Payment (where companies can bid in realtime to be the payment processor for a given (say, to make it a Visa purchase) but credit card companies can enter new territories: they can (pay uses to) monitor users' CloudCasts (Facility 23) for their upcoming purchase intentions. They might see for example a user who is about to remodel their half bathroom, with the intention of spending, say, five thousand dollars. MasterCard could then examine that user's credit report which could be available via that user's ComCloud (Facility 23), and decide if they'd like to make that user a new MasterCard customer, or extend special financing for this single project. MasterCard could pay to contact that user with an offer, for say, a $5000 line of credit with a credit card-like interest rate. Or alternatively a lower rate if Master Card can put a lien on the house as per this remodeling project. Liens, electronically implemented and cleared are another Motran product); Transaction/online credibility, (Users who enter profile-limited sites or certified blogs can have their RFID capable device, for instance, provide the user access via Motran); Theft prevention (Automobiles that can sync data with mobile devices, can use Motran to enable ignition interlock. The mobile "transaction" in this case, is the successful handshake between the car and it's rightful owner/driver); e-SIM cards (Motran can provide digital/electronic versions of subscriber identity module SIM cards, not just for phones, but for any connected object or device. In embodiments, with e-SIM cards users simply download the credentials and authorizations and payment modalities via Motran. Typically a SIM card is an integrated circuit that securely stores the service-subscriber key which is used to identify a subscriber on what are typically a mobile telephony device. However, the ecosystem of connected devices is about to explode and may include a much broader range of objects, such as video gaming rigs, gas station pumps and picture frames. Thus the need for subscriber identification services is growing ever more complex. Nevertheless the antiquated and more expensive hardware based integrated circuit conventional art method of subscriber identification is becoming something of an anachronism. Motran's e-SIM card is more flexible and can interoperate with international standards. this gives users the greatest possible number of choices when deciding which network service provider to utilize at any given moment. Motran's e-SIM cards' flexibility solve an important compatibility issue: carriers may operate on different network protocol. Thus most users won't be able to swap physical SIM cards from carrier to carrier if they utilize a differing network protocols. Furthermore, the SIM card technology is over a decade old, when users typically had only one device. Today user's may have multiple connected devices (such as laptops and cellphones). Motran's software defined features such as: serial numbers, security authentication, an ciphering information, network profile history, carrier profile, PIN passwords, and a user's subscribed services list, is a superior solution for a rapidly evolving multi-device marketplace. And like all other Mobi Facilities, enables the user to get paid as various network providers (pay the user to) bid to be the provider to a user or device for any given task or time period).

In a dynamic and rapidly evolving technology era, a plurality of various transaction-related items and services need to be entirely re-imagined. Replacing outdated method of transacting, Motran provides newer and better solutions designed for the forthcoming mobile age and with the user in mind. Nearly every type of transaction is about to undergo a monumental change. And Motran powers the future of mobile, distributed and electronic transactions.

Facility 37

Path Management Facility

5137

In embodiments, a module that facilitates path management (hereafter "Gotz Dotz") is provided. Gotz Dotz are an embodiment of Survey Eggs (Facility 39), which themselves are an embodiment of Mobi. Gotz Dotz is also a wireless service network method to store and transmit geo-based data. Gotz Dotz serve as replacement for Botts' dots on highways to divide lanes of traffic. Compact, secure, waterproof, reflective, location aware, intelligent path marking units, Gotz Dotz are rounded raised plastic, ceramic or polyester (or other materials) domes that server as road lane (pavement) markers. Gotz Dotz are primarily utilized in commercial, municipal, and federal applications. Gotz Dotz help establish locations of roads in countries where reliable digital maps don't exist. Once in place, Gotz Dotz can automatically create digital maps for the area traversed by that road, path, sidewalk or trail marked by Gotz Dotz.

Gotz Dotz can establish location information via GPS and other means such as triangulation. In embodiments, Gotz Dotz can monitor traffic flow/speed, and can provide warnings such as vehicles veering out of lanes (such as when users may be falling asleep at the wheel). Gotz Dotz can interact with a car's navigation system or other onboard digital devices, such as a user's mobile handset. Gotz Dotz can act as Web Drop data points: users traveling along a road for instance, can get and leave location-based information. Users frustrated by the daily heavy traffic at a particular intersection can leave a complaint for city officials, actually at that location via the Gotz Dotz. Users can simply speak their message (a query Tilz, Facility 30), which is sent to the Gotz Dotz at that location. Gotz Dotz store information about items related to that location/area including, for example: "Stoplights are currently not timed and should be corrected by the City by the end of March." Government road maintenance organizations can leave information there actually in those Gotz Dotz, that can be accessed via Bluetooth, WiFi, cellular radio, or other means. Furthermore, other motorists can leave comments and complaints as well as answer each other's questions, directly via the Gotz Dotz.

Gotz Dotz are Survey Eggs for highways and can perform the same/similar functions as per the description below (Survey Eggs Facility 30). In embodiments radio frequency identification RFID is built-into Gotz Dotz. Gotz Dotz are powered by a plurality of means such as: low cost solar cells, heat of the pavement, impact energy of vehicles driving over them, radio waves, et. al. Each Gotz Dotz has its own IPv21 # (Facility 25 which confers an IP address) and Net Dotz (Facility 27) IP barcode. Gotz Dotz data handoff: transceive to/from available wired/wireless networks, sync to/from passing card (Bluetooth, WiFi, RFID), communicate with emergency roadside phones (as a means of transmitting information back to central servers, or outside applications or other networks), et. al. Regarding syncing to passing cars, users can hand off profiles and Tilz as they pass by. Gotz Dotz then seek out profile matches and can return results further up the road. Users could sell their sofa by driving down the road, and having Gotz Dotz match up that Sofa Sell profile with another user who has a Sofa Sought profile. Gotz Dotz are transactable nodes. Users don't have to make the dangerous walk down the highway to get to the nearest emergency roadside phone, as Gotz Dotz can act as mini relay stations enabling such phone calls to be made Gotz Dotz uses include, but are not limited to: Identify available parking spaces in parking garages or on a street (When a car parks between Gotz Dotz that circumscribe (or other layout arrangement relative to) a parking space the car's/user's ComCloud (Facility 23) can indicate to the Gotz Dotz that the parking space is now taken); telemetry data services (Gotz Dotz can download and transmit telematics data from the car's computer (such as speed, engine temperature, oil pressure, tire pressure, exhaust emissions, et. al.) in realtime. Data, as per user's profiles and wishes, can be sent to entities such as the car owners or the owner's mobile device, or the car manufacturer (which might pay users for such information), or law enforcement agencies (outstanding parking tickets or lapsed insurance), or the department of motor vehicles DMV (smog information, current registration), et. al.); Free GPS (People and cars moving along a Gotz Dotz path can determine their location); Traffic report network (Cars can automatically send anonymous driving speed information to Gotz Dotz, that can be aggregated to provide realtime traffic conditions information, and sell it to online map services and news organizations); Seasonal road marking (Gotz Dotz can mark the edges of seasonal ice roads (a solution superior to the conventional art sticks with flags. Gotz Dotz can also mark the edges of highways and roads with heavy snowfall); Automated vehicle guidance (As various aspects of vehicular control are enabled by ground sensors, Gotz Dotz can interact with the car's navigation system, cruise control, automatic breaking, steering, et. al. to guide the vehicle along the Gotz Dotz marked path); People movers inside airports; Baggage trucks/carts on airport tarmacs; Conveyor belts in factories. Sensor networks (Gotz Dotz can gather/relay information (ambient temperature, carbon dioxide levels, et. al.) in support networks of devices which can measure and/or analyze, for instance, environmental parameters).

Most subdivision maps rely on what are called survey monuments. These are often physical nails or plaques that are placed in/on the ground and act as the reference points for official subdivision surveys. Over time many survey monuments are lost or incorrectly replaced. This happens, for example, when a survey monument is located in a sidewalk or road that is torn up to access underground utilities and then re-surfaced. Survey monuments are intended to be replaced in the exact same spot, but in practice they are often replaced inaccurately. The result is tens of billions of dollars of wasted time and unnecessarily lengthy surveys, to re-establish an accurate starting point for each survey. Gotz Dotz replace survey monuments in places where Survey Eggs (Facility 30) might be destroyed, such as on a street, curb, or sidewalk. Gotz Dotz, like Botts' Dots, are designed to withstand being run over by vehicles. Gotz Dotz act as permanent and accurately re-locatable survey monuments. Gotz Dotz amass location data to automatically produce subdivision plot maps that can be more accurate than some conventional art subdivision maps, and are continuously available (via online map mashup) at minimal (relative) cost. Because Gotz Dotz an automatically create online/digital plot maps they provide impetus for resolution of differing boundary surveys—as well as a basis for updating inaccurate legal descriptions of properties. Owners of telephone poles, street light posts, cell phone towers, et. al. are beginning to geo-tag their inventory, driving demand for fixed-location sensing devices such as Gotz Dotz.

Facility 38

Location Sensing Facility

5138

In embodiments, a module that facilitates location sensing (hereafter "Survey Nuts") is provided. Survey Nuts are an embodiment of Survey Eggs (Facility 39), which are themselves an embodiment of Mobi. Survey Nuts do not utilize satellite GPS to locate themselves, instead triangulating from three or more location-established objects. In embodiments Survey Nuts are intended to be installed during construction, and placed in every corner and key point of a structure. Once in place, Survey Nuts can provide a three dimensional electronic blueprint of that structure. In combination with magnetometers/accelerometers users engage the real world via gestures/motions (guide radio-controlled vehicles, "press" an elevator button with just a flick of a finger, roll up car windows by making a U-shaped motion with a finger while walking away from the car control a custom version of a fast food restaurant drive-through menu display, flick content to another person or device, change the TV channel, play Mobi tennis with another person, or play other video games, or engage virtual or overly environments, utilize RFID fingernail stickers to type on any surface by just moving the user's fingers without need for a keyboard, control a virtual heads up display, among other uses). In embodiments Survey Nuts utilize radio frequency identification RFID to perform 3-axes geo-spatial location.

Inside a home Survey Nuts/Eggs can CloudCast all of a user's household items. If a guest likes the kitchen appliances, cabinets, or faucet, such information Tilz may be being CloudCast. The homeowner may get paid if/when an interested party who receives those Tilz, for example, later purchases that item from that company. All the contractors/manufacturers for every time in the house, can pay the homeowner to be on the homeowner's CloudCast. Information about items is CloudCast to guest's mobile devices. Such household items might include: paintings, artwork, silverware, couches, TVs, light fixtures, clothes, literally everything that user owns has a Tilz that is part of that property's CloudCast. The homeowner may get paid for the information regarding who designed, supplied and installed their kitchen. This can alternatively be achieved via Net Dotz (Facility 27) Internet protocol barcodes or RFIP (RFID Widge Facility 33), IP-enabled RFID.

Survey Nuts are in-situ location establishing devices. The Survey Nuts Facility consists of a Website, mapping and blueprint software application programming interfaces APIs, server software, and a widget (Webified mini software application). The widge enables users to engage and manage a number of location-based services, that Survey Nuts engender. There are also online/offline tools for CloudCasting profiles, comments, blogging, message boards, media sharing, social mapping and tagging/geo-tagging. Each remotely programmable Survey/Nut contains a microprocessor, flash storage, and an operating system. Survey Nuts determine relative location.

Facility 39

GPS Location Facility

5139

In embodiments, a module that facilitates GPS location functions and technology (hereafter "Survey Eggs") is provided. Survey Eggs are an embodiment of Mobi. Survey Eggs are compact, secure, waterproof, location-establishing devices, that enable, among many other uses, surveyors to permanently establish the boundary points of property lines. Survey Eggs address the problem wherein property owners pay over and over again to have boundary points located, at considerable expense each time. Survey Eggs are placed in the ground once, and for an optional monthly fee, boundary points are permanently located. Once location has been established, the device(s) can transmit and receive a variety of data based upon location, profile, and other factors, facilitating novel interactions and transactions.

Subdivision maps in places such as County Assessor's Offices are sometimes inaccurate. Most subdivision maps rely on what are called survey monuments. These are often physical nails or plaques that are placed in/on the ground and act as the reference points for official subdivision surveys. Over time many survey monuments are lost or incorrectly replaced. This happens, for example, when a survey monument is located in a sidewalk or road that is torn up to access underground utilities and then re-surfaced. Survey monuments are intended to be replaced in the exact same spot, but in practice they are often replaced inaccurately. The result is tens of billions of dollars of wasted time and unnecessarily lengthy surveys, to re-establish an accurate starting point for each survey. Survey Eggs may produce more accurate subdivision plot maps, that are continuously available, at minimal (relative) cost.

In addition to survey-related uses, property owners can utilize Survey Eggs to mini-broadcast a commerce communications cloud (ComCloud Facility 23)—essentially an extranet from their property to (a) synchronously interact with others via mobile device without necessarily utilizing the Internet. Users can post their items for sale to their ComCloud, which can notify others walking by with a profile seeking one of those items. Users can continuously CloudCast (Facility 23) their "garage sale" items—not just on weekends, and without having to haul all their stuff into the driveway.

ComCloud is CloudCast via various means such as Bluetooth, WiFi, wireless carrier network, and other means. Software from ComCloud enables users to utilize their mobile device (Mobi) to place items for sale or requests for proposals (RFPs) in their CloudCast. Users can seek proposals from contractors for a paver stone driveway from those who happen to be driving past the home. Users can offer their home for sale via ComCloud. Buyers can indicate interest, even for homes not for sale. Survey Eggs can store the names of interested buyers, possibly eliminating the need to list the house with a real estate broker to sell the home (saving the user possibly tens of thousands of dollars in commissions).

The homeowner's gardener can pay the homeowner to CloudCast Acme Landscaping Company, with that yard acting as reference. If a passerby likes the iron work on the user's front gate, the information may be available via the Survey Egg CloudCast. The homeowner may get paid if/when an interested party who receive the ironwork gate information tiles (Tilz Facility 30), later purchases from that company.

Survey Eggs are in-situ location establishing devices. The Survey Eggs Facility consists of a Website, mapping and blueprint software application programming interfaces APIs, server software, and a widget (Webified mini software application). The widget enables users to engage and manage a number of location-based services, that Survey Eggs/Nuts engender. There are also online/offline tools for CloudCasting profiles, comments, blogging, message boards, media sharing, social mapping and tagging/geo-tagging. Each remotely programmable Survey Egg contains a microprocessor, flash storage, and an operating system. Survey Eggs determine absolute location. Anyone can install a Survey Egg, however only licensed surveyor-installed Survey Eggs have legal merit. In embodiments Survey Eggs installed by state-licensed surveyors features an electronic Tilz as well as a physical tag, with the surveyor's license number and survey date. Survey Eggs can be installed above grade (e.g. on a spike), below grade or even underwater (for dock piers, et. al.).

Survey Eggs are field locatable, via wireless mobile device, including non-GPS devices, using protocols such as Bluetooth, RFID, and WiFi. Users are not required to have Internet service. If users desire realtime monitoring, they can utilize connectivity from by wireless carriers, or WiFi at the home/office/property, or (tethering) via Bluetooth from mobile devices, or other means. As a user with a mobile device is in the field trying to locate a buried Survey Egg, staccato beeps become a solid tone when right over the Survey Egg.

Parking meters can become smart meters with Survey Eggs. Parking meters become smart parking meters simply by attaching a Survey Egg or Survey Nut thereto. The Survey Egg/Nut ComCloud CloudCasts information to parking users on parking hours/costs. This can be accomplished by various means including sending Tilz (Facility 30) to the parking users' mobile devices (Mobis) or automobiles. Parking users can pay via a variety of means, including iDough (Facility 7), Pay by Widge (Facility 32), Motran (Facility 36), or other methods. Options include a SafePay method, whereby a user's credit/debit card (or other payment facility) is charged or bank account debited, for each block of time utilized, without worry about the meter running out of time, and the user possibly receiving a parking ticket (as is the case with coin-operated "dumb" parking meters). The cost advantages for adding a low cost Survey Egg/Nut to existing parking meters, are tremendous. Cities are paying upwards of $5,000 each for so-called smart meters. For example, Survey Eggs can be installed at the corners of the parking lot, with less expensive Survey Nuts attached to each parking meter at each parking space. In fact, parking lots could even be made "smart" with just one Survey Egg station; that users walk to (or access via Bluetooth) after they park their car. Users then enter their parking space number and payment information. Parking police are wirelessly notified if any meters go "red" (run out of time); or again, users can SafePay, if they have an approved payment modality that can be charged for each unit of time parked. Furthermore, adding a Survey Egg/Nut to a parking meter, turns that parking meter into a revenue generating station, for both cities and parking users.

Sponsored parking. Parking users can actually receive revenue by agreeing to accept ads, sent via the Survey Egg ComCloud. Any such revenue can be split with the City. Parking users can receive ads in exchange for reduced or even free parking. The City can also promote, via the Survey Egg ComCloud, upcoming town events. A hair salon, for example, that is near the parking lot can advertise an "empty-chair" 25% discount—true real-time advertising. And all ads are received (or rejected) as per each user's profile. Such advertising meets a real world need: an empty salon chair that will either generate revenue that hour or not. Those skilled in the art may appreciate a plurality of uses and income generating cases, utilizing a Survey Egg ComCloud.

Survey Eggs on City Buses/Trains. All bus stop poles can have Survey Eggs/Nuts attached thereto. Passenger's mobile devices, for example, can receive the bus schedule, and actual bus location on a realtime map (for those buses that have a Survey Egg onboard).

Sponsored Riding. Cities, transportation districts, bus companies, et. al. can receive additional revenue from advertisements/coupons sent to passengers in exchange for reduced or free fares. Transportation vehicles simply attach a Survey Egg to the vehicle, and the Survey Egg ComCloud, can, for example, accept ads/coupons/offers/information from businesses near a passenger's stop. Blockbuster video store, for example, could incentivize the user to go two additional stops to a location near the Blockbuster store, by paying the extra 25 cents fare. True realtime advertising, as per users' profiles.

In embodiments, Survey Eggs contain a lithium (or other type of) battery. Optional solar cell panel on skyfacing surface of the Survey Egg. Remote solar panel attached via weatherproof external connector. Every Survey Egg/Nut has an unique IPv21 # (Facility 25). Optional sensors monitor: humidity, temperature, radiation, gases (carbon dioxide, et. al.), et. al. Alternate use attachments include anti-gopher or mole underground signal generators, invisible pet fence (attach a Survey Nut to a pet's collar to limit or track the pet's whereabouts (display the location data on the user's mobile handset (Mobi)). Survey Eggs/Nuts can mark the location of postal service and private delivery company mailboxes, and thereby CloudCast up-to-date pickup times. Egg customization (For those Survey Eggs/Nuts that are above ground, people can turn them into fashion statement with paint or decals/stickers that can be applied. Users can add patterns, photos or even corporate logos (sponsored Eggs, for which users might be paid); CloudCast customization (Users can post "ringtones" that play a song clip for passersby on their mobile device, or the user's kids singing, or photos/videos of the user's family. Like a social network profile for the user's house, in the real offline world. CloudCast content can be limited for instance such that only certain others/profiles can view various content).

Survey Eggs use cases. Automatic legal descriptions of properties (Survey Eggs in the four corners of a user's property not only informs the subdivision map but also creates an accurate legal description suitable for submission to, for instance, the County Assessor's Office); Electronic ROS filing (Survey Eggs can automatically, wirelessly file the Record of Survey with the appropriate entities); Detailed landscape surveys (Utilize Survey Eggs/Nuts and/or Gotz Dotz (Facility 37) to locate the edges of a road, sidewalk or trail, as well as shrubs, lawns, pools, ponds, et. al.); Government territory boundary markers (Survey Eggs can establish and CloudCast the boundary for city, county, state, country, National Park, et. al.); Parkland mapping (Forest Service roads, county parks, city parks, et. al.); Map companies (subscribe to Survey Eggs' additional location data); Development story poles (show where new buildings, roads, and sidewalks (et. al.) may be built. Easy to share with affected neighbors via electronic map mashups); Realtime weather data for weather bureaus and online maps (People who have electronic temperature, air pressure, or rainfall gauges can transmit this data to weather bureaus, local news stations, and online maps (for a realtime, hyperlocal temperature map feature); Ad hoc transport (For example, a user who needs to move just four furniture items to their friend's garage or public storage. Too much hassle to try to get bids for this tiny job, but if a truck is driving past, with just enough room (or is dead-heading) they can choose to pick up this ad hoc business, that is enabled by the home's Survey Eggs CloudCast); Note drop (For example, leave the location of a little used side door to gain access to the Notre Dame cathedral in Paris for a user's friends. Only they can read the digital note).

Geologic data (Sell geology firms or university departments location and tectonic shift data); Environment sensor networks ESNs or sensor webs (Survey Eggs can form the backbone of sensor networks that monitor, map and assist in the management of environmental resources. Sensors monitor, for instance, air, water and soil for chemicals and pollutants. Because Survey Eggs may already be in-situ for survey related purposes, it saves the cost of purpose built sensor networks. Such sensor networks can track climate change, hurricanes, air and water pollution, receding coastlines, track icebergs, mark pilings for piers and docks, et. al. Help researchers understand how environments and people are linked as the basis for an intelligent response to natural disasters); Travel monument guides (A traveler visits a castle ruin in England, which features an information plaque with a Net Dotz (Facility 27) IP barcode on it. The traveler tags the barcode to see if Survey Eggs are nearby which can transmit a brief audio and video history for that ruin. All of this can be accomplished without need for a working wireless carrier network, and can be accomplished with devices that are not cellphones); Emergency or medical alert reporting system (The elderly who live alone, can wear a pendant which can communicate with the Survey Egg CloudCast (Facility 23) and thereby alert family, friends, neighbors, or first responder personnel to a problem); Emergency services (Firefighters, ambulance and police (et. al.) can find house numbers even in darkness or smoke); Emergency broadcast network (Send or receive messages during natural disasters, even during power outages when the outdated TV-based conventional art emergency broadcasting system is not functioning); In-car navigation data (ComCloud can communicate with users driving by to indicate such items as the house number or if the user allows the homeowner's name, especially to or limited to FedEX or delivery company personnel, et. al.); Atmospheric research (Up-look spectral imaging via low spectral resolution spectrometer attachments to Survey Eggs which can measure atmospheric reflectance which detect airborne pollutants and greenhouse gases); Automated water, gas, electric meter reading (Utilize CloudCast to transmit data either locally via Bluetooth to company personnel, or longer-distance, directly to company servers via the Internet if that home, the neighbors, or a nearby mobile device has connectivity (even asynchronously). And Survey Eggs can aggregate and disseminate local data gathered by both mobile device users, as well as sensor networks).

Prevent skiers from getting lost (Each year skiers die when they accidentally head off piste, especially in storm conditions); Online map service addresses can include GPS coordinates (for homes, businesses, travel monuments, telephone directory listings, et. al.); Dig safely (Avoid underground utilities—only need to be marked once, not during every job); Improve underground utility serviceability (Determine where the problem is when an underground pipe breaks. Flow meters can be attached to Survey Eggs. Telematics sent from Survey Eggs can include such items as flow rate and analysis of capacity usage); Online 3D map mashups (Survey Eggs enable online maps to display underground, ground level, and above ground data. In addition Survey Eggs/Nuts can give reference points to cameras as they take still and video images. This enables a fly-through three dimensional image or video of any building, monument, et. al. to be created from the thousands of photos taken by tourists (and others). Maps could show layers of information: Above ground: utility poles and lines, as well as airway rights. Also digital blueprints of structures. Ground level: railroad lines, dirt roads, sidewalks, trails. Underground utilities: such as pipes, water, sewer and gas lines); Digital blueprints (Not just buildings, but also things such as ancient Mayan cities, of which very expensive and time consuming surveys are being made utilizing conventional art equipment, but could have been made automatically with Survey Eggs and Nuts, for less effort and money); Shipping container monitors (Current container monitors cost upwards of $1000 per container. Survey Eggs are much more cost effective); GPE service (Global positioning egg service as an alternative to global positioning satellite GPS. Lower power and lower cost. Mobile devices and cars can utilize networks of Survey Eggs/Nuts and Gotz Dotz (Facility 37), cell phone towers, WiFi hotspots, et. al. in preference to expensive more GPS service); Geo-limit CloudCasts (including profiles for ads and coupons. It's nearly 6 PM, and a restaurant has a few empty tables. Wants to limit their ads and coupons to those within a few miles, who can get there by 6 PM).

Widget store (In order to facilitate choosing among a user's various widgets (and other software applications and things), in embodiments Survey Eggs CloudCast appropriate widgets in-situ, in-context, in the real world. Widgets that would be useful to a user who is in a particular location, are presented to the user (if the user's profile allows, and possibly only after the user gets paid, according to their Ad Widge Facility 1 and/or Coupon Widge Facility 3 profiles and rates they each set for themselves. So, for example, a user is presented with a coupon widget when entering a store, or a digital travel guide(book) when entering a small village in Europe); Digital content store (In embodiments Survey Eggs CloudCast to users digital content of any kind, for any purpose, in-situ, in-context, in the real world. A wide variety of digital content, such as digital "notes" left for a user's friends at a particular location, stating for example: "We had to bail, the line was too long, meet us at Julie's flat." Or videos (such as videos shot at that location, or a video guide to travel monuments/sites), or music (songs inspired by that location, or local historic music from that village), or new stories (say from the local paper(s)—sifted and presented as per the user's Web Pref (Facility 20) preference profile, giving the use the sports or political or historical information related to this site, they desire). In fact, any digital content (in Tilz (Facility 30) format); Electronic signs (Physical signs with Survey Eggs beneath or attached to them, can CloudCast the latest and most accurate information. For example, the wooden Testarossa Winery sign reads: "Tasting Daily 11 AM-5 PM." Yet users who go there on the afternoon of December twenty fourth may be disappointed to find the tasting room closed. Before climbing the long winding driveway, users could have been informed at the bottom of the hill, via Survey Eggs CloudCast, that Christmas Eve is an exception to the stated hours of operation); Trail waypoints (Users can utilize Survey Eggs/Nuts to locate trail junctions and waypoints along trails. Users, for instance, can use a GPS device to determine their location, and load it into the Survey Egg/Nut via Bluetooth (and the more users who download such data to the Survey Eggs/Nuts, the more accurate the data becomes, as, for instance, the mean of the those coordinates can be calculated). Then as users hike or ski within Bluetooth range, the users get a hit noise on their mobile device (which may not be GPS-equipped). Users can also store and pass asynchronous messages to one another via the Survey Egg/Nut via the onboard storage and/or CloudCast. Users can also ask that another user who passes by "pick up the mail" on their mobile device, and "deliver" it when they are next in WiFi (or other network) range (or via peer-to-peer means such as Bluetooth or via other means), either for free or for a fee); Air traffic control (A Survey Eggs aboard an airplane enables it and air traffic controllers to geo-locate planes using GPS satellites. A method with potentially superior accuracy and functionality, as compared to conventional art (World War II era) ground-based radar systems used by air traffic controllers. Survey Eggs can be utilized by (ground or air) avionics for live data telematics.

Reverse local advertising (Via a Survey Eggs home CloudCast, homeowner's can charge contractors, say, $2 to respond to a request for proposal (RFP) for a paver stone driveway. Or charge a local painter $1 to send the unsolicited proposal: "I see your garage door needs painting." Or charge a realtor to send the message: "I have a buyer interested in your house" when it's not on the market); Location-based advertising (A yogurt shop sends out coupons for their daily special in a 100 meter radius from the store's Survey Egg-marked signal point or boundary); Profile access fee (Users, via Survey Eggs, can sell access to property profiles or property owner profiles (which may be CloudCast) to various parties); Property inventory merchandising (Because the owner has Tilz (Facility 30) of every item they own, companies can pay the user to make offers to upgrade or replace an item (when it's time) as per the user's Ad Widge (Facility 1) and Coupon Widge (Facility 3) profiles. Examples might include: lawn needs annual aerating. Fireplace needs cleaning every 10 years. Appliances, clothes, placemats, lightbulbs, et. al. need replacing from time to time. (In addition to the selling (garage sale items) and marketing (sell information Tilz for the of the granite countertop installer) related to household/property items)); Survey Eggs services (For example services as informed by attachments to Survey Eggs such as brix meters (which read sugar content) and temperature meters for wine tanks (saving, perhaps the single most time consuming aspect of wine making). Survey Eggs can control valve attachments to automate and coordinate the timing for pumping of fermenting red wine juice back over the grape skins as well as water flow regulation to heat or cool the tanks. A pressure regulator Survey Egg attachment for hydraulic-powered fermentors and hydraulic-powered presses. Mass spectrometer or gas sensor Survey Egg attachments, to monitor carbon dioxide levels, and thus automate venting. Spectrophotometer Survey Egg attachments to measure the presence of different compounds in wine. A single spectrophotometer attached to a Survey Egg, thereby shareable among all tanks in the entire winery).

Cellphone service providers (Carriers that sell GPS service or wireless network service, can offer monthly contracts for Survey Eggs. Providing the network for Survey Egg CloudCasts may result in the carrier receiving a cut of all the software, services, and transactions revenue therefrom); Landline or broadband providers (As customers drop their landlines in favor of wireless, Survey Eggs (in embodiments) become the Web Drops that connect to existing landlines, and become the wireless nodes to interface with the landline and/or broadband providers' ubiquitous WiFi service. Then those entities may participate in the software, services and transaction income on that network); Surveyors (Surveyors install and maintain Survey Eggs, and may revenue share the software, services and transaction income from those Survey Eggs); Government entities (Municipalities may offer new residents a 10% discount on boundary Survey Egg service fees in exchange, for example, for a portion of the Survey Egg CloudCast monthly revenue); Architects (Because architects require the survey (and blueprint) data, they may market Survey Eggs to clients on a monthly basis (with an ongoing revenue sharing relationship), rather than utilizing conventional art (one-time) survey (and blueprint) techniques/methods); Geology organizations (may want the types of datasets that Survey Eggs produce, and seek grants/funds to obtain them); Tourist boards (may co-market the Dotz Guides (Facility 4) ComCloud features, in exchange for a cut of revenue from paid guides/tours); Web drops (Web drops are places in the real world where users (or objects) can gain access to a wider network of other users or objects, generally via wireless networks, both paid (such as a carrier wireless network) and unpaid (such as Bluetooth)).

Survey Eggs/Nuts provide a vital connections between the online and offline worlds, and may play a vital role in the transformation of the conventional art network architecture. Survey Eggs/Nuts not only establish locations, but fundamentally change people's lives, via the interactions and transactions enabled by Survey Eggs CloudCast, as well as the marketing and merchandising of products and services.

Facility 40

Other Facilities

5140

See B3T, BLURBZ, uTAG uTEL, et. al. below.

Figure 52:
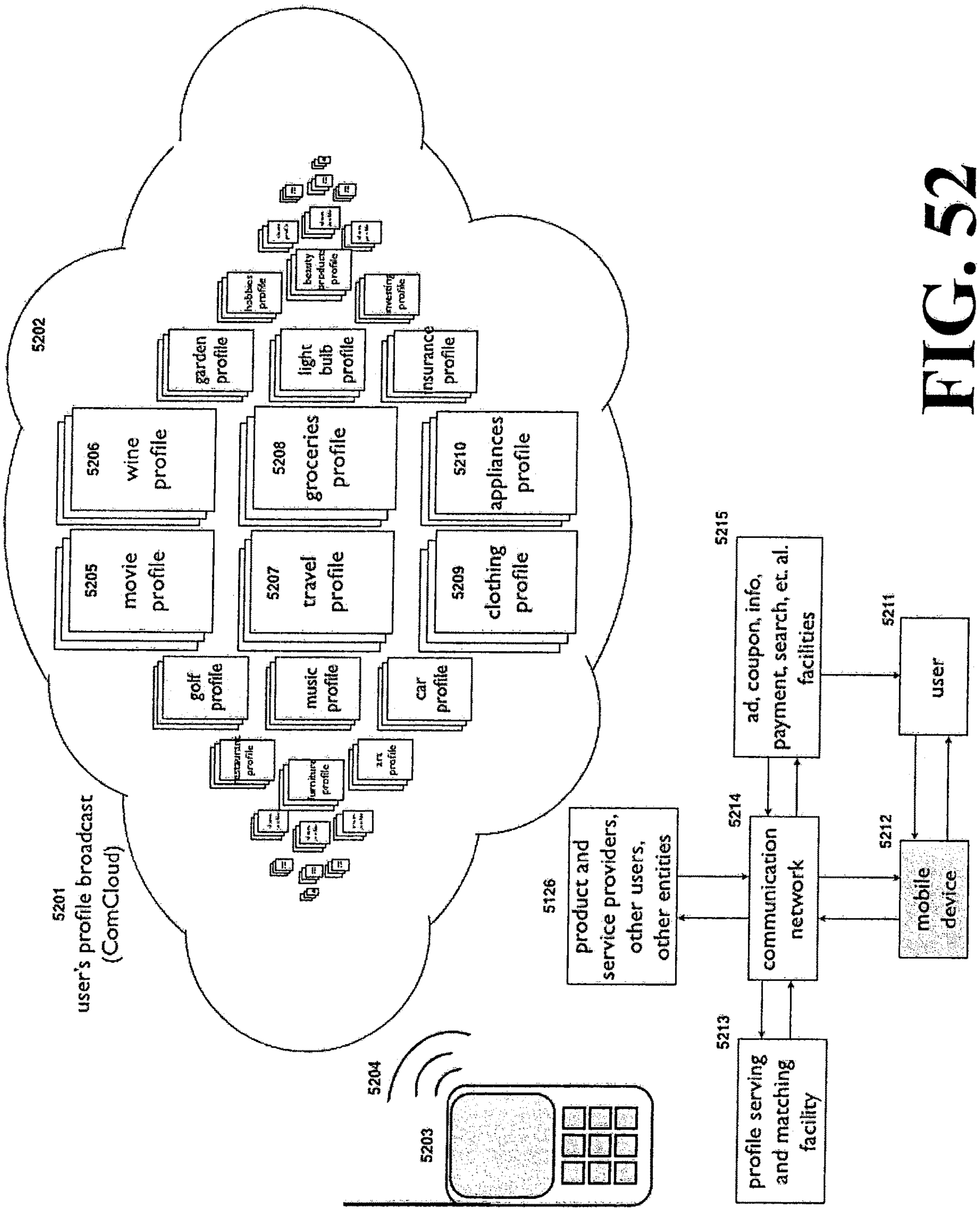
FIG. 52 is a functional block diagram illustrating an embodiment of a depiction of a user's profile broadcast, which the user creates with, and, in some embodiments, broadcasts from, the present Invention; in addition to a depiction of an embodiment of a simple schematic illustrating the functional relationships between the user and the product and service providers.

FIG. 52 is a functional block diagram illustrating an embodiment of a depiction of a user's profile broadcast 5201, which the user creates with, and, in some embodiments, broadcasts 5204 from, the Mobi mobile handset 5203; in addition to a depiction of an embodiment of a simple schematic illustrating the functional relationships between the user 5211 and the product and service providers 5216 with whom users engage in the course of their daily lives, and highlights the role that the Invention's profile matching facility 5213 plays in the process; in this case via the user's mobile handset (Mobi) 5212.

Mobi is a real world profile/information platform. Life takes place in the real world, via, for instance, interaction with the real world objects a person actually utilizes in their life. To that end the Mobi Platform is accessible by devices such as mobile handsets 5203, which, pending a compelling blend of hardware/services, may emerge as the next primary computing platform, and represent the first computing platform which a user might have on their person during their every waking hour. A user's profiles may live on the user's devices, not just on the Internet or other servers. Thus, the Mobi Platform client-side software, which resides on the user's digital device of choice, enables users to create profiles 5202 as well as broadcast (CloudCast) 5204 profiles 5202 therefrom. Such profiles may include things such as: Profiles of the items they want to buy; Profiles of the types of people they want to date; Profiles of their appliances, which at some point will inevitably need replacing/repair; Profiles of those items they are performing searches for; And so on. With the Mobi Platform, users interact with the profiles of others, objects, and/or entities to get what they want/need, with far less time and effort.

In embodiments users CloudCast 5204 their Mobi profile 5201 directly from their mobile handset 5203 via means such as Bluetooth, or peer-to-peer via various means (such as infrared IrDA), not to mention wireless carrier network or other means via the Internet. Thus as the user moves about in their real life, they may be constantly adding to and updating the profiles 5202 vis a vis the things they utilize in their life, and thereby constantly benefit by this realtime profile. Via Mobi users essentially carry around their wants and needs (in the form of profiles), and have same met, with far less effort than per conventional art.

Even if a user's 5211 profiles 5202 are created and hosted locally, for instance on a user's mobile handset 5212, users 5211 may also have their profiles stored and matched via (and broadcast from) a remote server (or other device) via the Internet 5214. User profiles may even be stored and matched on other devices such a user's PC or TV (and broadcast therefrom via a plurality of communication modalities). Multi-nodal profile synchronization may be performed manually by the user or automatically by the Mobi Platform as per various rules 5024, 5025.

Companies (product and service providers 5216, including product manufacturers and retailers, as well as various advertising/marketing entities) may view user profiles 5202 and make decisions manually, or companies may create and surface their own profiles, optionally utilizing the Mobi Platform, and have their profiles automatically matched in realtime 5213 with other entities/objects/people/companies with whom they might want to share/exchange/deliver ads/offers/information/et. al. 5215. A user's profile 5201, is matched against profiles of various companies, entities, objects, et. al. 5216 and may receive ads/offers/information/et. al. from same. The Mobi Platform surfaces, for example, the user's movie profile 5205 to appropriate entities 5216, such as those entities that can supply the movie to this user. Appropriate entities may also, or alternatively, subscribe to a user's profile and thereby receive realtime or asynchronous updates for free or for a fee (as opposed to being notified manually by the Mobi Platform, or being notified manually of a profile match from a prospective customer for a product/ service that entity provides). Appropriate entities may subscribe to a user's entire profile 5202, or just selected elements, such as a user's clothing profile 5209.

Other embodiments of various interaction modalities between ad/information/et. al. senders and ad/information/et. al. receivers pursuant to the principles of the Invention are also envisioned.

Figure 53:
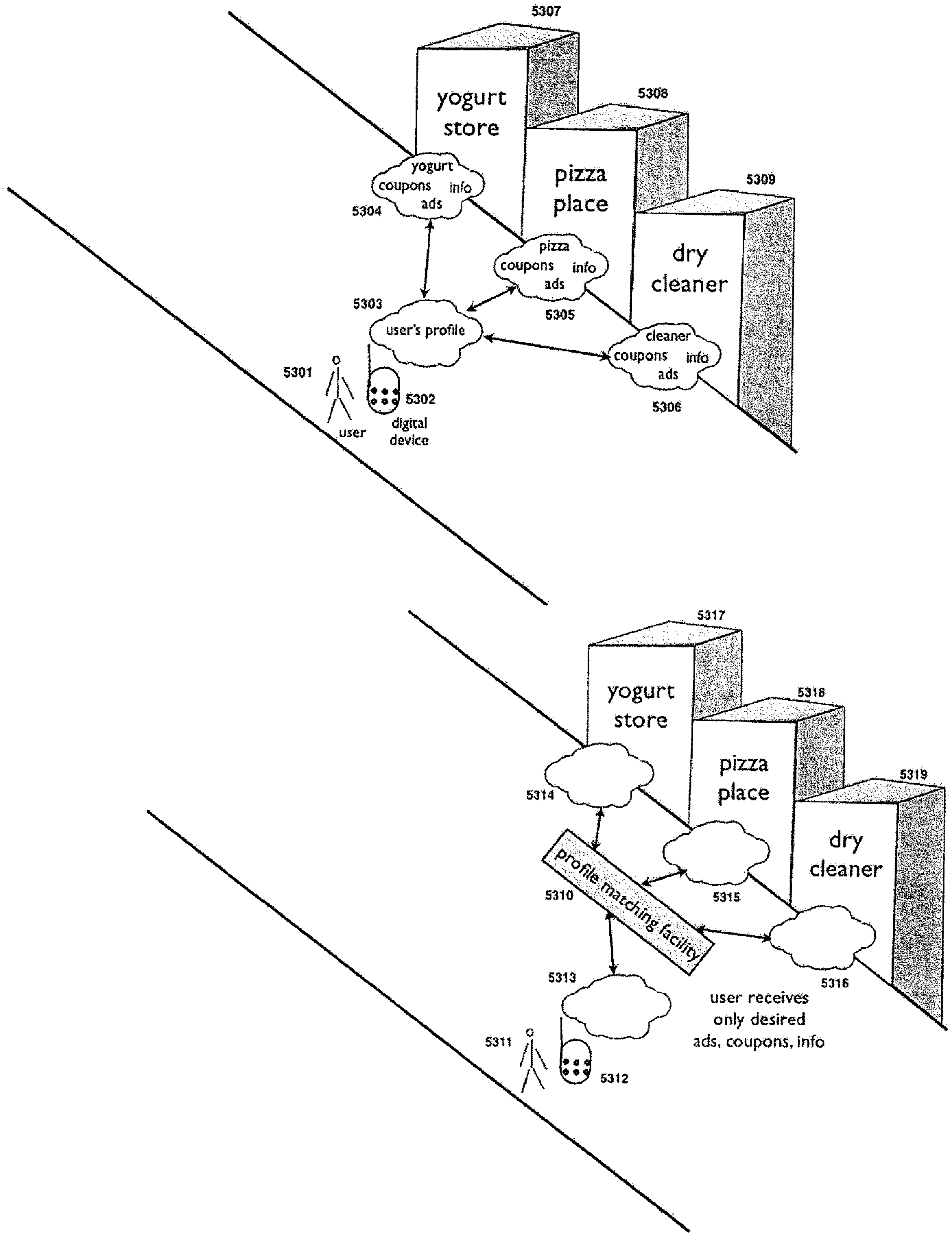
FIG. 53 is a depiction of an embodiment of an example wherein both product/service providers as well as the user broadcast their profiles, which are then profile-matched by the Invention; thereupon filtering for just those ads/coupons/information/et. al. the user desires.

FIG. 53 is a depiction of an embodiment of an example wherein both product/service providers 5307, 5308, 5309 as well as the user 5301 broadcast their profiles 5304, 5305, 5306, 5303, which are then profile-matched 5310 by the Mobi Platform; thereupon filtering for just those ads/offers/info/etc. the user 5311 desires.

Profile-based interactions and transactions are sufficiently superior to the conventional art that a shift to same without profile-matching facilities 5310 may be cacophonous. The Mobi Platform facilitates such profile-matching 5310 via a plurality of means and modalities. For instance, all parties may broadcast (CloudCast) their wants and needs 5304, 5305, 5306, 5303 via the Internet, and via client-side facilitation such profile-matching occurs.

Alternatively, such broadcasts may be facilitated entirely via local means and modalities. In embodiments, a user locally 5301 CloudCasting the user's the Mobi Platform profile 5303 (say via Bluetooth) encounters various businesses 5307, 5308, 5309 also CloudCasting 5304, 5305, 5306 via local means, such as WiFi. Without need for a wireless carrier network, the user may receive just those ads/offers/information/et. al. desired as per the Mobi Platform's client-side profile matching facility 5310 configured for operation on the user's 5311 mobile handset 5312.

Figure 54:
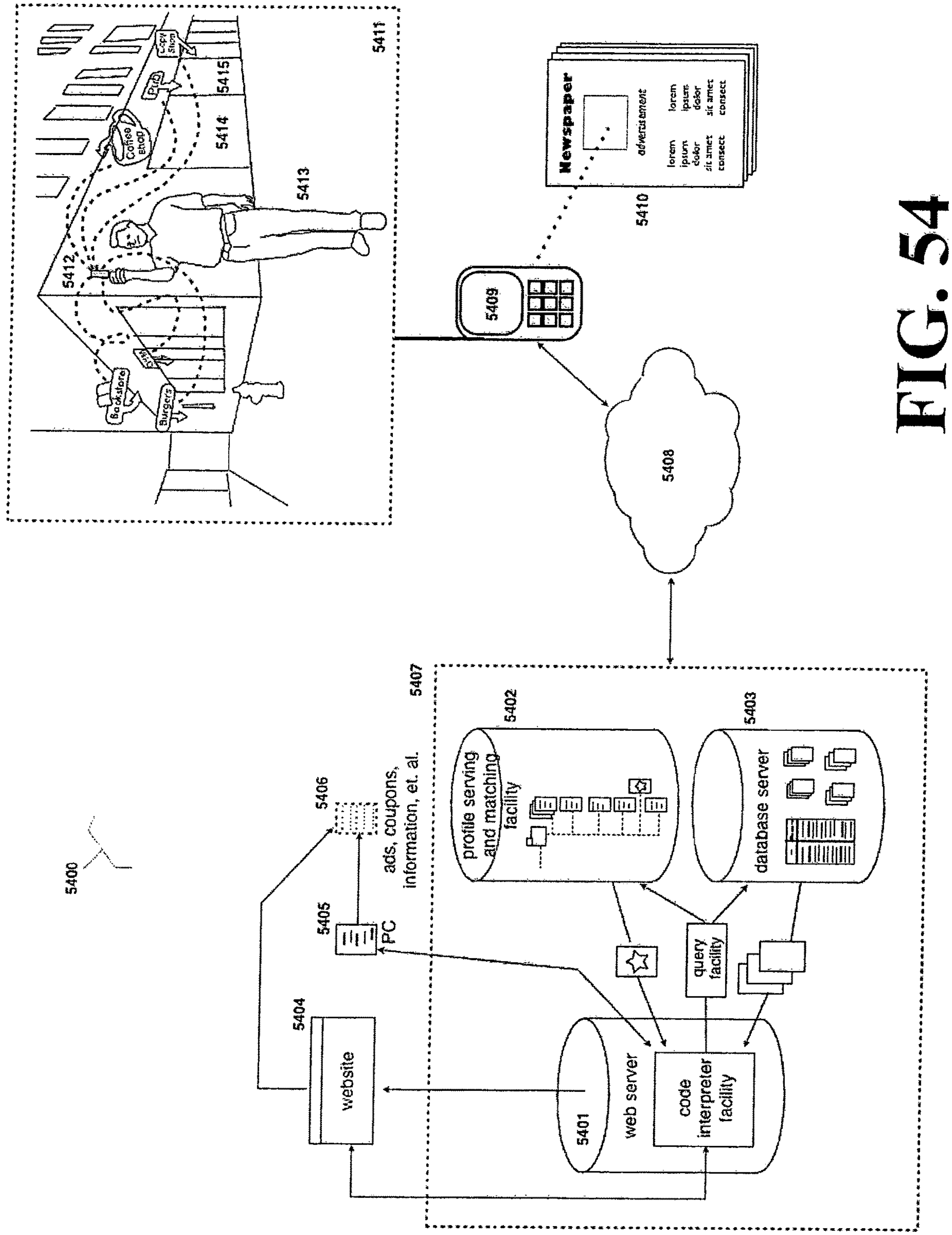
FIG. 54 is a functional block diagram illustrating an embodiment of an exemplifying architecture of a method for server-side profile configuration and transaction facilitation as per mobile handset scanning and broadcast.

Peer-to-peer, user-to-machine, and machine-to-machine transactions may skyrocket in the coming years, and be facilitated by an innovative system, method, service and platform such as the Invention FIG. 54 is a functional block diagram illustrating an embodiment of an exemplifying architecture of a method for server-side 5407 profile configuration and transaction facilitation as per mobile handset 5409 scanning 5410 and broadcast 5412.

A user's profile broadcast (ComCloud) 5412 is updated as a result of an ad 5410 the user scanned in their morning newspaper, then as the user 5413 is walking along, various commercial enterprises 5414, 5415 attempt to send ads/information/offers/et. al. to the user's mobile handset 5412. The user is shielded from information overload by the user's instantly updated ad/information/offers/et. al. profile 5409 which dictates which ads/information/et. al. the user desires, and which the user does not. And may be alerted to a desired transaction involving the coffee shop 5414.

Mobi Platform server-side facilities 5407 are provided. A profile serving and matching facility 5402 is configured to transmit profiles (Tilz) to remote devices. The profile serving and matching facility 5402 includes algorithms configured to filter and match a plurality of available ads/information/offers/et. al. based upon metadata for each ad/information/offer/et. al. against profiles of items a user has indicated a desire to receive (or not) ads/information/offers/et. al. for. A database server 5403 facilitates user profiles and preferences, as well as a rules facility by which certain actions must accord.

Users create new or update existing profiles by a plurality of means, including, for instance, scanning an ad 5410 in a newspaper for an item a user is interested in. The scan results in a query which returns a data tile (Tilz), about the subject item, to the user's mobile handset 5409. For example, if the user scanned an ad 5410 for Acme coffee beans, and received the Tilz for same, the user, via the client-side Mobi Platform widget 5409 queries the user as to whether or not the user would like to receive Acme coffee bean ads/offers/information/et. al., The user's profile is updated presently by (the Mobi Platform client-side software on the user's mobile device, and/or) the Mobi Platform server-side facilities 5407, which receive transmission of the query results via a plurality of communication modalities 5408. The user's updated profile is returned therefrom to the user's Mobi widget for inclusion in the user's profile broadcast (ComCloud) 5201.

As the user 5413, walks along and passes a number of commercial entities, said entities attempt to send various information to the user's mobile handset 5412. In embodiments Mobi Platform REJECTS all information, based upon the user's Mobi Platform profile, not flagged for ACCEPT. So for instance information-sending attempts by the burger joint, bookstore, copy shop, and pub 5415 all failed—as Mobi Platform protected the user against such information overload. Mobi Platform did allow through the communication from coffee shop 5414, because Acme coffee beans are sold therein, and an ad/offer/information/et. al. for same was proffered to the user. The user might not have known that that particular coffee shop sold Acme coffee beans were it not for Mobi Platform facilitating such an interaction/transaction.

In embodiments, the commercial entities review the user's profile, as broadcast directly from the user's mobile handset 5412, and if their wares match the user's wants, may then send, via Mobi Platform, an ad/offer/information/et. al. to the user.

In embodiments, both the user and the commercial enterprise broadcast their profiles, whereupon the Mobi Platform profile matching facility (either client- or server-side) may alert the user to matches and present the resultant ads/offers/information/et. al.

In embodiments the Mobi Platform searches other sources, accessed for instance, via the Internet 5408, for Acme coffee beans (data tiles) and/or ads/offers/information/et. al. related to same, and if found, the Mobi Platform Web server 5401 presents the ads/offers/information/et. al. to the Mobi Platform Website 5404 wherefrom the user may display via their mobile handset 5412 the ads/offers/information/coupons/et. al. 5406 machine readable barcode for redemption at the coffee shop. Similarly the ads/offers/information/et. al. may be sent to the user via modalities such as email, which the user may access from a PC 5405 and therefrom print the ads/offers/information/et. al. 5406.

In embodiments Mobi Platform software may be configured as a Web-based application 5404.

Figure 55:
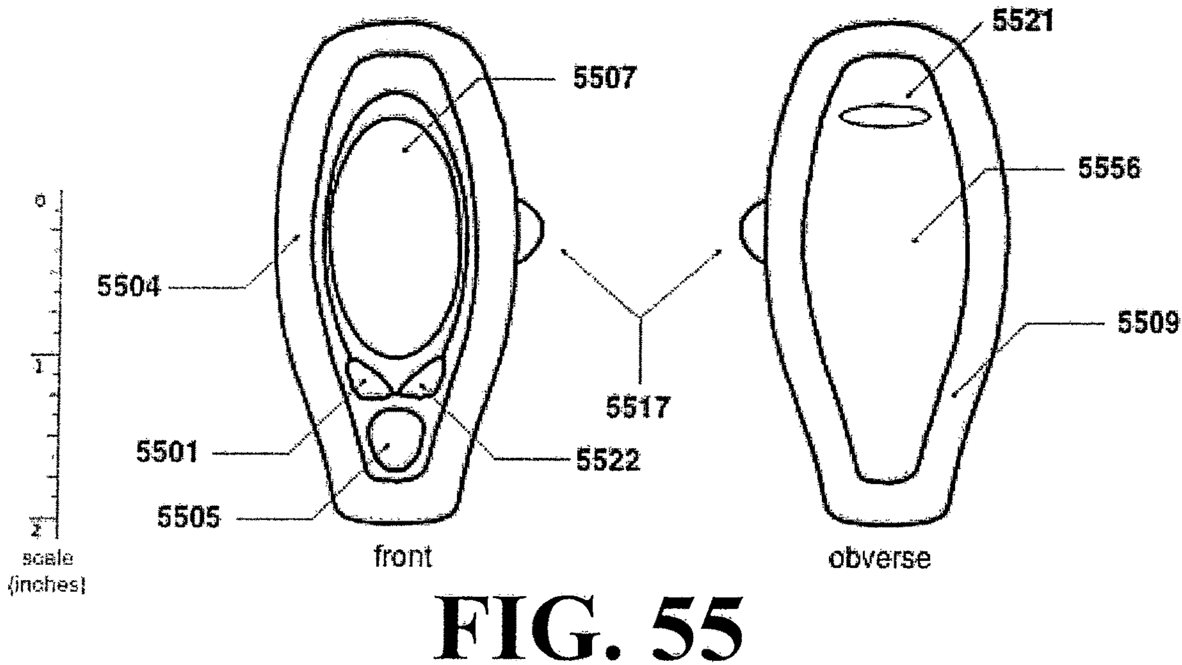
FIG. 55 is a diagram of an embodiment of an example of the present Invention.

FIG. 55 is a diagram of a first, second and third embodiments of an example of the present Invention. Such examples of embodiments are sufficiently small that they may easily accompany a user all day, yet are functional enough to still captures Tilz via means such as barcode scanning. Later when the user performs a wireless sync, the Tilz are asynchronously downloaded (including potentially payments to receive same). Thus users may still harvest the important Tilz during the day, maintaining the overall accuracy of the user's profiles.

First Embodiment

A first embodiment of the present Invention is a thumb-sized barcode reader 5521 with storage facilities. An onboard software widget is configured to store data (Tilz Facility 30 and IP addresses of large Tilz) and sync with an information sorting widget (Sorto Facility 8) when connected. This embodiment is small enough to be used as a key fob or worn as a pendant. An embodiment may lack wireless carrier functionality, however wireless facilities may be added via a wireless card (or equivalent thereto) inserted in the memory slot (or by other means). Such a first embodiment is slightly larger form factor than a thumb drive. Additionally the embodiment has sufficient storage (e.g. NAND flash memory) to store encrypted information such as photos of family passports and medical data. The embodiment may be plugged into (or otherwise interface with) any computer (or even a full featured Mobi), via USB cable and it will launch its applications. In embodiments it includes a small dime-sized display screen 5507.

Second Embodiment

A second embodiment of the present Invention, which is a push-to-talk version of the first embodiment. Users talk and hear on Bluetooth headsets. The second embodiment is roughly the same size and shape as the original Star Trek communicator on the breast of their uniforms. It may be attached to a user's shirt with Velcro or using the built-in clip. The second embodiment sends a small chirp sound (or custom ringtone in the user's designated Mobi profile), other available Mobis may respond and users may have an asynchronous call with some slight latency. Instead of the chirp sound, the second embodiment may make two two-note logo sounds: "mar-ko" and "mo-bi", in both spoken and tones versions, ala the sounds of the marco-polo swimming pool game. When the user presses the second embodiment, it makes a small "mar-ko" noise. The people you send it to hear "marko" in their headsets, and may send back the "mo-bi" tone or spoken version in each of their own voices (each of them saying "mobi").

Third Embodiment

A third embodiment adds a small thumbwheel 5517 to the side of the device. The thumbwheel 5517 controls a display 5507 the user sees via a heads-up display which is generated by suitably configured pair of eyeglasses or windshield. The heads-up display is controlled by the thumbwheel 5517. The heads-up display may display basic menus and digital document icons. Users may talk and listen via Bluetooth earpieces, which are an optional component of the one or more embodiments of the suitably configured eyeglasses.

Figure 56:
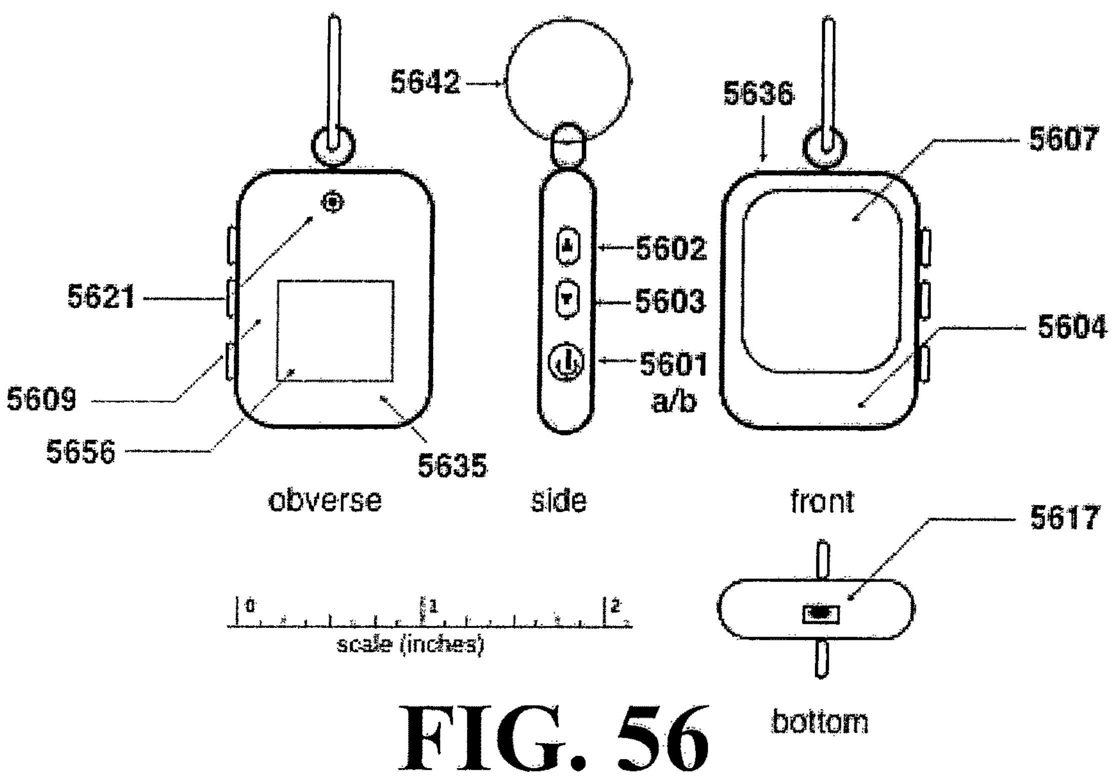
FIG. 56 is a diagram of an embodiment of an example of the present Invention.

FIG. 56 is a diagram of a fourth embodiment of an example of the present Invention.

Fourth Embodiment

A fourth embodiment of the present Invention that includes: a barcode reader 5621, RFID, and several software widgets configured to perform such functions as sorting/organizing digital content and receiving multi-media ads and coupons. The fourth embodiment may also include portable software configured to handle email, instant messaging, Web browsing, et. al.

The display screen 5607 is approximately 1"×1". The entire unit is just slightly larger than the screen itself. There are a few physical buttons on the edges of the device, such as volume up/down 5602/5603, off/on buttons 5601 on one side. The touchscreen is the primary form of input. The IP barcode reader 5621 is on the obverse. To mark an item, the user touches the Barcode Read icon on the screen, once the barcode is successfully read, the user may see a small popup window with Cover Info (high level information) about that item, and with a touch the user can Accept Read which stores the IP address for the information (and/or static barcode information) about the scanned item. Users may sort the item into the appropriate folder with the digital content sorting widget, or sync the information with a PC or mobile handset or other device for further manipulation. The fourth embodiment may feature flash memory (NAND chips). The docking station interface may be an analog 30-pin plug. The fourth embodiment may have a memory card slot.

Fifth, Sixth, Seventh, and Eighth Embodiments (not Shown) of Examples of the Present Invention

Fifth Embodiment

The fifth embodiment may include all the features of the fourth embodiment, but in a larger device format with greater storage capacity. The fifth embodiment may also include a camera, GPS and mapping software, and corporate class email handler. The fifth embodiment is smart phone device that does not need to use a cellular network to make phone calls, instead it may utilize IP phone services. The fifth embodiment may have a 3.5" widescreen display. The fifth embodiment may also include portable software to handle email, instant messaging, Web browsing, etc. as well as more than 25 other widgets.

Sixth Embodiment

The sixth embodiment may include all the features of the fifth embodiment, but uses a hard disk to enable greater onboard storage (at least 160 GB, although other memory amounts are contemplated). The camera is higher resolution and the screen has a slightly faster refresh rate screen than the fifth embodiment. The sixth embodiment is powered by faster microprocessors than the fifth embodiment.

The sixth embodiment is designed for power civilian users (gamers, construction workers, etc.). The sixth embodiment has more features and may be ruggedized and water resistant. The sixth embodiment may include video-conferencing software. The sixth embodiment may also include a motion-sensing accelerometer that may make the sixth embodiment ideal for many uses, especially video games. The motion-sensing chip translates a person's movement to the screen. Users may control software programs by clicking on virtual buttons on the screen, use gestures (on the touchscreen) or the use accelerometer to perform movements such as a "virtual click" (achieved by a quick downward flick of the device). The accelerometer may be configured, at the user's option, to automatically change the aspect of the display contents from portrait to landscape mode as the user turns the device.

Seventh Embodiment

The seventh embodiment is slightly larger than a normal cordless handset at home. The seventh embodiment may have a 5.5" widescreen with a higher resolution display with a higher refresh rate. The seventh embodiment is a full Mobi with (up to) all the features of the other embodiments previously described plus some additional capabilities. The seventh embodiment may include a docking station (which may become a user's cloud services delivery endpoint) that holds the seventh embodiment in a position that enables users to simply pass items underneath it or in front of it to barcode/RFID scan them. The seventh embodiment may also be a DVR and a digital content transfer box. The seventh embodiment may feature software which enables users to control Internet applications on the TV set, via, for instance a set top box. The seventh embodiment may also control a user's commerce communications cloud (Com-Cloud Facility 23)—which enables users to broadcast profiles of things such as their garage sale items from their home's WiFi network. The seventh embodiment may sync and load content to a user's other mobis.

The seventh embodiment may act as an universal TV and stereo remote control. The seventh embodiment may also act as the wireless touchpad input and cursor control device for TVs.

The seventh embodiment charging cradle may provide a physical connection via USB to the user's DVR or TV. The seventh embodiment handset may also connect wirelessly both to its charging cradle as well as DVRs or TVs with set top boxes that directly support wireless communication via WiFi and other means.

Because the seventh embodiment may be configured with IP phone service capability, it may function as an in-home IP phone handset that some users may use to eventually replace landline home phone service (and cordless phone). Users may want the seventh embodiment in each bedroom, as well as the kitchen—all the same places a user currently has home phone handsets.

When users are utilizing the seventh embodiment as a phone they may utilize either the built-in speakerphone or a Bluetooth headset.

The seventh embodiments may be WiFi enabled home phone wireless handsets. Replacing regular home phone wireless handsets, these WiFi-enabled, handsets, can run various software widgets.

The seventh embodiment may enable users to browse the Internet, including Websites from their TV set in search of movies, TV shows, and music.

The seventh embodiment may support software-defined radio so users may get connectivity not just from WiFi or other frequencies, but also from whichever wireless protocol their wireless carrier uses (if the user has a wireless carrier subscription and the carrier allows unlocked devices on their network). The seventh embodiment may display content onto TVs.

The seventh embodiment may support lossless compression, to enable high resolution content display. Users may display photos from photo Website services, as well as content synced from a user's computer.

The seventh embodiment battery life may be up to 18 hours depending upon the type of usage. The seventh embodiment may have a memory card slot, a touch capable touch screen, HD radio receiver, and, in some embodiments, a slide-out physical keyboard. The seventh embodiment may be utilized in place of standalone gaming rigs.

Eighth Embodiment

The eighth embodiment embraces many of the features and functionality of the seventh embodiment via a 10" touchscreen TV tablet. Similar in physical design to high-end television control system tablets, the eighth embodiment enables users to engage the functionality of the various Mobi facilities on a larger screen format suitable, for instance, for consuming or controlling digital content while on the couch or around the house. Designed not as a TV itself, but instead (among other uses) as an interface facility to the television, enabling users to manage their profiles on their TV with the ease engendered by the increased screen real estate of the eighth embodiment.

Figure 57:
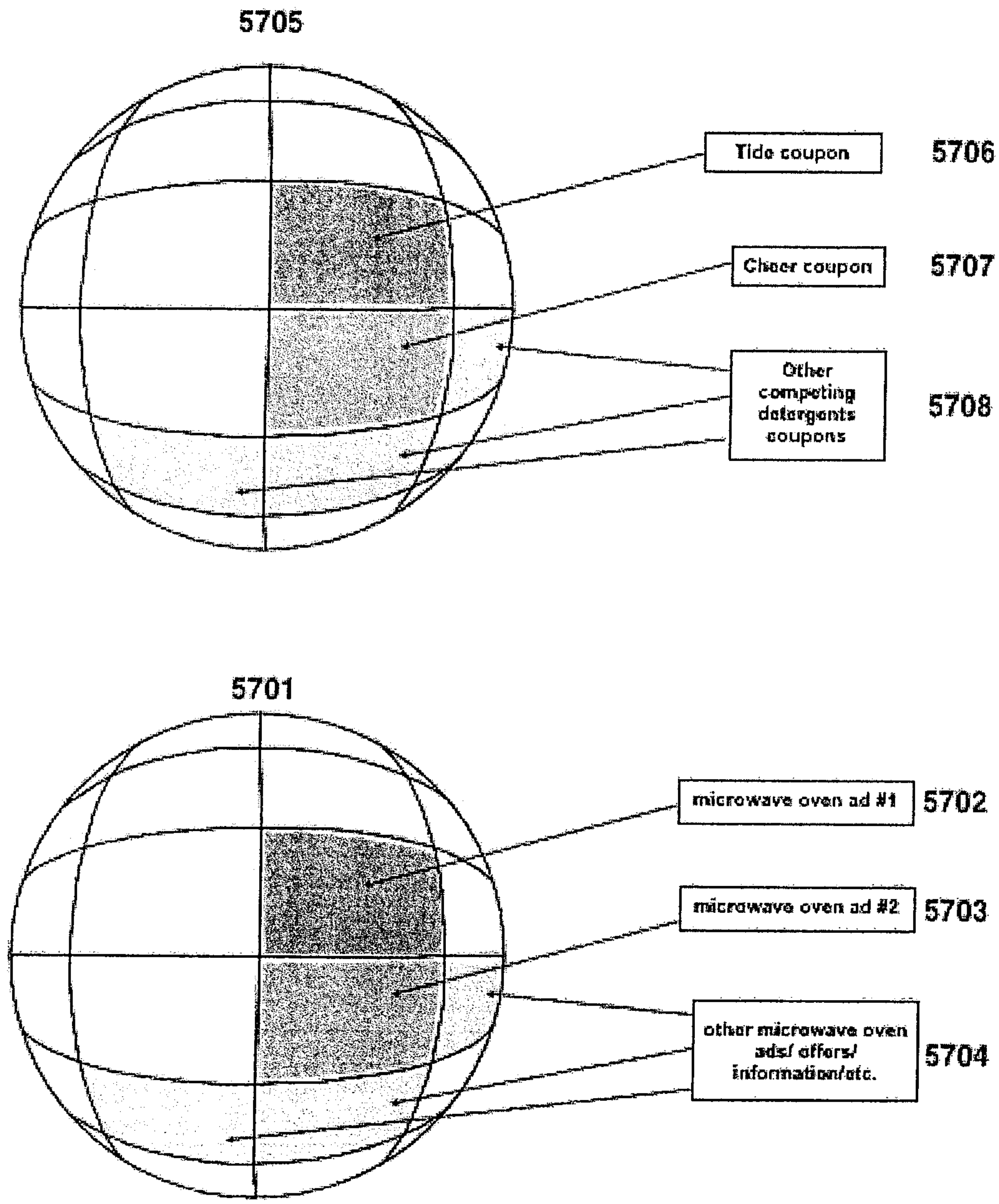
FIG. 57 is a depiction of an embodiment of an example of an unique information management facility, a Spherez, wherein data a user receives are configured into thumbnail tiles that are mapped onto (in this case) a sphere; whereupon the sphere information management facility attracts like content to it, for which the user may be paid directly by the data tile sender, for prominent placement on the user's topic-specific sphere.

FIG. 57 is a depiction of an embodiment of an example of an unique information management facility, wherein ads/offers/information/et. al. 5702, 5703, 5704, a user receives are received in thumbnail tiles (Tilz) that are mapped onto (in this case) a sphere 5701; whereupon the sphere information management facility (hereafter "Spherez") attracts like content to it, for which the user may be paid by the ad-sending entity, for prominent placement on the user's topic-specific information spheres (Spherez).

It may be appreciated by those skilled in the art, that fields such as search are becoming inextricably linked to advertising, and thus embodiments that relate to search/advertising warrant exploration.

With the Mobi Platform users may, for the first time, actually actively manage their ads 5702, 5703, 5704, 5706, 5707, 5708. And with Mobi Spherez, ads achieve a unique level of capability and usability—thus making ads far more valuable to users—literally making users lives better. For example, if a user's microwave oven is 10 years old, and needs replacing, the user, in embodiments, scans the barcode/RFID of their microwave oven to receive the data tile 5702 (Tilz) on their mobile handset. The received Tilz is mapped onto an information navigation facility called a Spherez 5701, which appears on the user's mobile handset (or other device) screen. Spherez 5701 enable users to manage the ads/offers/information/et. al. they receive.

As per the conventional art, a user who needed to replace their microwave oven would most likely sit down at their PC, and utilize a search engine to seek out information about microwave ovens. In fact, as per the conventional art, users often have to become a mini-expert when they need to accomplish something: find a reliable plumber to fix the leaking kitchen sink, figure out how to increase their child's chances of getting into the desired nursery school, or in this case, find a replacement for their aging microwave oven. As per the conventional art a user is likely to take a significant deal of time, trying to learn about microwave ovens: what's new since the user last purchased a microwave?; which manufacturers are reliable?; should the user purchase the microwave online or at a local store near the user? (taking into account such issues such as product returns and repairs).

And as step #1, which ovens are right for that user. As per the conventional art, a user may have to try to locate a tape measure, then go into their kitchen attempt to measure the dimensions of the opening of their cabinetry in which their current microwave resides. At which point the user may realize the microwave also provides the cooktop ventilation. The user may scribble down all this information on a piece of paper, which they have to take back to their PC utilize as the starting point for a long and rambling search for suitable replacement microwaves.

During the conventional art search process (which is funded by the appurtenant advertising, such as paid search), the user's time is being expended, and monies are being made by the search provider. Monies paid to search providers increase the costs of goods. Product makers build their marketing/advertising costs into the price of their products. Therefore every dollar that goes into a search engine's pocket is ultimately a dollar taken out of a user's pocket.

With the Mobi Platform other entities take their time supplying information to the user, and it is the user who gets paid.

The Tilz 5702 for the user's microwave oven, contains the profile for the user's microwave oven. With the Mobi Platform users don't have to become a mini-expert for all the problems they need to solve during the course of their regular life. In this case, the user doesn't need to have to research the dimensions of their microwave, or try to discover the power requirements, or if it is a combination microwave/cooktop vent model. The user doesn't need to know any such details. In embodiments the user, via the Mobi Platform, simply indicates that their microwave oven needs replacement and drags the Tilz for their old microwave oven from the blocked ads (REJECT) profile, to the seeking ads (ACCEPT) profile. And, in embodiments, within seconds, two things happen: the user starts receiving profile-informed ads/information/et. al., and the user gets paid to receive same.

Only those entities which manufacture microwaves that fit the proper dimensions, and include required functionality (such a cooktop venting) are likely to send ad Tilz or offer Tilz or information Tilz to the user. And likely only those bricks and mortar stores near the user send the user ads, hoping to convince the user to purchase the microwave at their store.

If a manufacturer made a microwave oven that did not include the cooktop venting function (and thus would not meet the user's needs) were to send the user an ad or information Tilz, it may be a waste of that company's time and money (as the user won't be buying their product) thus they are automatically disincentivized from bombarding the user with ads.

In response to the newly flagged ACCEPT condition vis a vis microwave ovens in the user's Mobi Platform profile, the user may start to receive additional ads/offers/information/et. al. 5703, 5704 presently. The Spherez maps these Tilz onto the sphere in such a way as to site the most closely matched responses as close as possible to the key position 5702 on the Spherez—currently occupied by the Tilz 5702 for the user's current microwave. Mobi Platform's profile matching algorithm facilities 5015 compare the profile of the incoming Tilz to the user's current microwave and place the best matches 5703, 5704 as close as possible to the key Tilz for the user's microwave 5702.

Alternatively if the user's Mobi Platform profile allows, ad-sending entities may pay 5022 the user for premium data placement on the Spherez 5701 (a variation on paid search advertising wherein the users get paid, as opposed to the search engine middlemen as per the conventional art).

Several other aspects of the Mobi Platform information navigation modalities are worth noting. First, Spherez is just one of a nearly limitless number of possible embodiments for Tilz/ads/offers/information/et. al. presentation. Instead of spheres they may be cubes, or any shape the user desires. Third parties may build other Mobi Platform information navigation modalities for anyone to use, either for free or for a fee.

Spherez are a convenient navigation modality for the smaller screen size of the mobile handset (and work well with a touchscreen wherein the user can navigate the Spherez by flicking with their finger which causes the Spherez to spin, and thereby reveal the desired Tilz). Users on a mobile handset may prefer a handful of relevant search results (as per the Mobi Platform), to a million blue links (as per conventional search engines).

Spherez attract like content—which revolutionizes search. With a conventional search engine, a search is performed, but the search results are generally not saved. So any given user may do the same search over and over again. With Spherez search results may be saved—the ads/offers/information/et. al. a user receives related to a given topic may each be maintained on separate profile-based Spherez (that the user can keep indefinitely). FIG. 57 illustrates the user's detergent and microwave oven Spherez. The Mobi Platform may create Spherez for each of a user's profiles. For example, a user whose hobby is comic book collecting may have a Comic Book Spherez, which may store current information (Tilz) the user already has, and continue to attract new information, such as upcoming comic book conventions, and offers from comic book sellers. Spherez are "living" entities. That is to say, they continue to function in the background, attracting like content. In the case of the user's microwave oven Spherez 5701, it may continue to attract like content, such as ads/information/et. al. about microwavable cookware, or microwave recipes, or information about sterilizing a baby's bottle using the microwave, etc. However, each user's Spherez only attracts content as per that user's profile. Thus each user's Spherez are different, even if they may be about the same topic—such as microwave ovens. If a user doesn't have a baby, that user may not receive the baby bottle sterilization Tilz. A user's profiles inform inbound messaging.

With the Mobi Platform, search is no longer a process that puts all the burden on the user, instead search may become something that happens automatically, and continuously, and minimizes the amount of time a user has to invest in the process. The Mobi Platform respects the user experience. Conventional search does not. With conventional search, the search engine makes money off users; wherein the Mobi Platform makes money with users.

Conventional search also fails users in other ways. Consider the case of two users in Paris, each one trying to figure out where to go for dinner. As per the conventional art, they each avail themselves of a search engine, and type in "Paris restaurants." The search engine, returns the same results for both users. There are billions of users on earth, each of whom are different, yet conventional art search engines return the same results for all users. One-size-fits-all search/advertising is a woefully inadequate solution.

Consider the additional case information that one person is a student backpacking through Europe and the other person is the CEO of a large company. Chances are the student wants to pay very little for dinner, while the CEO might be willing to pay quite a lot. Search engines should deliver different results for different people. Yet don't.

Ads are information that inform purchase decisions. The two Paris users need information to inform their restaurant choice.

Utilizing the Mobi Platform is a far more effective way of informing their restaurant choice. In embodiments, the Mobi Platform sets their restaurant profiles to ACCEPT and updates the user's location information. Each user's restaurant profile may consist of a Tilz for each restaurant they've already been to, thus Paris restaurants may make an informed decision as to whether the student's or CEO's restaurant tastes are such that they are a possible match. And if so, those restaurants may send the particular user their ad/information/et. al. Tilz, and potentially pay the user to receive such information 5703, 5704.

In embodiments the Mobi Platform blurs some aspects of the line between search and advertising. The Mobi Platform delivers more relevant information to users; in this case delivering differing and highly relevant sets of ads/offers/information/et. al. based upon each user's profile; whereas conventional art search engines treat every single user on earth, as if they all had the same profile. Profile-based search/advertising, as per the present Invention, obsoletes the conventional art.

FIG. 57 also illustrates a user's detergent Spherez 5705. The Mobi Platform, among many of features, enables a unique realtime challenge coupon process. For example, a user in a store, grabs a box of their favorite detergent, Tide, and scans the barcode with their mobile handset to receive via the Mobi Platform any available Tide coupons. If the user has elected, as per their Mobi Platform preference profile, to receive challenge coupons, then the following may take place: the user's Mobi Platform profile is updated in realtime, including any received coupons for Tide. The Mobi Platform presents an ordered list of available coupons on the user's mobile handset via the Mobi Platform client-side software. Once the user has selected a coupon, that fact is added in realtime to the user's Mobi Platform profile. Competing detergent companies, for instance, may receive an alert, that a user is actually in the process of purchasing detergent, and furthermore that the user, is about to purchase the competition's brand of detergent. There is no time when a user is more valuable to coupon-sending entities than when a user is actively in the act of making a purchase. In that moment, competitors to Tide, such as Cheer, are likely to make their most aggressive coupon offers, since the user is an active detergent buyer (as opposed to a coupon a company may send to someone who is in fact a detergent buyer, but may or may not be buying detergent anytime soon). And particularly, if the user's Household Items profile indicates that this user has been a loyal Tide buyer for years, it may take a bold gesture on Cheer's part to try to get this user to switch. It is not inconceivable therefore, that the user, via the realtime Mobi Platform profile broadcast, may be offered a multi-dollar off coupon from Cheer, and even pay the user, say, 50 cents, just to review the coupon right then in the store. The Cheer coupon may include a provision that the coupon is only redeemable on a receipt sans any Tide detergent.

Spherez embodiments are virtually endless, and compelling, and unique, and revolutionize aspects of search, marketing, advertising, and merchandising.

Figure 58:
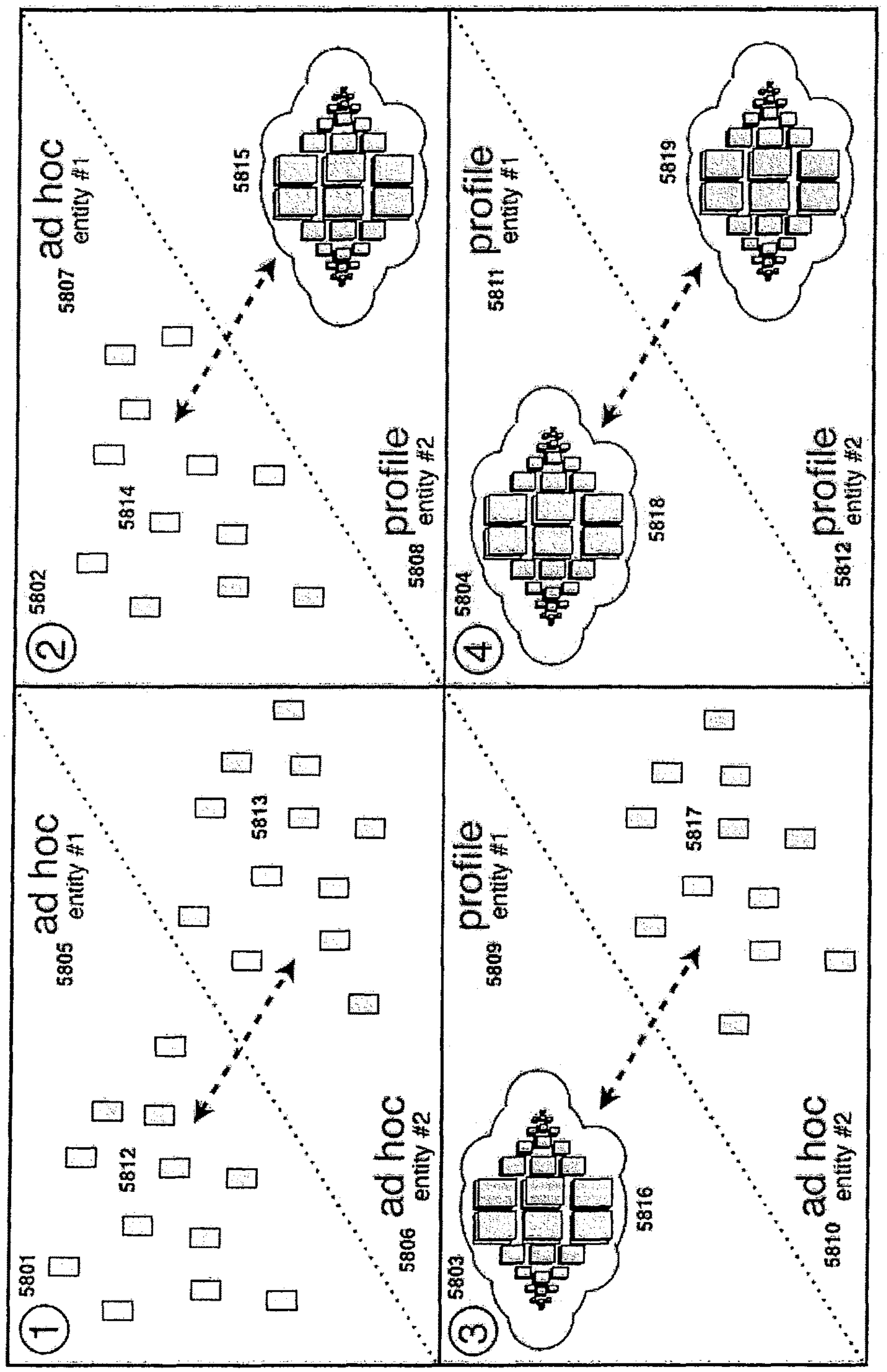
FIG. 58 is a functional block diagram illustrating an embodiment of a depiction of a method for determining whether an intersection of interest exists pursuant to interactions and/or transactions.

FIG. 58 is a functional block diagram illustrating an embodiment of a depiction of a method for determining whether an intersection of interest exists pursuant to interactions and/or transactions.

Mobi was created to make users lives better. One way to achieve same, is to enable the user to broadcast (CloudCast 5123) their wants and needs, and match them against information about entities/objects that may be able to meet their wants and needs. If such a match exists, Mobi may alert the user, to a potentially want/need fulfilling interaction(s) and/or transaction(s). Alternatively, Mobi and/or one or more of its Facilities may be configured or otherwise instructed by the user to act (autonomously) on the user's behalf pursuant to said interaction(s) and/or transaction(s).

In embodiments, Mobi (and/or its Facilities) may utilize an Intersection of Interest method to determine if the information appurtenant to two or more persons/entities contains a sufficient overlap or match, such that a potential for interaction and/or transaction should be flagged.

Cases

1) 5801 Entity #1 5805 compares its unstructured data 5812 against entity #2's 5806 unstructured data 5813.

2) 5802 Entity #1 5807 compares its unstructured data 5814 against entity #2's 5808 structured (profile) data 5815.

3) 5803 Entity #1 5809 compares its structured (profile) data 5816 against entity #2's 5810 unstructured data 5817.

4) 5804 Entity #1 5811 compares its structured (profile) data 5818 against entity #2's 5812 structured (profile) data 5819.

(included cases subsume cases wherein entity #2 performs the comparison, and/or wherein both entities are performing the comparison).

Case Examples

5801 Case #1: Bob (entity #1) 5805 walking along the sidewalk, comes upon Suzy's (entity #2's) 5806 mobile handset (Mobi) broadcast (CloudCast) 5813, which is broadcasting (CloudCasting) Suzy's "Garage Sale Items" profile 5813. In this case, Bob 5805 manually reviews all the available items for sale 5813, to determine if there is anything Bob 5805 might be interested in purchasing. Bob's (entity's #1's) 5805 effort is required to determine if there is an "Intersection of Interest" between the two entities, one of which has items for sale, and the other might have an interest in purchasing such items.

5802 Cases #2: Bob (entity #1) 5807 walking along the sidewalk, comes upon Suzy's (entity #2's) 5808 mobile handset (Mobi) broadcast (CloudCast) 5815, which is broadcasting (CloudCasting) Suzy's "Garage Sale Items" profile 5815. Bob 5807 manually reviews the tags relating to the available items for sale, which have been formed into logical groups of items 5815 with corresponding keyword tags. Instead of having to review every single item for sale, Bob 5808 may review just the keywords (a potentially faster process than having to review every single item for sale individually, as per 5801 Case #1), to help determine if there is an "Intersection of Interest" between the two entities, one of which has items for sale, and the other might have an interest in purchasing such items.

5803 Case #3: Bob (entity #1) 5809 walking along the sidewalk, comes upon Suzy's (entity #2's) 5810 mobile handset (Mobi) broadcast (CloudCast) 5817, which is broadcasting (CloudCasting) Suzy's "Garage Sale Items" profile 5817. Bob may be automatically alerted if any of the individual items for sale 5817, matches any of Bob's profiles 5816 of items sought—thereby confirming an "Intersection of Interest." Because Bob's profile broadcast (CloudCast) 5816 already indicate Bob's wants and needs, other entities (such as Suzy 5810 entity #2) may take their time performing the profile matching or "Intersection of Interest" determination; and thus very little (or none) of Bob's 5809 time need be spent wherein Bob 5809 would otherwise have to take his time to determine if the items for sale 5817 might be of interest.

5804 Case #4: Bob (entity #1) 5811 walking along the sidewalk, comes upon Suzy's (entity #2's) 5812 mobile handset (Mobi) broadcast (CloudCast) 5819, which is broadcasting (CloudCasting) Suzy's "Garage Sale Items" profile 5819. In this case, Bob (entity #1) 5811 has already established, and is CloudCasting from his mobile device (Mobi), his own profile of items 5818 he is interested in purchasing, and thus may be automatically alerted to any "Intersections of Interest" e.g. if entity #2 (Suzy) 5812 had a couch for sale for $50 5819, and entity #1 (Bob) 5811 happened to be interested in such couches 5818 at or near that price point, then there may be an "Intersection of Interest."

An embodiment of an exemplifying example of structured vs unstructured data:

Garage Sale Items—Unstructured

Couch $50, Rollerblades $25, Inflatable Kiddie Pool $12, Lamp $20, Skis $30, Saw $10, Nightstand $15, Basketball $5, Rake $2, Dresser $25. (Such unstructured data might be completely unstructured and therefore not even grouped by "Garage Sale Items." Thus these ten Garage Sale Items may be mixed in with thousands of pictures, status updates, videos, links, bookmarks, documents, files, etc. appurtenant, or otherwise related, to this person/entity).

Garage Sale Items—Structured (into Profiles)

Furniture for Sale (Couch $50, Dresser $25, Nightstand $15, Lamp $20); Sports Equipment for Sale (Basketball $5, Rollerblades $25, Skis $30); Tools for Sale (Rake $2, Saw $10); Kid's Items for Sale (Inflatable Kiddie Pool $12).

In the case of profile-based matching, one or more parties (or a third party) may possess a profile creation (and broadcast) facility, capable, if need be, of comparing other profiles for a possible "Intersection of Interest."

A disambiguation facility is configured for instances, such as when there is a potential match, but it is not unambiguously clear there is a 100% (or other user-selectable percentage) match or "Intersection of Interest." The disambiguation facility is configured such that the "degree of confidence" in any given "match" or "intersection of interest," is a user-adjustable parameter. The disambiguation facility may limit information overload potentially directed a given user (too broad a match criteria may result in the user being presented with an unwanted (too great a) number of potential matches, that the user may then have to take their time reviewing. The disambiguation facility may be further configured to "learn" from any such disambiguation that the user has to manually perform, i.e. the disambiguation facility creates a profile of user preferences and rules.

These and other objects and features of the present Invention may become more fully apparent from the following description and appended claims, or may be learned by the description and practice of the Invention as set forth hereinafter.

HD Radio

The Mobi HD radio tuner may be utilized not just to tune into HD radio stations, but also for data transfer (a feature unique to Mobis). Mobis may utilize the frequency to send and receive many forms of data—data beyond the current song title/artist, traffic, and stock information—such as ads, coupons, offers, messaging, social networking updates, et. al.

Radiation Shielding

Mobis may feature substantial radiation shielding. The sun routinely experiences cycles of sunspot activity. Solar Cycle 23, is experiencing peak activity that is expected to decay gradually over the next few years, before building again for the next solar cycle. There is concern that some of the most powerful solar storms in decades could arrive during the next solar cycle. A sunspot is an area of intense magnetic activity on the surface of the sun. During a solar storm, highly charged particles ejected from the sun may head toward Earth, where they can bring down power grids and disrupt communications/devices such as Mobi.

Continuous Wireless Sync

Mobis may continuously sync with a user's PC and/or the Mobi Website (and/or other local or remote device). If the user changes an appointment on their Mobi calendar, it may sync that change with the user's PC's calendar. Users don't have to wait until they get near their PC and plug in a USB cable to sync. If the user is trying to sync with their PC, but their PC happens to not be connected to the Internet or is off, sync items may stay in a cache until the PC is back online Digital Media Player In embodiments Mobis include a digital media player which is capable of downloading/streaming desired shows off (TV networks') Websites as well as videos from online sites. Users may play, pause, rewind, and fast forward many types of digital content, such as digital radio.

Users may download/stream shows/movies to some Mobi embodiments, either directly from the Internet or by syncing with other digital devices (such as a personal computer or DVR). This may be accomplished wirelessly (via WiFi or other wireless protocols) or via an optional cable.

DVR Sync

Software on the Mobi may sync the shows recorded on a user's DVR with the user's mobile handset (Mobi). The synced shows last as long as they exist on the user's DVR. The user may not own the shows, either when they are on the user's DVR or when they are on the user's mobile handset. Once a show is removed from the DVR, the show may either be immediately removed from the user's mobile handset (via continuous wireless syncing) or last an additional set amount of time, say 24 hours on the mobile handset before it is automatically deleted.

Remote Application Control and Input Device for Software on TVs

In embodiments Mobis may act as the wireless "mouse" for software applications being viewed/utilized on a user's TV (or other device). Furthermore, Mobis may act as the remote cursor for those applications running on a TV. The trackball, control pad, touchscreen or other thing on the Mobi may control the cursor for the TV software applications. And the Mobi touchscreen or physical keyboard may act as the input device for applications running on TVs (which may be delivered via a set top box or other means).

Device Control

In embodiments Mobis may be controlled with one thumb via a 360 degree mini knob. Other Mobi embodiments may be controlled via thumbwheel. The Mobi may be held in one hand, with the user's thumb scrolling and clicking through the menus, leaving the other hand free. Other Mobi embodiments may be controlled via a control pad on the non-display portion of the top of the device case. Other Mobi embodiments may be controlled via a touch-sensitive display screen. In embodiments Mobis may be compatible with technology to read and control menus via heads-up displays in users' eyeglasses.

Silent Mode

In embodiments users may place Mobi face down on a surface (such as a desk) to put the Mobi into full quiet mode (no sound or vibrate notifications). The user may still monitor what is happening, and perform some functions, via the smaller display screen on the back of some Mobi embodiments. This second smaller screen may also be touchscreen capable on some Mobi embodiments.

Mobile-to-Mobile Data Exchange

Mobi users may designate one or more of their profiles (stored on their mobile handset) to be "squirtable" to another Mobi. This profile exchange may be accomplished via Bluetooth or RFID or other means. The profile may contain simple information such as a business card or calling card, or more elaborate information such as a social networking site profile. This feature is intended to be utilized when WiFi or other Internet connection is not available or desired to be used. Thusly commerce and social interaction may take place on mobile handsets that have no cellular phone service provider, and without access to the Internet.

IP Address Management

Each mobile handset (Mobi) is assigned a unique IP address. This may be one of several IP addresses assigned to each Mobi user. The advantage is that others may get in touch with the mobile handset user via a single point of contact number: the IP address assigned to the user's mobile handset. So instead of others having to remember a person's phone number, email address, instant message (IM) screen name, etc. they can direct contact to that user's mobile handset IP address. Users access IP address management via the Mobi Preferences Profile. Among other actions users may select the IP addresses the user is accepting IM, chat, email or IP phone calls at. The user may want to use a Master Email IP address, instead of the many individual email addresses they currently maintain. Alternatively the user might have a work IP address—the user's work "phone" number—and a home IP address—the user's "home" phone number—and other IP addresses that are temporary. These temporary addresses, which may last just a few days or weeks, are utilized to provide to strangers or vendors who might later want to bother the user with solicitation/sales phone calls.

Cookies

Via the use of a novel type of wireless electronic reverse cookies (My Cookiez Facility 26), in addition to other means, a user's Mobi is able to transmit the user's preferences, and other information, to other digital devices. For instance, when a user is watching a TV the user may transmit the types of commercials they want to view or the way they like their commercials presented. Also a when a user accesses a Website via their Mobi mobile handset the Website can receive the user's cookies (My Cookiez) and display the Website information in accordance with the user's preferences.

Volume Typing

Users may plug in a keyboard or utilize a Bluetooth-connected keyboard to facilitate volume typing. Examples include foldable tactile keyboards or ones that project a light-based keyboard and touchpad. Some Mobi embodiments may be placed in the docking cradle to hold the Mobi either in vertical portrait position or in horizontal landscape position for hands-free viewing. In addition, Mobi users may purchase a docking station, ala laptop docking stations, to hook up a full size physical keyboard and large display monitor or digital TV. Finally, some Mobi embodiments may have a slide-out physical QWERTY keyboard.

Mobile Handset Photos

Using the Mobi's WiFi capability, users may create a Mobi camera profile that may automatically transfer digital images (pictures or videos) to their PC (or other device) and/or Website of their choice. After the initial profile setup the user does nothing more than have their Mobi on, and the pictures and videos may transfer automatically. During transfers a camera popup window may appear with a progress thermometer and display the name of each image being transferred, including the destination information. Mobi's image transfer capability may be compatible with WiFi networks including those that utilize login pages. Additionally, images taken with the Mobi may be assigned an unique ID number. The user may also keep, as per their preferences profile, a low resolution thumbnail of all images on their mobile handset or PC (or other device). If the user then clicks on a thumbnail, it may browse to wherever that full image now resides (such as the user's photo-sharing Websites).

Ejectable/Removable Battery

In embodiments Mobi has a removable, and thus user replaceable, battery and/or an ejectable battery. The ejectable battery enables users to quickly swap out a dying/dead battery for a fresh one. The standard battery may be a sealed, lithium-ion type battery.

Non-Cellular Mobile Mail

Mobis are compatible with an email delivery service for IP based (as opposed to wireless carrier based) mobile handsets. Unlike current devices, MobiMail is functional for mobile handsets which do not subscribe to a wireless carrier. Instead these mobile handsets may rely on WiFi and other forms of wireless data services that happen to be geographically proximate to the mobile handset device to send and receive email (and other forms of communication).

Environmentally Friendly Features

Recycled Components

Mobis may be (partially) constructed from materials from recycled aluminum, glass and plastic, particularly for the case and display screen.

Photovoltaic, Touchscreen Glass Display Screen (Green Option #1)

Users may optionally select a photovoltaic, touch-sensitive display screen. By leaving the photovoltaic screen facing toward sunlight, the Mobi's battery may be recharged.

Green Plug (Green Option #2)

The Green Plug is a Mobi feature that allows third parties to build alternative, eco-friendly power sources for the Mobi, and utilize the ejectable battery slot to install the chassis for their power source for the Mobi. Examples may include a portable solar power panel, or hand-cranked power.

Other Mobi Options

Carbon Fiber Case

Mobis may be available in an optional carbon fiber body.

Bioscan Reader

In embodiments Mobi may include a touchscreen with integrated fingerprint scanning facility. This security feature may include software with user-selectable settings, such as requiring the user to re-scan their thumbprint each time to awaken the Mobi after it has gone into sleep mode.

Bio Chips

In embodiments a module configured for interface with implantable ID chips is provided. This security feature for instance enables users to conduct financial transactions with their Mobi as their payment device (though the Mobi may be utilized as a payment device without use of biologic chips).

Virtual Personal Assistant Facility

VPAs may be the successor to PDAs. Virtual personal assistants supplant the functionality of current devices such as personal digital assistant (PDA) devices. Mobi's personal digital assistant facility (hereafter "MiMo"), leverages the vast user profile data, and Mobi facilities, to be able to execute tasks and provide information to the user, in a semi- or fully-automated way. A user's profile data enables MiMo to provide customized responses and recommendations (even paid recommendations wherein the user gets paid).

Animation Facility

In embodiments a module configured to provide animated avatars for Mobi widgets and other software applications is provided.

Fleet Management Facility

The Invention fleet management tools include: a management console facility that among other things facilitates asset management, configuration management, and the ability to secure and protect lost or stolen devices.

To further clarify the above and other advantages and features of the present Invention, more particular descriptions of the Invention will be rendered by reference to specific embodiments thereof which are, in some cases, illustrated in the appended drawings. It is appreciated that these drawings and descriptions depict only typical embodiments of the Invention and are therefore not to be considered limiting of its scope. The Invention will be described and explained with additional specificity and detail via the following applications and use cases.

IP Phone Service

Mobile devices, especially mobile devices without a monthly service contract, may make phone calls for free or very low cost. IP phone service can turn lower cost mobile devices into phones via Phone Widge (Facility 9).

Wireless Carriers

May Enter the IP Phone Service Market

Mobis may enable wireless carriers to enter the IP phone service market. There may be mobile handsets in the marketplace not paying subscription fees to wireless carriers that utilize, for instance, Voice over Internet Protocol VOIP via WiFi. If wireless carriers want to get any revenue from this market, they may offer IP phone service and data services via WiFi (and other non-traditional wireless carrier network frequencies). They may make revenue by commissions from Mobi Facilities for transactions that take place on such devices.

ISPs and Cable Companies

May Enter the IP Phone Service Market

Mobis may enable Internet service providers (ISPs) including entities such as DSL or cable Internet providers, and/or cable TV companies to enter the wireless (IP) phone service market—without having to invest in any infrastructure. Users with Voice over Internet Protocol VOIP-capable Mobis, may opportunistically connect to available networks to facilitate IP phone calling. A majority of all cellphone calls are made from the home or office, places where many users may already benefit from some form of wireless Internet coverage, such as WiFi. VOIP calling, when such functionality is enabled on mobile handsets such as Mobis, represents a green field market opportunity for ISPs and cable companies to extend their product mix deeper into their users lives. Companies such as Time Warner Cable can get in to the wireless phone service business without having to put up a single tower. The set-top boxes they may deploy to users' homes, Mobi Homis, may be carried around and utilized as an IP phone service device, relying on WiFi or Bluetooth or other means to make the calls.

Electronic Payment Device

Mobis may be utilized as an electronic payment device for example to pay for in-flight entertainment options on airlines, or food at the local store, without need for physical credit cards or cash.

Remote Keyless Entry Devices

Mobis may be utilized as remote keyless entry fobs (wireless-lock fobs ala car key fobs which may unlock/lock the doors fro the fob) for the doors of houses/buildings (as well as for cars and other things).

Captive Audience TV

Mobis enable users to interface with audience display marketers. An increasing number of elevators and gas pumps feature display screens running ads for the brief time that users are in their presence. Such screens may be utilized to broadcast (CloudCast) updates to user's mobile handsets. In embodiments the captive audience device CloudCasts (Facility 23) a data signal that reads a user's ComCloud (Facility 23) and thereby provides status updates or information sync for the user's Tilz (Facility 30), including Tilz mail—tmail. Such updates may be profile-based and include, for instance, the latest news from their friend's social nets.

Traffic Report Network

Car drivers with GPS-enable Mobis may provide firsthand traffic data to online map services, particularly in combination with Gotz Dotz (Facility 37) path marking units. This may enable online map services to offer real-time traffic conditions that other users may benefit from on their mobile handsets (and/or in-car navigation systems or other devices).

Realtime Item Tracking

Every item with a barcode or RFID may be tracked users with compatible mobile devices (Mobis), so users know where inventory items are, or where the user's Domino's pizza is right at the moment. Mobi's barcode/RFID scanning facilities may offer up-to-the-minute tracking of most any item, from the time the customer orders the item, to when it is sent out for delivery, and where exactly it is in transit. That is to say, the barcodes/RFIDs at various points along the journey may be scanned, as the product passes that point in the manufacturing/delivery process. Other uses may include inventory management at stores, or military materiel tracking. A plurality of mobile devices (Mobis) with GPS and barcode/RFID scanning capabilities may be better able to track and locate such items.

Replaces the Need for Dedicated Barcode Scanners

Many stores use dedicated handheld barcode scanners for inventory purposes. Mobis may offer this same functionality. Stores may in some instances, utilize handheld scanners instead of tying up valuable real estate with checkout areas. It may also increase customer throughput. And Mobis may offer a lower cost approach than purpose-built handheld scanners.

In-Home Hands-Free Barcode Scanner

Mobi may also be an in-home, hands-free barcode scanner. The optional docking station may hold the Mobi in such a fashion as to allow the user to swipe barcodes for household items. For example, users may scan all the items they eat and send the information to their weight loss service provider, such as Jenny Craig (or doctor), for tracking and analysis. Or users may create a Household Items VictorsList (Facility 18) and get paid to receive related offers (Ad Widge Facility 1) when it's time to replace such items.

In Store Scanning Via Mobile Handset

Users may utilize their Mobi to barcode/RFID scan items while they shop, and receive coupons (Coupon Widge Facility 3), offers and information (Ad Widge Facility 1) and assistance—and may get paid to do so.

Social Networking Via Mobile Handset

The next generation of teenagers is quickly making the online publishing of photos, diaries, videos and art a basic part of their daily life. Mobile handsets are becoming the digital device the teenagers spend the most time on each day. So it is only natural that teenagers (and others) would seek to have a mobile handset (or other devices) that may enable them to do their online social networking, without having to take extra time each day to sit down at a PC to do so. And Mobis unique Facilities ecosystem enables novel, profile-based social networking modalities. Each user simply carries around their profile, as CloudCast (Facility 23) from the user's mobile device (Mobi), and others who wish to view such profiles can (as per each user's permission and other profiles). Or their profile may be limited to just certain other users or affinity groups or users with sufficient Web Cred (Facility 19).

Social Networking Via TV

Mobi users may do their social networking at home while watching TV, or simply utilizing the larger TV screen size real estate as a large display. One or more Mobi embodiments may enable users to "mark" shows or commercials or other content (via Net Dotz Facility 27 and Tube Widge Facility 15) that a user wants to bookmark and then share the content or bookmarks with others. Users who grab the Tilz (Facility 30) profile for the show they're watching may choose to interact with other users who are watching that same show at that same time. Or network with others who push their profile onto the user's TV, so they can socialize at the margins of the screen while each user watches their own shows. Mobi Facilities are profile-based, and thus are a natural fit for social networking.

Touchscreen TV Capability

Users may utilize various Mobi display screens to be the touch pad to control the cursor and be the "touch screen" control for televisions (or TVs connected to set top boxes such as DVR's). It is impractical for users to walk up to TVs and use them like the touchscreen, thus the user may sit back in the comfort of their chair or couch or bed (or other thing) with their Mobi in their hand, and use it as a remote touchscreen for the TV.

Mobis solve the problem of how to run "computer" applications on a TV without having to have a full keyboard in a user's lap while watching TV (though some Mobi embodiments may have a slide-out tactile QWERTY keyboard). Users may utilize the Mobi as both a remote control for the TV and the input device and the wireless connection to the Internet. The wireless Mobi addresses the problem that many people don't have their Internet connection (Ethernet plug) close to their TV and/or their DVR/TV doesn't have a wireless Internet connection.

e-Book Reader

Some Mobi embodiments have a screen large enough for it to function for some users as an e-book reader. Mobi enables the user to change the display font size. In embodiments Mobis pre-load, paid-content such as some sample e-books that expire 24 hours after the user starts viewing them. For e-books that the user views in mobile digital-content format 5130, any live links in the book may be clicked on to be taken to the Web for the content behind that link For those books that the author chooses to do so, the book's content can be updated in real-time. So for instance errata may be corrected, and if the author is online users may chat or instant message (IM) with the author—connected reading (which may also include connecting and socializing with other readers). Authors may choose (or not) to accept feedback and contributions wild-style about/to their book. Authors/publishers may allow readers to post opposing viewpoints or refuting links for various contentions in the book, that the critic thought was an inaccurate representation. Book clubs can meet inside their e-book.

Depending upon the Mobi embodiment, navigation is via a touch screen where users make flicking motions to scroll forward and back in the book. Readers may also utilize a search engine 5116 to search inside the book.

DVR Statistics

Mobi embodiments that function as DVRs may, if the user allows, share/sell second-by-second ratings information for programs and commercials, as well as demographic data about the viewers themselves (gender, age, income, geography, race/ethnicity, presence of children, marital status, number of DVRs, length of ownership, connectivity type (DSL, dial-up, etc.), TV signal type (cable, satellite, over the air), but only if the user chooses to make such information public or semi-public as per their Mobi preferences profile 5120. Users may be paid for CloudCasting (Facility 23) such information. Users may also choose to share their viewing habits with ad agencies, market research firms, or even TV networks themselves. These (or other) firms (or entities) may pay the user for this data, which may be offered with or without any personally identifiable data about the user. Much better than conventional art Nielsen Ratings since Mobis may be carried with a user at all times, and thereby provide a 360 degree view, that manifests how each user utilizes information on TV commercials in that user's real life. Importantly, Mobi analytics go far beyond Nielsen TV ratings. Mobi may, if the user allows, record a user's use of and satisfaction with all products and services in a user's day to day life, as well as when the user is traveling.

Wireless "Landline" Handsets in Offices

One or more Mobi embodiments are designed to replace cordless and corded landline phone in homes and offices. The superior functionality of a Mobi, as compared to traditional office phone systems, enables workers to be far more productive. Mobi's corporate widget stack includes videoconferencing software as well as widgets that enable common employee tasks such as checking inventory levels, expensing lunch, etc.

Personal Server

The Mobi embodiment referred to herein as Docking Station (or Docking Station Pro)—may include a faster CPU, a high-end dedicated graphics processor and more memory—may act as the home's digital shoebox or personal server. Users may move photos, files, songs and other things taking up space on their PC to their home's personal server. There is a trend toward consumers starting to turn the tasks of storing, distributing and safeguarding data over to personal servers and/or remote servers. The Mobi Docking Station Pro may act as a local "remote" server, for purposes of backing up, syncing across multiple devices, and data broadcast 5123. Mobis may utilize the user's TV as a large screen display. Users may back up their PC and/or other (mobile) devices to their Docking Station Pro each day. And the Mobis Docking Station Pro may store, display and manage a user's digital content such as photos, movies and music.

Software widgets which ship with the one or more of the Mobi embodiments, including Docking Station Pro, enable the following:

Mobi music and videos may be played through the user's home audio system, or streamed to the user on a plurality of devices. The Mobi Homi embodiment performs DVR functions and may send Tilz or stream content. Homi may host content for others to view, such as photos a user wants to share with friends. Users may host their own Internet protocol IP addresses, their Tilz, on their Homi with no monthly fee paid to an ISP. Mobis may be on the user's home network and monitor the security status of all PCs on the network, and alert users when, for example, antivirus software needs updating.

Mobis may record TV shows and sync/stream them to other devices. Mobis may be configured to provide remote access to a user's files.

Mobis may act as a Web server that lets friends and relatives view photos from the Internet. Users may utilize a digital content controller widget to let friends and relatives view selected digital content.

Home Internet Box

The Mobis Docking Station Pro may double as be the user's home interne box—which terminates various services such as high-speed Internet, TV, and phone connections. The Mobi phone software manages the user's phone mailbox. Features may include text translation for voicemails, including the ability to include the callers' voicemail message in the recipient's reply voicemail—which may be sent without having to call the original caller, if the original caller also has Mobi's IP phone software 5109. Thus voicemail may function like enterprise voicemail systems using Tilz which the user simply records their reply on, then that Tilz is synced with the sender who created that conversation Tilz. Conversation Tilz for a given person may store all conversation a user has ever had with that person—and thereby function like email. Users may also forward voicemails to other callers.

In addition to separate inboxes for each email account, and for text messages, and voicemails, Mobis may also have an Unified Inbox where users can manage all their digital traffic. Additionally the user has the option of managing their communication traffic (email, voicemails, and texts) in mobile document format 5130—which appears to the user just like any of their other digital content such as songs or videos.

Video Game Box

Users may upgrade to the optional Docking Station Pro to run videogames. Users may play either via their TV set or via their (Mobi) mobile handset.

Whole House Controller

In embodiments Mobi functions as the whole house controller; controlling, for instance, the home's lighting systems, audio/video systems and digital appliances such as ovens or hot tub (via third party software). The Mobis controller software offers basic security functions for compatible hardware/software.

On Demand TV

Mobis enables a new type of on-demand television service. Currently most on-demand is offered by live streaming of content from the cable TV company's servers. Features such as fast forwarding or rewinding are slow, and there is a noticeable time lag from the time any command is given, to the time it is executed (again due to the streaming delay). Mobi DVR offers the ability to pull the entire content Tilz onto the user's Mobi DVR just like any other show the user might record off the regular TV broadcast. This has the advantages of allowing the user full and fast-response control over this on-demand content. The user experience should be consistent across all content, whether from a standard TV broadcast or from on-demand.

Additionally, satellite TV companies may then offer on-demand for users with access to a broadband connection. The on-demand menu may be broadcast from the satellites, but the delivery is from the satellite company's Website/content servers which then send the show to the user's Mobi DVR via wired high-speed broadband (DSL or cable) or via WiFi (or similar wireless protocol) or via other means.

IP TV

In embodiments Mobis download/stream online videos from the Internet. This ultimately means that Mobis may become some users' cable/satellite TV replacement. Mobis, in conjunction with Tube Widge (Facility 15), may download/stream shows from Websites as well as independent content for the user to view. Also Mobis may, via the Hosted Everything (Facility 6) knowledge sharing facility 5106, find TV/movie critics who search the Web (including TV network and movie studio Websites) for a mix of TV shows, sports shows, and movies, and have that bundle delivered to the user's Mobis for playing/display on the user's TV or Mobi handset (per digital rights acquisition).

Television broadcast signals may be utilized to broadcast data (such as Tilz 5130 updates, status updates, notifications, etc.) not just TV. That is to say utilize television broadcast signals for data transmission and synchronization. Metadata for Tilz, as well as Internet Protocol IP addresses for more information (Tilz Facility 30) on all items shown on that TV broadcast (such as information about the shirt worn by the TV news anchor), as well as data transmission and synchronization unrelated to the TV broadcast.

Portable DVR and Set-Top Box

DVR's and set top boxes consist, generally speaking, of a CPU, RAM and storage, plus software configured to perform various functions such as recording and playing back content. So instead of wasting billions of dollars shipping such single function equipment to users' homes, cable and/or satellite companies (or other television service providers) can save those billions, and utilize devices users already have in their homes—home phones or mobile phones. The seventh Mobi embodiment (Mobi Homi) doubles as a home cordless/mobile phone, with DVR/set top box functionality. Users may thereby take shows with them, either from room to room, to a friend's house, or even when traveling. And this Mobi embodiment enables, say, a cable TV company to offer their service anywhere that the subscribers' Mobi happens to be connecting from. Also, since there are usually a plurality of home phone (cordless) handsets in a house, each person in the home may have their own Mobi Homi, and thus their own DVR. And with Mobi's Internet capabilities the DVR transitions to become a DCP—Digital Content Provider. The Mobi Homi may download, via Tilz (Facility 30) any sort of digital content a user may desire: such as games, songs, movies, TV shows from major networks, and TV shows from independent outfits, or even other users. In short, the Mobi Homi (and/or Docking Station Pro) becomes a user's cloud services delivery endpoint. Lastly, the Mobi Homi also replaces the aging concept of a standalone gaming rig.

Purchase Items Directly from Ads or Shows

When a user comes across an ad in a newspaper (or other thing), the user may scan the Net Dotz (Facility 27) barcode for that ad with their Mobi; and thereby receive a Tilz (Facility 30), which a transactable object containing a profile for that product or service, and place an order for same directly from that Tilz.

Mark TV Shows and Commercials and Movies

When a user is watching a TV show, they may "mark" that show and add it to their Shows Watched VictorsList (Facility 18) or Recurring TV Show VictorsList 5118, by simply receiving the show's IPv21 # (Facility 25) via radio frequency, from the metadata channel that is included with all shows, and which may be CloudCast 5123 from the TV from the Mobi Homi set-top box (or by other means). Users may then get paid by companies that want to send ads/offers/information/et. al. regarding various ways the user may receive that show (video rental stores, local stores that carry the DVD of that show, online stores, etc.). Users may also mark commercials and get paid to accept ads for that product, and get paid to accept ads for competing products, and get paid to receive coupons (and other information/content) for that product. Users may also add the product in that commercial to their Gifts For Family VictorsList (Facility 18), and local and online retailers may pay the user to make offers to sell that product to the user.

Host Digital Content

Mobi may usher in a new form of hosting. Conventional art hosting may be expensive and cumbersome. Most users have no idea how to create a Website, and even if they do, adding or changing Website content is often difficult or time consuming. Hosting content should be as simple as creating a word processing document. And via Tilz (Facility 30) it is. Users may "host" content simply by creating a Tilz then tagging it as Public (or Semi-Public). Period. It's that easy. Users may also restrict the viewership of hosted content by listing those users who may view it. Others may then find that content by utilizing a tag-based search engine, such as Mobi's uTag (Facility 16), and grab a copy of the content Tilz, whenever the host's Mobi is connected to the Internet (or via other means such as peer-to-peer if the person happens to be in Bluetooth range of the host's Mobi).

Manage and CloudCast a User's Profiles

Instead of other companies spying on users creating profiles, then making money off users' profiles, with Mobi each user is in charge of their own profiles, and may get paid by others for their use. The Mobi is a device specifically configured for this purpose. Users may easily acquire data from their real world interactions with all the objects in their day to day life (via means such as barcode/RFID scanning), which automatically builds use profiles, which marketers/advertisers/et. al. may pay the user to view. In addition, unlike the conventional art, wherein users have to expend users' time and energy inputting their information on other Websites, in order, for instance, to sell items on eBay, with Mobi users simply add that item for sale, by scanning the item's barcode/RFID (or other means), and in seconds it is for sale, right from their own digital device, via ComCloud (Facility 23).

Unique Features Enable New Forms of Advertising and Transacting

New forms of Advertising. With Mobi advertising may finally become truly one-to-one marketing. With Mobi companies may now have a direct relationship with their customers. Companies don't need conventional art search companies, tracking companies and others in the middle. Users CloudCast (Facility 23) their wants and needs and companies may market directly to individual users via ads (Ad Widge Facility 1), coupons (Coupon Widge Facility 3), and custom offers. New forms of transacting. Users CloudCast 5123 what they want, and others nearby (or remote) fill that need with items they want to sell. Other users may sell the person used items, or nearby stores may sell new items. Users may scan their own shopping cart of items with their Mobi, and pay via their Mobi (utilizing iDough Facility 7 or Pay by Widge Facility 32 or Motran Facility 36), and get paid with their Mobi 5100, when their Shopping VictorsList (Facility 18) profile is updated and marketers pay the user to view that profile. Inter-modal transactions (transactions that take place between various types or modalities of merchandising or order fulfillment). Online companies may, on a transaction by transaction basis, utilize a bricks and mortar store an user happens to be near, as a fulfillment platform to save shipping costs, and the user may thusly get the item right away. And the reverse may sometimes be true: bricks and mortar stores may utilize an online store, such as Amazon, to fulfill and ship an order to a customer when, say, chain-store location A is out of stock, and it would be cheaper to fulfill via Amazon, rather than lose the sale, because their next chain-store location B is too far away, for it to be worth it to the user to drive there.

Motion-Based Interaction and Transaction Platform

Utilizing a magnetometer and accelerometer, in addition to RFID-powered Survey Nuts (Facility 38), enables Mobi users to utilize hand/body gestures and/or motions to perform various functions. Digitally "tap" a person on the shoulder to get their attention by waving a Mobi at another user. Mobi users may transact, such as pay each other or trade content or Tilz, by a simple flip motion with their Mobi.

Oversold Flight, Angry Crowd at the Gate

By examining everyone's profiles, as CloudCast (Facility 23) by their mobile devices (Mobis), which include future flights/connections, and each user's willingness to fly at a different time, third party/airline widgets may calculate better passenger mixes—which may save airlines from having to pay passengers for bumping them from the flight—and put money into the pocket of flexible travelers. Users may not only CloudCast 5123 to airlines what they are willing to accept to be bumped from a flight (in a kind of reverse blind auction), but users may also accept offers from other airlines to get them to their destination—all via CloudCast, and with almost no effort on the part of users. And airlines may rationally deal with all the passengers at once, silently working with various passengers to solve any problems.

Games

Games such as Been There Tagged That ("B3T") that provide a fun way for users to show others the various places they've been, and for place owners to raise awareness of and drive traffic to their establishment (or other thing). As per Mobi usual, users get paid, and real life sites and businesses interact directly with customers, instead of advertising (and other) monies going to third parties. B3T is a social networking facility enabling users to share places they visited and geo-tagged utilizing their GPS/barcode/RFID-equipped mobile device (Mobi 5100). B3T is a real world games hub enabling users to interact in and with the real world. B3T may incorporate videogame characters, or movie characters or cartoon characters into real world situations. GPS "tag" a location by sending that waypoint to B3T (or other servers or other IP addresses). Net Dotz 5127 tag the barcode of a site—scan the Net Dotz barcode to tag-in and receive the Tilz (Facility 30) digital profile for that location. RFID tag via glop (a digital message) to the RFIP (IP-based RFID Widge Facility 33) site or use the RFIP 5133 ComCloud 5123 to tag-in by grabbing the Tilz 5130 from the IP address encoded in the tag. Because it drives traffic to their location, owners are incentivized to place a Net Dotz 5127 sticker or RFIP (IP-enabled RFID Widge Facility 33) tag on their establishment. Glops are messages users leave for each other (e.g. user interrogates the RFID tag which may return the IP address of that location's site, the IPv21 # (Facility 25) site, or simply the profile Tilz 5130 for that location/establishment). Users may then sign the Virtual Guestbook "Bob was here" or take a picture of themselves in front of the little church in Greece. This picture may not be available on Myspace or anywhere else. It may be restricted such that only users who are actually physically present at that location can view that guestbook. Alternatively, anyone who tagged the location may be able to view the location's ParaSite (Facility 29) (mini Website for that location, that users carry around on their mobile device (Mobi)) for 30 days, then must re-tag to keep socializing).

Local, location-based message boards. Tags may only be made within a set distance of the location. To read prior taggers' tag messages, one needs to by within, say, ten feet of the location. Prizes for those who log the most tag badges (Tilz 5130)—by category (National Parks, ice cream parlors, museums, et. al.). Users may utilize means such as Bluetooth and/or RFID 5133 to tag an item. Locations/establishments/destinations may pay B3T to be on certain tag hunts (to drive traffic to their location). Tag badges are Tilz (Facility 30) that become (virtual) collectibles.

B3T creates "bookmarks" (tags) of physical places users have visited. Users may then sort 5108 these tags into various lists 5118, which they may share for free or for a fee. People who travel to very interesting, out-of-the-way places may make income by allowing others to subscribe to their tag-in list (VictorsList Facility 18 of the places they've tagged). Users may get paid to allow companies to market services/products relevant to their tag-in lists. If a user has been to a number of Ritz-Carlton hotels, it may be the case that the Four Seasons may want to pay to send the user an offer (as per Ad Widge Facility 1) to stay at the Four Seasons next time. Users may share 5123 their prospective tag-ins (for upcoming trips) and may get paid to allow companies to send ads 5101 and offers related thereto.

Users may track locations "visited" by characters in movies, TV shows and video games. The producers of the digital content may place electronic Net Dotz (Facility 27) in their movies, TV shows and video games. Fans of James Bond movies may track and tag the cities/buildings the character visited. Fans of various video games may be able to "prove" they've been to various places, on various game levels, by tagging the location (and thereby receiving the Tilz 5130 for that location). B3T is not limited to corporeal places. Users may also tag locations inside digital items such as e-books, documents, movies, videogames (and other things). Fantasy games may utilize avatars to seek out and tag B3T checkpoints inside the fantasy game. Users may greet others at (corporeal or digital/game) tagpoints, with their avatar presenting a video message.

B3T Traveler IQ Challenges, where contestants are quizzed about geographic locations and asked to click on (or otherwise locate) them on maps. Users may compare their score to others for points and prizes. And businesses may drive traffic to their location by sponsoring games where their location needs to be tagged. In addition to widgets for school age children for geographic eduction, B3T games include: Tales of Tags We Logged, Marko de Polo, Oh My What a Big List You Have, Tag the One Less Traveled, Tags for Rags (turn tag-ins into clothes for charity), No Bored Games, and travel tags catalogs/guidebooks, et. al.

Paid Tags. For example, there is a truly stunning work of art in Italy, that the town keeps well hidden and protected. There is a 6 week waiting list at any time to simply view the original of this work of art. However, if a user knows a few simple steps, one may make an appointment for most any day. That is a B3T entry, which the user might provide only to a select few, and may do so for a fee. Users may pay other users for travel tips: 25 cents or 25 dollars, or whatever each deems the tip worth.

A real world game example. "The Amazing Place" may be offered by the producers of "The Amazing Race" TV show. Contestants have to solve clues and tag the checkpoints and pitstops. Phil Keoghan, host of The Amazing Race, may has his avatar be there virtually, greeting people, assigning their order of arrival, and delivering prizes, so viewers may mimic the on TV game. Users may also create less elaborate games to appeal to wider audience of players. Games may incorporate video game characters. The local McDonald's may have the Shrek movie character greet children who tag-in (especially via low cost Mobi embodiments, that don't require a wireless carrier). Imagine some of the scarier videogame characters appearing, as per tagging-in, during, say, the (already creepy) Paris nighttime sewer tour, or even being the virtual tour guide for a price. Real dollars being paid, for real world entertainment (via virtual characters). Mobi, via games its Facilities enable, extends the franchises for videogame characters, movie characters, TV show personalities, et. al. into the real world, for additional real world monies. Virtual convergence.

B3T is more than a real world game and social networking facility and education tool. B3T revolutionizes branding and customer acquisition and interaction. Information is undergoing a transformation from centralized to decentralized. From monolithic information (at centralized servers) to customized information carried with or attached to people, places, and things. B3T is informed by the structural shift that individualized, decentralized information portends.

Blurbz

Few people have enough time to consume the ever expanding volume of content. Accordingly a new way to provide customized summaries of the world's information is desirable—hence user-generated, multi-flavored content synopses (hereafter "Blurbz."). Cliff Notes synopses for everything: TV shows, books, movies, cars, history, how-to topics, class notes, product reviews, company meetings, psychology, political topics, science, travel, et. al. Blurbz provide brief summaries that capture the most salient information. User-generated (Users create Blurbz, and split revenue with content owners). Multi-flavored (The Rome travel Blurbz for punk rockers, for executives, for single-women, et. al.). How To: install a sink, hang a light fixture, et. al. Users may receive an iDough (Facility 7) micropayment from others who view the How To.

In embodiments there are Blurbz for each of the primary Dewey Decimal system classes: 000 Computer Science, Information and general works; 100 Philosophy and Psychology; 200 Religion; 300 Social Sciences; 400 Language; 500 Science/Math; 600 Technology; 700 Arts & Religion; 800 Literature; 900 History & Geography. Blurbz provide an ordered approach to the world's knowledge. And make the oceans of information available in bite size pieces. With a plurality of flavors of each topic, since different users have differing opinions about each topic. Blurbz travel guides built by/for various affinity groups: single moms, sports fans, wealthy elderly, cruise goers, et. al. each enjoy their own travel tip forums, blogs, reviews, and Guides, that users create and moderate. A Republican's synopses (Blurbz) of a book, or political speech, may be different from a Democrat's.

A user watches a TV show about healthy foods and condenses the 2 hours of video content into a few pages of written notes. People who enjoyed the show, start asking if they can have a copy of the notes. So the user creates a Blurbz to distribute to friends and other for free or for a fee (subject to digital usage/content rights). As per the conventional art, people take and share notes all the time without any revenue going to the content creator; with Blurbz that may change—the content creator may revenue share.

A user watches a travel show on TV. The user clicks/taps a button on the user's mobile device to request the show Blurbz. The Blurbz consist of Tilz (Facility 30) containing subTilz for each of the hotels, restaurants, sites of interest, travel routes, car rental, and airline (and other) information conveyed during the show. If the user utilizes or patronizes any of those entities, the TV network and/or content producer/owner may get a commission. Comprised of Tilz 5130, Blurbz are thereby transactable, enabling users to get paid (as per Ad Widge Facility 1 and Coupon Widge Facility 3) to allow companies to send ads/offers/coupons/et. al. related to the information in the Blurbz. Blurbz and partners (such as the wireless network provider and device manufacturer) may get paid when users and content owners get paid. And get paid again during that user's trip for allowing realtime location-based ads/offers/et. al. for restaurants/wares,/tours/et. al.

Blurbz provide "Just the Gist," for time-starved users. And in doing so create new interaction and transaction possibilities between product/service providers and content creators/owners and their users.

uTag uTel uTag uTel provides a convenient method for users to share knowledge of real world items, they feel others may have an interest in. Users discover, tag, and rate, not just Web pages, photos and videos, but also corporeal points of interest, products, shows, and people (such tags inform the uTag search engine Facility 16). Such tags may be discovered by querying that object's/person's ComCloud (Facility 23). Users may get paid for recommendations that lead to transactions. uTag uTel becomes a way to discover things a user may like. Offline social bookmarks. uTag uTel is a social facility to enable sharing of items of interest. Results are sorted 5108 as per Web Pref (Facility 20) profile and affinity groups. Users may evangelize about content (Websites, digital content, or offline content/items/et. al.) via the Tilz (Facility 30) digital profile tiles for those items. uTag uTel searches for tag-related content about that place, show, product, person/et. al. And users can leave glops (digital content/messages) about any item of interest. For example, a user may attach a recommendation about a person, to an actual person (if that person agrees to same). So, if others walk past Joe Smith, and a person wrote a recommendation saying what a great manager he is, others may view that recommendation Tilz (if Joe Smith's profile allows). A mobile device (Mobi) that is with users every moment of the day, informs new methods of sharing information about real world objects with others. Information that others may find humorous, helpful or essential. uTag uTel has created a revolutionary way to share such information.

Spherez Treez

A Spherez is a (digital) multi-faceted sphere (or other shape) onto which data tiles (Tilz Facility 30) are mapped. A Spherez Treez is a physical embodiment of a ComCloud (Facility 23), data/profile broadcast facility, wherein display screens arranged onto a multi-faceted sphere (or other) shape, as supported on a (tree trunk-shaped) column. Spherez Treez may be placed in stores, and plazas, and even utilize the windows of skyscrapers as displays for Tilz. User's ComClouds may, if the user allows, be projected onto Spherez Trees displays. When one user's Tilz or profile makes a match with another Tilz or profile, the audience may see the match happen (as, in embodiments, two Tilz move to overlap). Via Spherez Trees users may actually see other users' ComClouds 5123. The audience may see a user's model railroad set for sale (see the Tilz digital baseball card-like profile of the railroad set); and perhaps see another user's Tilz profile indicating a desire for such a railroad set—even if one or more of the users is on the other side of the world—if the user's ComCloud was set to global). People may also watch uTag searches happen. They may see trending terms and Tilz, and watch as tagged content is pulled closer to the central or "key" Tilz for that search term. Spherez Treez provide manifest illumination of how Mobi Facilities function, and are the physical representation of the intersection where users' online and offline worlds meet. Users may walk up to a Spherez Treez and, if they allow their ComCloud 5201 to be displayed thereon, see the user's Galaxz Tilz 5202; much like seeing their social networking page, but in the real world. Touchscreen panels enable the user and others to interact with the content. Spherez Treez may be installed all over the world: on a street corner in Paris (where it may help a tourist, or advertise a play). Spherez Treez may also be installed in airports, in hotel lobbies (for sightseeing or restaurant recommendations), company breakrooms (to facilitate worker interactions). Spherez Treez may be huge (e.g. fifty feet tall) or night table size (one foot tall). People may see the ads that would be bombarding them, and see them intercepted by their profile protectors, such as Ad Widge (Facility 1) and Coupon Widge (Facility 3), blocking and destroying the unwanted ads—like in a videogame. And such videogame characters may be licensed to actually destroy those ads making viewing on Spherez Treez rather entertaining. Spherez Treez in hotel lobbies, company lobbies, and other places. Spherez Treez become an extension of the Mobi brand. Spherez Treez may also be placed in numerous other businesses such as 7-11s, McDonald's and Pizza Huts. Spherez Treez which incorporate (third party) image recognition facilities might recognize a user's shirt, and commence a uTag 5116 search for information related to that shirt (or an uTag search for information about a flower in a woman's hair), possibly returning information about stores that carry that shirt, or ads about competing/similar shirts. Spherez Treez may be helpful for users who carry the smaller Mobi embodiments, such as the thumb-sized embodiments that have a miniature screen or no screen at all. Such users may utilize Spherez Treez to view all the Tilz they scanned (e.g. Tilz that were download to their Mobi as a result of their barcode/RFID 5131/5133 scans for the day), (be paid to) receive ads 5101 for recommendations, see friend updates, et. al. See what's going on in other people's minds: that guy likes Guinness beer and soccer. That other person is an UCLA fan. Can watch as users walk up, and their ComCloud Tilz may be projected onto the Spherez Treez. Checking for matches, and if, for example, there is another UCLA fan, then they might meet at the next parking lot tailgate before a game. Spherez Treez may also speak to users, and respond to spoken commands. Users' profiles (and license rights) determine which voices it uses: Hal (from 2001 Space Odyssey), or whichever celebrity voice the user has licensed (good way for a user to show off their e-stuff, at a tSpot (transaction spot, so enabled by the presence of a Spherez Treez, where users may sell each other Tilz or download movies, songs, games, et. al.), where others may admire a user's cool Tilz collections or Mobi features. Artists and architects may build unique versions of Spherez Treez. Each city, or neighborhood may reflect its own character by having a Spherez Treez in, say, antique form, or very modern graffiti-esque. The London Tate Modern Museum spider statue may have a Spherez depending from it's belly, or perhaps wrapped in a "spider web" like a caught fly, with display panels visible to patrons, who may interact with it.

Want to know where "The Cloud" is? It's right here. Spherez Treez are the physical embodiment of The Cloud. Data centers may brand themselves via Spherez Treez, with, say Amazon's name on a Spherez Treez that in some way (with due respect to privileged information) conveys the sort of transactions being facilitated by the Amazon servers is taking place). Spherez pulse slightly, as if alive, as each transaction or match occurs. Spherez Treez may also be next generation bulletin boards—which interact with users as they pass by or stop and read the items. TV's at audio video stores usually display a canned show or movie. Instead, TV's for sale at such a store, can become Galaxz (Facility 5) Wallz or Spherez Wallz—interacting with users' profiles, and displaying their wants and needs (if the users allow), or photos or thoughts (Tilz), et. al. And if the (profile match and/or) transaction happens at that store, then that store may receive a commission. Spherez Treez are also configured as self checkout point of sale stations for stores, and libraries, and other things. In embodiments, laser lights may emit from outdoor Spherez to project a huge version of Spherez Treez Tilz, say, on a nearby building or wall.

Social networking. When users walk up to a Spherez Treez they may see their Galaxz 5105 Tilz 5130—their latest posts and pictures, and even items for sale, moving their social networking to the real world. Commerce. Users may engage in commerce utilizing Spherez Treez, for stock transactions, or to purchase cameras, software, movies, widgets, send email, get directions, communicate with friends, et. al. Touchscreen panels enable users to interact with the content. Live gaming. Users may play poker with other users online all over the world, or participate in videogame tournaments (with a live audience). The lottery may utilize Spherez Treez (users watch the numbers being drawn which are then flashed on the Tilz). 3-D gaming. Game makers can create real three dimensional games, where users have to walk around Spherez Treez to see what's behind the next building or obstacle in the game.

Ogle. Ogling or just "gling" refers to when an interaction or transaction was successful. Live feeds on Spherez Treez enable customers to watch glings happen in realtime. And Tilz 5130 decks of glings may be available ex post facto. Some users may be interested in watching live interactions take place. For instance, users may watch as a woman with her dating profile Tilz visible, actually meets her match via ComCloud. Business schools may watch live commerce actually happen. A user with a profile containing rare Harley parts may make a ComCloud 5123 connection with another person needing those parts. Avatars, map mashups, et. al. may be used to create recreations of transactions (if desired). Digital tools may be supplied to viewers who vie to create the most-watched transaction recreations. DVD Tilz. Users may walk up to a Spherez Treez to download a DVD Tilz (digital copy of a DVD) to the user's mobile device. Users may interact with friends (Phone Widge Facility 9) VOIP phone calls, or social network 5105 while the user waits. Wired and wireless downloads available.

Spherez Treez adapt to their surroundings. Spherez Treez may be built to take on most any shape using, for example, exiting public art installations. And office building windows may be used as display screens (at night). Passersby may stare up at the side of office buildings as they see their profile Tilz appear as if on a giant video screen, displaying their latest picture or video or status update or quick picture of their couch for sale, or the profile entry for the type of person they'd like to date. And sidewalk goers may watch as actual transactions take place and profile matches are made. Crowds may stand in rapt attention as they see the embodiment of "The Cloud" brought to them by Mobi 5100.

Retail Mashups

Retail mashups (between online and bricks and mortar retailers) may be utilized in a number of different ways including for time-limited merchandise, or for specialty sizes, or for larger selection than a store would like to carry. Bricks and mortar stores may turn to online wholesalers for order fulfillment. Halloween costumes are a good example of time-limited merchandise where retailers may have to make an important tradeoff. How much valuable shelf space should they dedicate for this short term annual event? And what will it cost them in lost sales, when some of the regular merchandise is temporarily removed from the shelves to make way for the Halloween gear? Not to mention the cost for management to plan all these limited-time shelf stocking changes, and the cost for the labor to actually remove items and fill the space with limited-time items such as Halloween costumes. And the cost again to put everything back the way it was as soon as Halloween is over. For example, Kmart and Target may have in store Halloween displays, but want to have a larger selection without the expense of setting aside space for, and incurring the cost of large in-store fixtures. To avoid this expense bricks and mortar stores may turn to online wholesalers. Mobi Facilities may provide retailers such as Kmart and Target with a brand new merchandising opportunity—a retail mashup with an online distributor. Instead of Kmart and Target having to make a big gamble on an investment in a vast assortment of Halloween gear, they may turn to an online wholesaler/distributor, to provide a larger selection, as well as order fulfillment. Customers may come in to Kmart and Target to view all manner of Halloween yard installations such as gravestones and coffins and giant inflatable vampires, but have the merchandise shipped to them by the online wholesaler. The online wholesaler owns the inventory, warehouses the inventory, is the wholesale transaction Website, and ships the goods to the customer. Kmart and Target take the markup for the sale, from the online wholesaler's wholesale prices, thus providing them a nice sales margin. The process is seamless to the customer. And bricks and mortar retailers enjoy smaller working capital commitments, and less floor space utilized for what is a five-week business (Halloween). The online wholesaler already has in place the call center, distribution, expertise and (greater) assortment for such specialty items (than Kmart or Target could practically offer).

Size assortment. How many retailers can profitably afford to carry every size of every item. For instance, plus sizes—whether for Halloween costumes, or simply regular clothing items year round, bricks and mortar stores may not be able to carry every item in every size possible. With Mobi Facilities they may interface with the Website of specialty stores, such as those specializing in plus sizes for fulfillment. It should be noted that if retail mashups are successful for specific retailing events, such as Halloween, then bricks and mortar stores may make mashups with online wholesalers a part of their everyday business.

Online stores may turn to bricks and mortar stores for touch shopping. With Mobi Facilities online stores may have a way for their customers to actually see, touch and try their merchandise at their local brick and mortar retail store. For example, the brick and mortar stores carry just display sizes, so that customers can try on items, see how they like the fit, and make sure it's the right size. Bricks and mortar stores don't have to carry inventory, but may get paid a sales commission. And from the customer's point of view, the cost to the customer is the same, even including free shipping. The online wholesaler can utilize brick and mortar retailers such as Kmart and Target to enable their customers to actually touch and try before they buy from the online retailer. The online store still owns the inventory, warehouses the inventory, is the wholesale transaction Website and ships the goods to the customer. Kmart and Target may get paid a commission from the sale, from the online retailer. The process is seamless to the customer. The bricks and mortar retailers enjoy smaller working capital commitments, and less floor space used. Yet can offer a larger selection. From the customers point of view, it's almost as if the online store's inventory of items in now available at the local bricks and mortar store where they've been shopping for years. The online retailer still handles the logistics and support for this mashed up sale via their own assets and strengths which may include a call center, distribution, expertise and assortment. Bricks and mortar stores may utilize Spherez Treez to enable the customer to get paid to receive live offers to fulfill shipment of the items they are trying on in the store. Bricks and mortar stores may need to find a way to combat the impression that almost anything can be purchased less expensively online. By having Spherez Treez inside stores, they enable customers to see just what is available online, and either get a commission on helping that customer make their purchase online, or have the data the stores need to make decisions about certain inventory items they may no longer wish to carry, in their bricks and mortar store if they cannot be competitive with online pricing and delivery.

Mobi Facilities provide a game-changing set of tools for bricks and mortar stores to bring their facilities and processes into the mobile age. RFIP (RFID Widge Facility 33) tags may replace physical price tags. Not only may the store re-price an entire store's inventory in mere minutes, with a mobile device (Mobi), but may also deliver customized ads and offers 5101 to patrons as they shop. Analytics via the use of ComClouds (Facility 23), may provide analytic data never before available to retailers such as missed demand data.

Virtual Stores. Stores may engage their customers in a whole new way that extends their shopping experience beyond the borders of their physical bricks and mortar store. For example, Macy's buyers may span the globe looking for products they believe their customers would likely want to purchase. As per the conventional art retail model, Macy's would then negotiate with that small store which carries that item to have hundreds or thousands of those items delivered to various Macy's stores. With Mobi Facilities, Macy's customers and those who have the Macy's virtual store card (Motran Facility 36), move about in the real world and may be alerted whenever they are, for instance, near merchandise that the Macy's buyer would have brought into the Macy's store. By saving the expense of actually shipping the products around, customers save money, Macy's still receives a sales commission, and the small stores (or item manufacturers) get new traffic driven to their doorstep. And these virtual store items may appear on the Macy's Website, available for sale, but with fulfillment via the small store (or item manufacturer).

Mobi Facilities provide retailers both online and offline a true new mashup. The user of mobile devices (Mobis), RFID Widge (Facility 33), Net Dotz (Facility 27) plus analytics data provided by various Mobi Facilities equals a better understanding of what to order, how much to order, and which items should be displayed in-store even though some merchandise may be provisioned, as well as shipped to the customers, from an online wholesaler. Stores may feature "Try before you buy" areas in their stores, where customers see and perhaps try out some of the toys, games or other merchandise, but fulfillment may be made via online wholesalers, or even from product manufacturers directly. Users may move about in the real world, and be alerted when one of a curated set of items in near.

CloudCasting

Users may continuously CloudCast (Facility 23) from their Mobi, "ringtones" such as song clips or pictures or videos of the user or favorite movies or the user's status—enabling conversations to take place as the user moves about in the real world. People may be able to see other users' profiles via their mobile handset (and other means). And it's not limited to users who are proximate to the user, Mobis CloudCast may send and receive profiles from anyone anywhere on earth. Interested passersby may view each other's profiles. All sorts of real world connections and transactions may be made. If a user is moving out of their apartment because they bought a house, chances are other residents in the user's apartment complex may be interested in the user's furniture or other stuff. (Apartment residents a user would otherwise have no easy way of reaching.) As per the conventional art, both parties may have to have posted and/or searched on the same Website for such an online transaction to take place. But with CloudCasting 5201 from Mobis 5203, all that changes. The user just scans their items, and they can be instantly posted to the user's CloudCast 5204. And other residents can opportunistically leave a request in their CloudCast for local deals on couches or apartment-sized dining room sets. Mobi's CloudCast facilitate an environment that is akin to Myspace+eBay+Amazon+reverse Google ads (ads that pay the user), all happening all the time—without needing any of those companies. And it happens naturally instead of the work that all those conventional art sites require on the user's part. With Mobi, it's: Users First.

Cloud 1 Vs Cloud 2

Yahoo, eBay, Google, Myspace, etc. are all examples of Cloud 1. They try to amass as much content/et. al. as possible in a single place on their servers in the cloud. Data and transactions are stored at server farms, not locally. With Cloud 2, each person's mobile device (Mobi 5203) is its own cloud. And there's a ComCloud 5201 emanating from each person 5303, business 5304, 5305, 5306, and house; and indeed every object such as cars, refrigerators, every item in every store, etc., and any other tangible entity. With Cloud 2, users keep their data, such as all their wants and needs and social profiles, as well as their items for sale, on their own digital device (Mobi 5203). The definition of "hosting" changes and Mobi utilizes the Internet or peer-to-peer connections to facilitate transactions. Users may offer their items for sale (via ComCloud CloudCast Facility 23) globally or locally or even just within fifty feet of their mobile device or house (via Survey Egg Facility 39). Items each have their own profile Tilz 5202 (Facility 30). And Tilz may be carried by others (for other users) on their mobile devices, expanding the range of the transaction potential. Although the Internet blankets much of the earth, it doesn't mean that every single potential buyer, has logged onto eBay, for instance, to search for the item that you have for sale; or bothered to check Amazon or Craigslist. If a user is an HO model railroad enthusiast and wants to sell their locomotive, the user simply changes the status tag on the Tilz 5202 for the locomotive, which is already on the user's mobile device (Mobi), which powers the user's ComCloud (Train Stuff VictorsList Facility 18). Thusly those in ComCloud 5201 range (as set by the user) who are interested in acquiring HO scale railroad paraphernalia know what is being offered. And better yet, since HO people may like to hang out with other HO people, the ability to let others carry a user's for-sale Tilz, means the user's products for sale are being made known to the most interested and focused audience in the world. As opposed to Cloud 1 which exposes a user's for sale items to the unfocused entire world . . . and then, only if everyone who might be interested happened to log onto eBay, or whichever site a user's stuff is posted on. People in other countries may be turning to their local equivalent of eBay (or other Cloud 1 site), and may never see the user's item. However, with ComCloud 5201 (a Cloud 2 service), a user may conceivably reach anyone on earth, even those in other countries, or in remote areas without Internet access. And importantly, the user is in charge of the transaction, and there are no listing fees (only value for value transaction fees). Cloud 2 is billions of mini clouds all over the globe. And billions of users constantly exchanging each others' profiles/Tilz to geometrically turbocharge the facilitation of interactions and transactions.

So goes Merchandising 1 vs Merchandising 2 with Mobi. So too goes Social Networking 1 (share all things with everybody) vs Social Networking 2 (share things with others as per intersection of interest). Advertising 1 (spray as many users as possible with ads, junk mail, spam) vs Advertising 2 (send ads to just those users/entities (actively) interested in receiving same). Payments 1 (designed for the benefit of payment facilitators) vs Payments 2 (designed for the benefit of the two parties to the transaction—the buyer and the seller). Networking Architecture 1 (designed years ago for static devices) vs Networking Architecture 2 (designed for ubiquitous mobile/connected devices). Web 1 (HTML, URL, HTTP) vs Web 2 (Tilz 5130, IPv21 #5125, ComCloud 5123).

Mobi

Mobi is at the core of an ecosystem of Facilities designed from the ground up to compliment and integrate into a user's life. And the user gets paid for utilization of same. In embodiments Mobis have unique features for consumer handsets such as laser-based barcode scanners 5131 and RFID interrogators 5133. The Mobi Homi embodiment may replace conventional art cordless home phones with (Mobi) smartphones. The Mobi Home Docking Station Pro may replace just about every box associated with a user's TV, including the DVR. The Docking Station Pro may also become a gaming platform that obviates the necessity for standalone gaming rigs. And the Docking Station Pro may become the user's personal server, digital shoebox, and local cloud services hub. This Mobi hub may also become the income center for each household. Users lives are transformed by having with them at all times a digital device, the Mobi, which may interact with the items in the real world that each user encounters in their day to day life. Mobi not only enables the user to capture and utilize information valuable to them, but also creates and manages the profiles that the user can monetize. This income may essentially result in Mobis being (net) free with no (net) monthly service charges. And the profiles CloudCast by the Mobi may change the way users interact with others and the world interacts with the user. Mobis are not only game-changing for individuals, but also game-changing for many companies: gaming rig makers may get out of the money losing hardware business and focus on game innovation and new uses for game characters, such as cool embodiments of various digital services such as virus protection. Mobi also revolutionizes the medical world by being the central ubiquitous device to which numerous attachments are connected to replace many of the current medical devices that are much larger and more expensive. And Mobi's unique technology enables what may well become the new form of social networking—CloudCasting.

The present Invention may be embodied in other specific forms without departing from its spirit or essential characteristics. The described embodiments are to be considered in all respects only as illustrative and not restrictive. The scope of the Invention is, therefore, indicated by the appended claims in addition to all foregoing descriptions. All changes which come within the meaning and range of equivalency of the claims and foregoing descriptions are to be embraced within their scope.

What is claimed is:

1. A method of data transmission to and from a fixed-in-place location establishing device, said method comprising:

providing a compact, secure, waterproof, weatherproof, and any of battery and solar-powered fixed-in-place location establishing device comprising a microprocessor, operating system, memory, and wireless broadcast module;

the fixed-in-place location establishing device further comprising a plurality of Tilz stored in said memory;

each said Tilz identified by its own IP address, each said Tilz further comprising a relational database further comprising a plurality of metadata identified datasets;

broadcasting by the fixed-in-place location establishing device, a plurality of said Tilz IP address and a plurality of Tilz metadata to an external computing device;

receiving, using said broadcast module, from said external computing device, a request for a particular IP address and metadata identified dataset from among the plurality of datasets;

transmitting by said fixed-in-place location establishing device, said particular metadata identified dataset to said external computing device;

wherein at least some of said Tilz are further linked to other Tilz to form a Tilz construct according to any of content or topics of their respective metadata identified datasets;

further transmitting by said fixed-in-place location establishing device, data from at least one linked Tilz to said external computing device;

further configuring said links in said Tilz construct to enable representations of a plurality of said Tilz in said Tilz construct to be mapped onto sections of a sphere; and wherein said external computing device displays said Tilz construct as said representations of a plurality of said Tilz mapped onto said sections of said sphere.

2. The method of claim 1, wherein broadcasting said plurality of Tilz IP addresses and transmitting said particular metadata identified dataset are effected via Bluetooth.

3. The method of claim 1, wherein broadcasting said plurality of Tilz IP addresses and transmitting said particular metadata identified dataset are effected via a wireless protocol.

4. The method of claim 1, wherein said datasets comprise profiles of any of objects, people, or future actions.

5. The method of claim 4, wherein said profiles are stored in Tilz metadata identified datasets.

6. The method of claim 1, wherein at least some Tilz further comprise other tiles.

7. The method of claim 1, wherein any of said datasets and said Tilz comprise profiles, and said profiles are user-created and managed profiles.

8. The method of claim 1, wherein said fixed-in-place location establishing device further comprises a GPS receiver;

wherein said fixed-in-place location establishing device further uses said GPS receiver to automatically determine its location, thereby producing location data; and further transmitting, by said fixed-in-place location establishing device, said location data to said external computing device;

wherein said external computing device uses said location data to determine any of which particular IP address or metadata identified dataset to request.

9. A method of data transmission to and from an external computing device, the method comprising:

providing a compact, secure, waterproof, weatherproof, and any of battery and solar-powered fixed-in-place location establishing device comprising a microprocessor, operating system, memory, and wireless broadcast module;

said fixed-in-place location establishing device further comprising a plurality of Tilz stored in said memory;

each Tilz identified by its own IP address, each of said Tilz further comprising a relational database further comprising a plurality of metadata tag identified datasets;

wherein at least one dataset comprises a metadata tag indicating a profile of the wants and needs of a user of said external computing device;

detecting, via said external computing device, one or more datasets containing a metadata tag identified matching dataset broadcast by said fixed-in-place location establishing device;

transmitting, by said external computing device, a request for the metadata tag identified matching dataset to the fixed-in-place location establishing device;

adjudicating, by said external computing device in communication with the fixed-in-place location establishing device, terms of service for the identified matching dataset(s);

receiving by said external computing device the metadata tag identified matching dataset from the fixed-in-place location establishing device;

wherein at least some of said Tilz are further linked to other Tilz to form a Tilz construct;

at least some of said Tilz are further linked to other Tilz to form said Tilz construct according to any of content or topics of their respective metadata identified datasets;

receiving by said external computing device the metadata tag identified matching dataset and data from at least one linked Tilz from the fixed-in-place location establishing device;

further configuring said links in said Tilz construct to enable representations of a plurality of said Tilz in said Tilz construct to be mapped onto sections of a sphere; and wherein said external computing device displays said Tilz construct as said representations of a plurality of said Tilz mapped onto said sections of said sphere.

10. The method of claim 9, wherein said terms of service for said metadata tag identified matching dataset include authorization prior to dataset transmission.

11. The method of claim 10, wherein said terms of service for said metadata tag identified matching dataset include authentication prior to dataset receipt.

12. The method of claim 11, wherein said terms of service for said metadata tag identified matching dataset include monetary or other value payment prior to transmission.

13. The method of claim 12, wherein said metadata tag identified matching datasets comprise profiles of any of objects, people, or future actions.

14. The method of claim 13, wherein said profiles are stored in a proprietary file type readable by mobile devices.

15. The method of claim 9, wherein at least some Tilz further comprise other tiles.

16. The method of claim 9, wherein any of said datasets and said Tilz comprise profiles, and said profiles are user-created and managed profiles.

17. The method of claim 9, wherein said fixed-in-place location establishing device further comprises a GPS receiver;

wherein said fixed-in-place location establishing device further uses said GPS receiver to automatically determine its location, thereby producing location data; and further transmitting, by said fixed-in-place location establishing device, said location data to said external computing device;

wherein said external computing device uses said location data to determine any of which particular IP address or metadata identified dataset to request.

* * * * *